(12) United States Patent
Grubbs et al.

(10) Patent No.: US 11,053,356 B2
(45) Date of Patent: Jul. 6, 2021

(54) CONTROL OF POLYMER ARCHITECTURES BY LIVING RING-OPENING METATHESIS COPOLYMERIZATION

(71) Applicant: CALIFORNIA INSTITUTE OF TECHNOLOGY, Pasadena, CA (US)

(72) Inventors: Robert H Grubbs, South Pasadena, CA (US); Tzu-Pin Lin, Pasadena, CA (US); Alice Chang, Los Angeles, CA (US); Hsiang-Yun Chen, Pasadena, CA (US); Christopher M Bates, Santa Barbara, CA (US)

(73) Assignee: California Institute of Technology, Pasadena, CA (US)

( * ) Notice: Subject to any disclaimer, the term of this patent is extended or adjusted under 35 U.S.C. 154(b) by 321 days.

(21) Appl. No.: 15/914,762

(22) Filed: Mar. 7, 2018

(65) Prior Publication Data

US 2018/0258230 A1 Sep. 13, 2018

Related U.S. Application Data

(60) Provisional application No. 62/467,925, filed on Mar. 7, 2017.

(51) Int. Cl.
C08G 81/00 (2006.01)
C08G 81/02 (2006.01)
(Continued)

(52) U.S. Cl.
CPC .......... *C08G 81/021* (2013.01); *C08F 285/00* (2013.01); *C08F 287/00* (2013.01);
(Continued)

(58) Field of Classification Search
CPC .............. G08G 81/021; G08G 61/08; G08G 2261/136; C08F 293/00; C08F 293/005;
(Continued)

(56) References Cited

U.S. PATENT DOCUMENTS 4,052,539 A 10/1977 Shropshire et al.
5,462,990 A 10/1995 Hubbell et al.
(Continued)

FOREIGN PATENT DOCUMENTS

JP 2006/052326 A 2/2006
WO WO 2013/138494 A1 9/2013

OTHER PUBLICATIONS

U.S. Appl. No. 15/243,788, filed Aug. 22, 2016.
(Continued)

*Primary Examiner* — Ling Siu Choi
*Assistant Examiner* — David L Miller
(74) *Attorney, Agent, or Firm* — Leydig, Volt & Mayer, Ltd.

(57) ABSTRACT

In an aspect, a method of synthesizing a graft copolymer comprises the steps of: copolymerizing a first macromonomer and a first reactive diluent; wherein said first macromonomer comprises a first backbone precursor directly or indirectly covalently linked to a first polymer side chain group; wherein said reactive diluent is provided in the presence of the first macromonomer at an amount selected so as to result in formation said graft copolymer having a first backbone incorporating said diluent and said first macromonomer in a first polymer block characterized by a preselected first graft density or a preselected first graft distribution of said first macromonomer. In some embodiments of this aspect, said preselected first graft density is any value selected from the range of 0.05 to 0.75. In some methods, the composition and amount of said diluent is selected to provide both a first preselected first graft density and a first preselected first graft distribution.

30 Claims, 106 Drawing Sheets

(51) Int. Cl.

| | | |
|---|---|---|
| C08F 285/00 | (2006.01) | |
| C08F 287/00 | (2006.01) | |
| C08G 61/08 | (2006.01) | |
| C08F 290/04 | (2006.01) | |
| C08F 290/06 | (2006.01) | |
| C08F 290/02 | (2006.01) | |
| C08F 267/10 | (2006.01) | |
| B82Y 40/00 | (2011.01) | |
| C08F 293/00 | (2006.01) | |

(52) U.S. Cl.
CPC .......... *C08F 290/02* (2013.01); *C08F 290/04* (2013.01); *C08F 290/06* (2013.01); *C08G 61/08* (2013.01); *B82Y 40/00* (2013.01); *C08F 267/10* (2013.01); *C08F 290/042* (2013.01); *C08F 290/044* (2013.01); *C08F 290/046* (2013.01); *C08F 290/048* (2013.01); *C08F 290/061* (2013.01); *C08F 290/062* (2013.01); *C08F 290/064* (2013.01); *C08F 290/065* (2013.01); *C08F 290/067* (2013.01); *C08F 290/068* (2013.01); *C08F 293/00* (2013.01); *C08F 293/005* (2013.01); *C08F 2500/09* (2013.01); *C08G 2261/126* (2013.01); *C08G 2261/128* (2013.01); *C08G 2261/136* (2013.01); *C08G 2261/144* (2013.01); *C08G 2261/148* (2013.01); *C08G 2261/149* (2013.01); *C08G 2261/1424* (2013.01); *C08G 2261/1426* (2013.01); *C08G 2261/1428* (2013.01); *C08G 2261/418* (2013.01); *C08G 2261/722* (2013.01)

(58) Field of Classification Search
CPC .. C08F 290/02; C08F 290/04; C08F 290/042; C08F 290/044; C08F 290/046; C08F 290/048; C08F 290/06; C08F 290/061; C08F 290/062; C08F 290/064; C08F 290/065; C08F 290/067; C08F 290/068
See application file for complete search history.

(56) References Cited

U.S. PATENT DOCUMENTS

| | | |
|---|---|---|
| 6,007,845 A | 12/1999 | Domb et al. |
| 6,306,540 B1 | 10/2001 | Hiroi et al. |
| 6,383,500 B1 | 5/2002 | Wooley et al. |
| 6,407,187 B1 | 6/2002 | Matyjaszewski et al. |
| 6,433,931 B1 | 8/2002 | Fink et al. |
| 6,489,055 B1 | 12/2002 | Ichihashi et al. |
| 6,627,314 B2 | 9/2003 | Matyjaszewski et al. |
| 6,671,097 B2 | 12/2003 | Fink et al. |
| 6,692,914 B1 | 2/2004 | Klaerner et al. |
| 7,101,937 B1 | 9/2006 | Frechet et al. |
| 7,795,355 B2 | 9/2010 | Matyjaszewski et al. |
| 7,960,479 B2 | 6/2011 | Cheng et al. |
| 8,415,436 B2 | 4/2013 | Han et al. |
| 8,419,792 B2 | 4/2013 | Vanderbilt et al. |
| 8,454,689 B2 | 6/2013 | Vanderbilt et al. |
| 9,045,579 B2 | 6/2015 | Xia et al. |
| 9,142,835 B2 | 9/2015 | Vicari et al. |
| 9,382,387 B2 | 7/2016 | Xia et al. |
| 9,453,943 B2 | 9/2016 | Miyake et al. |
| 2002/0135880 A1 | 9/2002 | Fink et al. |
| 2002/0183473 A1* | 12/2002 | Matyjaszewski ..... C08F 293/00 526/335 |
| 2005/0192409 A1 | 9/2005 | Rhodes et al. |
| 2007/0099791 A1 | 5/2007 | Wan et al. |
| 2010/0305368 A1 | 12/2010 | Grubbs et al. |
| 2013/0296491 A1 | 11/2013 | Xia et al. |
| 2013/0324666 A1 | 12/2013 | Xia et al. |
| 2014/0011958 A1 | 1/2014 | Miyake et al. |
| 2016/0024244 A1 | 1/2016 | Xia et al. |
| 2016/0024250 A1 | 1/2016 | Yang et al. |
| 2016/0289392 A1 | 10/2016 | Grubbs et al. |
| 2016/0356923 A1 | 12/2016 | Miyake et al. |
| 2017/0018801 A1 | 1/2017 | Grubbs et al. |
| 2017/0057908 A1 | 3/2017 | Jones et al. |
| 2017/0062874 A1 | 3/2017 | Jones et al. |

OTHER PUBLICATIONS

U.S. Appl. No. 15/229,026, filed Aug. 4, 2016.
U.S. Appl. No. 15/228,876, filed Aug. 4, 2016.
U.S. Appl. No. 15/065,317, filed Mar. 9, 2016.
U.S. Appl. No. 15/065,291, filed Mar. 9, 2016.
U.S. Appl. No. 14/698,520, filed Apr. 28, 2015.
U.S. Appl. No. 13/930,400, filed Jun. 28, 2013.
U.S. Appl. No. 13/801,710, filed Mar. 13, 2013.
U.S. Appl. No. 13/800,646, filed Mar. 13, 2013.
U.S. Appl. No. 12/680,316, filed Aug. 11, 2010.
Abbasi et al.,"Linear and Extensional Rheology of Model Branched Polystyrenes: From Loosely Grafted Combs to Bottlebrushes", *Macromolecules*, 50(15): 5964-5977 (2017).
Adlhart, et al., "Mechanism and Activity of Ruthenium Olefin Metathesis Catalysts: The Role of Ligands and Substrates from a Theoretical Perspective",*J. Am. Chem. Soc.*, 126(11): 3496-3510 (2004).
Agarwal et al., "Mechanisms for CO Production from $CO_2$ Using Reduced Rhenium Tricarbonyl Catalysts", *J. Am. Chem. Soc.*, 134:5180-5186 (2012).
Agarwal et al., "Design of a Catalytic Active Site for Electrochemical $CO_2$ Reduction with Mn(I)-Tricarbonyl Species", *Inorg. Chem.*, 54:5285-5294 (2015).
Aguirre et al., "Tunable Colors in Opals and Inverse Opal Photonic Crystals", *Adv. Funct. Mater.*, 20:2565-2578 (2010).
Aharoni, "Rigid Backbone Polymers. 2. Polyisocyanates and Their Liquid-Crystal Behavior", *Macromolecules*, 12: 94-103 (1979).
Akbari et al., "Cool Surfaces and Shade Trees to Reduce Energy Use and Improve Air Quality in Urban Areas", *Solar Energy*, 70(3): 295-310 (2001).
Alberico et al., "Towards a Methanol Economy Based on Homogeneous Catalysis: Methanol to H2 and $CO_2$ to Methanol", *Chem. Commun.* 51:6714-6725 (2015).
Albert et al., "Self-Assembly of Block Copolymer Thin Films", *Materials Today*, 13(6):24-33 (2010).
Al Samak et al., "Alternating ring-opening metathesis copolymerization of bicyolo[2.2.1]hept-2-ene and cyclopentene", *J. Chem. Commun.*, 2057-2058 (1997).
Alvarez-Guerra et al., "Ionic Liquids in the Electrochemical Valorisation of $CO_2$", *Energy Environ. Sci.*, 8:2574-2599 (2015).
Appel et al., "Frontiers, Opportunities, and Challenges in Biochemical and Chemical Catalysis of $CO_2$ Fixation," *Chem. Rev.*, 113:6621-6658 (2013).
Armand et al., "Ionic-Liquid Materials for the Electrochemical Challenges of the Future" ,*Nat. Mater.*, 8:621-629 (2009).
Atwater et al., "Plasmonics for Improved Photovoltaic Devices", *Nature Material* 9:205-214 (2010).
Azzaroni et al., "Polymer Brushes Here, There, and Everywhere: Recent Advances in Their Practical Applications and Emerging Opportunities in Multiple Research Fields", *J. of Polymer Science Part A: Polymer Chemistry*. 50:3225-3258 (2012).
Babarao et al., "Understanding the High Solubility of $CO_2$ in an Ionic Liquid with the Tetracyanoborate Anion", *J. Phys. Chem. B.*, 115:9789-9794 (2011).
Bae et al., "Organization of Rigid Wedge-Flexible Coil Block Copolymers into Liquid Crystalline Assembly", *Macromolecules*, 38(10):4226-4230 (2005).
Bajpai et al., "Responsive Polymers in Controlled Drug Delivery", *Progress in Polymer Science*, 33:1088-1118 (2008).
Bang et al., "Block Copolymer Nanolithography: Translation of Molecular Level Control to Nanoscale Patterns", *Adv. Mater.*, 21:4769-4792 (2009).
Bang et al., "Dual Templating Synthesis of Mesoporous Titanium Nitride Microspheres", *Adv. Mater.*, 21:3186-3190 (2009).

(56) References Cited

OTHER PUBLICATIONS

Barosse-Antle et al., "Voltammetry in Room Temperature Ionic Liquids: Comparisons and Contrasts with Conventional Electrochemical Solvents", *Chem. Asian J.*, 5:202-230 (2010).
Bates et al., "Block Copolymer Thermodynamics: Theory and Experiment", *Ann. Rev. Phys. Chem.*, 41:525-557 (1990).
Bates et al., "Block Co-polymers-Designer Soft Materials", *Physics Today*, 52:32-38 (1999).
Bates et al., "Multiblock Polymers: Panacea or Pandora's Box?", *Science*, 336:434-440 (2012).
Bates et al., "ABA Triblock Brush Polymers: Synthesis, Self-Assembly, Conductivity, and Rheological Properties", *Macromolecules*, 48:4967-4973 (2015).
Bates et al., "Brush Polymer Ion Gels", *Journal of Polymer Science, Part B: Polymer Physics*, 54:292-300 (2016).
Bates et al., "*50th Anniversary Perspective*: Block Polymers—Pure Potential", *Macromolecules*, 50(1): 3-22 (2017).
Benitez, et al., "Conformational Analysis of Olefin-Carbene Ruthenium Metathesis Catalysts", *Organometallics*, 28(8): 2643-2645 (2009).
Bennett et al., "Modelling of the Urban Heat Island and of its Interaction with Pollutant Dispersal", *Atmospheric Environment*, 16:1797-1822 (1982).
Benson et al., "Electrocatalytic and homogeneous approaches to conversion of $CO_2$ to liquid fuels", *Chem. Soc. Rev.*, 38:89-99 (2009).
Benson et al., "Structural Investigations into the Deactivation Pathway of the $CO_2$ Reduction Electrocatalyst $Re(bpy)(CO)_3Cl$", *Chem. Commun.*, 48:7374-7376 (2012).
Bertone et al., "Thickness Dependence of the Optical Properties of Ordered Silica-Air and Air-Polymer Photonic Crystals", *Phys. Rev. Lett.*, 83:300-303 (1999).
Bhattarai et al., "PEG-grafted chitosan as an injectable thermosensitive hydrogel for sustained protein release", *Journal of Controlled Release*, 103(3): 609-624 (2005).
Bielawski et al., "Living Ring-Opening Metathesis Polymerization", *Prog. Polym. Sci.*, 32:1-29 (2007).
Bielawski et al., "Living Ring-Opening Metathesis Polymerization," Ch. 6 *Controlled and Living Polymerizations, Methods and Materials*, Edited by Axel H.E. Müller and Krzysztof Matyjaszewski, K. Wiley-VCH. Weinheim, Germany. pp. 297-342 (2009).
Black, "Self-Aligned Self Assembly of Multi-Nanowire Silicon Field Effect Transistors", *Appl. Phys. Lett.*, 87:163116-163118 (2005).
Black et al., "Integration of Self-Assembled Diblock Copolymers for Semiconductor Capacitor Fabrication", *Appl. Phys. Lett.*, 79:409-411 (2001).
Blakemore et al., "Noncovalent Immobilization of Electrocatalysts on Carbon Electrodes for Fuel Production", *J. Am. Chem. Soc.*, 135:18288-18291 (2013).
Bockstaller et al., "Block Copolymer Nanocomposites: Perspectives for Tailored Functional Materials", *Adv. Mater.*, 17:1331-1349 (2005).
Bolton et al., "Synthesis and Melt Self-Assembly of PS-PMMA-PLA Triblock Bottlebrush Copolymers", *Macromolecules*, 47:2864-2874 (2014).
Börner et al., "Synthesis of Molecular Brushes with Gradient in Grafting Density by Atom Transfer Polymerization", *Macromolecules*, 35(9): 3387-3394 (2002).
Bouchet et al., "Charge Transport in Nanostructured PS-PEO-PS Triblock Copolymer Electrolytes", *Macromolecules*, 47:2659-2665 (2014).
Bourrez et al., "[Mn(bipyridyl)(CO)$_3$Br]: an Abundant Metal Carbonyl Complex as Efficient Electrocatalyst for $CO_2$ Reduction", *Angew. Chem. Int. Ed.*, 50:9903-9906 (2011).
Braun et al., "Microporous materials: Electrochemically grown photonic crystals", *Nature*, 402:603-604 (1999).
Cabral et al., "Electrochemistry of tris(2,2'-bipyridyl) cobalt(II) in Ionic Liquids and Aprotic Molecular Solvents on Glassy Carbon and Platinum", *Electrochem. Acta.* 180:419-426 (2015).
Campbell et al., "Fabrication of Photonic Crystals for the Visible Spectrum by Holographic Lithography", *Nature*, 404:53-56 (2000).
Cao et al., "Computer Simulations of Bottle Brushes: From Melts to Soft Networks", *Macromolecules*, 48(14):5006-5015 (2015).
Carmesin et al., "Static and Dynamic Properties of Two-Dimensional Polymer Melts," *J. Phys.* (Paris), 51:915-932 (1990).
Carney et al., "Intramolecular Hydroamination of Aminoalkynes with Silver-Phenanthroline Catalysts", *Org. Lett.*, 10(17):3903-3906 (2008).
Chambon, et al, "Synthesis, Temperature Gradient Interaction Chromatography, and Rheology of Entangled Styrene Comb Polymers", *Macromolecules*, 41(15): 5869-5875 (2008).
Chan et al., "A Robust and Efficient Cobalt Molecular Catalyst for $CO_2$ Reduction," *Chem. Commun.*, 51:7799-7801 (2015).
Chang, et al., "Sequence-Controlled Polymers by Ruthenium-Mediated Ring-Opening Metathesis Polymerization", *American Chemical Society*, 1170: 161-188 (2014).
Chang, et al., "Manipulating the ABCs of self-assembly via low-$\chi$ block polymer design", *Proc. Natl. Acad. Sci. U.S.A.*, 114(25): 6462-6467 (2017).
Chen et al., "Molecular Catalysis of the Electrochemical and Photochemical Reduction of $CO_2$ with Earth-Abundant Metal Complexes. Selective Production of CO vs HCOOH by Switching of the Metal Center", *J. Am. Chem. Soc.*, 137:10918-10921 (2015).
Chen et al., "Splitting $CO_2$ into CO and $O_2$ by a Single Catalyst", *Proc. Natl. Acad. Sci. USA*, 109:15606-15611 (2012).
Cheng et al., "Formation of a Cobalt Magnetic Dot Array via Block Copolymer Lithography", *Adv. Mater.*, 13:1174-1178 (2001).
Cheng et al., "Templated Self-Assembly of Block Copolymers: Top-Down Helps Bottom-Up", *Adv. Mater.*, 18:2505-2521 (2006).
Cheng et al., "Facile One-Pot Synthesis of Brush Polymers through Tandem Catalysis Using Grubbs' Catalyst for Both Ring-Opening Metathesis and Atom Transfer Radical Polymerizations", *Nano Lett.*, 6(8):1741-1746 (2006).
Cheng et al., "Synthesis of Core-Crosslinked Nanoparticles with Controlled Cylindrical Shape and Narrowly-Dispersed Size via Core-Shell Brush Block Copolymer Templates", *Adv. Mater.*, 19:2830-2835 (2007).
Chintapalli et al., "Effect of Grain Size on the Ionic Conductivity of a Block Copolymer Electrolyte", *Macromolecules*, 47(15):5424-5431 (2014).
Cho et al., "Printable Ion-Gel Gate Dielectrics for Low-Voltage Polymer Thin-Film Transistors on Plastic", *Nat. Mater.*, 7:900-906 (2008).
Connelly et al., "Chemical Redox Agents for Organometallic Chemistry", *Chem. Rev.*, 96:877-910 (1996).
Costentin et al., "Benchmarking of Homogeneous Electrocatalysts: Overpotential, Turnover Frequency, Limiting Turnover Number," *J. Am. Chem. Soc.*, 137:5461-5467 (2015).
Costentin et al., "Catalysis of the Electrochemical Reduction of Carbon Dioxide", *Chem. Soc. Rev.*, 42:2423-2436 (2012).
Costentin et al., "A Local Proton Source Enhances $CO_2$ Electroreduction to CO by a Molecular Fe Catalyst", *Science*, 338:90-94 (2012).
Cowie et al., "Effect of Side Chain Length and Crosslinking on the AC Conductivity of Oligo (Ethyleneoxide) Comb-Branch Polymer-Salt Mixture", *Solid State Ionics*, 42:243-249 (1990).
Crutzen, "New Directions: The Growing Urban Heat and Pollution "Island" Effect—Impact on Chemistry and Climate", *Atmospheric Environment*, 38:3539-3540 (2004).
Cushen et al., "Oligosaccharide/Silicon-Containing Block Copolymers with 5 nm Features for Lithographic Applications", *ACS Nano.*, 6:3424-3433 (2012).
Daeffler, "Ring-Opening Metathesis of Bulky Norbornene Monomers and Radical-Mediated Hydrophosphonation of Olefins", Ph.D. Thesis, California Institute of Technology, Pasadena, California (2013).
Daigle et al., "Lithium battery with solid polymer electrolyte based on comb-like copolymers", *J. of Power Sources.*, 279:372-383 (2015).
Dalsin et al., "Molecular Weight Dependence of Zero-Shear Viscosity in Atactic Polypropylene Bottlebrush Polymers", *ACS Macro Letters.*, 3(5):423-427 (2014).

(56) References Cited

OTHER PUBLICATIONS

Dalsin et al., "Linear Rheology of Polyolefin-Based Bottlebrush Polymers", *Macromolecules*, 48:4680-4691 (2015).
Dalsin, et al., "Bottlebrush Block Polymers: Quantitative Theory and Experiments", *ACS Nano*, 9: 12233-12245 (2015).
Daniel, et al., Solvent-free, supersoft and superelastic bottlebrush melts and networks, *Nature Materials*, 15: 183-189 (2016).
Daniels, et al., "Molecular Rheology of Comb Polymer Melts. 1. Linear Viscoelastic Response", *Macromolecules*, 34: 7025-7033 (2001).
Del Valle et al., "Empirical Parameters for Solvent Acidity, Basicity, Dipolarity, and Polarizability of the Ionic Liquids [BMIM][BF4] and [BMIM][PF6]", *J. Phys. Chem. B.*, 119:4683-4692 (2015).
Deshmukh et al., "Molecular Design of Liquid Crystalline Brush-Like Block Copolymers for Magnetic Field Directed Self-Assembly: A Platform for Functional Materials", *ACS Macro Letters*, 3(5):462-466 (2014).
Dettmer, et al., "Synthesis and Functionalization of ROMP-Based Gradient Copolymers of 5-Substituted Norbornenes", *Macromolecules*, 37: 5504-5512 (2004).
Deutsch et al., "Interdiffusion and Self-Diffusion in Polymer Mixtures: A Monte Carlo Study", *J. Chem. Phys.*, 94:2294-2304 (1991).
Eberhardt et al., "Synthesis of Active Ester Polymers and Block Copolymers via Controlled Radical Polymerization", *Polymer Preprints*, 41(1):100-101 (2005). (Abstract only).
Eddaoudi et al., "CO2 Separation, Capture and Reuse: A Web Themed Issue", *Chem. Commun.*, 51:5554-5555 (2015).
Edrington et al., "Polymer-Based Photonic Crystals", *Adv. Mater.*, 13:421-425 (2001).
Elli, et al., "Size and persistence length of molecular bottle-brushes by Monte Carlo simulations", *J. Chem. Phys*, 120: 6257-6267 (2004).
Elling, et al., "Living Alternating Ring-Opening Metathesis Polymerization Based on Single Monomer Additions", *J. Am. Chem. Soc.*, 137: 9922-9926 (2015).
Evans et al., "A Comparative Electrochemical Study of Diffusion in Room Temperature Ionic Liquid Solvents versus Acetonitrile", *Chem. Phys. Chem.*, 6:526-533 (2005).
Fabry et al., "Immobilization and Continuous Recycling of Photoredox Catalysts in Ionic Liquids for Applications in Batch Reactions and Flow Systems: Catalytic Alkene Isomerization by Using Visible Light", *Chem. Eur. J.*, 21:5350-5354 (2015).
Fenyves et al., "Aqueous Self-Assembly of Giant Bottlebrush Block Copolymer Surfactants as Shape-Tunable Building Blocks", *J. Am. Chem. Soc.*, 136(21):7762-7770 (2014).
Ferry et al., "Design Considerations for Plasmonic Photovoltaics", *Adv. Mater.*, 22:4794-4808 (2010).
Fetters et al., "Connection between Polymer Molecular Weight, Density, Chain Dimensions, and Melt Viscoelastic Properties", *Macromolecules*, 27(17):4639-4647 (1994).
Fineman, et al., "Linear method for determining monomer reactivity ratios in copolymerization", *Journal of Polymer Science*, 5: 259-262 (1950).
Fink et al., "Block Copolymers as Photonic Bandgap Materials", *J. of Lightwave Technology*, 17(11):1963-1969 (1999).
Finn et al., "Molecular Approaches to the Electrochemical Reduction of Carbon Dioxide", *Chem. Commun.*, 48:1392-1399 (2011).
Fiset et al., "Synthesis, Characterization and Modification of Azide-Containing Dendronized Diblock Copolymers", *Polymer*, 50:1369-1377 (2009).
Franco et al., "A local proton source in a [Mn(bpy-R)(CO)3Br]-type redox catalyst enables CO2 reduction even in the absence of Brønsted acids", *Chem. Commun.*, 50:14670-14673 (2014).
Fredrickson, "Surfactant-induced lyotropic behavior of flexible polymer solutions", *Macromolecules*, 26(11): 2825-2831 (1993).
Fredrickson et al., "Dynamics of Block Copolymers: Theory and Experiment", *Annu. Rev. Mater. Sci.*, 26: 501-550 (1996).
Fu et al., "Volatilisation of Ferrocene from Ionic Liquids: Kinetics and Mechanism", *Chem. Commun.*, 47:7083-7085 (2011).
Fuller et al., "Ionic Liquid-Polymer Gel Electrolytes", *J. Electrochem. Soc.*, 144:L67-L70 (1997).
Fullerton-Shirey et al., "Effect of LiClO4 on the Structure and Mobility of PEO-Based Solid Polymer Electrolytes", *Macromolecules*, 42:2142-2156 (2009).
Fürstner, et al., "Study Concerning the Effects of Chelation on the Structure and Catalytic Activity of Ruthenium Carbene Complexes", *Organometallics*, 21(2): 331-335 (2002).
Gai, et al., "Polystyrene-block-poly(ethylene oxide) Bottlebrush Block Copolymer Morphology Transitions: Influence of Side Chain Length and Volume Fraction", *Macromolecules*, 50(4), 1503-1511 (2017).
Galiński et al., "Ionic Liquids as Electrolytes", Electrochem. Acta., 51:5567-5580 (2006).
Galisteo-Lopez et al., "Self-Assembled Photonic Structures", *Adv. Mater.*, 23:30-69 (2011).
Ganesan et al., "Mechanisms Underlying Ion Transport in Lamellar Block Copolymer Membranes", *ACS Macro Letters*, 1(4):513-518 (2012).
Gao et al., "Synthesis of Molecular Brushes by "Grafting Onto" Method: Combination of ATRP and Click Reactions", *J. Am. Chem. Soc.*, 129:6633-6639 (2007).
Gavelin et al., "Amphiphilic Polymer Gel Electrolytes. I. Preparation of Gels Based on Poly(Ethylene Oxide) Graft Copolymers Containing Different Ionophobic Groups", *J. of Polymer Science Part A: Polymer Chemistry*, 39(13):2223-2232 (2001).
Ge et al., "Responsive Photonic Crystals", *Angew. Chem. Int. Ed.*, 50:1492-1522 2011).wangparnell.
Gerle, et al., "Main Chain Conformation and Anomalous Elution Behavior of Cylindrical Brushes as Revealed by GPC/MALLS, Light Scattering, and SFM", *Macromolecules*, 32(8): 2629-2637 (1999).
Gomez et al., "Effect of Ion Distribution on Conductivity of Block Copolymer Electrolytes", *Nano Letters*, 9(3):1212-1216 (2009).
Grayer, et al., "A Comparative Experimental and Theoretical Study between Heteroarm Star and Diblock Copolymers in the Microphase Separated State", *Macromolecules*, 33(17): 6330-6339 (2000).
Grason, "The Packing of Soft Materials: Molecular Asymmetry, Geometric Frustration and Optimal Lattices in Block Copolymer Melts", *Phys. Rep.*, 433:1-64 (2006).
Green et al., "Macromolecular Stereochemistry: the Out-of-Proportion Influence of Optically Active Comonomers on the Conformational Characteristics of Polyisocyanates. The Sergeants and Soldiers Experiment", *J. Am. Chem. Soc*, 111:6452-6454 (1989).
Green et al., "The Macromolecular Route to Chiral Amplification", *Angew. Chem. Int. Ed.*, 38:3138-3154 (1999).
Grice et al., "Recent Studies of Rhenium and Manganese Bipyridine Carbonyl Catalysts for the Electrochemical Reduction of CO2", *Advances in Inorganic Chemistry*, 66:163-188, Elsevier (2014).
Grills et al., "New Directions for the Photocatalytic Reduction of CO2: Supramolecular, scCO2 or Biphasic Ionic Liquid-scCO2 Systems", *J. Phys. Chem. Lett.*, 1:2709-2718 (2010).
Grills et al., "Mechanism of the Formation of a Mn-Based CO2 Reduction Catalyst Revealed by Pulse Radiolysis with Time-Resolved Infrared Detection", *J. Am. Chem. Soc.*, 136:5563-5566 (2014).
Grills et al., "Electrocatalytic CO2 Reduction with a Homogeneous Catalyst in Ionic Liquid: High Catalytic Activity at Low Overpotential", *J. Phys. Chem. Lett.*, 5:2033-2038 (2014).
Grimm et al., "Global Change and the Ecology of Cities", Science, 319:756-760 (2008).
Grubbs, et al., "A Tandem Approach to Graft and Dendritic Graft Copolymers Based on "Living" Free Radical Polymerizations", *J. Angew. Chem., Int. Ed.*, 36(3): 270-272 (1997).
Grubbs, et al., Handbook of Metathesis: Polymer Synthesis; Wiley-VCH, Second Edition, 2015.
Gu et al., "ABA-Triblock Copolymer Ion Gels for CO2 Separation Applications", *J. Membr. Sci.*, 423-424:20-26 (2012).
Gu et al., "High Toughness, High Conductivity Ion Gels by Sequential Triblock Copolymer Self-Assembly and Chemical Cross-Linking", *J. Am. Chem. Soc.*, 135(26):9652-9655 (2013).

(56) References Cited

OTHER PUBLICATIONS

Gu et al., "Self-Assembly of Symmetric Brush Diblock Copolymers", *ACS Nano*, 7(3):2551-2558 (2013).
Hadjichristidis et al., "Polymers with Complex Architecture by Living Anionic Polymerization", *Chem. Rev.*, 101:3747-3792 (2001).
Hadjichristidis et al., "The Strength of the Macromonomer Strategy for Complex Macromolecular Architecture: Molecular Characterization, Properties and Applications of Polymacromonomers", *Macromol. Rapid Commun.*, 24:979-1013 (2003).
Hallinan et al., "Polymer Electrolytes", *Annual Review of Materials Research*, 43(1):503-525 (2013).
Hamley, "Nanostructure Fabrication Using Block Copolymers", *Nanotechnology*, 14:R39 (2003).
Hammouda, "Structure Factors for Particulate Systems", Ch. 32 In; NIST Distance Learning. Accessible on the Internet at URL: http://www.ncnr.nist.gov/staff/hammouda/distance_learning/chapter_32.pdf (Fall 2016).
Hapiot et al., "Electrochemical Reactivity in Room-Temperature Ionic Liquids", *Chem. Rev.*, 108:2238-2264 (2008).
Hashimoto et al., "Ordered structure in blends of block copolymers. 1. Miscibility criterion for lamellar block copolymers", *Macromolecules*, 26:2895-2904 (1993).
Hashimoto et al., "Gelation Mechanism of Tetra-armed Poly(ethylene glycol) in Aprotic Ionic Liquid Containing Nonvolatile Proton Source, Protic Ionic Liquid", *J. Phys. Chem. B.*, 119:4795-4801 (2015).
Hatakeyama et al., "Coarse-grained simulations of ABA amphiphilic triblock copolymer solutions in thin films", *Phys. Chem. Chem. Phys.*, 9:4662-4672 (2007).
Hawecker et al., "Electrocatalytic reduction of carbon dioxide mediated by Re(bipy)(CO)3Cl (bipy = 2,2'-bipyridine)", *J. Chem. Soc. Chem. Commun.*, 6:328-330 (1984).
Hawecker et al., "Photochemical and Electrochemical Reduction of Carbon Dioxide to Carbon Monoxide Mediated by (2,2'-Bipyndine)tricarbonylchlororhenium(I) and Related Complexes as Homogeneous Catalysts", *Helvetica Chimica Acta.*, 69:1990-2012 (1986).
Hawker et al., "Block Copolymer Lithography: Merging 'Bottom-Up' with 'Top-Down' Processes", *Mrs Bull.*, 30:952-966 (2005).
Hayashi et al., "Involvement of a Binuclear Species with the Re—C(O)O—Re Moiety in CO2 Reduction Catalyzed by Tricarbonyl Rhenium(I) Complexes with Diimine Ligands: Strikingly Slow Formation of the Re—Re and Re—C(O)O—Re Species from Re(dmb)(CO)3S (dmb = 4,4'-Dimethyl-2,2'-bipyridine, S = Solvent)", *J. Am. Chem. Soc.*, 125:11976-11987 (2003).
Hayes et al., "Structure and Nanostructure in Ionic Liquids", *Chemical Reviews*, 115(13):6357-6426 (2015).
He et al., "Ion Gels by Self-Assembly of a Triblock Copolymer in an Ionic Liquid", *J. Phys. Chem. B.*, 111:4645-4652 (2007).
Hepp et al., "A Chemical Approach to Carbon Dioxide Utilization on Mars," In; The Proceedings of the In Situ Resource Utilization (ISRU) Technical Interchange Meeting 1997, p. 27 (Feb. 4-5, 1997).
Heroguez et al., Synthesis of α-Norbornenylpoly(ethylene oxide) Macromonomers and Their Ring-Opening Metathesis Polymerization, *Macromolecules*, 29:4459-4464 (1996).
Hickey et al., "Synthesis and evaluation of cationic norbornanes as peptidomimetic antibacterial agents", *Organic & Biomolecular Chemistry*, 13: 6225-6241 (2015).
Hogan et al., "Facile Analysis of EC Cyclic Voltammograms", *Anal. Chem.*, 76:2256-2260 (2004).
Hong et al., "Large deformation and electrochemistry of polyelectrolyte gels", *J. Mechan. Phys. Solids.*, 58:558-577 (2010).
Hong et al., "Photocatalytic reduction of CO2: a brief review on product analysis and systematic methods", *Anal. Methods*, 5:1086-1097 (2012).
Hong et al., "On the Self-Assembly of Brush Block Copolymers in Thin Films", *ACS Nano.*, 7(11):9684-9692 (2013).
Hou et al., "The effect of different lithium salts on conductivity of comb-like polymer electrolyte with chelating functional group", *Electrochimica Acta.*, 48(6):679-690 (2003).
Hsu, et al., "Characteristic Length Scales and Radial Monomer Density Profiles of Molecular Bottle-Brushes: Simulation and Experiment", *Macromolecules*, 43(3): 1592-1601 (2010).
Hsu et al., "Highly conductive, crosslinked ionomers based on poly(styrene-co-maleic anhydride) for water electrolysis", *J. of Materials Chemistry A.*, 1:8093-8096 (2013).
Hu et al., "Transformation of atmospheric CO2 catalyzed by protic ionic liquids: efficient synthesis of 2-oxazolidinones", *Angew. Chem., Int. Ed.*, 54:5399-5403 (2015).
Hu et al., "Linear Rheological Response of a Series of Densely Branched Brush Polymers", *Macromolecules*, 44:6935-6943 (2011).
Hu, et al., "Directed self-assembly of block copolymers: a tutorial review of strategies for enabling nanotechnology with soft matter", *Soft Matter*, 10: 3867-3889 (2014).
Hultgren et al., "Reference potential calibration and voltammetry at macrodisk electrodes of metallocene derivatives in the ionic liquid [bmim][PF6]", *Anal. Chem.*, 74:3151-3156 (2002).
Hustad et al., "Photonic Polyethylene from Self-Assembled Mesophases of Polydisperse Olefin Block Copolymers", *Macromolecule*, 42:3788-3794 (2009).
Imaizumi et al.,) "Driving Mechanisms of Ionic Polymer Actuators Having Electric Double Layer Capacitor Structures", *The J. of Physical Chemistry B.*, 116:5080-5089 (2012).
Inglis et al., "Electrocatalytic pathways towards sustainable fuel production from water and CO2", *Coord. Chem. Rev.*, 256:2571-2600 (2012).
Izgorodina et al., "Physical Absorption of CO2 in Protic and Aprotic Ionic Liquids: An Interaction Perspective", *J. Phys. Chem. B.*, 119:11748-11759 (2015).
Izuhara et al., "Electroactive Block Copolymer Brushes on MWCNTs", *Macromolecules*, 42:5416-5418 (2009).
Jaacks, "A novel method of determination of reactivity ratios in binary and ternary copolymerizations", *Macromolecular Chemistry and Physics*, 161(1): 161-172 (1972).
Jang et al., "Synthesis of Cis,syndiotactic A-alt-B Copolymers from Two Enantiomerically Pure Trans-2,3-Disubstituted-5,6-Norbornenes", *ACS Central Science*; 2: 631-636 (2016).
Jeon et al., "Patterned Polymer Growth on Silicon Surfaces Using Microcontact Printing and Surface-Initiated Polymerization", *Applied Physics Letters*, 75(26):4201-4203 (1999).
Jeon et al., "Fabricating Complex Three-Dimensional Nanostructures with High-Resolution Conformable Phase Masks", *Proc. Natl. Acad. Sci. USA*, 101:12428-12433 (2004).
Jeong et al., "Formation of Alternating trans-A-alt-B Copolymers through Ring-Opening Metathesis Polymerization Initiated by Molybdenum Imido Alkylidene Complexes", *Organometallics*, 34: 5136-5145 (2015).
Jeong et al., "Rheological Influence of Short-Chain Branching for Polymeric Materials under Shear with Variable Branch Density and Branching Architecture", *Macromolecules*, 50: 4491-4500 (2017).
Jha et al., "Synthesis of Ultralarge Molecular Weight Bottlebrush Polymers Using Grubbs' Catalysts", *Macromolecules*, 37(12): 4365-4374 (2004).
Jiang et al., "A Novel Architecture toward Third-Generation Thermoplastic Elastomers by a Grafting Strategy", *Macromolecules*, 46(12): 4772-4780 (2013).
Jiang, et al., "Microphase separation of short wormlike diblock copolymers with a finite interaction range", *Soft Matter*, 12: 2481-2490 (2016).
Johnson et al., "Electrocatalytic Reduction of CO2 Using the Complexes [Re(bpy)(CO)3L]n (n = +1, L = P(OEt)3, CH3CN; n = 0, L = Cl-, Otf-; bpy = 2,2'-Bipyndine; Otf- = CF3SO3) as Catalyst Precursors: Infrared Spectroelectrochemical Investigation", *Organometallics*, 15:3374-3387 (1996).
Johnson et al., "Drug-loaded, bivalent-bottle-brush polymers by graft-through ROMP", *Macromolecules*, 43:10326-10335 (2010).
Johnson et al., "Core-Clickable PEG-Branch-Azide Bivalent-Bottle-Brush Polymers by ROMP: Grafting-Through and Clicking-To", *J. Am. Chem. Soc.*, 133:559-566 (2011).
Jordan et al., "Biodegradation of ionic liquids—a critical review", *Chem. Soc. Rev.*, 44:8200-8237 (2015).

(56) References Cited

OTHER PUBLICATIONS

Juris et al., "Synthesis and photophysical and electrochemical properties of new halotricarbonyl(polypyridine)rhenium(I) complexes," *Inorg. Chem.*, 27:4007-4011 (1988).

Kalnay et al., "Impact of Urban and Land-Use Change on Climate", *Nature*, 423: 523-531(2003).

Kane et al., "Phase Behavior and Morphological Characteristics of Compositionally Symmetric Diblock Copolymer Blends", *Macromolecules*, 29:8862-8870 (1996).

Kang et al., "Broad-Wavelength-Range Chemically Tunable Block-Copolymer Photonic Gels", *Nat. Mater.*, 6:957-960 (2007).

Kang et al., "Full Color Stop Bands in Hybrid Organic/Inorganic Block Copolymer Photonic Gels by Swelling-Freezing", *J. Am. Chem. Soc.*, 131:7538-7539 (2009).

Kang et al., "Ultrafast Cyclopolymerization for Polyene Synthesis: Living Polymerization to Dendronized Polymers", *J. Am. Chem. Soc.*, 133:11904-11907 (2011).

Kapnistos, "Linear Rheology of Architecturally Complex Macromolecules: Comb Polymers with Linear Backbones", *Macromolecules*, 38: 7852-7862 (2005).

Kapnistos, et al., "Nonlinear rheology of model comb polymers", *J. Rheol.*, 53: 1133-1153 (2009).

Karl et al., "Modern Global Climate Change", *Science*, 302:1719-1723 (2003).

Kawamoto, et al., "Graft-through Synthesis and Assembly of Janus Bottlebrush Polymers from *A-Branch-B* Diblock Macromonomers", *Journal of the American Chemical Society*, 138, 11501-11504 (2016).

Keith et al., "Elucidation of the Selectivity of Proton-Dependent Electrocatalytic $CO_2$ Reduction by fac-Re(bpy)(CO)3Cl", *J. Am. Chem. Soc.*, 135:15823-15829 (2013).

Kelen, et al., "Analysis of the Linear Methods for Determining Copolymerization Reactivity Ratios. I. A New Improved Linear Graphic Method", *Journal of Macromolecular Science, Part A—Chemistry*, 9(1), 1-27 (1975).

Kikuchi et al., "Conformational Properties of Cylindrical Rod Brushes Consisting of a Polystyrene Main Chain and Poly(n-hexyl isocyanate) Side Chains", *Macromolecules*, 41:6564-6572 (2008).

Kikuchi, et al., "Graft Density Dependence of Main Chain Stiffness in Molecular Rod Brushes", *Macromolecules*, 48(16): 5878-5886 (2015).

Kim et al., "A Route to Nanoscopic $SiO_2$ Posts via Block Copolymer Templates", *Adv. Mater.*, 13:795-797 (2001).

Kim et al., "Artificial Photosynthesis for Sustainable Fuel and Chemical Production", *Angew. Chem., Int Ed.*, 54:3259-3266 (2015).

Kim et al., "From Self-Assembled Monolayers to Coatings: Advances in the Synthesis and Nanobio Applications of Polymer Brushes", *Polymers*, 7:1346-1378 (2015).

Kinning et al., "Hard-sphere interactions between spherical domains in diblock copolymers", *Macromolecules*, 17(9):1712-1718 (1984).

Klähn et al., "What Determines $CO_2$ Solubility in Ionic Liquids? A Molecular Simulation Study", *J. Phys. Chem. B.*, 119:10066-10078 (2015).

Kobayashi et al., "Ionically high conductive solid electrolytes composed of graft copolymer-lithium salt hybrids", *The J. of Physical Chemistry*, 89:987-991 (1985).

Kortlever et al., "Catalysts and Reaction Pathways for the Electrochemical Reduction of Carbon Dioxide", *J. Phys. Chem. Lett.*, 6:4073-4082 (2015).

Kovach et al.," Completely engulfed olive/silicone oil Janus emulsions with gelatin and chitosan", *J. Colloid Polym. Sci.*, 294: 705-713 (2016).

Krause et al., "Simple Synthesis of Poly(acetylene) Latex Particles in Aqueous Media", *Angew. Chem. Int Ed.*, 42: 5965-5969 (2003).

Kuan et al., "Controlled ionic conductivity via tapered block polymer electrolytes," *RSC Advances* 5(17):12597-12604 (Jan. 23, 2015).

Kumar et al., "Factors Relevant for the Regioselective Cyclopolymerization of 1,6-Heptadiynes, N,N-Dipropargylamines, N,N-Dipropargylammonium Salts, and Dipropargyl Ethers by RuIV—Alkylidene-Based Metathesis Initiators", *J. Am. Chem. Soc.*, 131, 387-395 (2009).

Lam et al., "A Mn Bipyrimidine Catalyst Predicted to Reduce $CO_2$ at Lower Overpotential", *ACS Catal.*, 5:2521-2528 (2015).

Lanson et al., "Poly(styrene)comb-b-Poly(ethylene oxide)comb Copolymers: Synthesis and AFM Investigation of Intra- and Supramolecular Organization as Thin Deposits", *Macromolecules*, 40:9503-9509 (2007).

Lanson et al., "Synthesis of (Poly(chloroethyl vinyl ether)-g-polystyrene)comb-b-(poly(chloropyran ethoxy vinyl ether)-g-polyisoprene)comb Copolymers and Study of Hyper-Branched Micelle Formation in Dilute Solutions", *Macromolecules*, 40:5559-5565 (2007).

Larson, et al., "Predicting the Flow of Real Polymers". *Science*, 333(6051): 1834-1835 (2011).

Lascaud et al., "Phase Diagrams and Conductivity Behavior of Poly(ethylene oxide)-Molten Salt Rubbery Electrolytes", *Macromolecules*, 27(25):7469-7477 (1994).

Lecommandoux et al., "Effect of Dense Grafting on the Backbone Conformation of Bottlebrush Polymers: Determination of the Persistence Length in Solution", *Macromolecules*, 35:8878-8881 (2002).

Lee, et al., "Molecular Brushes with Spontaneous Gradient by Atom Transfer Radical Polymerization", *Macromolecules*, 38(20): 8264-8271 (2005).

Lee et al., "Ion Gel Gated Polymer Thin-Film Transistors", *J. Am. Chem. Soc.* 129(15):4532-4533 (2007).

Lee et al., "Hetero-Grafted Block Brushes with PCL and PBA Side Chains", *Macromolecules*, 41:6073-6080 (2008).

Lee et al., "Quasi-Amorphous Colloidal Structures for Electrically Tunable Full-Color Photonic Pixels with Angle-Independency", *Adv. Mater.*, 22:4973-4977 (2010).

Lee, et al., "Stimuli-responsive molecular brushes", *Prog. Polym. Sol.*, 35(1-2): 24-44 (2010).

Lee et al., "Electrical Impedance of Spin-Coatable Ion Gel Films", *J. Phys. Chem. B.*, 115:3315-3321 (2011).

Lei et al., "Gas Solubility in Ionic Liquids", *Chem. Rev.*, 114:1289-1326 (2013).

Leibler, "Theory of Microphase Separation in Block Copolymers", *Macromolecules*, 13:1602-1617 (1980).

Leitgeb et al., "The ROMP toolbox upgraded", *Polymer*, 51:2927-2946 (2010).

Li et al., "Dense Arrays of Ordered GaAs Nanostructures by Selective Area Growth on Substrates Patterned by Block Copolymer Lithography", *Appl. Phys. Lett.*, 76:1689-1691 (2000).

Li, et al., "Facile syntheses of cylindrical molecular brushes by a sequential RAFT and ROMP "grafting-through" methodology", *J. Polym. Sol., Part A: Polym. Chem.*, 47(20): 5557-5563 (2009).

Li et al., "Dynamic Cylindrical Assembly of Triblock Copolymers by a Hierarchical Process of Covalent and Supramolecular Interactions," *J. Am. Chem. Soc.* 133(5):1228-1231 (2011).

Li, et al., "Surface Properties of Bottlebrush Polymer Thin Films", *Macromolecules*, 45(17):7118-7127 (2012).

Liang, et al., "Combs and Bottlebrushes in a Melt", *Macromolecules*, 50(8): 3430-3437 (2017).

Liberman-Martin, et al., "Application of Bottlebrush Block Copolymers as Photonic Crystals", *Macromol. Rapid Commun.*, 38(17): 1700058 (2017).

Lim et al., "A review on the electrochemical reduction of $CO_2$ in fuel cells, metal electrodes and molecular catalysts", *Catal. Today*, 233:169-180 (2014).

Lin et al., "A three-dimensional photonic crystal operating at infrared wavelengths", *Nature*, 394:251-253 (1998).

Lin et al., "Ionic Liquid Co-catalyzed Artificial Photosynthesis of CO", *Sci. Rep.*, 3:1056. pp. 1-5 (Jan. 11, 2013).

Lin, et al., "Control of Grafting Density and Distribution in Graft Polymers by Living Ring-Opening Metathesis Copolymerization", *J. Am. Chem. Soc.*, 139: 3896-3903 (2017).

Linquist et al., "Plasmonic Nanocavity Arrays for Enhanced Efficiency in Organic Photovoltaic Cells", *Applied Physics Letters*, 93:123308 (2008).

Lipson, "A Monte Carlo simulation study on long-chain combs", *Macromolecules*, 24(6): 1327-1333 (1991).

(56) References Cited

OTHER PUBLICATIONS

Liu, et al., "Theoretical Study of Phase Behavior of Frustrated ABC Linear Triblock Copolymers", *Macromolecules*, 45(23): 9522-9530 (2012).

Liu, et al., "Computational Studies of Ruthenium-Catalyzed Olefin Metathesis. In Handbook of Metathesis", Wiley-VCH Verlag GmbH & Co. KGaA, pp. 199-252 (2015).

Lodge, "A Unique Platform for Materials Design", *Science*, 321(5885):50-51 (2008).

Lopes et al., "Hierarchical Self-Assembly of Metal Nanostructures on Diblock Copolymer Scaffolds", *Nature*, 414:735-738 (2001).

Love et al., "A Practical and Highly Active Ruthenium-Based Catalyst that Effects the Cross Metathesis of Acrylonitrile", *Angew. Chem. Int Ed.*, 41:4035-4037 (2002).

Lu et al., "Synthesis and characterization of a novel ABA triblock copolymer via 4,4'-bis(trifluorovinyloxy)biphenyl and methyl methacrylate", *J. of Polymer Science Part A: Polymer Chemistry*, 44:5438-5444 (2006).

Lu et al., "Advanced applications of ionic liquids in polymer science", *Prog. Polym. Sci.*, 34(5):431-448 (2009).

Lu et al., "One-Pot Synthesis of Brush-Like Polymers via Integrated Ring-Opening Metathesis Polymerization and Polymerization of Amino Acid N-Carboxyanhydrides", *J. Am. Chem. Soc.*, 131: 13582-13583 (2009).

Luca et al., "The Selective Electrochemical Conversion of Preactivated $CO_2$ to Methane", *J. Electrochem. Soc.*, 162:H473-H476 (2015).

Luttge, "Massively Parallel Fabrication of Repetitive Nanostructures: Nanolithography for Nanoarrays", *J. Phys. D: Appl. Phys.*, 42:123001 (2009).

Lutz, et al., "Sequence-Controlled Pdyrners", *Science*, 341(646) (2013).

Ma, et al., "Synthesis of Bottiebrush Polystyrenes with Uniform, Alternating, and Gradient Distributions of Brushes via Living Anionic Polymerization and Hydrosilylation", *Macromol. Rapid Commun.*, 36: 726-732 (2015).

MacFarlane et al., "Energy applications of ionic liquids", *Energy & Environmental Science*, 7(1):232-250 (2013).

MacFarlane, et al., "Improving Brush Polymer Infrared One-Dimensional Photonic Crystals via Linear Polymer Additives", *Journal of the American Chemical Society*, 136: 17374-17377 (2014).

Machan et al., "Electrocatalytic Reduction of Carbon Dioxide by Mn(CN)(2,2'-bipyridine)(CO)3: CN Coordination Alters Mechanism", *J. Inorg. Chem.*, 54:8849-8856 (2015).

Machan et al., "Supramolecular Assembly Promotes the Electrocatalytic Reduction of Carbon Dioxide by Re(I) Bipyridine Catalysts at a Lower Overpotential", *J. Am. Chem. Soc.*, 136:14598-14607 (2014).

Maeda et al., "Helical polymer brushes with a preferred-handed helix-sense triggered by a terminal optically active group in the pendant", *Chem. Commun,*, 48: 3342-3344 (2012).

Mahurin et al., "High $CO_2$ solubility, permeability and selectivity in ionic liquids with the tetracyanoborate anion", *RSC Adv.*, 2:11813-11819 (2012).

Mai, et al., "Self-assembly of block copolymers", *A. Chem. Soc. Rev.*, 41: 5969-5985 (2012).

Mai, et al., "Topology-Controlled Relaxation Dynamics of Single Branched Polymers", *ACS Macro Lett.*, 4(4): 446-452 (2015).

Manbeck et al., "Push or Pull? Proton Responsive Ligand Effects in Rhenium Tricarbonyl $CO_2$ Reduction Catalysts", *J. Phys. Chem. B.*, 119:7457-7466 (2015).

Mapas et al., "Ultrahigh Molecular Weight Linear Block Copolymers: Rapid Access by Reversible-Deactivation Radical Polymerization and Self-Assembly into Large Domain Nanostructures", *Macromolecules*, 49: 3733-3738 (2016).

Marencic et al., "Controlling Order in Block Copolymer Thin Films for Nanopatterning Applications", *Annu. Rev. Chem. Bimol. Eng.*, 1:277-297 (2010).

Martinez, et al., "Ring-opening metathesis polymerization of 8-membered cyclic olefins", *Polymer Chemistry*, 5: 3507-3532 (2014).

Masuda et al., "Photonic Crystal Using Anodic Porous Alumina", *Jpn. J. Appl. Phys.* 38:L1403-L1405 (1999).

Matsen et al., "Conformationally asymmetric block copolymers", *J. Poly. Sci. Part B: Polym. Phys.*, 35:945-952 (1997).

Matsen, et al., "Unifying Weak- and Strong-Segregation Block Copolymer Theories", *Macromolecules*, 29(4): 1091-1098 (1996).

Matsen, et al., "Melts of semiflexible diblock copolymer", *The Journal of Chemical Physics*, 104: 7758-7764 (1996).

Matson et al., "Synthesis of Fluorine-18 Functionalized Nanoparticles for use as in vivo Molecular Imaging Agents", *J. Am. Chem. Soc.*, 130:6731-6733 (2008).

Matsubara et al "Reactivity of a fac-ReCl($\alpha$-diimine)(CO)3 complex with an NAD+ model ligand toward $CO_2$ reduction", *Chem. Commun.*, 50:728-730, (2013).

Matsubara et al., "Thermodynamic Aspects of Electrocatalytic $CO_2$ Reduction in Acetonitrile and with an Ionic Liquid as Solvent or Electrolyte", *ACS Catal.*, 5:6440-6452 (2015).

Matsuda, et al., "Periodically Functionalized and Grafted Copolymers via 1:2-Sequence-Regulated Radical Copolymerization of Naturally Occurring Functional Limonene and Maleimide Derivatives", *Macromolecules*, 46(14): 5473-5482 (2013).

Matyjaszewski, et al., "Gradient copolymers by atom transfer radical copolymerization", *J. Phys. Org. Chem.*, 13(12): 775-786 (2000).

Matyjaszewski, et al., "Nanostructured functional materials prepared by atom transfer radical polymerization", *Nature Chem.*, 1: 276-288 (2009).

Matyjaszewski, et al., "Architecturally Complex Polymers with Controlled Heterogeneity", *Science*, 333(6046): 1104-1105 (2011).

Maxein et al., "Opalescent Cholesteric Networks from Chiral Polyisocyanates in Polystyrene", *Adv. Mater.*, 10, 341-345 (1998).

Maxein et al., "Structure—Property Relations in Cholesteric Networks from Chiral Polyisocyanates", *Macromolecules*, 32:5747-5754 (1999).

Mayer et al., "Chiral polyisocyanates, a special class of helical polymers", *Prog. Polym. Sci.*, 26:1973-2013 (2001).

Mayershofer et al., Bi- and Trinuclear Ruthenium Alkylidene Triggered Cyclopolymerization of 1,6-Heptadiynes: Access to An—X—An Block and (An)3X Tristar Copolymers, *Macromolecules*, 39: 3484-3493 (2006).

Mayo, et al., "Copolymerization. I. A Basis for Comparing the Behavior of Monomers in Copolymerization; The Copolymerization of Styrene and Methyl Methacrylate", *J. Am. Chem. Soc.*, 66(9): 1594-1601 (1944).

Mayo, et al., "Copolymerization", *Chem. Rev.*, 46: 191-287 (1950).

McIntosh et al., "Evolution of Morphology, Modulus, and Conductivity in Polymer Electrolytes Prepared via Polymerization-Induced Phase Separation", *Macromolecules*, 48(5):1418-1428 (2015).

McLeish, "Tube theory of entangled polymer dynamics", *Advances in Physics*, 51: 1379-1527 (2002).

Meijs, et al., "Reactivity of Macromonomers in Free Radical Polymerization", *J. Macromol. Sci., Part C, Polym. Rev.*, 30: 305-377 (1990).

Meyer, "Polymer Electrolytes for Lithium-Ion Batteries", *Advanced Materials.* 10(6):439-448 (1998).

Milner et al., "Theory of the Grafted Polymer Brush", *Macromolecules*, 21(8):2610-2619 (1988).

Miranda et al., "Cross-Linked Block Copolymer/Ionic Liquid Self-Assembled Blends for Polymer Gel Electrolytes with High Ionic Conductivity and Mechanical Strength", *Macromolecules*, 46(23):9313-9323 (2013).

Miyake et al., "Stereospecific Polymerization of Chiral Oxazolidinone-Functionalized Alkenes", *Macromolecules*, 43:7504-7514 (2010).

Miyake et al., "Synthesis of Isocyanate-Based Brush Block Copolymers and Their Rapid Self Assembly to Infrared Reflecting Photonic Crystals", *J. Am. Chem. Soc.* 134:14249-14254 (2012).

Miyake et al., "Precisely Tunable Photonic Crystals From Rapidly Self-Assembling Brush Block Copolymer Blends", *Angew. Chem. Int. Ed.*, 51:11246-11248 (2012).

Moatsou, et al., "Precision polymers: a kinetic; approach for functional poly(norbomenes)", *Chem. Sci.*, 5: 2246-2250 (2014).

Moon et al., "Chemical Aspects of Three-Dimensional Photonic Crystals", *Chem. Rev.*, 110:547-574 (2010).

(56) References Cited

OTHER PUBLICATIONS

Moon et al., "Solution-Processable Electrochemiluminescent Ion Gels for Flexible, Low-Voltage, Emissive Displays on Plastic", *J. Am. Chem. Soc.*, 136(9):3705-3712 (2014).
Mortensen et al., "Structural study on the micelle formation of poly(ethylene oxide)-poly(propylene oxide)-poly(ethylene oxide) triblock copolymer in aqueous solution", *Macromolecules*, 26(4):805-812 (1993).
Muftuoglu et al., "Photoinitiated Crosslinking and Grafting of Methylmethacrylate Using N,N-Dimethyl Amino Functional Polystyrene Block Copolymers", *Turk. J. Chem.*, 28:469-476 (2004).
Müllner, et al., "Cylindrical polymer brushes—Anisotropic building blocks, unimolecular templates and particulate nanocarriers", *Polymer*, 98: 389-401 (2016).
Neese, et al., "Software update: the ORCA program system, version 4,0", *Wiley Interdiscip. Rev.: WIREs Comput. Mol. Sci.*, 8(1): e1327 (2017).
Neiser et al., "Polymerization of Macromonomers to Cylindrical Brushes Initiated by Organolanthanides", *Macromolecules*, 36:5437-5439 (2003).
Neugebauer et al., "How Dense Are Cylindrical Brushes Grafted from a Multifunctional Macroinitiator?", *Polymer*, 45:8173-8179 (2004).
Nguyen et al., "Nanocomposite hydrogels based on liquid crystalline brush-like block copolymer-Au nanorods and their application in H2O2 detection", *Chem. Commun.*, 51:12174-12177(May 28, 2015).
Nguyen et al., "Nanostructured ion gels from liquid crystalline block copolymers and gold nanoparticles in ionic liquids: manifestation of mechanical and electrochemical properties", *J. of Materials Chemistry C.*, 3:399-408 (2014).
Nicholson et al., "Theory of Stationary Electrode Polarography. Single Scan and Cyclic Methods Applied to Reversible, Irreversible, and Kinetic Systems", *Anal. Chem.*, 36:706-723 (1964).
Niitani et al., "Characteristics of new-type solid polymer electrolyte controlling nano-structure", J. of Power Sources., 146(1-2):386-390 (2005).
Niitani et al., "Synthesis of Li+ Ion Conductive PEO-PSt Block Copolymer Electrolyte with Microphase Separation Structure", *Electrochem. Solid-State Lett.*, 8:A385-A388 (2005).
Niitani et al., "Star-Shaped Polymer Electrolyte with Microphase Separation Structure for All-Solid-State Lithium Batteries", *J. of the Electrochemical Society*, 156(7):A577-A583 (2009).
Noel et al., "Self-Reporting Degradable Fluorescent Grafted Copolymer Micelles Derived from Biorenewable Resources", *ACS Macro Letters*, 4: 645-650 (2015).
Oh et al., "Ionic liquids enhance the electrochemical CO2 reduction catalyzed by MoO2", *Chem. Commun.*, 51:13698-13701 (2015).
Ohno, et al., "Controlling grafting density and side chain length in poly(n-butyl acrylate) by ATRP copolymerization of macromonomers", *J. Polym. Sci., Part A: Polym. Chem.*, 44(19): 5454-5467 (2006).
Olvera De La Cruz, "Theory of microphase separation in graft and star copolymers", *Macromolecules*, 19(10), 2501-2508 (1986).
Ong et al., "Electrochemical Windows of Room-Temperature Ionic Liquids from Molecular Dynamics and Density Functional Theory Calculations", *Chem. Mater.*, 23:2979-2986 (2011).
Oono et al., "⅔-Power Law for Copolymer Lamellar Thickness Implies a ⅓- Power Law for Spinodal Decomposition", *Phys. Rev. Lett.*, 61:1109-1111 (1988).
O'Toole et al., "Electrocatalytic reduction of CO2 at a chemically modified electrode", *J. Chem. Soc. Chem. Commun.*, 20:1416-1417 (1985).
Pakula et al., "Molecular brushes as super-soft elastomers", *Polymer*, 47(20):7198-7206 (2006).
Panday et al., "Effect of Molecular Weight and Salt Concentration on Conductivity of Block Copolymer Electrolytes", *Macromolecules*, 42(13):4632-4637 (2009).
Pangborn et al., "Safe and Convenient Procedure for Solvent Purification", *Organometallics*, 15:1518-1520 (1996).

Paquet et al., "Nanostructured polymers for photonics", *Materials Today*, 11: 48-56 (2008).
Park et al., "Block Copolymer Lithography: Periodic Arrays of ~1011 Holes in 1 Square Centimeter", *Science*, 276:1401-1404 (1997).
Park et al., "Enabling Nanotechnology with Self Assembled Block Copolymer Patterns", *Polymer*, 44:6725-6760 (2003).
Park et al., "Macroscopic 10-Terabit-per-Square-Inch Arrays from Block Copolymers with Lateral Order", *Science*, 323:1030-1033 (2009).
Park, et al., "Synthesis of Norbornene Derivative Using Diels-Alder Reaction," Advanced Materials Research (Durnten-Zurich, Switzerland), 421: 136-139 (2012).
Parnell et al., "Continuously Tuneable Optical Filters from Self-Assembled Block Copolymer Blends", *Soft Matter*, 7:3721-3725 (2011).
Patten et al., "'Living' titanium(IV) catalyzed coordination polymerizations of isocyanates", *J. Am. Chem. Soc.* 113:5065-5066 (1991).
Patten et al., "Living Organotitanium(IV)-Catalyzed Polymerizations of Isocyanates", *J. Am. Chem. Soc.* 118:1906-1916 (1996).
Patz et al., "Impact of regional climate change on human health," *Nature.* 438:310-317 (2005).
Paturej, et al., "Molecular structure of bottlebrush polymers in melts", *Science Advances*, 2(11): e1601478 (2016).
Pedersen et al., "Determination of size distribution from small-angle scattering data for systems with effective hard-sphere interactions", *J. of Applied Crystallography*, 27(4):595-608 (1994).
Pelletier et al., "Aluminum nanowire polarizing grids: Fabrication and analysis", *Appl. Phys. Lett.*, 88:211114 (2006).
Peng et al., "Surface Urban Heat Island Across 419 Global Big Cities," *Environ. Sci. Technol.*, 46(2), 696-703 (2012).
Peng et al., "Smart poiyaner brushes and their emerging applications", *RSC Advances*, 2: 8557-8578 (2012).
Pesek et al., "Small-Angle Neutron Scattering Analysis of Bottlebrush Polymers Prepared via Grafting-Through Polymerization", *Macromolecules*, 46(17): 6998-7005 (2013).
Pesek, et al., "Small-angle neutron scattering analysis of bottlebrush backbone and side chain flexibility",*J. Polym. Sci., Part B: Polym. Phys.*, 55(1): 104-111 (2017).
Ping et al., "Microphase Separation and High Ionic Conductivity at High Temperatures of Lithium Salt-Doped Amphiphilic Alternating Copolymer Brush with Rigid Side Chains", *Macromolecules*, 48(23):8557-8564 (2015).
Piunova et al., "Highly Ordered Dielectric Mirrors via the Self-Assembly of Dendronized Block Copolymers", *Journal of the American Chemical Society*, 135(41): 15609-15616 (2013).
Poelma et al., "Cyclic Block Copolymers for Controlling Feature Sizes in Block Copolymer Lithography", *ACS Nano.*, 6:10845-10854 (2012).
Pollino, et al., Living ROMP of exo-Norbornene Esters Possessing $Pd^{II}$ SCS Pincer Complexes or Diaminopyridines, *Macromolecules*, 36(7): 2230-2234 (2003).
Polymeropoulos et al., "*50th Anniversary Perspective*: Polymers with Complex Architectures", *Macromolecules*, 50(4):1253-1290 (2017).
Prudnikova, et al., "Biomimetic Proteoglycans Mimic Macromolecular Architecture and Water Uptake of Natural Proteoglycans", *Biomacromolecules*, 18(6): 1713-1723 (2017).
Pusey et al., "Phase behaviour of concentrated suspensions of nearly hard colloidal spheres", *Nature*, 320(6060):340-342 (1986).
Qiao et al., "A review of catalysts for the electroreduction of carbon dioxide to produce low-carbon fuels", *J. Chem. Soc. Rev.*, 43:631-675 (2013).
Quartarone et al., "Electrolytes for solid-state lithium rechargeable batteries: recent advances and perspectives", *Chem. Soc. Rev.*, 40:2525-2540 (2011).
Quezada et al., "Electrocatalytic reduction of carbon dioxide on a cobalt tetrakis(4-aminophenyl)porphyrin modified electrode in BMImBF4",*New J. Chem.*, 38:3606-3612 (2014).
Qiu, et al., "Self-assembled polyethylenimine-graft-poly(ε-caprolactone) micelles as potential dual carriers of genes and anticancer drugs", *Biomaterials*, 28(28): 4132-4142 (2007).

(56) References Cited

OTHER PUBLICATIONS

Quinn et al., "Novel Electrochemical Studies of Ionic Liquids", *Langmuir*, 18:1734-1742 (2002).
Radzinski, et al., "Synthesis of bottlebrush polymers via transfer-to and grafting-through approaches using a RAFT chain transfer agent with a ROMP-active Z-group", *Polym. Chem.*, 6: 5643-5652 (2015).
Radzinski, et al., "Bottlebrush Polymer Synthesis by Ring-Opening Metathesis Polymerization: The Significance of the Anchor Group", *J. Am. Chem. Soc.*, 138(22): 6998-7004 (2016).
Radzinski, et al., "Tapered Bottlebrush Polymers: Cone-Shaped Nanostructures by Sequential Addition of Macromonomers", *ACS Macro Lett.*, 6(10): 1175-1179 (2017).
Read, et al., "Linking Models of Polymerization and Dynamics to Predict Branched Polymer Structure and Flow", *Science*, 333(6051):1871-1874 (2011).
Rathgeber, et al., "On the shape of bottle-brush macromolecules: Systematic variation of architectural parameters", *The J. Chem. Phys.*, 122: 124904 (2005).
Rey et al., "Structural Transition in an Ionic Liquid Controls CO2 Electrochemical Reduction", *J. Phys. Chem. C.*, 119:20892-20899 (2015).
Rizwan et al., "A review on the generation, determination and mitigation of Urban Heat Island", *J. of Environmental Sciences*, 20:120-128 (2008).
Rogers et al., "Voltammetric Characterization of the Ferrocene|Ferrocenium and Cobaltocenium|Cobaltocene Redox Couples in RTILs", *J. Phys. Chem. C.*, 112:2729-2735 (2008).
Rosso, et al., "Removal of Palladium from Organic Reaction Mixtures by Trimercaptotriazine",*Org. Process Res. Dev.*, 1(4): 311-314 (1997).
Rouault, et al., "Comb-Branched Polymers: Monte Carlo Simulation and Scaling", *Macromolecules*, 29(7): 2605-2611 (1996).
Rule, et al., "ROMP Reactivity of endo- and exo-Dicyclopentadiene", *Macromolecules*, 35(21): 7878-7882 (2002).
Runge et al., "Synthesis of High Molecular Weight Comb Block Copolymers and Their Assembly into Ordered Morphologies in the Solid State", *J. Am. Chem. Soc.*, 129:10551-10560 (2007).
Runge et al., "Investigation of the Assembly of Comb Block Copolymers in the Solid State", *Macromolecules*, 41:7687-7694 (2008).
Rutenburg, "Synthesis of Polymer Dielectric Layers for Organic Thin Film Transistors via Surface-Initiated Ring-Opening Metathesis Polymerization", *J. Am. Chem. Soc.*, 126(13):4062-4063 (2004).
Rzayev, "Synthesis of Polystyrene-Polylactide Bottlebrush Block Copolymers and Their Melt Self-Assembly into Large Domain Nanostructures", *Macromolecules*, 42:2135-2141 (2009).
Rzayev, "Molecular Bottlebrushes: New Opportunities in Nanomaterials Fabrication", *J. ACS Macro. Lett.*, 1:1146-1149 (2012).
Saariaho, et al., "Effect of Side Chain Rigidity on the Elasticity of Comb Copolymer Cylindrical Brushes: A Monte Carlo Simulation Study", *Macromolecules*, 32(13): 4439-4443 (1999).
Sahara et al., "Efficient Photocatalysts for CO2 Reduction", *Inorg. Chem.*, 54:5096-5104 (2015).
Sampson et al., "Manganese Catalysts with Bulky Bipyridine Ligands for the Electrocatalytic Reduction of Carbon Dioxide: Eliminating Dimerization and Altering Catalysis", *J. Am. Chem. Soc.*, 136:5460-5471 (2014).
Sampson et al., "Direct observation of the reduction of carbon dioxide by rhenium bipyridine catalysts", *Energy Environ. Sci.*, 6:3748-3755 (2013).
Sanford et al., "Mechanism and Activity of Ruthenium Olefin Metathesis Catalysts", *J. Am. Chem. Soc.*, 123: 6543-6554 (2001).
Savéant, "Molecular Catalysis of Electrochemical Reactions. Mechanistic Aspects", *Chem. Rev.*, 108:2348-2378 (2008).
Schappacher et al., "From Combs to Comb-g-Comb Centipedes", *Macromolecules*, 38:7209-7213 (2005).
Schulze et al., "High-Modulus, High-Conductivity Nanostructured Polymer Electrolyte Membranes via Polymerization-Induced Phase Separation", *Nano Lett.*, 14(1):122-126 (2013).

Seehof et al., "Selective reaction with exo-isomers in ring-opening olefin metathesis polymerization (ROMP) of fluoroalkyl-substituted norbornene derivatives", *Macromolecules*, 26(4): 695-700 (1993).
Seel et al., "Electrochemical Intercalation of PF 6 into Graphite",*J. Electrochem. Soc.*, 147(3):892-898 (2000).
Segalman, "Patterning with Block Copolymer Thin Films", *Materials Science and Engineering*, R48:191-226 (2005).
Seitz et al., "Self-Assembly and Stress Relaxation in Acrylic Triblock Copolymer Gels", *Macromolecules*, 40(4):1218-1226 (2007).
Seki et al., "Distinct Difference in Ionic Transport Behavior in Polymer Electrolytes Depending on the Matrix Polymers and Incorporated Salts", *The J. of Physical Chemistry B.*, 109(9):3886-3892 (2005).
Semenov, "Contribution to the theory of microphase layering in block-copolymer melts", *Sov. Phys. JETP*, 61(4): 733-742 (1985).
Seo et al., "Effect of Cation on Physical Properties and CO2 Solubility for Phosphonium-Based Ionic Liquids with 2-Cyanopyrrolide Anions", *J. Phys. Chem. B.*, 119:11807-11814 (2015).
Shah et al., "Chiroptical Properties of Graft Copolymers Containing Chiral Poly(n-hexyl isocyanate) as a Side Chain", *Macromolecules*, 44:7917-7925 (2011).
Sheiko et al., "Visualization of Macromolecules—A First Step to Manipulation and Controlled Response", *Chem. Rev.*, 101:4099-4123 (2001).
Sheiko et al., "Cylindrical molecular brushes: Synthesis, characterization, and properties", *Prog. Polym. Sci.*, 33(7):759-785 (2008).
Shinoda, et al., "Structural Control of Poly(Methyl Methacrylate)-g-poly(Lactic Acid) Graft Copolymers by Atom Transfer Radical Polymerization (ATRP)", *Macromolecules*, 34(18): 6243-6248 (2001).
Sing, et al., "Theory of melt polyelectrolyte blends and block copolymers: Phase behavior, surface tension, and microphase periodicity", *J. Chem. Phys.*, 142: 034902 (2015).
Singh et al., "Effect of Molecular Weight on the Mechanical and Electrical Properties of Block Copolymer Electrolytes", *Macromolecules*. 40(13):4578-4585 (2007).
Singh, et al., "Manipulating ordering transitions in interfacially modified block copolymers", *Soft Matter*, 5: 4757-4762 (2009).
Slugovc, "The Ring Opening Metathesis Polymerisation Toolbox," *Macromol. Rapid Commun.*, 25:1283-1297 (2004).
Slugovc et al., "The Resting State Makes the Difference: The Influence of the Anchor Group in the ROMP of Norbornene Derivatives", *Macromol. Rapid Commun.*, 25: 475-480 (2004).
Smieja et al., "Re(bipy-tBu)(CO)3Cl-improved Catalytic Activity for Reduction of Carbon Dioxide: IR-Spectroelectrochemical and Mechanistic Studies", *Inorg. Chem.*, 49:9283-9289 (2010).
Smieja et al., "Manganese as a Substitute for Rhenium in CO2 Reduction Catalysts: The Importance of Acids", *J. Am. Chem. Soc.*, 52:2484-2491 (2013).
Song et al., "Review of gel-type polymer electrolytes for lithium-ion batteries", *J. Power Sources*, 77:183-197 (1999).
Soo et al., "Preparation of Block Copolymer in Solution", *J. Polym. Sci. Part B.: Polym. Phy.*, 42(6):923-938 (2004).
South et al., "Modular and Dynamic Functionalization of Polymeric Scaffolds", Accounts of Chemical Research, 40(1):63-74 (2007).
Stephan et al., "Review on composite polymer electrolytes for lithium batteries", *Polymer*, 47(16):5952-5964 (2006).
Stoykovich et al., "Block Copolymers and Conventional Lithography", *Materials Today*, 9:20 (2006).
Sullivan et al., "One- and two-electron pathways in the electrocatalytic reduction of CO2 by fac-Re(bpy)(CO)3Cl (bpy = 2,2'-bipyridine)", *J. Chem. Soc. Chem. Commun.*, 20:1414-1416 (1985).
Sumerlin et al., "Initiation Efficiency in the Synthesis of Molecular Brushes by Grafting from via Atom Transfer Radical Polymerization", *Macromolecules*, 38:702-708 (2007).
Sun, et al., "Sernibatch RAFT polymerization for producing ST/BA copolymers with controlled gradient composition profiles", *AIChE J.*, 54(4): 1073-1087 (2008).
Sun et al., "Structure-Conductivity Relationship for Peptoid-Based PEO-Mimetic Polymer Electrolytes", *Macromolecules*, 45(12):5151-5156 (2012).
Sun, et al., "Nanoscopic Cylindrical Dual Concentric and Lengthwise Block Brush Terpolymers as Covalent Preassembled High-

(56) References Cited

OTHER PUBLICATIONS

Resolution and High-Sensitivity Negative-Tone Photoresist Materials", *J. Am. Chem. Soc.*, 135(11): 4203-4206 (2013).
Sun et al., "Switching the Reaction Course of Electrochemical CO2 Reduction with Ionic Liquids", *Langmuir*, 30:6302-6308 (2014).
Susan et al., "Ion Gels Prepared by in Situ Radical Polymerization of Vinyl Monomers in an Ionic Liquid and Their Characterization as Polymer Electrolytes", *J. Am. Chem. Soc.*, 127(13):4976-4983 (2005).
Sutthasupa, et al., "Alternating Ring-Opening Metathesis Copolymerization of Amino Acid Derived Norbornene Monomers Carrying Nonprotected Carboxy and Amino Groups Based on Acid-Base Interaction", *J. Am. Chem. Soc.*, 131(30): 10546-10551 (2009).
Sutthasupa, et al., "Recent advances in ring-opening metathesis polymerization, and application to synthesis of functional materials", *Polym. J.*, 42: 905-915 (2010).
Sveinbjörnsson et al., "Rapid Self-Assembly of Brush Block Copolymers to Photonic Crystals", *Proc. Natl. Acad. Sci. USA*, 109(36)1 4332-14336 (2012).
Taheri et al., "An Iron Electrocatalyst for Selective Reduction of CO2 to Formate in Water: Including Thermochemical Insights", *ACS Catal.*, 5:7140-7151 (2015).
Tan et al., "Gels of ionic liquid [C4mim]PF6 formed by self-assembly of gelators and their electrochemical properties", *Electrochem. Commun.*, 11:933-936 (2009).
Tang et al., "Synthesis and Morphology of Molecular Brushes with Polyacrylonitrile Block Copolymer Side Chains and Their Conversion into Nanostructured Carbons", *Macromolecules*, 40:6199-6205 (2007).
Tang et al., "Synergistic Increase in Ionic Conductivity and Modulus of Triblock Copolymer Ion Gels", *Macromolecules*, 48(14):4942-4950 (2015).
Teran et al., "Discontinuous Changes in Ionic Conductivity of a Block Copolymer Electrolyte through an Order-Disorder Transition", *ACS Macro Letters*, 1(2):305-309 (2012).
Teran et al., "Thermodynamics of Block Copolymers with and without Salt", *The J. of Physical Chemistry B.*, 118(1):4-17 (2014).
Thompson et al., "Solvent Accelerated Polymer Diffusion in Thin Films", *Macromolecules*, 38:4339-4344 (2005).
Thurn-Albrecht et al., "High-Density Nanowire Arrays Grown in Self-Assembled Diblock Copolymer Templates", *Science*, 290:2126-2129 (2000).
Trapa et al., Rubbery Graft Copolymer Electrolytes for Solid-State, Thin-Film Lithium Batteries, *J. of the Electrochemical Society*, 152(1):A1-A5 (2005).
Trapa et al., "Synthesis and Characterization of Single-Ion Graft Copolymer Electrolytes", *J. of the Electrochemical Society*, 152(12):A2281-A2284 (2005).
Troparevsky et al., "Transfer-matrix formalism for the calculation of optical response in multilayer systems: from coherent to incoherent interference", *Optics Express*, 18:24715-24721 (2010).
Trzaskowski et al., "Structural and Mechanistic Basis of the Fast Metathesis Initiation by a Six-Coordinated Ruthenium Catalyst", *Organometallics*, 32(13): 3625-3630 (2013).
Tseng et al., "Block Copolymer Nanostructures for Technology", *Polymer*, 2:470-489 (2010).
Tsurumaki et al., "Properties of polymer electrolytes composed of poly(ethylene oxide) and ionic liquids according to hard and soft acids and bases theory", *Polym. Adv. Technol.*, 22:1223-1228 (2011).
Ueki et al., "Macromolecules in Ionic Liquids: Progress, Challenges, and Opportunities", *Macromolecules*, 41(11):3739-3749 (2008).
Ueki et al., "Photoreversible Gelation of a Triblock Copolymer in an Ionic Liquid", *Angew. Chem., Int Ed.*, 54:3018-3022 (2015).
Underwood, "Industrial Synthesis of Hydrocarbons from Hydrogen and Carbon Monoxide", *Ind. Eng. Chem.*, 32:449-454 (1940).
Urbas et al., "One-Dimensionally Periodic Dielectric Reflectors from Self-Assembled Block Copolymers—Homopolymer Blends", *Macromolecules*, 32:4748-4750 (1999).
Urbas et al., "Tunable Block Copolymer/Homopolymer Photonic Crystals", *Adv. Mater.*, 12:812-814 (2000).
Valkama et al., "Self-Assembled Polymeric Solid Films with Temperature-Induced Large and Reversible Photonic-Bandgap Switching", *Nature Mater.*, 3:872-876 (2004).
Van Gurp et al., "Time-Temperature Superposition for Polymer Blends", *Rheol. Bull.*, 67:5-8 (1998).
Van Ruymbeke et al., "Molecular rheology of branched polymers: decoding and exploring the role of architectural dispersity through a synergy of anionic synthesis, interaction chromatography, rheometry and modeling", *Soft Matter*, 10: 4762-4777 (2014).
Vayer et al., "Perpendicular Orientation of Cylindrical Domains Upon Solvent Annealing Thin Films of Polystyrene-B-Polylactide", *Thin Solid Films*, 518:3710-3715 (2010).
Verduzco et al., "Structure, function, self-assembly, and applications of bottlebrush copolymers", *Chem. Soc. Rev.*, 44:2405-2420 (2015).
Vougioukalakis et al., "Ruthenium-Based Heterocyclic Carbene-Coordinated Olefin Metathesis Catalysts", *Chem. Rev.*, 110:1746-1787 (2010).
Vyboishchikov, et al., "Mechanism of Olefin Metathesis with Catalysis by Ruthenium Carbene Complexes: Density Functional Studies on Model Systems", *Chem. Eur. J.*, 8(17): 3962-3975 (2002).
Vygodskii et al., "Cyclopolymerization of N,N-Dipropargylamines and N,N-Dipropargyl Ammonium Salts", *Macromolecules*, 41: 1919-1928 (2008).
Walsh et al., "Electrocatalytic CO2 reduction with a membrane supported manganese catalyst in aqueous solution", *Chem. Commun.*, 50:12698-12701 (2014).
Walsh et al., "Kinetic Study of Living Ring-Opening Metathesis Polymerization with Third-Generation Grubbs Catalysts",*J. Am. Chem. Soc.*, 139(39): 13644-13647 (2017).
Wanakule et al., "Thermodynamic Properties of Block Copolymer Electrolytes Containing Imidazolium and Lithium Salts", *Macromolecules*, 43:8282-8289 (2010).
Wang et al., "All Solid-State Lithium-Polymer Battery Using a Self-Cross-Linking Polymer Electrolyte", *J. of the Electrochemical Society*, 150(9):A1166-A1170 (2003).
Wang et al., Control of gradient copolymer composition in ATRP using semibatch feeding policy, *AIChE J.*, 53(1): 174-186 (2007).
Wang et al., Bioinspired Colloidal Photonic Crystals with Controllable Wettability, *Acc. Chem. Res.*, 44:405-415 (2011).
Wang et al., "Synthesis of sequence-determined bottlebrush polymers based on sequence determination in living anionic copolymerization of styrene and dimethyl(4-(1-phenylvinyl)phenyl)silane", *Polym. Chem.*, 7: 3090-3099 (2016).
Watanabe et al., "High ionic conductivity and electrode interface properties of polymer electrolytes based on high molecular weight branched polyether", *J. Power Sources*, 81-82:786-789 (1999).
Welton,"Room-Temperature Ionic Liquids. Solvents for Synthesis and Catalysis", *Chem. Rev.*, 99:2071-2084 (1999).
Welton, "Ionic liquids in catalysis", *Coord. Chem. Rev.*, 248:2459-2477 (2004).
Westphalen et al., "Metal Cluster Enhanced Organic Solar Cells", *Solar Energy Materials & Solar Cells*, 61:97-105 (1999).
Windmon, et al., "Diels-Alder reactions in the presence of a minimal amount of water", *Green Chemistry Letters and Reviews*, 1: 155-163 (2008).
Wolfe, et al., "Investigation of Organoboronates in Metathesis Polymerization", *Macromolecules*, 32(24): 7961-7967 (1999).
Xia et al., "Conductivities of solid polymer electrolyte complexes of alkali salts with polymers of methoxypolyethyleneglycol methacrylates", *Solid State Ionics*, 14:221-224 (1984).
Xia et al., "Efficient synthesis of narrowly dispersed brush copolymers and study of their assemblies: the importance of side chain arrangement", *J. Am. Chem. Soc.*, 131:18525-18532 (2009).
Xia et al., "Efficient Synthesis of Narrowly Dispersed Brush Polymers via Living Ring-Opening Metathesis Polymerization of Macromonomers", *Macromolecules*, 42:3761-3766 (2009).
Xiong et al., "Reversible Hydrophobic-Hydrophilic Transition of Ionic Liquids Driven by Carbon Dioxide", *Angew. Chem., Int. Ed.*, 54:7265-7269 (2015).
Xu, et al., "Molecular Pressure Sensors". *Adv. Mater.*, 19(19): 2930-2934 (2007).

(56) References Cited

OTHER PUBLICATIONS

Xu et al., "ABC Triblock Copolymer Particles with Tunable Shape and Internal Structure through 3D Confined Assembly", *Macromolecules*, 48:2628-2636 (2015).
Xu et al., "Fabrication of Silicon Oxide Nanodots with an Areal Density Beyond 1 Teradots Inch-2", *Adv. Mater.*, 22:5755 (2011).
Xu, et al., "Theoretical simulations of nanostructures self-assembled from copolymer systems", *Polymer Chemistry*, 7: 3783-3811 (2016).
Yamaguchi et al., "A Phase Diagram for the Binary Blends of Nearly Symmetric Diblock Copolymers. 1. Parameter Space of Molecular Weight Ratio and Blend Composition", *Macromolecules*, 34:6495-6505 (2001).
Yang et al., "Supramolecular ABC Triblock Copolymers via One-Pot, Orthogonal Self-Assembly",*J. Am. Chem Soc.*, 132:1637-1645 (2010).
Yashima et al., "Helical Polymers: Synthesis, Structures, and Functions", *Chem. Rev.*, 109:6102-6211 (2009).
Yavitt, et al., "High Molecular Mobility and Viscoelasticity of Microphase-Separated Bottlebrush Diblock Copolymer Melts", *Macromolecules*, 50(1): 396-405 (2017).
Ye et al., "Ionic liquid polymer electrolytes", *J. Mater. Chem. A.*, 1:2719-2743 (2012).
Yoon et al., "Self-Assembly of Block Copolymers for Photonic-Bandgap Materials", *MRS Bull.*, 30: 721-726 (2005).
Yoon et al., "Optically Transparent and High Molecular Weight Polyolefin Block Copolymers toward Self-Assembled Photonic Band Gap Materials", *Macromolecules*, 39:1913-1919 (2006).
Yoon et al., "Thermochromic Block Copolymer Photonic Gel", *Macromolecules*, 41:4582-4584 (2008).
Young et al., "Mixed-Salt Effects on the Ionic Conductivity of Lithium-Doped PEO-Containing Block Copolymers", *Macromolecules*, 44(20):8116-8123 (2011).
Young et al., "Block copolymer electrolytes for rechargeable lithium batteries", *J. of Polymer Science Part B: Polymer Physics*, 52(1):1-16 (2013).
Young et al., "Investigating polypropylene-poly(ethylene oxide)-polypropylene triblock copolymers as solid polymer electrolytes for lithium batteries", *Solid State Ionics*, 263:87-94 (2014).
Yuan et al., "Ionic Conductivity of Low Molecular Weight Block Copolymer Electrolytes", *Macromolecules*, 46(3):914-921 (2013).
Zalusky et al., "Ordered Nanoporous Polymers from Polystyrene-Polylactide Block Copolymers", *J. Am. Chem. Soc.*, 124:12761-12773 (2002).
Zhang, "Block Copolymer-Based Ion Gels as Solid Polymer Electrolytes", Dissertation (Ph.D.). University of Minnesota (2012).
Zhang et al., "Super soft elastomers as ionic conductors", *Polymer*, 45(18):6333-6339 (2004).
Zhang et al., "Cylindrical Polymer Brushes", *J. Polym. Sci. Part A: Polym. Chem.*, 43:3461-3481 (2005).
Zhang et al., "Physical Properties of Ionic Liquids: Database and Evaluation", *J. Phys. Chem. Ref. Data.*, 35:1475-1517 (2006).
Zhang et al., "Conformation of Cylindrical Brushes in Solution: Effect of Side Chain Length", *Macromolecules*, 39(24): 8440-8450 (2006).
Zhang et al., "Electrochemical behaviors and spectral studies of ionic liquid (1butyl-3-methylimidazolium tetrafluoroborate) based sol-gel electrode", *J. Electroanal. Chem.*, 603:243-248 (2007).
Zhang et al., "Ionic Conductivity, Capacitance, and Viscoelastic Properties of Block Copolymer-Based Ion Gels", *Macromolecules*, 44(4):940-949 (2011).
Zhang et al., "Viscoelastic Properties, Ionic Conductivity, and Materials Design Considerations for Poly(styrene-b-ethylene oxide-b-styrene)-Based Ion Gel Electrolytes", *Macromolecules*, 44(22):8981-8989 (2011).
Zhang, et al., "Well-Defined Polyethylene-Based Random, Block, and Bilayered Molecular Cobrushes", *Macromolecules*, 48(11): 3556-3562 (2015).
Zhang, et al., "Design of Graft Block Polymer Thermoplastics", *Macromolecules*, 49(23): 9108-9118 (2016).
Zhao et al., "Ionic liquids: applications in catalysis", *Catal. Today.*, 74:157-189 (2002).
Zhao et al., "Crystallization and thermal properties of PLLA comb polymer", *J. of Polymer Science Part B: Polymer Physics*, 46(6):589-598 (2008).
Zhao et al., "Electrochemistry of Room Temperature Protic Ionic Liquids", *J. Phys. Chem. B.*, 112:6923-6936 (2008).
Zheng et al., "Morphology of ABC triblock copolymers", *Macromolecules*, 28:7215-7223 (1995).
Zhulina, "Polymer brushes: Simple Views on Polymers at Surfaces and Interfaces: Simposium Honoring P.-G. de Gennes", APS meeting, Mar. 13, 2008, New Orleans USA, Institute of Macromolecular Compounds, Russian Academy of Sciences, St. Petersburg, Russia (2008).
Zhulina, "Polymer brushes: Polymers in Soft and Biological Matter" Jul. 30-Aug. 1, 2012, Boulder CO, USA, Institute of Macromolecular Compounds, Russian Academy of Sciences, St. Petersburg, Russia (Jul. 30-Aug. 1, 2012).
Zigon et al., Eds. The Proceedings of the Austrian-Slovenian Polymer Meeting 2013. Centre of Excellence PoliMaT. Bled, Slovenia., www.ASPM.SI, pp. 1-303, (Apr. 3-5, 2013).
International Search Report and Written Opinion dated Jul. 18, 2013, corresponding to International Application No. PCT/US2013/030978.
Hammouda, "Structure Factors for Particulate Systems", Ch. 32 In; NIST Distance Learning. Accessible on the Internet at URL: http://www.ncnr.nist.gov/staff/hammouda/distance_learning/chapter_32.pdf (Published Jun. 2016).
Orfanidis, Electromagnetic Waves and Antennas. Online book. Accessible on the Internet at URL: http:// http://www.ece.rutgers.edu/~orfanidi/ewa (Published 2011).

* cited by examiner

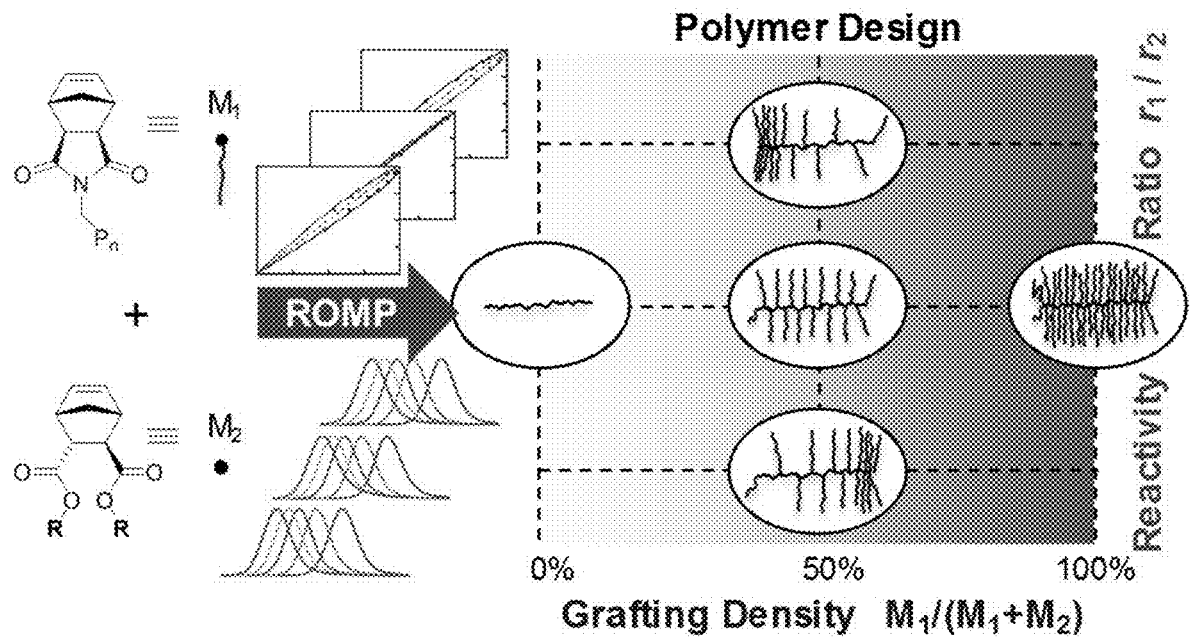
FIG. 1
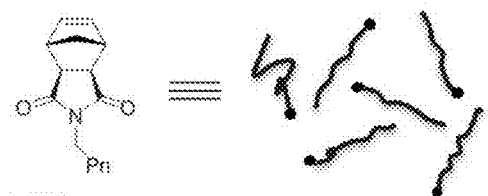
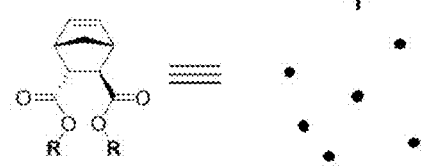
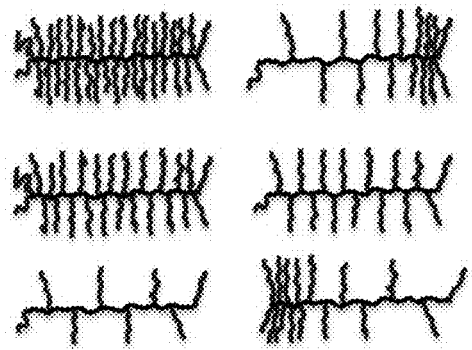
FIG. 2

Case I: $r_1, r_2 \ll 1$ (alternating)

$M_1M_2M_1M_2M_1M_2M_1M_2M_1M_2M_1M_2M_1M_2M_1M_2M_1M_2M_1M_2$

Case II: $r_1, r_2 \gg 1$ (blocky)

$M_1M_1M_1M_1M_1M_1M_1M_1M_1M_1M_2M_2M_2M_2M_2M_2M_2M_2M_2M_2$

Case III: $r_1 = r_2 = 1$ (random)

$M_2M_2M_1M_2M_1M_1M_1M_2M_1M_2M_1M_2M_2M_1M_1M_2M_1M_2M_2M_1$

Case IV: $r_1 < 1 < r_2$ (gradient)

$M_2M_2M_2M_2M_1M_2M_2M_2M_1M_1M_2M_2M_1M_1M_1M_2M_1M_1M_1M_1$

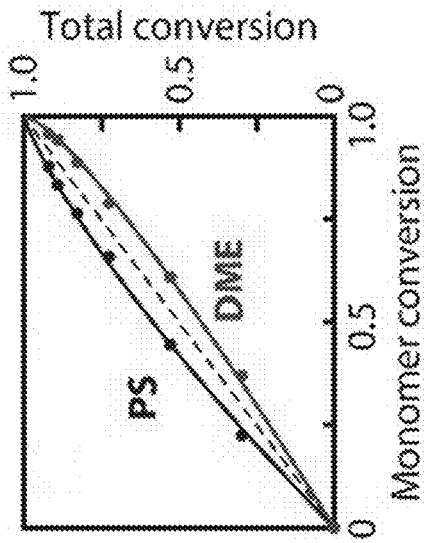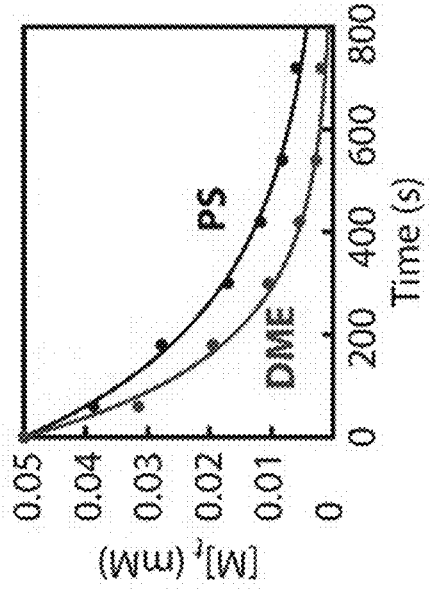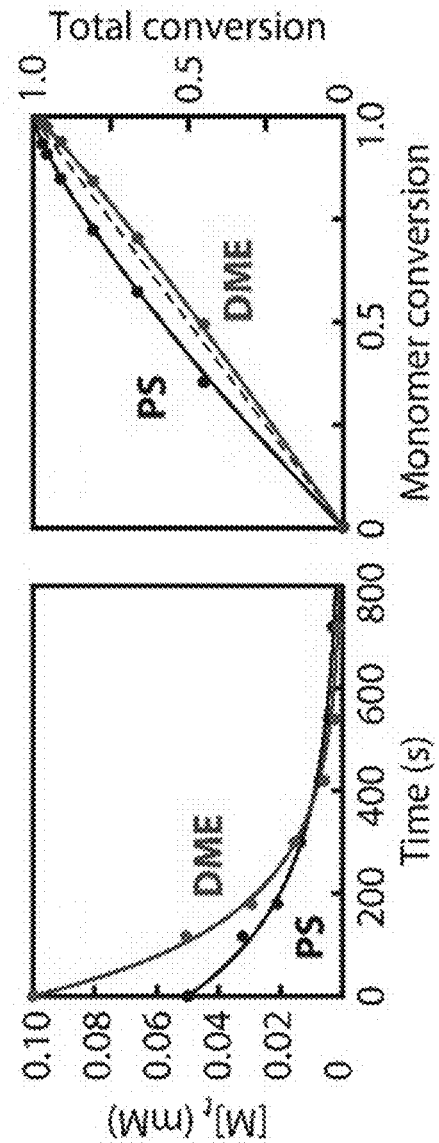

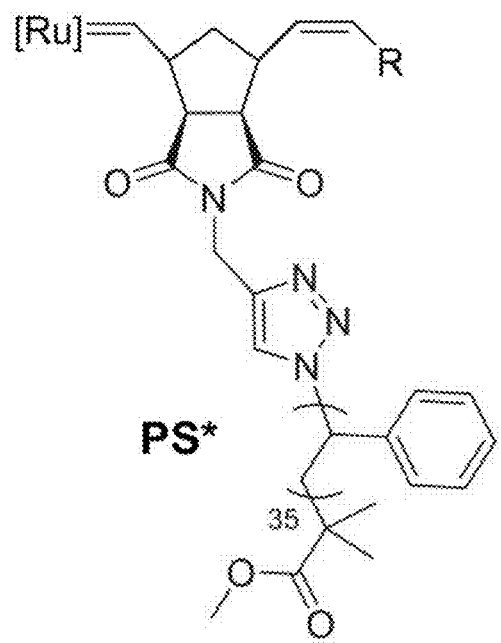
FIG. 7
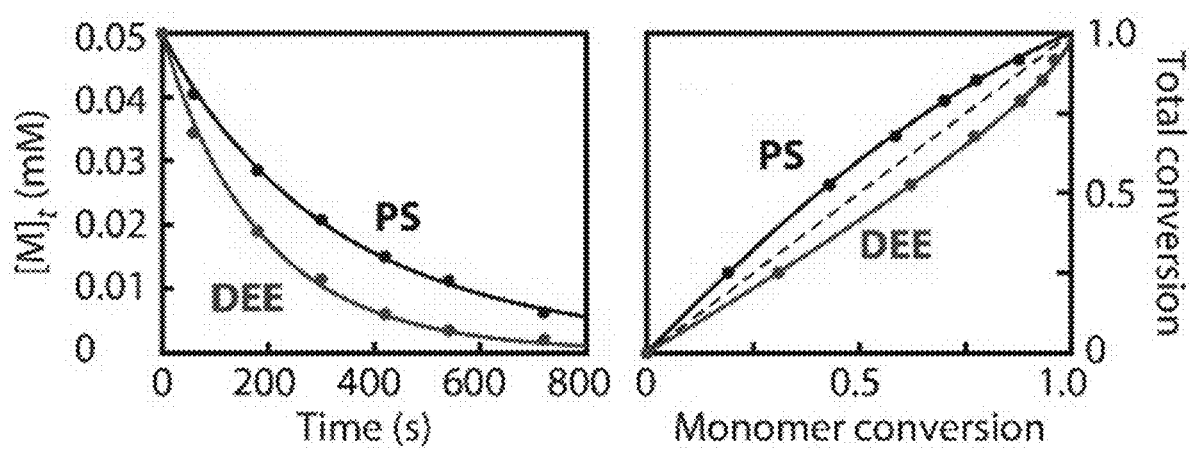
FIG. 8A  FIG. 8B

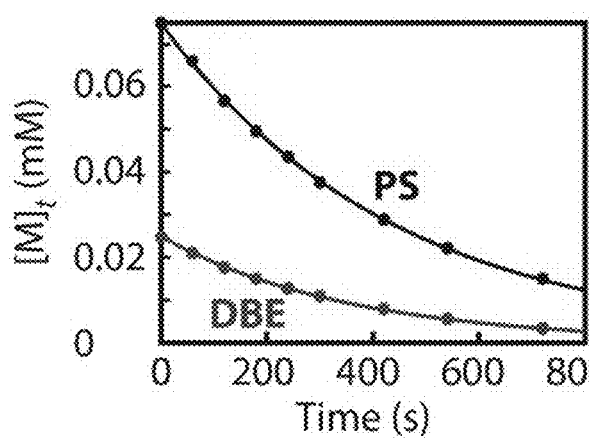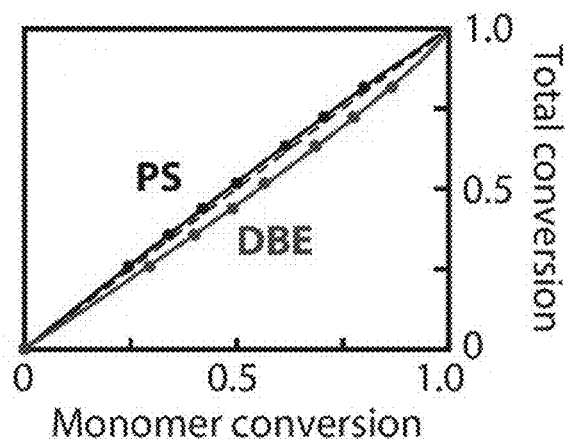
FIG. 19A  FIG. 19B
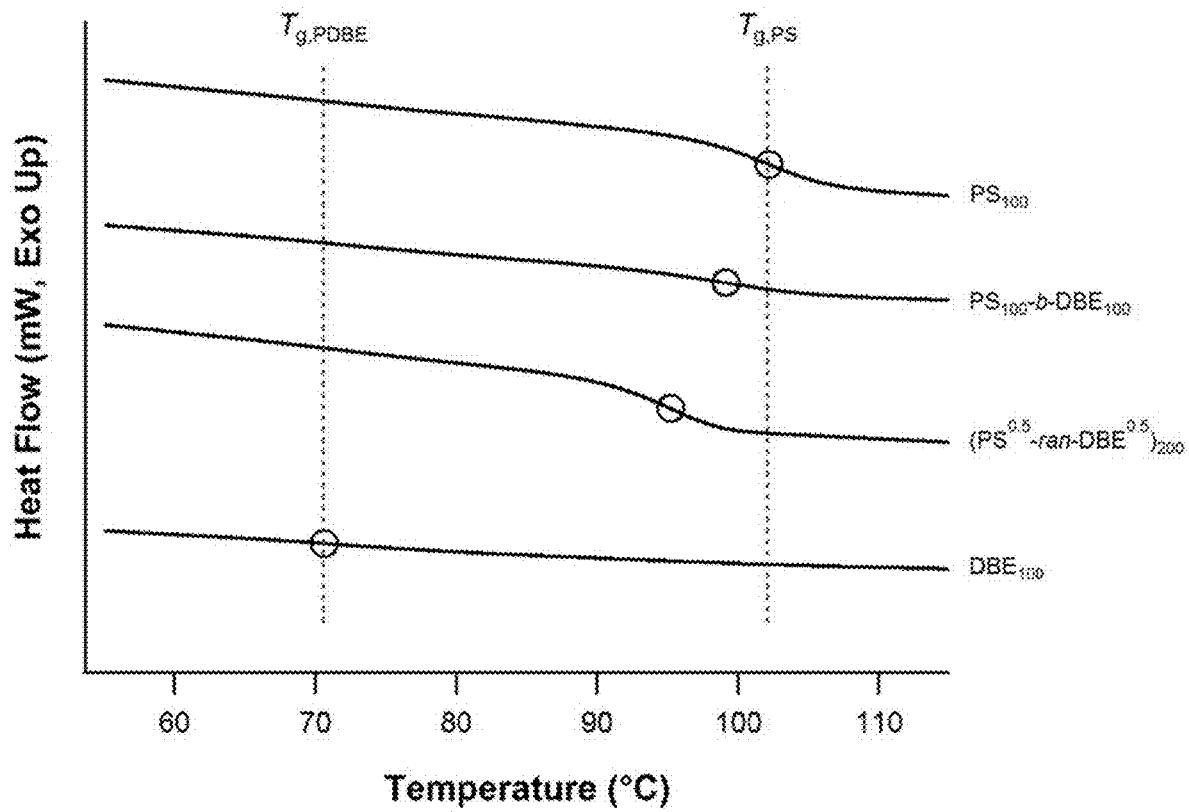
FIG. 20

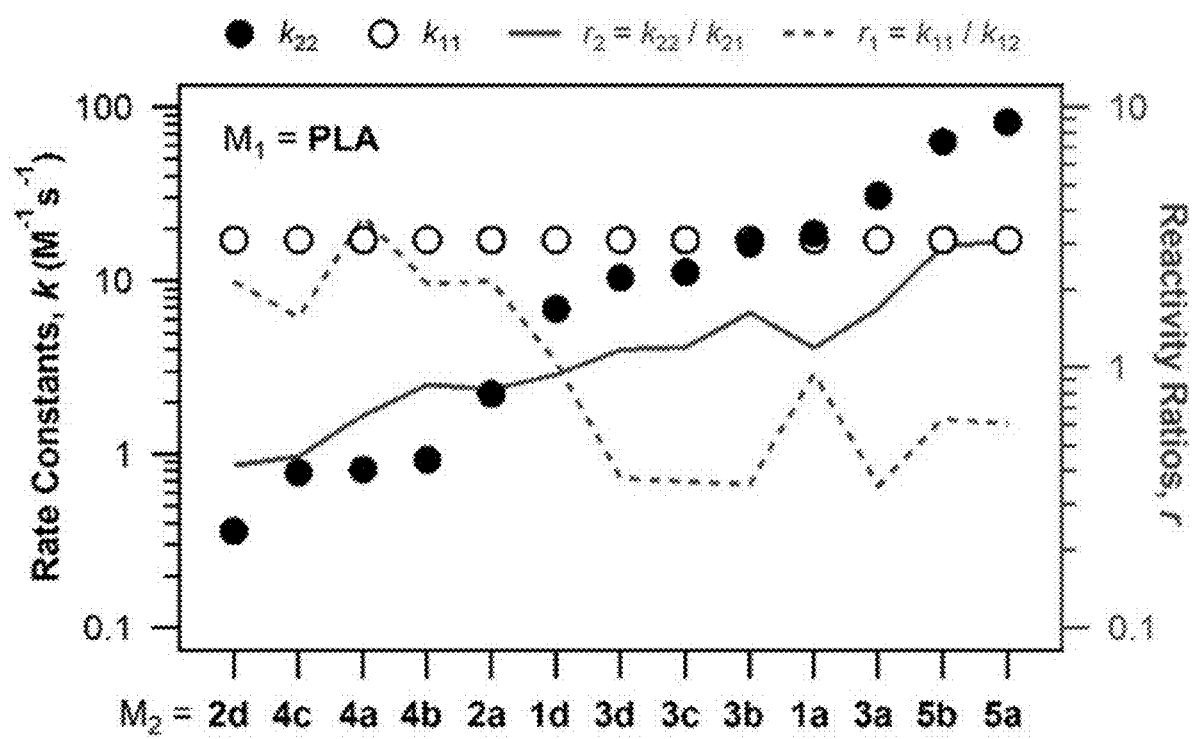
FIG. 29C
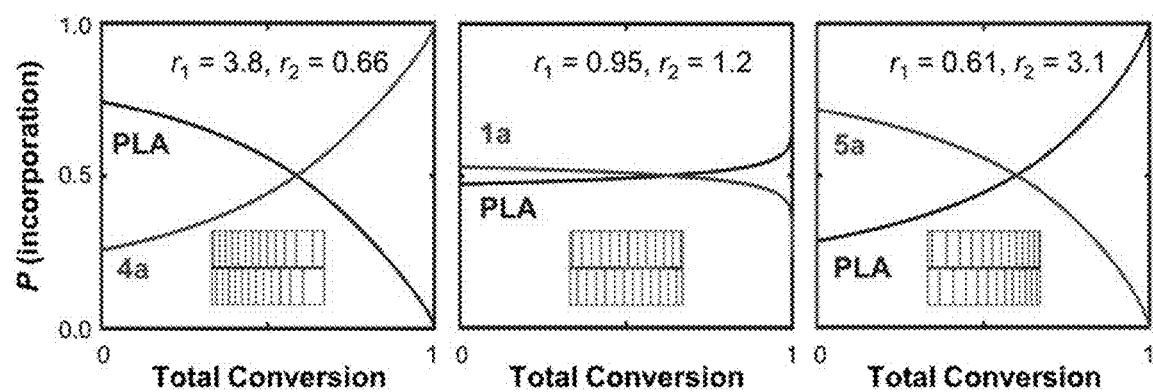
FIG. 30A  FIG. 30B  FIG. 30C

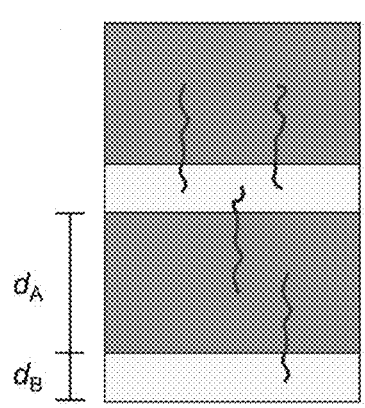 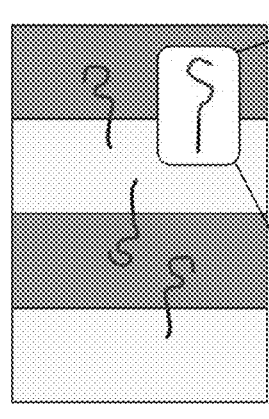 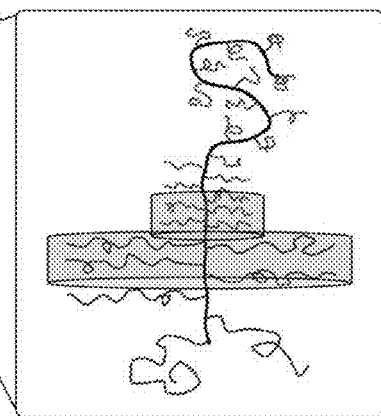
$d_A \approx 3d_B$
not observed
FIG. 34A
$d_A \approx d_B$
observed
FIG. 34B
BP-3
FIG. 34C

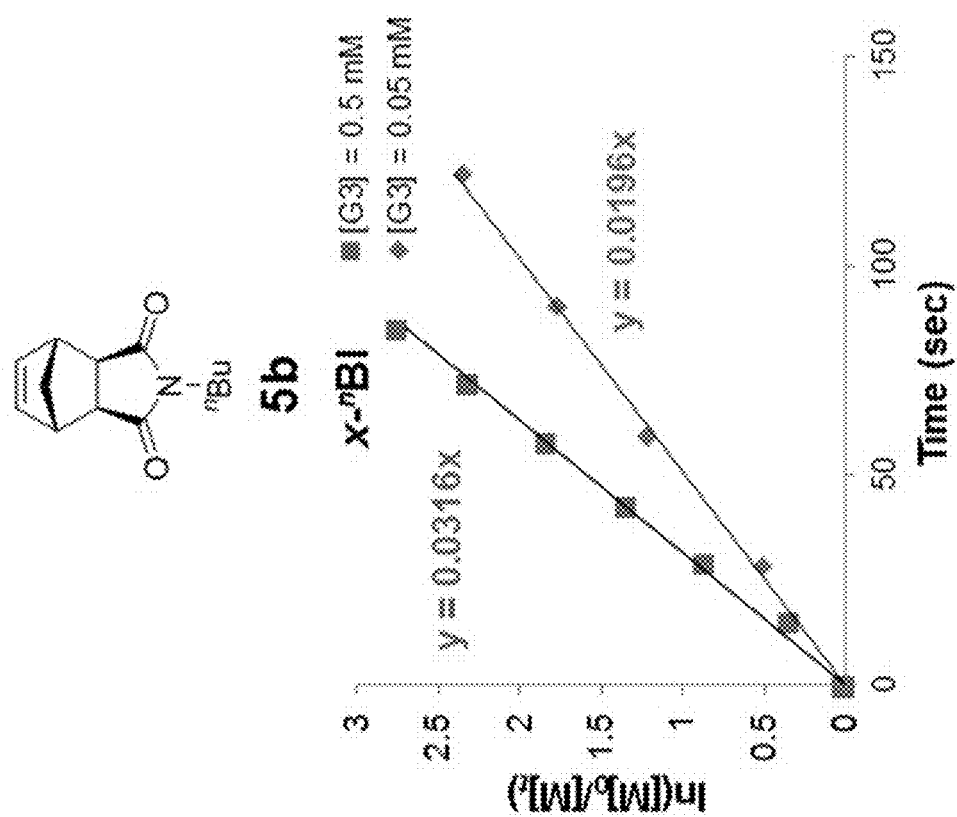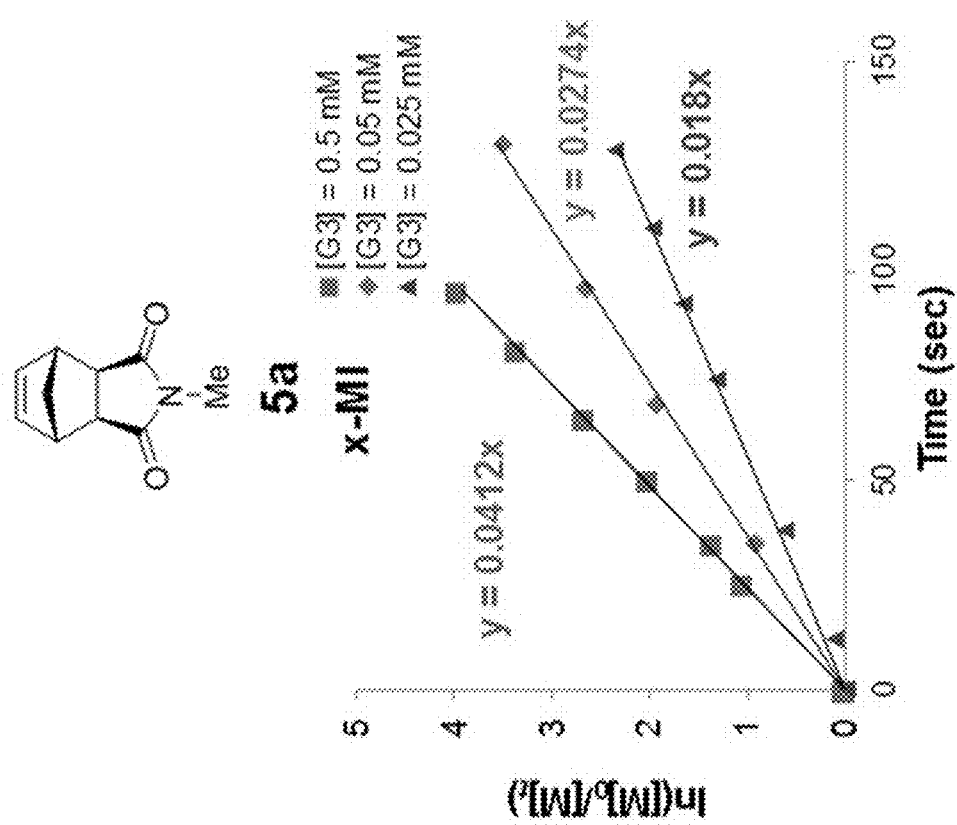
FIG. 51

$(PLA^{0.05}\text{-}r\text{-}DME^{0.95})_{200}$ $(PS^{0.05}\text{-}r\text{-}DBE^{0.95})_{200}$ System I, $z = 1.00$
$N_{bb} = 44$, $d^* = 27.5$ nm
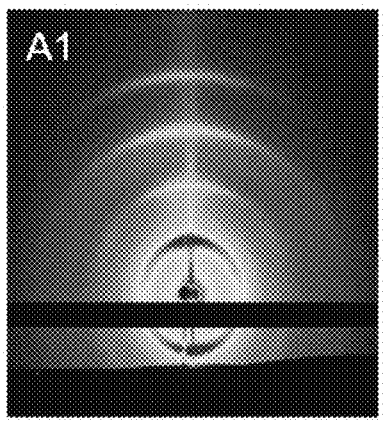
$N_{bb} = 84$, $d^* = 46.0$ nm
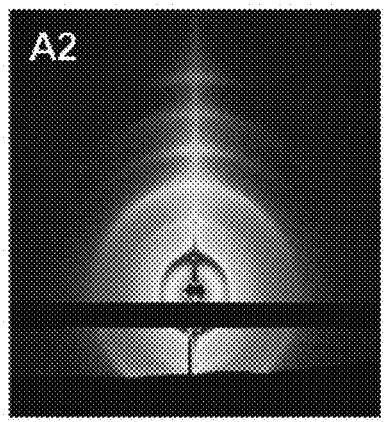
$N_{bb} = 129$, $d^* = 65.8$ nm
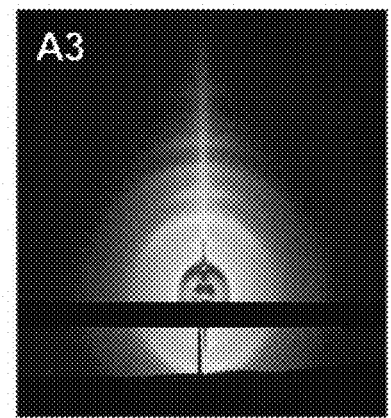
$N_{bb} = 165$, $d^* = 82.0$ nm
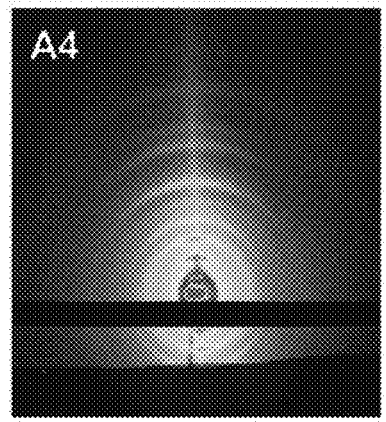
$N_{bb} = 199$, $d^* = 97.5$ nm
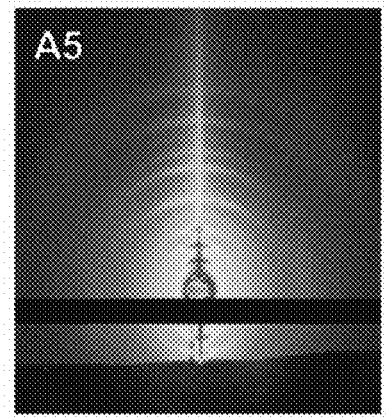
FIG. 77A

System I, z = 0.15
$N_{bb} = 216$, $d^* = 43.6$ nm         $N_{bb} = 235$, $d^* = 46.6$ nm         $N_{bb} = 250$, $d^* = 50.3$ nm
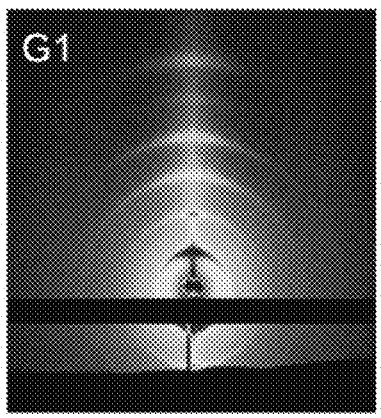 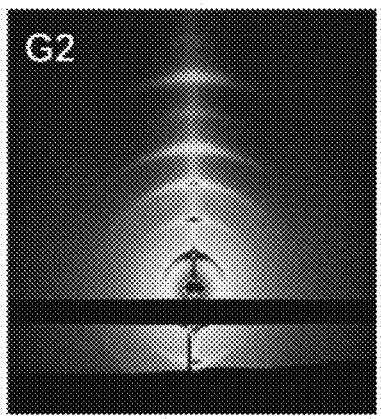 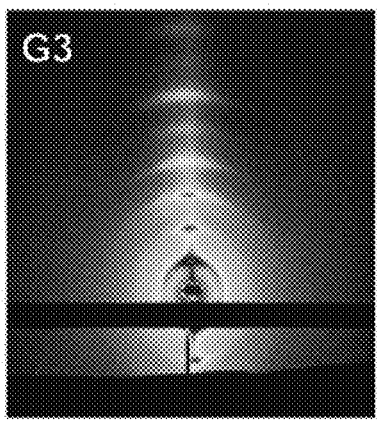
$N_{bb} = 286$, $d^* = 54.0$ nm         $N_{bb} = 307$, $d^* = 57.0$ nm         $N_{bb} = 325$, $d^* = 60.0$ nm
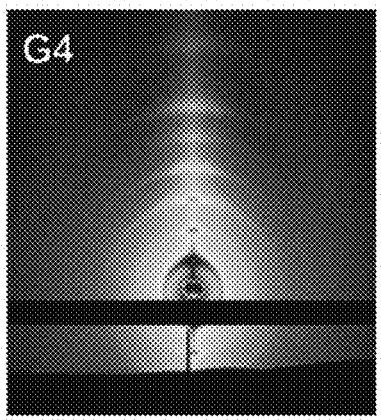 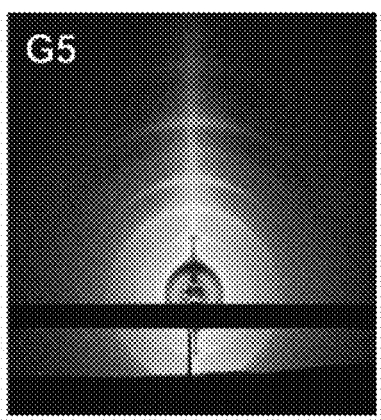 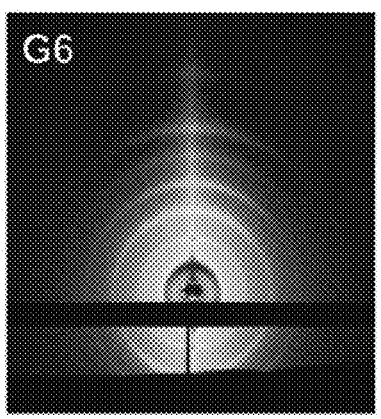
FIG. 77G

System I, $z = 0$
$N_{bb} = 184$, $d^* = 26.3$ nm
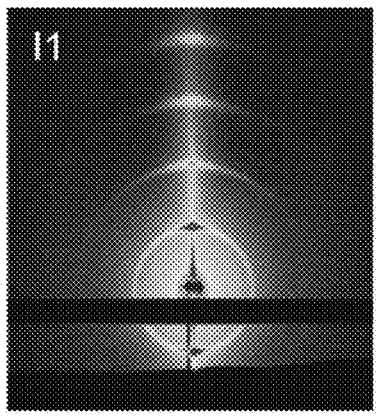
$N_{bb} = 219$, $d^* = 29.5$ nm
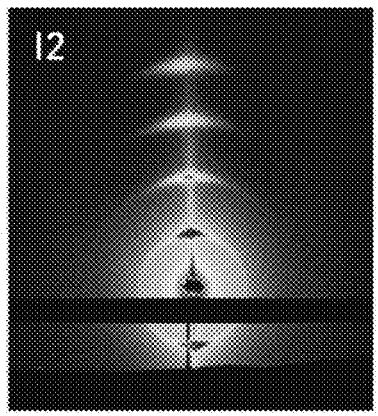
$N_{bb} = 249$, $d^* = 32.1$ nm
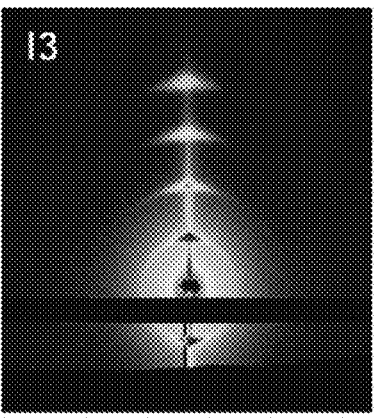
$N_{bb} = 287$, $d^* = 35.4$ nm
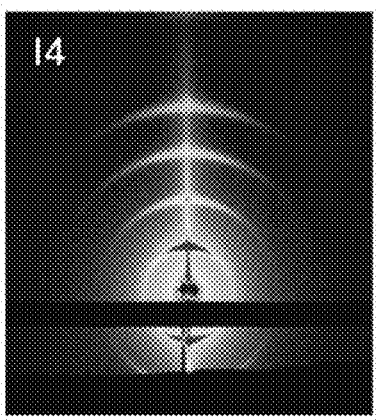
$N_{bb} = 326$, $d^* = 38.9$ nm
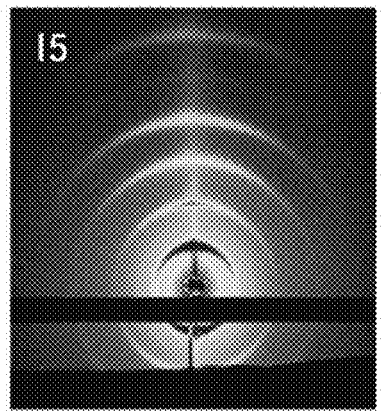
$N_{bb} = 363$, $d^* = 41.6$ nm
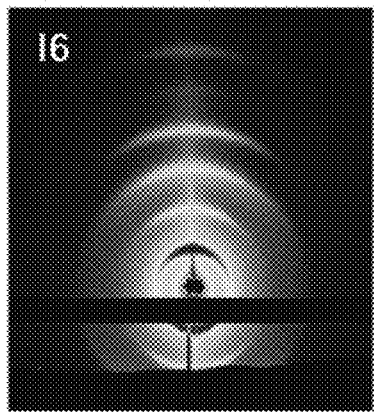
FIG. 77I

System II, $z = 0.75$
$N_{bb} = 44$, $d^* = 23.5$ nm
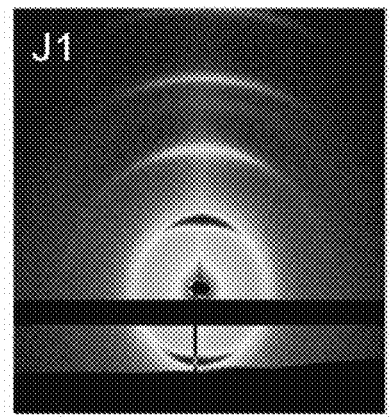
$N_{bb} = 82$, $d^* = 36.8$ nm
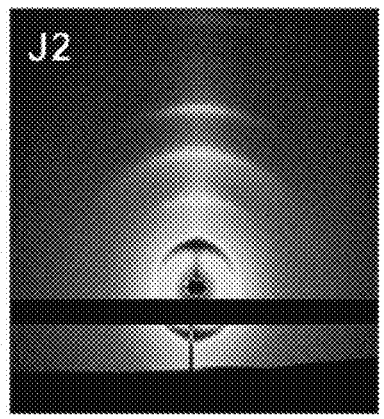
$N_{bb} = 125$, $d^* = 52.4$ nm
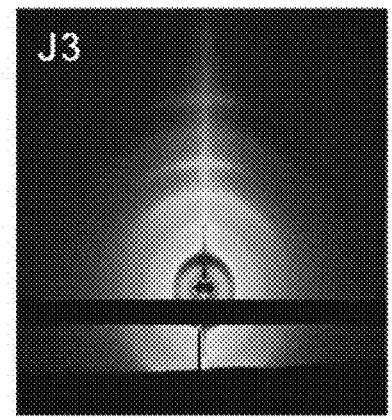
$N_{bb} = 152$, $d^* = 62.6$ nm
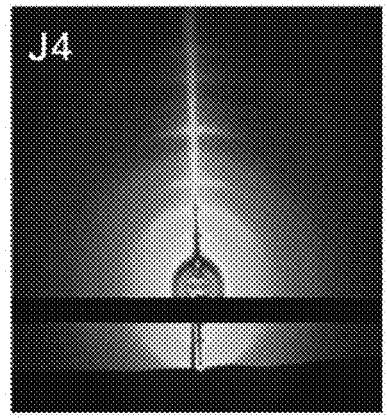
$N_{bb} = 198$, $d^* = 76.0$ nm
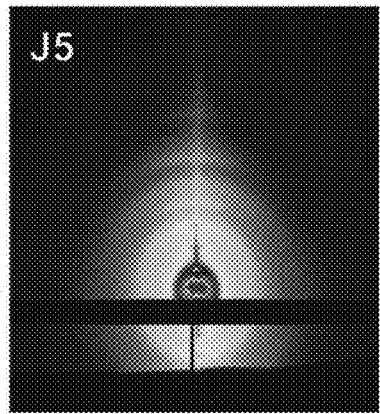
$N_{bb} = 246$, $d^* = 92.0$ nm
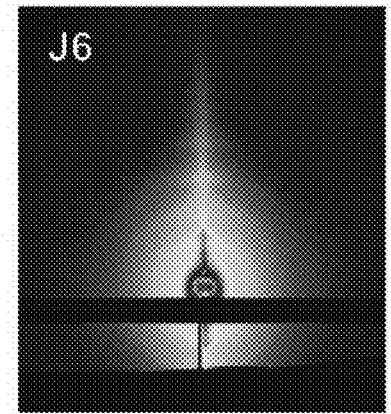
FIG. 77J

System II, $z = 0.50$
$N_{bb} = 135$, $d^* = 43.0$ nm
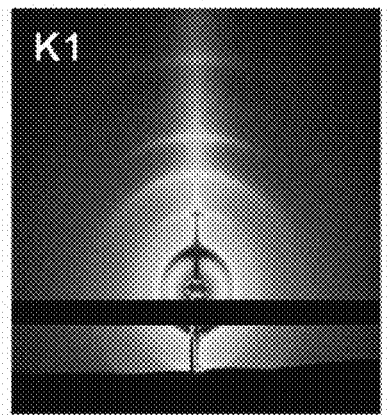
$N_{bb} = 174$, $d^* = 52.8$ nm
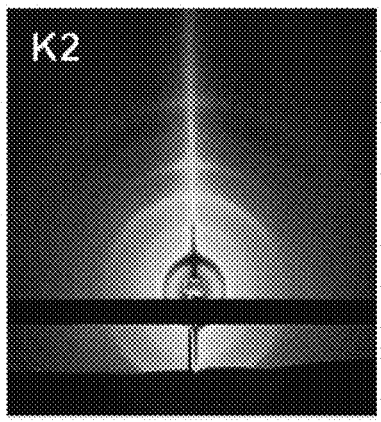
$N_{bb} = 213$, $d^* = 62.2$ nm
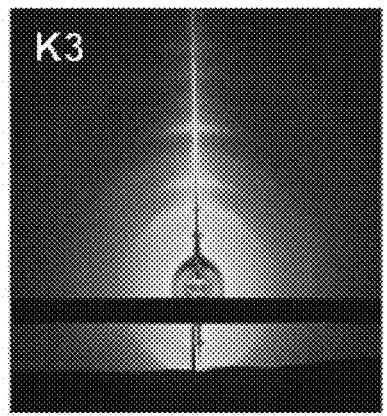
$N_{bb} = 254$, $d^* = 70.2$ nm
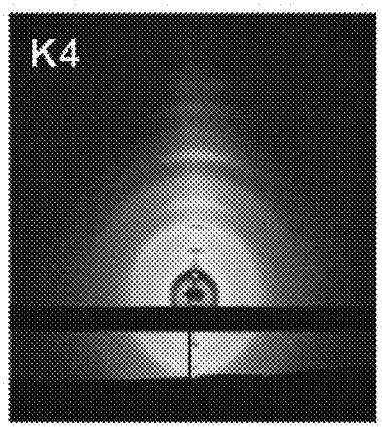
$N_{bb} = 285$, $d^* = 78.0$ nm
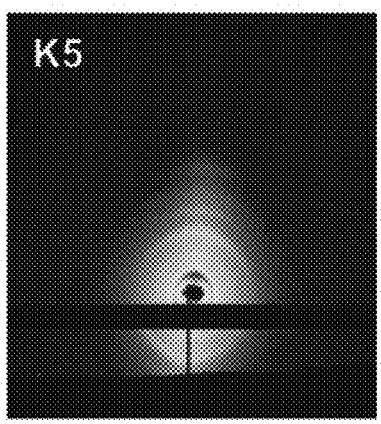
$N_{bb} = 325$, $d^* = 85.7$ nm
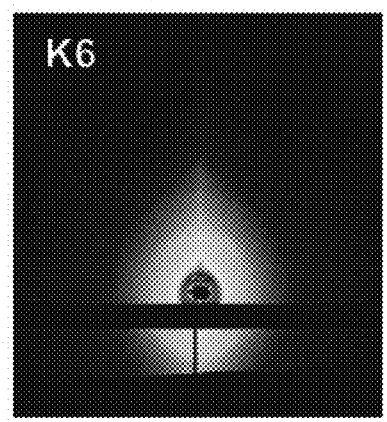
FIG. 77K

System II, z = 0.35
$N_{bb} = 174$, $d^* = 46.5$ nm  $N_{bb} = 221$, $d^* = 55.0$ nm  $N_{bb} = 263$, $d^* = 62.5$ nm
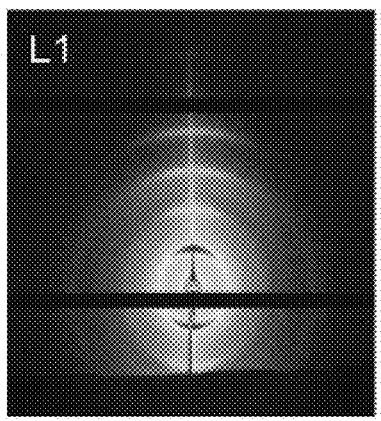 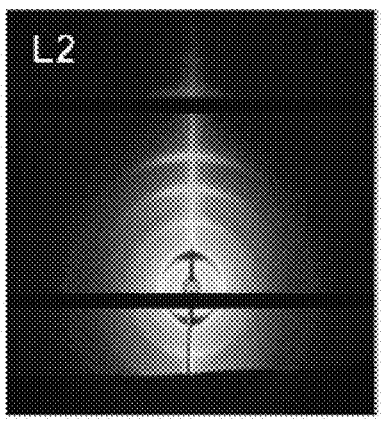 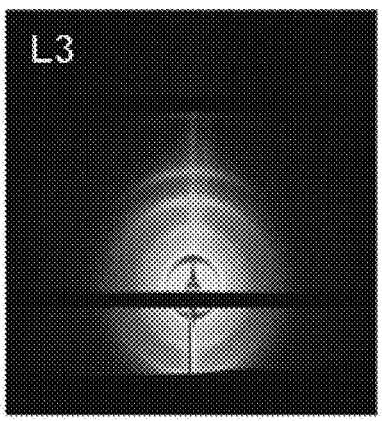
$N_{bb} = 314$, $d^* = 71.0$ nm  $N_{bb} = 341$, $d^* = 78.0$ nm  $N_{bb} = 388$, $d^* = 85.0$ nm
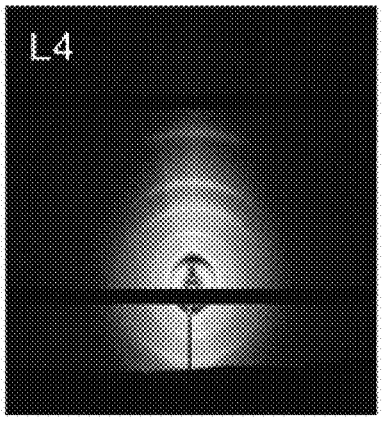 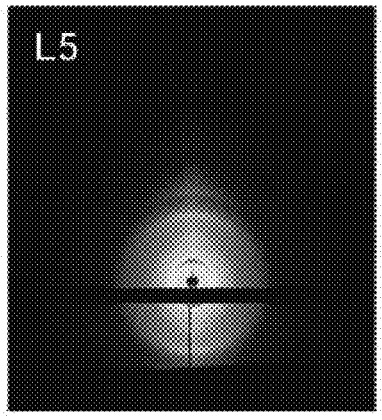 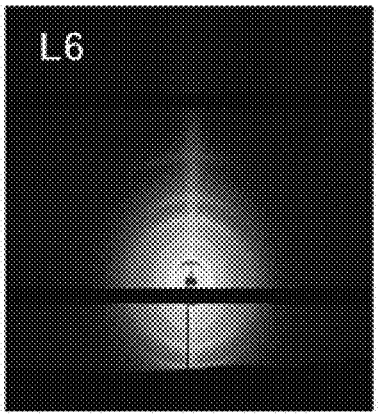
Note: L1–L2 exhibit minor HEX character (i.e., weak √7 peak). The presence of minor HEX is not expected to affect $d^*$.
FIG. 77L

System II, $z = 0.25$
$N_{bb} = 216$, $d^* = 42.6$ nm  $\quad N_{bb} = 258$, $d^* = 48.2$ nm  $\quad N_{bb} = 312$, $d^* = 54.1$ nm
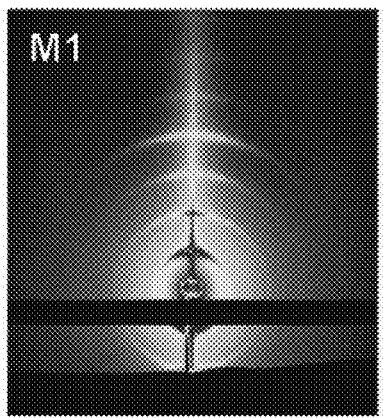 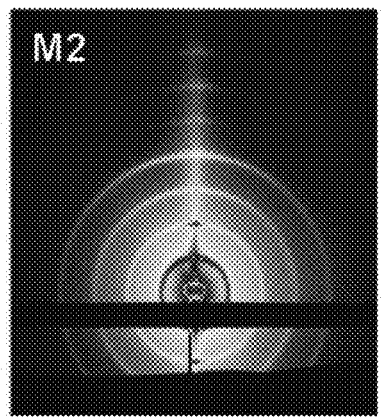 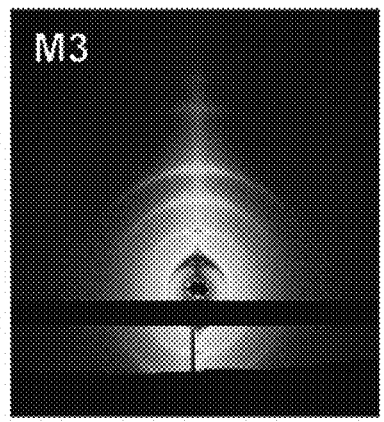
$N_{bb} = 358$, $d^* = 61.9$ nm  $\quad N_{bb} = 378$, $d^* = 64.0$ nm  $\quad N_{bb} = 439$, $d^* = 71.4$ nm
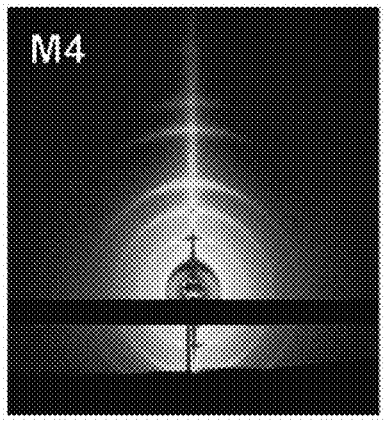 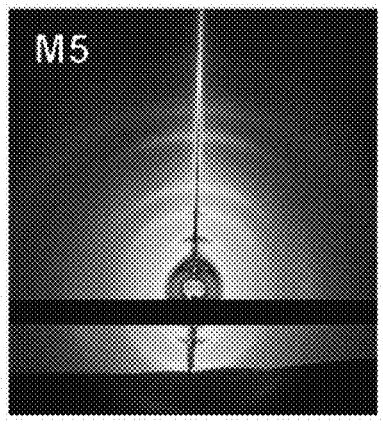 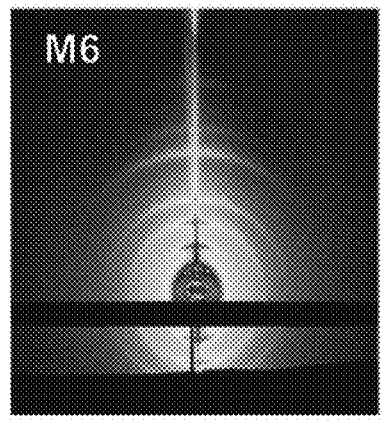
FIG. 77M

System II, $z = 0.15$
$N_{bb} = 129$, $d^* = 24.0$ nm 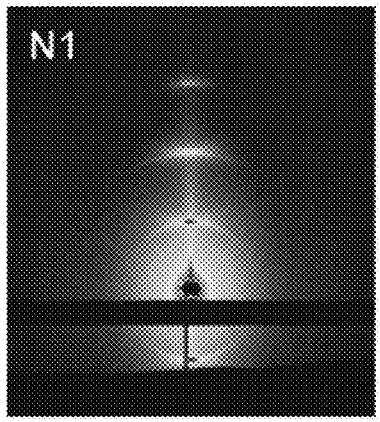
$N_{bb} = 212$, $d^* = 32.8$ nm 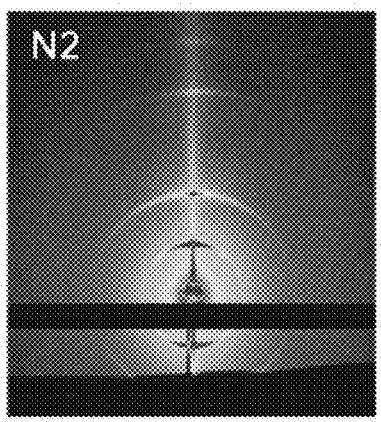
$N_{bb} = 253$, $d^* = 37.5$ nm 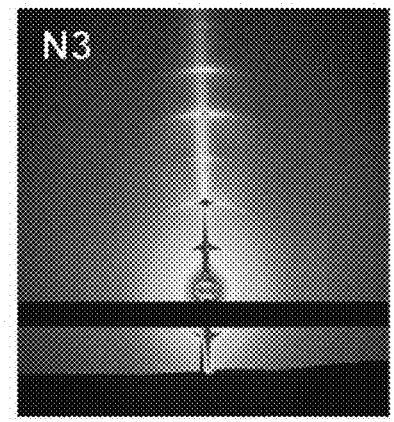
$N_{bb} = 279$, $d^* = 41.5$ nm 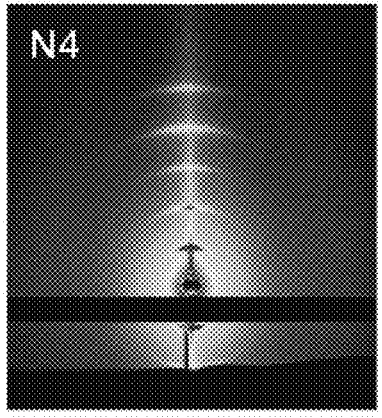
$N_{bb} = 329$, $d^* = 46.6$ nm 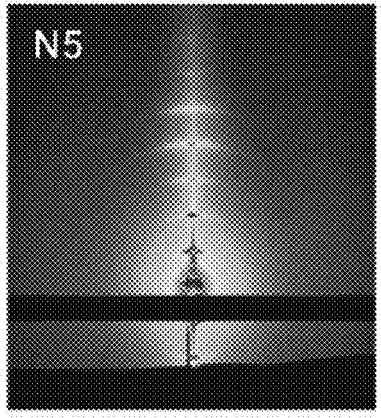
$N_{bb} = 392$, $d^* = 51.8$ nm 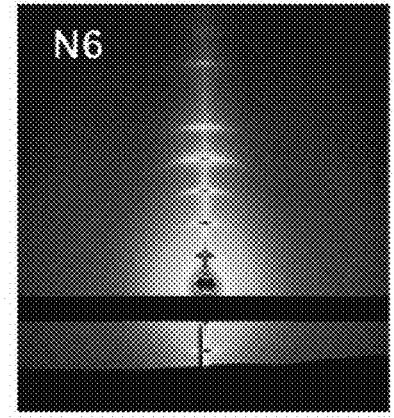
FIG. 77N

System II, $z = 0.12$
$N_{bb} = 224$, $d^* = 32.8$ nm
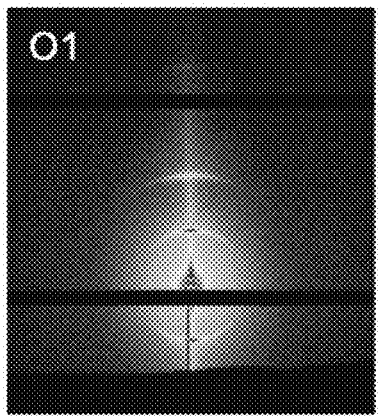
$N_{bb} = 274$, $d^* = 36.5$ nm
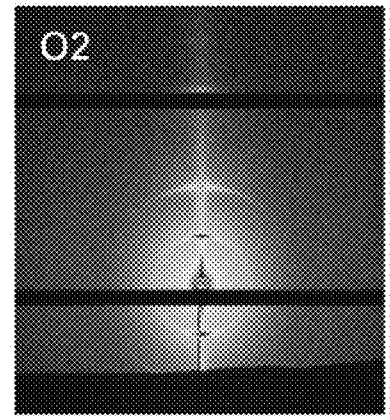
$N_{bb} = 330$, $d^* = 42.0$ nm
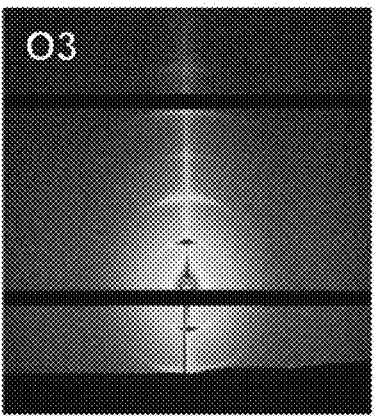
$N_{bb} = 370$, $d^* = 44.3$ nm
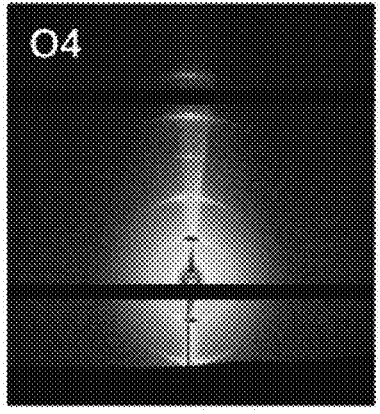
$N_{bb} = 409$, $d^* = 49.0$ nm
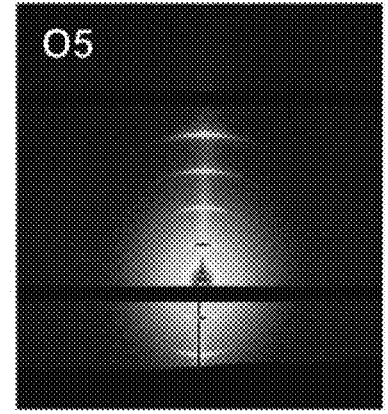
$N_{bb} = 451$, $d^* = 52.5$ nm
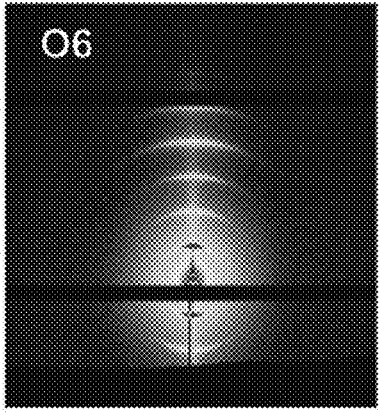
FIG. 77O

System II, $z = 0.06$
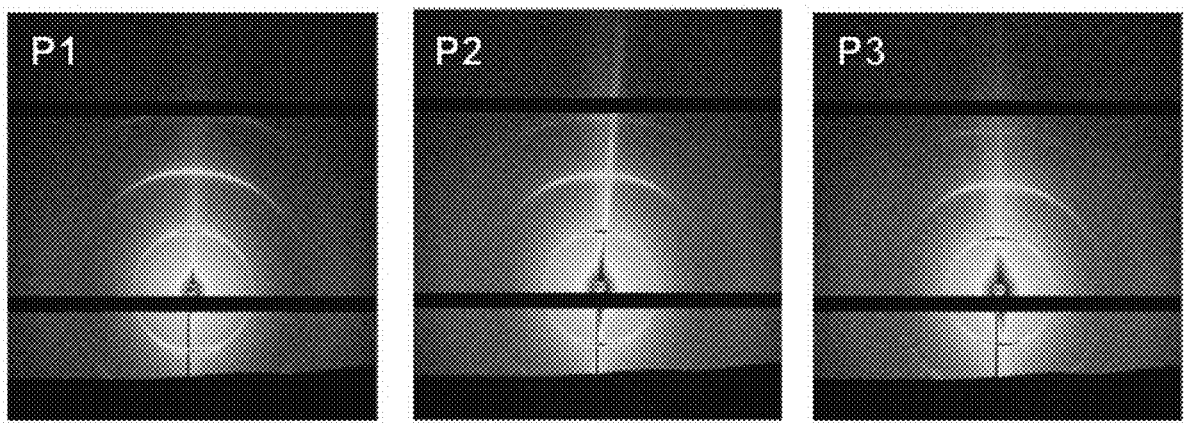
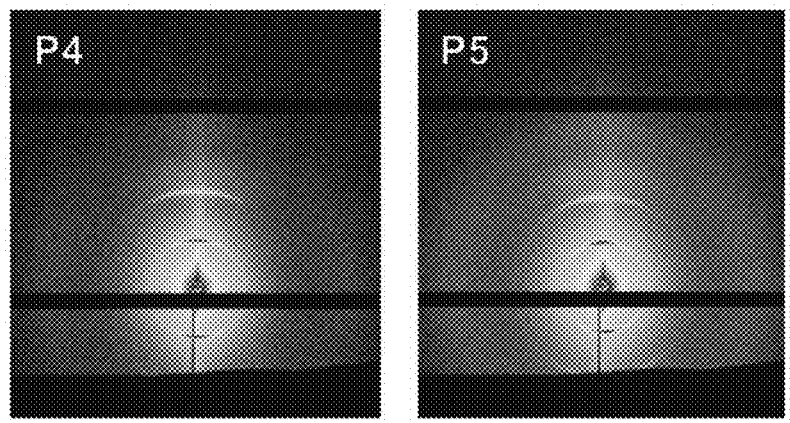
FIG. 77P

System II, z = 0.05
$N_{bb} = 337$, $d^* = 27.2$ nm
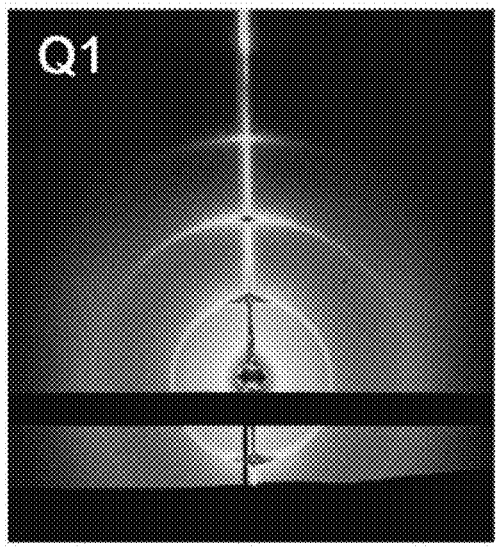
$N_{bb} = 376$, $d^* = 28.5$ nm
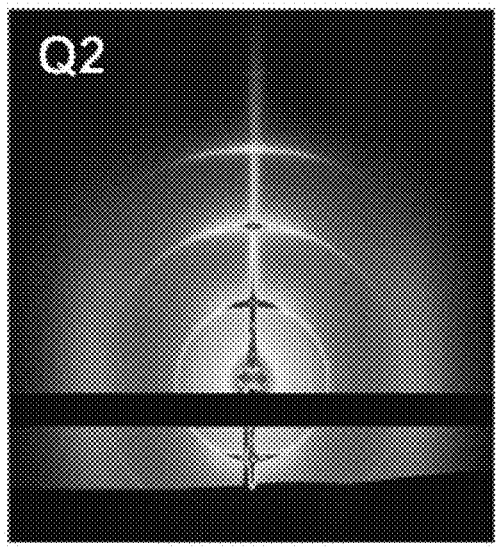
$N_{bb} = 408$, $d^* = 30.0$ nm
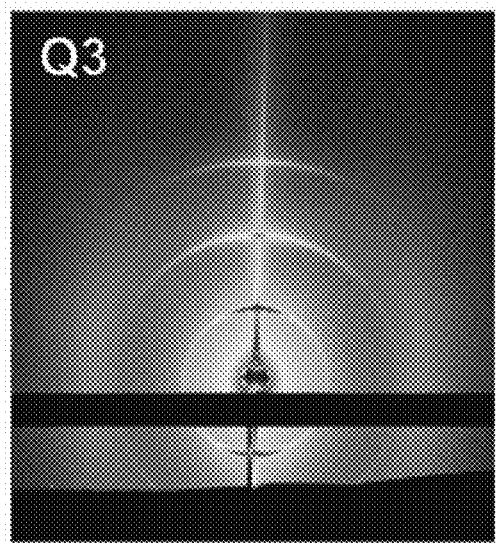
$N_{bb} = 451$, $d^* = 31.5$ nm
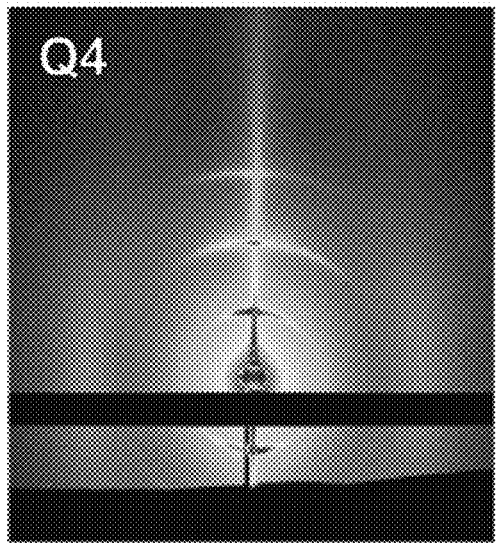
FIG. 77Q

CONTROL OF POLYMER ARCHITECTURES BY LIVING RING-OPENING METATHESIS COPOLYMERIZATION

CROSS-REFERENCE TO RELATED APPLICATIONS

This application claims the benefit of and priority to U.S. Provisional Application No. 62/467,925, filed Mar. 7, 2017, which is hereby incorporated in its entirety.

STATEMENT REGARDING FEDERALLY SPONSORED RESEARCH OR DEVELOPMENT

The invention described herein was made with government support under Grant No. DE-AR0000683/T-112546 awarded by the Department of Energy and under Grant No. CHE1502616 awarded by the National Science Foundation. The government has certain rights in the invention.

BACKGROUND OF INVENTION

Molecular architecture impacts the chemical and physical properties of all polymers. Achieving precise control over the chain connectivity, sequence, and symmetry presents synthetic challenges as well as rich opportunities for materials design. Over the past several decades, advances in controlled polymerization have enabled the synthesis of polymers with complex architectures. Graft copolymers are a class of polymer architectures featuring polymeric side chains attached to a polymeric backbone. The grafting density and distribution of grafts along the backbone influence the steric interactions between side chains and in turn influence the physical properties. Graft copolymers display many unique properties compared to their linear analogues, such as extended chain conformations, increased entanglement molecular weights, and architecture-dependent rheological behavior. Additionally, polymers having polymer blocks, such as graft block copolymers, provide platforms for forming useful materials for a wide range of applications, such as photonic materials. Due to their covalently linked yet chemically distinct blocks, block copolymers provide access to a wide range of periodic structures by balancing competing entropic and enthalpic demands. Precise control over polymer sequence and architecture is useful for both understanding structure-property relationships and designing such functional materials.

Despite the importance of grafting density and graft distribution, synthetic strategies that permit precise control of these parameters are currently limited. Grafting-to and grafting-from approaches may require multiple steps in which side chains are either attached to or grown from a pre-formed backbone. Steric congestion along the backbone typically prevents precise control over the molecular weight, grafting density, and side chain distribution. As a result, the synthesis of well-defined architectural variants—let alone materials with variable chemical compositions—is challenging.

Provided herein are a class of graft copolymer and methods for forming them which address these, and other, challenges. Provided herein are also useful functional materials comprising graft copolymers, and methods for forming these functional materials.

SUMMARY OF THE INVENTION

Provided herein are a class of copolymers and methods for making these copolymers. In an embodiment, for example, the invention provides versatile and deterministic methods for making highly tunable graft copolymers having one or more preselected properties. In an embodiment, for example, the invention provides versatile and deterministic methods for making highly tunable graft block copolymers having more than one polymer block at least one of which has one or more preselected properties In an embodiment, for example, the graft copolymers, or polymer block(s) thereof, of the present invention have a preselected graft density, preselected graft distribution, and/or preselected degree of polymerization. The methods and graft copolymers provided herein are compatible with a wide range of polymer side chains, functional groups, and polymer architectures. Also provided herein are self-assembled structures and methods for making the self-assembled structures. The highly tunable and deterministic nature of these graft copolymers and associated methods contributes to the high tunability and versatility of the self-assembled structures, and associated methods, of the present invention. In an embodiment, for example, the self-assembled structures are, or at least partially form, useful functional materials. For example, the self-assembled structures of the invention may be photonic crystals that are capable of, or are configured to, reflect at least a portion of wavelengths in the visible and infrared light range. In an embodiment, for example, methods for forming the self-assembled structures of the invention do not require high-energy or time intensive processes. In an embodiment, for example, the self-assembled structures of the present invention are formed by simple low-pressure annealing or low-temperature annealing. Useful applications of the self-assembled structures of the present invention include, but are not limited to, infrared light-reflecting coatings for windows.

In an aspect, a method of synthesizing a graft copolymer comprises a step of: copolymerizing a first macromonomer and a first reactive diluent; wherein said first macromonomer comprises a first backbone precursor directly or indirectly covalently linked to a first polymer side chain group; wherein said reactive diluent is provided in the presence of the first macromonomer at an amount selected so as to result in formation said graft copolymer having a first backbone incorporating said diluent and said first macromonomer in a first polymer block characterized by a preselected first graft density or a preselected first graft distribution of said first macromonomer.

In any embodiment of the methods of synthesizing a graft copolymer disclosed herein, said preselected first graft density may be any value selected from the range of 0.05 to 0.75. In other words, the diluent and macromonomer and the amount (concentrations) of these may be preselected so as to result in a preselected graft density that is any value in the range of 0.05 to 0.75, such that any graft density in said range is obtainable by the methods according this embodiment.

In any embodiment of the methods of synthesizing a graft copolymer disclosed herein, the composition and amount of said diluent may be selected to provide both a first preselected first graft density and a first preselected first graft distribution.

Graft copolymers having more than one polymer block (or, graft block copolymer) may be synthesized by some of the methods disclosed herein. Each of the more than one polymer blocks may be a graft copolymer itself, having a respective backbone and respective polymer side chains. At least one of the more than one polymer blocks of a graft (block) copolymer, synthesized according to a method of the present invention, may be a linear polymer block, having no branches. Some of the methods of the present invention allow for tuning each polymer block of the resulting graft (block) copolymer such that each polymer block is characterized by a respective graft density, graft distribution, and/or degree of polymerization. Thus, methods of the present invention are highly versatile.

In any embodiment of the methods of synthesizing a graft copolymer disclosed herein, the method may further comprise one or more additional copolymerization steps, so as to result in said graft copolymer having one or more additional polymer blocks directly or indirectly covalently linked to said first backbone of said first polymer block.

In any embodiment of the methods of synthesizing a graft copolymer disclosed herein, the method may further comprise a step of copolymerizing a second polymer block, said second polymer block having a second backbone; wherein said second backbone of said second polymer block is directly or indirectly covalently linked to said first backbone of said first polymer block.

In any embodiment of the methods of synthesizing a graft copolymer disclosed herein, the method may further comprise a step of copolymerizing a third polymer block, said third polymer block having a third backbone, wherein said third backbone of said third polymer block is directly or indirectly covalently linked to said first backbone of said first polymer block or to said second backbone of said second polymer block. In any embodiment of the methods of synthesizing a graft copolymer disclosed herein, said third polymer block may comprise one or more third polymer side chain groups, and wherein said third reactive diluent is provided in the presence of the third macromonomer at an amount selected so as to result in formation of said third polymer block characterized by a preselected third graft density or a preselected third graft distribution of said one or more third polymer side chain groups.

In any embodiment of the methods of synthesizing a graft copolymer disclosed herein, said graft copolymer may be a graft block copolymer and the method may further comprise a step of: copolymerizing a second macromonomer and a second reactive diluent; wherein said second macromonomer comprises a second backbone precursor directly or indirectly covalently linked to a second polymer side chain group; wherein said second reactive diluent is provided in the presence of the second macromonomer at an amount selected so as to result in formation said graft copolymer having a second backbone incorporating said second reactive diluent and said second macromonomer in a second polymer block characterized by a preselected second graft density or a preselected second graft distribution of said second macromonomer; wherein said first polymer block and said second polymer block are directly or indirectly covalently linked along said backbone.

In any embodiment of the methods of synthesizing a graft copolymer disclosed herein, said graft copolymer may be a graft block copolymer and the method may further comprise a step of: copolymerizing a second macromonomer and a second reactive diluent; wherein said second macromonomer comprises a second backbone precursor directly or indirectly covalently linked to a second polymer side chain group; thereby resulting in formation of said graft copolymer having a second backbone incorporating said second reactive diluent and said second macromonomer in a second polymer block; wherein said second polymer block is directly or indirectly covalently linked to said first polymer block along said backbone; and wherein said second polymer block has a different composition than said first polymer block. In a further embodiment, said second reactive diluent may be provided in the presence of the second macromonomer at an amount selected so as to result in said second polymer block being characterized by a preselected second graft density or a preselected second graft distribution of said second macromonomer. In a further embodiment, wherein said second polymer side chain group may be different from said first polymer side chain group. In a further embodiment, said second reactive diluent may be different from said first second reactive. In a further embodiment, the method may further comprise a step of copolymerizing a third polymer block, said third polymer block having a third backbone, wherein said third backbone of said third polymer block is directly or indirectly covalently linked to said first backbone of said first polymer block or to said second backbone of said second polymer block; wherein the composition of said third block is different from the composition said first polymer block, said second polymer block or both; and wherein said third polymer block comprises one or more third polymer side chain groups, and wherein said third reactive diluent is provided in the presence of the third macromonomer at an amount selected so as to result in formation of said third polymer block characterized by a preselected third graft density or a preselected third graft distribution of said one or more third polymer side chain groups.

In any embodiment of the methods of synthesizing a graft copolymer disclosed herein, said step of copolymerizing a first macromonomer and a first reactive diluent may be a grafting through copolymerization of said first macromonomer and first reactive diluent. In further embodiments, said grafting through copolymerization of said first macromonomer and first reactive diluent may be carried out via ring-opening metathesis polymerization.

In any embodiment of the methods of synthesizing a graft copolymer disclosed herein, said step of copolymerizing a second macromonomer and a second reactive diluent may be a grafting through copolymerization of said second macromonomer and second reactive diluent. In further embodiments, said grafting through copolymerization of said second macromonomer and second reactive diluent may be carried out via ring-opening metathesis polymerization.

In any embodiment of the methods of synthesizing a graft copolymer disclosed herein, said second polymer side chain group may be different from said first polymer side chain group.

Methods of the present invention allow for a wide range of preselected properties of a graft copolymer, or polymer block(s) thereof. The preselected properties include graft density, graft distribution, and degree of polymerization.

In any embodiment of the methods of synthesizing a graft copolymer disclosed herein, said first polymer block may have said preselected first graft density and said preselected first graft distribution of said first macromonomer.

In any embodiment of the methods of synthesizing a graft copolymer disclosed herein, said first graft density may be proportional to or equal to $[M^a_1]_0/([M^a_1]_0+[M^a_2]_0)$, where: $[M^a_1]_0$ and $[M^a_2]_0$ are initial concentrations of said first macromonomer and said first reactive diluent, respectively. In any embodiment of the methods of synthesizing a graft copolymer disclosed herein, said first graft density may be selected from the range of 0.01 to 0.99. In any embodiment of the methods of synthesizing a graft copolymer disclosed herein, said first graft density may be selected from the range of 0.05 to 0.75. In any embodiment of the methods of synthesizing a graft copolymer disclosed herein, said first graft density may be selected from the range of 0.05 to 0.32, 0.34 to 0.49, 0.51 to 0.65, or 0.68 to 0.75.

In any embodiment of the methods of synthesizing a graft copolymer disclosed herein, said first graft density may be equal to $[M^a{}_1]_0/([M^a{}_1]_0+[M^a{}_2]_0)$, where: $[M^a{}_1]_0$ and $[M^a{}_2]_0$ are initial concentrations of said first macromonomer and said first reactive diluent, respectively. In any embodiment of the methods of synthesizing a graft copolymer disclosed herein, said first graft density may be selected from the range of 0.01 to 0.99. In any embodiment of the methods of synthesizing a graft copolymer disclosed herein, said first graft density may be selected from the range of 0.05 to 0.75. In any embodiment of the methods of synthesizing a graft copolymer disclosed herein, said first graft density may be selected from the range of 0.05 to 0.32, 0.34 to 0.49, 0.51 to 0.65, or 0.68 to 0.75.

In any embodiment of the methods of synthesizing a graft copolymer disclosed herein, said first graft distribution may be an alternating graft distribution when $r^a{}_1$ is less than 1 and $r^a{}_2$ is less than 1; said first graft distribution may be a blocky graft distribution when $r^a{}_1$ is greater than 1 and $r^a{}_2$ is greater than 1; said first graft distribution may be a random graft distribution when $r^a{}_1$ is substantially equal to 1 and $r^a{}_2$ is substantially equal to 1; and said first graft distribution may be a gradient graft distribution when $r^a{}_1$ is less than 1 and $r^a{}_2$ is greater than 1; where: $r^a{}_1$ is a reactivity ratio of said first macromonomer; and $r^a{}_2$ is a reactivity ratio of said first reactive diluent.

In any embodiment of the methods of synthesizing a graft copolymer disclosed herein, said first graft distribution may be an alternating graft distribution when $r^a{}_1$ is substantially less than 1 and $r^a{}_2$ is substantially less than 1; said first graft distribution may be a blocky graft distribution when $r^a{}_1$ is substantially greater than 1 and $r^a{}_2$ is substantially greater than 1; said first graft distribution may be a random graft distribution when $r^a{}_1$ is substantially equal to 1 and $r^a{}_2$ is substantially equal to 1; and said first graft distribution may be a gradient graft distribution when $r^a{}_1$ is substantially less than 1 and $r^a{}_2$ is substantially greater than 1; where: $r^a{}_1$ is a reactivity ratio of said first macromonomer; and $r^a{}_2$ is a reactivity ratio of said first reactive diluent.

In any embodiment of the methods of synthesizing a graft copolymer disclosed herein, said first graft distribution may be an alternating graft distribution when $r^a{}_1$ is substantially less than 1 and $r^a{}_2$ is substantially less than 1; said first graft distribution may be a blocky graft distribution when $r^a{}_1$ is substantially greater than 1 and $r^a{}_2$ is substantially greater than 1; said first graft distribution may be a random graft distribution when $r^a{}_1$ is equal to 1 and $r^a{}_2$ is substantially to 1; and said first graft distribution may be a gradient graft distribution when $r^a{}_1$ is substantially less than 1 and $r^a{}_2$ is substantially greater than 1; where: $r^a{}_1$ is a reactivity ratio of said first macromonomer; and $r^a{}_2$ is a reactivity ratio of said first reactive diluent.

In any embodiment of the methods of synthesizing a graft copolymer disclosed herein, said step of copolymerizing said first macromonomer may be performed in the presence of a catalyst and first polymer block may have a preselected first degree of polymerization, said first degree of polymerization being proportional to or equal to $([M^a{}_1]_0+[M^a{}_2]_0)/[Cat]_0$; where: $[Cat]_0$ is an initial concentration of said catalyst.

In any embodiment of the methods of synthesizing a graft copolymer disclosed herein, said step of copolymerizing said first macromonomer may be performed in the presence of a catalyst and first polymer block may have a preselected first degree of polymerization, said first degree of polymerization being equal to $([M^a{}_1]_0+[M^a{}_2]_0)/[Cat]_0$; where: $[Cat]_0$ is an initial concentration of said catalyst.

As noted earlier, each polymer block of a graft copolymer synthesized by methods of the present invention may have respective preselected properties.

In any embodiment of the methods of synthesizing a graft copolymer disclosed herein, said second polymer block may have said preselected second graft density and said preselected second graft distribution of said first macromonomer.

In any embodiment of the methods of synthesizing a graft copolymer disclosed herein, said second graft density may be proportional to or equal to $[M^b{}_1]_0/([M^b{}_1]_0+[M^b{}_{d2}]_0)$, where: $[M^b{}_1]_0$ and $[M^b{}_2]_0$ are initial concentrations of said second macromonomer and said second reactive diluent, respectively.

In any embodiment of the methods of synthesizing a graft copolymer disclosed herein, said preselected second graft density may be any value selected from the range of 0.05 to 0.75. In any embodiment of the methods of synthesizing a graft copolymer disclosed herein, said second graft density may be selected from the range of 0.01 to 0.99. In any embodiment of the methods of synthesizing a graft copolymer disclosed herein, said second graft density may be selected from the range of 0.05 to 0.75. In any embodiment of the methods of synthesizing a graft copolymer disclosed herein, said first graft density may be selected from the range of 0.05 to 0.32, 0.34 to 0.49, 0.51 to 0.65, or 0.68 to 0.75.

In any embodiment of the methods of synthesizing a graft copolymer disclosed herein, said second graft distribution may be an alternating graft distribution when $r^b{}_1$ is less than 1 and $r^b{}_2$ is less than 1; said second graft distribution may be a blocky graft distribution when $r^b{}_1$ is greater than 1 and $r^b{}_2$ is greater than 1; said second graft distribution may be a random graft distribution when $r^b{}_1$ is substantially equal to 1 and $r^b{}_2$ is substantially equal to 1; and said second graft distribution may be a gradient graft distribution when $r^b{}_1$ is less than 1 and $r^b{}_2$ is greater than 1; where: $r^b{}_1$ is a reactivity ratio of said second macromonomer; and $r^b{}_2$ is a reactivity ratio of said second reactive diluent.

In any embodiment of the methods of synthesizing a graft copolymer disclosed herein, said second graft distribution may be an alternating graft distribution when $r^b{}_1$ is substantially less than 1 and $r^b{}_2$ is substantially less than 1; said second graft distribution may be a blocky graft distribution when $r^b{}_1$ is substantially greater than 1 and $r^b{}_2$ is substantially greater than 1; said second graft distribution may be a random graft distribution when $r^b{}_1$ is substantially equal to 1 and $r^b{}_2$ is substantially equal to 1; and said second graft distribution may be a gradient graft distribution when $r^b{}_1$ is substantially less than 1 and $r^b{}_2$ is substantially greater than 1; where: $r^b{}_1$ is a reactivity ratio of said second macromonomer; and $r^b{}_2$ is a reactivity ratio of said second reactive diluent.

In any embodiment of the methods of synthesizing a graft copolymer disclosed herein, said second graft distribution may be an alternating graft distribution when $r^b{}_1$ is substantially less than 1 and $r^b{}_2$ is substantially less than 1; said second graft distribution may be a blocky graft distribution when $r^b{}_1$ is substantially greater than 1 and $r^b{}_2$ is substantially greater than 1; said second graft distribution may be a random graft distribution when $r^b{}_1$ is equal to 1 and $r^b{}_2$ is equal to 1; and said second graft distribution may be a gradient graft distribution when $r^b{}_1$ is substantially less than 1 and $r^b{}_2$ is substantially greater than 1; where: $r^b{}_1$ is a reactivity ratio of said second macromonomer; and $r^b{}_2$ is a reactivity ratio of said second reactive diluent.

In any embodiment of the methods of synthesizing a graft copolymer disclosed herein, said step of copolymerizing said second macromonomer may be performed in the presence of a catalyst, and the second polymer block may have a preselected second degree of polymerization, said second degree of polymerization being proportional to or equal to $([M^b_1]_0+[M^b_2]_0)/[Cat]_0$; where: $[Cat]_0$ is an initial concentration of said catalyst.

Additionally, methods of the present invention allow for synthesizing graft copolymers with a low mass dispersity (low polydispersity index), which presents a number of benefits for applications in which the graft copolymers are used.

In any embodiment of the methods of synthesizing a graft copolymer disclosed herein, a polydispersity index of said graft copolymer may be selected from the range of 1.00 to 1.30. In any embodiment of the methods of synthesizing a graft copolymer disclosed herein, a polydispersity index of said graft copolymer may be selected from the range of 1.00 to 1.20. In any embodiment of the methods of synthesizing a graft copolymer disclosed herein, a polydispersity index of said graft copolymer may be selected from the range of 1.00 to 1.10.

A wide range of diluents and a wide range of macromonomers are compatible with methods of the present invention for synthesizing graft copolymers. Thus, the graft copolymers of the present invention may have a variety of chemical structures and so a broad set of properties and functionalities that are derived from the obtainable chemical structures of the graft copolymers.

In any embodiment of the methods of synthesizing a graft copolymer disclosed herein, said first macromonomer may comprise said first backbone precursor group, one or more anchor groups each covalently linked to said first backbone precursor group, optionally one or more linker groups each covalently linked to an anchor group, and one or more of said first polymer side chain group each covalently linked to an anchor group or a linker group.

In any embodiment of the methods of synthesizing a graft copolymer disclosed herein, said first reactive diluent may comprise said first backbone precursor group, one or more anchor groups each covalently linked to said first backbone precursor group, optionally one or more linker groups each covalently linked to an anchor group, and one or more diluent groups each covalently linked to an anchor group or a linker group.

In any embodiment of the methods of synthesizing a graft copolymer disclosed herein, said second macromonomer may comprise said second backbone precursor group, one or more anchor groups each covalently linked to said second backbone precursor group, optionally one or more linker groups each covalently linked to an anchor group, and one or more of said second polymer side chain group each covalently linked to an anchor group or a linker group.

In any embodiment of the methods of synthesizing a graft copolymer disclosed herein, said second reactive diluent may comprise said second backbone precursor group, one or more anchor groups each covalently linked to said first backbone precursor group, optionally one or more linker groups each covalently linked to an anchor group, and one or more diluent groups each covalently linked to an anchor group or a linker group.

In any embodiment of the methods of synthesizing a graft copolymer disclosed herein, said first reactive diluent may be defined by the formula (FX1a), (FX1b), or (FX1c):

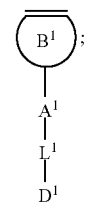
(FX1a)

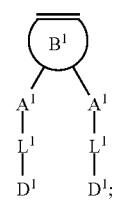
(FX1b)

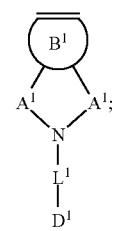
(FX1c)

where:
$B_1$ is said first or said second backbone precursor group having a strained olefin; each $A^1$ is independently an anchor group having the formula (FX3a) or (FX3b):

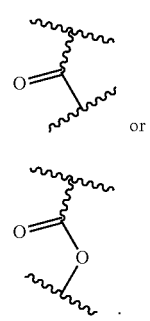
(FX3a)

or (FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_{1-10}$ alkoxy, $C_1$-$C_{10}$ acyl, triazole, diazole, pyrazole, and any combination thereof; and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the methods of synthesizing a graft copolymer disclosed herein, said second reactive diluent may be defined by the formula (FX1a), (FX1b), or (FX1c):

(FX1a)

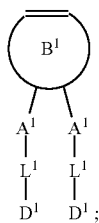
(FX1b)

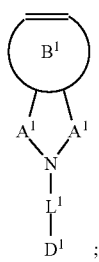
(FX1c)

where:
B₁ is said first or said second backbone precursor group having a strained olefin; each $A^1$ is independently an anchor group having the formula (FX3a) or (FX3b):

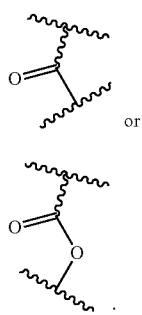
(FX3a)

or (FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the methods of synthesizing a graft copolymer disclosed herein, each of said first reactive diluent and said second reactive diluent independently may be defined by the formula (FX1a), (FX1b), or (FX1c):

(FX1a)

(FX1b)

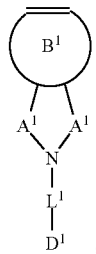
(FX1c)

where: B1 is said first or said second backbone precursor group having a strained olefin; each $A^1$ is independently an anchor group having the formula (FX3a) or (FX3b):

(FX3a)

or (FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the methods of synthesizing a graft copolymer disclosed herein, said first diluent may be defined by the formula (FX5):

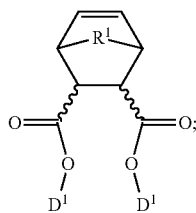

(FX5)

where: $R^1$ is —$CH_2$—, —$C_2H_4$—, —NH—, or —O—; and each $D^1$ is independently a $C_1$-$C_4$ alkyl dangling group.

In any embodiment of the methods of synthesizing a graft copolymer disclosed herein, said second diluent may be defined by the formula (FX5):

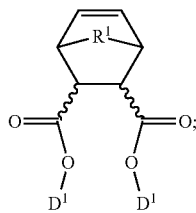

(FX5)

where: $R^1$ is —$CH_2$—, —$C_2H_4$—, —NH—, or —O—; and each $D^1$ is independently a $C_1$-$C_4$ alkyl dangling group.

In any embodiment of the methods of synthesizing a graft copolymer disclosed herein, each of said first diluent and said second diluent independently may be defined by the formula (FX5):

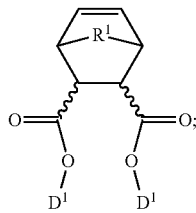

(FX5)

where $R^1$ is —$CH_2$—, —$C_2H_4$—, —NH—, or —O—; and each $D^1$ is independently a $C_1$-$C_4$ alkyl dangling group.

In any embodiment of the methods of synthesizing a graft copolymer disclosed herein, said first macromonomer may be defined by the formula (FX6a), (FX6b), or (FX6c):

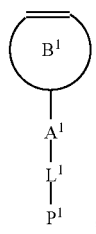

(FX6a)

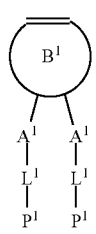

(FX6b)

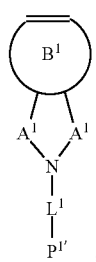

(FX6c)

where: $B_1$ is said first or said second backbone precursor group having a strained olefin; each $A^1$ is independently an anchor group having the formula (FX3a) or (FX3b):

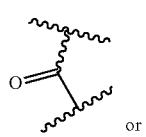

(FX3a)

or

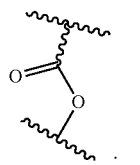

(FX3b)

each L' is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $P^1$ is independently said first or said second polymer side chain group.

In any embodiment of the methods of synthesizing a graft copolymer disclosed herein, said second macromonomer may be defined by the formula (FX6a), (FX6b), or (FX6c):

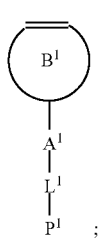

(FX6a)

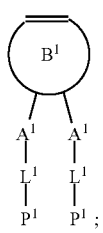

(FX6b)

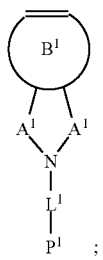

(FX6c)

where: $B_1$ is said first or said second backbone precursor group having a strained olefin; each $A^1$ is independently an anchor group having the formula (FX3a) or (FX3b):

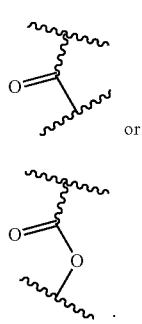

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $P^1$ is independently said first or said second polymer side chain group.

In any embodiment of the methods of synthesizing a graft copolymer disclosed herein, each of said first macromonomer and said second macromonomer independently may be defined by the formula (FX6a), (FX6b), or (FX6c):

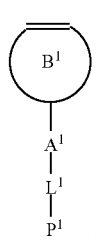

(FX6a)

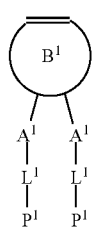

(FX6b)

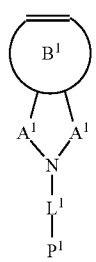

(FX6c)

where: $B_1$ is said first or said second backbone precursor group having a strained olefin; each $A^1$ is independently an anchor group having the formula (FX3a) or (FX3b):

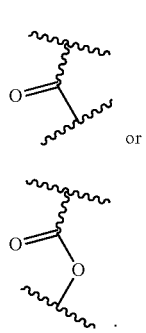

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $P^1$ is independently said first or said second polymer side chain group.

In any embodiment of the methods of synthesizing a graft copolymer disclosed herein, $B^1$ connected to one or more $A^1$ may have the formula (FX4a), (FX4b), or (FX4c):

(FX4a)

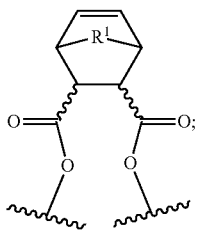

(FX4b)

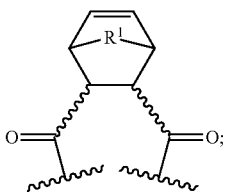

(FX4c)

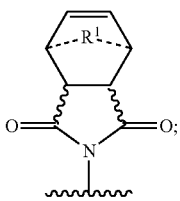

where:

R¹ is selected from the group consisting of —CH₂—, —C₂H₄—, —NH—, and —O—.

In any embodiment of the methods of synthesizing a graft copolymer disclosed herein, each $L^1$ independently may be defined by the formula (FX5a), (FX5b), (FX5c), or any combination thereof:

(FX5a)

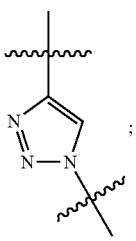

(FX5b)

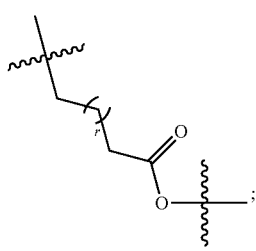

(FX5c)

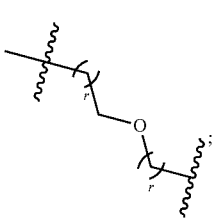

wherein r is 0 or an integer selected from the range of 1 to 5.

In any embodiment of the methods of synthesizing a graft copolymer disclosed herein, each $P^1$ independently may be defined by the formula (FX6a), (FX6b), (FX6c), or (FX6d):

(FX6a)

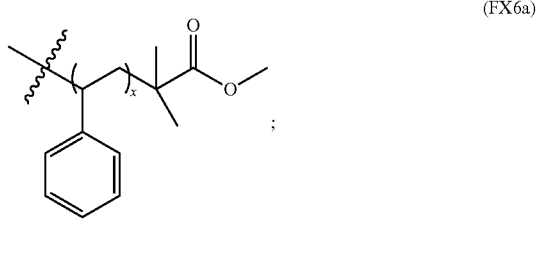

(FX6b)

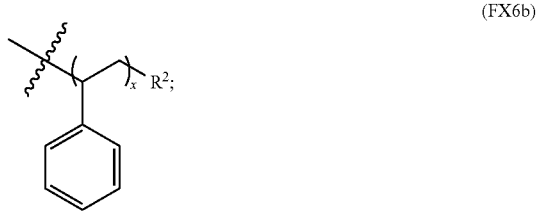

(FX6c)

(FX6d)

wherein x is an integer selected from the range of 10 to 100; wherein $R^2$ is a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the methods of synthesizing a graft copolymer disclosed herein, said first macromonomer may be defined by the formula (FX7a), (FX7b), or (FX7c):

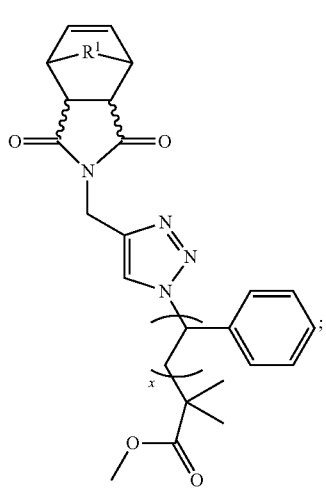

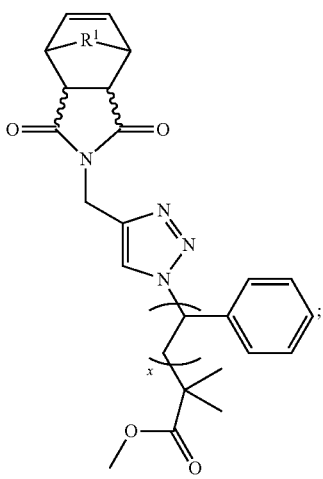

where: $R^1$ is selected from the group consisting of —$CH_2$—, —$C_2H_4$—, —NH—, and —O—; $R^2$ is a hydrogen or $C_1$-$C_5$ alkyl; and x is an integer selected from the range of 10 to 100.

In any embodiment of the methods of synthesizing a graft copolymer disclosed herein, said second macromonomer may be defined by the formula (FX7a), (FX7b), or (FX7c):

where: $R^1$ is selected from the group consisting of —$CH_2$—, —$C_2H_4$—, —NH—, and —O—; $R^2$ is a hydrogen or $C_1$-$C_5$ alkyl; and x is an integer selected from the range of 10 to 100.

In any embodiment of the methods of synthesizing a graft copolymer disclosed herein, each of said first macromonomer and said second macromonomer independently may be defined by the formula (FX7a), (FX7b), or (FX7c):

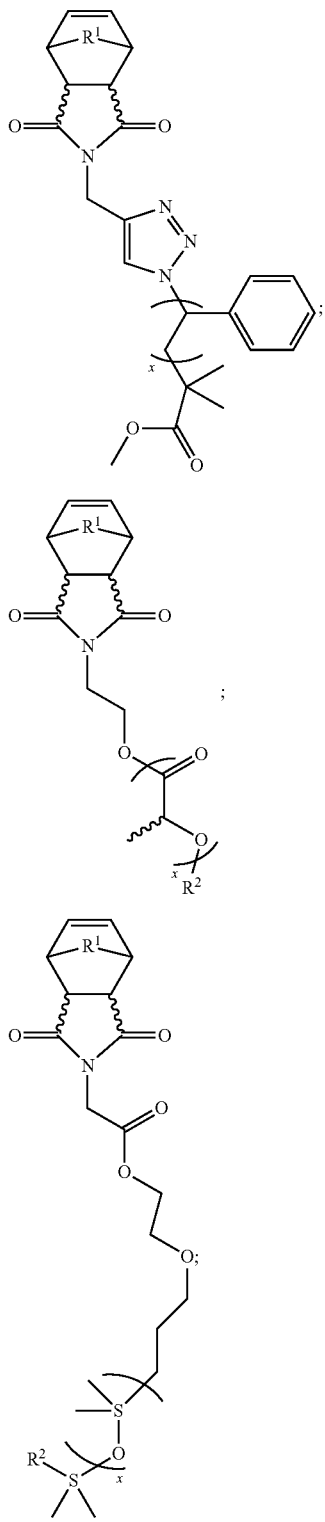

where: R¹ is selected from the group consisting of —CH₂—, —C₂H₄—, —NH—, and —O—; R² is a hydrogen or C₁-C₅ alkyl; and x is an integer selected from the range of 10 to 100.

Methods of the present invention are compatible with a broad range of catalysts, solvents, and temperature, for example, which may be selected to synthesize a desired graft copolymer according to methods disclosed herein.

In any embodiment of the methods of synthesizing a graft copolymer disclosed herein, said catalyst may be a fast initiating catalyst. In any embodiment of the methods of synthesizing a graft copolymer disclosed herein, said catalyst may be a Grubbs' catalyst. In any embodiment of the methods of synthesizing a graft copolymer disclosed herein, said catalyst may be a third-generation Grubbs' catalyst ("G3").

In any embodiment of the methods of synthesizing a graft copolymer disclosed herein, said step of copolymerizing may be performed in the presence of a solvent selected from the group consisting of dichloromethane, dichloroethane, tetrahydrofuran, benzene, toluene, water, ethyl acetate, N,N-dimethylformamide, ethyl acetate, and any combination thereof. In any embodiment of the methods of synthesizing a graft copolymer disclosed herein, said steps of copolymerizing may be performed in the presence of a solvent selected from the group consisting of dichloromethane, dichloroethane, tetrahydrofuran, benzene, toluene, water, ethyl acetate, N,N-dimethylformamide, ethyl acetate, and any combination thereof.

In any embodiment of the methods of synthesizing a graft copolymer disclosed herein, said step of copolymerizing may be performed at a temperature selected from the range of −80° C. to 80° C. In any embodiment of the methods of synthesizing a graft copolymer disclosed herein, said steps of copolymerizing may be performed at a temperature selected from the range of −80° C. to 80° C. In any embodiment of the methods of synthesizing a graft copolymer disclosed herein, said step of copolymerizing may be performed at a temperature selected from the range of 0° C. to 30° C. In any embodiment of the methods of synthesizing a graft copolymer disclosed herein, said steps of copolymerizing may be performed at a temperature selected from the range of 0° C. to 30° C.

In an aspect, a method of synthesizing a graft copolymer comprises the steps of: copolymerizing a first macromonomer and a first reactive diluent; wherein said first macromonomer comprises a first backbone precursor directly or indirectly covalently linked to a first polymer side chain group; wherein said copolymerization is a grafting through copolymerization of said first macromonomer and first reactive diluent so as to result in formation said graft copolymer having a first polymer block incorporating said diluent and said first macromonomer and characterized by a first graft density and a first graft distribution of said first macromonomer. In an embodiment of this aspect: (i) said grafting through copolymerization step is carried out via ring-opening metathesis polymerization; and/or (ii) said first reactive diluent is provided in the presence of the first macromonomer at an amount selected so as to result in formation said graft copolymer having said first backbone incorporating said diluent and said first macromonomer in a first polymer block characterized by a preselected first graft density or a preselected first graft distribution of said first macromonomer; and/or (iii) said graft copolymer is a graft block copolymer, and said method further comprises a step of: copolymerizing a second macromonomer and a second reactive diluent; wherein said second macromonomer comprises a second backbone precursor directly or indirectly covalently linked to a second polymer side chain group, thereby resulting in formation said graft copolymer having a second backbone incorporating said second reactive diluent and said second macromonomer in a second polymer block; wherein said second polymer block is directly or indirectly covalently linked to said first polymer block along said backbone; and wherein said second polymer block has a different composition than said first polymer block.

In some embodiments, methods of the present invention may produce any graft copolymer described below.

Provided herein are also graft copolymers, the obtainable properties and parameters of which are highly versatile and tunable.

In an aspect, a graft copolymer comprises a first polymer block comprising at least 10 first repeating units; each of said first repeating units comprising a first polymer backbone group and directly or indirectly covalently linked to a first polymer side chain group; wherein said first polymer block further comprises a first diluent group incorporated into a first backbone of said first polymer block and provided in an amount such that said first polymer block is characterized by a preselected first graft density or a preselected first graft distribution of said first repeating units.

In any embodiment of the graft copolymers disclosed herein, said preselected first graft density may be any value selected from the range of 0.05 to 0.75. In other words, any graft density in said range is obtainable for the graft copolymers of these embodiments.

In any embodiment of the graft copolymers disclosed herein, said first polymer block may be characterized by a preselected first graft density and a preselected first graft distribution of said first repeating units.

Graft copolymers of the present invention may have more than one polymer block. Each of the more than one polymer blocks may be a graft copolymer itself, having a respective backbone and respective polymer side chains. At least one of the more than one polymer blocks of a graft (block) copolymer having no branches. Properties of each polymer block of a graft (block) copolymer may be tunable such that each polymer block is characterized by a respective graft density, graft distribution, and/or degree of polymerization.

In any embodiment of the graft copolymers disclosed herein, the graft copolymer may further comprise one or more additional polymer blocks directly or indirectly covalently linked to said first backbone of said first polymer block.

In any embodiment of the graft copolymers disclosed herein, the graft copolymer may further comprise a second polymer block, said second polymer block having a second backbone; wherein said second backbone of said second polymer block is directly or indirectly covalently linked to said first backbone of said first polymer block.

In any embodiment of the graft copolymers disclosed herein, the graft copolymer may further comprise a third polymer block, said third polymer block having a third backbone, wherein said third backbone of said third polymer block is directly or indirectly covalently linked to said first backbone of said first polymer block or to said second backbone of said second polymer block.

In any embodiment of the graft copolymers disclosed herein, said third polymer block may comprise one or more third polymer side chain groups, and wherein said third polymer block is characterized by a preselected third graft density or a preselected third graft distribution of said one or more third polymer side chain groups.

In any embodiment of the graft copolymers disclosed herein, said graft copolymer may be a graft block copolymer; said graft block copolymer further comprising: a second polymer block comprising at least 10 second repeating units; each of said second repeating unit comprising a second polymer backbone group directly or indirectly covalently linked to a second polymer side chain group; wherein said second polymer block has a second backbone directly or indirectly covalently linked to said first backbone of said first polymer block; and wherein said second polymer block further comprises a second diluent group incorporated into said second backbone of said second polymer block and provided in an amount such that said second polymer block is characterized by a preselected second graft density or a preselected second distribution of said second repeating units.

In any embodiment of the graft copolymers disclosed herein, said second polymer side chain group may be different from said first polymer side chain group.

In any embodiment of the graft copolymers disclosed herein, said second polymer backbone group may be different from said first polymer backbone group.

In any embodiment of the graft copolymers disclosed herein, said second polymer block may be characterized by a preselected second graft density and a preselected second distribution of said second repeating units.

The graft copolymers of the present invention may have a variety of chemical structures, from the chemistry of an individual polymer block to the arrangement of the polymer blocks in a graft copolymer. Thus a broad set of properties and functionalities that are derived from the obtainable chemical structures and arrangements of the graft copolymers In any embodiment of the graft copolymers disclosed herein, the graft copolymer may be defined by the formula $Q^1\text{-}[G^1]_g\text{-}[H^1]_h\text{-}Q^2$, where:

$G^1$ is said first polymer block having the formula (FX20a), (FX20b), (FX20c), or (FX20d):

$[(A')_m\text{-}(B')_n]$ (FX20a); $[(B')_n\text{-}(A')_m]$ (FX20b); $[(A')_m\text{-}(B')_n\text{-}(A')_x]$ (FX20d); $[(B')_n\text{-}(A')_m\text{-}(B')_y]$ (FX20d);

$H^1$ is said second polymer block having the formula (FX30a), (FX30b), (FX30c), or (FX30d):

$[(A'')_q\text{-}(B'')_s]$ (FX30a); $[(B'')_s\text{-}(A'')_q]$ (FX30b); $[(A'')_q\text{-}(B'')_s\text{-}(A'')_u]$ (FX30c); $[(B'')_s\text{-}(A'')_q\text{-}(B'')_v]$ (FX30d);

A' is said first repeating unit; B' is a first diluent group; A" is said second repeating unit; B" is a second diluent group; $Q^1$ is a first polymer block terminating group; $Q^2$ is a second polymer block terminating group; g is a degree of polymerization of said first polymer block, and g is an integer selected from the range of 10 to 1000; h is a degree of polymerization of said second polymer block, and h is an integer selected from the range of 10 to 1000; each of m and q is independently an integer selected from the range of 10 to 999; each of n and s is independently an integer selected from the range of 1 to 990; each of x and y is independently an integer equal to (g-m-n); and each of u and v is independently an integer equal to (h-q-s); wherein the formulas (FX20a), (FX20b), (FX20c), and (FX20d) indicate amounts of A' and B' which can have any distribution within $G^1$, and wherein the formulas (FX30a), (FX30b), (FX30c), and (FX30d) indicate amounts of A" and B" which can have any distribution within $H^1$.

In any embodiment of the graft copolymers disclosed herein, each of said first repeating units (e.g., A') may be defined by the formula (FX10a), (FX10b), (FX10c), (FX11d), (FX11e), (FX11f), (FX11g), (FX11h), or (FX11i):

(FX10a)
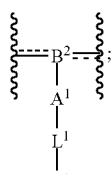

(FX10b)
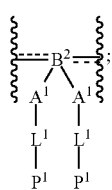

(FX10c)
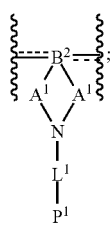

(FX11d)
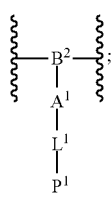

(FX11e)
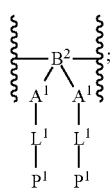

(FX11f)
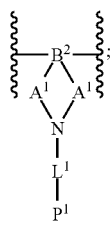

(FX11g)
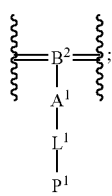

(FX11h)
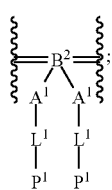

-continued (FX11i)
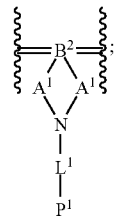

where: $B^2$ is said first or said second backbone precursor group having a strained olefin; each $A^1$ is independently an anchor group having the formula (FX3a) or (FX3b):

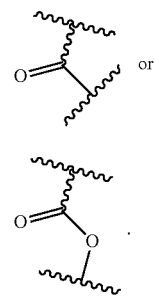

(FX3a)

(FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $P^1$ is independently said first or said second polymer side chain group.

In any embodiment of the graft copolymers disclosed herein, each of said second repeating units (e.g., A″) may be defined by the formula (FX10a), (FX10b), (FX10c), (FX11d), (FX11e), (FX11f), (FX11g), (FX11h), or (FX11i):

(FX10a)
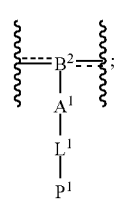

(FX10b)
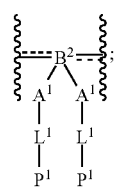

(FX10c)
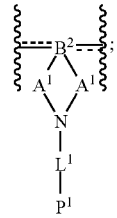

-continued (FX11d)
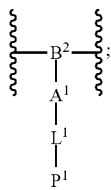

(FX11e)
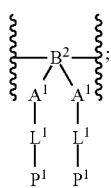

(FX11f)
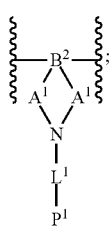

(FX11g)
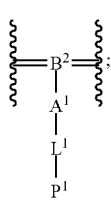

(FX11h)
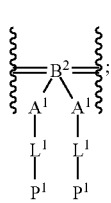

(FX11i)
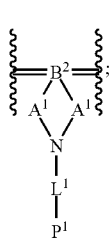

where: $B^2$ is said first or said second backbone precursor group having a strained olefin; each $A^1$ is independently an anchor group having the formula (FX3a) or (FX3b):

(FX3a)
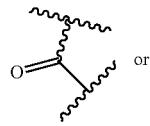
or (FX3b)
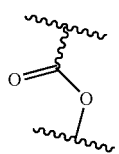

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $P^1$ is independently said first or said second polymer side chain group.

In any embodiment of the graft copolymers disclosed herein, each of said first repeating units, said second repeating units or both is independently may be defined by the formula (FX10a), (FX10b), (FX10c), (FX11d), (FX11e), (FX11f), (FX11g), (FX11h), or (FX11i):

(FX10a)
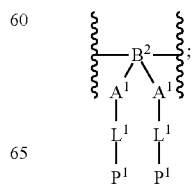

(FX10b)
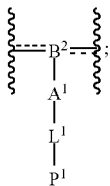

(FX10c)
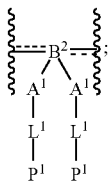

(FX11d)
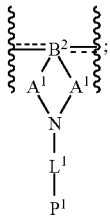

(FX11e)
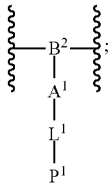

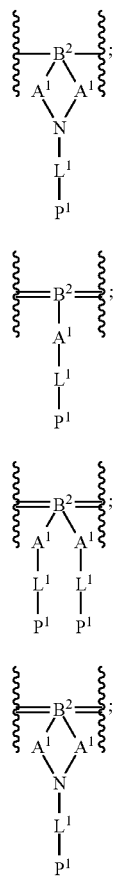
(FX11f)

(FX11g)

(FX11h)

(FX11i)

where: $B^2$ is said first or said second backbone precursor group having a strained olefin; each $A^1$ is independently an anchor group having the formula (FX3a) or (FX3b):

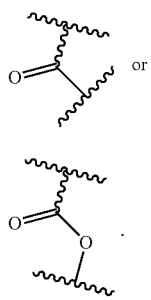
(FX3a)

or (FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $P^1$ is independently said first or said second polymer side chain group.

In any embodiment of the graft copolymers disclosed herein, said first diluent group (e.g., B') (e.g., when incorporated into a polymer backbone) may be defined by the formula (FX11a), (FX11b), (FX11c), (FX11d), (FX11e), (FX11f), (FX11g), (FX11h), or (FX11i):

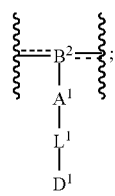
(FX11a)

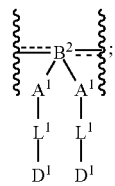
(FX11b)

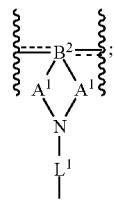
(FX11c)

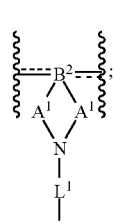
(FX11d)

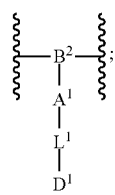
(FX11e)

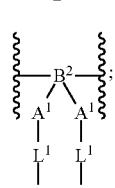
(FX11f)

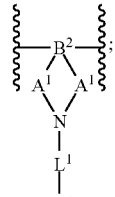
(FX11g)

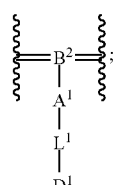
(FX11h)

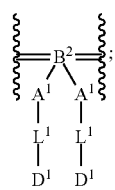

(FX11i)

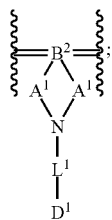

where: $B^2$ is said first or said second backbone precursor group having a strained olefin; each $A^1$ is independently an anchor group having the formula (FX3a) or (FX3b):

(FX3a)

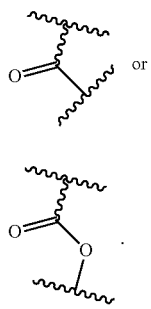

or (FX3b)

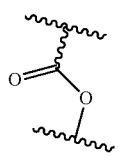

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the graft copolymers disclosed herein, said second diluent group (e.g., B") (e.g., when incorporated into a polymer backbone) may be defined by the formula (FX11a), (FX11b), (FX11c), (FX11d), (FX11e), (FX11f), (FX11g), (FX11h), or (FX11i):

(FX11a)

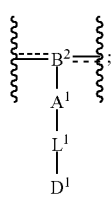

(FX11b)

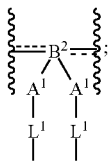

(FX11c)

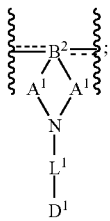

(FX11d)

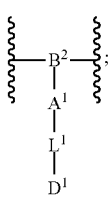

(FX11e)

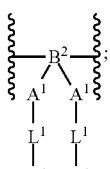

(FX11f)

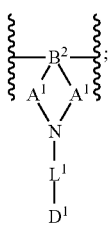

(FX11g)

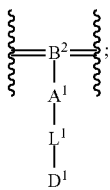

(FX11h)

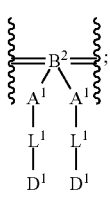

-continued

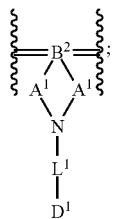
(FX11i)

where: $B^2$ is said first or said second backbone precursor group having a strained olefin; each $A^1$ is independently an anchor group having the formula (FX3a) or (FX3b):

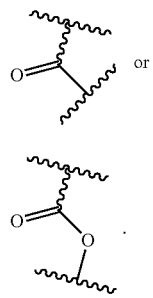
(FX3a) or (FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the graft copolymers disclosed herein, each of said first diluent groups, said second diluent groups or both (incorporated in a respective polymer backbone) independently may be defined by the formula (FX11a), (FX11b), (FX11c), (FX11d), (FX11e), (FX11f), (FX11g), (FX11h), or (FX11i):

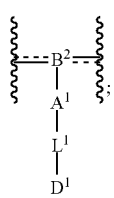
(FX11a)

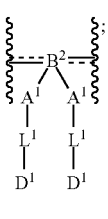
(FX11b)

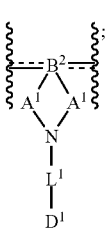
(FX11c)

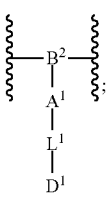
(FX11d)

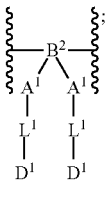
(FX11e)

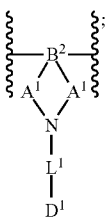
(FX11f)

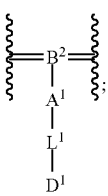
(FX11g)

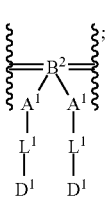
(FX11h)

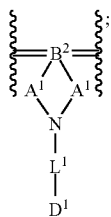
(FX11i)

where: $B^2$ is said first or said second backbone precursor group having a strained olefin; each $A^1$ is independently an anchor group having the formula (FX3a) or (FX3b):

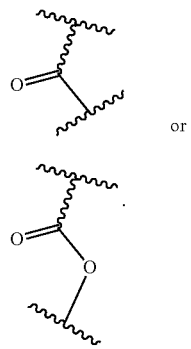
(FX3a)

or (FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof; and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the graft copolymers disclosed herein, $B^2$ connected to one or more $A^1$ may have the formula (FX12a), (FX12b), or (FX12c):

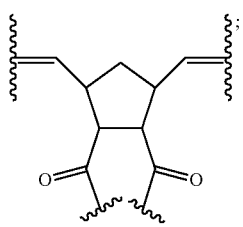
(FX12a)

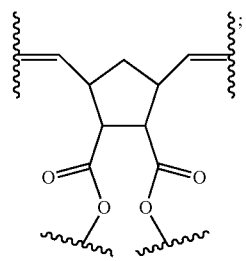
(FX12b)

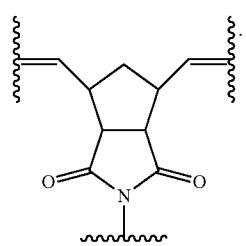
(FX12c)

In any embodiment of the graft copolymers disclosed herein, each $L^1$ is independently may be defined by the formula (FX13a), (FX13b), (FX13c), or any combination thereof:

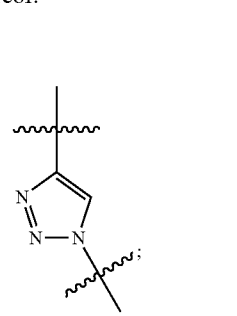
(FX13a)

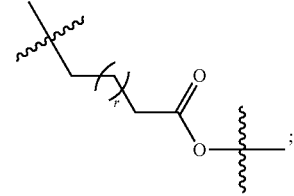
(FX13b)

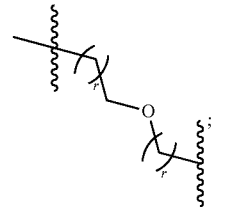
(FX13c)

wherein r is 0 or an integer selected from the range of 1 to 5.

In any embodiment of the graft copolymers disclosed herein, each $P^1$ may be independently defined by the formula (FX14a), (FX14b), (FX14c), or (FX14d):

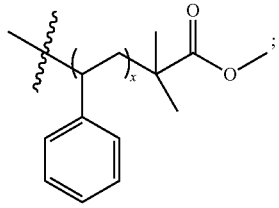 (FX14a)

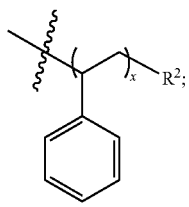 (FX14b)

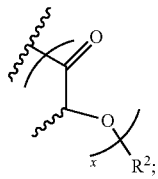 (FX14c)

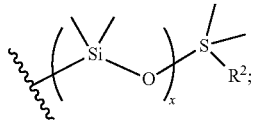 (FX14d)

wherein x is an integer selected from the range of 10 to 100; wherein $R^2$ is a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

In any embodiment of the graft copolymers disclosed herein, each of said first repeating units (e.g., A') may be defined by the formula (FX15a), (FX15b), or (FX15c):

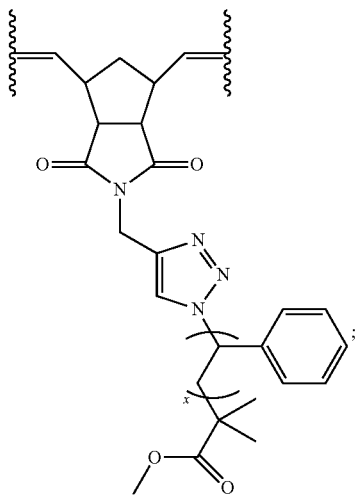 (FX15c)

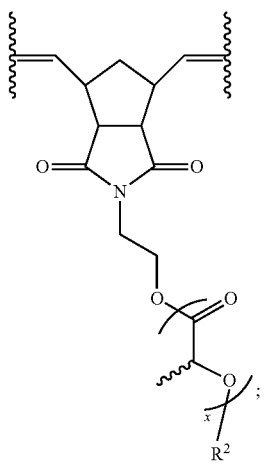 (FX15a)

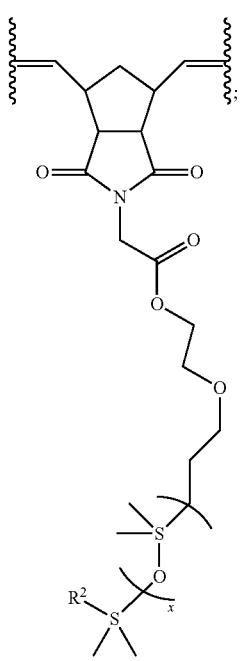 (FX15b)

where: $R^1$ is selected from the group consisting of —$CH_2$—, —$C_2H_4$—, —NH—, and —O—; $R^2$ is a hydrogen or $C_1$-$C_5$ alkyl; and x is an integer selected from the range of 10 to 100.

In any embodiment of the graft copolymers disclosed herein, each of said second repeating units (e.g., A″) may be defined by the formula (FX15a), (FX15b), or (FX15c):

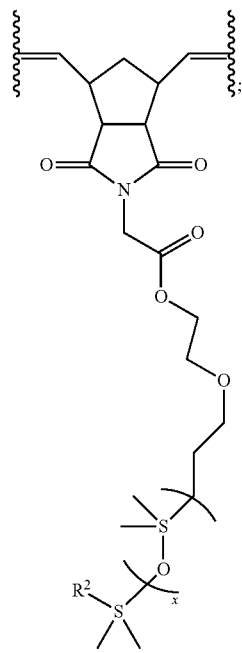

(FX15b)

where: $R^1$ is selected from the group consisting of —$CH_2$—, —$C_2H_4$—, —NH—, and —O—; $R^2$ is a hydrogen or $C_1$-$C_5$ alkyl; and x is an integer selected from the range of 10 to 100.

In any embodiment of the graft copolymers disclosed herein, each of said first repeating units, said second repeating units or both is independently may be defined by the formula (FX15a), (FX15b), or (FX15c):

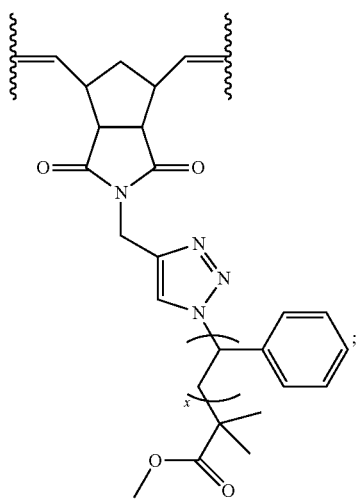

(FX15c)

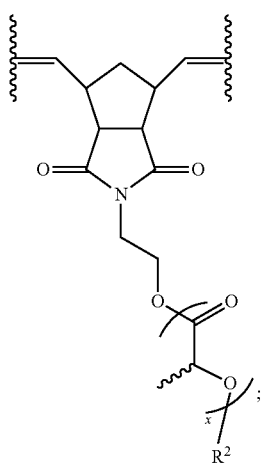

(FX15a)

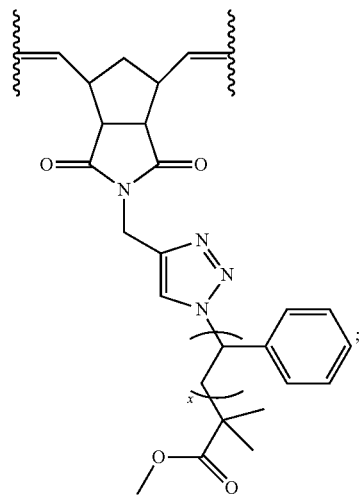

(FX15c)

(FX15a)

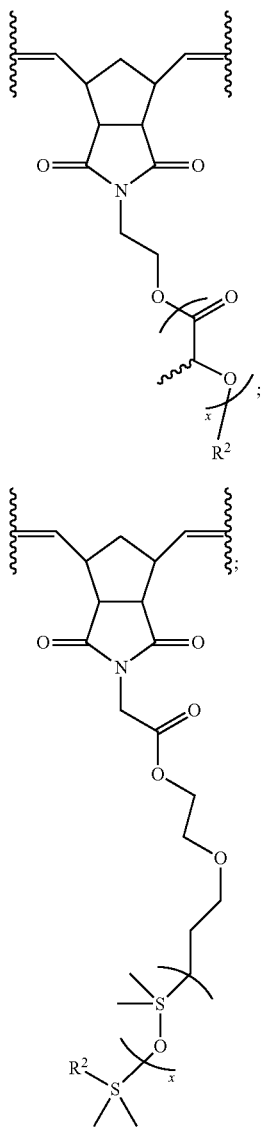

(FX15b)

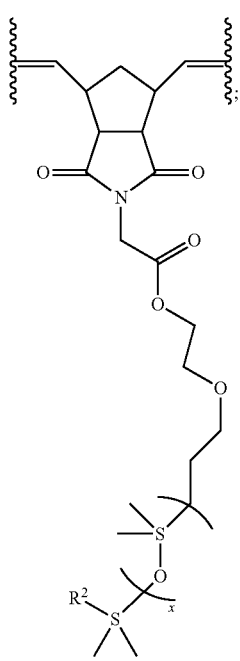

where: R¹ is selected from the group consisting of —CH₂—, —C₂H₄—, —NH—, and —O—; R² is a hydrogen or $C_1$-$C_5$ alkyl; and x is an integer selected from the range of 10 to 100.

In any embodiment of the graft copolymers disclosed herein, said first diluent group (e.g., B') (e.g., when incorporated into a polymer backbone) may be defined by the formula (FX16a), (FX16b), or (FX16c):

(FX16a)

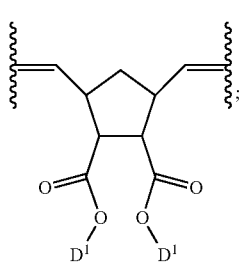

(FX16b)

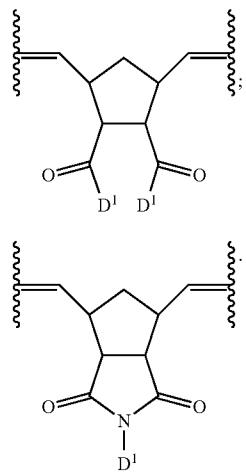

(FX16c)

In any embodiment of the graft copolymers disclosed herein, said second diluent group (e.g., B") (e.g., when incorporated into a polymer backbone) may be defined by the formula (FX16a), (FX16b), or (FX16c):

(FX16a)

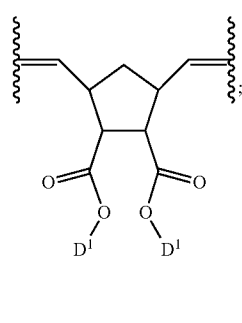

(FX16b)

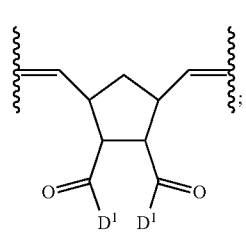

(FX16c)

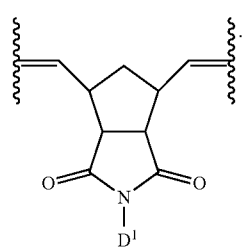

In any embodiment of the graft copolymers disclosed herein, each of said first diluent groups, said second diluent groups or both is independently may be defined by the formula (FX16a), (FX16b), or (FX16c):

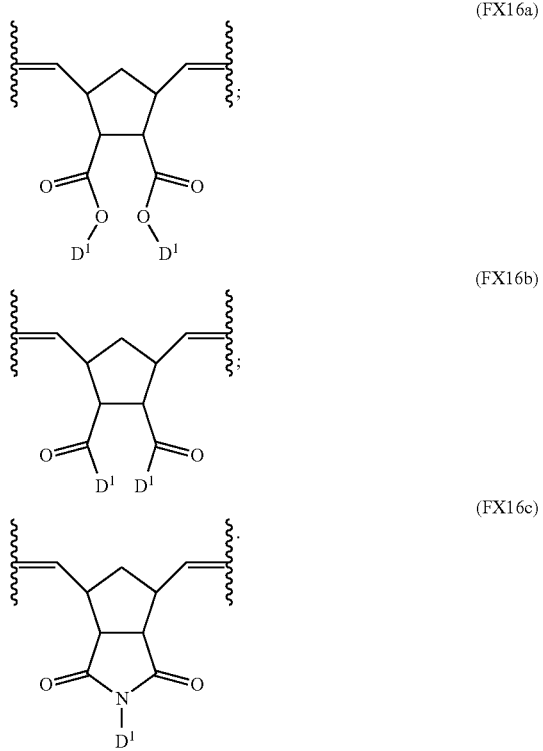

(FX16a)

(FX16b)

(FX16c)

Graft copolymers of the present invention may be characterized by a subset of a wide range of preselected properties. Moreover, each polymer block of a graft copolymer having more than one polymer block may be characterized by a subset of a wide range of preselected properties. Preselected properties include graft density, graft distribution, and degree of polymerization.

In any embodiment of the graft copolymers disclosed herein, said first graft density may be proportional to or equal to $[M^a_1]_0/([M^a_1]_0+[M^a_2]_0)$, where: $[M^a_1]_0$ and $[M^a_2]_0$ are initial concentrations of said first macromonomer and said first diluent group, respectively. In any embodiment of the graft copolymers disclosed herein, said first graft density may be selected from the range of 0.01 to 0.99. In any embodiment of the graft copolymers disclosed herein, first graft density may be selected from the range of 0.05 to 0.75. In any embodiment of the graft copolymers disclosed herein, said first graft density may be selected from the range of 0.05 to 0.32, 0.34 to 0.49, 0.51 to 0.65, or 0.68 to 0.75.

In any embodiment of the graft copolymers disclosed herein, said first graft density may be equal to $[M^a_1]_0/([M^a_1]_0+[M^a_2]_0)$, where: $[M^a_1]_0$ and $[M^a_2]_0$ are initial concentrations of said first macromonomer and said first diluent group, respectively. In any embodiment of the graft copolymers disclosed herein, said first graft density may be selected from the range of 0.01 to 0.99. In any embodiment of the graft copolymers disclosed herein, first graft density may be selected from the range of 0.05 to 0.75. In any embodiment of the graft copolymers disclosed herein, said first graft density may be selected from the range of 0.05 to 0.32, 0.34 to 0.49, 0.51 to 0.65, or 0.68 to 0.75.

In any embodiment of the graft copolymers disclosed herein, said first graft distribution may be an alternating graft distribution when $r^a_1$ is less than 1 and $r^a_2$ is less than 1; said first graft distribution may be a blocky graft distribution when $r^a_1$ is greater than 1 and $r^a_2$ is greater than 1; said first graft distribution may be a random graft distribution when $r^a_1$ is substantially equal to 1 and $r^a_2$ is substantially equal to 1; and said first graft distribution may be a gradient graft distribution when $r^a_1$ is less than 1 and $r^a_2$ is greater than 1; where: $r^a_1$ is a reactivity ratio of said first macromonomer; and $r^a_2$ is a reactivity ratio of said first diluent group (or first reactive diluent).

In any embodiment of the graft copolymers disclosed herein, said first graft distribution may be an alternating graft distribution when $r^a_1$ is substantially less than 1 and $r^a_2$ is substantially less than 1; said first graft distribution may be a blocky graft distribution when $r^a_1$ is substantially greater than 1 and $r^a_2$ is substantially greater than 1; said first graft distribution may be a random graft distribution when $r^a_1$ is substantially equal to 1 and $r^a_2$ is substantially equal to 1; and said first graft distribution may be a gradient graft distribution when $r^a_1$ is substantially less than 1 and $r^a_2$ is substantially greater than 1; where: $r^a_1$ is a reactivity ratio of said first macromonomer; and $r^a_2$ is a reactivity ratio of said first diluent group (or first reactive diluent).

In any embodiment of the graft copolymers disclosed herein, said first graft distribution may be an alternating graft distribution when $r^a_1$ is substantially less than 1 and $r^a_2$ is substantially less than 1; said first graft distribution may be a blocky graft distribution when $r^a_1$ is substantially greater than 1 and $r^a_2$ is substantially greater than 1; said first graft distribution may be a random graft distribution when $r^a_1$ is equal to 1 and $r^a_2$ is equal to 1; and said first graft distribution may be a gradient graft distribution when $r^a_1$ is substantially less than 1 and $r^a_2$ is substantially greater than 1; where: $r^a_1$ is a reactivity ratio of said first macromonomer; and $r^a_2$ is a reactivity ratio of said first diluent group (or first reactive diluent).

In any embodiment of the graft copolymers disclosed herein, said step of copolymerizing said first macromonomer may be performed in the presence of a catalyst. In any embodiment of the graft copolymers disclosed herein, the first polymer block may have a preselected first degree of polymerization, said first degree of polymerization being proportional to or equal to $([M^a_1]_0+[M^a_2]_0)/[Cat]_0$; where: $[Cat]_0$ is initial concentration of said catalyst.

In any embodiment of the graft copolymers disclosed herein, said second graft density is proportional to or equal to $[M^b_1]_0/([M^b_1]_0+[M^bd_2]_0)$, where: $[M^b_1]_0$ and $[M^b_2]_0$ are initial concentrations of said second macromonomer and said second diluent group, respectively. In any embodiment of the graft copolymers disclosed herein, said second graft density may be selected from the range of 0.01 to 0.99. In any embodiment of the graft copolymers disclosed herein, said second graft density may be selected from the range of 0.05 to 0.75. In any embodiment of the graft copolymers disclosed herein, said second graft density may be selected from the range of 0.05 to 0.32, 0.34 to 0.49, 0.51 to 0.65, or 0.68 to 0.75.

In any embodiment of the graft copolymers disclosed herein, said second graft distribution may be an alternating graft distribution when $r^b_1$ is less than 1 and $r^b_2$ is less than 1; said second graft distribution may be a blocky graft distribution when $r^b_1$ is greater than 1 and $r^b_2$ is greater than 1; said second graft distribution may be a random graft distribution when $r^b_1$ is substantially equal to 1 and $r^b_2$ is substantially equal to 1; and said second graft distribution may be a gradient graft distribution when $r^b_1$ is less than 1 and $r^b_2$ is greater than 1; where: $r^b_1$ is a reactivity ratio of said second macromonomer; and $r^b_2$ is a reactivity ratio of said second diluent group (or of said second reactive diluent).

In any embodiment of the graft copolymers disclosed herein, said second graft distribution may be an alternating graft distribution when $r^b_1$ is substantially less than 1 and $r^b_2$ is substantially less than 1; said second graft distribution may be a blocky graft distribution when $r^b_1$ is substantially greater than 1 and $r^b_2$ is substantially greater than 1; said second graft distribution may be a random graft distribution when $r^b_1$ is substantially equal to 1 and $r^b_2$ is substantially equal to 1; and said second graft distribution may be a gradient graft distribution when $r^b_1$ is substantially less than 1 and $r^b_2$ is substantially greater than 1; where: $r^b_1$ is a reactivity ratio of said second macromonomer; and $r^b_2$ is a reactivity ratio of said second diluent group (or of said second reactive diluent).

In any embodiment of the graft copolymers disclosed herein, said second graft distribution may be an alternating graft distribution when $r^b_1$ is substantially less than 1 and $r^b_2$ is substantially less than 1; said second graft distribution may be a blocky graft distribution when $r^b_1$ is substantially greater than 1 and $r^b_2$ is substantially greater than 1; said second graft distribution may be a random graft distribution when $r^b_1$ is equal to 1 and $r^b_2$ is equal to 1; and said second graft distribution may be a gradient graft distribution when $r^b_1$ is substantially less than 1 and $r^b_2$ is substantially greater than 1; where: $r^b_1$ is a reactivity ratio of said second macromonomer; and $r^b_2$ is a reactivity ratio of said second diluent group.

In any embodiment of the graft copolymers disclosed herein, said step of copolymerizing said second macromonomer may be performed in the presence of a catalyst. In any embodiment of the graft copolymers disclosed herein, the second polymer block may have a preselected second degree of polymerization, said second degree of polymerization being proportional to or equal to $([M^b_1]_0+[M^b_2]_0)/[Cat]_0$; where: $[Cat]_0$ is initial concentration of said catalyst.

Additionally, graft copolymers of the present invention may have a low mass dispersity (low polydispersity index), which presents a number of benefits for applications in which the graft copolymers are used. In any embodiment of the graft copolymers disclosed herein, a polydispersity index of said graft copolymer is selected from the range of 1.00 to 1.30. In any embodiment of the graft copolymers disclosed herein, a polydispersity index of said graft copolymer is selected from the range of 1.00 to 1.20. In any embodiment of the graft copolymers disclosed herein, a polydispersity index of said graft copolymer is selected from the range of 1.00 to 1.10.

Some graft copolymers of the present invention have three or more polymer blocks, wherein a wide range of polymer block properties and arrangements are obtainable.

In any embodiment of the graft copolymers disclosed herein, the graft copolymer may be defined by the formula $Q^1$-$[G^1]_g$-$[W^1]_i$-$[H^1]_h$-$Q^2$, $Q^3$-$[W^1]_i$-$[G^1]_g$-$[H^1]_h$-$Q^2$, or $Q^1$-$[G^1]_g$-$[H^1]_h$-$[W^1]_i$-$Q^3$, where:

$G^1$ is said first polymer block having the formula (FX20a), (FX20b), (FX20c), or (FX20d):
$[(A')_m$-$(B')_n]$ (FX20a); $[(B')_n$-$(A')_m]$ (FX20b); $[(A')_m$-$(B')_n$-$(A')_x]$ (FX20d); $[(B')_n$-$(A')_m$-$(B')_y]$ (FX20d);

$H^1$ is said second polymer block having the formula (FX30a), (FX30b), (FX30c), or (FX30d):
$[(A'')_q$-$(B'')_s]$ (FX30a); $[(B'')_s$-$(A'')_q]$ (FX30b); $[(A'')_q$-$(B'')_s$-$(A'')_u]$ (FX30c); $[(B'')_s$-$(A'')_q$-$(B'')_v]$ (FX30d);

A' is said first repeating unit; B' is a first diluent group; A" is said second repeating unit; B" is a second diluent group; $Q^1$ is a first polymer block terminating group; $Q^2$ is a second polymer block terminating group; g is a degree of polymerization of said first polymer block, and g is an integer selected from the range of 10 to 1000; h is a degree of polymerization of said second polymer block, and h is an integer selected from the range of 10 to 1000; each of m and q is independently an integer selected from the range of 10 to 999; each of n and s is independently an integer selected from the range of 1 to 990; each of x and y is independently an integer equal to (g-m-n); and each of u and v is independently an integer equal to (h-q-s); $W^1$ is a third polymer block; $Q^3$ is a third polymer block terminating group; and i is a degree of polymerization of said third polymer block, and i an integer selected from the range of 10 to 1000; wherein the formulas (FX20a), (FX20b), (FX20c), and (FX20d) indicate amounts of A' and B' which can have any distribution within $G^1$, and wherein the formulas (FX30a), (FX30b), (FX30c), and (FX30d) indicate amounts of A" and B" which can have any distribution within $H^1$.

In any embodiment of the graft copolymers disclosed herein, the graft copolymer may be defined by the formula $Q^1$-$[G^1]_g$-$[W^1]_i$-$[W^2]_j$-$[H^1]_h$-$Q^2$, $Q^1$-$[G^1]_g$-$[W^2]_j$-$[W^1]_i$-$[H^1]_h$-$Q^2$, $Q^3$-$[W^1]_i$-$[W^2]_j$-$[G^1]_g$-$[H^1]_h$-$Q^2$, $Q^4$-$[W^2]_j$-$[W^1]_i$-$[G^1]_g$-$[H^1]_h$-$Q^2$, $Q^1$-$[G^1]_g$-$[H^1]_h$-$[W^1]_i$-$[W^2]_j$-$Q^4$, or $Q^1$-$[G^1]_g$-$[H^1]_h$-$[W^1]_i$-$[W^1]_i$-$Q^3$:

$G^1$ is said first polymer block having the formula (FX20a), (FX20b), (FX20c), or (FX20d):
$[(A')_m$-$(B')_n]$ (FX20a); $[(B')_n$-$(A')_m]$ (FX20b); $[(A')_m$-$(B')_n$-$(A')_x]$ (FX20d); $[(B')_n$-$(A')_m$-$(B')_y]$ (FX20d);

$H^1$ is said second polymer block having the formula (FX30a), (FX30b), (FX30c), or (FX30d):
$[(A'')_q$-$(B'')_s]$ (FX30a); $[(B'')_s$-$(A'')_q]$ (FX30b); $[(A'')_q$-$(B'')_s$-$(A'')_u]$ (FX30c); $[(B'')_s$-$(A'')_q$-$(B'')_v]$ (FX30d);

A' is said first repeating unit; B' is a first diluent group; A" is said second repeating unit; B" is a second diluent group; $Q^1$ is a first polymer block terminating group; $Q^2$ is a second polymer block terminating group; g is a degree of polymerization of said first polymer block, and g is an integer selected from the range of 10 to 1000; h is a degree of polymerization of said second polymer block, and h is an integer selected from the range of 10 to 1000; each of m and q is independently an integer selected from the range of 10 to 999; each of n and s is independently an integer selected from the range of 1 to 990; each of x and y is independently an integer equal to (g-m-n); each of u and v is independently an integer equal to (h-q-s); $W^1$ is a third polymer block; $Q^3$ is a third polymer block terminating group; i is a degree of polymerization of said third polymer block, and i an integer selected from the range of 10 to 1000; $W^2$ is a fourth polymer block; $Q^4$ is a third polymer block terminating group; and j is a degree of polymerization of said third polymer block, and j an integer selected from the range of 10 to 1000; wherein the formulas (FX20a), (FX20b), (FX20c), and (FX20d) indicate amounts of A' and B' which can have any distribution within $G^1$, and wherein the formulas (FX30a), (FX30b), (FX30c), and (FX30d) indicate amounts of A" and B" which can have any distribution within $H^1$.

Also provided herein are functional materials having graft copolymers such as those also provided herein. Functional materials provided herein include self-assembled polymer structures. The structure, chemistry, and other properties of the self-assembly of these structures disclosed herein may be highly tunable due to the highly versatile and tunable properties of the constituent graft copolymers. These self-assembled polymer structures have a broad set of applications, which include known and yet unknown potential applications. Exemplary applications include, but are not limited to, photonic materials, scaffolds for controlling nanoadditive distribution or orientation, scaffolds for growth of biological materials, and structures with gradient mechanical properties.

In an aspect, a self-assembled polymer structure comprises a plurality of graft block copolymers each independently being a graft copolymer of any embodiment of the graft copolymers disclosed herein.

In an aspect, a self-assembled polymer structure comprises a plurality of graft block copolymers each being identical to the others and being a graft copolymer of any embodiment of the graft copolymers disclosed herein.

In any embodiment of the self-assembled polymer structures disclosed herein, said self-assembled polymer structure may be a lamellar structure, a matrix-sphere structure, a matrix-cylinder structure, or a matrix-gyroid structure. In any embodiment of the self-assembled polymer structures disclosed herein, said polymer structure may be a lamellar structure and has a periodicity selected from the range of 20 nm to 400 nm. In any embodiment of the self-assembled polymer structures disclosed herein, said polymer structure may be a lamellar structure and has a periodicity selected from the range of 25 nm to 100 nm. In any embodiment of the self-assembled polymer structures disclosed herein, said polymer structure may be a lamellar structure and has a total thickness in a transverse direction selected from the range of 40 nm to 1400 nm.

In any embodiment of the self-assembled polymer structures disclosed herein, the self-assembled polymer structure may be at least partially configured as a photonic crystal. In any embodiment of the self-assembled polymer structures disclosed herein, said photonic crystal is configured to reflect visible light. In any embodiment of the self-assembled polymer structures disclosed herein, the self-assembled polymer structure may be configured as a transmissive surface coating, configured to substantially transmit at least a portion of visible light, a partially reflective surface coating, configured to substantially reflect at least a portion of visible light, a photonic crystal, a solid polymer electrolyte, a scaffold, a gradient mechanical property structure, or a combination thereof.

In any embodiment of the self-assembled polymer structures disclosed herein, one or more polymer blocks of one or more graft copolymers of said plurality of graft block copolymers may be a linear-type block copolymer. In any embodiment of the self-assembled polymer structures disclosed herein, one or more polymer blocks of one or more graft copolymers of said plurality of graft block copolymers may be a comb-type block copolymer. In any embodiment of the self-assembled polymer structures disclosed herein, one or more polymer blocks of one or more graft copolymers of said plurality of graft block copolymers may be a bottle-brush-type block copolymer.

In an aspect, a method for forming a self-assembled polymer structure comprises the steps of: (a) providing a plurality of graft block copolymers each independently being a graft copolymer of any embodiment of the graft copolymers disclosed herein; and (b) inducing self-assembly of said plurality of graft block copolymers. In any embodiment of the methods for forming a self-assembled polymer structure disclosed herein, said step of inducing may comprise pressure annealing under a contact pressure selected from the range of 100 kPa to 200 kPa. In any embodiment of the methods for forming a self-assembled polymer structure disclosed herein, said step of inducing may comprise pressure annealing under a contact pressure selected from the range of 100 kPa to 120 kPa. In any embodiment of the methods for forming a self-assembled polymer structure disclosed herein, said step of inducing may comprise temperature annealing at an annealing temperature selected from the range of 50° C. to 150° C. In any embodiment of the methods for forming a self-assembled polymer structure disclosed herein, said step of inducing may comprise temperature annealing at an annealing temperature selected from the range of 30° C. to 50° C.

In any embodiment of the methods for forming a self-assembled polymer structure disclosed herein, said self-assembled polymer structure may be a lamellar structure, a matrix-sphere structure, a matrix-cylinder structure, or a matrix-gyroid structure.

In an aspect, a self-assembled polymer structure comprises: a plurality of graft block copolymers, each graft block copolymer independently comprising: a first polymer block comprising at least 10 first repeating units; each of said first repeating units comprising a first polymer backbone group and directly or indirectly covalently linked to a first polymer side chain group; wherein said first polymer block further comprises a first diluent group incorporated into a first backbone of said first polymer block and provided in an amount such that said first polymer block is characterized by a preselected first graft density or a preselected first graft distribution of said first repeating units; and a second polymer block comprising at least 10 second repeating units; each of said second repeating unit comprising a second polymer backbone group directly or indirectly covalently linked to a second polymer side chain group; wherein said second polymer block has a second backbone directly or indirectly covalently linked to said first backbone of said first polymer block; and wherein said second polymer block further comprises a second diluent group incorporated into said second backbone of said second polymer block and provided in an amount such that said second polymer block is characterized by a preselected second graft density or a preselected second distribution of said second repeating units; wherein said first polymer bock and said second polymer block are directly or indirectly linked to each other. In an embodiment of the self-assembled polymer structure of this aspect: (i) said preselected first graft density and/or or said preselected second graft density is any value selected from the range of 0.05 to 0.75; and/or (ii) said first polymer block is characterized by a preselected first graft density and a preselected first graft distribution of said first repeating units; and/or (iii) said second polymer block is characterized by a preselected second graft density and a preselected second distribution of said second repeating units; and/or (iv) said second polymer side chain group is different from said first polymer side chain group; and/or (v) said second polymer backbone group is different from said first polymer backbone group; and/or (vi) said preselected first graft density and/or said preselected second graft density is selected from the range of 0.01 to 0.99; and/or (vii) each graft block copolymer of the self-assembled polymer structure comprises one or more additional polymer blocks directly or indirectly covalently linked to said first backbone of said first polymer block or said second backbone of said second polymer block; and/or (viii) a polydispersity index of said each graft block copolymer is selected from the range of 1.00 to 1.30, 1.00 to 1.20, or 1.00 to 1.10.

In an aspect, a method of synthesizing a graft copolymer comprises a step of: copolymerizing a first macromonomer and a first reactive diluent; wherein said first macromonomer comprises a first backbone precursor directly or indirectly covalently linked to a first polymer side chain group; wherein said reactive diluent is provided in the presence of the first macromonomer at an amount selected so as to result in formation said graft copolymer having a first backbone incorporating said diluent and said first macromonomer in a first polymer block characterized by a preselected first graft density or a preselected first graft distribution of said first macromonomer. In an embodiment of the method of this aspect: (i) said preselected first graft density and/or or said preselected second graft density is any value selected from the range of 0.05 to 0.75; and/or (ii) the composition and amount of said diluent is selected to provide both a first preselected first graft density and a first preselected first graft distribution; and/or (iii) the method further comprises one or more additional copolymerization steps, so as to result in said graft copolymer having one or more additional polymer blocks directly or indirectly covalently linked to said first backbone of said first polymer block; and/or (iv) said preselected first graft density is selected from the range of 0.01 to 0.99, or is selected from the range of 0.05 to 0.32, 0.34 to 0.49, 0.51 to 0.65, or 0.68 to 0.75; and/or (v) a polydispersity index of said graft copolymer is selected from the range of 1.00 to 1.30, 1.00 to 1.20, or 1.00 to 1.10.

In an aspect, a method of synthesizing a graft copolymer comprises a step of: copolymerizing a first macromonomer and a first reactive diluent; wherein said first macromonomer comprises a first backbone precursor directly or indirectly covalently linked to a first polymer side chain group; wherein said reactive diluent is provided in the presence of the first macromonomer at an amount selected so as to result in formation said graft copolymer having a first backbone incorporating said diluent and said first macromonomer in a first polymer block characterized by a preselected first graft density or a preselected first graft distribution of said first macromonomer. In an embodiment of the method of this aspect: (i) said preselected first graft density and/or or said preselected second graft density is any value selected from the range of 0.05 to 0.75; and/or (ii) the composition and amount of said diluent is selected to provide both a first preselected first graft density and a first preselected first graft distribution; and/or (iii) the method further comprises a step of copolymerizing a second macromonomer and a second reactive diluent, wherein said second macromonomer comprises a second backbone precursor directly or indirectly covalently linked to a second polymer side chain group, wherein said second reactive diluent is provided in the presence of the second macromonomer at an amount selected so as to result in formation said graft copolymer having a second backbone incorporating said second reactive diluent and said second macromonomer in a second polymer block characterized by a preselected second graft density or a preselected second graft distribution of said second macromonomer, and wherein said first polymer block and said second polymer block are directly or indirectly covalently linked along said backbone; wherein said second polymer side chain group may be different from said first polymer side chain group; wherein said second polymer backbone group may be different from said first polymer backbone group; and wherein said second polymer block may be characterized by a preselected second graft density and a preselected second distribution of said second repeating units; and/or (iv) said preselected first graft density and/or said preselected second graft density is selected from the range of 0.01 to 0.99, or is selected from the range of 0.05 to 0.32, 0.34 to 0.49, 0.51 to 0.65, or 0.68 to 0.75; and/or (v) a polydispersity index of said graft copolymer is selected from the range of 1.00 to 1.30, 1.00 to 1.20, or 1.00 to 1.10.

In an aspect, a graft copolymer comprises a first polymer block comprising at least 10 first repeating units; each of said first repeating units comprising a first polymer backbone group and directly or indirectly covalently linked to a first polymer side chain group; wherein said first polymer block further comprises a first diluent group incorporated into a first backbone of said first polymer block and provided in an amount such that said first polymer block is characterized by a preselected first graft density or a preselected first graft distribution of said first repeating units. In an embodiment of a graft copolymer of this aspect: (i) said preselected first graft density and/or or said preselected second graft density is any value selected from the range of 0.05 to 0.75; and/or (ii) said first polymer block is characterized by a preselected first graft density and a preselected first graft distribution of said first repeating units; and/or (iii) a polydispersity index of said graft copolymer is selected from the range of 1.00 to 1.30, 1.00 to 1.20, or 1.00 to 1.10; and/or (iv) said preselected first graft density and/or said preselected second graft density is selected from the range of 0.01 to 0.99, or is selected from the range of 0.05 to 0.32, 0.34 to 0.49, 0.51 to 0.65, or 0.68 to 0.0.75; and/or (v) the graft copolymer further comprises one or more additional polymer blocks directly or indirectly covalently linked to said first backbone of said first polymer block.

In an aspect, a graft copolymer comprises a first polymer block comprising at least 10 first repeating units; each of said first repeating units comprising a first polymer backbone group and directly or indirectly covalently linked to a first polymer side chain group; wherein said first polymer block further comprises a first diluent group incorporated into a first backbone of said first polymer block and provided in an amount such that said first polymer block is characterized by a preselected first graft density or a preselected first graft distribution of said first repeating units. In an embodiment of a graft copolymer of this aspect: (i) said preselected first graft density and/or or said preselected second graft density is any value selected from the range of 0.05 to 0.75; and/or (ii) said first polymer block is characterized by a preselected first graft density and a preselected first graft distribution of said first repeating units; and/or (iii) a polydispersity index of said graft copolymer is selected from the range of 1.00 to 1.30, 1.00 to 1.20, or 1.00 to 1.10; and/or (iv) said preselected first graft density and/or said preselected second graft density is selected from the range of 0.01 to 0.99, or is selected from the range of 0.05 to 0.32, 0.34 to 0.49, 0.51 to 0.65, or 0.68 to 0.75; and/or (v) the graft copolymer further comprises said graft copolymer may be a graft block copolymer; said graft block copolymer further comprising: a second polymer block comprising at least 10 second repeating units; each of said second repeating unit comprising a second polymer backbone group directly or indirectly covalently linked to a second polymer side chain group; wherein said second polymer block has a second backbone directly or indirectly covalently linked to said first backbone of said first polymer block; and wherein said second polymer block further comprises a second diluent group incorporated into said second backbone of said second polymer block and provided in an amount such that said second polymer block is characterized by a preselected second graft density or a preselected second distribution of said second repeating units; wherein said second polymer side chain group may be different from said first polymer side chain group; wherein said second polymer backbone group may be different from said first polymer backbone group; and wherein said second polymer block may be characterized by a preselected second graft density and a preselected second distribution of said second repeating units.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1. An illustrative summary of exemplary methods and graft copolymers having preselected graft density and/or graft distribution.

FIG. 2. An illustration of an exemplary method and exemplary resulting graft copolymers in accordance with the present invention, where grafting density and side chain distribution may be controlled and preselected.

FIG. 5, panel A: Normalized differential refractive index (dRI) trace from size-exclusion chromatography (SEC). The different traces correspond to aliquots extracted at different times. At elution times (x-axis) of less than 16 minutes, the right-most to left-most data curves correspond to aliquots taken at 1, 3, 5, 7, 9, and 12 minutes, respectively. At elution times (x-axis) of greater than 16 minutes, the top-most to bottom data curves correspond to aliquots taken at 1, 3, 5, 7, 9, and 12 minutes, respectively. FIG. 5, panel B: Plots of $\ln([M]_0/[M]_t)$ versus time as monitored by $^1H$ NMR spectroscopy (filled blue circles=PS, filled red triangles=DME). Unfilled blue circles (PS), unfilled red triangles (DME), and the solid lines, plotted for comparison, are obtained from homopolymerization reactions under the same conditions.

FIGS. 6A-6D. Non-linear least-square curve fitting for the copolymerization of (FIGS. 6A-6B) PS (0.05 M) and DME (0.05 M) and (FIGS. 6C-6D) PS (0.05 M) DME (0.10 M) in $CH_2Cl_2$ at 298 K. $[G3]_0$=0.5 mM. Calculated fits (solid lines) show close agreement with the measured values (points). In FIGS. 6B and 6D, the dashed lines, included for comparison, indicate ideal random copolymerization ($r_1$=$r_2$=1).

FIG. 7. A chemical structure of a reactive propagating species PS*.

FIGS. 8A-8L. Non-linear least-square curve fitting for the copolymerization of various macromonomer/diluent pairs: (FIGS. 8A-8B) PS/DEE, (FIGS. 8C-8D) PS/DBE, (FIGS. 8E-8F) PLA/DME, (FIGS. 8G-8H) PLA/DBE, (FIGS. 8I-8J) PDMS/DME, and (FIGS. 8K-8L) PDMS/DBE (0.055 M). Reaction conditions: $[M]_0$=0.05 M unless otherwise indicated, $[G3]_0$=0.5 mM, solvent=$CH_2Cl_2$, temperature=298 K.

(FIG. 9B) PLA:DME=1:1; (FIG. 9C) PDMS:DME=1:1; (FIG. 9D) PDMS:DBE=1:1. Insets show the schematic illustrations of the corresponding polymers.

FIGS. 19A-19B. Non-linear least-square curve fitting for the copolymerization of PS (0.075 M) and DBE (0.025 M) in $CH_2Cl_2$ at 298 K. $[G3]_0$=0.5 mM: FIG. 19A is a plot of $[M]_t$ vs. time and FIG. 19B is a plot of total conversion vs. monomer conversion. Calculated fits (solid lines) show close agreement with the measured values (points). In FIG. 19B, the dashed lines indicate random copolymerization ($r_1$=$r_2$=1).

FIG. 20. Differential scanning calorimetry (DSC) data for $PS_{100}$, $DBE_{100}$, and two copolymers thereof: ($PS_{100}$-b-$DBE_{100}$), a block copolymer with one fully grafted block and one ungrafted block, synthesized by sequential addition of PS and DBE; and ($PS^{0.5}$-ran-$DBE^{0.5}$)$_{200}$, a random bottle-brush copolymer with 50% grafting density, synthesized by copolymerizing PS and DBE in a 1:1 feed ratio as discussed in the text. The data are collected on the second heating cycle using a 10° C./min ramp rate, and glass transition temperatures ($T_g$, open circles) are identified from the corresponding derivative curves. Both copolymers exhibit a single $T_g$ between the $T_g$s of the pure components, indicating successful incorporation of both PS and DBE. The $T_g$ of $PS_{100}$-b-$DBE_{100}$ (which has a guaranteed blocky sequence due to sequential addition and complete consumption of each block) differs from the $T_g$ of ($PS^{0.5}$-ran-$DBE^{0.5}$)$_{200}$ in terms of both position and shape, suggesting that ($PS^{0.5}$-ran-$DBE^{0.5}$)$_{200}$ is at least not blocky and instead likely random.

(FIG. 22A) uniform, (FIG. 22B) gradient, etc. The anticipated average cross-sectional radius of gyration ($R_c$) is indicated. For ease of visualization, chains are illustrated in the limit of fully extended backbones.

FIG. 29C. PLA/diluent copolymerization data. Left axis, black: self-propagation rate constants ($k_{22}$: filled circles, $k_{11}$: open circles). Right axis, red: reactivity ratios ($r_2$: solid line, $r_1$: dotted line).

FIGS. 30A-30C. Simulated sequences and (inset) graft polymer architectures for the copolymerization of PLA with different diluents: (FIG. 30A) 4a, (FIG. 30B) 1a, or (FIG. 30C) 5a. For ease of visualization, the simulated structures show fully extended side chains and backbones.

FIG. 34A-34C. Schematic illustration of the relationships between chain dimensions and the lamellar period. FIG. 34A. $d_A \approx 3d_B$ is expected if the backbones are fully stretched (since $N_{bb,A}=3N_{bb,B}$), but it is consistent with SAXS data. FIG. 34B. Instead, $d_A \approx d_B$ is observed. This requires bending of the A block backbone. FIG. 34C. Illustration of BP-3 and revised chain conformations.

FIG. 38, panel A: Stacked 1D azimuthally averaged SAXS profiles for z=1, indicating well-ordered lamellar morphologies. FIG. 38, panel B: Experimental data for the lamellar period (d*) and $N_{bb}$ (circles), as well as calculated power-law fits ($d^*\text{-}N_{bb}^\alpha$, lines). The data curves top-to-bottom correspond to graft densities of z=1.00 to z=0.00, respectively (see legend). FIG. 38, panel C: Plot of the scaling exponents ($\alpha$) as a function of z. A transition occurs around z=0.2 (dotted line). The data curves left-to-right correspond to graft densities of z=0.00 to z=1.00, respectively.

(FIG. 39, panel B) z=0.75, $(PLA^{0.75}\text{-}r\text{-}DME^{0.25})_{110}\text{-}b\text{-}(PS^{0.75}\text{-}r\text{-}DBE^{0.25})_{110}$; (FIG. 39, panel C) z=0.50, $(PLA^{0.5}\text{-}r\text{-}DME^{0.5})_{104}\text{-}b\text{-}(PS^{0.5}\text{-}r\text{-}DBE^{0.5})_{104}$, and (FIG. 39, panel D) z=0.25, $(PLA^{0.25}\text{-}r\text{-}DME^{0.75})_{112}\text{-}b\text{-}(PS^{0.25}\text{-}r\text{-}DBE^{0.75})_{112}$.

FIG. 41, panel A. Stacked 1D azimuthally averaged SAXS profiles for z=0.75, indicating well-ordered lamellar morphologies. FIG. 41, panel B. Experimental data for the lamellar period (d*) and $N_{bb}$ (circles), as well as calculated power-law fits ($d^*\text{-}N_{bb}^\alpha$, lines). The data curves top-to-bottom correspond to graft densities of z=1.00 to z=0.05, respectively (see legend). FIG. 41, panel C. Plot of the scaling exponents ($\alpha$) as a function of z. A transition occurs around z=0.2 (dotted line).

The data curves left-to-right correspond to graft densities of z=0.05 to z=1.00, respectively. Note that in FIG. 41, panel B, and FIG. 41, panel C, unfilled circles indicate data for System I (z=1.00), in which the side chain molecular weights are slightly higher.

Figure 42:
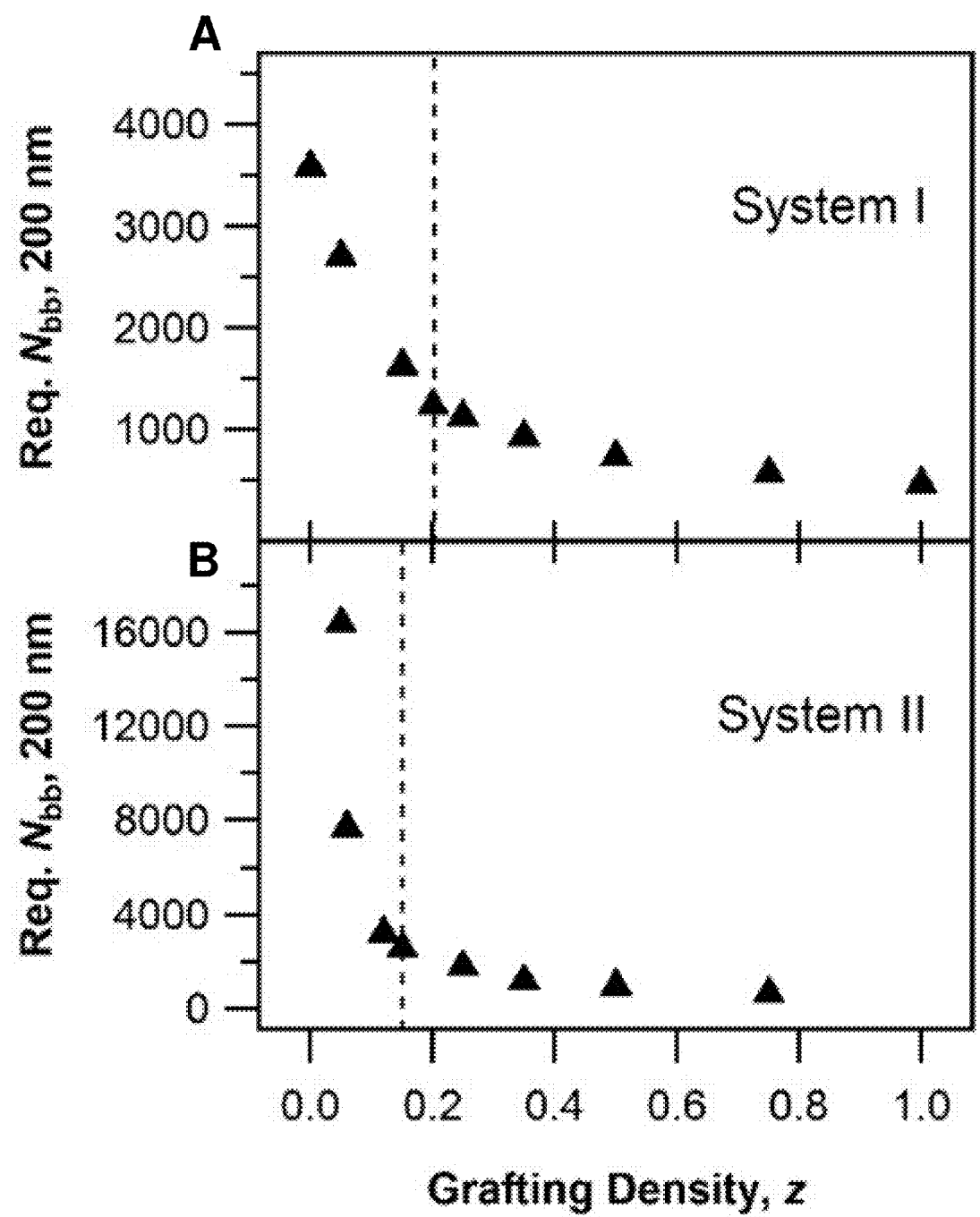

FIG. 42. Plots of predicted $N_{bb}$ required to access d*=200 nm as a function of grafting density (z) for (FIG. 42, panel A) System I and (FIG. 42, panel B) System II.

Figure 43A:
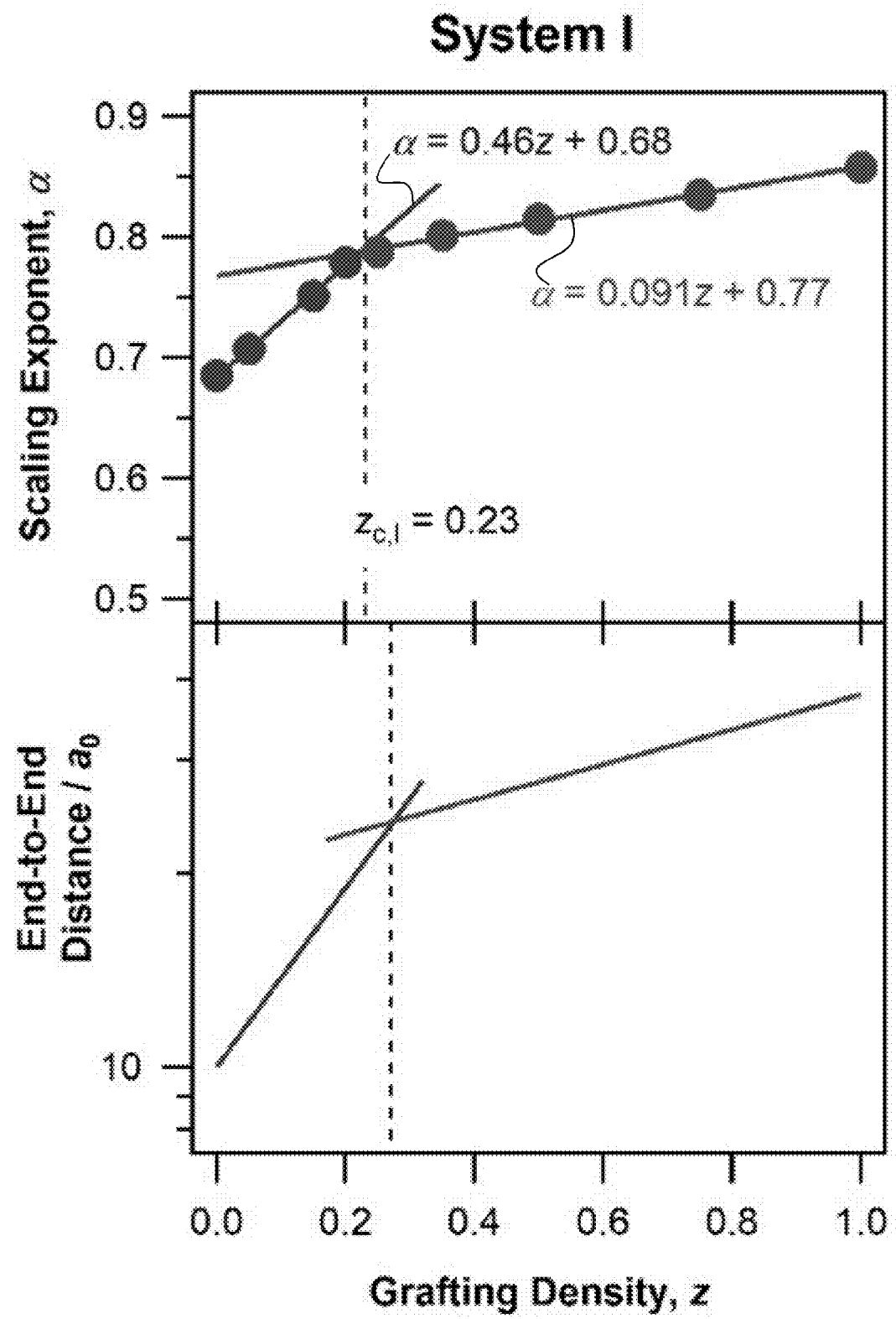
Figure 43B:
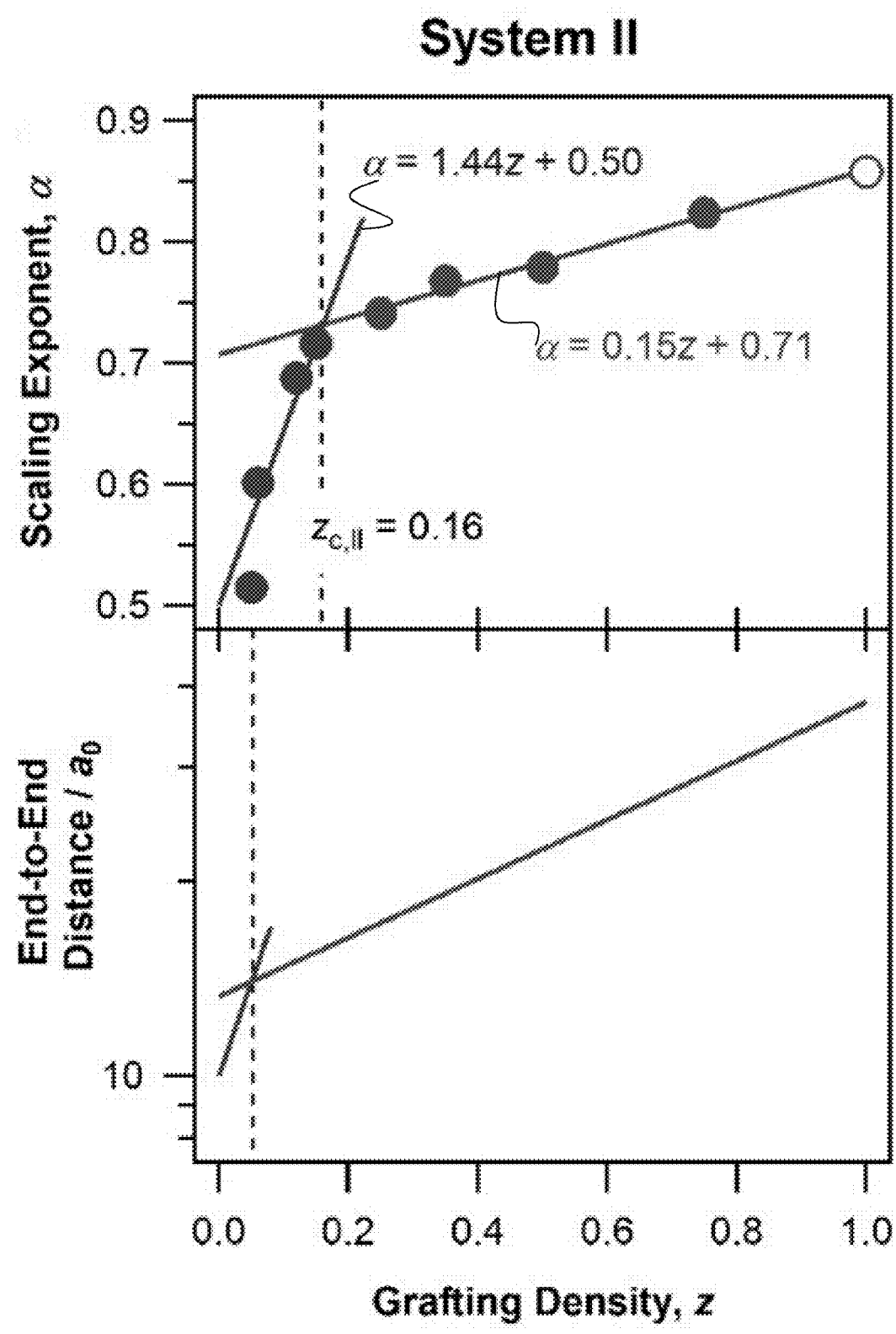

FIG. 43A-43B. Analysis of scaling trends with grafting density (z) for (FIG. 43A) System I and (FIG. 43B) System II. (top) Experimentally determined values and lines of best fit for the scaling exponent (α) versus z. The lines intersect at a critical $z_c$, associated with a transition in the backbone stiffness. In FIG. 43B, the unfilled circle (z=1.00) indicates data for System I. (bottom) Calculated root-mean-square end-to-end distances, normalized by the backbone statistical segment length ($\sqrt{\langle R^2 \rangle}/a_0$), fixing $N_{bb}$=100.

Figure 23:
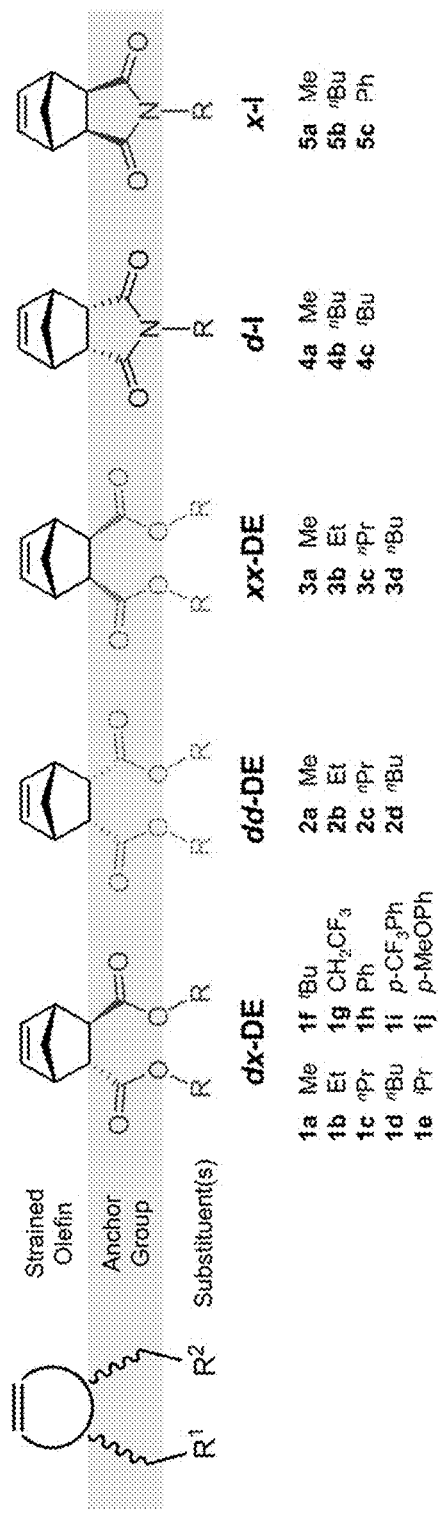
FIG. 23. Monomer design for ring-opening metathesis copolymerization, demonstrating exemplary reactive diluent species in accordance with the present invention.
Figure 44A:
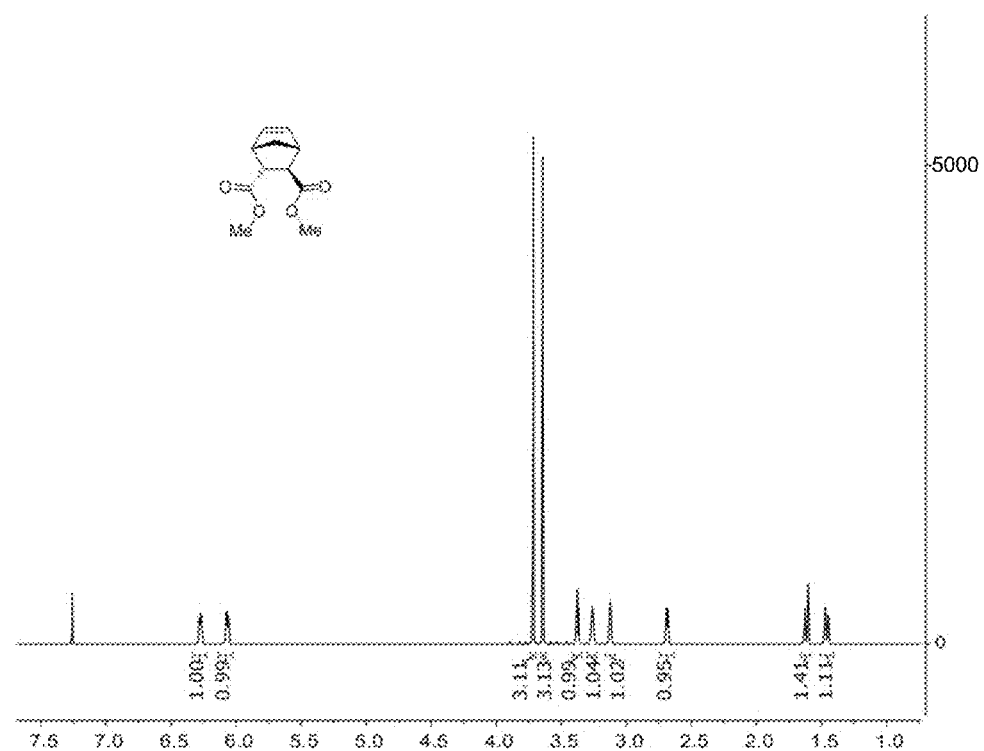
Figure 44B:
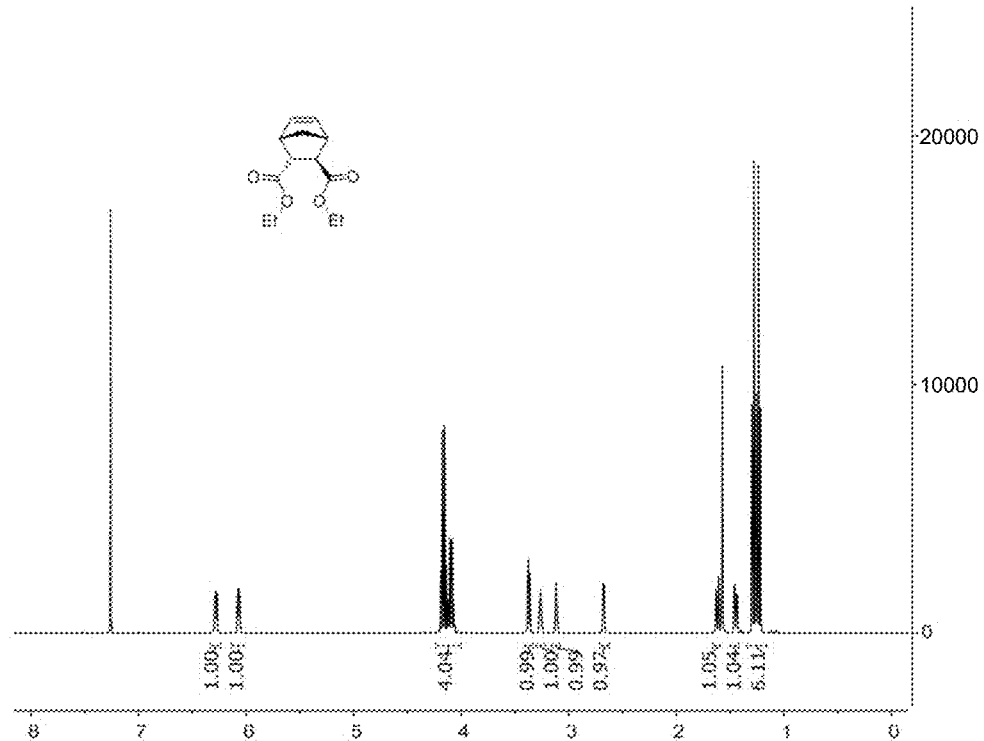
Figure 44C:
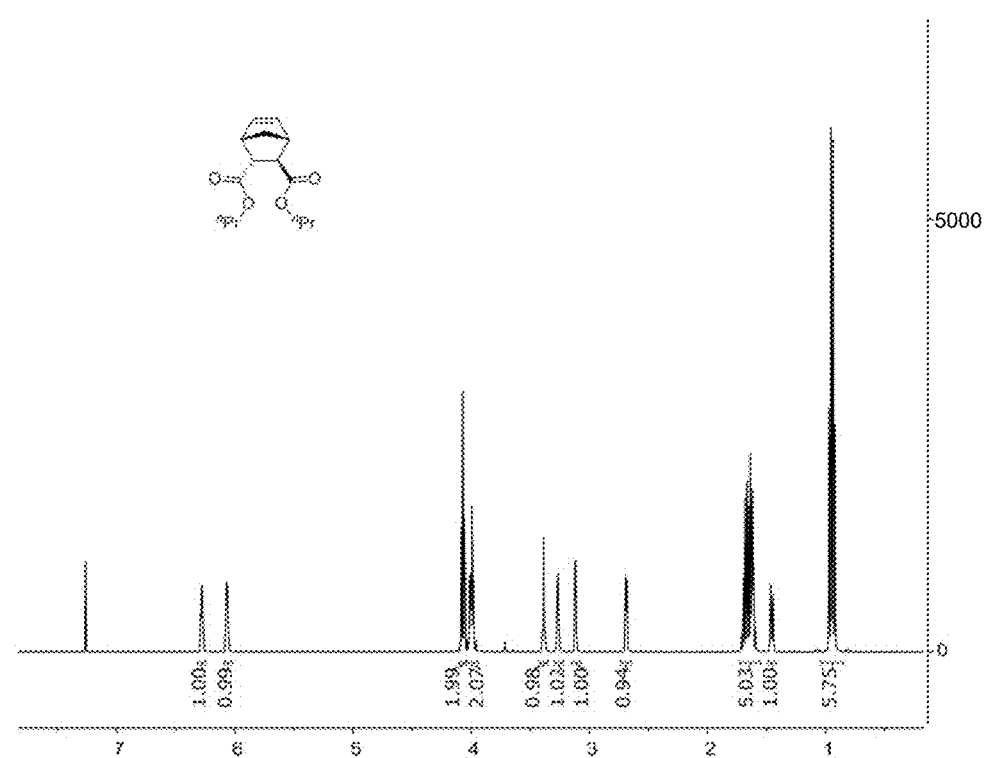
Figure 44D:
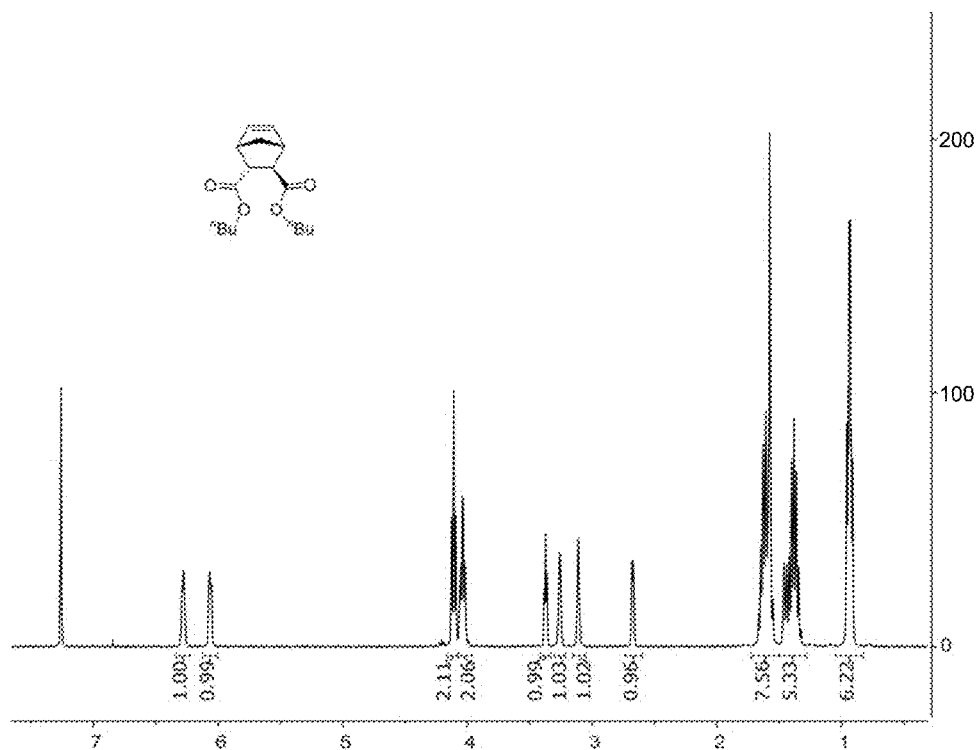
Figure 44E:
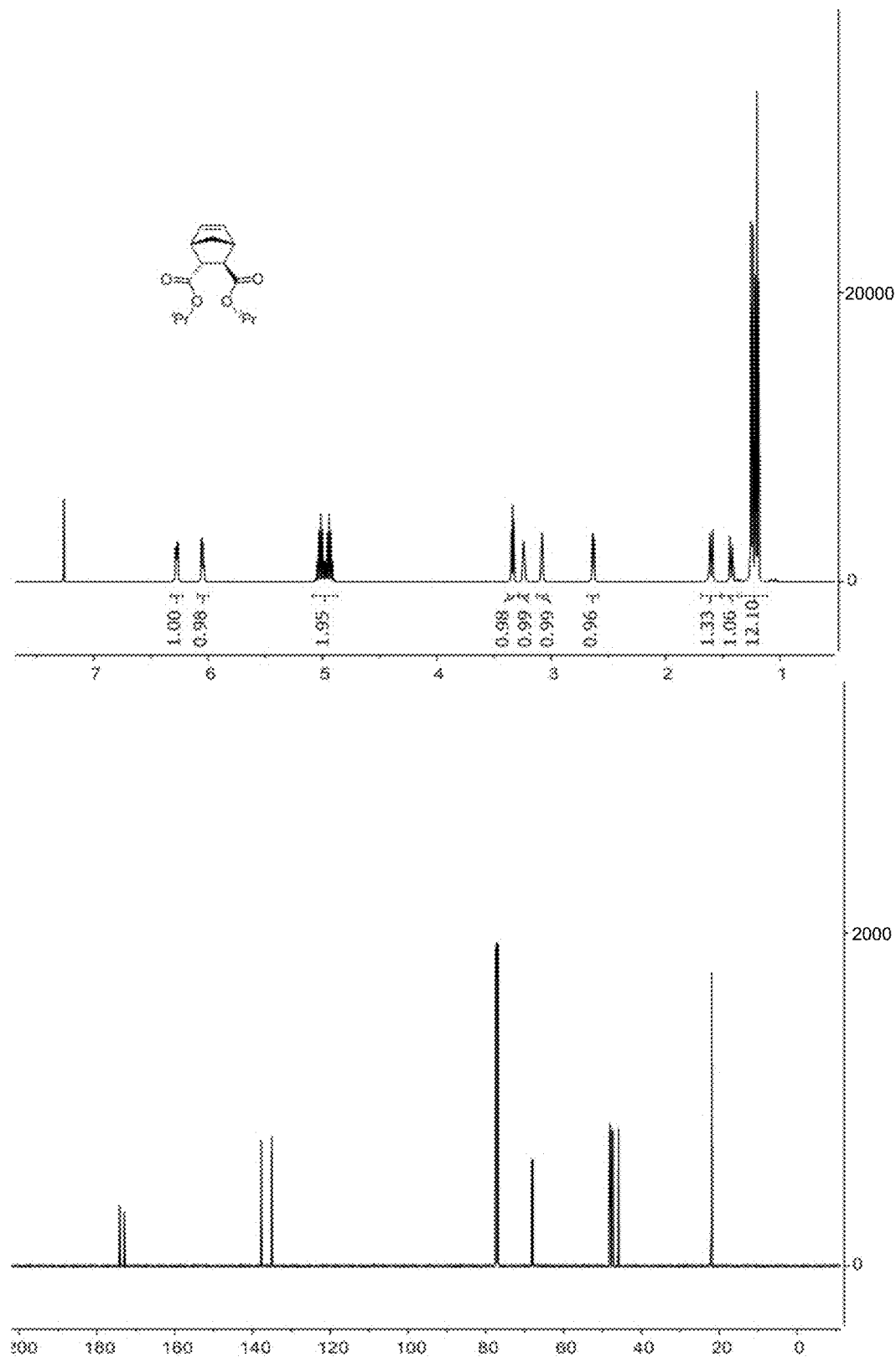
Figure 44F:
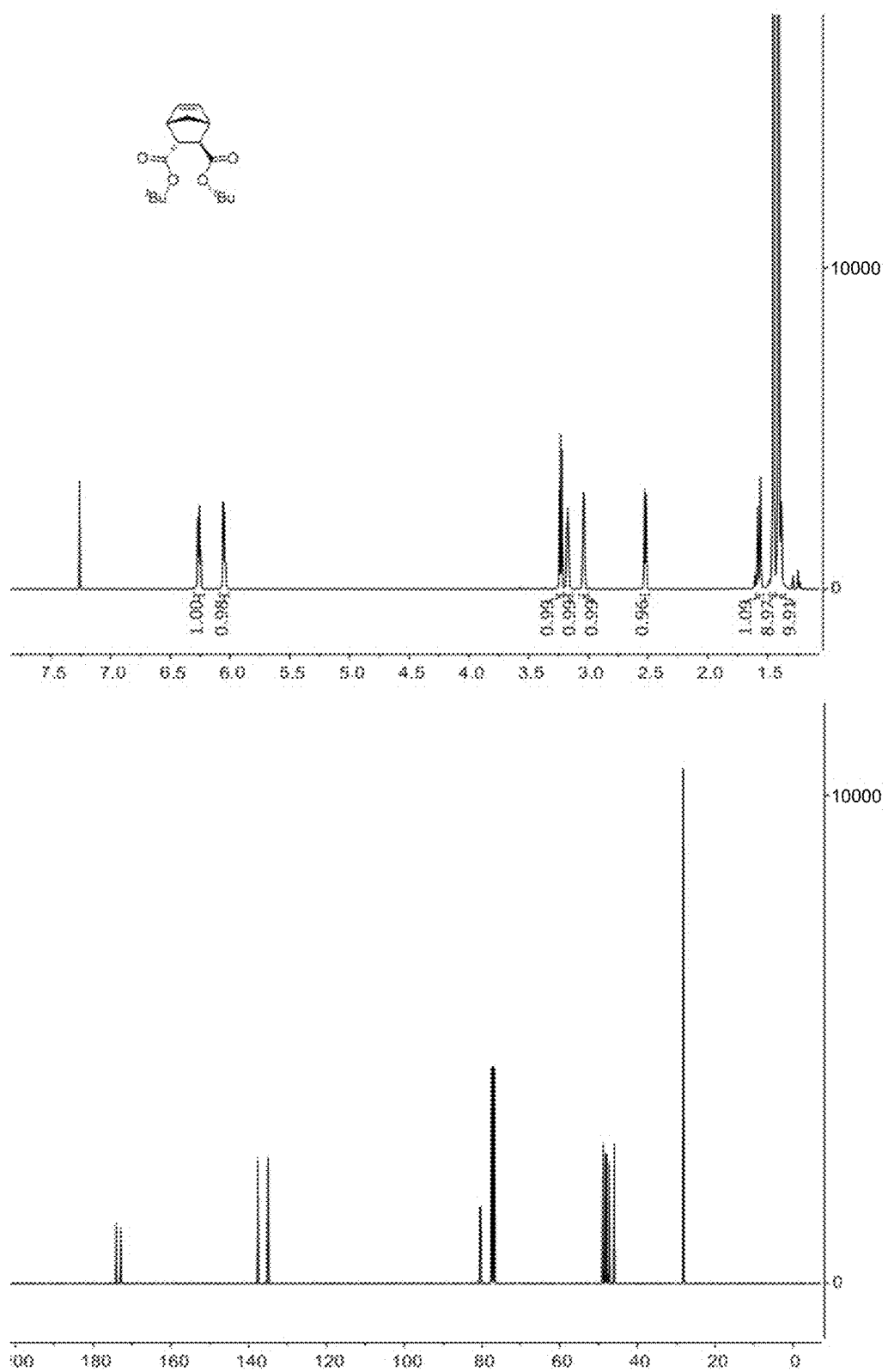
Figure 44G:
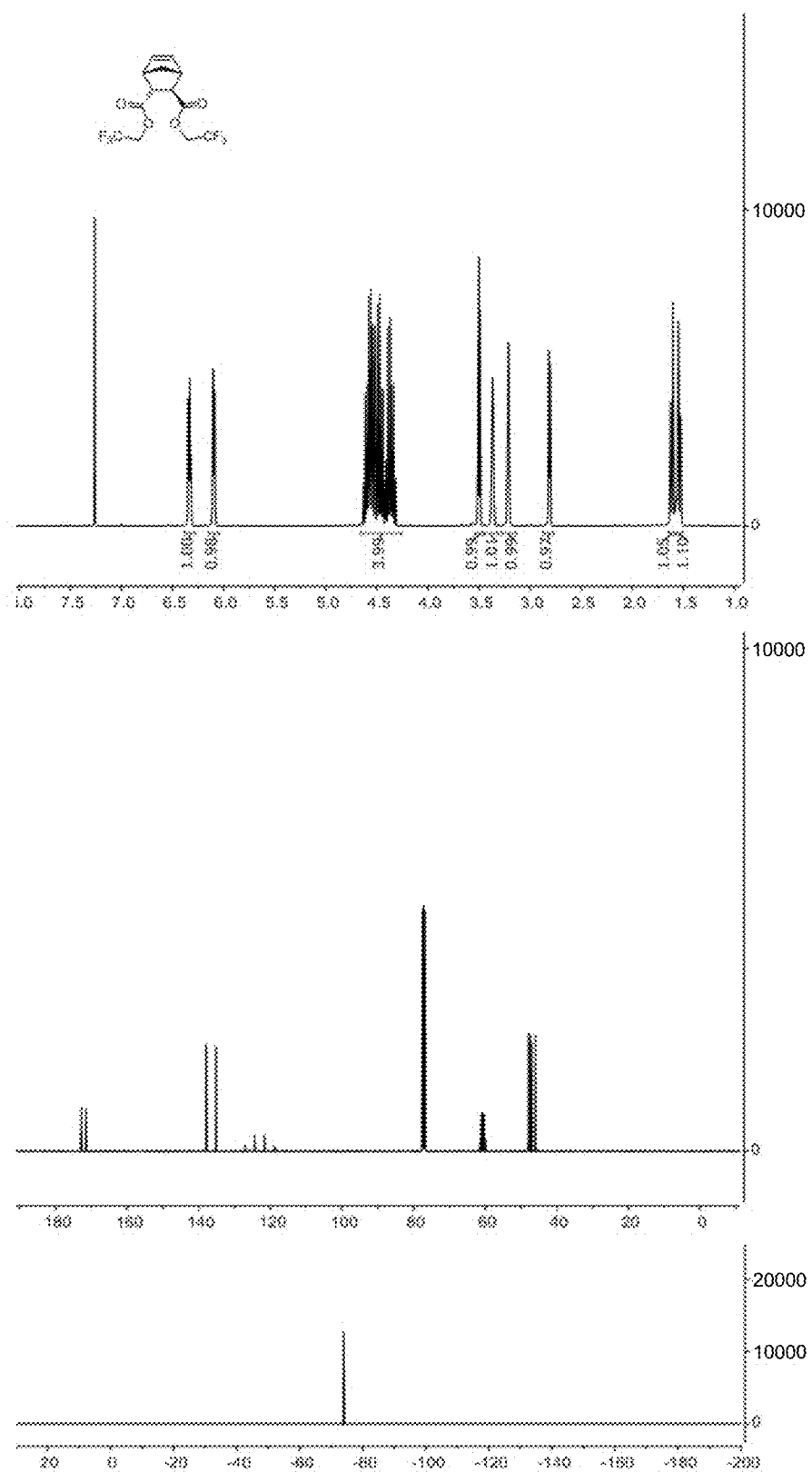
Figure 44H:
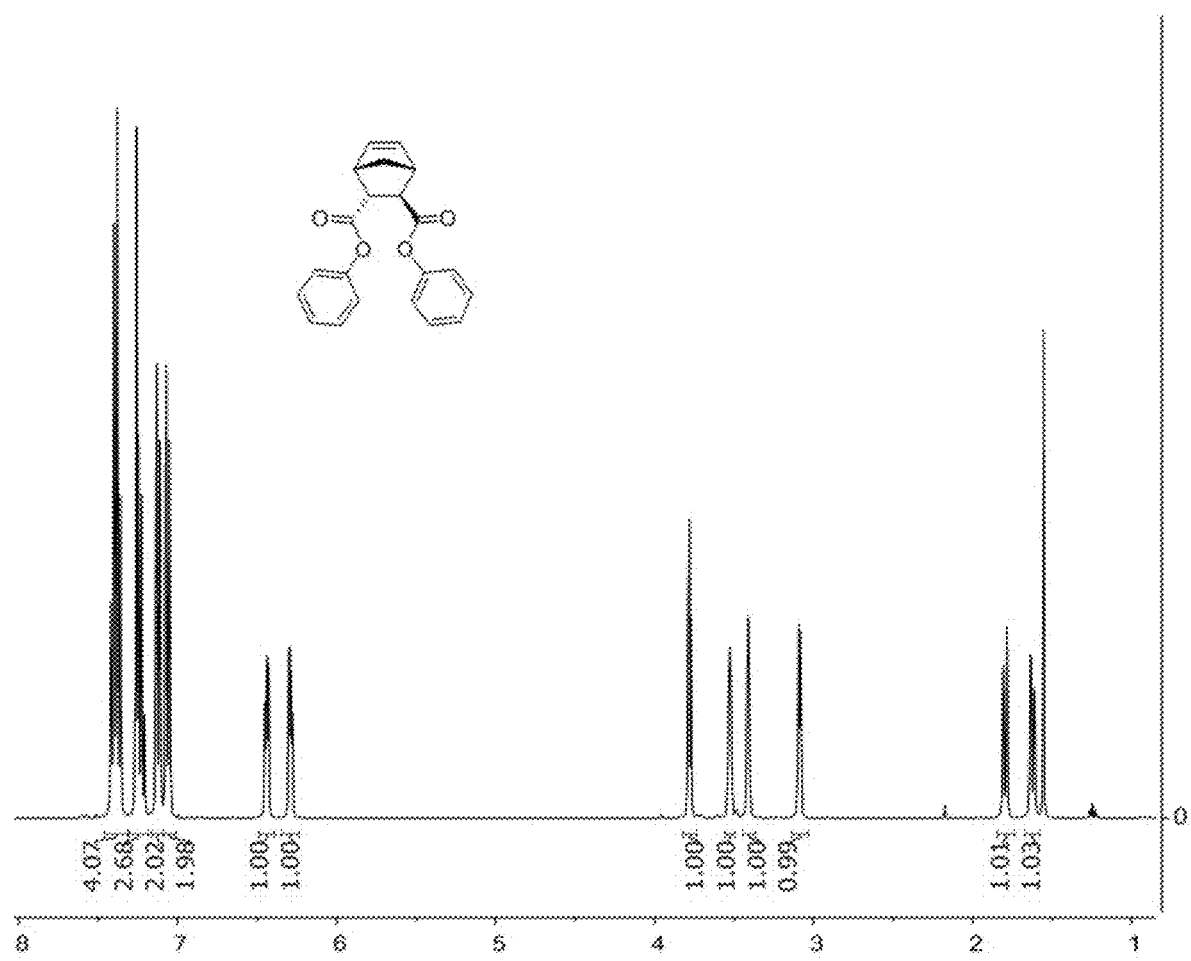
Figure 44I:
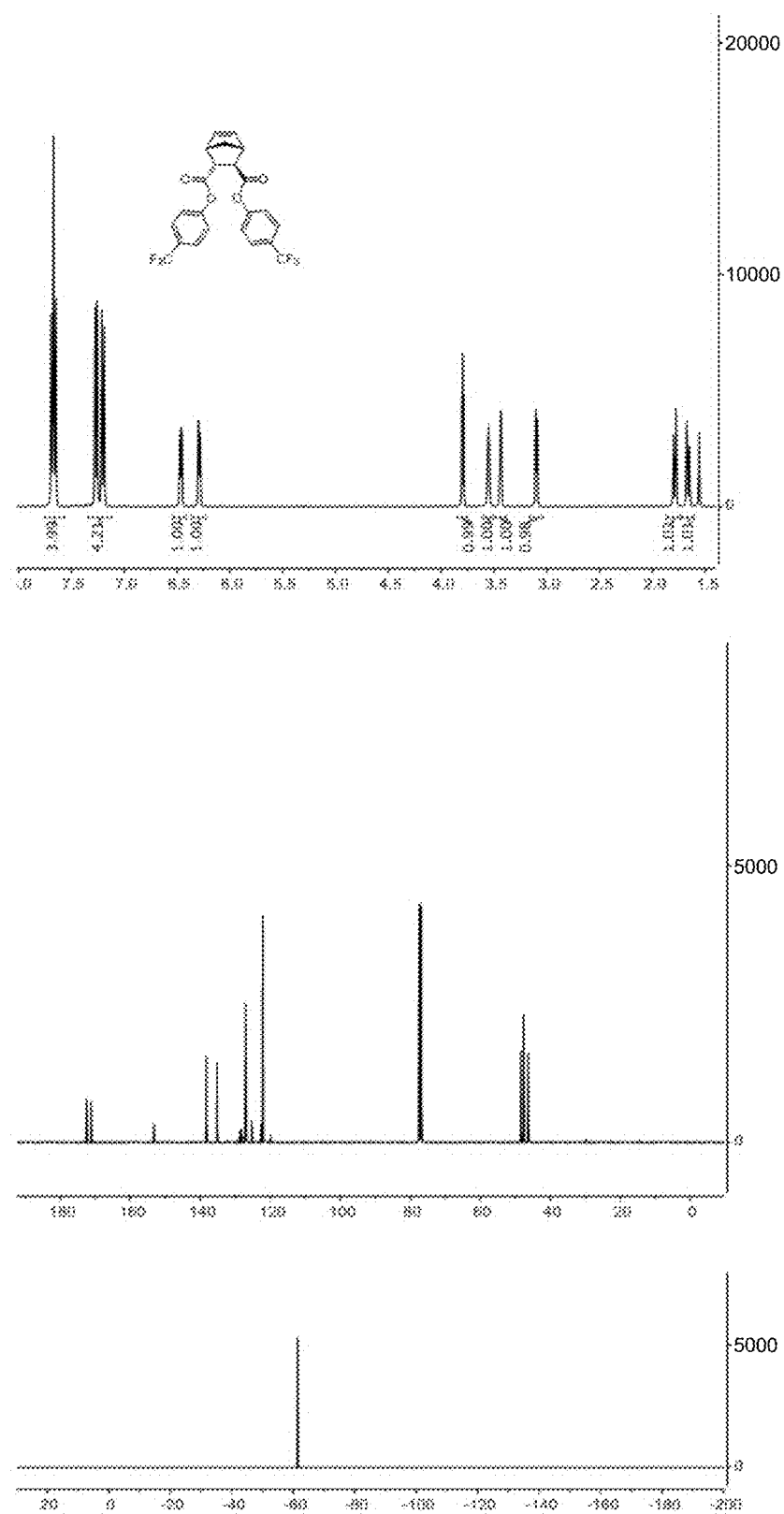
Figure 44J:
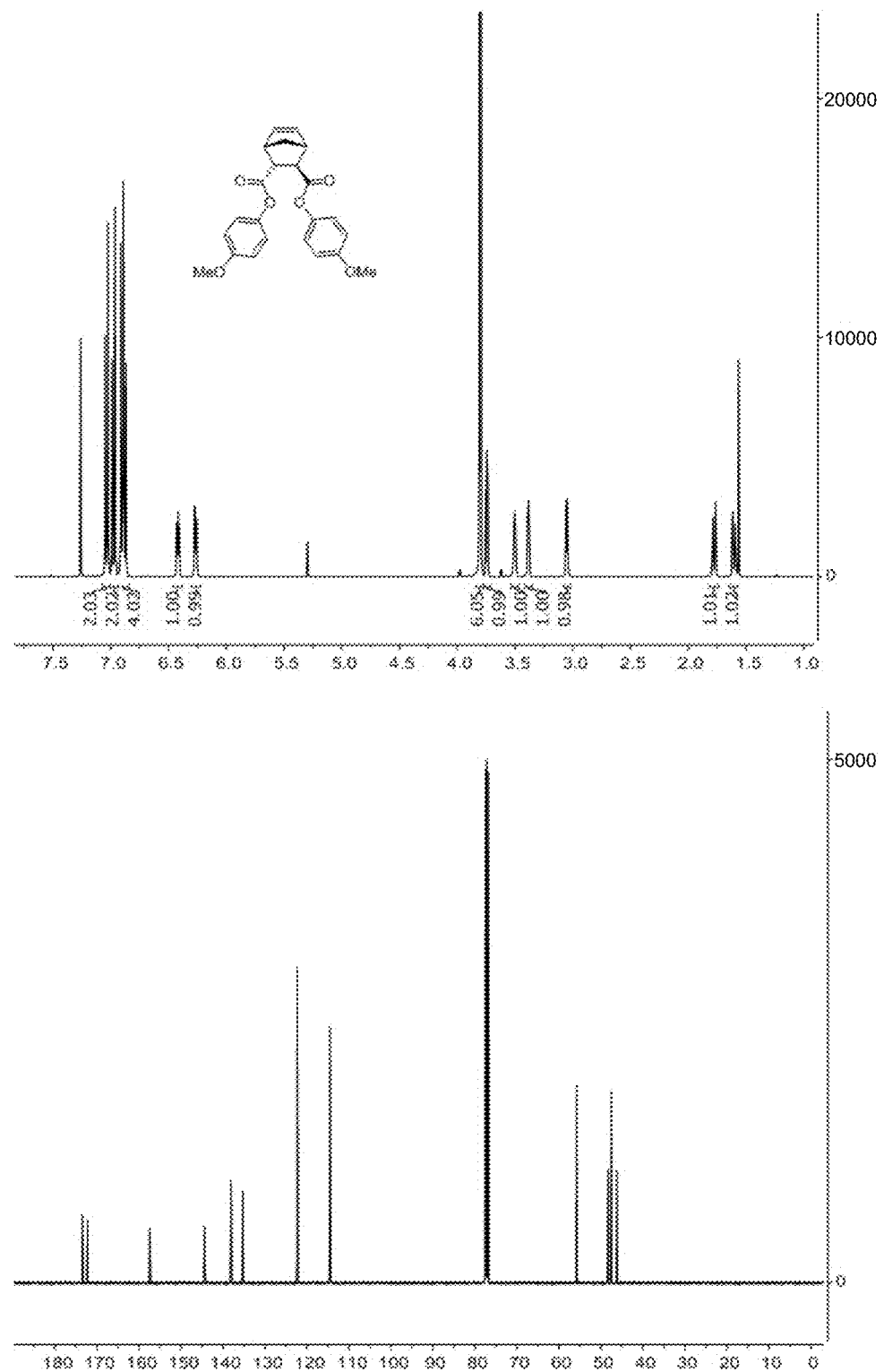

FIGS. 44A-44J. NMR spectra corresponding to certain structures or materials discussed in Examples 2A and 2B (e.g., "1a", "1 b", and "1c", some of which are illustrated in FIG. 23 and FIG. 29B, for example). FIG. 44A. $^1$H NMR spectrum of 1a in CDCl$_3$; FIG. 44B. $^1$H NMR spectrum of 1 b in CDCl$_3$; FIG. 44C. $^1$H NMR spectrum of 1c in CDCl$_3$; FIG. 44D. $^1$H NMR spectrum of 1d in CDCl$_3$; FIG. 44E. $^1$H (top) and $^{13}$C (bottom) NMR spectra of 1e in CDCl$_3$; FIG. 44F. $^1$H (top) and $^{13}$C (bottom) NMR spectra of 1f in CDCl$_3$; FIG. 44G. $^1$H (top), $^{13}$C (middle), and $^{19}$F (bottom) NMR spectra of 1g in CDCl$_3$; FIG. 44H. $^1$H NMR spectrum of 1h in CDCl$_3$; FIG. 44I. $^1$H (top), $^{13}$C (middle), and $^{19}$F (bottom) NMR spectra of 1i in CDCl$_3$; FIG. 44J. $^1$H (top) and $^{13}$C (bottom) NMR spectra of 1j in CDCl$_3$.

Figure 45A:
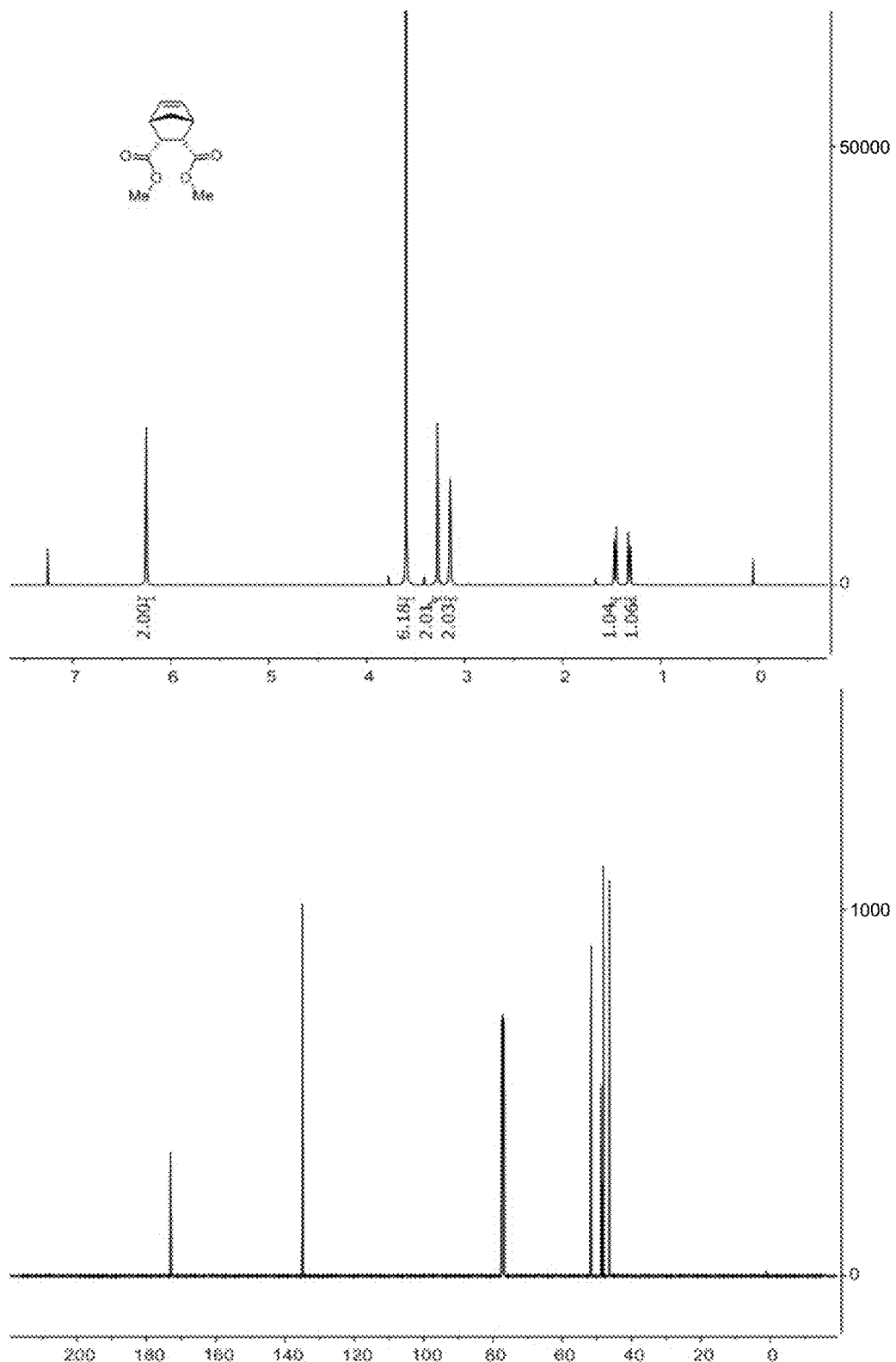
Figure 45B:
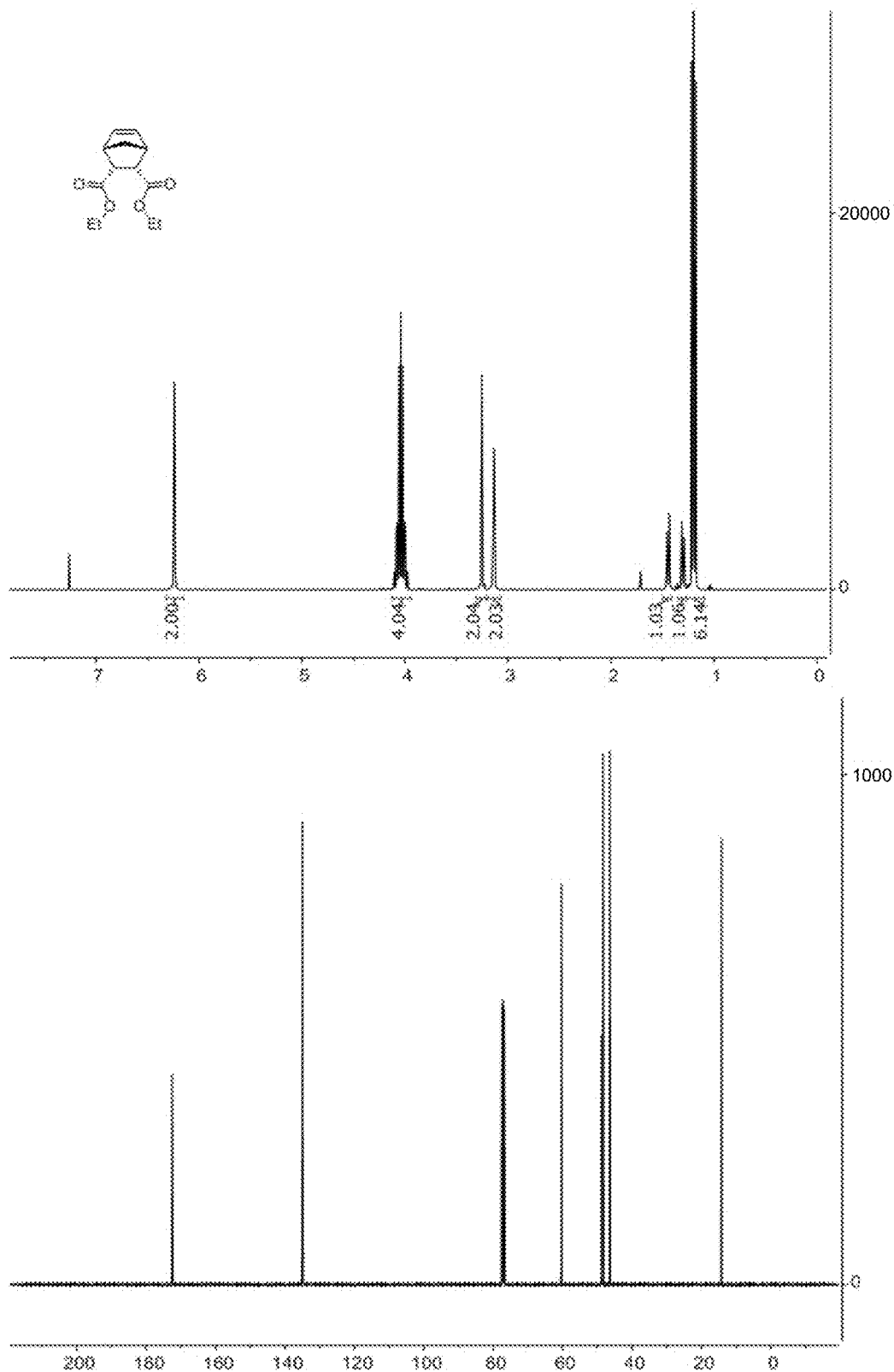
Figure 45C:
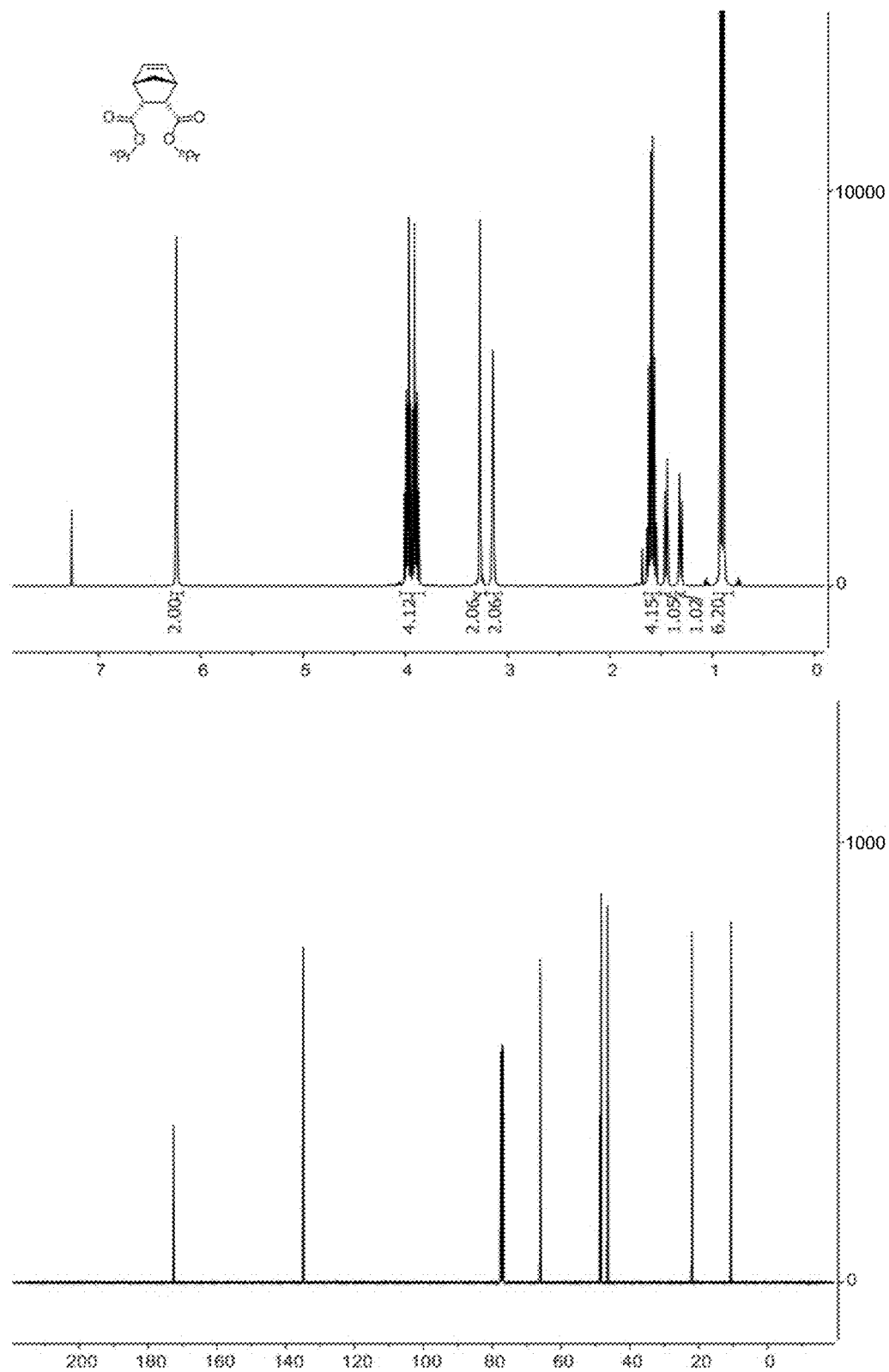
Figure 45D:
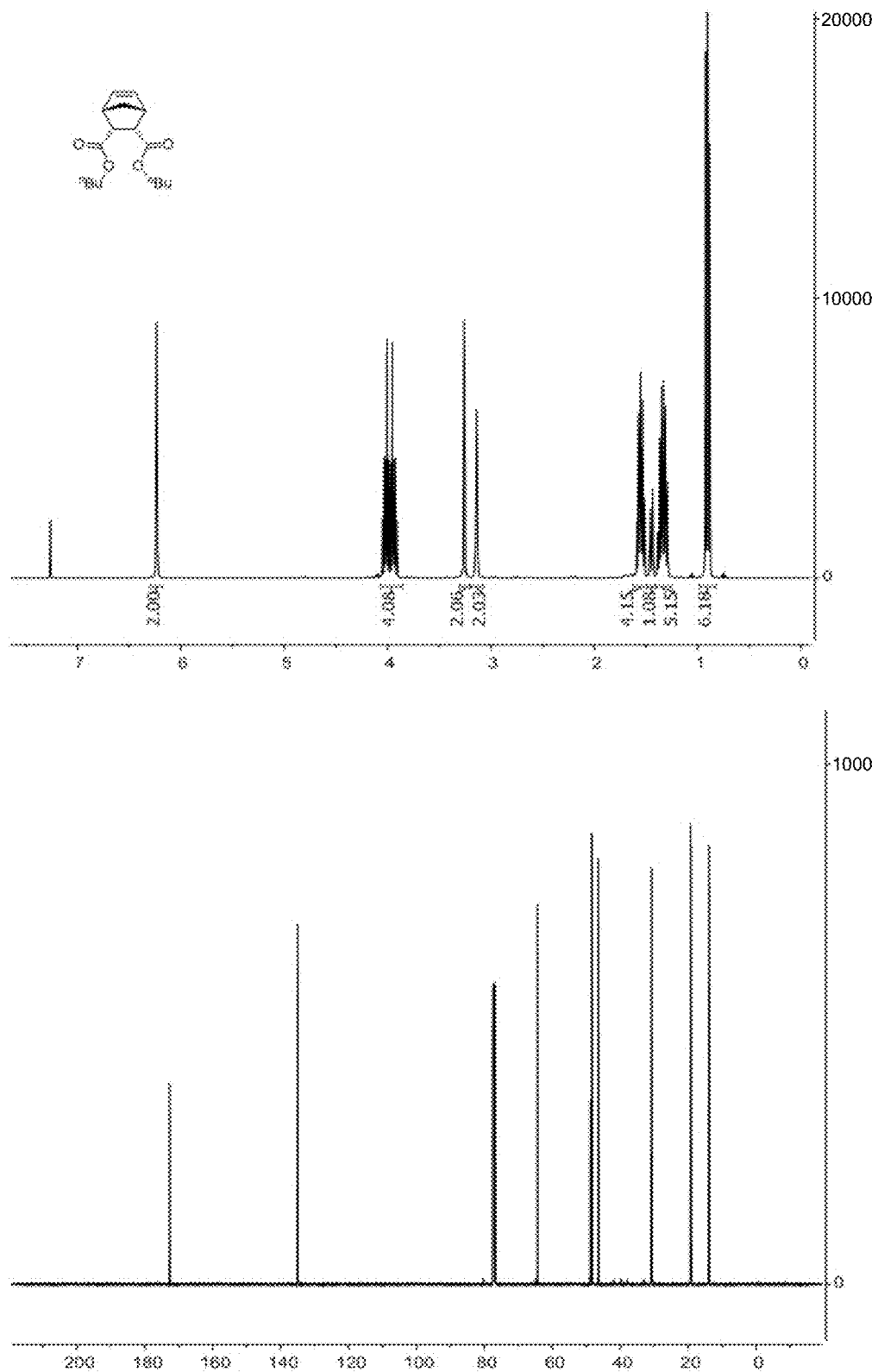

FIGS. 45A-45D. NMR spectra corresponding to certain structures or materials discussed in Examples 2A and 2B (e.g., "2a", "2b", and "2c", some of which are illustrated in FIG. 23 and FIG. 29B, for example). FIG. 45A. $^1$H (top) and $^{13}$C (bottom) NMR spectra of 2a in CDCl$_3$; FIG. 45B. $^1$H (top) and $^{13}$C (bottom) NMR spectra of 2b in CDCl$_3$; FIG. 45C. $^1$H (top) and $^{13}$C (bottom) NMR spectra of 2c in CDCl$_3$; FIG. 45D. $^1$H (top) and $^{13}$C (bottom) NMR spectra of 2d in CDCl$_3$.

Figure 46A:
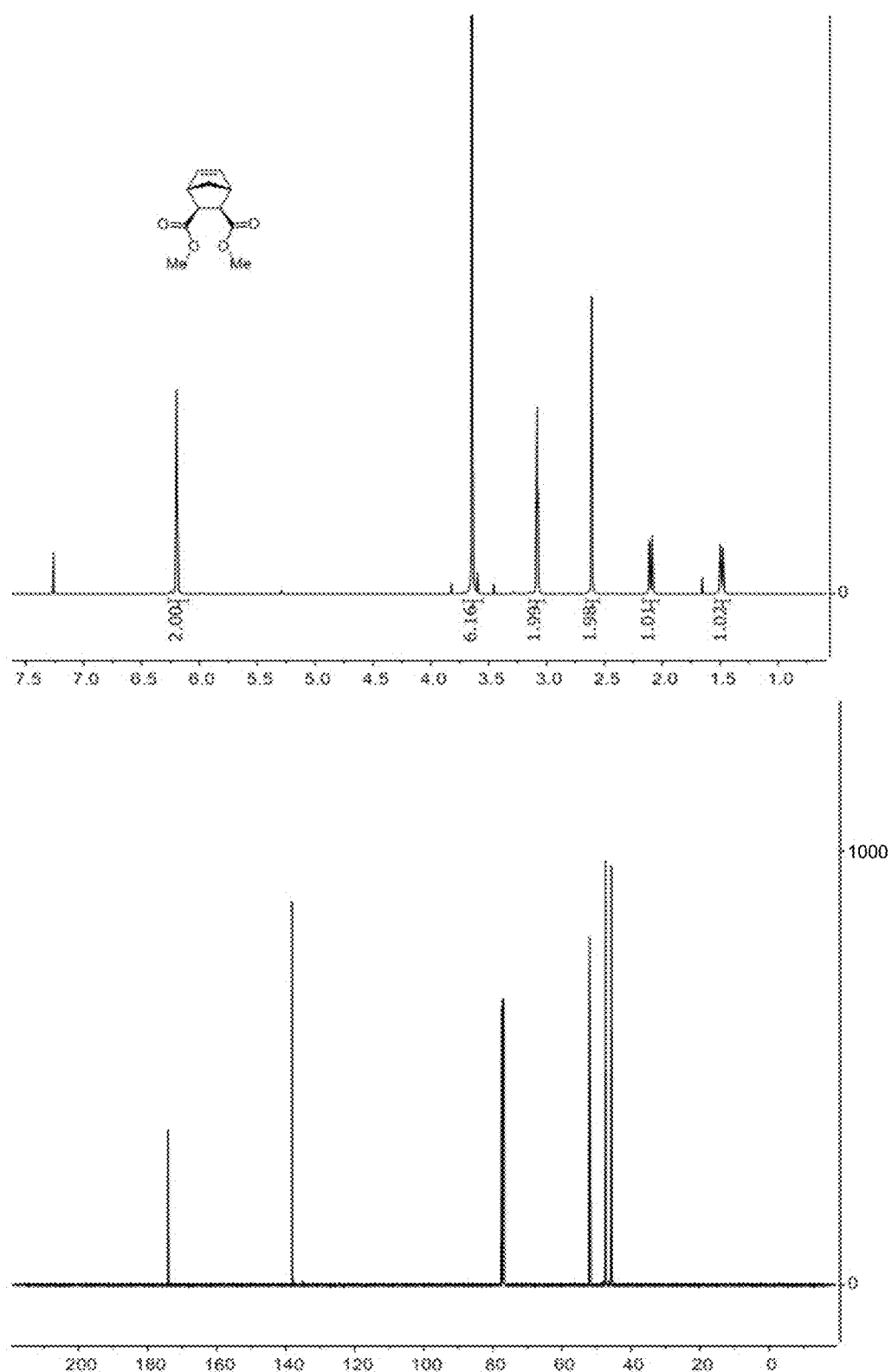
Figure 46B:
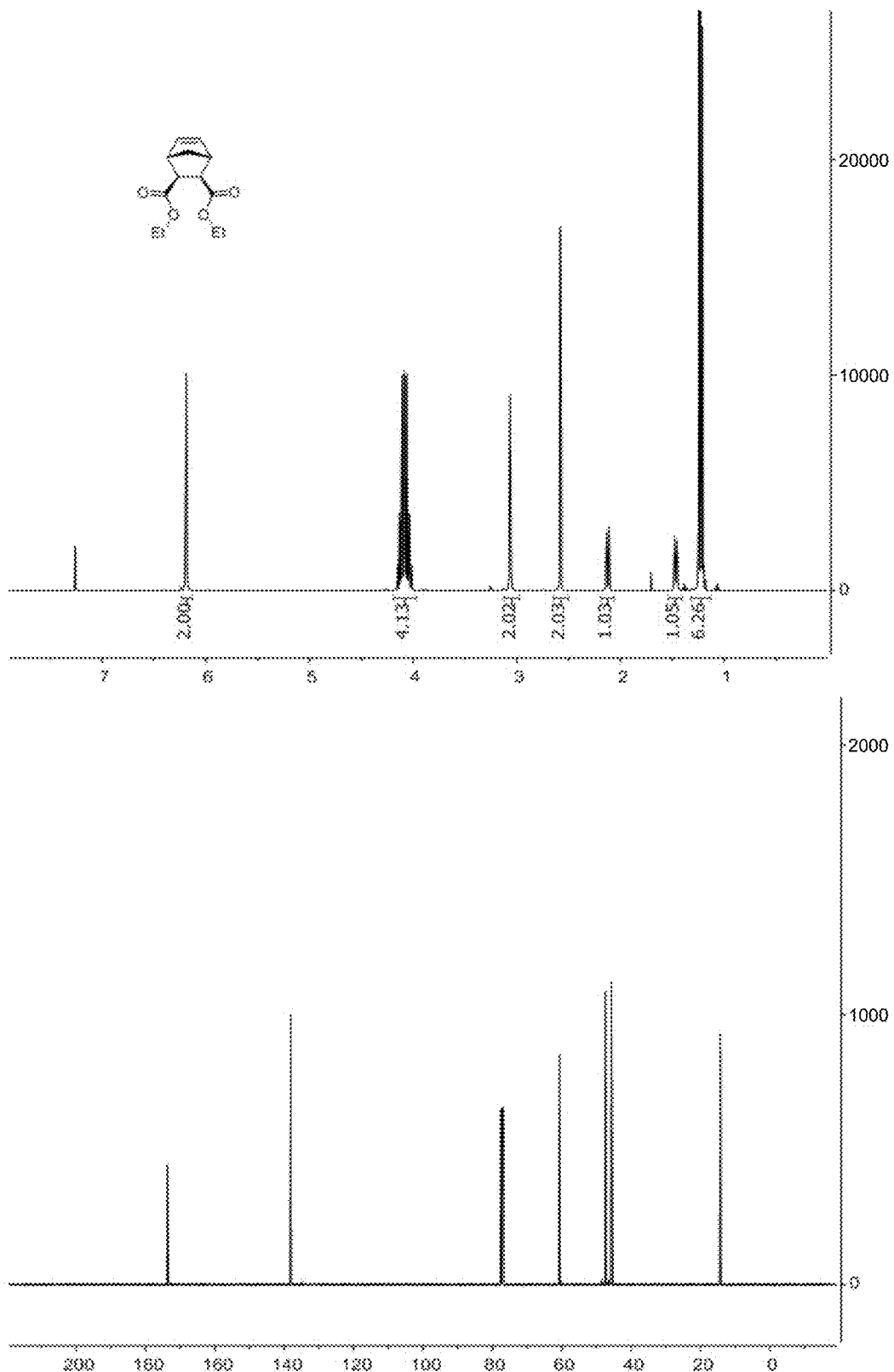
Figure 46C:
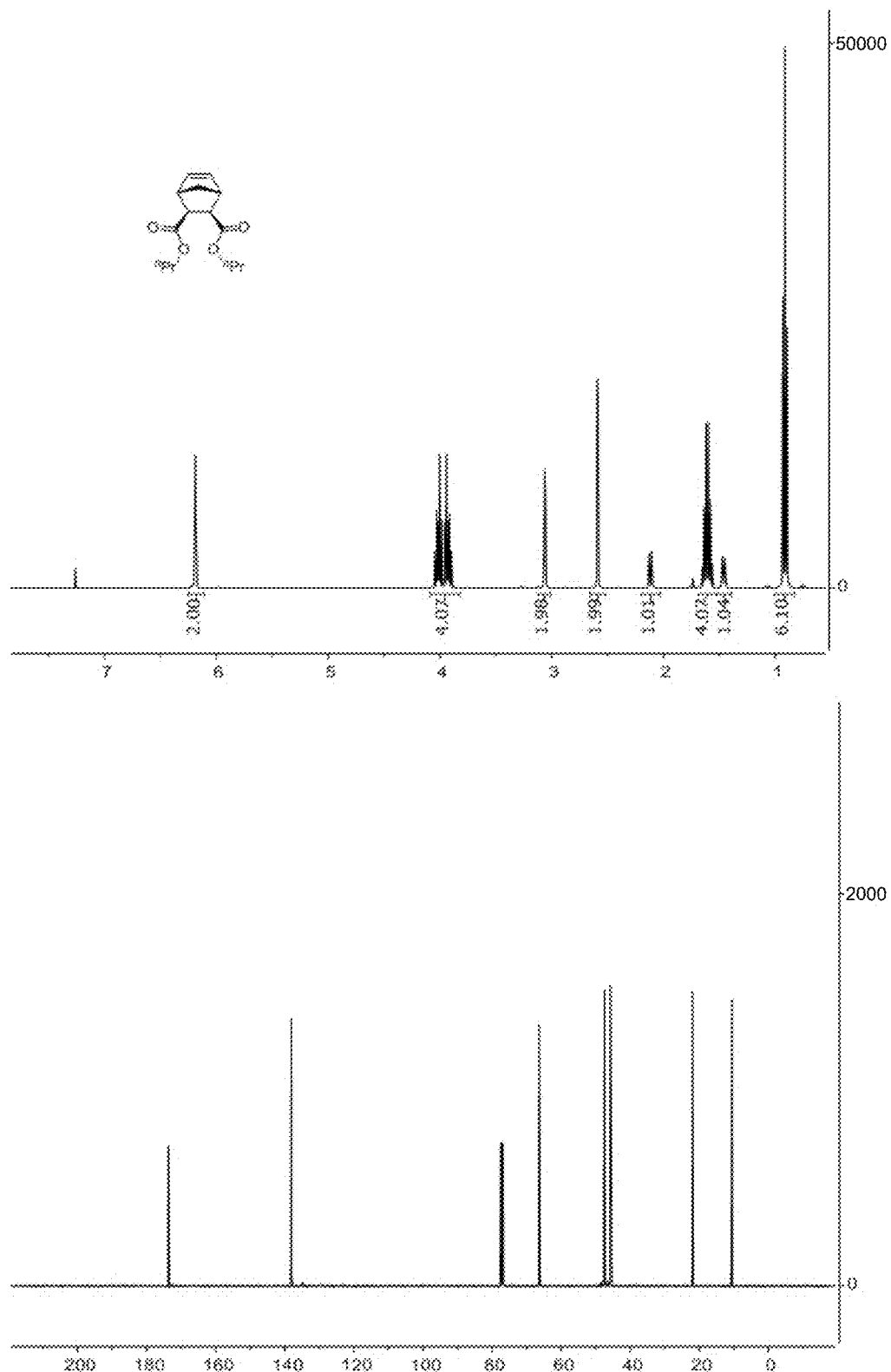
Figure 46D:
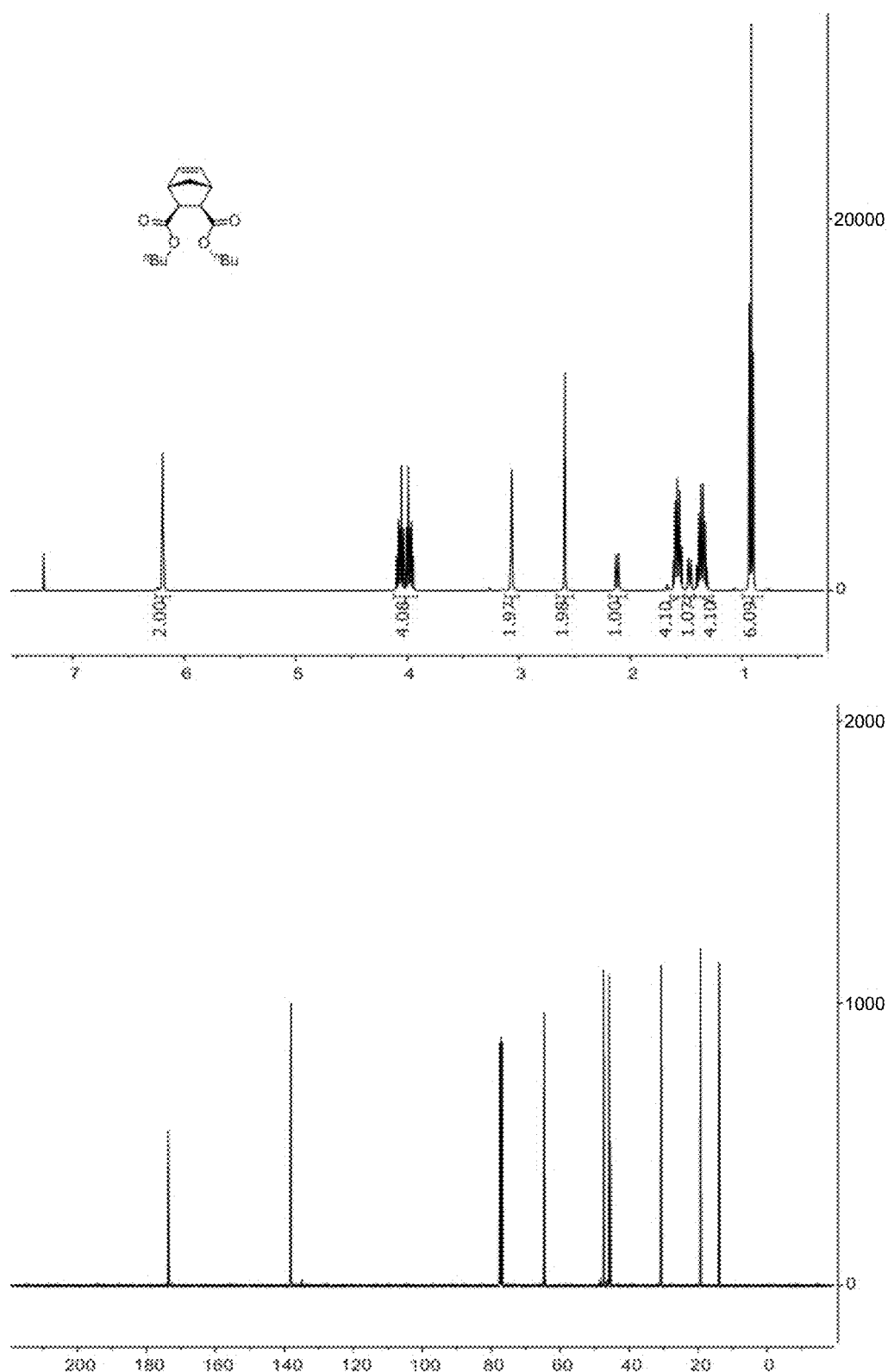

FIGS. 46A-46D. NMR spectra corresponding to certain structures or materials discussed in Examples 2A and 2B (e.g., "3a", "3b", and "3c", some of which are illustrated in FIG. 23 and FIG. 29B, for example). FIG. 46A. $^1$H (top) and $^{13}$C (bottom) NMR spectra of 3a in CDCl$_3$; FIG. 46B. $^1$H (top) and $^{13}$C (bottom) NMR spectra of 3b in CDCl$_3$; FIG. 46C. $^1$H (top) and $^{13}$C (bottom) NMR spectra of 3c in CDCl$_3$; FIG. 46D. $^1$H (top) and $^{13}$C (bottom) NMR spectra of 3d in CDCl$_3$.

Figure 47A:
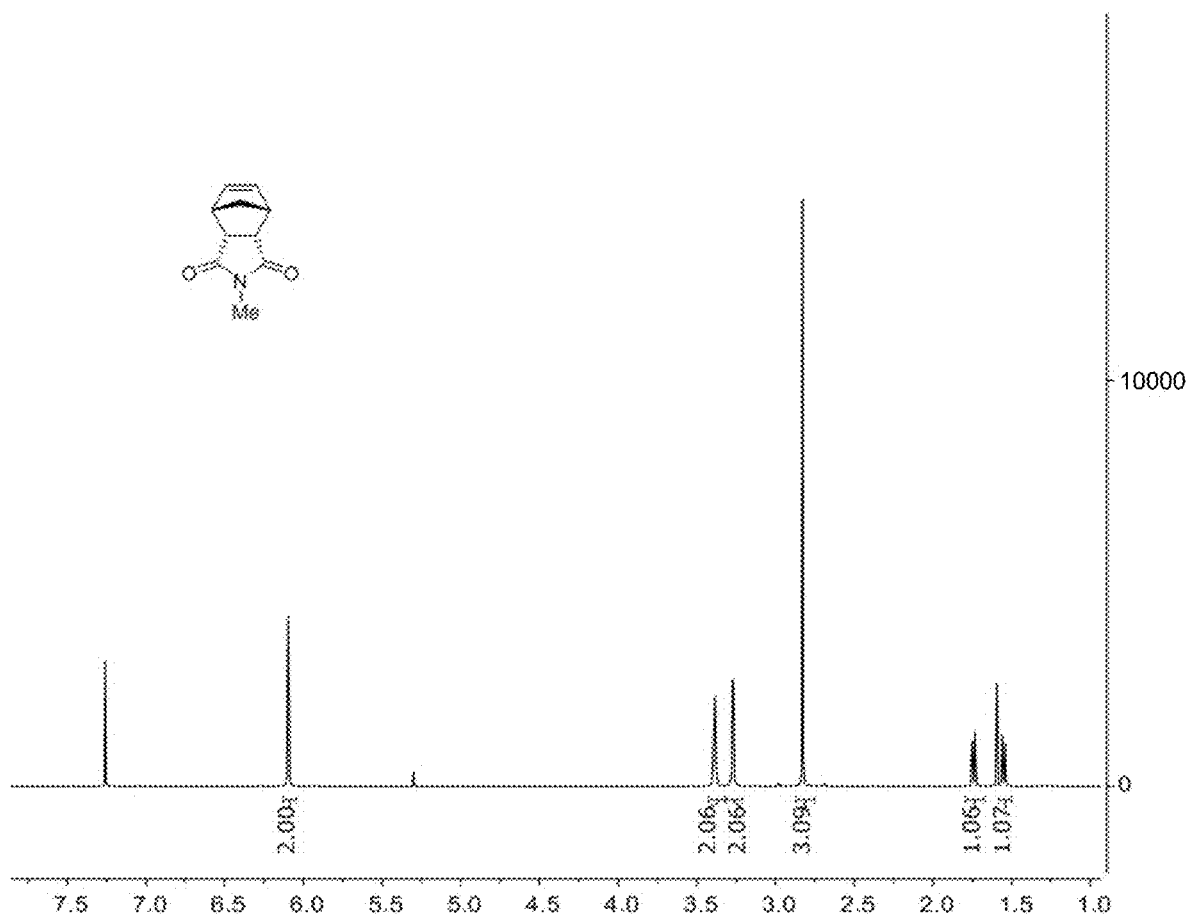
Figure 47B:
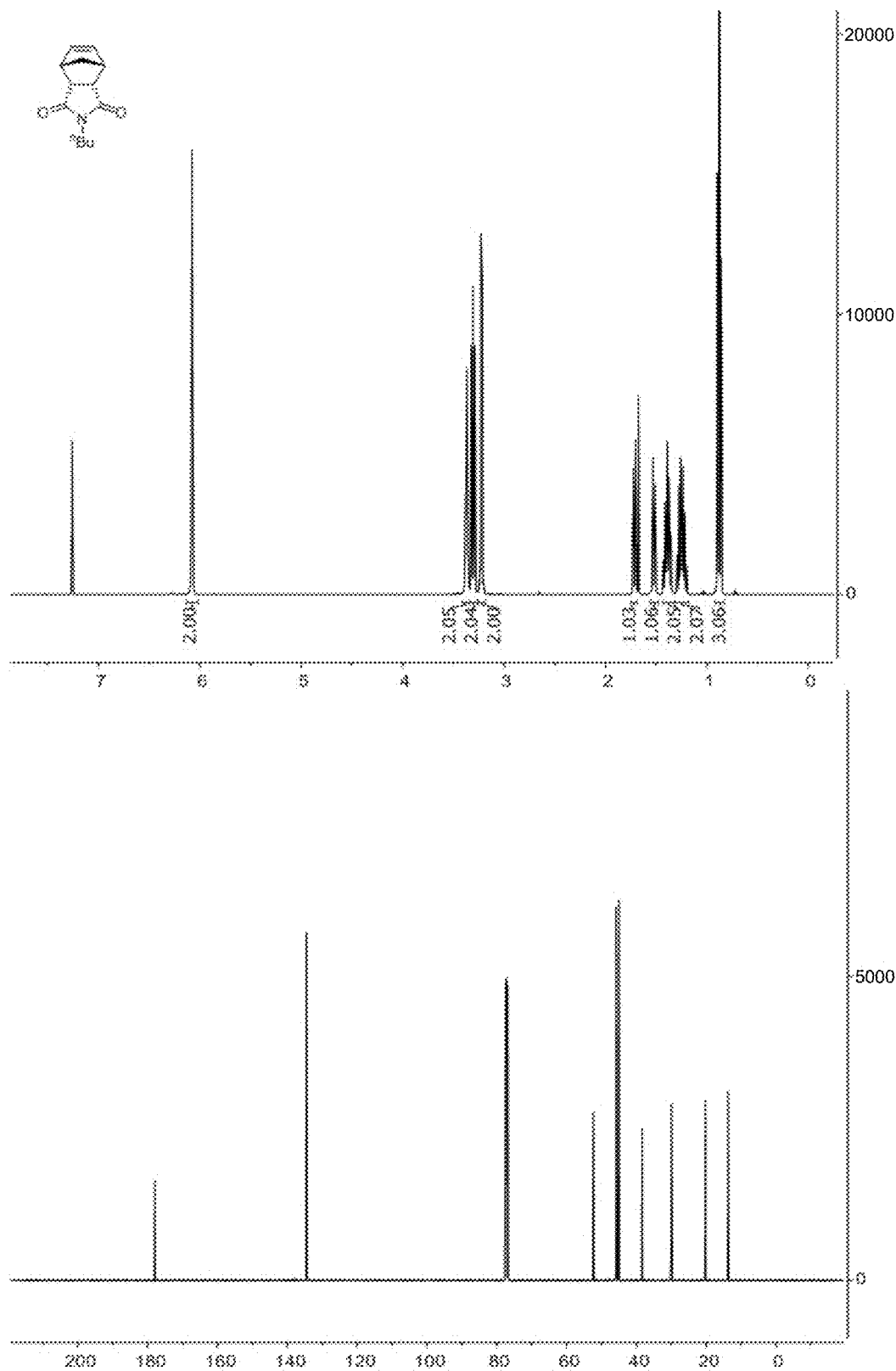
Figure 47C:
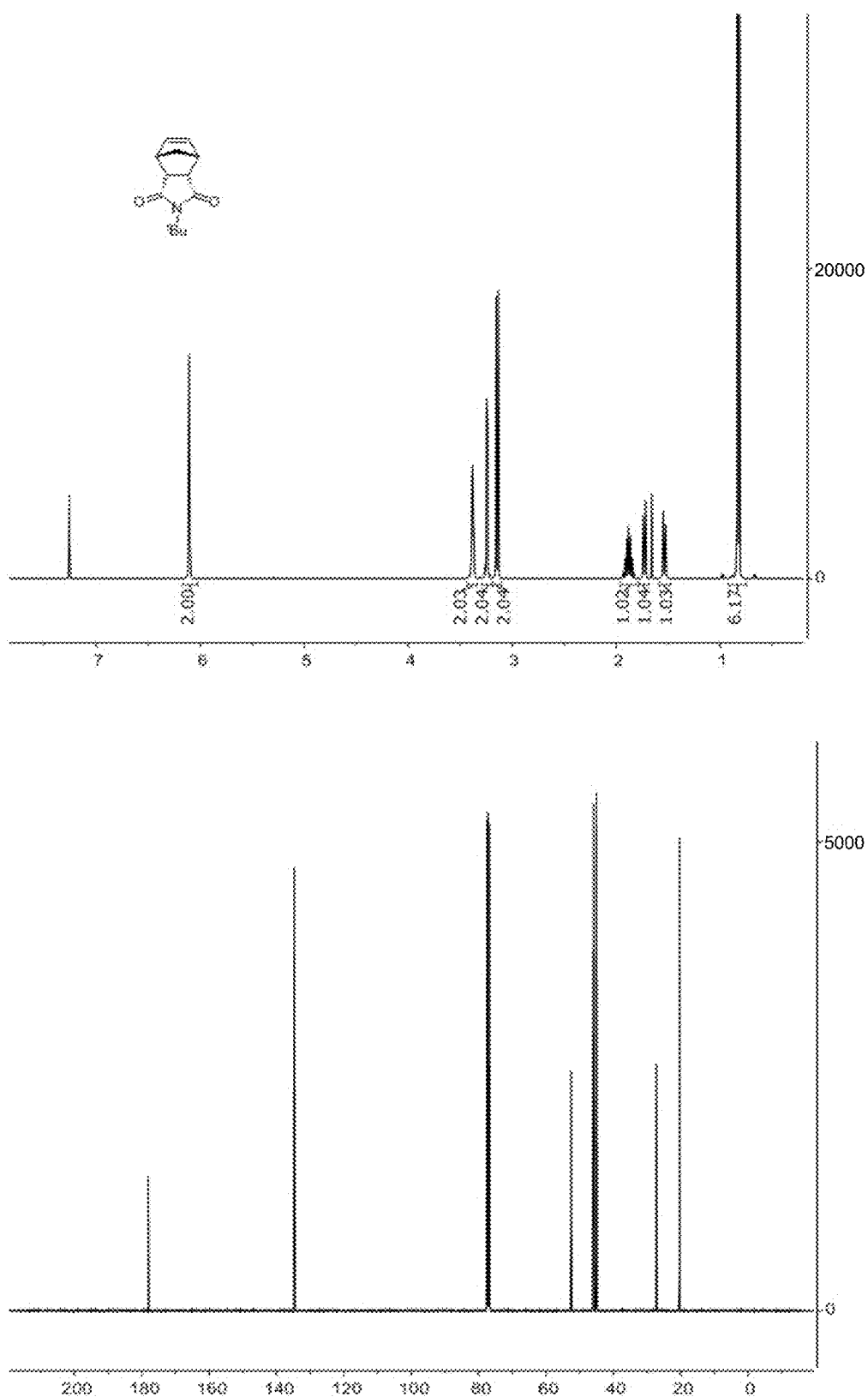

FIGS. 47A-47C. NMR spectra corresponding to certain structures or materials discussed in Examples 2A and 2B (e.g., "4a", "4b", and "4c", some of which are illustrated in FIG. 23 and FIG. 29B, for example). FIG. 47A. $^1$H NMR spectrum of 4a in CDCl$_3$; FIG. 47B. $^1$H (top) and $^{13}$C (bottom) NMR spectra of 4b in CDCl$_3$; FIG. 47C. $^1$H (top) and $^{13}$C (bottom) NMR spectra of 4c in CDCl$_3$.

Figure 48A:
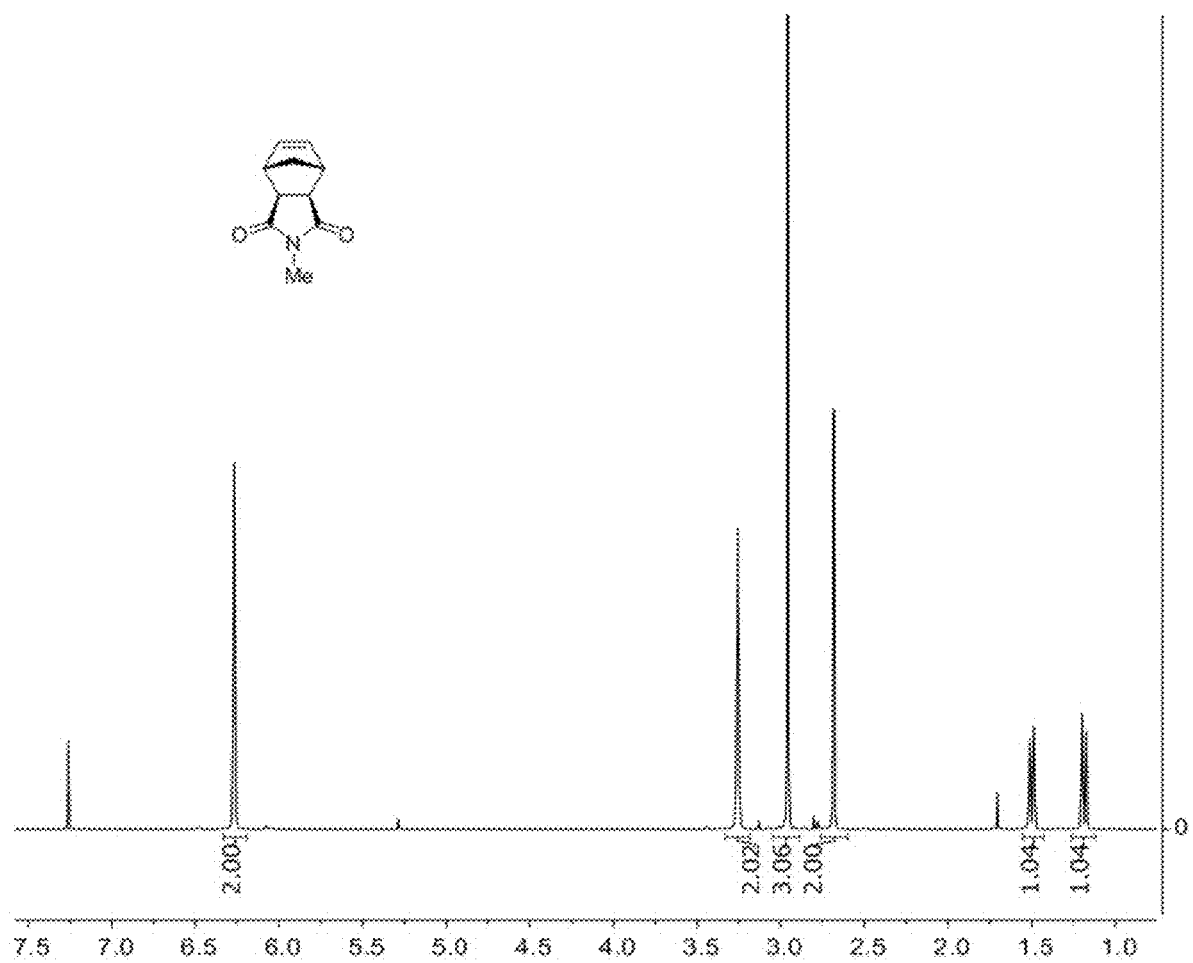
Figure 48B:
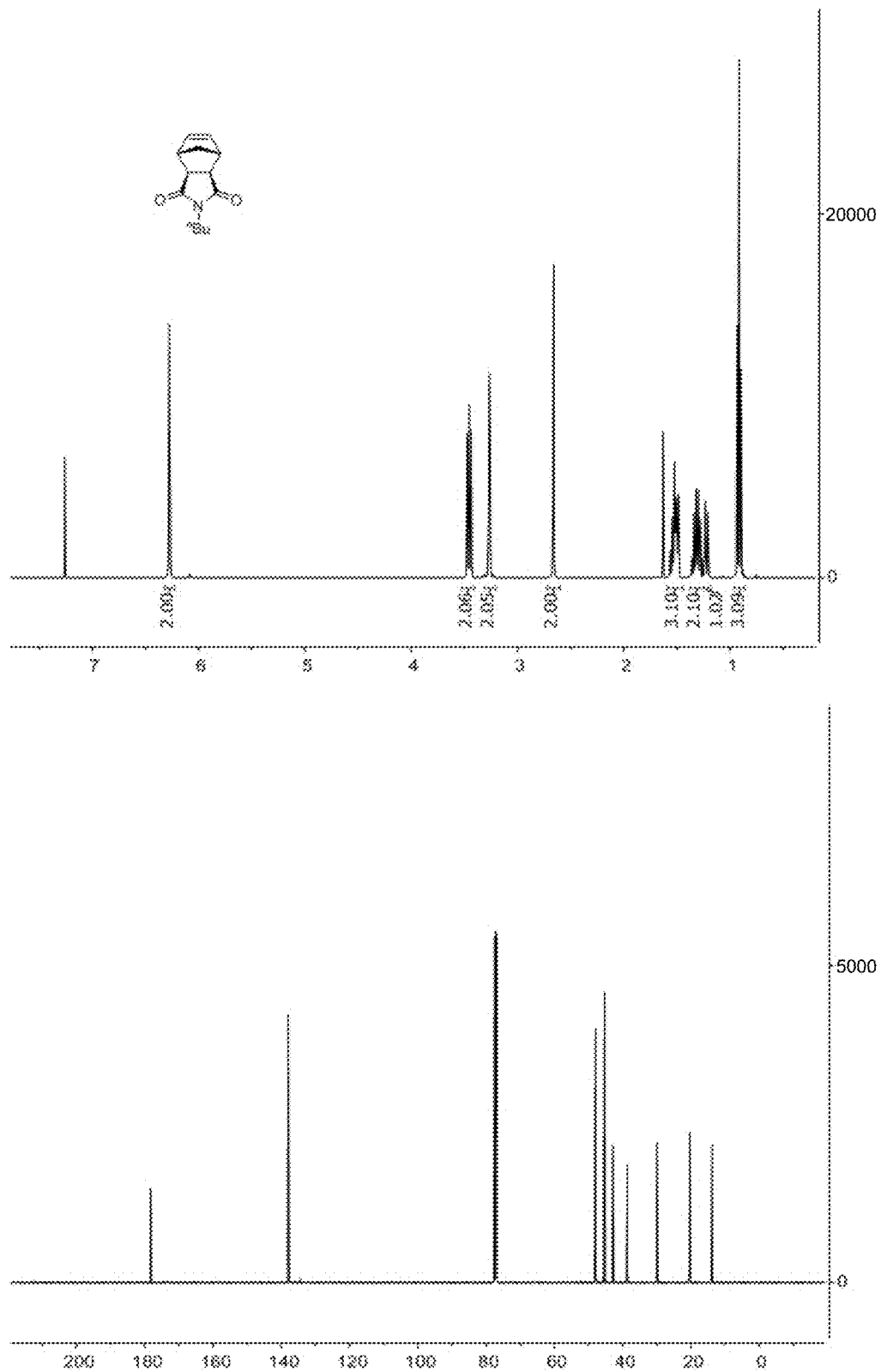
Figure 48C:
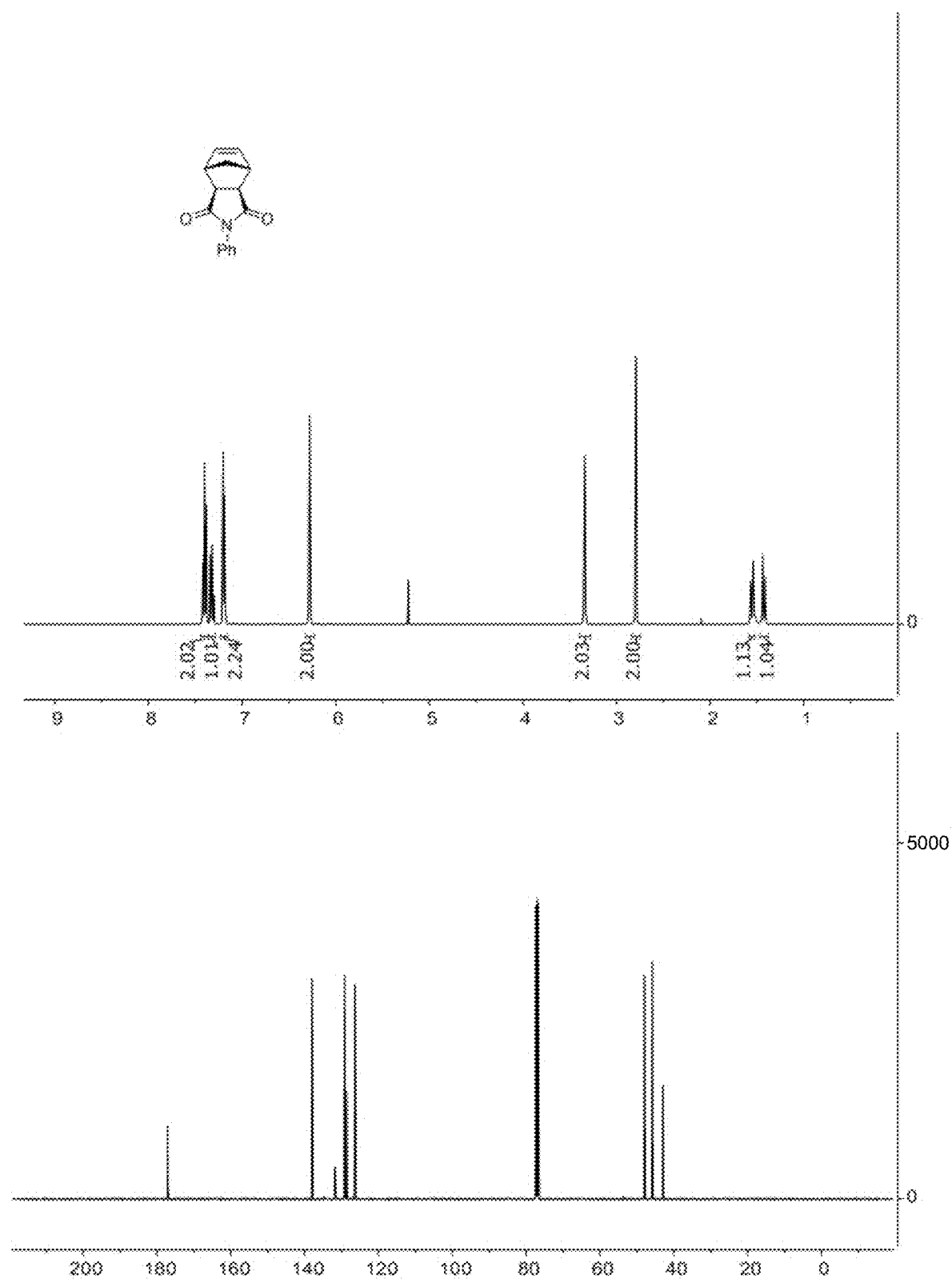

FIGS. 48A-48C. NMR spectra corresponding to certain structures or materials discussed in Examples 2A and 2B (e.g., "5a", "5b", and "5c", some of which are illustrated in FIG. 23 and FIG. 29B, for example). FIG. 48A. $^1$H NMR spectrum of 5a in CDCl$_3$; FIG. 48B. $^1$H (top) and $^{13}$C (bottom) NMR spectra of 5b in CDCl$_3$; FIG. 48C. $^1$H (top) and $^{13}$C (bottom) NMR spectra of 5c in CDCl$_3$.

Figure 49A:
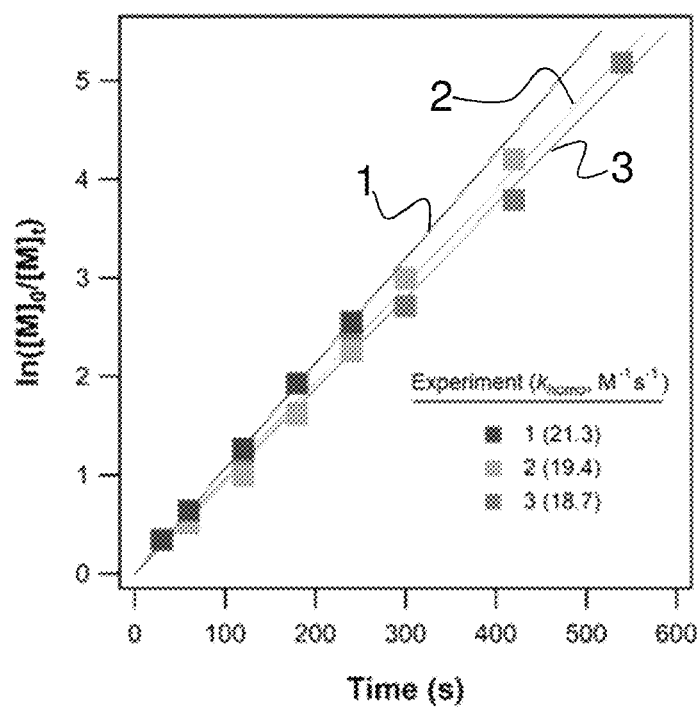
Figure 49B:
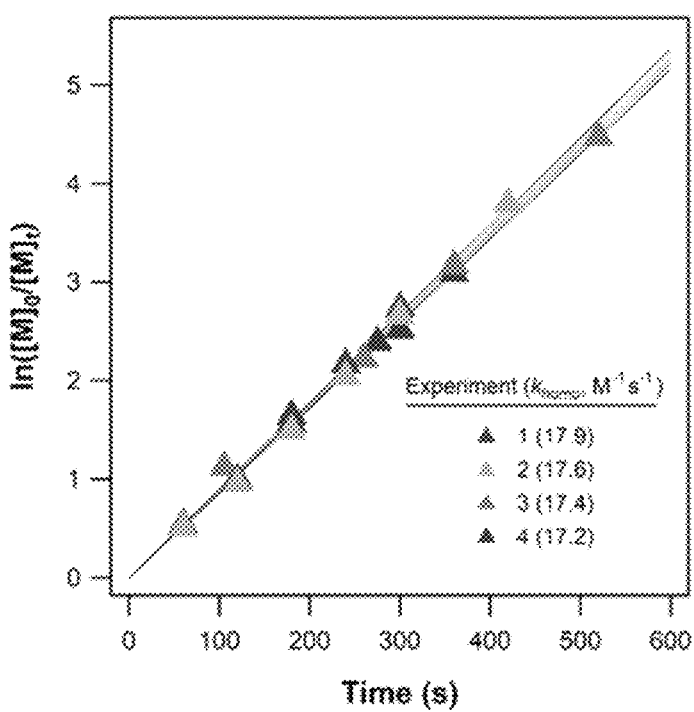

FIGS. 49A-49B. Plots of ln([M]$_0$/[M]$_t$) vs. time used to determine rate constants for certain materials corresponding to Examples 2A and 2B. Representative repeated runs to determine rate constants ($k_{homo}$) for (FIG. 49A) 1a, endo, exo-norbornenyl dimethylester; and (FIG. 49B) PLA, poly ($_{D,L}$-lactide) macromonomer. $k_{homo}$ is calculated from Eq. 1.

Figure 50:
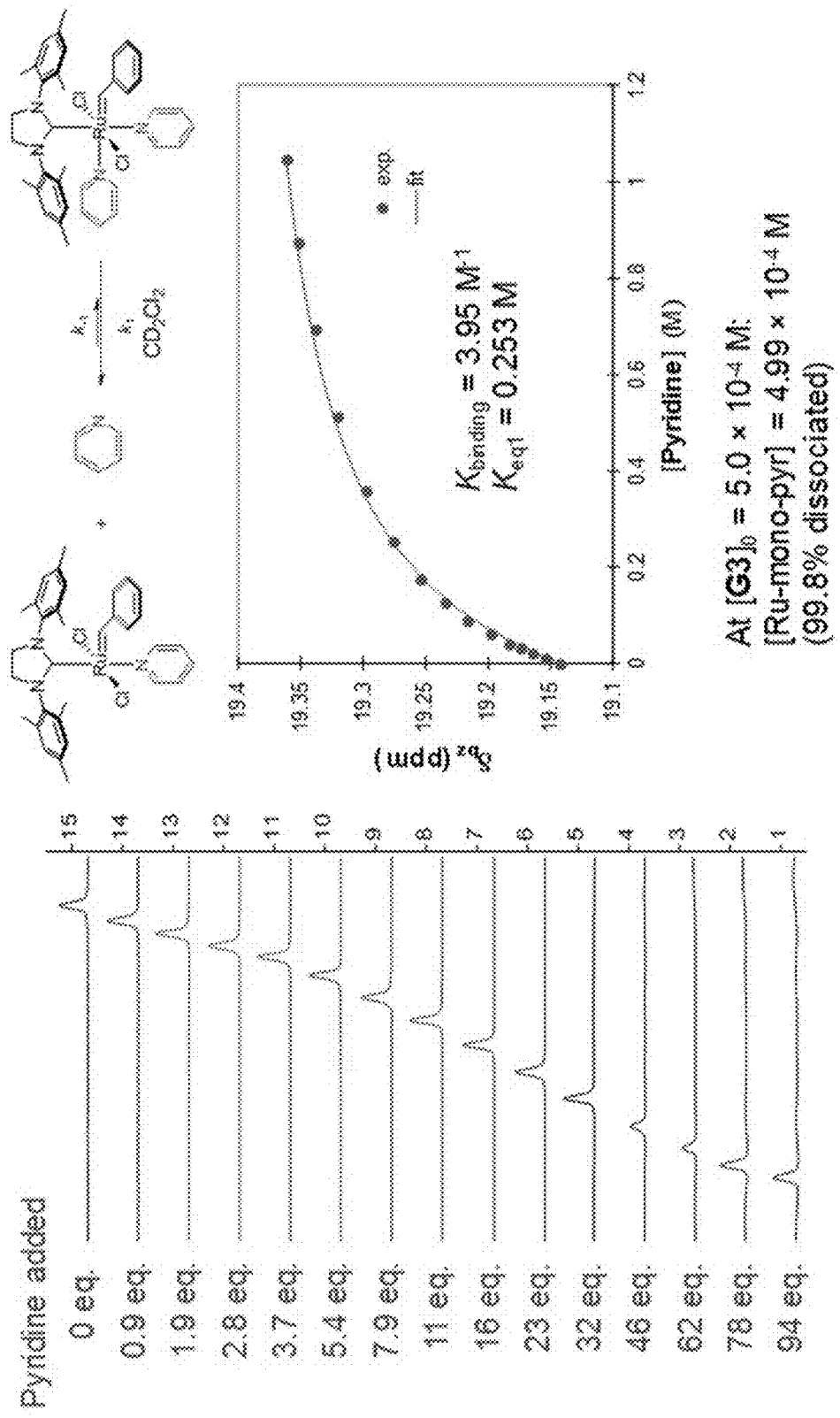

FIG. 50. Stacked $^1$H NMR spectra obtained during the pyridine titration experiments, corresponding to Examples 2A and 2B. To an NMR tube containing a CD$_2$Cl$_2$ solution of the monopyridine complex (11.2 mM) was titrated with a CD$_2$Cl$_2$ solution containing both pyridine (1.47 M) and the monopyridine complex (11.2 mM). The concentration of the monopyridine complex remained constant during the titrations. The chemical shifts of the benzylidene $^1$H resonance was monitored at 298 K and could be employed to fit the pyridine binding constant ($K_{binding}$=1/$K_{eq,1}$).

FIG. 51. ROMP of 5a (left) and 5b (right) in CH$_2$Cl$_2$ at 298 K showing the rate dependence on catalyst initial concentration [G3]$_0$ (maroon (big squares): [G3]$_0$=0.5 mM, blue (small squares): [G3]$_0$=0.05 mM, green (triangles): [G3]$_0$=0.025 mM). The slope corresponds to the $k_{obs}$ (s$^{-1}$). These polymerization reactions have the same [5a]d[G3]$_0$ and [5b]$_0$/[G3]$_0$ ratio of 100. Time-lapse kinetic traces were obtained using our standard homopolymerization procedure. These data correspond to Examples 2A and 2B.

Figure 27A:
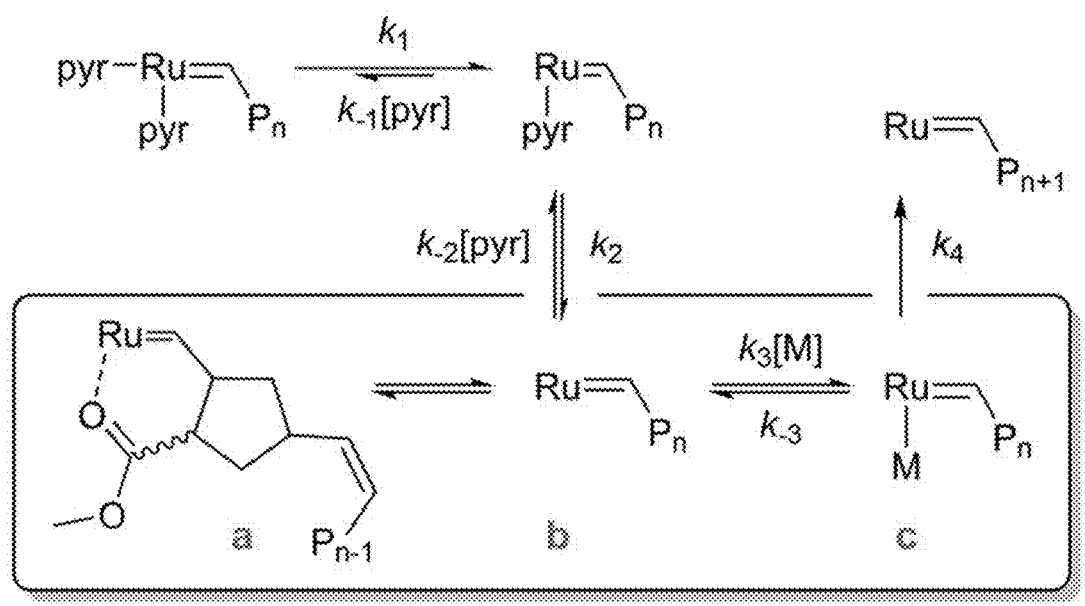
FIG. 27A. Proposed dissociative ROMP pathway for a G3 catalyst.
Figure 27B:
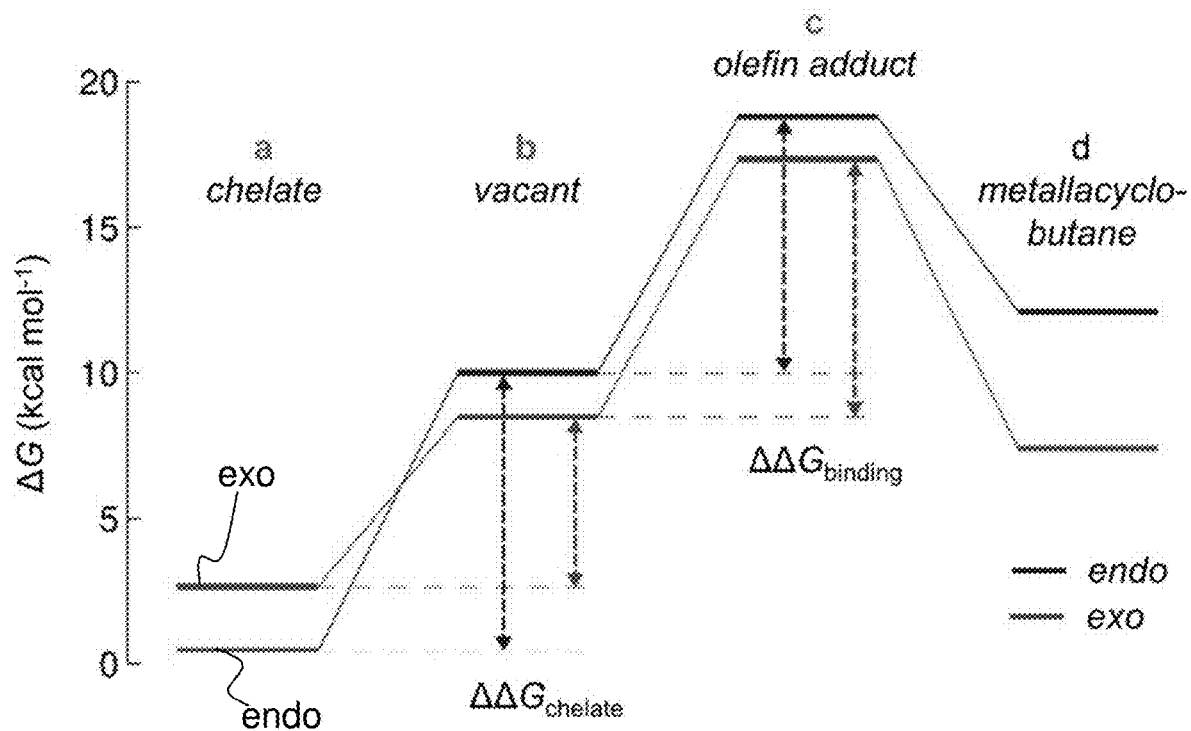
FIG. 27B. DFT-calculated free energy diagram corresponding to one ROMP cycle for endo- (2a, blue) and exo-substituted (3a, red) norbornenyl monomers. The following intermediates are calculated: (a) six-membered Ru—O chelate, (b) 14-electron vacant species, (c) olefin adduct, and (d) metallacyclobutane.
Figure 52E:
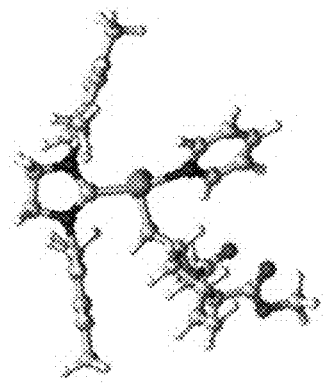
Figure 52D:
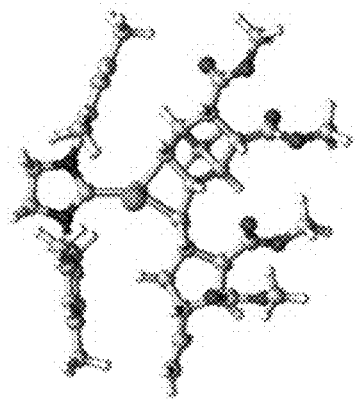
Figure 52F:
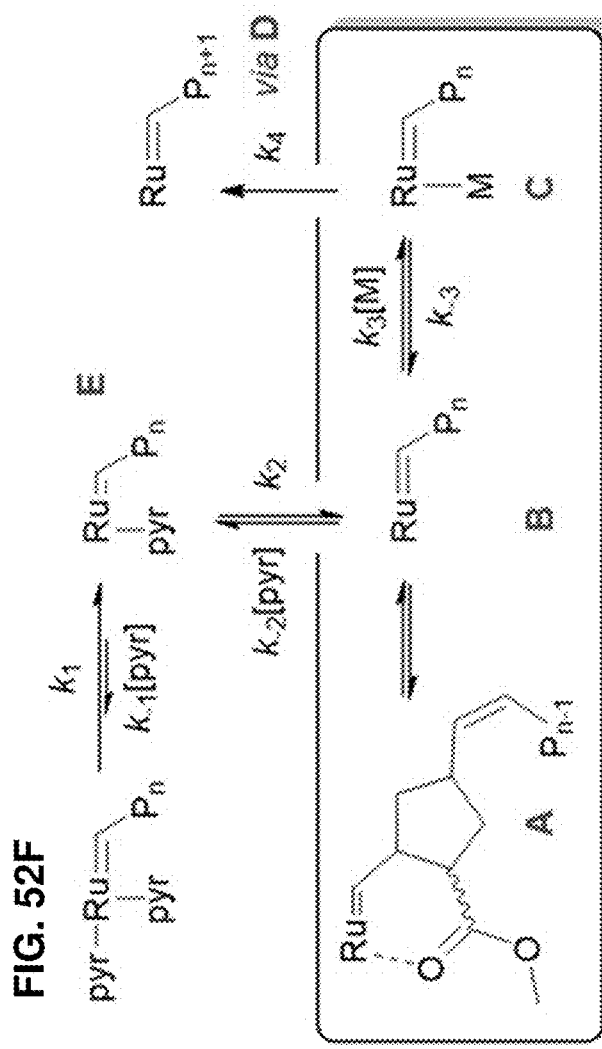
Figure 52C:
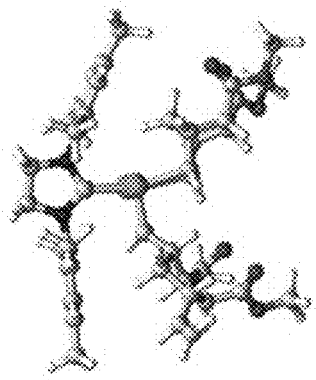

FIGS. 52A-52F. DFT-optimized structures of catalytically relevant ruthenium species, corresponding to the proposed dissociative ROMP pathway, which is illustrated in FIG. 52F and FIGS. 27A-27B. FIGS. 52A-52E correspond to structures of chemical species such as intermediate species of the ROMP pathway of FIG. 52F: (FIG. 52A) Six-membered Ru—O chelate, (FIG. 52B) 14-electron vacant species, (FIG. 52C) olefin adduct, (FIG. 52D) metallacyclobutane intermediate, and (FIG. 52E) monopyridine adduct. The labels "A", "B", "C", "via D", and "E" in FIG. 52F correspond to the chemical structures of FIGS. 52A, 52B, 52C, 52D, and 52E, respectively. These data correspond to Examples 2A and 2B.

Figure 53:
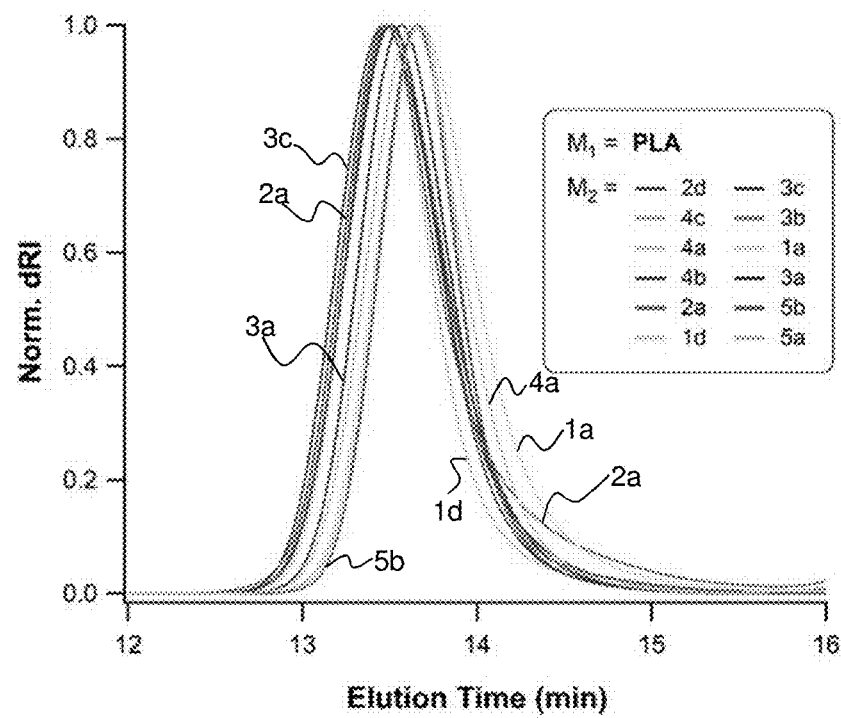

FIG. 53. SEC traces for PLA and diluent copolymerizations at full conversion. These data correspond to Examples 2A and 2B.

Figure 54:
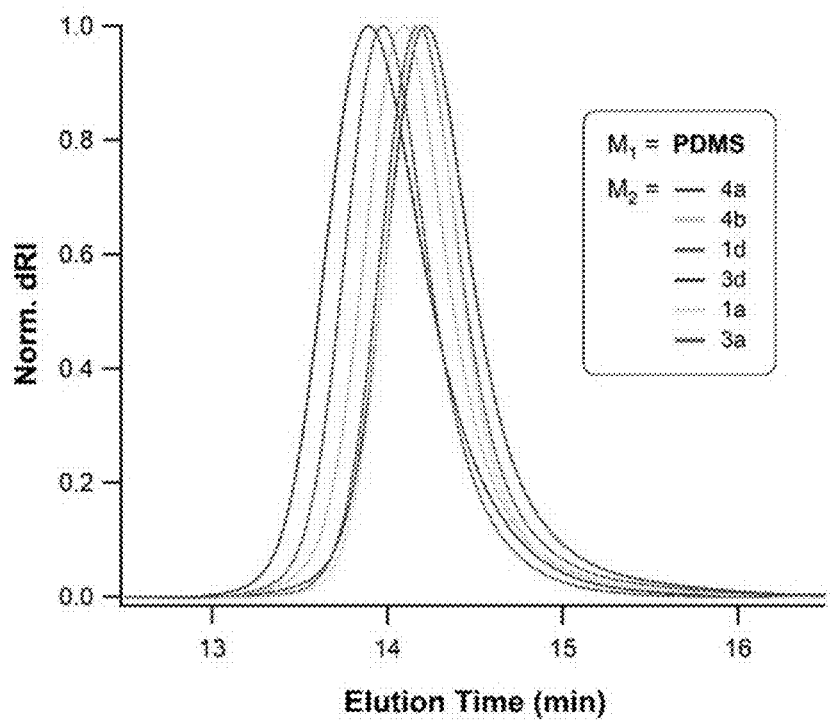

FIG. 54. SEC traces for PDMS and diluent copolymerizations at full conversion. These data correspond to Examples 2A and 2B. The data curves from left-to-right correspond to M$_2$ of 3d, 3a, 4b, 1d, 1a, and 4a, respectively (M$_1$ is PDMS in each case).

Figure 55:
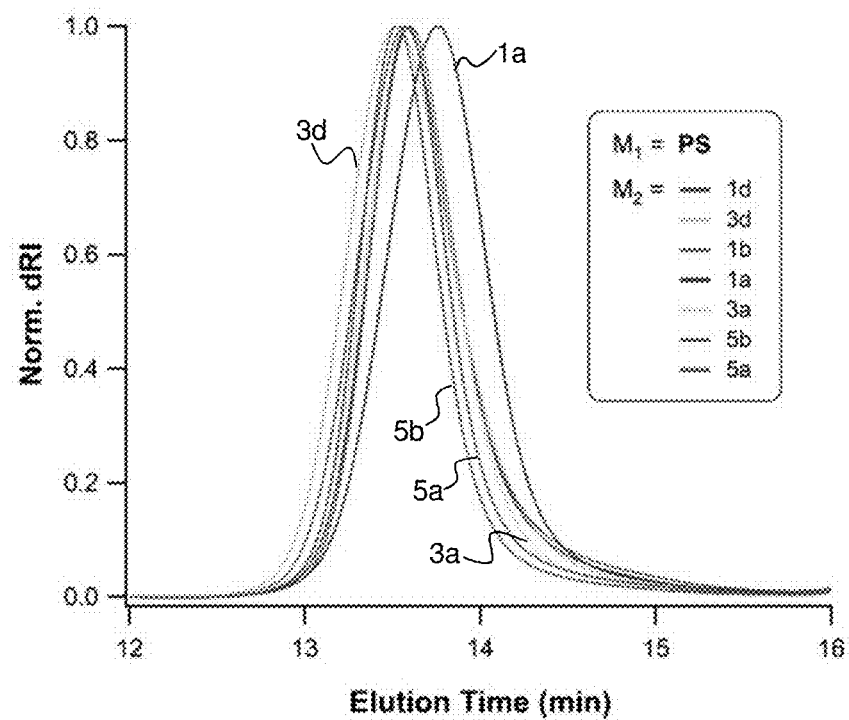

FIG. 55. SEC traces for PS and diluent copolymerizations at full conversion. These data correspond to Examples 2A and 2B.

Figure 56:
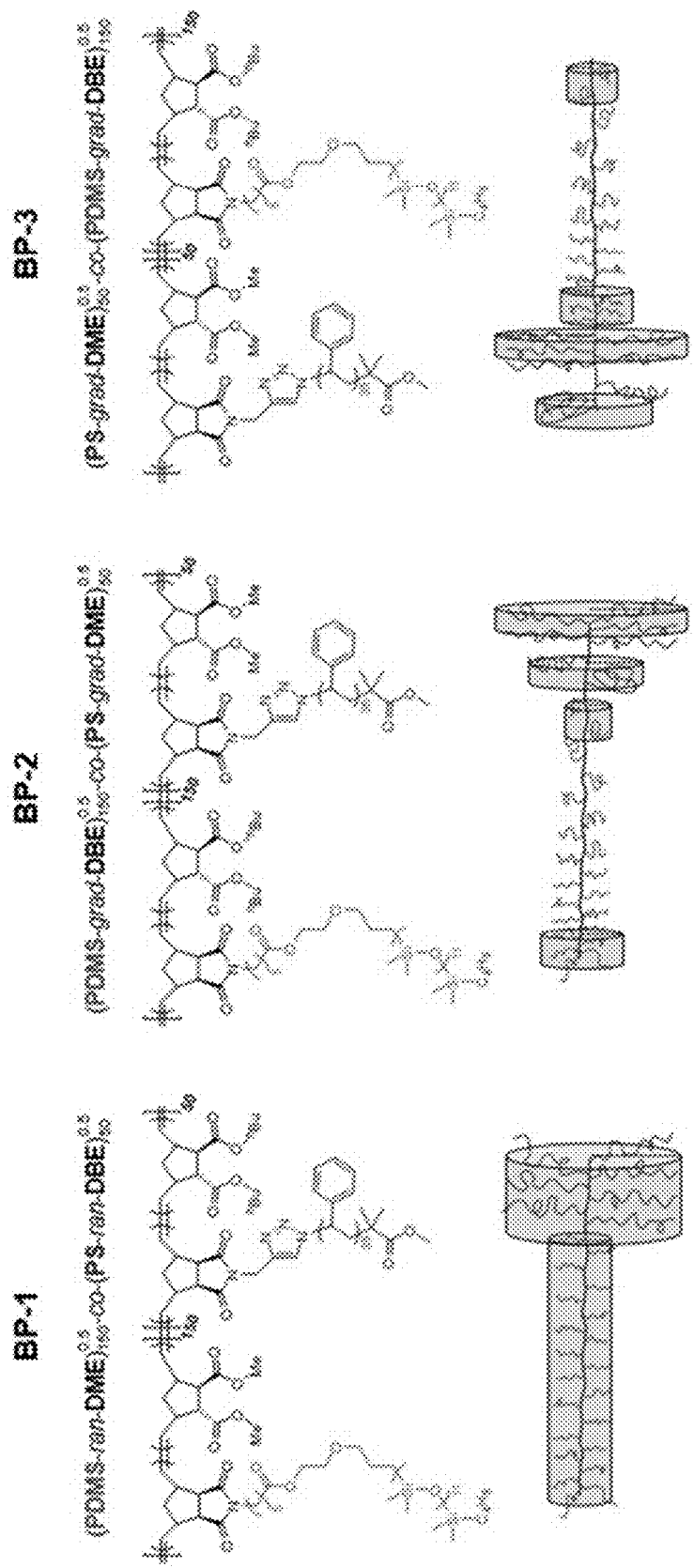

FIG. 56. (Top) Chemical structures of graft block polymers BP-1, BP-2, and BP-3. (Bottom) Schematic illustrations of the anticipated molecular "shapes," drawn in the limit of fully extended backbones for ease of visualization. These data correspond to Examples 2A and 2B.

Figure 57:
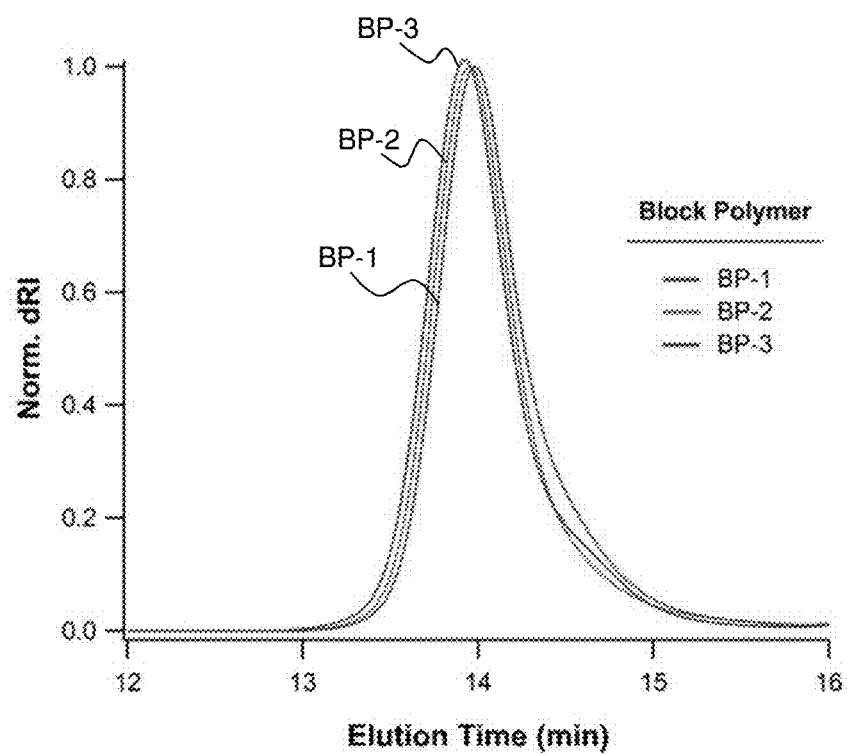

FIG. 57. SEC traces for graft block polymers BP-1, BP-2, and BP-3, indicating essentially identical molecular weights and dispersities. These data correspond to Examples 2A and 2B. The data curves from left-to-right correspond to BP-3, BP-2, and BP-1, respectively.

Figure 58:
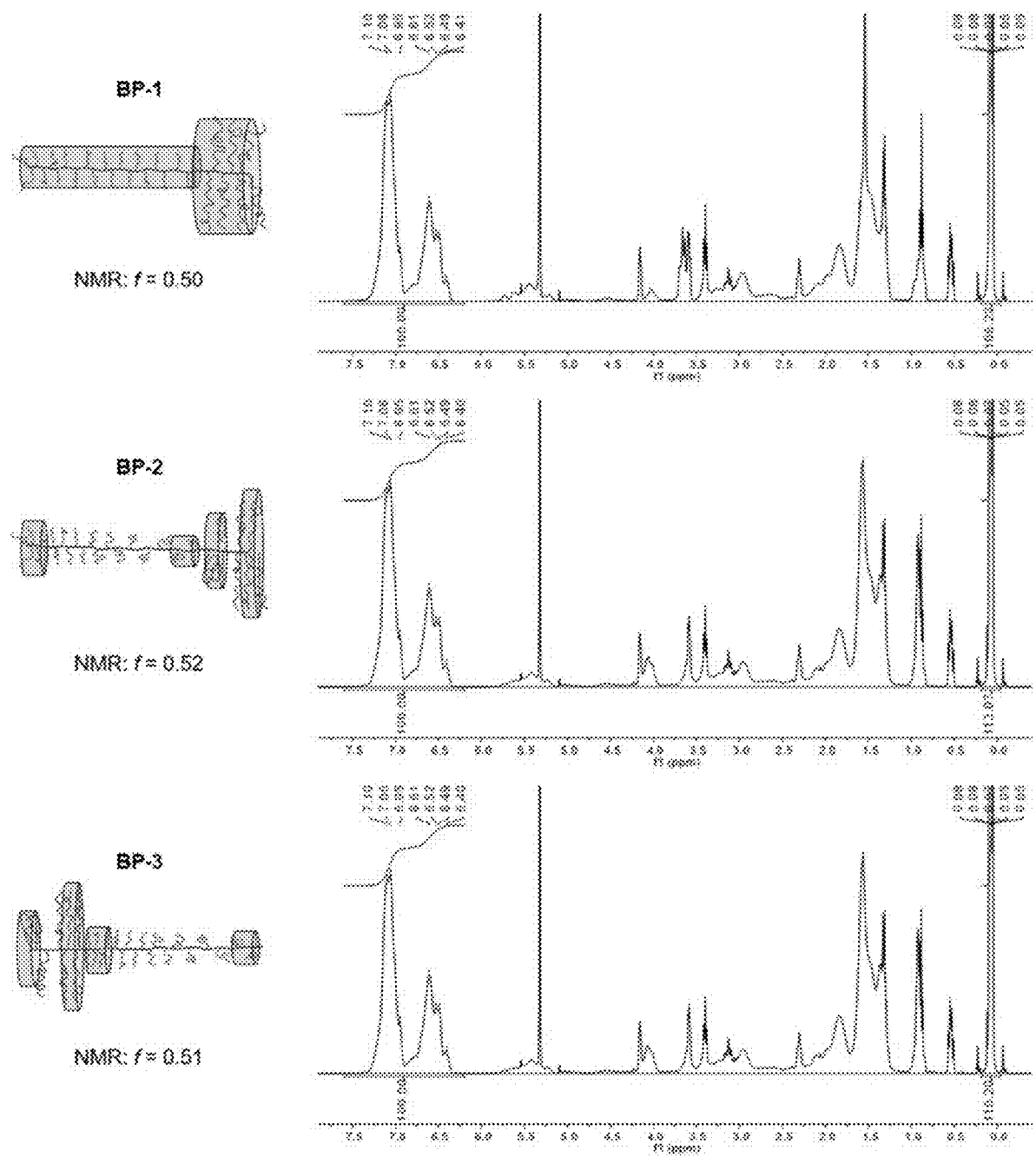

FIG. 58. $^1$H NMR data for graft block polymers BP-1, BP-2, and BP-3, indicating essentially identical chemical compositions (f≈0.5). Illustrations of the corresponding polymer chain distributions and arrangements are shown on the left. These data correspond to Examples 2A and 2B.

Figure 59:
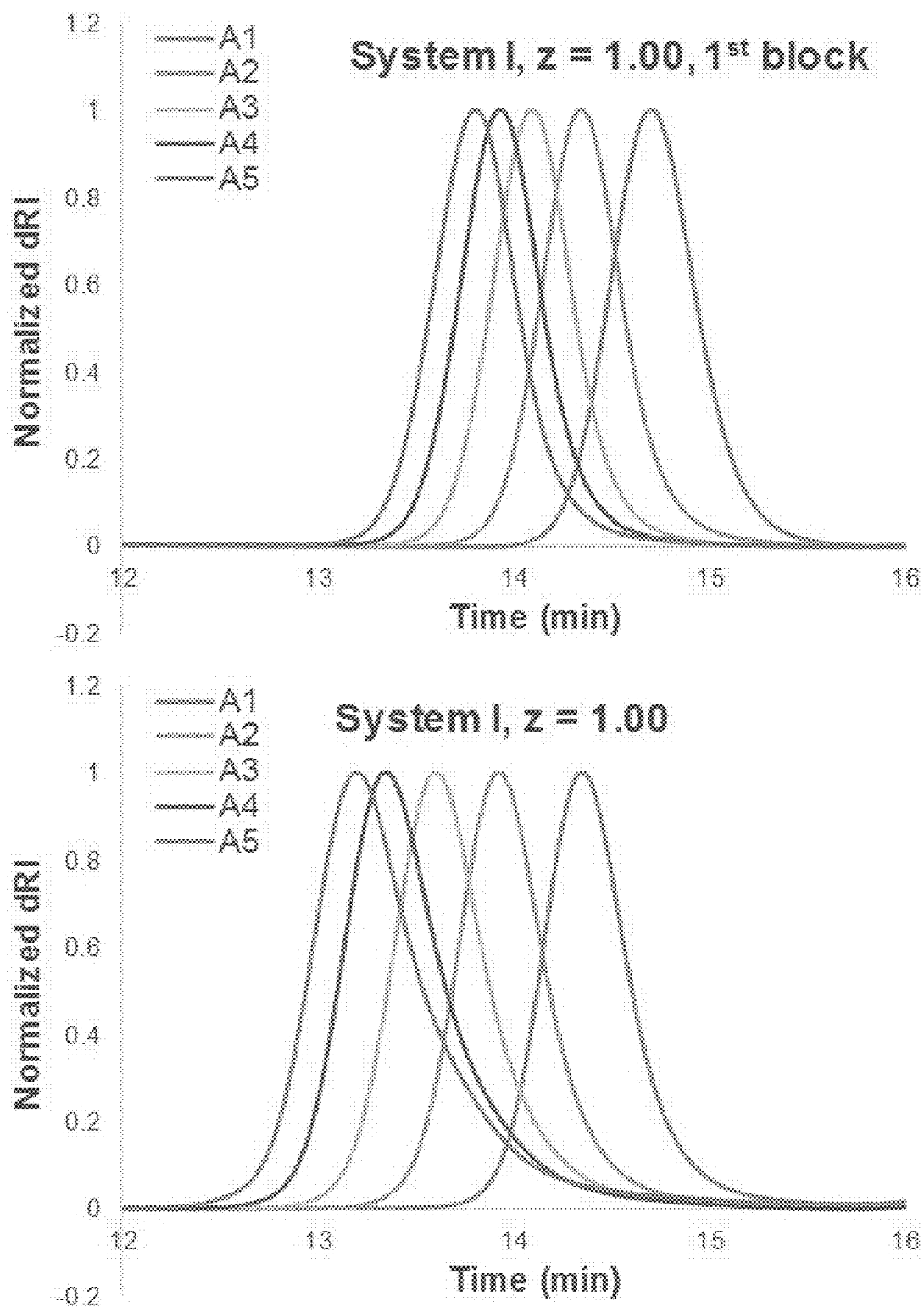

FIG. 59. SEC traces; (top) System I, z=1.00, 1$^{st}$ block; System I, z=1.00 (bottom). These data correspond to certain structures of Examples 3A and 3B. The data curves left-to-right correspond to A5 to A1, respectively.

Figure 60:
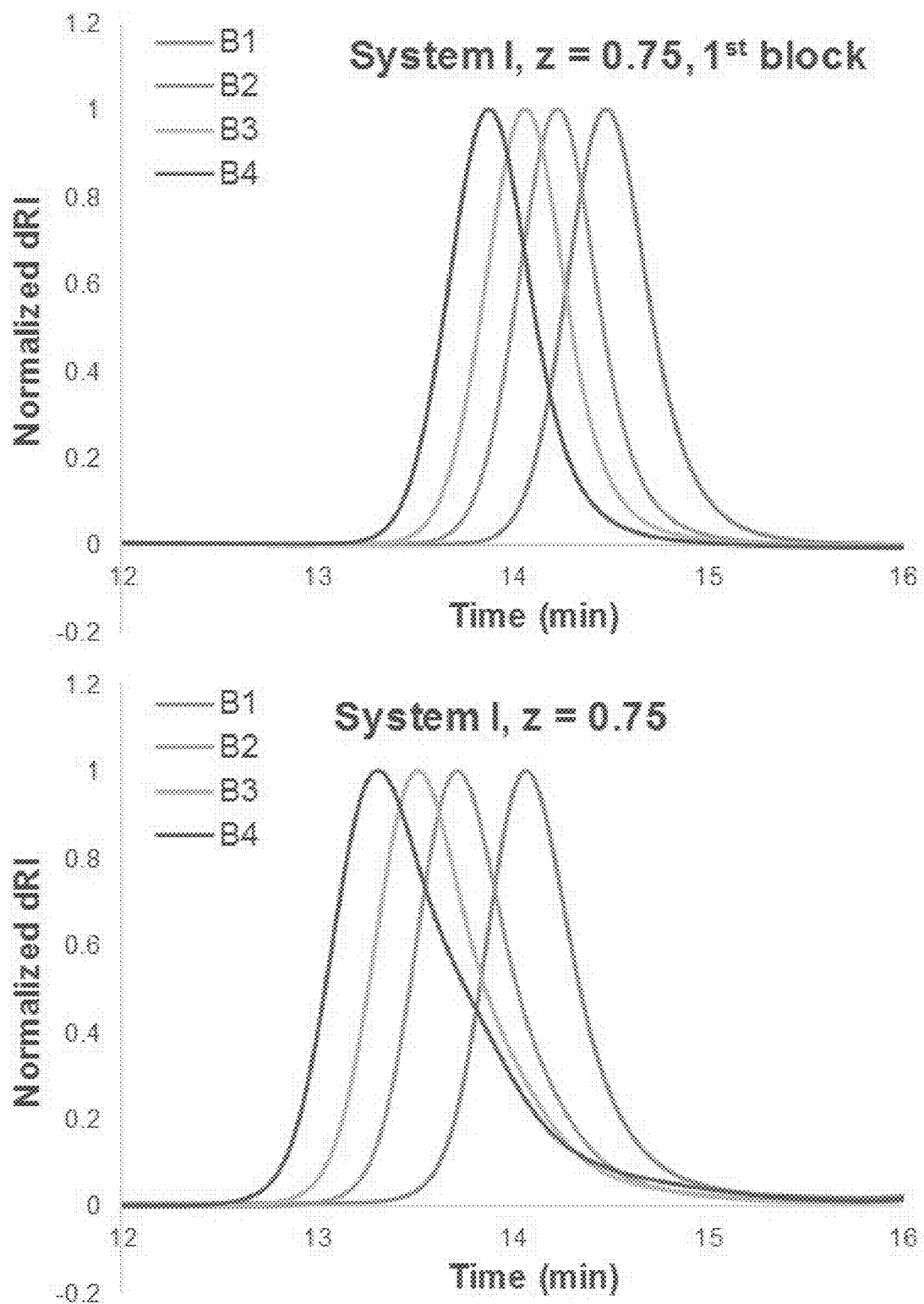

FIG. 60. SEC traces; (top) System I, z=0.75, 1$^{st}$ block; System I, z=0.75 (bottom). ("z" represents graft density.)

These data correspond to certain structures of Examples 3A and 3B. The data curves left-to-right correspond to B4 to B1, respectively.

Figure 61:
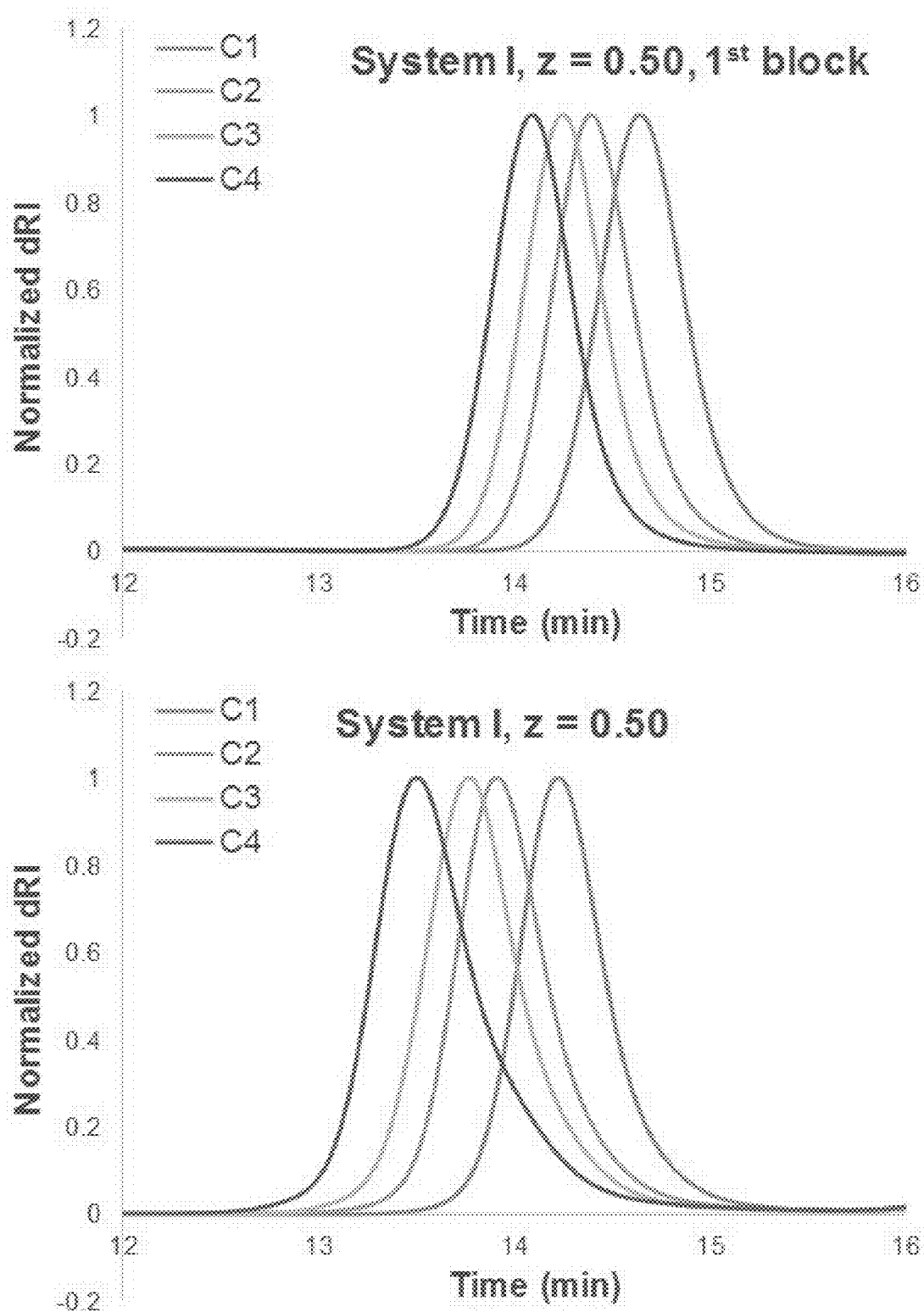

FIG. 61. SEC traces; (top) System I, $z=0.50$, $1^{st}$ block; System I, $z=0.50$ (bottom). These data correspond to certain structures of Examples 3A and 3B. The data curves left-to-right correspond to C4 to C1, respectively.

Figure 62:
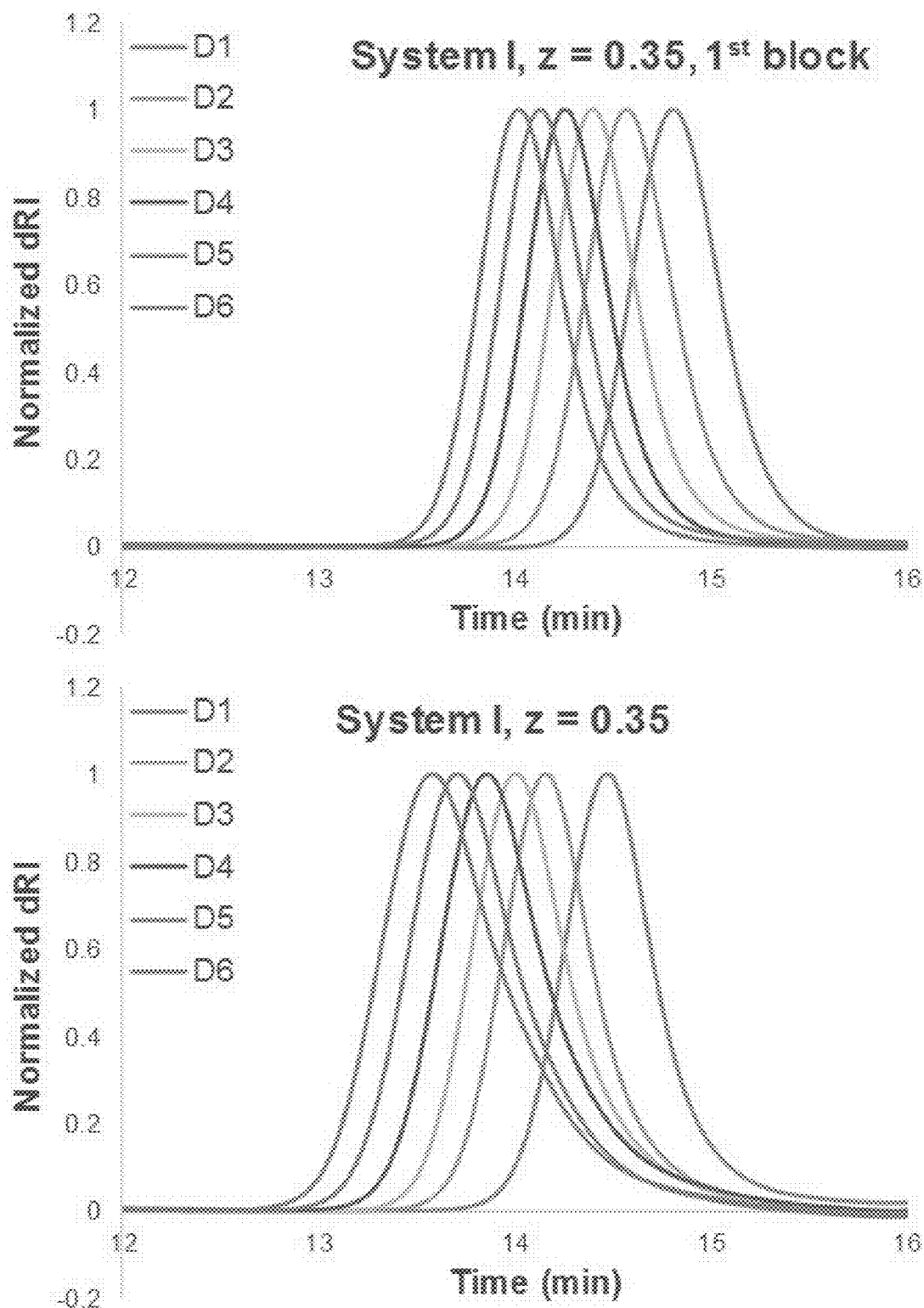

FIG. 62. SEC traces; (top) System I, $z=0.35$, $1^{st}$ block; System I, $z=0.35$ (bottom). These data correspond to certain structures of Examples 3A and 3B. The data curves left-to-right correspond to D6 to D1, respectively.

Figure 63:
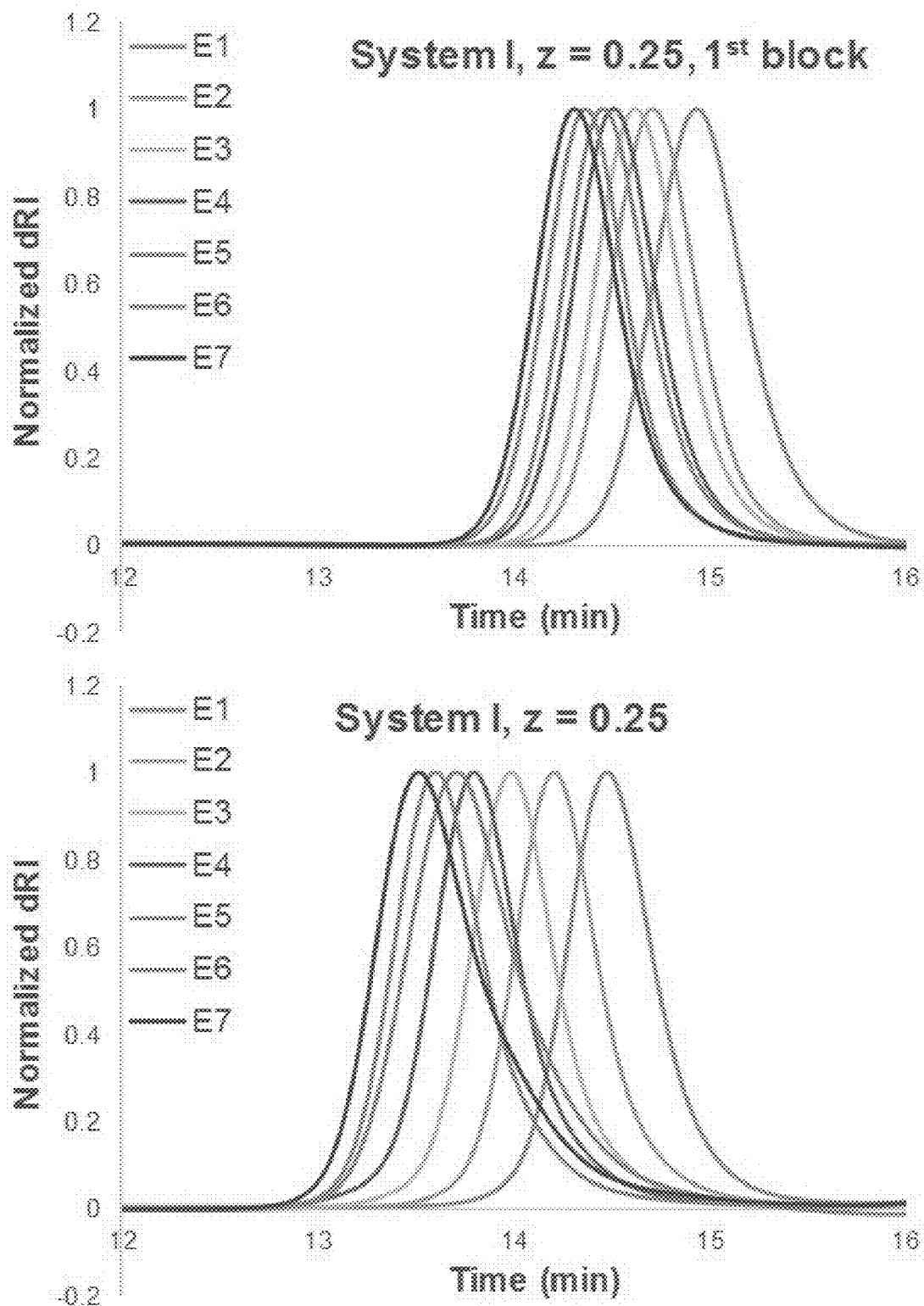

FIG. 63. SEC traces; (top) System I, $z=0.25$, $1^{st}$ block; System I, $z=0.25$ (bottom). These data correspond to certain structures of Examples 3A and 3B. The data curves left-to-right correspond to E7 to E1, respectively.

Figure 64:
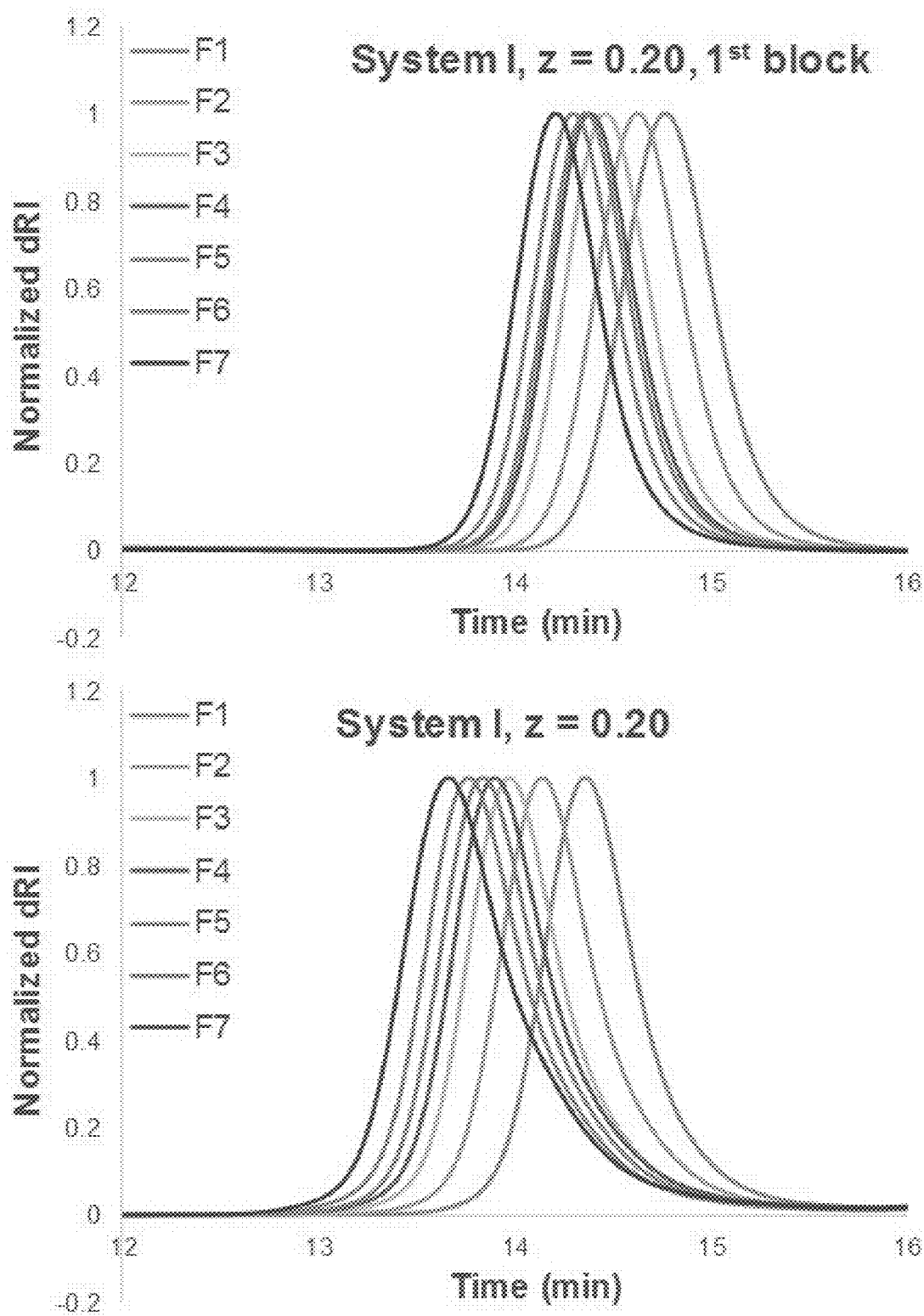

FIG. 64. SEC traces; (top) System I, $z=0.20$, $1^{st}$ block; System I, $z=0.20$ (bottom). These data correspond to certain structures of Examples 3A and 3B. The data curves left-to-right correspond to F7 to F1, respectively.

Figure 65:
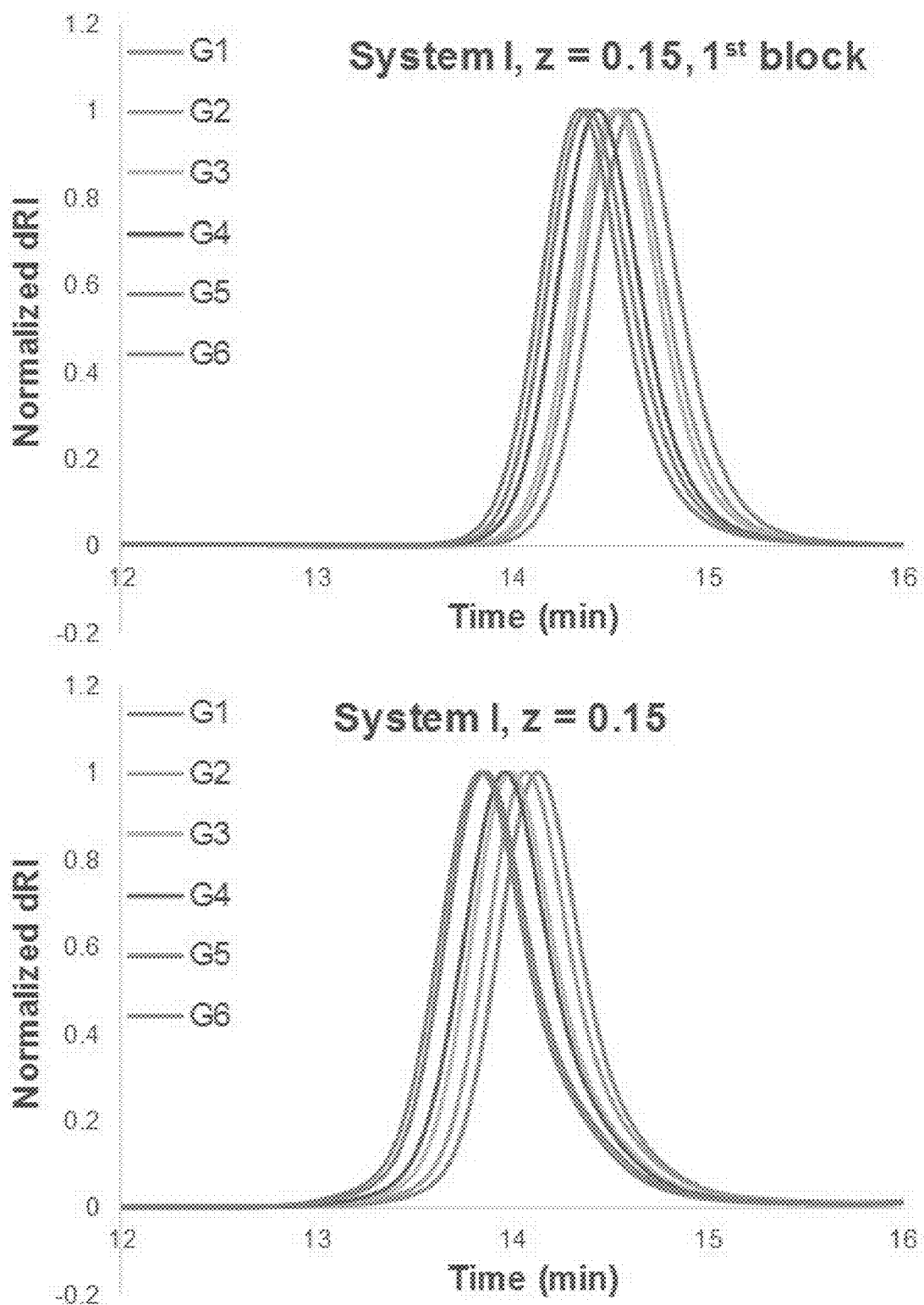

FIG. 65. SEC traces; (top) System I, $z=0.15$, $1^{st}$ block; System I, $z=0.15$ (bottom). These data correspond to certain structures of Examples 3A and 3B. The data curves left-to-right correspond to G6 to G1, respectively.

Figure 66:
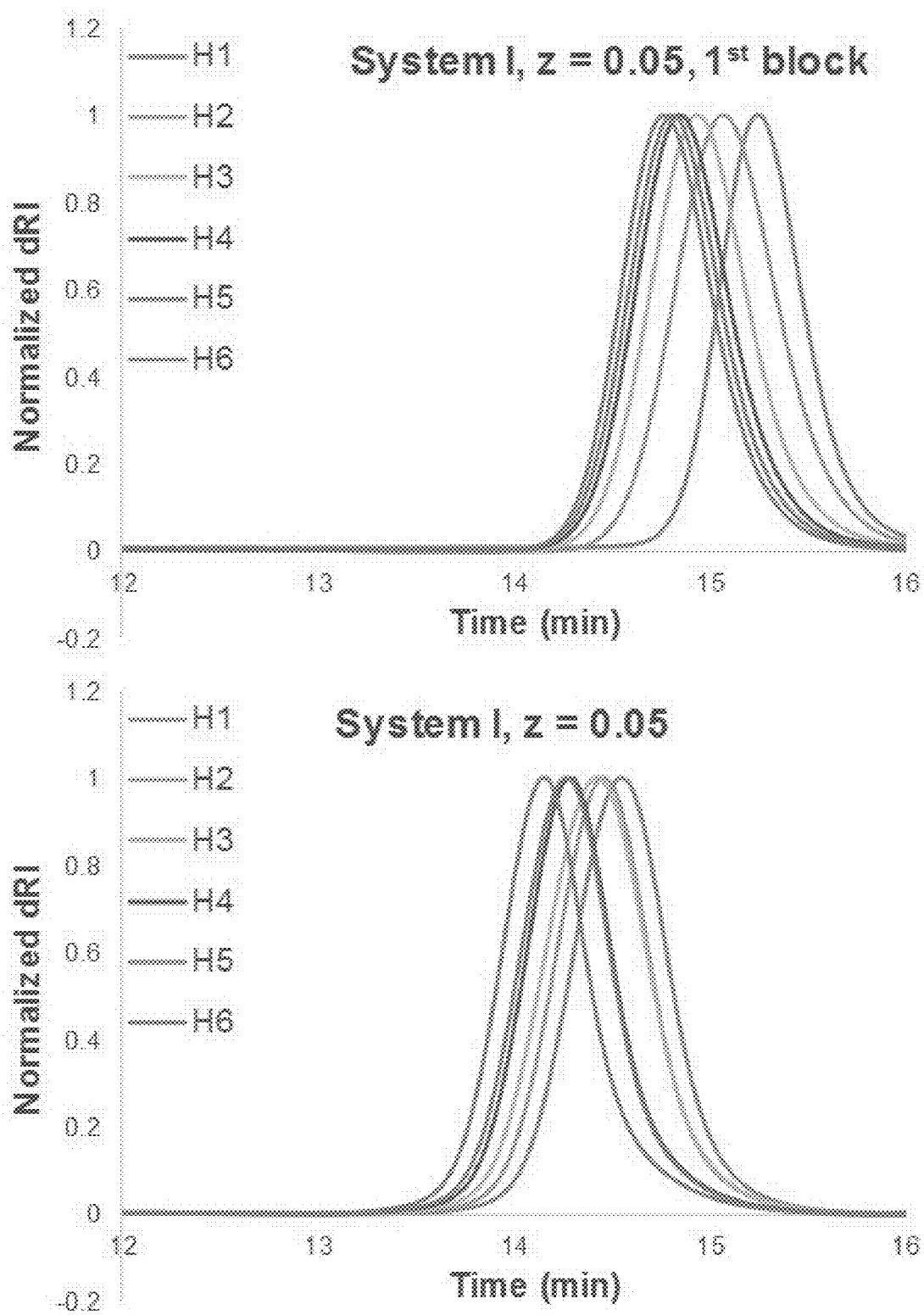

FIG. 66. SEC traces; (top) System I, $z=0.05$, $1^{st}$ block; System I, $z=0.05$ (bottom). These data correspond to certain structures of Examples 3A and 3B. The data curves left-to-right correspond to H6 to H1, respectively.

Figure 67:
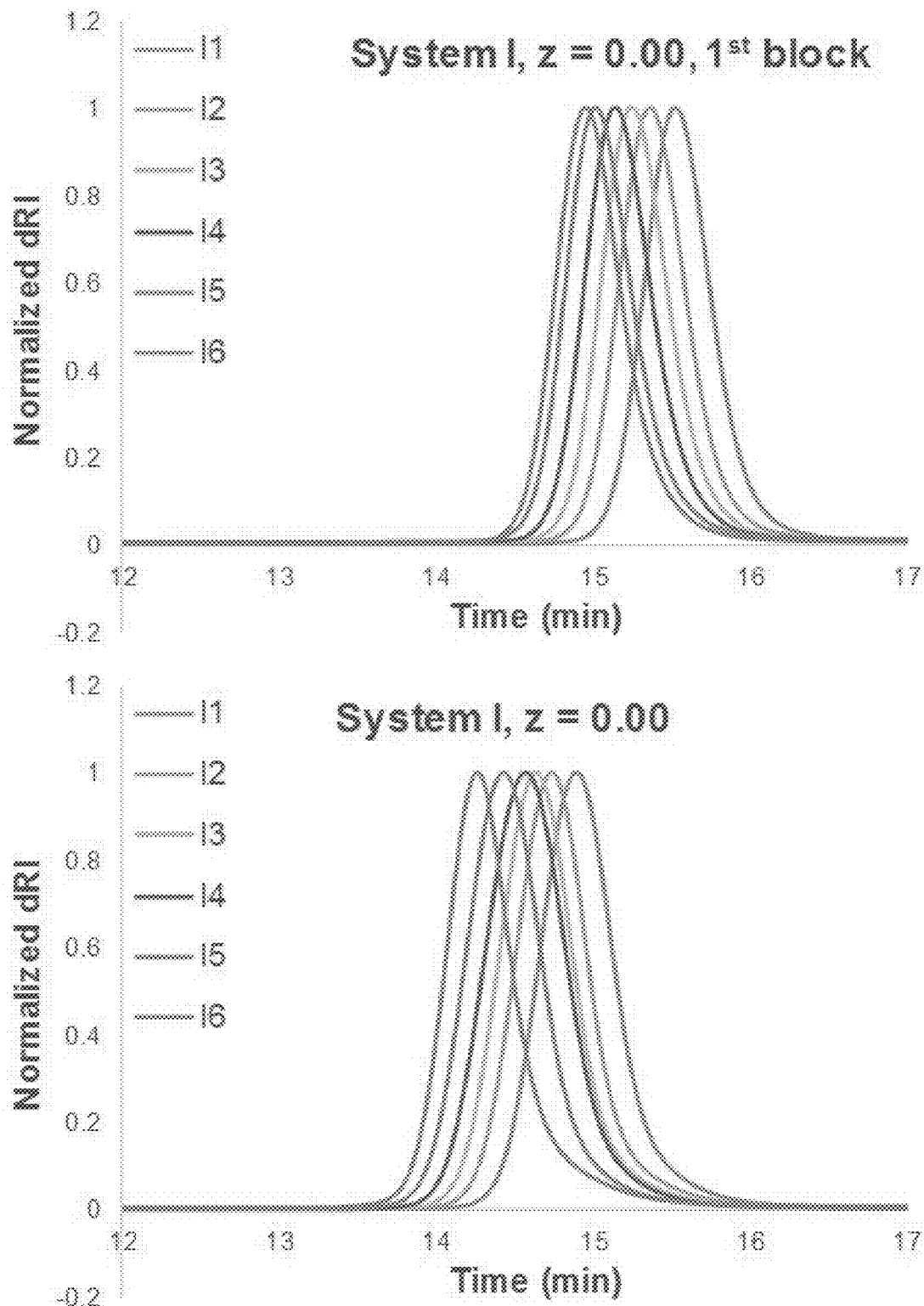

FIG. 67. SEC traces; (top) System I, $z=0.00$, $1^{st}$ block; System I, $z=0.00$ (bottom). These data correspond to certain structures of Examples 3A and 3B. The data curves left-to-right correspond to I6 to I1, respectively.

Figure 68:
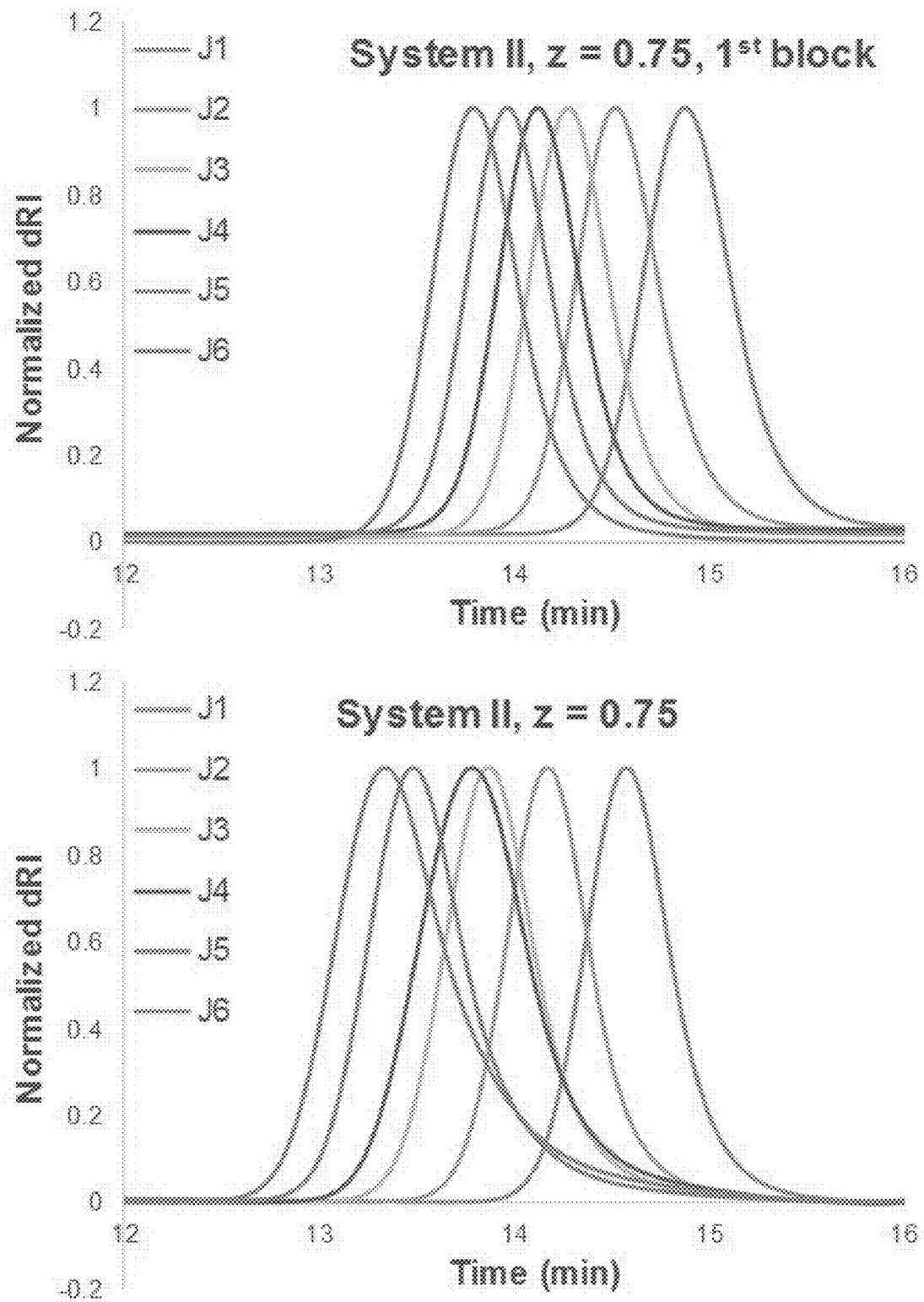

FIG. 68 SEC traces; (top) System II, $z=0.75$, $1^{st}$ block; System II, $z=0.75$ (bottom). These data correspond to certain structures of Examples 3A and 3B. The data curves left-to-right correspond to J6 to J1, respectively.

Figure 69:
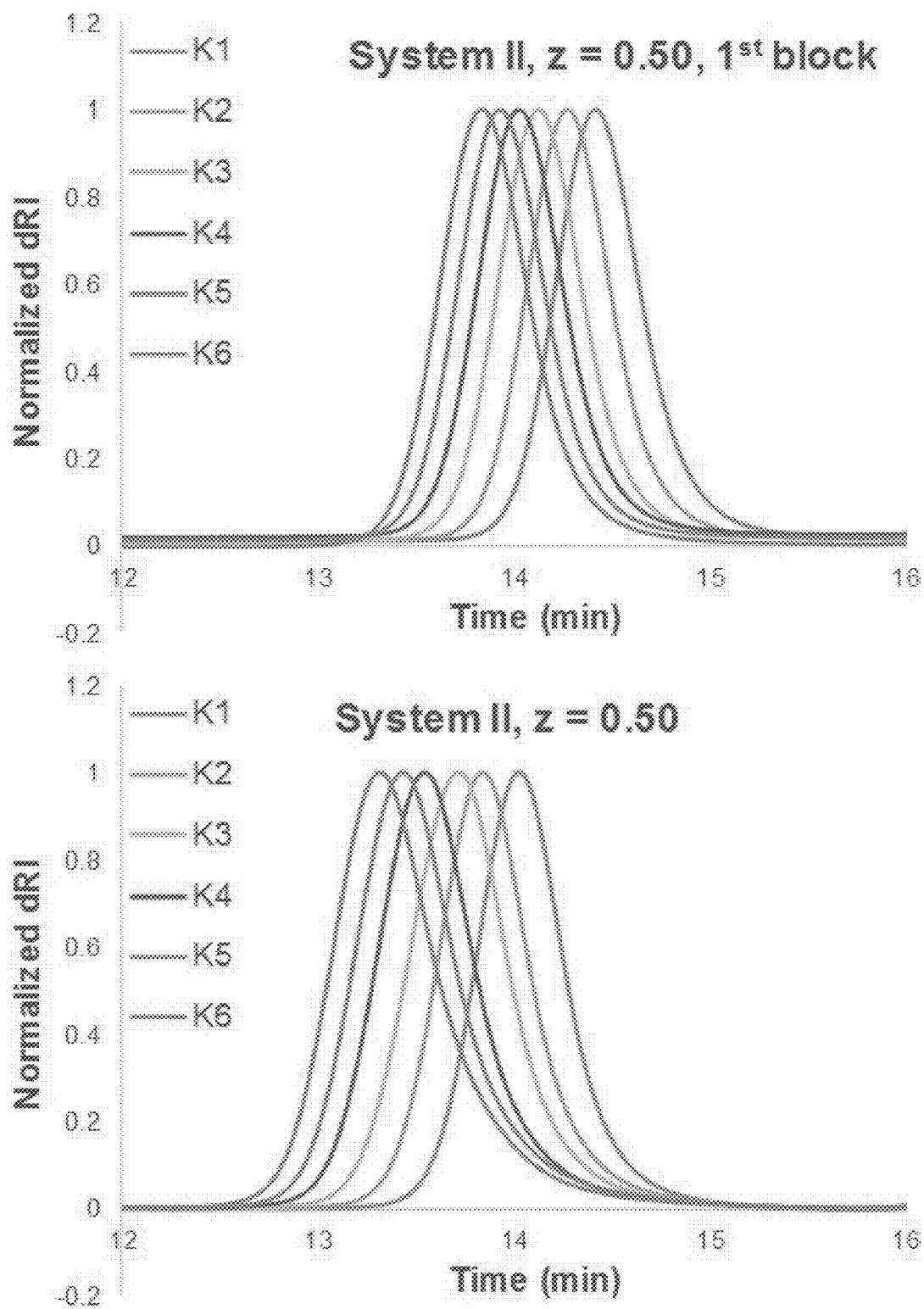

FIG. 69. SEC traces; (top) System II, $z=0.50$, $1^{st}$ block; System II, $z=0.50$ (bottom). These data correspond to certain structures of Examples 3A and 3B. The data curves left-to-right correspond to K6 to K1, respectively.

Figure 70:
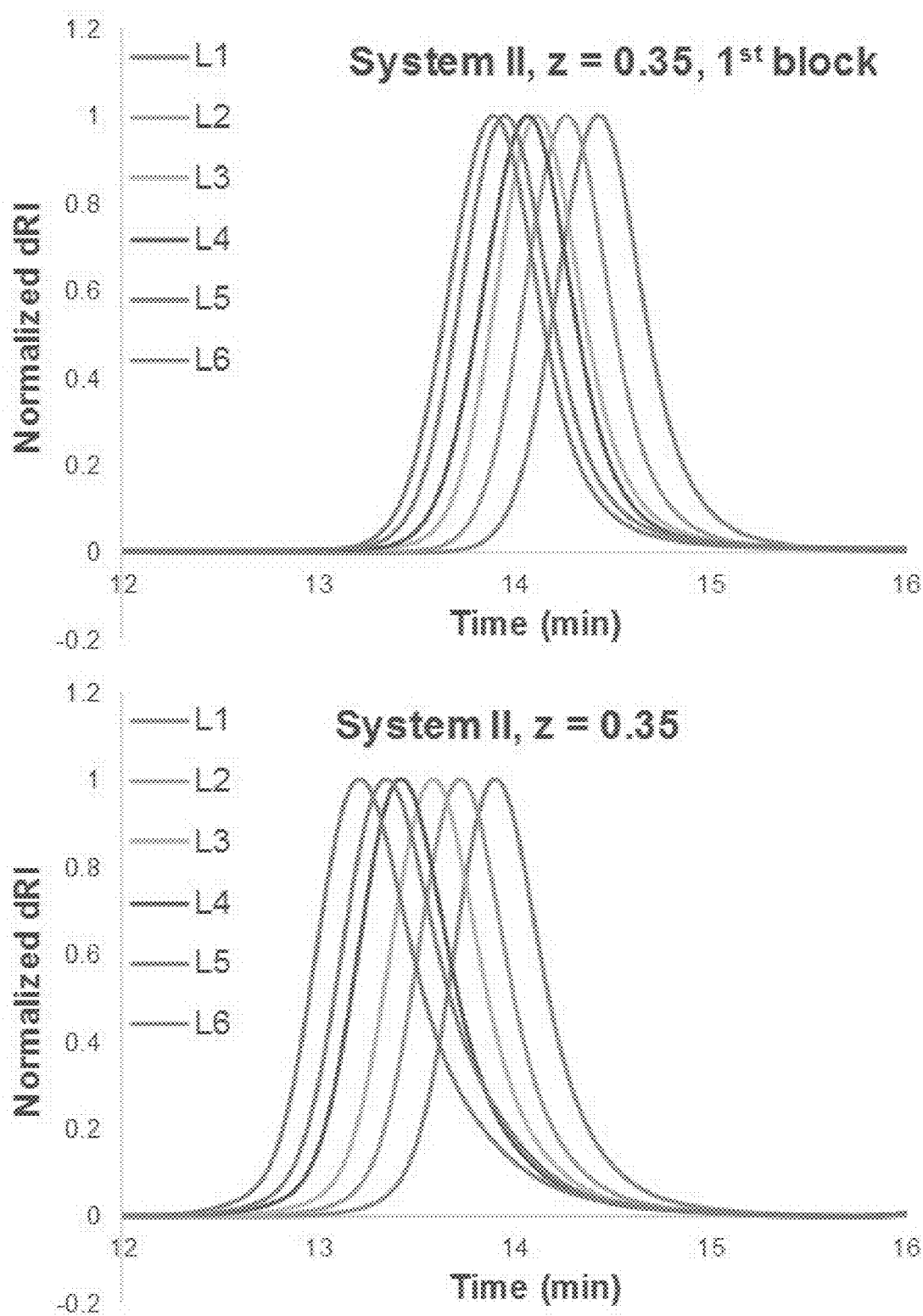

FIG. 70. SEC traces; (top) System II, $z=0.35$, $1^{st}$ block; System II, $z=0.35$ (bottom). These data correspond to certain structures of Examples 3A and 3B. The data curves left-to-right correspond to L6 to L1, respectively.

Figure 71:
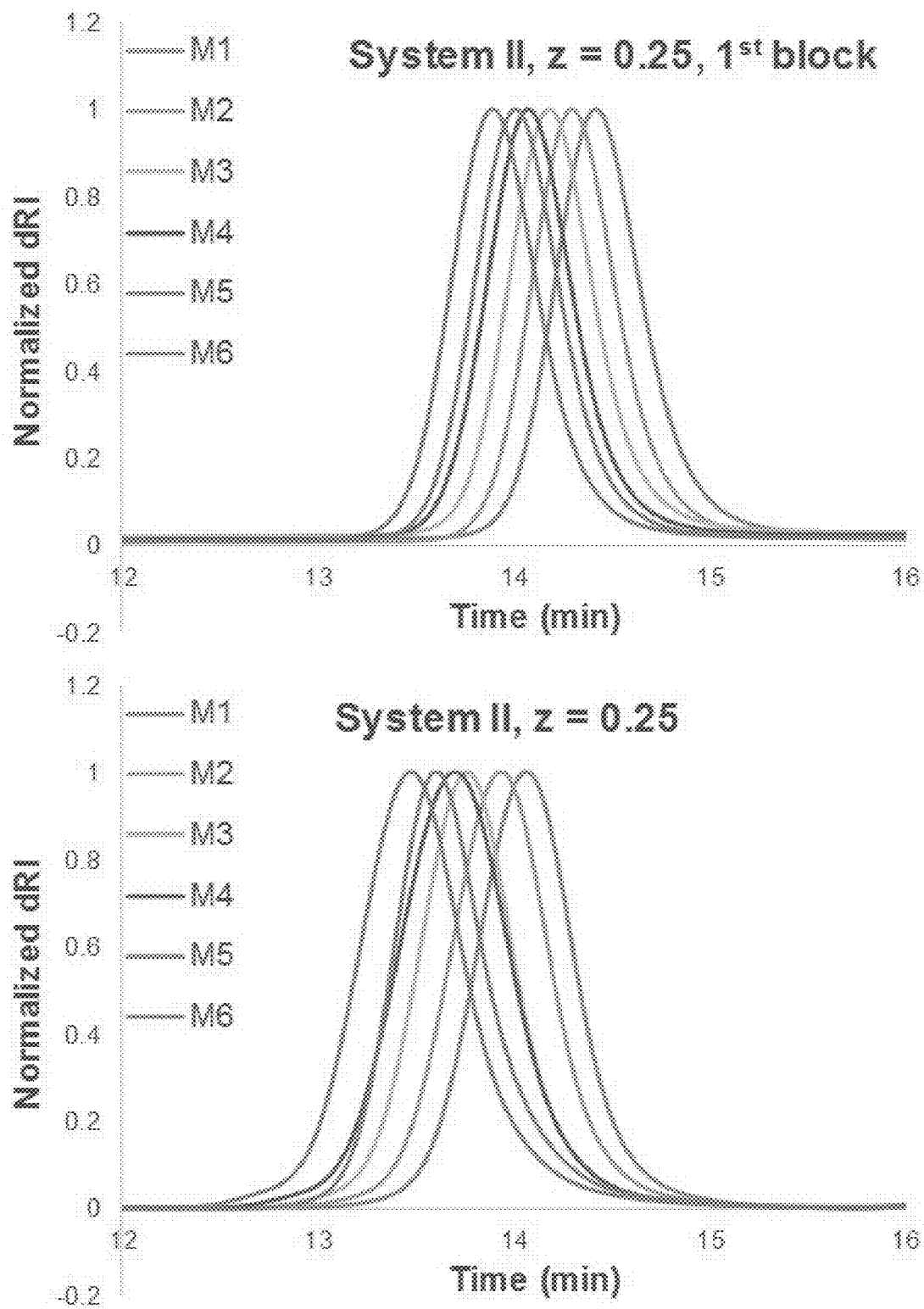

FIG. 71. SEC traces; (top) System II, $z=0.25$, $1^{st}$ block; System II, $z=0.25$ (bottom). These data correspond to certain structures of Examples 3A and 3B. The data curves left-to-right correspond to M6 to M1, respectively.

Figure 72:
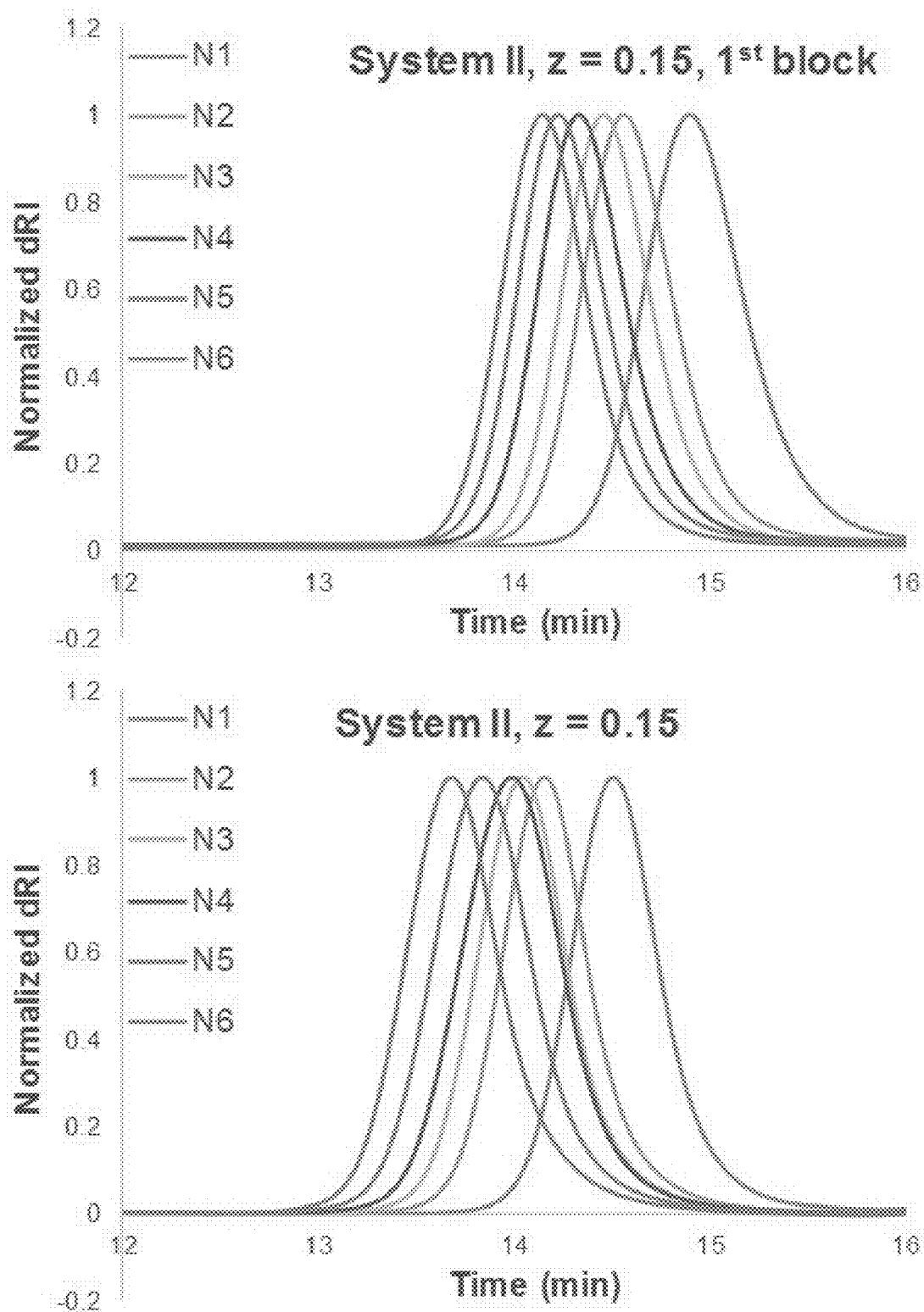

FIG. 72. SEC traces; (top) System II, $z=0.15$, $1^{st}$ block; System II, $z=0.15$ (bottom). These data correspond to certain structures of Examples 3A and 3B. The data curves left-to-right correspond to N6 to N1, respectively.

Figure 73:
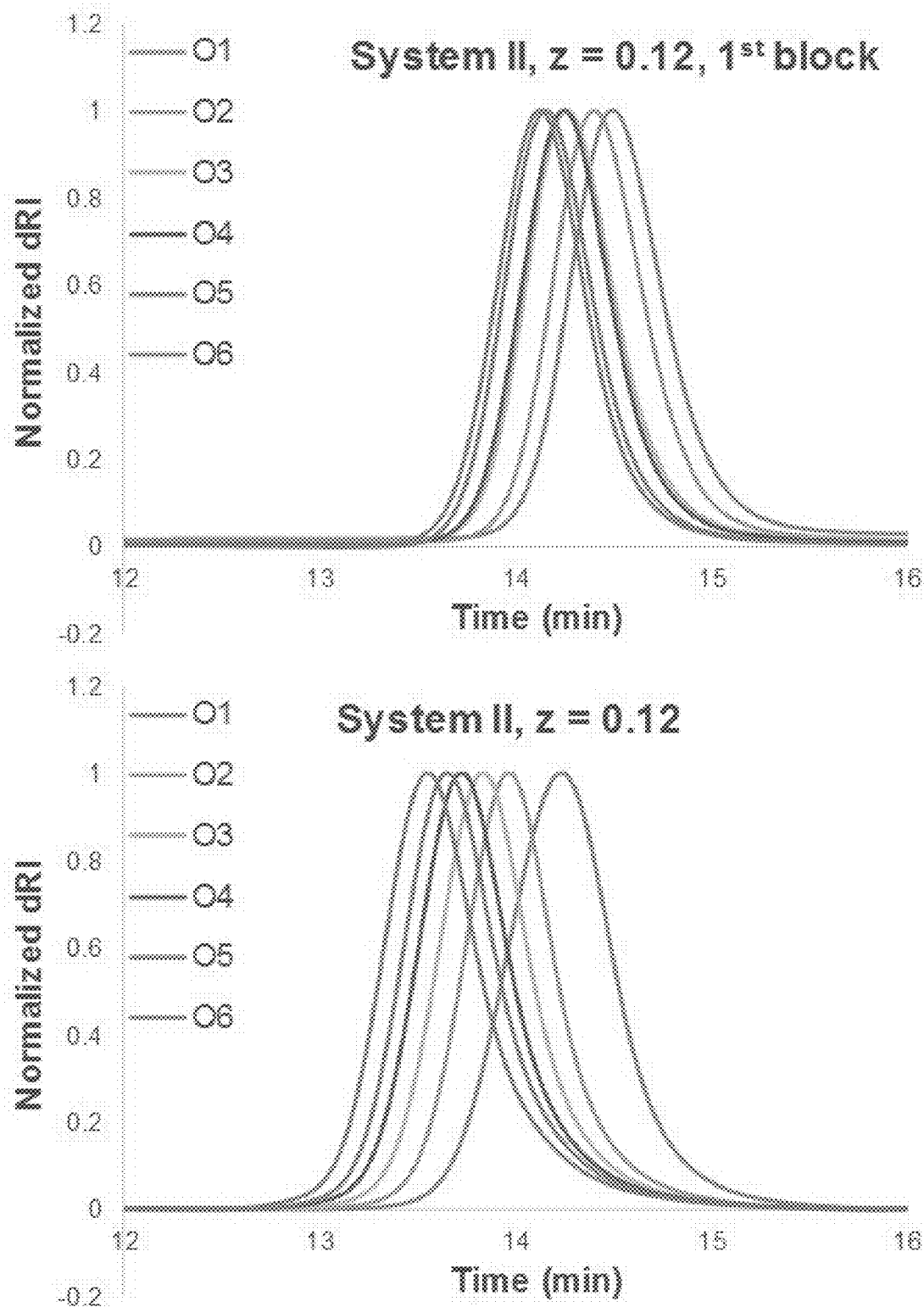

FIG. 73. SEC traces; (top) System II, $z=0.12$, $1^{st}$ block; System II, $z=0.12$ (bottom). These data correspond to Examples 3A and 3B. The data curves left-to-right correspond to O6 to O1, respectively.

Figure 74:
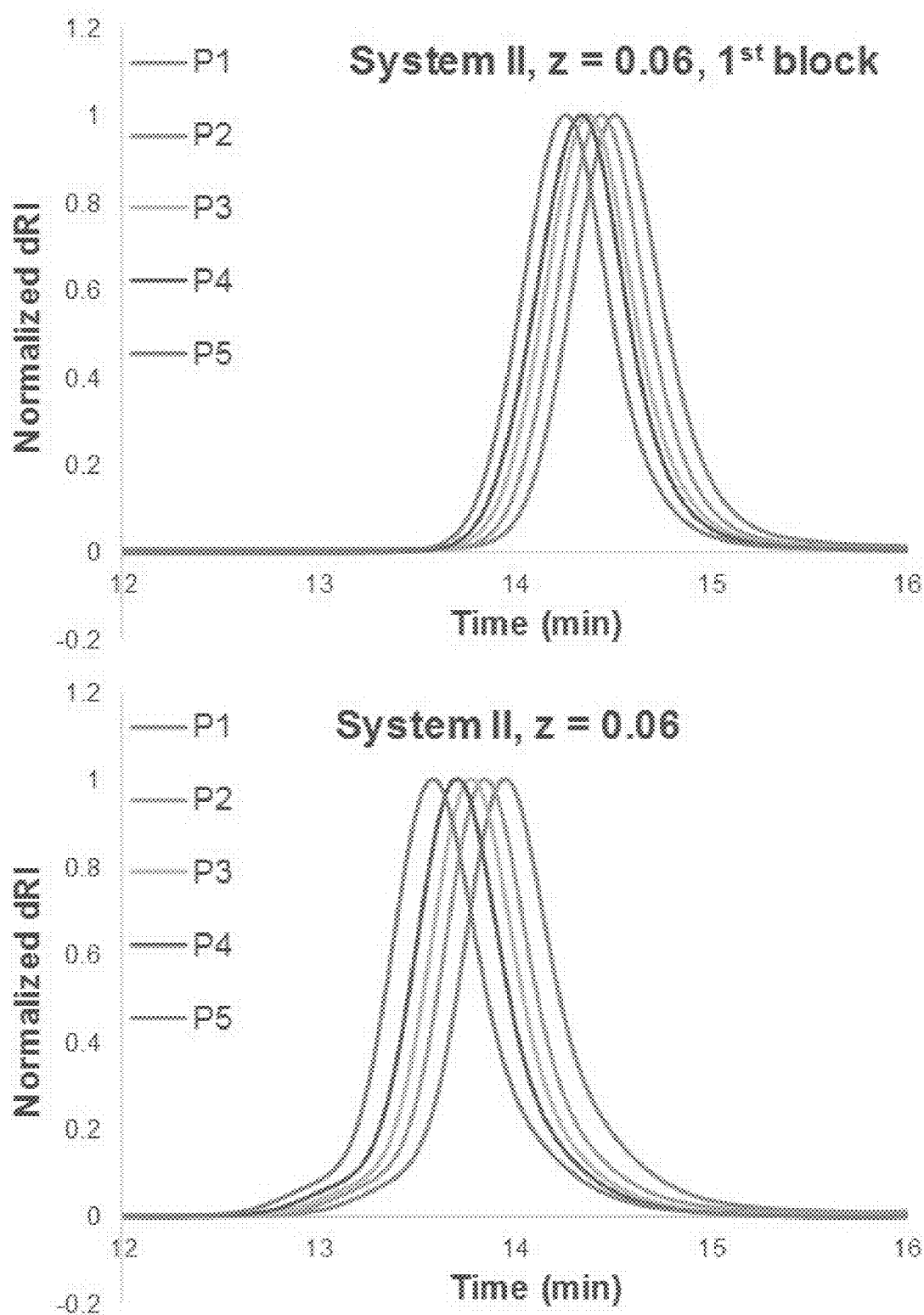

FIG. 74. SEC traces; (top) System II, $z=0.06$, $1^{st}$ block; System II, $z=0.06$ (bottom). These data correspond to certain structures of Examples 3A and 3B. The data curves left-to-right correspond to P5 to P1, respectively.

Figure 75:
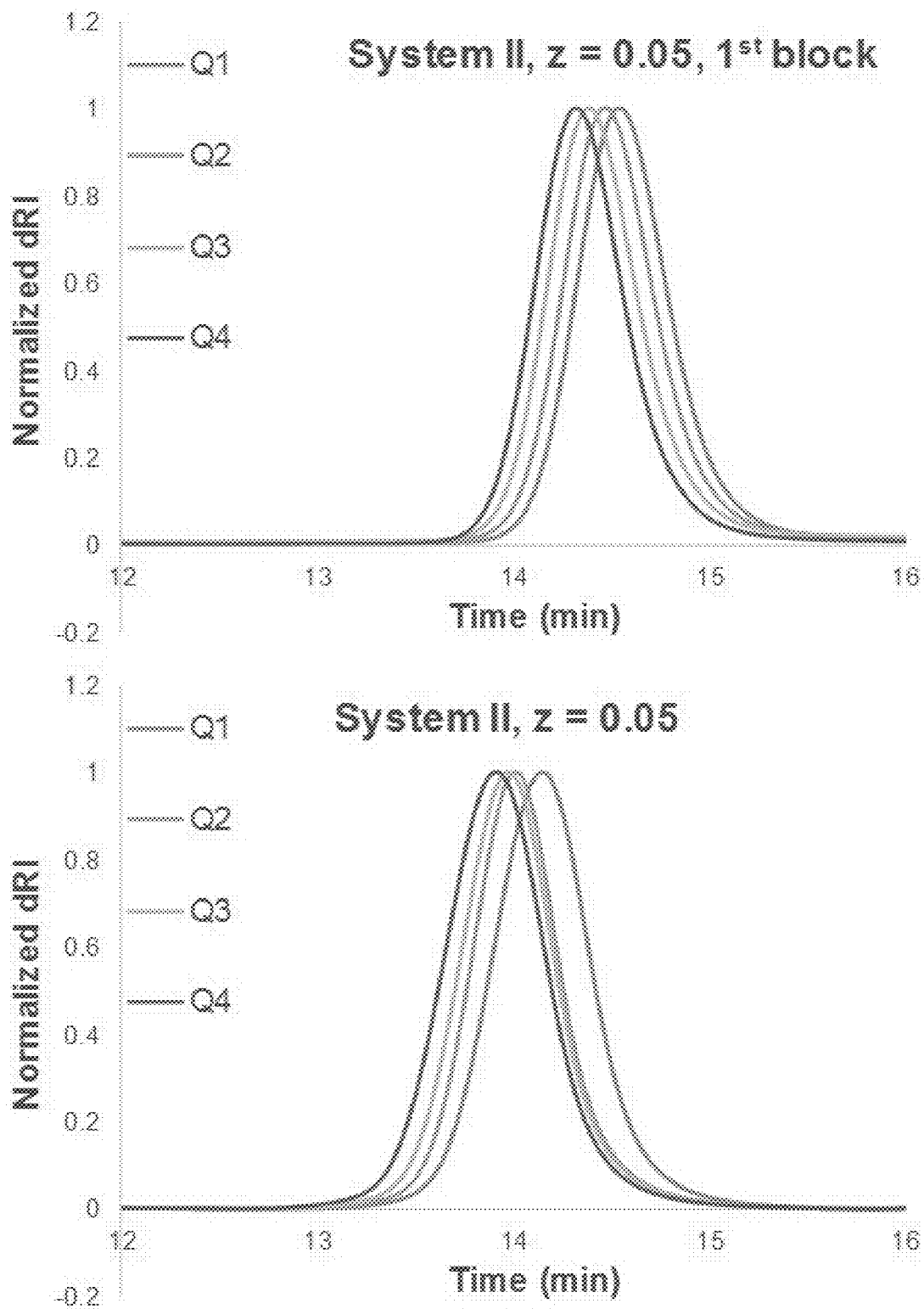

FIG. 75. SEC traces; (top) System II, $z=0.05$, $1^{st}$ block; System II, $z=0.05$ (bottom). These data correspond to certain structures of Examples 3A and 3B. The data curves left-to-right correspond to Q4 to Q1, respectively.

Figure 76A:
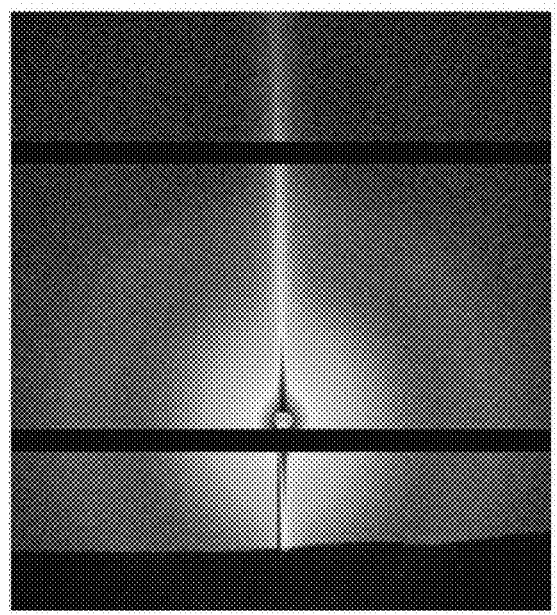
Figure 76B:
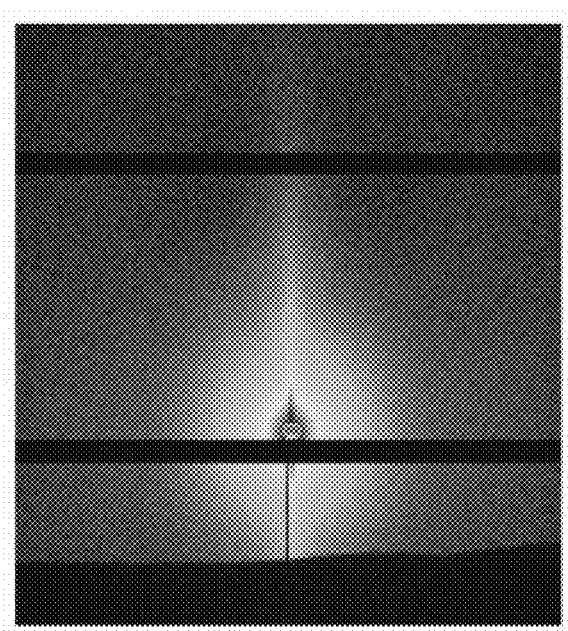

FIGS. 76A-76B. Raw 2D SAXS data for $z=0.05$ graft polymers: (FIG. 76A) $(PLA^{0.05}\text{-r-}DME^{0.95})_{200}$, (FIG. 76B) $(PS^{0.05}\text{-r-}DBE^{0.95})_{200}$. These polymers correspond to each block of the lowest-grafting-density samples investigated herein. Even at large $N_{bb}$, no evidence of microphase separation is observed, suggesting that each block is effectively homogeneous. To a first approximation, $\chi$ between the backbone and side chains does not appear significant. These data correspond to certain structures of Examples 3A and 3B.

Figure 77B:
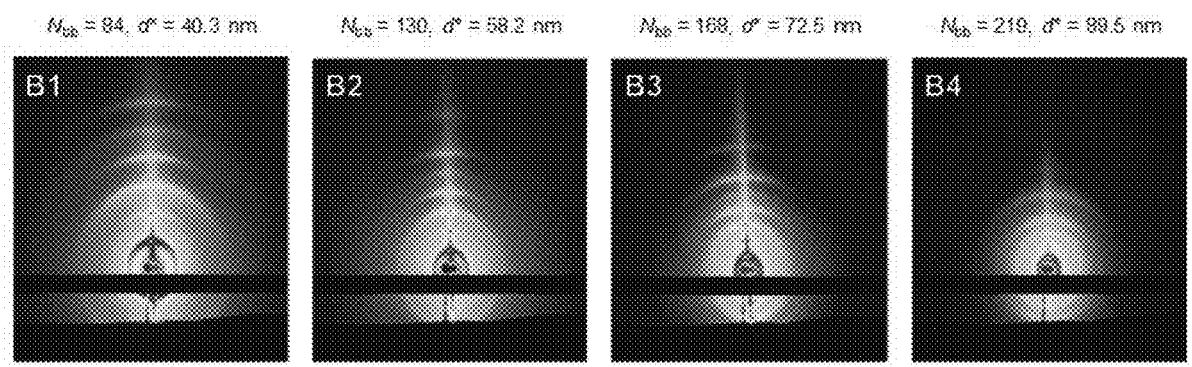
Figure 77C:
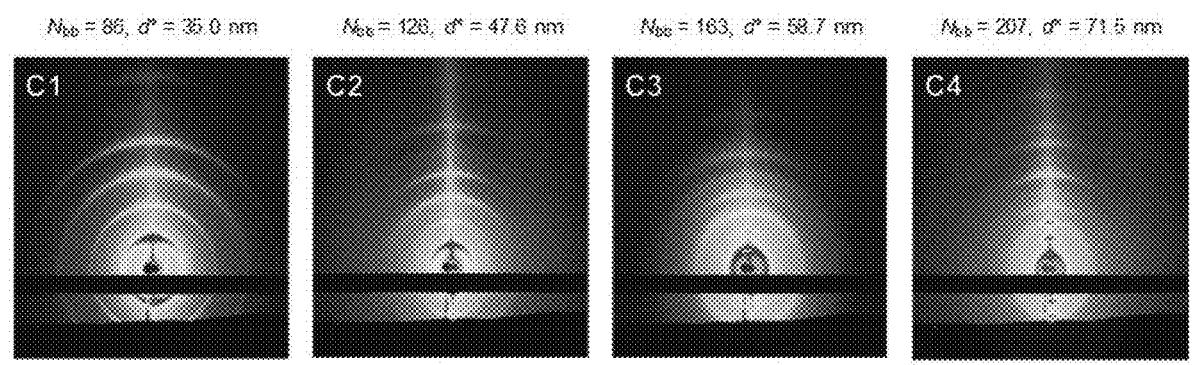
Figure 77D:
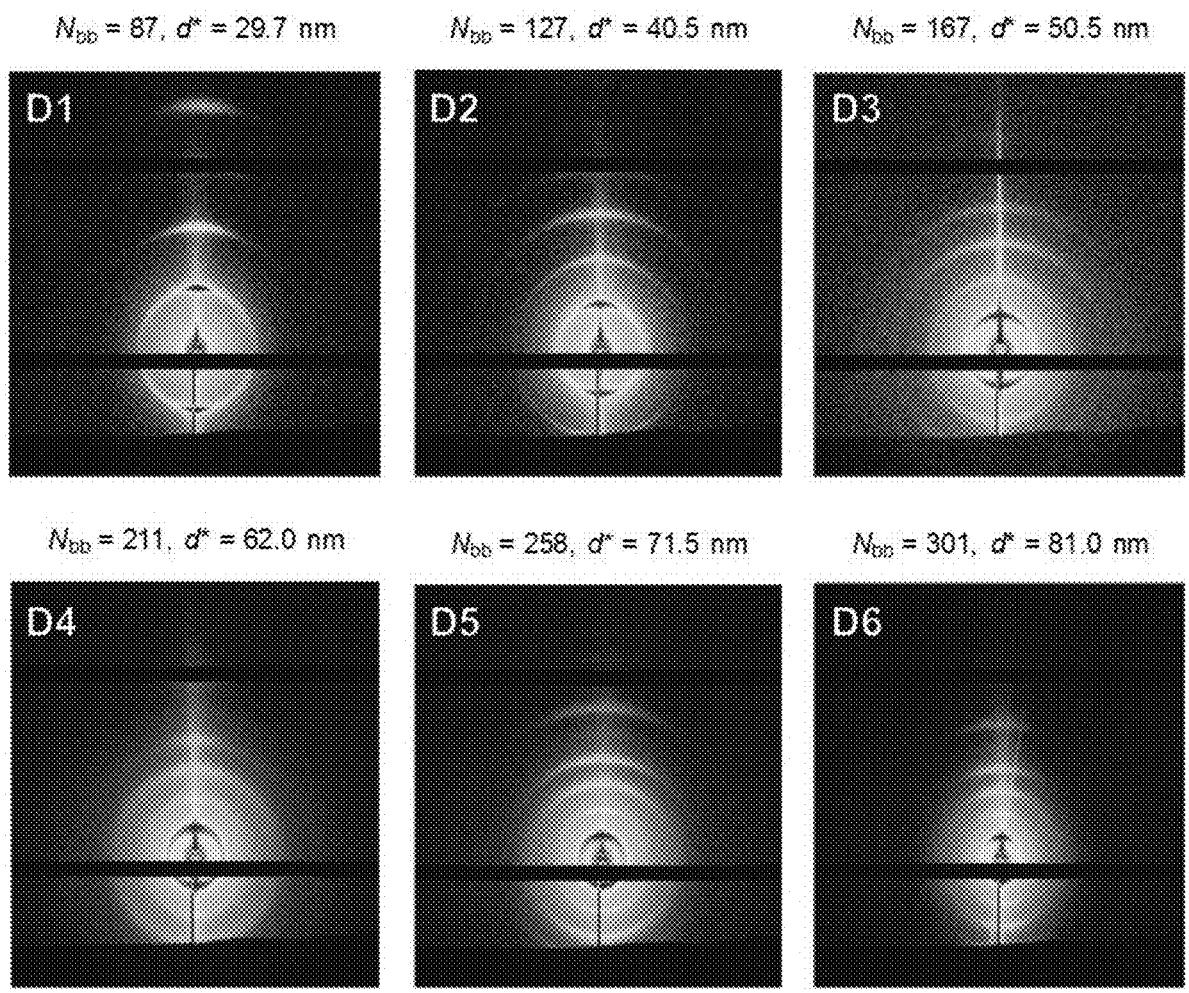
Figure 77E:
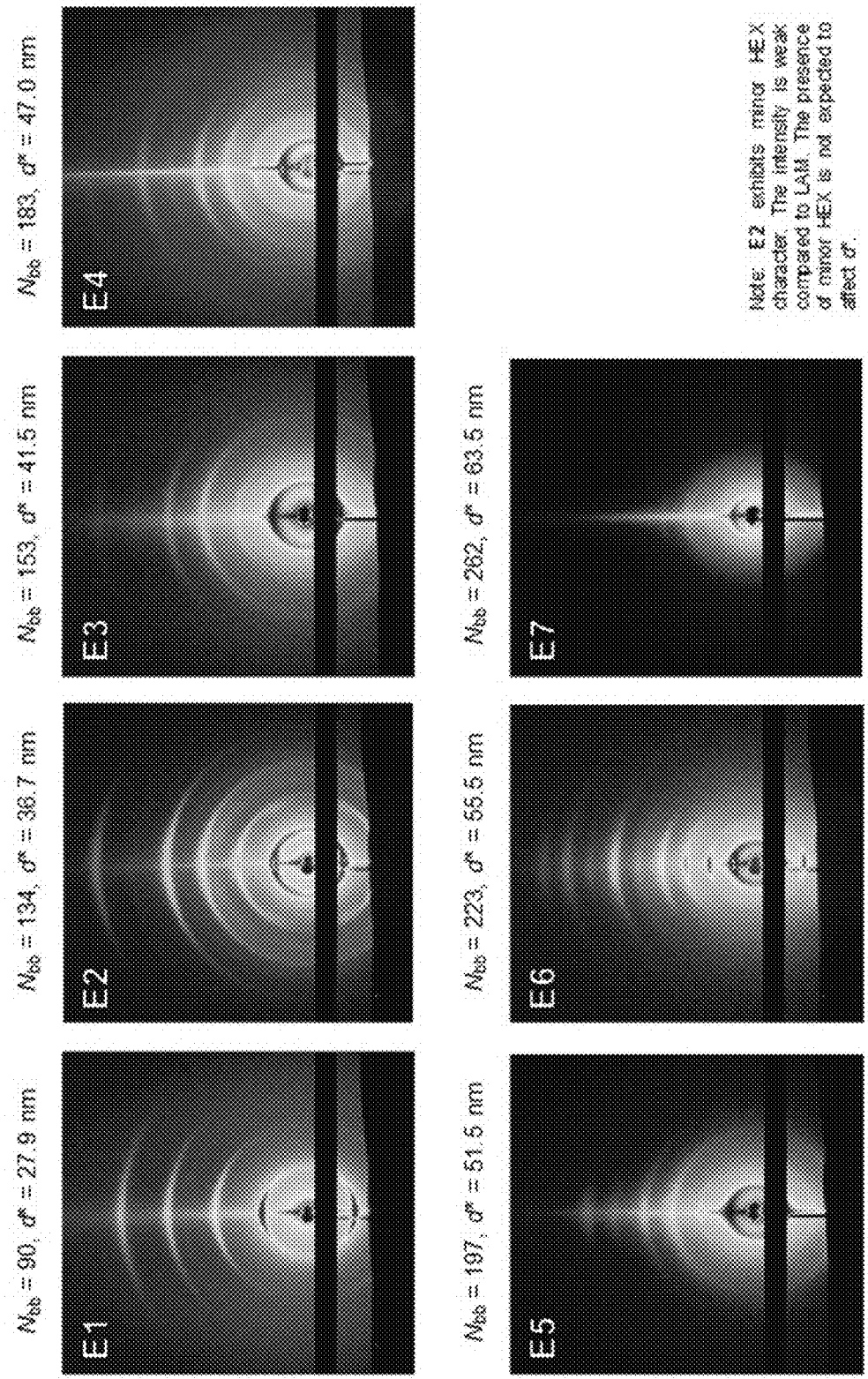
Figure 77F:
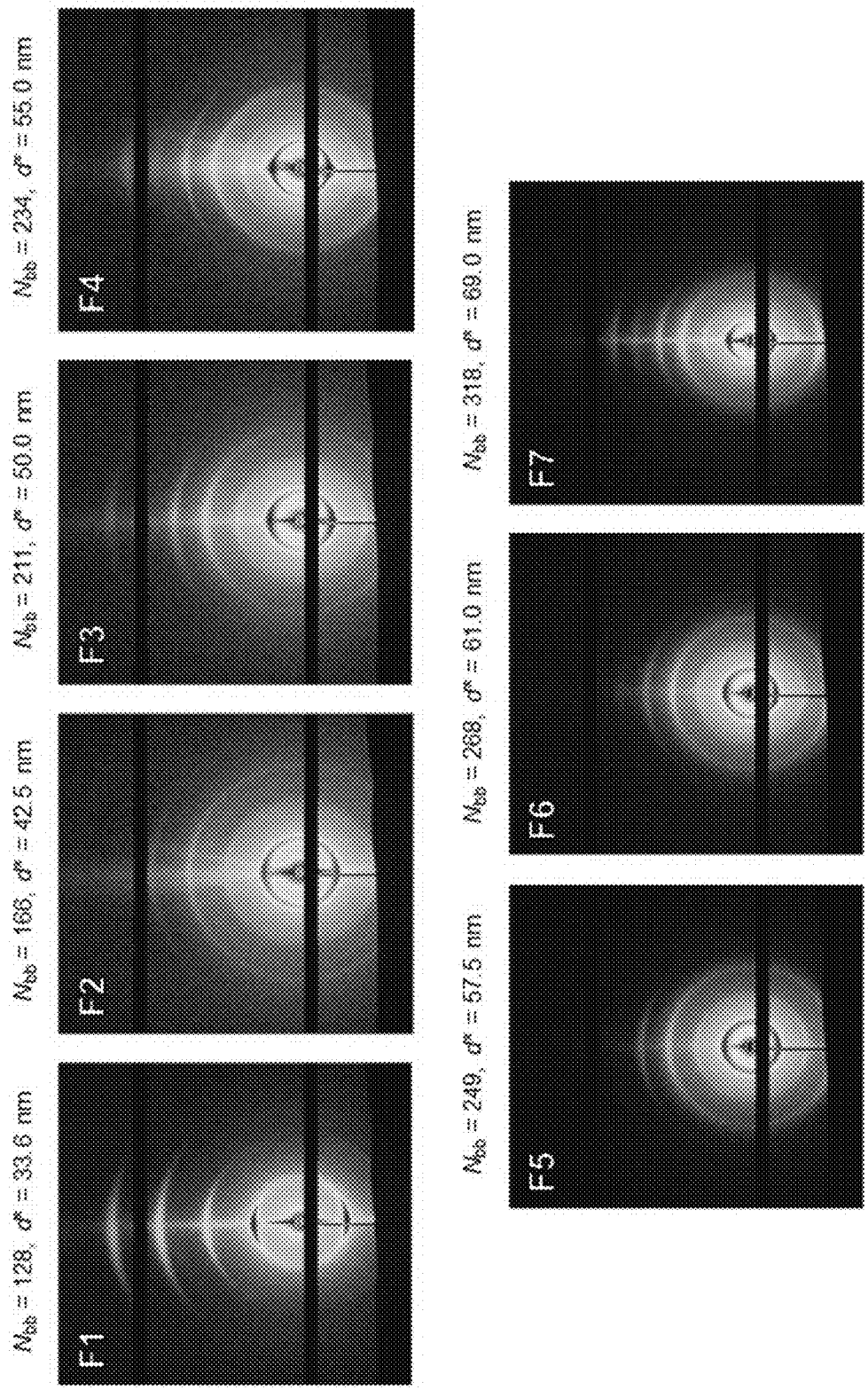
Figure 77H:
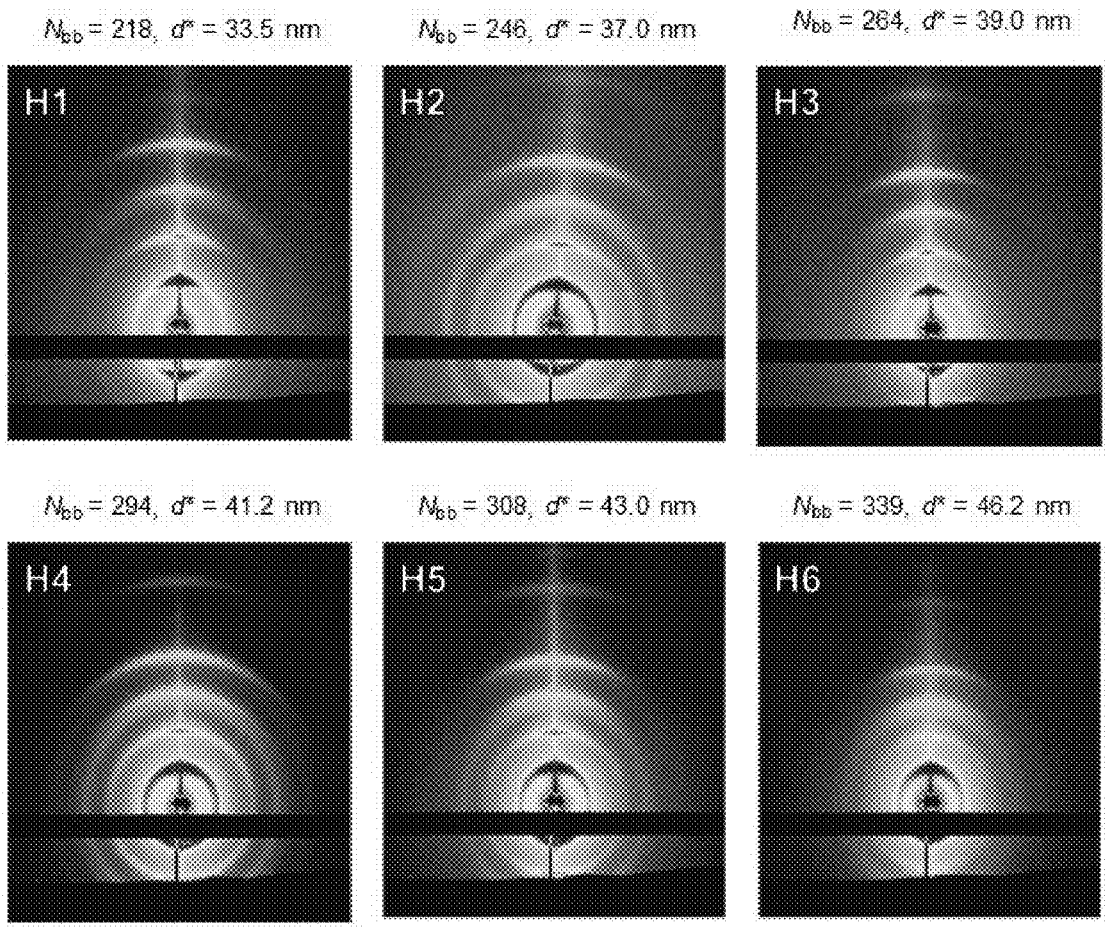

FIGS. 77A-77Q. Raw 2D SAXS data corresponding to certain structures (e.g., System 1 or System 2; e.g., having graft density "z", total backbone degree of polymerization "$N_{bb}$", and/or period "d*") of Examples 3A and 3B.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

In an embodiment, a composition or compound of the invention is isolated or purified. In an embodiment, an isolated or purified compound is at least partially isolated or purified as would be understood in the art. In an embodiment, the composition or compound of the invention has a chemical purity of at least 95%, optionally for some applications at least 99%, optionally for some applications at least 99.9%, optionally for some applications at least 99.99%, and optionally for some applications at least 99.999% pure.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications.

An "oligomer" refers to a molecule composed of repeating structural units connected by covalent chemical bonds often characterized by a number of repeating units less than that of a polymer (e.g., equal to or less than 3 repeating units) and a lower molecular weights (e.g. less than or equal to 1,000 Da) than polymers. Oligomers may be the polymerization product of one or more monomer precursors.

"Block copolymers" are a type of copolymer comprising blocks or spatially segregated domains, wherein different domains comprise different polymerized monomers, for example, including at least two chemically distinguishable blocks. Block copolymers may further comprise one or more other structural domains, such as hydrophobic groups, hydrophilic groups, thermosensitive groups, etc. In a block copolymer, adjacent blocks are constitutionally different, i.e.

adjacent blocks comprise constitutional units derived from different species of monomer or from the same species of monomer but with a different composition or sequence distribution of constitutional units. Different blocks (or domains) of a block copolymer may reside on different ends or the interior of a polymer (e.g. [A][B], [B][A], [A][B][C], or [B][A][C], etc.), or may be provided in a selected sequence (e.g., [A][B][A][B], [A][B][C], or [A][B][A][C], etc.).

"Diblock copolymer" refers to block copolymer having two different polymer blocks. "Triblock copolymer" refers to a block copolymer having three different polymer blocks, including compositions in which two non-adjacent blocks are the same or similar. "Pentablock" copolymer refers to a copolymer having five different polymer including compositions in which two or more non-adjacent blocks are the same or similar.

A "graft polymer" or "graft copolymer" is a branched copolymer having a backbone, which comprises linked polymer backbone groups, and one or more branches formed, at least partially, of another polymer group, optionally further including other components such as repeating units corresponding to or having a diluent group incorporated in or attached to the backbone. A "branch" is a polymer side chain (e.g., a branched repeating unit corresponds to a repeating unit having a polymer side chain attached to a polymer backbone group). In an embodiment, the polymer backbone of a graft copolymer is a linear backbone. Each branch includes repeating polymer units. In an embodiment, the distribution of branches, or side chains, along the backbone is random, linearly gradient, non-linearly gradient, blocky, or alternating. In an example, a gradient distribution of branches is one where the frequency of branches increases from one end of the polymer to another end. In an example of a blocky distribution of branches, a repeating sequence has five or more or ten or more sequential branches are followed by five or more or ten or more non-branched repeating units. In another embodiment of a blocky distribution of branches, each type of repeating unit corresponds to only one region of the respective graft copolymer [e.g., in the case of only two types of repeating units, the graft copolymer has a first region (e.g., between a first end point and a transition point) which has repeating units only of a first type and a second region (e.g., between a second end point and the transition point) which has repeating units only of a second type]. In an example of an alternating distribution of branches, every two, or every three repeating units is a branched repeating unit. In an embodiment, a non-branched repeating unit includes a polymer backbone group and, optionally, one or more other non-polymeric groups such as one or more diluent groups.

In a graft copolymer, each of the branches is independently a homopolymer or a copolymer. In an embodiment, each branch of a graft copolymer has repeating unit(s) identical to the other branches. In an embodiment, each branch of a graft copolymer is identical to the other branches. In an embodiment, a graft copolymer comprises two or more different types of branches (the repeating unit(s) of one branch being different from that of the other branch). In an embodiment, a graft copolymer has one or more types of non-branched repeating units. For example, a graft copolymer has at least a first repeating unit (e.g., non-branched, discrete, non-polymer side chain) and a second repeating unit (e.g., branched repeating unit). In an embodiment, a graft copolymer is a graft block copolymer, wherein a "graft block copolymer" is a graft copolymer having two or more different polymer blocks. In an embodiment, a polymer block of a graft block copolymer may be characterized as a graft copolymer itself. In an embodiment, each polymer block of a graft block copolymer may be characterized as a graft copolymer itself. In an embodiment, at least one polymer block of a graft block copolymer is not a graft copolymer (e.g., has no grafted polymer side chains or branches). In an embodiment, one or more polymer blocks of a graft block copolymer having two or more blocks are linear polymer blocks. A graft block copolymer may be characterized as having a distribution of polymer blocks which may be, for example, a random, a gradient, a blocky, or an alternating distribution of polymer blocks within the graft block copolymer.

As used herein, the term "discrete group" refers to a non-polymeric group. A discrete group may be a diluent group. A discrete group may be a combination of a polymer backbone group and one or more diluent groups.

The term "graft density" or "grafting density" refers to a ratio of the number of branched repeating units, of a graft copolymer or of a polymer block in a graft block copolymer, to the total number of repeating units in the graft copolymer or graft block copolymer. In other words, a graft density of 1 refers to a graft copolymer wherein each repeating unit is a branched repeating unit (i.e., 100% of the repeating units are branched—e.g., having polymer side chain groups). A graft density of 0.5 refers to a graft copolymer where half of the repeating units are branched and half of the repeating units are not branched (i.e., 50% of the repeating units are branched—e.g., having polymer side chain groups). In a graft block copolymer, each polymer block of the graft copolymer may have the same or a different graft density. In an embodiment, graft density of a graft copolymer, or a polymer block thereof, is selected from the range of greater than 0 to 1.0. In an embodiment, graft density of a graft copolymer, or a polymer block thereof, is selected from the range of 0.001 to 0.999. In an embodiment, graft density of a graft copolymer, or a polymer block thereof, is selected from the range of 0.01 to 0.99. In an embodiment, graft density of a graft copolymer, or a polymer block thereof, is at least 0.40. In an embodiment, a graft density is selected from the range of 0.4 to 0.99. In an embodiment, graft density of a graft copolymer, or a polymer block thereof, is selected from the range of 0.4 to 0.8. In an embodiment, graft density of a graft copolymer, or a polymer block thereof, is selected from the range of the range of 0.05 to 0.32, 0.34 to 0.49, 0.51 to 0.65, or 0.68 to 0.75. In an embodiment, graft density of a graft copolymer, or a polymer block thereof, is selected from the range of the range of 0.05 to 0.75.

The term "graft distribution" or "grafting distribution" refers to a distribution of branches or polymer side chains, or repeat units therewith, in a graft copolymer or a polymer block of a graft block copolymer having two or more types of repeating units (e.g., a first repeating unit and a second repeating unit; e.g., a first repeating unit, a second repeating unit, and a third repeating unit). In an embodiment, the graft distribution in graft copolymer, or polymer block thereof, is an alternating distribution, a blocky distribution, a random distribution, or a gradient distribution. In an embodiment, a gradient graft distribution is a linearly gradient distribution or a non-linearly gradient distribution. In an embodiment of an alternating graft distribution, every other one, every other two, every other three, every second, or every third repeating unit(s) is a first repeating unit. In an embodiment of a blocky graft distribution, four or more, five or more, 10 or more, 20 or more, or 50 or more are identical (e.g., a first repeating unit) and are followed by four or more, five or more, 10 or more, 20 or more, or 50 or more other identical repeating units (e.g., a second repeating unit). In another embodiment of a blocky graft distribution of branches, each type of repeating unit corresponds to only one region of the respective graft copolymer [e.g., in the case of only two types of repeating units, the graft copolymer has a first region (e.g., between a first end point and a transition point) which has repeating units only of a first type and a second region (e.g., between a second end point and the transition point) which has repeating units only of a second type]. In an embodiment of a random graft distribution, the distribution lacks long-range order, where long-range order refers to 10 or more or 20 or more repeating units. In an embodiment of a random graft distribution, the random distribution is not characterized as an alternating, a blocky, or a gradient distribution on a scale of 10 or more, or 20 or more, repeating units. In an embodiment, a gradient graft distribution is a linearly gradient distribution wherein the frequency of repeating units being branched repeating units increases linearly between one end and another end. In an embodiment, for example, a linearly gradient graft distribution is characterized as $y \propto mx$ (y is proportional to m*x), where x is a number of repeating units from a starting point (or, in other words, a distance along a polymer block from a starting end measured in increments of repeating units), y is the sum of repeating units that are branched between the starting point and x, and m is a proportionality constant, where a starting point is optionally a first repeating unit in a polymer block. In an embodiment, a gradient distribution is a non-linear distribution. In an embodiment, a non-linear gradient graft distribution is an exponential distribution characterized as $y \propto x^m$ (y is proportional to m^x), where x is a number of repeating units from a starting point (or, in other words, a distance along a polymer block from a starting end measured in increments of repeating units), y is the sum of repeating units that are branched between the starting point and x, and m is a constant, where a starting point is optionally a first repeating unit in a polymer block. In an embodiment, the graft distribution of a graft copolymer or a polymer block of a graft copolymer is determined by or is dependent upon the reactivity ratio of each of the precursors of the graft copolymer, where an exemplary precursor is a macromonomer or a reactive diluent.

The term "degree of polymerization" refers to the total number of repeating units in the respective polymer or polymer block. For example, when referring to a polymer block of a graft block copolymer, degree of polymerization is the number of repeating units in said polymer block. For example, when referring to an entire graft copolymer, degree of polymerization is the number of repeating units in said entire graft copolymer.

The term "reactivity ratio", used in reference to a chemical species which polymerizes in copolymerization reaction(s), such as a monomer, a macromonomer, or a reactive diluent, refers to a ratio of a homo-propagation rate constant to a hetero-propagation rate constant of said chemical species. For example, a monomer or diluent species $M_1$ and a macromonomer species $M_2$, which together may copolymerize, are combined. In this latter example, four reactions are possible:

$$M_1^* + M_1 \rightarrow M_1M_1^* (k_{11})$$

$$M_1^* + M_2 \rightarrow M_1M_2^* (k_{12})$$

$$M_2^* + M_2 \rightarrow M_2M_2^* (k_{22})$$

$$M_2^* + M_1 \rightarrow M_2M_1^* (k_{21})$$

where each of $M_1^*$ and $M_2^*$ refers to a radical (reactive) species chain end group of the respective species $M_1$ or $M_2$, and where $k_{11}$, $k_{12}$, $k_{22}$, and $k_{21}$ are the rate constants of the respective reactions. In this latter example, the reactivity ratio of species M1 is $$r_1 = \frac{k_{11}}{k_{12}}$$

and the reactivity ratio of species $M_2$ is $$r_2 = \frac{k_{22}}{k_{21}}.$$

The term "initial concentration" may be used in reference to a chemical species, such as a macromonomer, participating in a reaction, such as a copolymerization reaction, where said reaction consumes said chemical species. When used in this way, the initial concentration of a chemical species is its concentration after it is introduced into the solution where the reaction takes place but immediately before the reaction initiates. In other words, the initial concentration of a species is its concentration at time=0 ("$t_0$").

As used herein, the term "diluent" may refer to a "reactive diluent", which refers to a monomeric chemical species capable of participating in a (co)polymerization reaction. Optionally, a reactive diluent is a chemical species characterized as having a low molecular weight as compared to a macromonomer. In an embodiment, the molecular weight of a diluent or a reactive diluent is less than 1,000 Da, or less than 500 Da, or less than 300 Da. In an embodiment, a reactive diluent comprises a polymer backbone precursor group and one or more diluent groups. In an embodiment, a diluent group is a discrete, non-monomer, or non-polymer group that is directly or indirectly covalently linked to a polymer backbone of a (co)polymer. In an embodiment, a graft copolymer, or a polymer block thereof, has one or more repeating units each of which comprises one or more diluent groups wherein each repeating unit that has a diluent group is a non-branched repeating unit. In an embodiment, a non-branched repeating unit is a repeating unit, of a polymer or polymer block, which lacks a polymer side chain. In an embodiment, a diluent comprises a polymer backbone precursor group having a strained olefin group, an anchor group linked to the polymer backbone precursor group, and a diluent dangling group directly or indirectly linked to the anchor group. In an embodiment, a diluent comprises a polymer backbone precursor group having a strained olefin group, an anchor group linked to the polymer backbone precursor group, a linker group linked to the anchor group, and a diluent dangling group linked to the linker group. An exemplary polymer backbone precursor group is a norbornene group. Exemplary anchor groups include, but are not limited to, groups having an alkoxy group, an ester group, an imide group, an anhydride group, and a combination thereof. Exemplary linker groups include, but are not limited to, a single bond, an oxygen, and groups having an alkyl group, an alkenylene group, an arylene group, an alkoxy group, an acyl group, a triazole group, a diazole group, a pyrazole group, and any combination thereof. Exemplary diluent dangling groups include, but are not limited to, alkyl groups such as $C_1$-$C_{10}$ alkyl groups. Exemplary diluents include, but are not limited to, racemic endo,exo-norbornenyl diesters with a methyl, an ethyl, or an n-butyl diluent dangling group linked to each ester.

The term "polymer backbone precursor group" refers to a chemical group that is incorporated into a polymer, or polymer block, backbone as a polymer backbone group as a result of a (co)polymerization reaction. In an embodiment, the polymer backbone precursor group is changed or otherwise transformed during a polymerization reaction such that the polymer backbone precursor group is not identical to the polymer backbone group which it becomes. For example, a norbornenyl group, which is an exemplary polymer backbone precursor group, may be incorporated into a polymer backbone as a divinylcyclopentane group, which is an exemplary polymer backbone group. In an embodiment, the polymer backbone precursor group is changed or otherwise transformed during a polymerization reaction such that the polymer backbone precursor group is not identical to the polymer backbone group which it becomes but one is a derivative of the other.

The term "preselected" or "pre-selected" may be used in reference to property or feature of a polymer or polymer block. In an embodiment, a preselected property or feature of a polymer, or polymer block, is a property or feature that is selected or determined (to within some degree of tolerance—e.g., to within 10% or within 5%) in advance or prior to the formation or (co)polymerization of said polymer, or polymer block. In an embodiment, a polymer or polymer block having at least one preselected property or feature is a deterministic polymer or polymer block. In an embodiment, a method for forming or synthesizing a polymer or polymer block having at least one preselected property or feature is a deterministic method for forming or synthesizing said polymer or polymer block. Exemplary properties or features, which may be preselected in accordance with the present invention, of a polymer or polymer block, include a graft density, a graft distribution, and a degree of polymerization.

The term "strained" in reference to a chemical species or group, such as a "strained olefin group", refers to a chemical species or group that has a higher internal energy, due to strain, compared to a strain-free reference. Strain refers to a form of deformation. In an embodiment, strain refers to a compression or expansion of one or more bonds compared the lowest internal energy state equilibrium state of the bond. In an embodiment, a strain-free reference is the chemical species or group in its lowest internal energy equilibrium state.

The term "substantially equal" or "substantially equivalent", when used in conjunction with a reference value describing a property or condition, refers to a value that is within 10%, within 5%, within 1%, or is equivalent to the provided reference value. For example, a reactivity ratio is substantially equal to 1.00 if the reactivity ratio is a value within 10%, within 5%, within 1%, or equivalent to 1.00. The term "substantially greater", when used in conjunction with a reference value describing a property or condition, refers to a value that is at least 2%, at least 5%, or at least 10% greater than the provided reference value. For example, a reactivity ratio is substantially greater than 1.00 if the reactivity ratio is at least 2%, at least 5%, or at least 10% greater than 1.00. The term "substantially less", when used in conjunction with a reference value describing a property or condition, refers to a value that is at least 2%, at least 5%, or at least 10% less than the provided reference value. For example, a reactivity ratio is substantially less than 1.00 if the reactivity ratio is at least 2%, at least 5%, or at least 10% less than 1.00.

The term "Grubbs' catalyst" refers to a transition metal carbene complex, known in the art as a Grubbs' catalyst, and which may be used as a catalyst for olefin metathesis. A "third-generation Grubbs' catalyst" is defined by the formula (FX100):

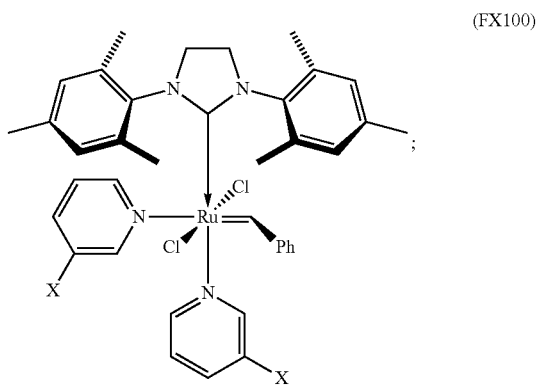

(FX100)

where X is a hydrogen or a halide (e.g., F, Cl, Br, or I).

A "bottlebrush" or "bottlebrush-type" graft copolymer is a graft copolymer, or polymer block thereof, having a high graft density and having branches extending in at least two directions. In an embodiment, a bottlebrush-type graft copolymer has a graft density of at least 0.55, at least 0.75, or at least 0.90 and has branches that extend, in total, in at least two or at least four directions from the polymer backbone. A "comb" or "comb-type" graft copolymer is a graft copolymer, or polymer block thereof, having a high graft density and having branches extending in substantially only one direction or in substantially only two directions. In an embodiment, a bottlebrush-type graft copolymer has a graft density of at least 0.55, at least 0.75, or at least 0.90 and has branches that extend substantially in only one direction or in substantially only two directions from the polymer backbone. A "linear" or "linear-type" graft copolymer is a graft copolymer, or polymer block thereof, that does not have branched repeating units, or repeating units comprising a polymer side chain.

As used herein, the term "macromonomer" refers to a high-molecular weight chemical species comprising a polymer backbone precursor group, which allows the macromonomer to act as a monomer. In an embodiment, a macromonomer comprises a polymer backbone precursor group and a polymer chain comprising at least two repeating units. In an embodiment, a macromonomer has a molecular weight of at least 500 Da, at least 1,000 Da, at least 5,000 Da, or at least 10,000 Da. In an embodiment, a macromonomer has a molecular weight selected from the range of 500 Da to 50,000 Da, or 500 Da to 10,000 Da, or 1,000 Da to 50,000 Da, or 1,000 Da to 10,000 Da. In an embodiment, a macromonomer comprises a polymer backbone precursor group having a strained olefin group, an anchor group linked to the polymer backbone precursor group, and a polymer side chain group directly or indirectly linked to the anchor group. In an embodiment, a macromonomer comprises a polymer backbone precursor group having a strained olefin group, an anchor group linked to the polymer backbone precursor group, a linker group linked to the anchor group, and a polymer side chain group linked to the linker group. An exemplary polymer backbone precursor group is a norbornene group. Exemplary anchor groups include, but are not limited to, groups having an alkoxy group, an ester group, an imide group, an anhydride group, and a combination thereof. Exemplary linker groups include, but are not limited to, a single bond, an oxygen, and groups having an alkyl group, an alkenylene group, an arylene group, an alkoxy group, an acyl group, a triazole group, a diazole group, a pyrazole group, and any combination thereof. Exemplary polymer side chain groups include, but are not limited to polystyrene (PS), polylactide (PLA), and polydimethylsiloxane (PDMS).

"Ionophobic" refers to a property of a functional group, or more generally a component of a compound, such as one or more polymer side chain groups of a brush block copolymer, which are immiscible with polar compounds, including, but not limited to, at least one of the following: water, ionic liquid, lithium salts, methanol, ethanol, and isopropanol. In a specific embodiment, for example, "ionophobic" refers to a property of a functional group, or more generally a component of a compound, such as one or more polymer side chain groups of a brush block copolymer, which are immiscible with at least one of the following water, methanol, ethanol, and isopropanol. In some embodiments, ionophobic is used to describe one or more side chains characterizing a polymer block of a copolymer that does not contribute substantially to the ionic conductivity of a copolymer or physical network thereof, but instead contributes to one or more other chemical, physical or electronic properties, such as the mechanical strength of a brush block copolymer physical network. In an embodiment, for example, polystyrene, poly(methyl methacrylate), poly(ethylene), poly(propylene), poly(butadiene), and poly(isoprene) are examples of ionophobic polymer side chains. In an embodiment, an ionophobic polymer side chain of a brush block copolymer is a hydrophobic polymer side chain.

"Ionophilic" refers to a property of a functional group, or more generally a component, of a compound, such as one or more polymer side chain groups of a brush block copolymer, which exhibit miscibility at certain relative concentrations with polar compounds including, but not limited to, at least one of the following: water, ionic liquid, lithium salts, methanol, ethanol, and isopropanol. In a specific embodiment, for example, "ionophilic" refers to a property of a functional group, or more generally a component, of a compound, such as one or more polymer side chain groups of a brush block copolymer, which exhibit miscibility with at least one of the following water, methanol, ethanol, and isopropanol. In some embodiments, "ionophilic" is used to describe one or more a side chains characterizing a polymer block of a copolymer that contributes substantially to the net ionic conductivity of a copolymer or physical network thereof. In an embodiment, for example, poly(ethylene oxide), poly(lactide), poly(N-isopropylacrylamide), and poly(pyrrolidinone) are examples of ionophilic polymer side chains. In an embodiment, an ionophilic polymer side chain of a brush block copolymer is a hydrophilic polymer side chain.

"Polymer backbone group" refers to groups that are covalently linked to make up a backbone of a polymer, such as a graft block copolymer. Polymer backbone groups may be linked to side chain groups, such as polymer side chain groups. Some polymer backbone groups useful in the present compositions are derived from polymerization of a monomer selected from the group consisting of a substituted or unsubstituted norbornene, olefin, cyclic olefin, norbornene anhydride, cyclooctene, cyclopentadiene, styrene and acrylate. Some polymer backbone groups useful in the present compositions are obtained from a ring opening metathesis polymerization (ROMP) reaction. Polymer backbones may terminate in a range of backbone terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{30}R^{40}$, —$NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl.

"Polymer side chain group" refers to a group covalently linked to a polymer backbone group that comprises a polymer side chain, optionally imparting steric properties to the polymer. In an embodiment, for example, a polymer side chain group is characterized by a plurality of repeating units having the same, or similar, chemical composition. A polymer side chain group may be directly or indirectly linked to the polymer back bone groups. In some embodiments, polymer side chain groups provide steric bulk and/or interactions that result in an extended polymer backbone and/or a rigid polymer backbone. Some polymer side chain groups useful in the present compositions include unsubstituted or substituted polyisocyanate group, polymethacrylate group, polyacrylate group, polymethacrylamide group, polyacrylamide group, polyquinoxaline group, polyguanidine group, polysilane group, polyacetylene group, polyamino acid group, polypeptide group, polychloral group, polylactide group, polystyrene group, polyacrylate group, poly tert-butyl acrylate group, polymethyl methacrylate group, polysiloxane group, polydimethylsiloxane group, poly n-butyl acrylate group, polyethylene glycol group, polyethylene oxide group, polyethylene group, polypropylene group, polytetrafluoroethylene group, and polyvinyl chloride group. Some polymer side chain groups useful in the present compositions comprise repeating units obtained via anionic polymerization, cationic polymerization, free radical polymerization, group transfer polymerization, or ring-opening polymerization. A polymer side chain may terminate in a wide range of polymer side chain terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{30}R^{40}$, —$NR^{41}COR^{42}$, $C_1$-$C_{10}$ alkyl halide, phosphonate, phosphonic acid, silane, siloxane acrylate, or catechol; wherein each of $R^{30}$-$R^{42}$ is independently hydrogen or $C_1$-$C_5$ alkyl.

As used herein, the term "brush block copolymer" refers to a block copolymer in containing at least one polymer backbone group covalently linked to at least one polymer side chain group.

"Polymer blend" refers to a mixture comprising at least one polymer, such as a block copolymer, e.g., brush block copolymer, and at least one additional component, and optionally more than one additional component. In some embodiments, for example, a polymer blend of the invention comprises a first brush block copolymer and one or more electrochemical additives. In some embodiments, for example, a polymer blend of the invention further comprises one or more additional brush block copolymers, homopolymers, copolymers, block copolymers, brush block copolymers, oligomers, electrochemical additives, solvents, metals, metal oxides, ceramics, liquids, small molecules (e.g., molecular weight less than 500 Da, optionally less than 100 Da), or any combination of these. Polymer blends useful for some applications comprise a first block copolymer, such as a brush block copolymer or a wedge-type block copolymer, and one or more additional components comprising block copolymers, brush block copolymers, wedge-type block copolymers, linear block copolymers, random copolymers, homopolymers, or any combinations of these. Polymer blends of the invention include mixture of two, three, four, five and more components.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group, including, but not limited to: a halogen or halide, an alkyl, a cycloalkyl, an aryl, a heteroaryl, an acyl, an alkoxy, an alkenyl, an alkynyl, an alkylaryl, an arylene, a heteroarylene, an alkenylene, a cycloalkenylene, an alkynylene, a hydroxyl (—OH), a carbonyl (RCOR'), a sulfide (e.g., RSR'), a phosphate (ROP(=O)(OH)$_2$), an azo (RNNR'), a cyanate (ROCN), an amine (e.g., primary, secondary, or tertiary), an imine (RC(=NH)R'), a nitrile (RCN), a pyridinyl (or pyridyl), a diamine, a triamine, an azide, a diimine, a triimine, an amide, a diimide, or an ether (ROR'); where each of R and R' is independently a hydrogen or a substituted or unsubstituted alkyl group, aryl group, alkenyl group, or a combination of these. Optional substituent functional groups are also described below. In some embodiments, the term substituted refers to a compound wherein more than one hydrogen is replaced by another functional group, such as a halogen group.

Unless otherwise specified, the term "molecular weight" refers to an average molecular weight. Unless otherwise specified, the term "average molecular weight," refers to number-average molecular weight. Number average molecular weight is defined as the total weight of a sample volume divided by the number of molecules within the sample. As is customary and well known in the art, peak average molecular weight and weight average molecular weight may also be used to characterize the molecular weight of the distribution of polymers within a sample.

The term "weight-average molecular weight" ($M_w$) refers to the average molecular weight defined as the sum of the products of the molecular weight of each polymer molecule ($M_i$) multiplied by its weight fraction ($w_i$): $M_w = \Sigma w_i M_i$. As is customary and well known in the art, peak average molecular weight and number average molecular weight may also be used to characterize the molecular weight of the distribution of polymers within a sample.

As is customary and well known in the art, hydrogen atoms in formulas (FX1a)-(FX12f) are not always explicitly shown, for example, hydrogen atoms bonded to the carbon atoms of aromatic, heteroaromatic, and alicyclic rings are not always explicitly shown in formulas (FX1a)-(FX12f). The structures provided herein, for example in the context of the description of formulas (FX1a)-(FX12f) and schematics and structures in the drawings, are intended to convey to one of reasonable skill in the art the chemical composition of compounds of the methods and compositions of the invention, and as will be understood by one of skill in the art, the structures provided do not indicate the specific positions and/or orientations of atoms and the corresponding bond angles between atoms of these compounds.

As used herein, the terms "alkylene" and "alkylene group" are used synonymously and refer to a divalent group derived from an alkyl group as defined herein. The invention includes compounds having one or more alkylene groups. Alkylene groups in some compounds function as linking and/or spacer groups. Compounds of the invention may have substituted and/or unsubstituted $C_1$-$C_{20}$ alkylene, $C_1$-$C_{10}$ alkylene and $C_1$-$C_5$ alkylene groups, for example, as one or more linking groups (e.g. $L^1$-$L^6$).

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as linking and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups, for example, as one or more linking groups (e.g. $L^1$-$L^6$).

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as linking and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups, for example, as one or more linking groups (e.g. $L^1$-$L^6$).

As used herein, the terms "heteroarylene" and "heteroarylene group" are used synonymously and refer to a divalent group derived from a heteroaryl group as defined herein. The invention includes compounds having one or more heteroarylene groups. In an embodiment, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as linking and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups, for example, as one or more linking groups (e.g. $L^1$-$L^6$).

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as linking and/or spacer groups. Compounds of the invention include substituted and/or unsubstituted $C_2$-$C_{20}$ alkenylene, $C_2$-$C_{10}$ alkenylene and $C_2$-$C_5$ alkenylene groups, for example, as one or more linking groups (e.g. $L^1$-$L^6$).

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as linking and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups, for example, as one or more linking groups (e.g. $L^1$-$L^6$).

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as linking and/or spacer groups. Compounds of the invention include substituted and/or unsubstituted $C_2$-$C_{20}$ alkynylene, $C_2$-$C_{10}$ alkynylene and $C_2$-$C_5$ alkynylene groups, for example, as one or more linking groups (e.g. $L^1$-$L^6$).

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, rhreonine, asparagine, glutamine, tyrosine, cysteine, lysine, arginine, histidine, aspartic acid and glutamic acid. As used herein, reference to "a side chain residue of a natural α-amino acid" specifically includes the side chains of the above-referenced amino acids. Peptides are comprised of two or more amino-acid connected via peptide bonds.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7-, or 8-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—. Compositions of some embodiments of the invention comprise alkyl groups as terminating groups, such as polymer backbone terminating groups and/or polymer side chain terminating groups. Substituted alkyl groups may include substitution to incorporate one or more silyl groups, for example wherein one or more carbons are replaced by Si.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms. Compositions of some embodiments of the invention comprise alkenyl groups as terminating groups, such as polymer backbone terminating groups and/or polymer side chain terminating groups.

Aryl groups include groups having one or more 5-, 6-7-, or 8-member aromatic rings, including heterocyclic aromatic rings. The term heteroaryl specifically refers to aryl groups having at least one 5-, 6-7-, or 8-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocyclic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents. Compositions of some embodiments of the invention comprise aryl groups as terminating groups, such as polymer backbone terminating groups and/or polymer side chain terminating groups.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms. Compositions of some embodiments of the invention comprise arylalkyl groups as terminating groups, such as polymer backbone terminating groups and/or polymer side chain terminating groups.

As to any of the groups described herein which contain one or more substituents, it is understood that such groups do not contain any substitution or substitution patterns which are sterically impractical and/or synthetically non-feasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine; pseudohalides, including —CN;

—COOR where R is a hydrogen or an alkyl group or an aryl group and more specifically where R is a methyl, ethyl, propyl, butyl, or phenyl group all of which groups are optionally substituted;

—COR where R is a hydrogen or an alkyl group or an aryl group and more specifically where R is a methyl, ethyl, propyl, butyl, or phenyl group all of which groups are optionally substituted;

—CON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—OCON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—N(R)$_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;

—SR, where R is hydrogen or an alkyl group or an aryl group and more specifically where R is hydrogen, methyl, ethyl, propyl, butyl, or a phenyl group, which are optionally substituted;

—SO$_2$R, or —SOR where R is an alkyl group or an aryl group and more specifically where R is a methyl, ethyl, propyl, butyl, or phenyl group, all of which are optionally substituted;

—OCOOR where R is an alkyl group or an aryl group;

—SO$_2$N(R)$_2$ where each R, independently of each other R, is a hydrogen, or an alkyl group, or an aryl group all of which are optionally substituted and wherein R and R can form a ring which can contain one or more double bonds and can contain one or more additional carbon atoms; and —OR where R is H, an alkyl group, an aryl group, or an acyl group all of which are optionally substituted. In a particular example R can be an acyl yielding—OCOR" where R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible.

Many of the molecules disclosed herein contain one or more ionizable groups. Ionizable groups include groups from which a proton can be removed (e.g., —COOH) or added (e.g., amines) and groups that can be quaternized (e.g., amines). All possible ionic forms of such molecules and salts thereof are intended to be included individually in the disclosure herein. With regard to salts of the compounds herein, one of ordinary skill in the art can select from among a wide variety of available counterions that are appropriate for preparation of salts of this invention for a given application. In specific applications, the selection of a given anion or cation for preparation of a salt can result in increased or decreased solubility of that salt.

The compounds of this invention can contain one or more chiral centers. Accordingly, this invention is intended to include racemic mixtures, diastereomers, enantiomers, tautomers and mixtures enriched in one or more stereoisomer. The scope of the invention as described and claimed encompasses the racemic forms of the compounds as well as the individual enantiomers and non-racemic mixtures thereof.

As used herein, the term "polydispersity index" of a polymer can be calculated as $M_w/M_n$, where $M_w$ is the weight-averaged molar mass and $M_n$ is the number-averaged molar mass of the polymer. In an embodiment, the polydispersity index of a graft copolymer of the present invention is selected from the range of 1.00 to 1.20, or 1.00 to 1.10, or 1.00 to 1.05.

As used herein, the term "thermosensitive" refers to a temperature-responsive or thermoresponsive polymer that exhibits significant and, optionally discontinuous, change of their physical properties with temperature, such as a change in phase, or physical property.

As used herein, the term "% w/v" refers to a measurement of concentration wherein 1% w/v equates to 1 g of solute per a total volume of 100 mL of solution.

The terms "non-aqueous solvent", "nonaqueous solvent", and "organic solvent" may be used interchangeably and refer to a non-water liquid in which may dissolve a solute, such as a metal-coordination complex. The non-aqueous solvent may include small amounts of water, such that the water is a solute or impurity dissolved in the non-aqueous solvent. The non-aqueous solvent may include small amounts of water but such that the predominant phase of the solution is the non-water liquid and the solute(s) remains substantially dissolved in the non-water phase. In some of the embodiments disclosed herein, non-aqueous solvent may be acetonitrile, 2-methyltetrahydrofuran, tetrahydrofuran, nitromethane, dichloromethane, propylene carbonate, liquid sulfur dioxide (l-SO$_2$), dimethyl formamide, ionic liquid, perfluorinated liquid, or any combination of these.

The term "self-assembly" refers to a process in which individual elements assemble into a network, optionally a crystalline network, or organized structure without external direction. In an embodiment, self-assembly leads to a decrease in entropy of a system. In an embodiment, a self-assembly process is an annealing process, wherein a disordered system takes on a more ordered arrangement. In an embodiment, self-assembly may be induced, or initiated, via temperature and/or pressure. In an embodiment, self-assembly is induced or initiated via pressure, either due to a change in pressure, such as a pressure increase, and/or due to reaching a particular pressure at which self-assembly occurs. Self-assembly induced or initiated via pressure may be referred to as pressure annealing. In an embodiment, pressure annealing is performed by applying a contact pressure on a material or a layer thereof. In an embodiment, self-assembly is induced or initiated via temperature, either due to a change in temperature, such as a temperature increase, and/or due to reaching a particular temperature at which self-assembly occurs. Self-assembly induced or initiated via temperature may be referred to as temperature annealing. A "self-assembled structure" is a structure or network formed by self-assembly. In an embodiment, self-assembly is a polymer crystallization process. The Gibbs free energy of the self-assembled structure is lower than of the sum of the individual components in their non-organized arrangement prior to self-assembly under otherwise identical conditions (e.g., temperature and pressure). In an embodiment, entropy of a self-assembled structure is lower than that of the sum of the individual components in their non-organized arrangement prior to self-assembly under otherwise identical conditions (e.g., temperature and pressure). In an embodiment, a self-assembled structure is a polymer network formed from a plurality of polymers, such as graft block copolymers. In an embodiment, a self-assembled structure is an amorphous, a semi-crystalline, or a crystalline polymer network or structure. In an embodiment, a self-assembled structure is a semi-crystalline or a crystalline polymer network or structure. In an embodiment, a self-assembled structure is a semi-crystalline polymer structure having a degree of crystallinity selected from the range of 10% to 90%, or 10% to 80%. In an embodiment, a self-assembled structure is a polymer network having a lamellar structure. In an embodiment, a lamellar structure is a rectangular sheet structure having a finite length, width, and thickness. A lamellar structure or network may be referred to as a lamella. A polymer network having a lamellar structure may be characterized as having a period, which refers to a characteristic size dimension (e.g., thickness) of a unit cell or repeating structural unit of the lamellar structure. A characteristic size dimension may be a size of a repeating structure unit in the direction of repetition. For example, a lamellar sheet characterized as having a stack of parallel [A] and [B] planes (e.g., [A][B][A][B], etc.), where each [A] plane is substantially identical to other [A] planes and each [B] plane is substantially identical to other [B] planes, may be characterized as having a period corresponding to the sum thickness of one [A][B] sequence (or, thickness of one [A] plane and one [B] plane).

The term "photonic crystal" refers to a periodic structure that affects the motion of photons. In an embodiment, a photonic crystal is at least partially or is substantially formed of a polymer network or polymer structure, such as a lamellar polymer structure. In an embodiment, a photonic crystal is capable of or is configured to reflect at least a portion of wavelengths of the visible light spectrum. In an embodiment, a photonic crystal is capable of or is configured to reflect at least a portion of wavelengths of the infrared light spectrum. In an embodiment, a photonic crystal is capable of or is configured to reflect at least a portion of wavelengths of the visible light spectrum and of the infrared light spectrum.

The term "matrix-sphere structure" refers to a structure characterized as comprising a matrix having element A and spheres having element B. In an embodiment, a matrix-sphere structure refers to a self-assembled structure having a plurality of graft block copolymers where a first polymer block of each of the plurality of graft block copolymer collectively forms a matrix and a second polymer block of each of the plurality of graft block copolymer collectively forms one or more spheres within the matrix.

The term "matrix-gyroid structure" refers to a structure characterized as comprising a matrix having element A and gyroids having element B. In an embodiment, a matrix-gyroid structure refers to a self-assembled structure having a plurality of graft block copolymers where a first polymer block of each of the plurality of graft block copolymer collectively forms a matrix and a second polymer block of each of the plurality of graft block copolymer collectively forms one or more gyroids within the matrix.

The term "matrix-cylinder structure" refers to a structure characterized as comprising a matrix having element A and cylinders having element B. In an embodiment, a matrix-cylinders structure refers to a self-assembled structure having a plurality of graft block copolymers where a first polymer block of each of the plurality of graft block copolymer collectively forms a matrix and a second polymer block of each of the plurality of graft block copolymer collectively forms one or more cylinders within the matrix.

The term "total thickness in a transverse direction" may refer to a polymer structure having periodicity such that the direction of periodicity is a transverse direction.

DETAILED DESCRIPTION OF THE INVENTION

In general, the terms and phrases used herein have their art-recognized meaning, which can be found by reference to standard texts, journal references and contexts known to those skilled in the art. The following definitions are provided to clarify their specific use in the context of the invention.

Example 1: Control of Grafting Density and Distribution in Graft Polymers by Living Ring-Opening Metathesis Copolymerization We provide effective new methods that allow for facile control of the polymer sequences and architectures by ring-opening metathesis copolymerization of a pair of cyclic olefins. Mediated by a highly active ruthenium metathesis catalyst, the monomer pair may be strategically designed to have preselected properties such that the copolymerization yields a random or gradient sequence. The copolymerization sequence, dictated by the reactivity ratios of the monomer pair, may be easily and reliably determined by a non-linear curving-fitting method we developed (see the attached paper). In this example, we demonstrate that copolymerization reactions of a diluent (endo, exo-norbornenyl-dimethylester "DME", -diethylester "DE" E, or -di-n-butylester "DBE") with a norbornene-functionalized macromonomer (polystyrene "PS", polylactide "PLA", or polydimethylsiloxane "PDMS") may generate random ($r_1 \approx r_2 \approx 1$) or gradient ($r_1 < 1 < r_2$; $r_1 > 1 > r_2$) sequences. These results show that the ring-opening metathesis copolymerization methods of the present example can be exploited in the context of side chain density and distribution control, providing new opportunities for designing architecturally complex polymers spanning the linear-to-bottlebrush regimes.

Abstract: Control over polymer sequence and architecture is important to both understanding structure-property relationships and designing functional materials. Accordingly, we provide a new synthetic approach that enables facile manipulation of the density and distribution of grafts in polymers via living ring-opening metathesis polymerization (ROMP). In this example, discrete endo,exo-norbornenyl dialkylesters (dimethyl ("DME"), diethyl ("DEE"), di-n-butyl ("DBE")) are strategically designed to copolymerize with a norbornene-functionalized polystyrene ("PS"), polylactide ("PLA"), or polydimethylsiloxane ("PDMS") macromonomer mediated by a $3^{rd}$ generation Grubbs' catalyst ("G3"). The small-molecule diesters act as diluents that increase the average distance between grafted side chains, generating polymers with variable grafting density. The grafting density (number of side chains/number of norbornene monomers) is straightforwardly controlled by the macromonomer/diluent feed ratio. To gain insight into the copolymer sequence and architecture, self-propagation and cross-propagation rate constants are determined according to a terminal copolymerization model. These kinetic analyses show that copolymerizing a macromonomer/diluent pair with evenly matched self-propagation rate constants favors randomly distributed side chains. As the disparity between macromonomer and diluent homopolymerization rates increases, the reactivity ratios depart from unity, leading to an increase in gradient tendency. To demonstrate the effectiveness of our methods, an array of monodisperse polymers (PLA$^x$-ran-DME$^{1-x}$)$_n$ bearing various grafting densities (x=1.0, 0.75, 0.5, 0.25) and total backbone degrees of polymerization (n=167, 133, 100, 67, 33) are synthesized in this example. The approach disclosed in this example constitutes a powerful strategy for the synthesis of polymers spanning the linear-to-bottlebrush regimes with controlled and preselected grafting density and/or side chain distribution, molecular attributes that dictate micro- and macroscopic properties.

Introduction: Bottlebrush polymers are a subset of graft polymers that consist of a polymer backbone bearing densely grafted side chains.[1] The steric demands exerted by side chains encourage the backbone to adopt an extended wormlike conformation,[2] rendering distinct mechanical and physical features uncharacteristic of linear analogues.[3] Numerous studies have accordingly leveraged the unique attributes of bottlebrush polymers to address challenges in diverse applications including drug delivery,[4] surface coatings,[5] photolithography,[6] pressure sensors,[7] transport,[8] energy storage,[9] and photonics.[10] These achievements are facilitated by a host of grafting-to, grafting-from, and grafting-through polymerization methodologies, enabling control over structural parameters such as the backbone degree of polymerization, side chain degree of polymerization, molar mass dispersity, and chemical functionality.

Despite prior advances, systematic variation of grafting density exhaustively spanning the linear-to-bottlebrush regimes remained synthetically challenging.[11] Grafting density is of fundamental importance in shaping the mechanical[12]/physical[13] properties, self-assembly,[14] and stimuli-responsiveness[15] exhibited by graft polymers. We provide an effective and efficient synthetic protocol to modify grafting density which increases understanding of the structure-property-function relationships[16] in graft polymers. Matyjaszewski previously reported the copolymerization of an acryloyl-functionalized macromonomer with n-butyl acrylate using atom transfer radical polymerization (ATRP).[17] Matyjaszewski elegantly illustrated the role of n-butyl acrylate as a diluent that served to increase the average distance between grafting points. However, harsh conditions and prolonged reaction times were required in Matyjaszewski, and low backbone degrees of polymerization could be achieved at high grafting density due to the steric profile of the macromonomers. Another method described by Kamigaito employed radical copolymerization of limonene and maleimide derivatives, generating an ABB alternating propagation sequence.[18] The limonene or maleimide derivative was selectively functionalized to subsequently enable a "grafting-from" installation of poly(methyl methacrylate) side chains. However, Kamigaito yields polymers with precisely 33% or 67% grafting densities and with high molar mass dispersity (Đ=1.7).

We show that a living ring-opening metathesis polymerization (ROMP)[19] of the present invention is an approach that may circumvent the aforementioned challenges. Our method harnesses the many advantages of living ROMP including 1) mild reaction conditions, 2) low molar mass dispersity, 3) uniform side chain lengths, 4) living character with tunable backbone degrees of polymerization, and 5) functional group tolerance. We herein provide the first demonstration that ROMP can be exploited for preselected grafting density control. In this example, monodisperse polymers with grafting densities spanning the linear, comb, and bottlebrush regimes are easily accessible by copolymerization reactions of a norbornene-functionalized macromonomer with a discrete small-molecule diluent in different feed ratios (FIG. 2). In-depth kinetic analyses reveal that the distribution (random or gradient) of grafts is adjusted by simple modifications to the diluent ester substituents. The methods of the present invention therefore constitute an effective strategy in controlling polymer architecture,[20] providing new opportunities for polymer design and applications.

Figure 3:
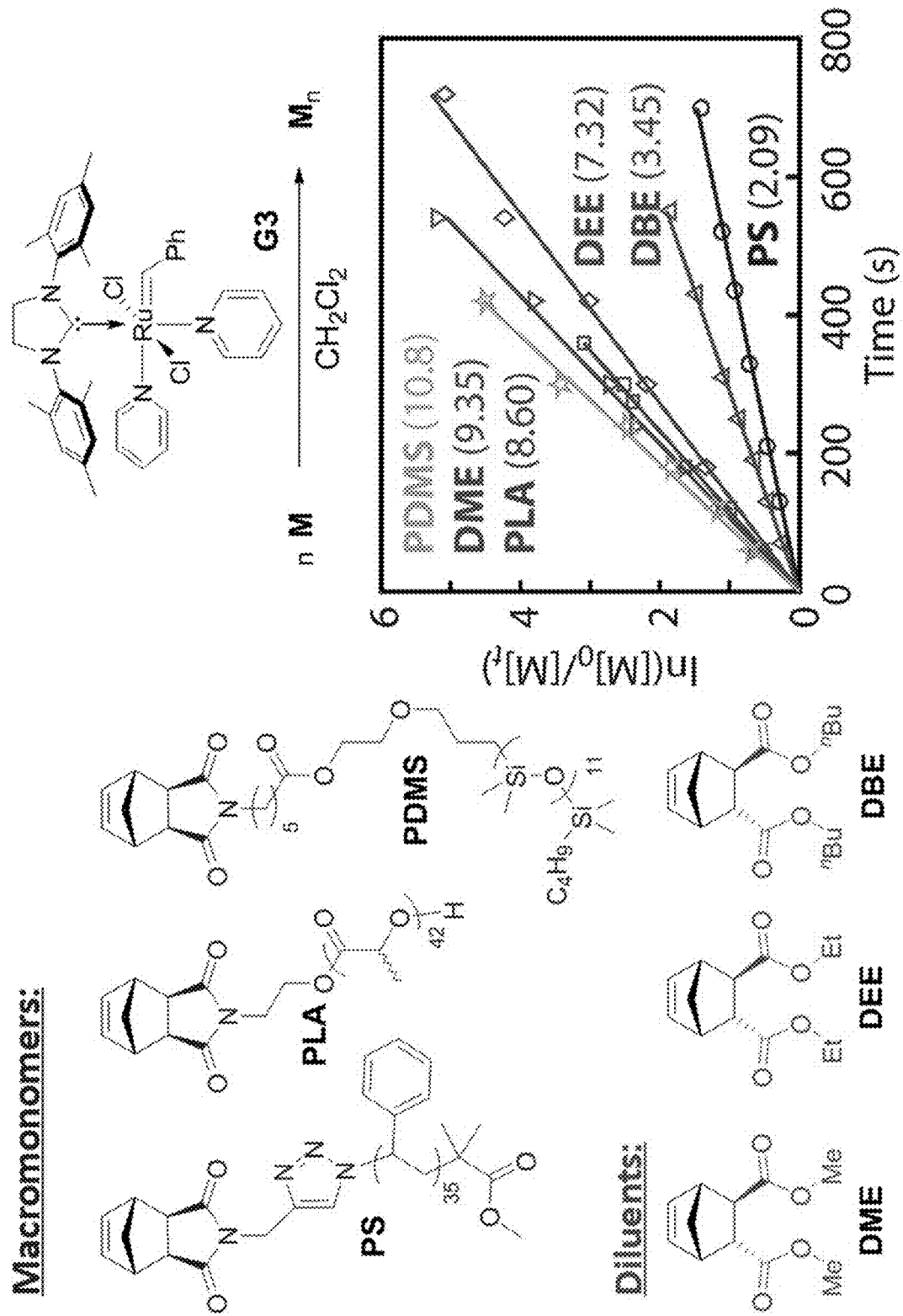
FIG. 3. Left: Structures of macromonomers (PS, PLA, PDMS) and diluents (DME, DEE, DBE). Right: Plots of $\ln([M]_0/[M]_t)$ versus time, showing first-order kinetics for the homopolymerization of norbornene monomers (0.05 M) catalyzed by G3 (0.5 mM) in $CH_2Cl_2$ at 298 K (orange stars: PDMS, inverted red triangles: DME, green squares: PLA, brown diamonds: DEE, purple triangles: DBE, blue circles=PS). The numbers in parentheses represent the values of $k_{obs}$ ($10^{-3}$ $s^{-1}$) under the reaction conditions.

Monomer design. In pursuit of this approach, we determine the homopolymerization kinetics of macromonomers and diluents bearing polymerizable end groups. Cyclic olefinic monomers may favor alternating sequences,[21] but since strict alternation may limit grafting density to 50% and preclude control over graft distribution, cyclic olefinic monomers are not used in this example. Instead, norbornene-functionalized derivatives, which rarely result in alternating polynorbornene,[22] are selected for the present example. Relief of the high ring strain in norbornene, mediated by highly active ruthenium metathesis catalysts, enables grafting-through ROMP to produce well-defined bottlebrush polymers.[23] We also note that random copolymerization of norbornenes has been previously inferred,[23b,24] suggesting potential opportunities for advanced sequence control. However, quantitative sequence determination has been lacking in prior work. With this context in mind, ω-norbornenyl polystyrene ("PS", $M_n$=3990 g/mol), polylactide ("PLA", $M_n$=3230 g/mol), and polydimethylsiloxane ("PDMS", $M_n$=1280 g/mol) macromonomers featuring an exo,exo-imide anchor group are prepared (FIG. 3). PS and PLA macromonomers of similar molar masses have been previously employed in the synthesis of well-defined bottlebrush polymers and are therefore attractive candidates for this example.[9-10] For the diluents, we employ a family of racemic endo,exo-norbornenyl diesters (dimethyl ("DME"), diethyl ("DEE"), di-n-butyl ("DBE"), each with molar mass <300 g/mol) which may be easily assembled by Diels-Alder reactions of cyclopentadiene with the corresponding fumarate. We demonstrate different propagation rates for these norbornenyl diesters,[25] amenable to tuning the relative reactivity of diverse diluent/macro monomer pairs.

Homopolymerization kinetics. ROMP of each monomer in CH$_2$Cl$_2$ (0.05 M) is mediated by the highly active 3$^{rd}$ generation olefin metathesis catalyst,[26] (H$_2$IMes)(pyr)$_2$(Cl)$_2$Ru=CHPh ("G3", 0.5 mM). At different time points, aliquots are extracted from the reaction mixture and immediately quenched in a separate vial containing a large excess of ethyl vinyl ether. Subsequently, the quenched reactions are analyzed by size-exclusion chromatography (SEC) and $^1$H NMR spectroscopy, allowing evaluation of the conversion, molar mass, and molar mass dispersity. As shown in FIG. 3, the depletion of monomers is first-order. Since the rate of initiation for G3 is much faster than that of propagation under these conditions,[26-27] the observed first-order rate constant ($k_{obs}$) can be used to calculate the second-order self-propagation rate constant ($k_{homo}$) according to Eq. 1 (M=monomer):

$$-\frac{d[M]_t}{dt} = k_{obs}[M]_t = k_{homo}[G3]_0[M]_t \qquad (1)$$

The $k_{homo}$, which is independent of the catalyst concentration, is of direct relevance to our copolymerization kinetic analyses (vide infra). The homopolymerization kinetic results are summarized in Table 1. Comparing the three macromonomers, PDMS possesses the largest $k_{homo}$ of 21.6 M$^{-1}$ s$^{-1}$. The $k_{homo}$ of PLA (17.2 M$^{-1}$ s$^{-1}$) is around four times as large as that measured for PS (4.18 M$^{-1}$ s$^{-1}$), in line with previous observations.[23b] The $k_{homo}$ values of the norbornenyl diesters trends inversely with the bulkiness of the ester substituents. Indeed, the $k_{now}$ measured for DME (18.7 M$^{-1}$ s$^{-1}$) is larger than that of DEE (14.6 M$^{-1}$ s$^{-1}$) or DBE (6.90 M$^{-1}$ s$^{-1}$). Collectively, these results show that the norbornene monomer sterics play an important role in the rate of ROMP.

TABLE 1

Homopolymerization reactions CH$_2$Cl$_2$ at 298K

| Monomer | $k_{homo}$ (M$^{-1}$ s$^{-1}$) | Expected $M_n^a$ (kg/mol) | Measured $M_n^b$ (kg/mol) | Đ$^b$ | Conv. (%) |
|---|---|---|---|---|---|
| PS | 4.18 | 399 | 375 | 1.06 | 94$^c$ |
| PLA | 17.2 | 323 | 319 | 1.01 | 99$^c$ |
| PDMS | 21.6 | 128 | 131 | 1.02 | 99$^c$ |
| DME | 18.7 | 21.0 | 21.7 | 1.02 | 100$^d$ |
| DEE | 14.6 | 23.8 | 24.2 | 1.02 | 100$^d$ |
| DBE | 6.90 | 29.4 | 29.6 | 1.02 | 100$^d$ |

$^a$Based on the monomer/G3 ratio of 100/1
$^b$Determined by SEC light scattering detector.
$^c$Determined by SEC differential refractive index detector.
$^d$Determined by $^1$H NMR.

Figure 4:
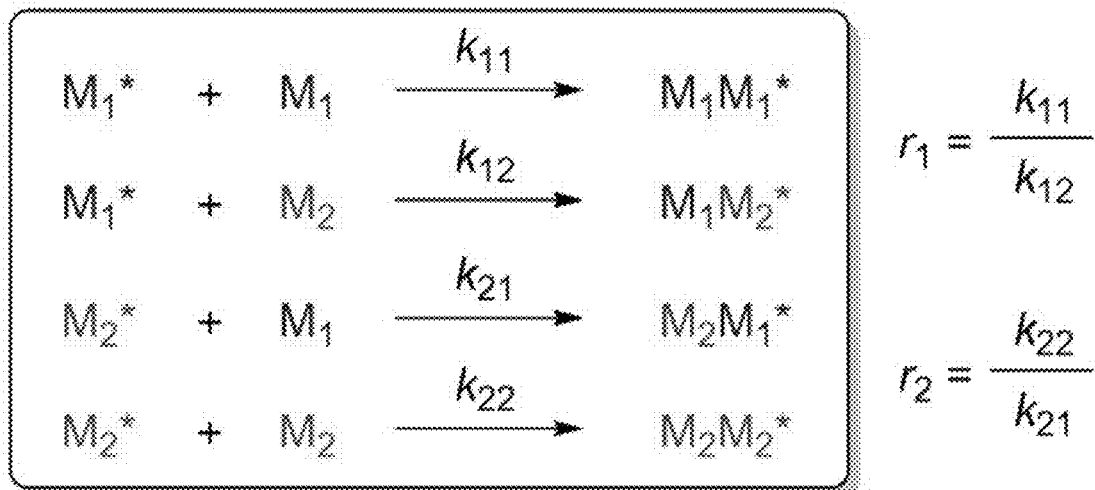
FIG. 4. Terminal model describing the copolymerization of $M_1$ and $M_2$, including exemplary conditions for exemplary graft distributions of graft copolymers.

Analytical methods for copolymerization kinetics. The homopolymerization kinetic analyses indicate that ROMP of each individual macromonomer or diluent is well-behaved. However, controlling side chain density and distribution also requires knowledge of the macromonomer/diluent copolymerization kinetics. To this end, we determine copolymerization reactions based on the Mayo-Lewis terminal model[28] (FIG. 4) in which the reactivity of two distinct propagating species (hereafter denoted as M$_1$* and M$_2$*) strictly depends on the monomer at the growing chain end. In other words, the chemical reactivity of the Ru catalyst is assumed to be primarily influenced by the electronic/steric properties of the latest formed alkylidene. The copolymerization of M$_1$ (macromonomer) and M$_2$ (diluent) can be described by four unique propagation reactions with individual rate constants k$_{11}$, k$_{12}$, k$_{21}$, and k$_{22}$. The reactivity ratios (r$_1$=k$_{11}$/k$_{12}$, r$_2$=k$_{22}$/k$_{21}$) are defined as the tendency for the propagating species to react with the same monomer over the other. As depicted in FIG. 4, the copolymerization is directed by the reactivity ratios, leading to sequences such as alternating, blocky, random, or gradient.

Historically, a number of methodologies have been established to determine the reactivity ratios for copolymerizations. Popular techniques include those pioneered by Mayo-Lewis,[28] Fineman-Ross,[29] and Kelen-Tüdös,[30] among others.[31] While these linear regression methods bear irrefutable merit, they are derived from equations based on the steady-state approximation, with the assumption that the rates of crossover are identical; i.e., k$_{12}$[M$_1$*]$_t$[M$_2$]$_t$=k$_{21}$[M$_2$*]$_t$[M$_1$]$_t$. As such, these prior methods are applicable under steady-state conditions in which the change in monomer feed is insignificant.[32] Obtaining kinetic data in a low-conversion regime is analytically more challenging for fast polymerization reactions such as G3-mediated ROMP.

Given the aforementioned constraint, we develop another approach that bypasses the steady-state approximation. According to the terminal model, the time-dependent concentrations of M$_1$, M$_2$, M$_1$*, and M$_2$* can be described by the following ordinary differential equations:

$$-\frac{d[M_1]_t}{dt} = k_{11}[M_1^*]_t[M_1]_t + k_{21}[M_2^*]_t[M_1]_t \quad (2)$$

$$-\frac{d[M_2]_t}{dt} = k_{12}[M_1^*]_t[M_2]_t + k_{22}[M_2^*]_t[M_2]_t \quad (3)$$

$$-\frac{d[M_1^*]_t}{dt} = k_{12}[M_1^*]_t[M_2]_t - k_{21}[M_2^*]_t[M_1]_t \quad (4)$$

$$-\frac{d[M_2^*]_t}{dt} = k_{21}[M_2^*]_t[M_1]_t - k_{12}[M_1^*]_t[M_2]_t \quad (5)$$

While the exact analytical solutions for Eqs. 2-5 cannot be obtained, numerical solutions for [M$_1$]$_t$, [M$_2$]$_t$, [M$_1$]$_t$, and [M$_2$]$_t$ can be generated if the propagation rate constants are provided. In this example, the homopolymerization rate constants k$_{11}$ and k$_{22}$ are independently measured (see Table 1). Further, the instantaneous monomer concentrations [M$_1$]$_t$ and [M$_2$]$_t$ during the copolymerization can be determined by the ethyl vinyl ether quenching method. In living ROMP, the sum of [M$_1$*]$_t$ and [M$_2$*]$_t$ should be [G3]$_0$. Taken collectively, the best numerical solutions for k$_{12}$ and k$_{21}$ for Eqs. 2-5 can be determined using a non-linear least-square curve fitting method (exemplary MATLAB codes provided below).

Figure 5:
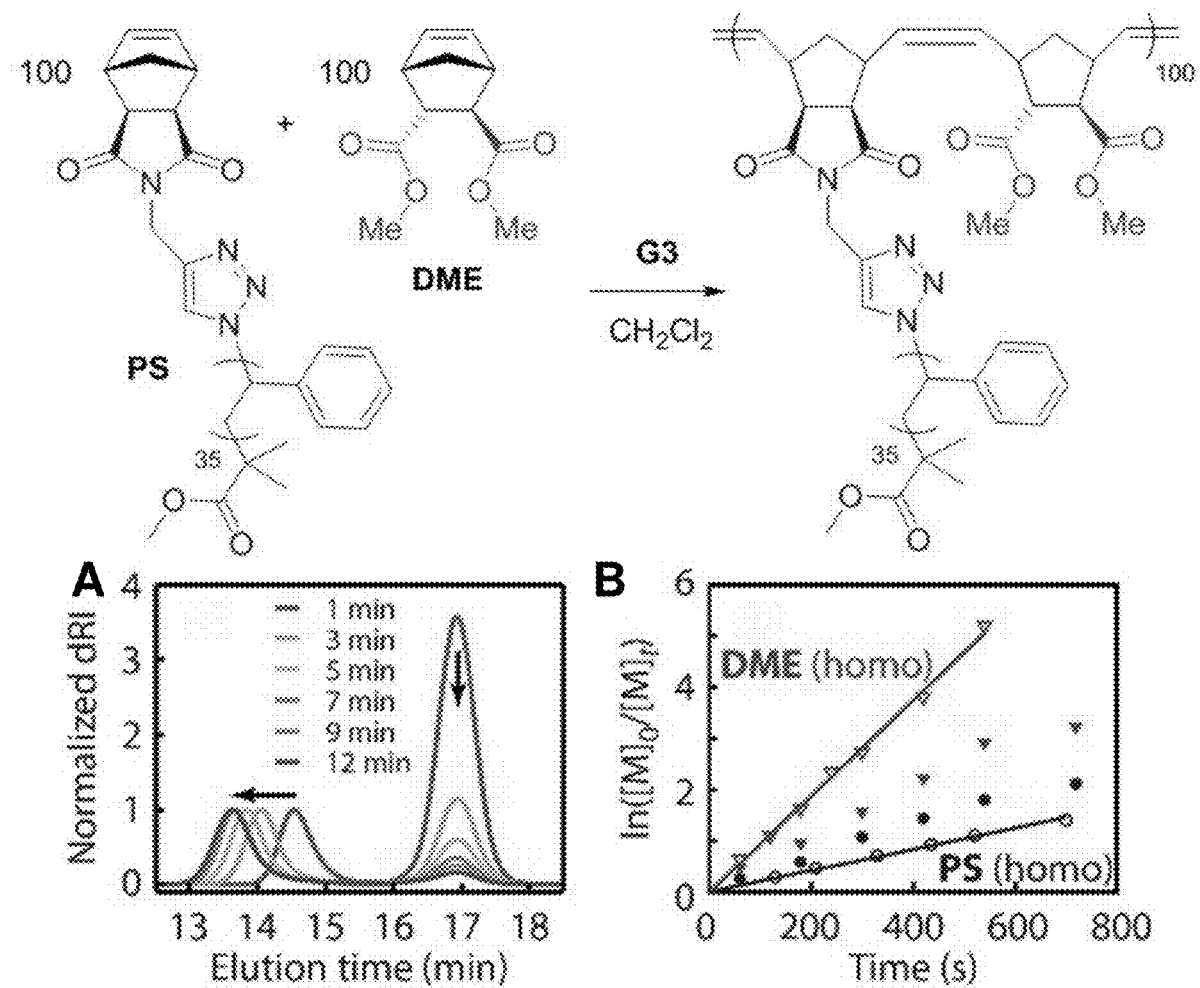
FIG. 5. (Top) Illustration of a process of copolymerization of PS (0.05 M) and DME (0.05 M) catalyzed by G3 (0.5 mM) in $CH_2Cl_2$ at 298 K.

Copolymerization kinetics. We first determine the copolymerization of PS (0.05 M) and DME (0.05 M) mediated by G3 (0.5 mM) in CH$_2$Cl$_2$ (FIG. 5 top panel). The conditions, including the monomer and catalyst concentrations, are identical to those employed in homopolymerization reactions. Aliquots are extracted at different time points, quenched, and subjected to SEC and NMR analyses. The SEC traces indicated the continuing depletion of PS as well as the concomitant growth of the copolymer (FIG. 5, panel A). In addition, the instantaneous concentrations of both monomers can be determined by $^1$H NMR integration of their distinct norbornenyl olefinic resonances. Plotting ln([M]$_0$/[M]$_t$) as a function of time (FIG. 5, panel B) suggests that the decay of PS and DME approaches pseudo first order. However, we note that the first order kinetics are only strictly applicable in the event that both [M$_1$*]$_t$ and [M$_2$*]$_t$ are constant (see Eqs. 2 and 3). With the same G3 concentration of 0.5 mM, the propagation rates for PS and DME in the copolymerization reaction are, respectively, faster and slower than those measured independently in the homopolymerization reactions (FIG. 5, panel B). The increase in the rates of PS consumption in the copolymerization reaction can be attributed to cross-propagation being faster than self-propagation. Interestingly, an opposite trend is observed for DME.

To gain more insight, the kinetic profile of the copolymerization of PS and DME (1:1) is fitted to the terminal model using our analytical methods with known values of k$_{PS-PS}$, k$_{DME-DME}$, [PS]$_0$, [DME]$_0$, and [G3]$_0$ (FIG. 6A). The calculated curves of monomer conversion versus total conversion agree satisfactorily with the experimental data (FIG. 6B). This analysis determines k$_{PS-DME}$ and k$_{DME-PS}$ values of 7.74 and 13.2 M$^{-1}$ s$^{-1}$, respectively (Table 2, entry 1). The reactivity ratios (r$_{PS}$=0.54, r$_{DME}$=1.41) indicate gradient copolymerization and can be used in the simulation of instantaneous copolymer composition (vide infra). Copolymerizing PS and DME in a 1:1 feed ratio can therefore be expected to yield a polymer bearing 50% grafting density and a gradient distribution of PS side chains. In order to further examine the validity of our methods, the copolymerization of PS and DME in a 1:2 feed ratio is carried out and subjected to the same analyses (FIGS. 6C-6D), yielding comparable $k_{PS\text{-}DME}$ and $k_{DME\text{-}PS}$ values (Table 2, entry 2). As such, these experiments underline the ability of the terminal model to capture the copolymerization kinetics of G3-catalyzed ROMP.

either gradient or random copolymers. Kinetic analyses reveal similar $k_{12}$ values (PS=5.23-7.74 $M^{-1}$ $s^{-1}$, PLA=16.7-18.8 $M^{-1}$ $s^{-1}$, PDMS=19.5-19.9 $M^{-1}$ $s^{-1}$) and disparate $k_{21}$ values (PS=5.66-14.6 $M^{-1}$ $s^{-1}$, PLA=7.95-16.9 $M^{-1}$

TABLE 2

Copolymerization rate constants and reactivity ratios in $CH_2Cl_2$ at 298K

| Entry | $M_1$ | $M_2$ | $[M_1]_0$ (M) | $[M_2]_0$ (M) | $k_{11}$ ($M^{-1}s^{-1}$) | $k_{12}{}^a$ ($M^{-1}s^{-1}$) | $k_{22}$ ($M^{-1}s^{-1}$) | $k_{21}{}^a$ ($M^{-1}s^{-1}$) | $r_1$ | $r_2$ | $r_1 r_2$ |
|---|---|---|---|---|---|---|---|---|---|---|---|
| 1 | PS | DME | 0.050 | 0.050 | 4.18 | 7.74 | 18.7 | 13.2 | 0.54 | 1.41 | 0.76 |
| 2 | PS | DME | 0.050 | 0.100 | 4.18 | 7.58 | 18.7 | 14.6 | 0.55 | 1.28 | 0.71 |
| 3 | PS | DEE | 0.050 | 0.050 | 4.18 | 7.73 | 14.6 | 8.75 | 0.54 | 1.67 | 0.90 |
| 4 | PS | DBE | 0.050 | 0.050 | 4.18 | 5.23 | 6.90 | 5.66 | 0.80 | 1.22 | 0.97 |
| 5 | PS | DBE | 0.075 | 0.025 | 4.18 | 5.24 | 6.90 | 5.93 | 0.80 | 1.16 | 0.93 |
| 6 | PLA | DME | 0.050 | 0.050 | 17.2 | 18.8 | 18.7 | 16.9 | 0.92 | 1.11 | 1.02 |
| 7 | PLA | DBE | 0.050 | 0.050 | 17.2 | 16.7 | 6.90 | 7.95 | 1.03 | 0.87 | 0.90 |
| 8 | PDMS | DME | 0.050 | 0.050 | 21.6 | 19.9 | 18.7 | 19.9 | 1.09 | 0.94 | 1.02 |
| 9 | PDMS | DBE | 0.050 | 0.055 | 21.6 | 19.5 | 6.90 | 15.9 | 1.11 | 0.43 | 0.48 |

$^a$Obtained from least-square curve fitting

Figure 8C:
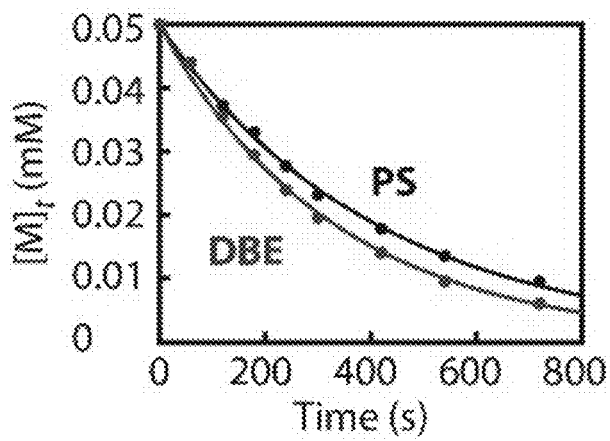
Figure 8D:
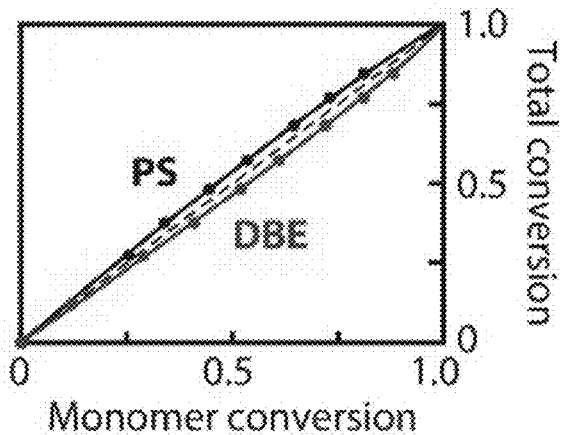

We next determine the 1:1 copolymerization of PS and DEE (FIGS. 8A-8B). The measured $k_{PS\text{-}DEE}$ (7.73 $M^{-1}$ $s^{-1}$, Table 2, entry 3) is very close to $k_{PS\text{-}DME}$ (7.58-7.74 $M^{-1}$ $s^{-1}$), thus indicating similar chemical reactivity of the propagating species PS* (see FIG. 7) toward DME and DEE. In sharp contrast, $k_{DEE\text{-}PS}$ (8.75 $M^{-1}$ $s^{-1}$) is notably smaller than $k_{DME\text{-}PS}$ (13.2-14.6 $M^{-1}$ $s^{-1}$). This observation suggests that the PS* alkylidene steric/electronic effects are important in governing the rate of ROMP (perhaps more so than that of the approaching norbornenyl diester). The calculated reactivity ratios $r_{PS}$ (0.54) and $r_{DEE}$ (1.67) indicate gradient copolymerization. In addition, the $r_{PS} \times r_{DEE}$ product of 0.90 suggests an almost ideal copolymerization process in which each propagating species, PS* and DEE*, has the same preference for PS over DEE; i.e., $k_{PS\text{-}PS}/k_{PS\text{-}DME} \approx k_{DME\text{-}PS}/k_{DME\text{-}DME}$. The copolymerizations of PS and DBE in a 1:1 (FIGS. 8C-8D) and 3:1 (see FIGS. 19A and 19B) stoichiometry have also been examined. The propagation rate constants obtained from these experiments parallel each other (Table 2, entries 4, 5), again reflecting the competence of our analytical methods. The PS/DBE copolymerization is best described as near-ideal, approaching random, as evidenced by the reactivity ratios ($r_{PS}$=0.8, $r_{DBE}$=1.16-1.22) as well as their product ($r_{PS} \times r_{DBE}$=0.93-0.97).

Figure 8E:
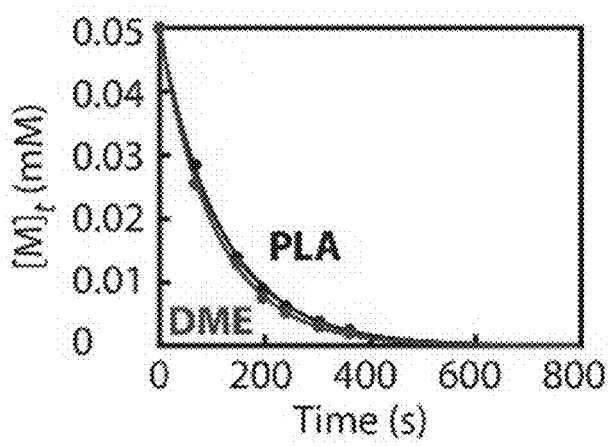
Figure 8F:
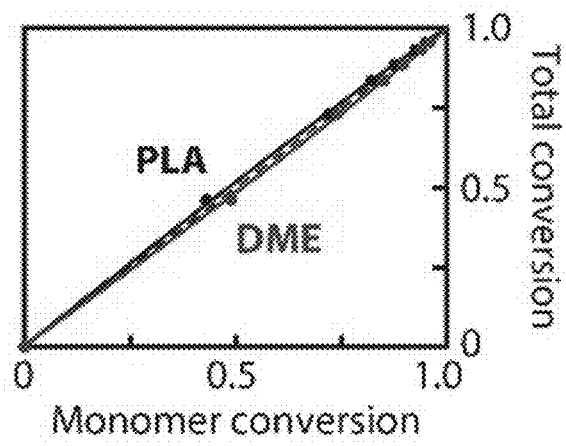
Figure 8G:
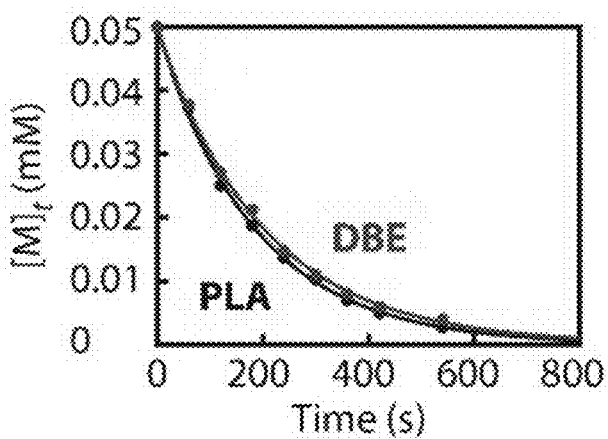
Figure 8H:
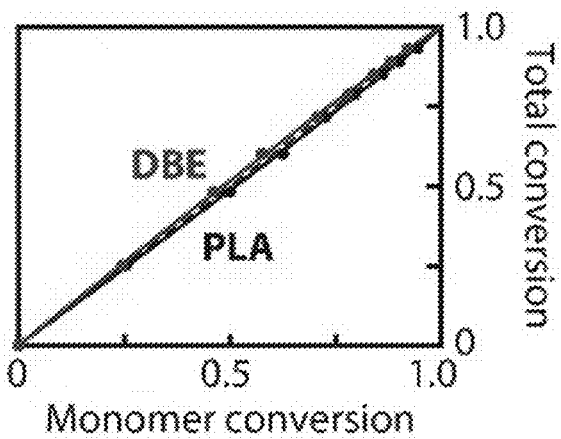
Figure 8I:
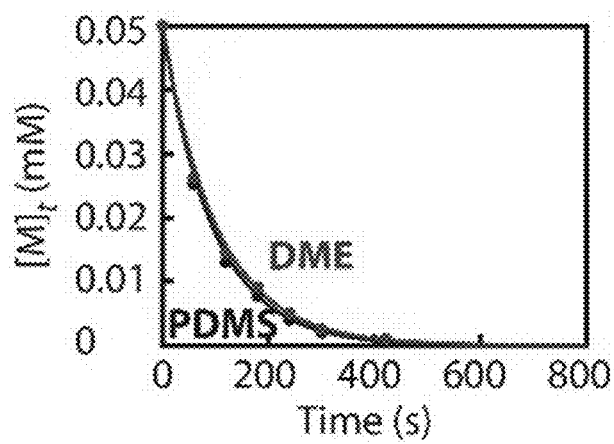
Figure 8J:
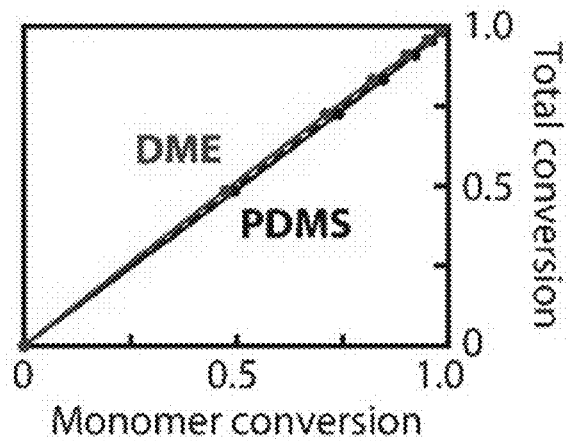
Figure 8K:
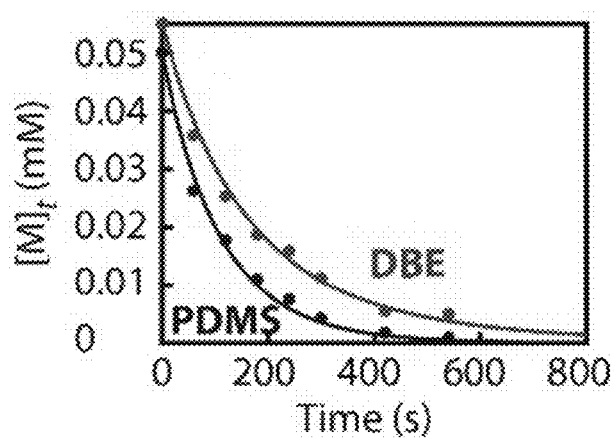
Figure 8L:
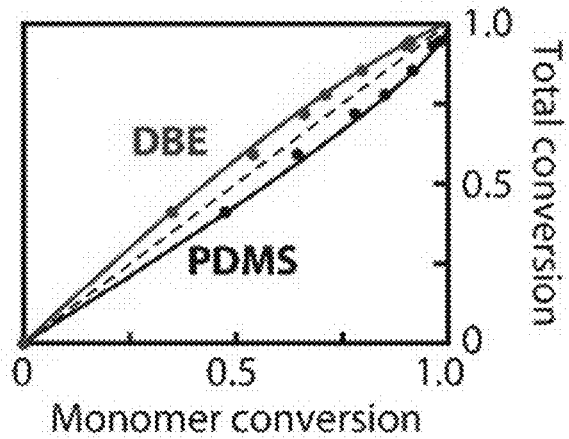

For studies and applications in which uniform grafting density is desired, the ability to access random copolymers is useful. The copolymerization reactions of PS with diluents imply that random copolymerization ($r_1 \approx r_2 \approx 1$) may be achieved when both self-propagation rate constants are similar ($k_{11} \approx k_{22}$). To examine this, we turn our attention to the copolymerization of PLA ($k_{homo}$=17.2 $M^{-1}$ $s^{-1}$) and DME ($k_{homo}$=18.7 $M^{-1}$ $s^{-1}$). These experiments indicate that the decay of PLA is marginally slower than that of DME, in line with an almost random copolymerization process (FIGS. 8E-8F; Table 2, entry 6). Similarly, random copolymerization is observed for PLA/DBE (FIGS. 4G-4H; Table 2, entry 7) as well as PDMS/DME (FIGS. 4I-4J; Table 2, entry 8). Lastly, gradient copolymers (Table 2, entry 9, $r_{PDMS}$=1.11, $r_{DBE}$=0.43) are obtained by copolymerization reaction of PDMS with DBE (FIGS. 4K-4L). The reactivity ratio product ($r_{PDMS} \times r_{DBE}$=0.48) indicates a departure from ideal copolymerization. This observation appears to be correlated with the large differences in the self-propagation rate constants. Taken collectively, the copolymerization of a norbornene-functionalized macromonomer (PS, PLA, or PDMS) with a diluent (DME, DEE, or DBE) may generate PDMS=15.9-19.9 $M^{-1}$ $s^{-1}$). This observation may attributed to the different steric, electronic, and ligating environments exerted by the pendent polymer group, linker, and anchor group (exo,exo-imide for macromonomer versus endo,exo-diester for diluent). The importance of the anchor group has been recently discussed by Matson in the context of self-propagation rates.[33]

Figure 9A:
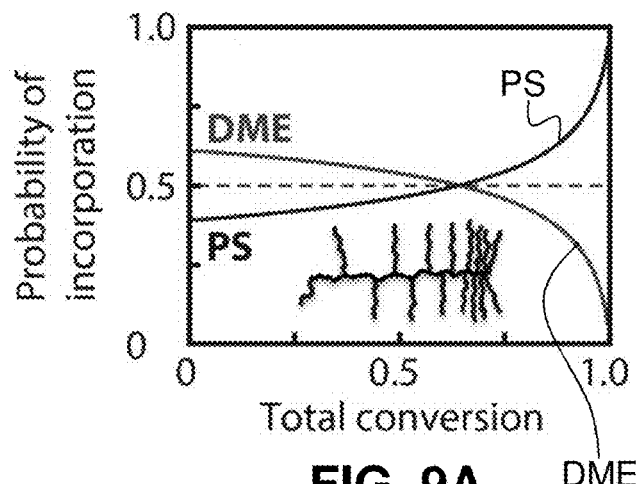
FIGS. 9A-9D. Simulated copolymer compositions for (FIG. 9A) PS:DME=1:1.
Figure 9B:
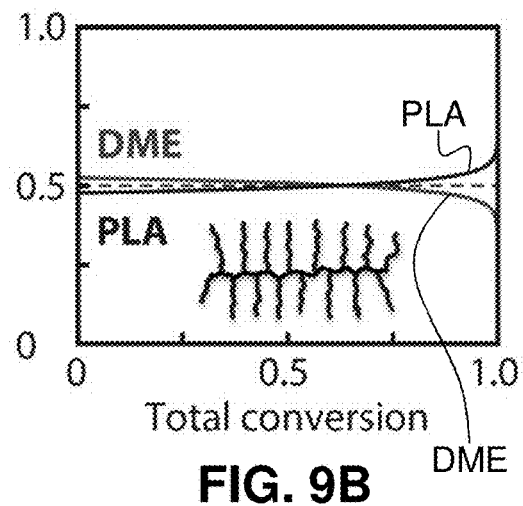
Figure 9C:
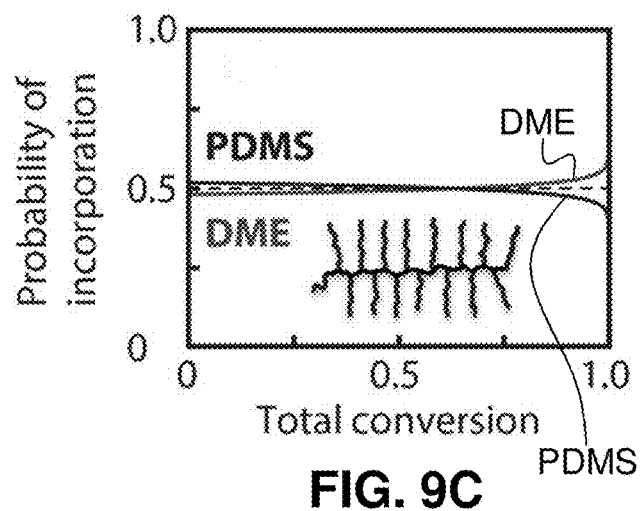
Figure 9D:
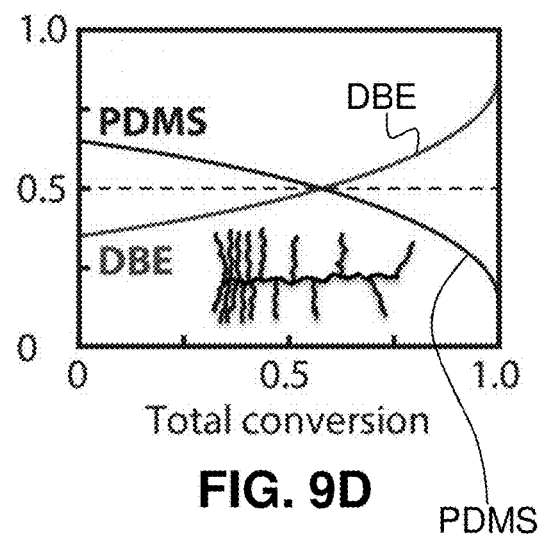

Instantaneous copolymer composition. From the copolymerization kinetics, the rate of monomer incorporation at any given time may be calculated according to Eqs. 2 and 3, allowing prediction of instantaneous copolymer composition as a function of total conversion. For example, copolymerizing PS and DME in a 1:1 feed ratio results in $(PS\text{-grad-}DME)_n$ best described as a gradient graft polymer (FIG. 9A). Such a copolymer at 100% conversion possesses, on average, 50% grafting density; i.e., one polystyrene brush per two norbornene backbone repeat units. The difference in reactivity ratios leads to richer DME composition at early conversion and higher PS incorporation toward the end. We note that some gradient graft polymers have been previously accessed by grafting-from ATRP methods.[34] The brush distribution gradient is much less pronounced in copolymers $(PLA\text{-ran-}DME)_n$ (FIG. 9B) and $(PDMS\text{-ran-}DME)_n$ (FIG. 9C), in which the side chains are uniformly grafted across the entire polynorbornene backbone. Lastly, copolymerizing PDMS/DBE in a 1:1 ratio generates the gradient copolymer $(PDMS\text{-grad-}DBE)_n$ (FIG. 9D). Unlike $(PS\text{-grad-}DME)_n$, our simulations indicate that $(PDMS\text{-grad-}DBE)_n$ is more densely grafted at early conversion. Coupled with sequential polymerization, copolymerizing PS/DME and PDMS/DBE may be exploited in the synthesis of normal tapered or inverse tapered block copolymers.[35]

Synthesis of various grafting density polymers. To showcase the synthetic versatility of our methods, we preselect an array of polymers $(PLA^x\text{-ran-}DME^{1-x})_n$ with various grafting densities (x=1.0, 0.75, 0.5, 0.25) and backbone lengths (n=167, 133, 100, 67, 33). These polymers may be easily prepared by mixing PLA, DME, and G3 in different ratios according to Eqs. 6 and 7 ($M_1$=macromonomer, $M_2$=diluent):

$$x=[M_1]_0/([M_1]_0+[M_2]_0) \qquad (6)$$

$$n=([M_1]_0+[M_2]_0)/[G3]_0 \qquad (7)$$

Figure 10:
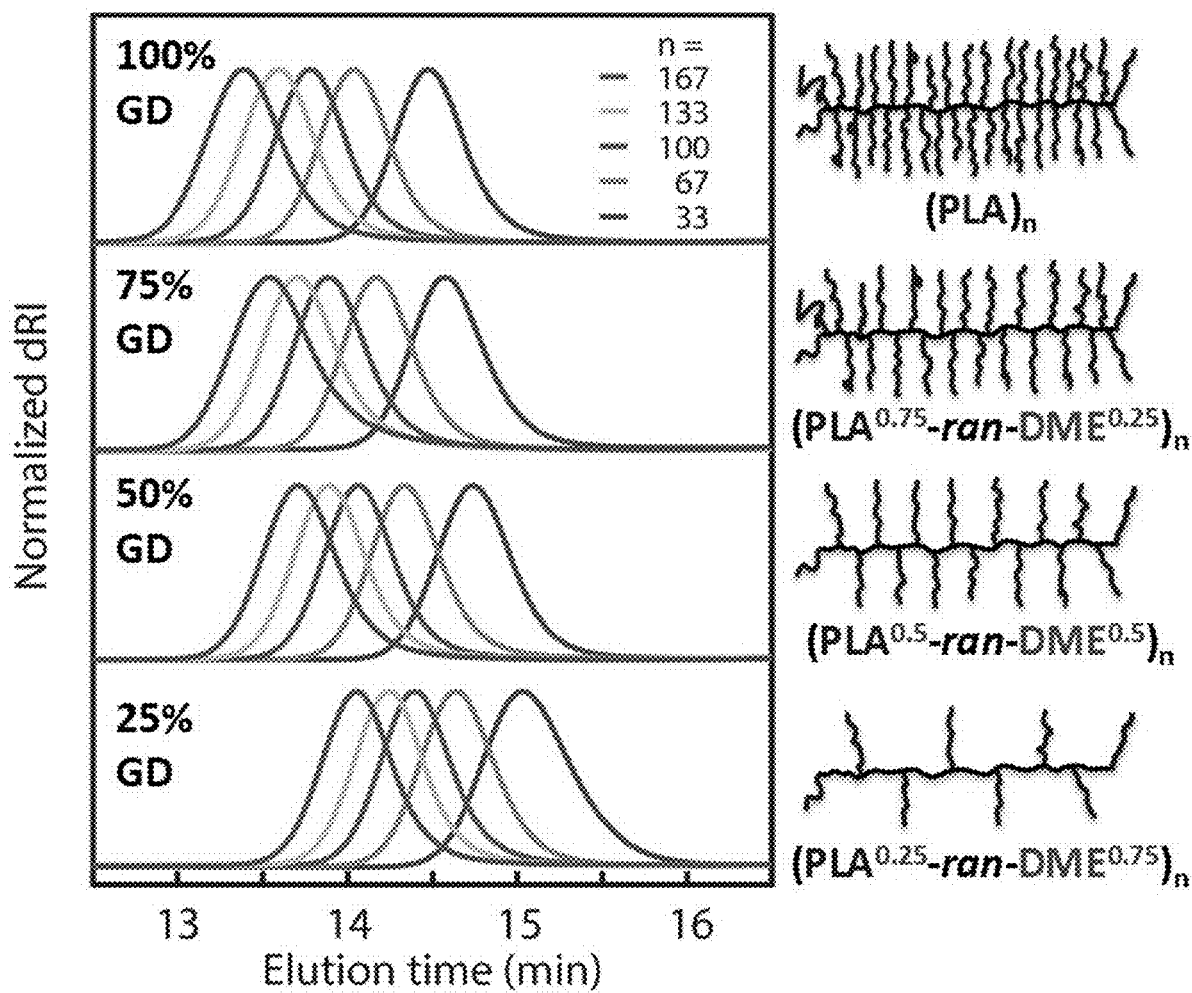
FIG. 10. SEC traces of $(PLA^x\text{-ran-DME}^{1-x})_n$ where x=grafting density (1.0, 0.75, 0.5, 0.25), n=targeted total backbone degree of polymerization (red: 167, orange: 133, green: 100, teal: 67, purple: 33), and "ran" indicates a random distribution of PLA polymer side chains, or branches. The data curves from left-to-right correspond to n of 167, 133, 100, 67, and 33, respectively. Schematics on the right show the schematic illustrations of corresponding copolymers.
Figure 11:
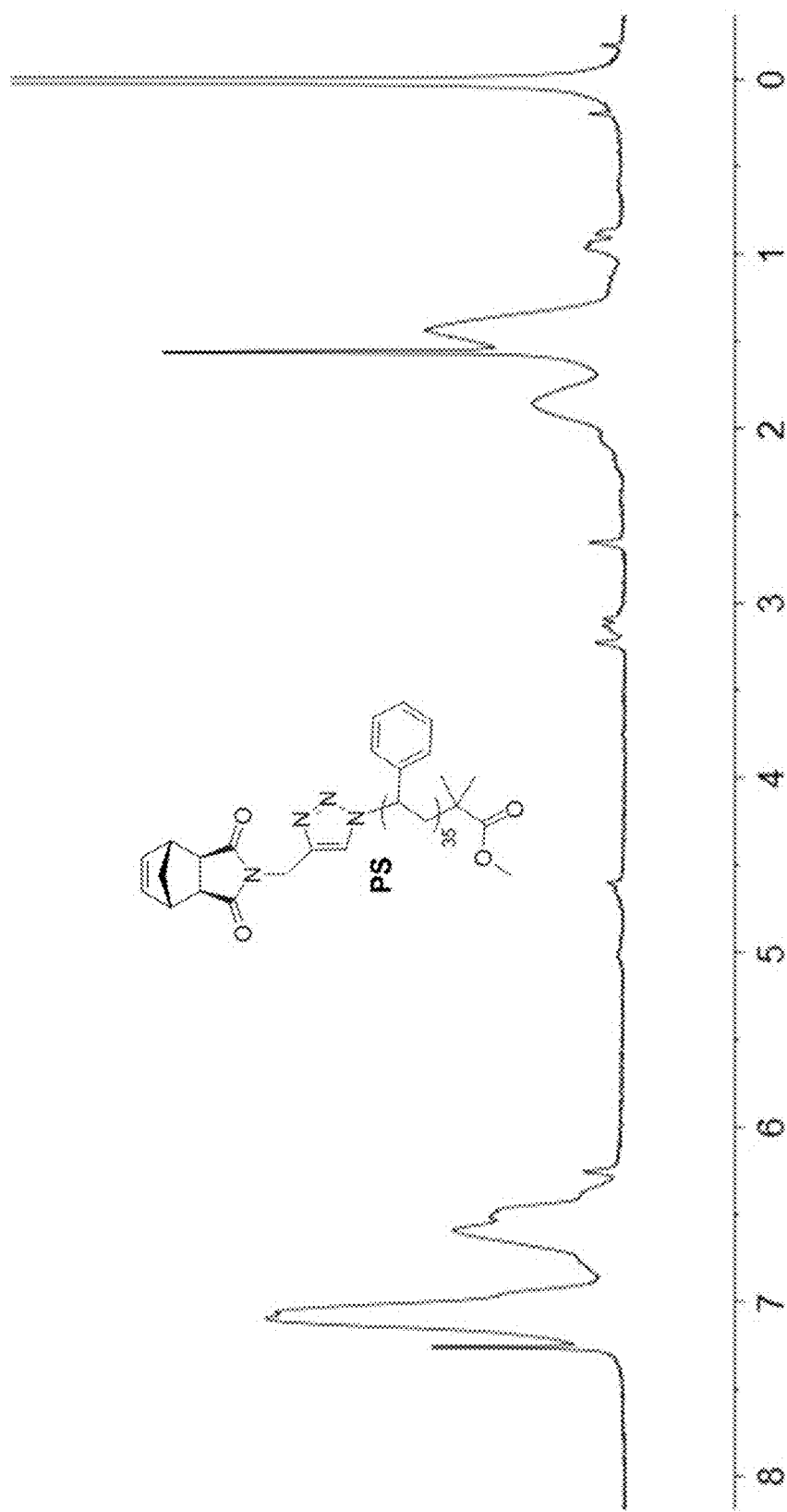
FIG. 11. $^1H$ NMR spectrum of PS in $CDCl_3$.
Figure 12:
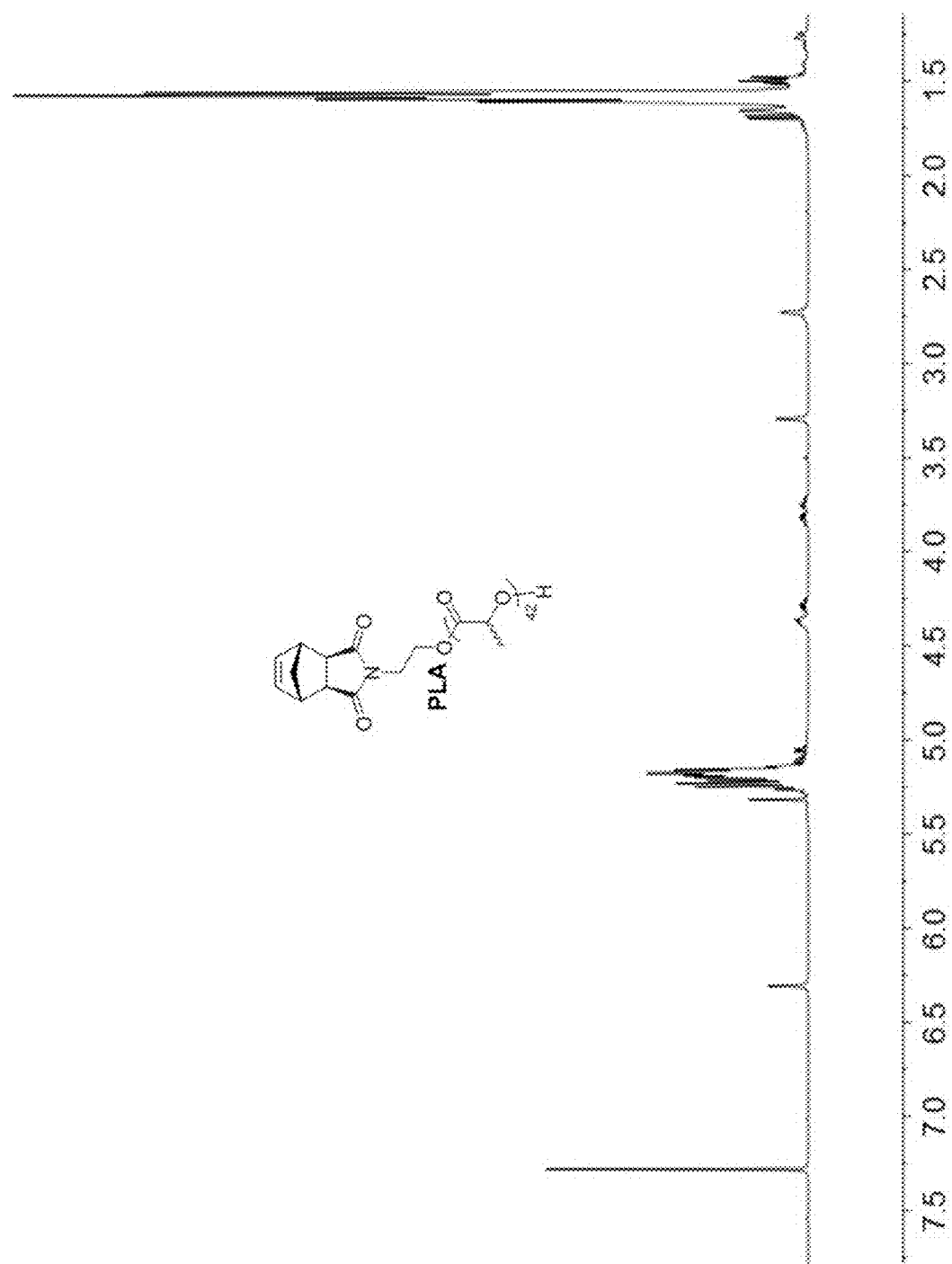
FIG. 12. $^1H$ NMR spectrum of PLA in $CDCl_3$.
Figure 13:
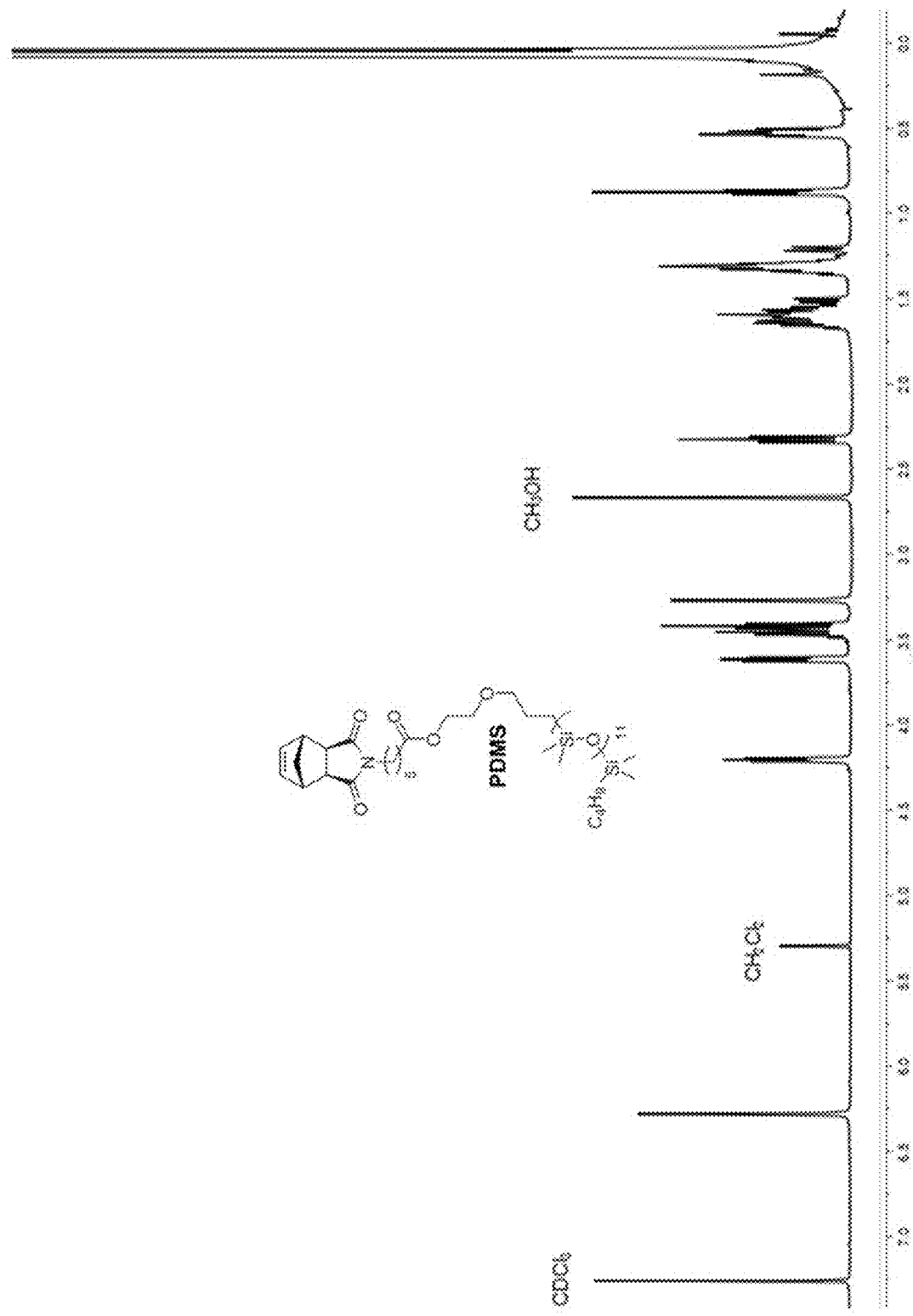
FIG. 13. $^1H$ NMR spectrum of PDMS in $CDCl_3$.
Figure 14:
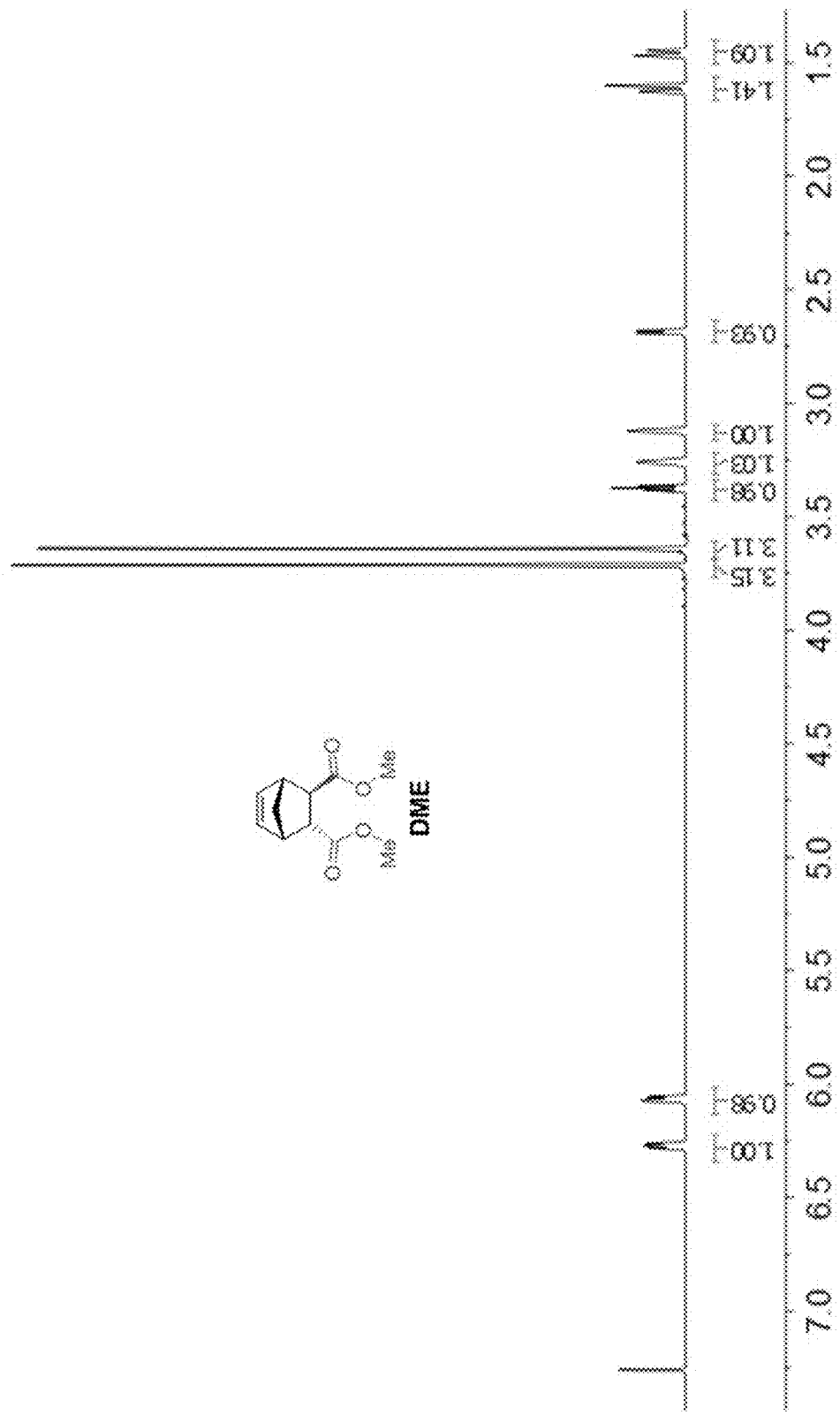
FIG. 14. $^1H$ NMR spectrum of DME in $CDCl_3$.
Figure 15:
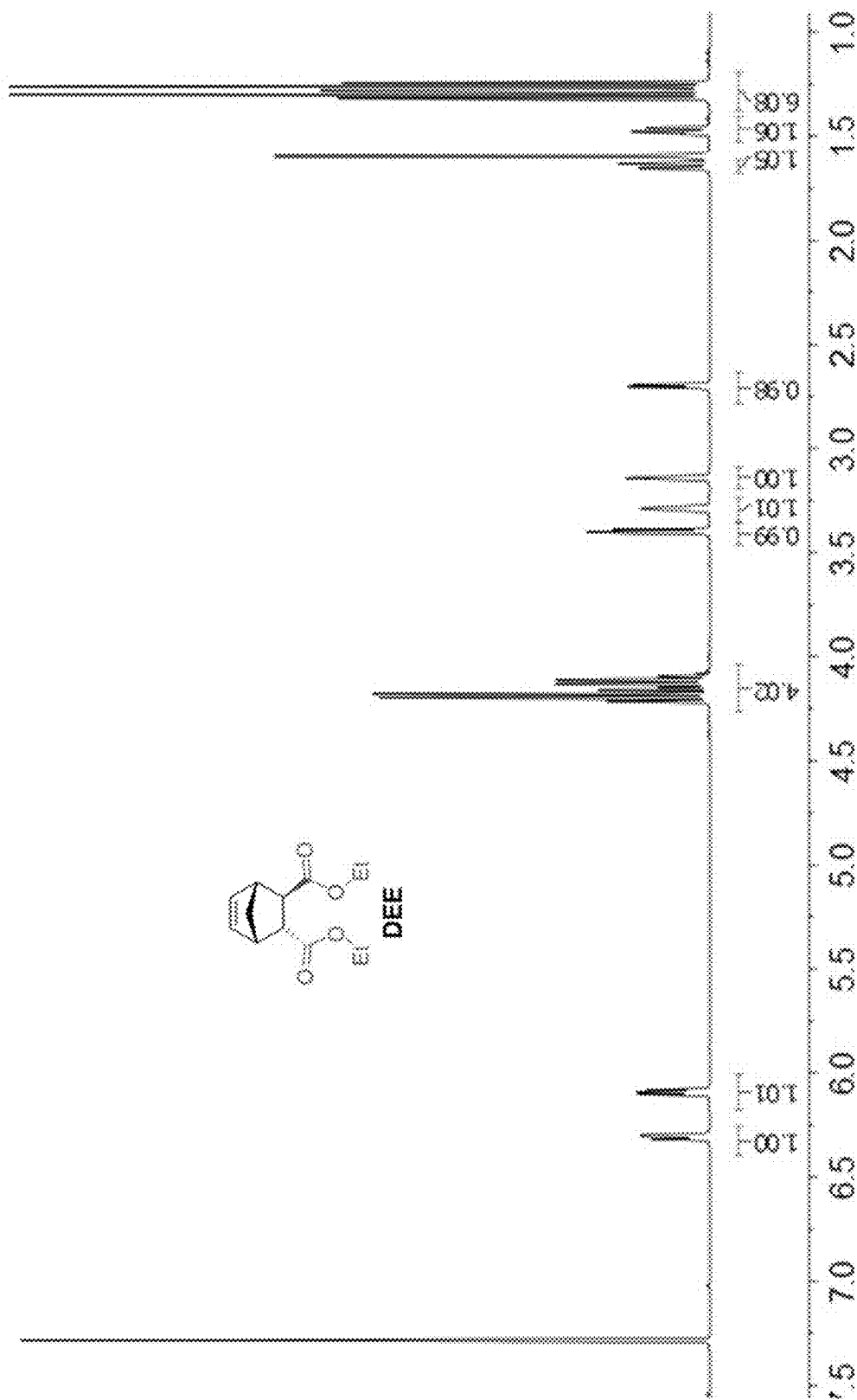
FIG. 15. $^1H$ NMR spectrum of DEE in $CDCl_3$.
Figure 16:
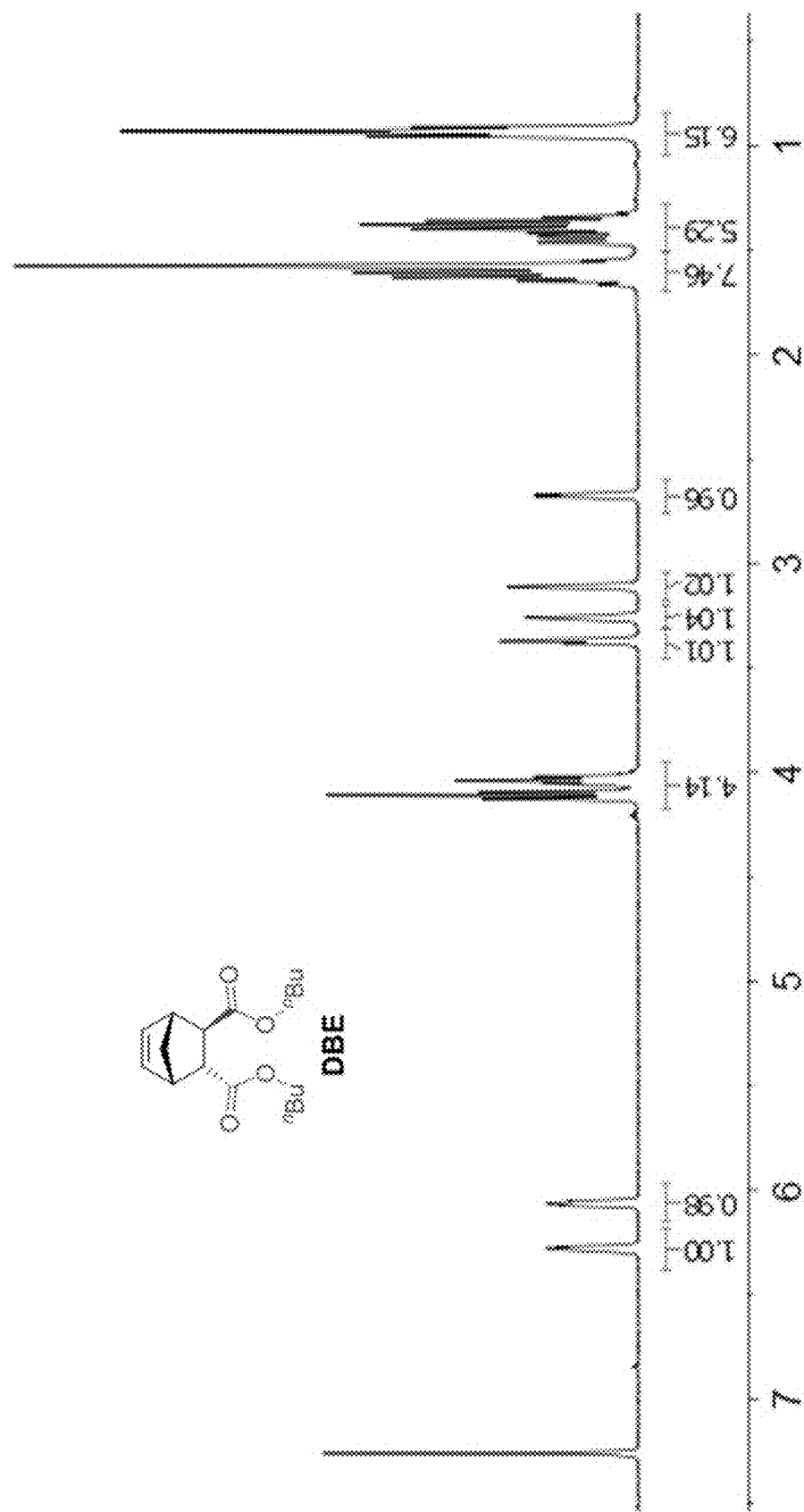
FIG. 16. $^1H$ NMR spectrum of DBE in $CDCl_3$.
Figure 17:
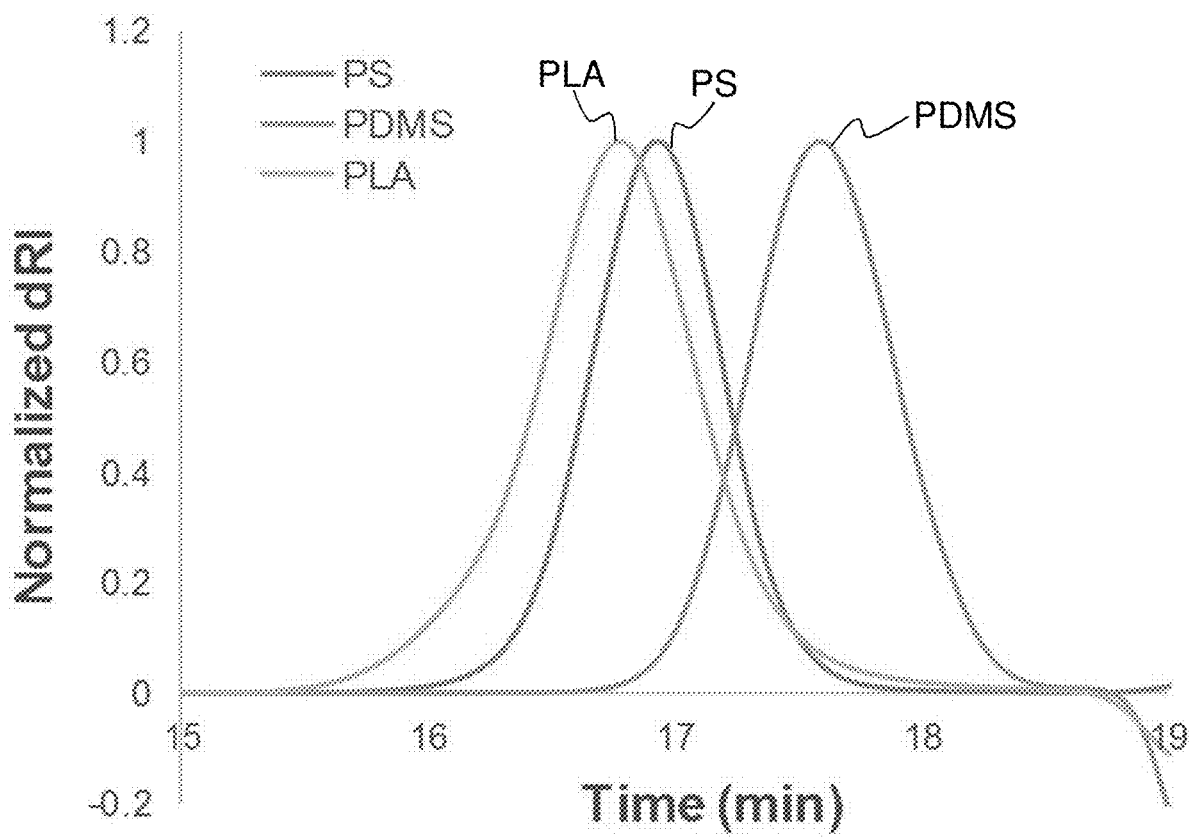
FIG. 17. SEC traces of PS (Đ=1.04), PLA (Đ=1.05), and PDMS (Đ=1.03) macromonomers. Note that the retention time does not reflect the actual molar masses of the macromonomers due to different interactions between the macromonomers and the mobile phase (THF). The molar masses of the macromonomers are determined by $^1H$ NMR spectroscopy. The data curves from left-to-right correspond to PLA, PS, and PDMS, respectively.
Figure 18:
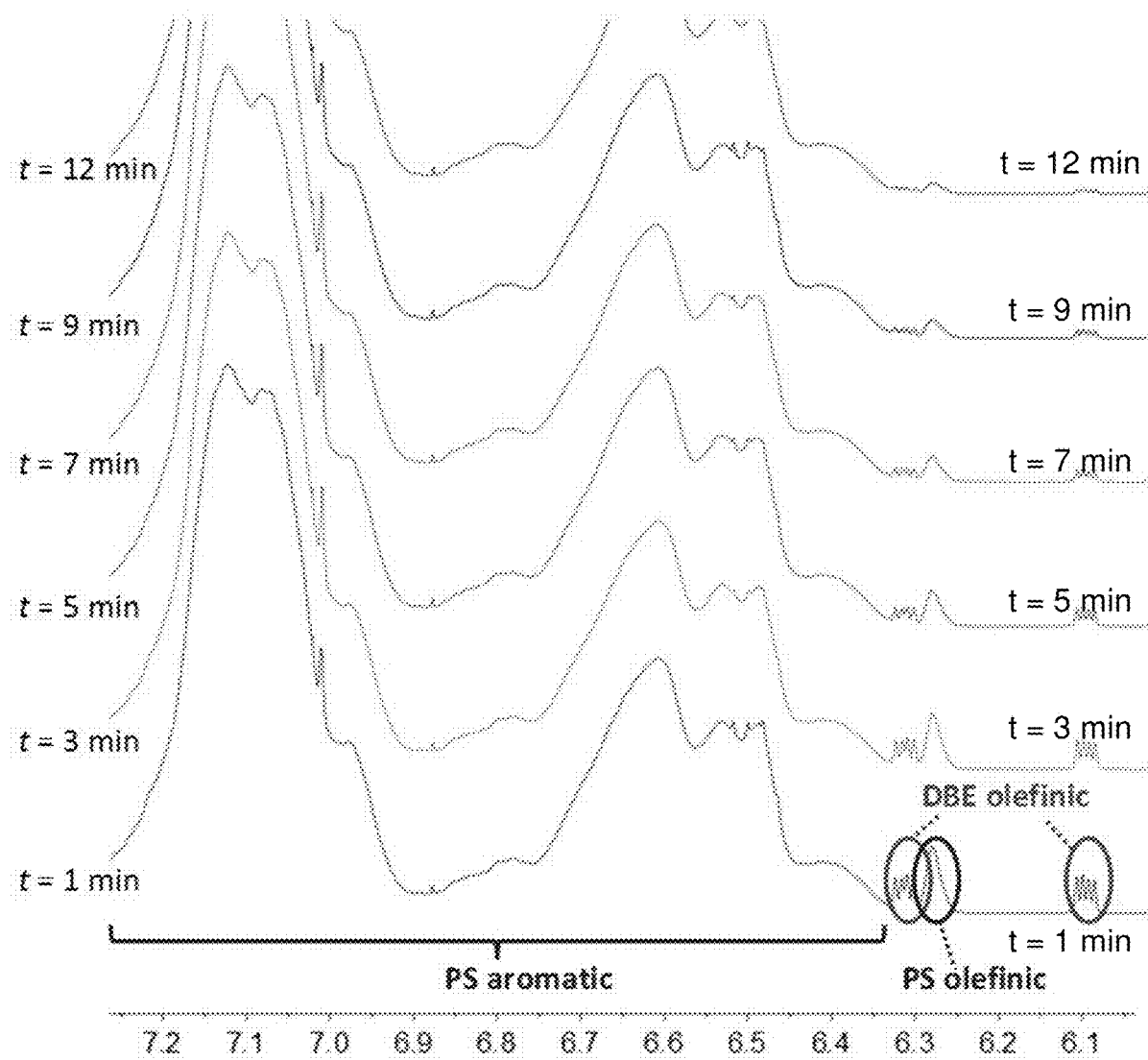
FIG. 18. Selected $^1H$ NMR spectra (solvent: $CDCl_3$) obtained from the copolymerization reaction of PS with DBE (1:1) as an example, showing the depletion of the olefinic resonances which may be integrated against the aromatic polystyrene resonances.
Figure 21:
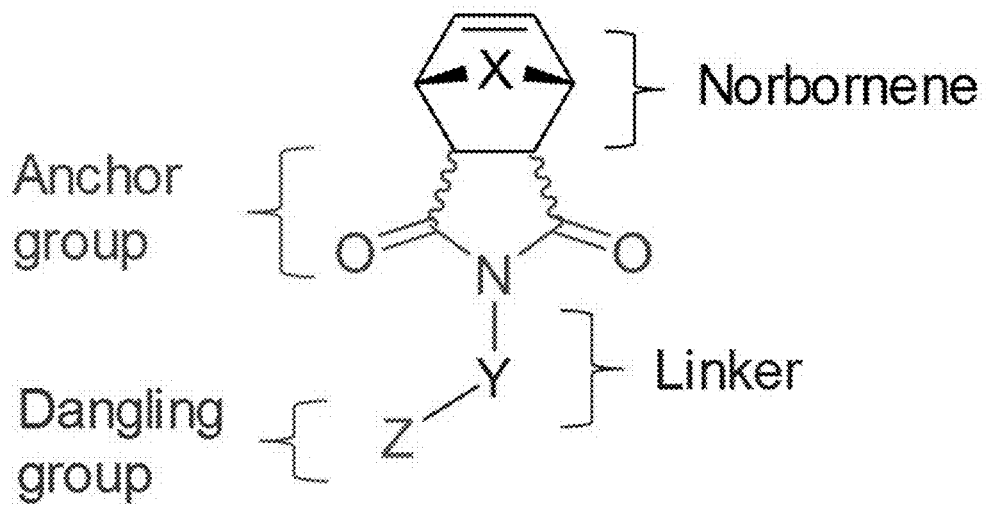
FIG. 21. An illustrative summary of exemplary reactive diluent and macromonomer species in accordance with the present invention.

These copolymerization reactions are carried out under very mild conditions in $CH_2Cl_2$ (298 K, $[G3]_0$=0.5 mM, 15 min), and complete monomer consumption is verified by $^1$H NMR spectroscopy. As shown in FIG. 10, the SEC analyses of the resulting polymers indicated low molar mass dispersities, or "polydispersity indices", (Đ=1.01-1.03) as well as excellent agreement between the measured and targeted molar masses throughout the series (see also FIG. 17).

Reinforcing the NMR and SEC data, differential scanning calorimetry (DSC) provides further evidence supporting the controlled incorporation of both macromonomer and diluent (see FIG. 20). For example, DSC data collected for $(PS^{0.5}\text{-ran-}DBE^{0.5})_{200}$ shows one glass transition temperature ($T_g$) at 95° C., which lies between the $T_g$ values of the pure components $PS_{100}$ (102° C.) and $DBE_{100}$ (71° C.). The presence of two $T_g$s would suggest either blocky copolymerization (rarely encountered) or microphase separation of PS-functionalized and DBE-functionalized segments. The observation of a single $T_g$ instead supports random copolymerization as desired.

Conclusion: The current work introduces a general approach for simultaneously controlling the grafting density and side chain distribution of polymers. This method is achieved by ring-opening metathesis copolymerization of a norbornene-functionalized macromonomer (PS, PLA, or PDMS) with a discrete endo,exo-norbornenyl diester diluent (DME, DEE, or DBE). While such a system may appear at first glance untenable due to the vastly different steric profiles characteristic of the macromonomers and diluents, appropriate monomer design overcomes this challenge. By simple modifications to the diester substituents, the self-propagation rate constant ($k_{homo}$) of the diluents is adjusted to match or mismatch those of the norbornenyl macromonomers. To investigate the copolymerization kinetics, the reaction profiles are monitored and fitted to a terminal copolymerization model using a non-linear least-square curve fitting method. This analysis enables close inspection of previously unexplored reactivity ratios ($r_1$ and $r_2$) as well as cross-propagation rate constants ($k_{12}$ and $k_{21}$) for G3-catalyzed ROMP. In particular, we demonstrate that 1) copolymerizing a macromonomer/diluent pair with similar or dissimilar values of $k_{homo}$ favors the generation of random ($r_1 \approx r_2 \approx 1$) or gradient ($r_1 < 1 < r_2$; $r_1 > 1 > r_2$) copolymers, respectively; 2) different macromonomer/diluent feed ratios may be employed to vary the grafting density from 100% to 0%; and 3) the $k_{12}$ values measured for macromonomers (PS=5.23-7.74 $M^{-1}$ $s^{-1}$, PLA=16.7-18.8 $M^{-1}$ $s^{-1}$, PDMS=19.5-19.9 $M^{-1}$ $s^{-1}$) are very similar whereas the $k_{21}$ are substantially different (1=macromonomer, 2=diluent; see Table 2), reflecting the importance of the alkylidene ligands in metathesis rates. The determined reactivity ratios can be used to calculate the instantaneous copolymer composition, thus permitting visualizations of brush distributions. We further synthesize an array of monodisperse polymers $(PLA^x\text{-ran-}DME^{1-x})_n$ with various preselected grafting densities (x=1.0, 0.75, 0.5, 0.25) and preselected backbone degrees of polymerization (n=167, 133, 100, 67, 33). These results demonstrate that ring-opening metathesis copolymerization can be exploited in the context of side chain density/distribution control. Simultaneous control over the density and distribution of grafts via grafting-through ROMP therefore expands the polymer synthetic toolbox, providing new opportunities for designing architecturally complex polymers spanning the linear-to-bottlebrush regimes.[36] We also contemplate the effects of grafting density variations on the self-assembly and rheological properties of graft polymers.

Experimental Conditions:

General considerations. Norbornene macromonomers PS[9] and PLA[10] are prepared according to the reported procedures. Norbornene diluents DME,[37] DEE,[38] and DBE[39] are prepared by Diels-Alder reactions according to the reported procedures. The second-generation ruthenium metathesis catalyst [(H$_2$IMes)(PCy$_3$)(Cl)$_2$Ru=CHPh] is generously provided by Materia, and G3 is prepared according to the reported preceduce.[26] CH$_2$Cl$_2$ is dried by passing through an activated alumina column. Deuterated solvents are purchased from Cambridge Isotopes Laboratories, Inc. and used as received.

NMR, SEC, and DSC characterization. Ambient temperature NMR spectra are recorded on a Varian 300 MHz, 400 MHz, or 500 MHz NMR spectrometer. Chemical shifts (δ) are given in ppm and referenced against residual solvent signals ($^1$H, $^{13}$C). SEC data are collected using two Agilent PLgel MIXED-B 300×7.5 mm columns with 10 μm beads, connected to an Agilent 1260 Series pump, a Wyatt 18-angle DAWN HELEOS light scattering detector, and Optilab rEX differential refractive index detector. Online determination of dn/dc assumed 100% mass elution under the peak of interest. The mobile phase is THF. Thermal profiles of polymer samples are obtained using a Hitachi DSC7020 calorimeter with an aluminum reference pan. Following an initial run to erase thermal history (by heating from 25° C. to 130° C. at a rate of 10° C./min), sample temperature is maintained at 120° C. in an external oven while the furnace cooled for approximately 20 minutes. Samples are then removed from the oven, cooled for 45 seconds on a thermally conductive surface, then rerun through an identical calorimeter cycle (25-130° C., 10° C./min). The reported data are collected on the second heating ramp.

Synthesis of PDMS. A solution of N-(hexanoic acid)-cis-5-norbornene-exo-dicarboximide (6.00 g, 21.6 mmol), alcohol-terminated PDMS (18.1 g, 18.1 mmol, $M_n$=1000 g/mol, Gelest), EDC-HCl (5.52 g, 28.8 mmol), and DMAP (222 mg, 1.80 mmol) is prepared in 250 mL of dichloromethane. After stirring for 20 hours under air at room temperature, the organic solution is washed with 1 M HCl (3×75 mL), brine (3×75 mL), and deionized water (3×75 mL). The organic solution is stirred over anhydrous MgSO$_4$ then filtered, and volatile components are removed under vacuum. The product is filtered through a plug of silica with dichloromethane (2 L), and is dried in vacuo, affording PDMS as a colorless oil (18.6 g, 82%). $^1$H NMR (CDCl$_3$, 300 MHz) δ 6.28 (s, 2H), 4.20 (dd, 4H), 3.61 (dd, 4H), 3.44 (dt, 10H), 3.27 (t, 4H), 2.33 (t, 2H), 1.59 (m, 9H), 1.31 (m, 6H), 1.21 (d, 1H), 0.88 (t, 4H), 0.52 (td, 4H), 0.07 (s, 104H). $M_n$ (determined by $^1$H NMR)=1280 g/mol.

Standard procedures for the determination of homopolymerization rate constants. A 4 mL vial is charged with a flea stir bar and a norbornene monomer (0.025 mmol) in CH$_2$Cl$_2$ at 298 K. While stirring vigorously, the polymerization is initiated by adding a CH$_2$Cl$_2$ solution of G3 (0.0125 M, 20 μL, 0.25 μmol) to achieve initial conditions of [norbornene]$_0$ (0.05 M) and [G3]$_0$ (0.5 mM). During the course of the reaction, aliquots (~20-50 μL) are extracted at different time points and immediately quenched in a separate vial containing a large excess of ethyl vinyl ether (~0.2 mL) in THF. The quenched reaction mixtures are subsequentially subjected to SEC and $^1$H NMR analysis, allowing for the determination of [norbornene]$_t$. For each homopolymerization experiment, the self-propagation rate constant $k_{homo}$ is determined according to Eq. 1.

Standard procedures for the determination of copolymerization reactivity ratios. A 4 mL vial is charged with a flea stir bar and a CH$_2$Cl$_2$ solution of two norbornene monomers (M$_1$, M$_2$, each 0.025 mmol) at 298 K. While stirring vigorously, the copolymerization is initiated by adding a CH$_2$Cl$_2$ solution of G3 (0.0125 M, 20 µL, 0.25 µmol) to achieve initial conditions of [M$_1$]$_0$ (0.05 M), [M$_2$]$_0$ (0.05 M), and [G3]$_0$ (0.5 mM). During the course of the reaction, aliquots (~20-50 µL) are extracted at different time points and immediately quenched in a separate vial containing a large excess of ethyl vinyl ether (~0.2 mL) in THF. The quenched reaction mixtures are subsequentially subjected to SEC and $^1$H NMR analysis, allowing for the determination of [M$_1$]$_t$ and [M$_2$]$_t$. Values of k$_{12}$ and k$_{21}$ are obtained by fitting the experimentally determined kinetic data to the numerical solutions for Eq. 2-5 using MATLAB non-linear least-square solver (lsqcurvefit) in conjunction with non-stiff differential equation solver (ode45).

REFERENCES (1) (a) Hadjichristidis, N.; Pitsikalis, M.; Iatrou, H.; Pispas, S. Macromol. Rapid Commun. 2003, 24, 979-1013. (b) Sheiko, S. S.; Sumerlin, B. S.; Matyjaszewski, K. Prog. Polym. Sci. 2008, 33, 759-785. (c) Rzayev, J. ACS Macro Letters 2012, 1, 1146-1149. (d) Ver-duzco, R.; Li, X.; Pesek, S. L.; Stein, G. E. Chem. Soc. Rev. 2015, 44, 2405-2420. (e) Müllner, M.; Müller, A. H. E. Polymer 2016, 98, 389-401.

(2) (a) Lecommandoux, S.; Chécot, F.; Borsali, R.; Schappacher, M.; Deffieux, A.; Brûlet, A.; Cotton, J. P. Macromolecules 2002, 35, 8878-8881. (b) Zhang, B.; Gröhn, F.; Pedersen, J. S.; Fischer, K.; Schmidt, M. Macromolecules 2006, 39, 8440-8450. (c) Cao, Z.; Carrillo, J.-M. Y.; Sheiko, S. S.; Dobrynin, A. V. Macromolecules 2015, 48, 5006-5015.

(3) (a) Runge, M. B.; Bowden, N. B. J. Am. Chem. Soc. 2007, 129, 10551-10560. (b) Hu, M.; Xia, Y.; McKenna, G. B.; Kornfield, J. A.; Grubbs, R. H. Macromolecules 2011, 44, 6935-6943. (c) Gu, W.; Huh, J.; Hong, S. W.; Sveinbjornsson, B. R.; Park, C.; Grubbs, R. H.; Russell, T. P. ACS Nano 2013, 7, 2551-2558. (d) Dalsin, S. J.; Hillmyer, M. A.; Bates, F. S. ACS Macro Letters 2014, 3, 423-427.

(4) Johnson, J. A.; Lu, Y. Y.; Burts, A. O.; Lim, Y.-H.; Finn, M. G.; Koberstein, J. T.; Turro, N. J.; Tirrell, D. A.; Grubbs, R. H. J. Am. Chem. Soc. 2011, 133, 559-566.

(5) Li, X.; Prukop, S. L.; Biswal, S. L.; Verduzco, R. Macromole-cules 2012, 45, 7118-7127.

(6) Sun, G.; Cho, S.; Clark, C.; Verkhoturov, S. V.; Eller, M. J.; Li, A.; Pavía-Jiménez, A.; Schweikert, E. A.; Thackeray, J. W.; Trefonas, P.; Wooley, K. L. J. Am. Chem. Soc. 2013, 135, 4203-4206.

(7) Xu, H.; Sun, F. C.; Shirvanyants, D. G.; Rubinstein, M.; Sha-bratov, D.; Beers, K. L.; Matyjaszewski, K.; Sheiko, S. S. Adv. Mater. 2007, 19, 2930-2934.

(8) Bates, C. M.; Chang, A. B.; Schulze, M. W.; Momčilović, N.; Jones, S. C.; Grubbs, R. H. J. Polym. Sci., Part B: Polym. Phys. 2016, 54, 292-300.

(9) Bates, C. M.; Chang, A. B.; Momčilović, N.; Jones, S. C.; Grubbs, R. H. Macromolecules 2015, 48, 4967-4973.

(10) Sveinbjörnsson, B. R.; Weitekamp, R. A.; Miyake, G. M.; Xia, Y.; Atwater, H. A.; Grubbs, R. H. Proceedings of the National Academy of Sciences 2012, 109, 14332-14336.

(11) Cheng, C.; Khoshdel, E.; Wooley, K. L. Nano Lett. 2006, 6, 1741-1746.

(12) Daniel, W. F. M.; Burdynska, J.; Vatankhah-Varnoosfaderani, M.; Matyjaszewski, K.; Paturej, J.; Rubinstein, M.; Dobrynin, A. V.; Sheiko, S. S. Nat Mater 2016, 15, 183-189.

(13) Paturej, J.; Sheiko, S. S.; Panyukov, S.; Rubinstein, M. Science Advances 2016, 2.

(14) Noel, A.; Borguet, Y. P.; Wooley, K. L. ACS Macro Letters 2015, 4, 645-650.

(15) (a) Peng, S.; Bhushan, B. RSC Advances 2012, 2, 8557-8578. (b) Zhang, Q.; Ran, Q.; Zhao, H.; Shu, X.; Yang, Y.; Zhou, H.; Liu, J. Colloid Polym. Sci. 2016, 294, 1705-1715.

(16) (a) Lipson, J. E. G. Macromolecules 1991, 24, 1327-1333. (b) Rouault, Y.; Borisov, O. V. Macromolecules 1996, 29, 2605-2611. (c) Saariaho, M.; Subbotin, A.; Szleifer, I.; Ikkala, O.; ten Brinke, G. Macromolecules 1999, 32, 4439-4443. (d) Elli, S.; Ganazzoli, F.; Timoshenko, E. G.; Kuznetsov, Y. A.; Connolly, R. J. Chem. Phys. 2004, 120, 6257-6267.

(17) Ohno, S.; Matyjaszewski, K. J. Polym. Sci., Part A: Polym. Chem. 2006, 44, 5454-5467.

(18) Matsuda, M.; Satoh, K.; Kamigaito, M. Macromolecules 2013, 46, 5473-5482.

(19) (a) Bielawski, C. W.; Grubbs, R. H. Prog. Polym. Sci. 2007, 32, 1-29. (b) Leitgeb, A.; Wappel, J.; Slugovc, C. Polymer 2010, 51, 2927-2946. (c) Sutthasupa, S.; Shiotsuki, M.; Sanda, F. Polym. J. 2010, 42, 905-915. (d) Martinez, H.; Ren, N.; Matta, M. E.; Hillmyer, M. A. Polymer Chemistry 2014, 5, 3507-3532.

(20) (a) Lutz, J.-F.; Ouchi, M.; Liu, D. R.; Sawamoto, M. Science 2013, 341. (b) Chang, A. B.; Miyake, G. M.; Grubbs, R. H. In Sequence-Controlled Polymers: Synthesis, Self-Assembly, and Proper-ties; American Chemical Society: 2014; Vol. 1170, p 161-188.

(21) (a) Al Samak, B.; G. Carvill, A.; J. Rooney, J.; M. Thompson, J. Chem. Commun. 1997, 2057-2058. (b) Elling, B. R.; Xia, Y. J. Am. Chem. Soc. 2015, 137, 9922-9926.

(22) (a) Sutthasupa, S.; Shiotsuki, M.; Masuda, T.; Sanda, F. J. Am. Chem. Soc. 2009, 131, 10546-10551. (b) Jeong, H.; John, J. M.; Schrock, R. R. Organometallics 2015, 34, 5136-5145. (c) Jang, E. S.; John, J. M.; Schrock, R. R. ACS Central Science 2016, 2, 631-636.

(23) (a) Jha, S.; Dutta, S.; Bowden, N. B. Macromolecules 2004, 37, 4365-4374. (b) Xia, Y.; Olsen, B. D.; Kornfield, J. A.; Grubbs, R. H. J. Am. Chem. Soc. 2009, 131, 18525-18532. (c) Li, Z.; Zhang, K.; Ma, J.; Cheng, C.; Wooley, K. L. J. Polym. Sci., Part A: Polym. Chem. 2009, 47, 5557-5563.

(24) (a) Lu, H.; Wang, J.; Lin, Y.; Cheng, J. J. Am. Chem. Soc. 2009, 131, 13582-13583. (b) Zhang, H.; Zhang, Z.; Gnanou, Y.; Hadjichristidis, N. Macromolecules 2015, 48, 3556-3562.

(25) Moatsou, D.; Hansell, C. F.; O'Reilly, R. K. Chem. Sci. 2014, 5, 2246-2250.

(26) Love, J. A.; Morgan, J. P.; Trnka, T. M.; Grubbs, R. H. An-gew. Chem., Int. Ed. 2002, 41, 4035-4037.

(27) Trzaskowski, B.; Grela, K. Organometallics 2013, 32, 3625-3630.

(28) (a) Mayo, F. R.; Lewis, F. M. J. Am. Chem. Soc. 1944, 66, 1594-1601. (b) Mayo, F. R.; Walling, C. Chem. Rev. 1950, 46, 191-287.

(29) Fineman, M.; Ross, S. D. Journal of Polymer Science 1950, 5, 259-262.

(30) Kelen, T.; Tüdös, F. Journal of Macromolecular Science, Chemistry 1975, A9, 1-27.

(31) Jaacks, V. Die Makromolekulare Chemie 1972, 161, 161-172.

(32) Odian, G. Principles of Polymerization, 4th ed.; John Wiley & Sons, Inc.: Hoboken, N.J., 2004.

(33) Radzinski, S. C.; Foster, J. C.; Chapleski, R. C.; Troya, D.; Matson, J. B. J. Am. Chem. Soc. 2016, 138, 6998-7004.
(34) (a) Börner, H. G.; Duran, D.; Matyjaszewski, K.; da Silva, M.; Sheiko, S. S. Macromolecules 2002, 35, 3387-3394. (b) Lee, H.-i.; Matyjaszewski, K.; Yu, S.; Sheiko, S. S. Macromolecules 2005, 38, 8264-8271.
(35) Singh, N.; Tureau, M. S.; Epps, I. I. I. T. H. Soft Matter 2009, 5, 4757-4762.
(36) Bates, C. M.; Bates, F. S. Macromolecules 2017, 50, 3-22.
(37) Hickey, S. M.; Ashton, T. D.; Khosa, S. K.; Robson, R. N.; White, J. M.; Li, J.; Nation, R. L.; Yu, H. Y.; Elliott, A. G.; Butler, M. S.; Huang, J. X.; Cooper, M. A.; Pfeffer, F. M. Organic & Biomolecular Chemistry 2015, 13, 6225-6241.
(38) Windmon, N.; Dragojlovic, V. Green Chemistry Letters and Reviews 2008, 1, 155-163.
(39) Park, J.-S.; Oh, H.-C.; Park, Y.-S.; Woo, J.-W. Advanced Materials Research (Durnten-Zurich, Switzerland) 2012, 421, 136-139.

TABLE 3

Characterizations of graft polymers (PLAx-ran-DME1-x)n with various grafting densities (x = 1, 0.75, 0.5, 0.25) and backbone degrees of polymerization (n = 167, 133, 100, 67, 33)

| Grafting density (x) | Targeted backbone DP (n) | Expected $M_n$ (kg/mol) | Measured $M_n^a$ (kg/mol) | Difference between the expected and measured $M_n$ | Molar mass dispersity ($Ð^a$) |
|---|---|---|---|---|---|
| 100% | 167 | 539 | 548 | 1.7% | 1.025 |
|  | 133 | 431 | 432 | 0.1% | 1.014 |
|  | 100 | 323 | 335 | 3.7% | 1.008 |
|  | 67 | 216 | 227 | 5.3% | 1.009 |
|  | 33 | 108 | 109 | 1.0% | 1.017 |
| 75% | 167 | 413 | 404 | −2.2% | 1.033 |
|  | 133 | 330 | 337 | 1.9% | 1.029 |
|  | 100 | 248 | 250 | 0.8% | 1.029 |
|  | 67 | 165 | 169 | 2.2% | 1.019 |
|  | 33 | 82.6 | 81.1 | −1.8% | 1.023 |
| 50% | 167 | 287 | 296 | 3.3% | 1.026 |
|  | 133 | 230 | 234 | 1.7% | 1.015 |
|  | 100 | 172 | 179 | 3.9% | 1.010 |
|  | 67 | 115 | 119 | 3.4% | 1.008 |
|  | 33 | 57.4 | 60.1 | 4.7% | 1.019 |
| 25% | 167 | 161 | 161 | 0.2% | 1.009 |
|  | 133 | 129 | 126 | −2.6% | 1.014 |
|  | 100 | 96.6 | 97.4 | 0.8% | 1.013 |
|  | 67 | 64.4 | 66.1 | 2.6% | 1.014 |
|  | 33 | 32.2 | 32.3 | 0.2% | 1.021 |

$^a$As determined by SEC differential refractive index detector. The SEC analyses are performed on the ether vinyl ether quenched reaction mixtures without further workup or purification.

Instructions for Copolymerization Kinetics Fitting:

This model fits the copolymerization of two monomers ($M_1$ and $M_2$) with independently determined homopolymerization rate constants $k_{11}$ and $k_{22}$ (refer to the experimental section in the main text for details). The initial concentrations $M_1C_i$ ($M_1^*$, $M_1$ propagating species) and $M_2C_i$ ($M_2^*$, $M_2$ propagating species) are arbitrarily given as long as the sum of $M_1C_i$ and $M_2C_i$ equals $C_i$ (G3 concentration). To use the codes, 1. Use MATLAB to save the following documents (see below) FitKinData.m, odeSolver.m, and model.m, as .m files under the same folder.
2. Use MATLAB to save the following array of kinetic data with time (first column, unit: s), $M_1(t)$ (second column, unit: M), and $M_2(t)$ (third column, unit: M). Note that the concentrations at time zero are not included. To save the data as .mat file, copy and paste the following example in the command window of MATLAB (under the same folder):
KinDataTimePS_DBE31=[60.0000 0.0660 0.0210
    120.0000 0.0566 0.0176
    180.0000 0.0495 0.0150
    240.0000 0.0435 0.0127
    300.0000 0.0375 0.0109
    420.0000 0.0289 0.0079
    540.0000 0.0221 0.0056
    720.0000 0.0150 0.0034];
save ExampleData
3. Open FitKinData.m file, follow comments line by line to setup the .mat file name, the array name, $k_{11}$, $k_{22}$, initial concentrations, as well as the boundary of the fitting parameters for $k_{12}$ and $k_{21}$.
4. Run the FitKinData.m file to find solutions for $k_{12}$ and $k_{21}$.

MATLAB Codes for Copolymerization Kinetics Fitting

FitKinData.m

```
%This code is part of the SI of JACS 2017 by TPL, ABC, HYC, and RHG.
close all    %close all figure windows
clc          %clear command window
clear all    %clear all workspace
load ExampleData %Load .mat file
%KinDataTimePS_DBE31 is the array name containing data time, M1t, M2t
data=KinDataTimePS_DBE31;
%KinDataTimePS_DBE31_fit is fitting results containing [time M1t M2t M1C M2C]
FittingResultName='KinDataTimePS_DBE31_fit';
%Self-propagation rate constants obtained from homopolymerization of M1 and M2
k11=4.18;    %rate constant (M-1s-1) determined by homopolymerization of M1
k22=6.9;     %rate constant (M-1s-1) determined by homopolymerization of M2
%Initial conditions for the copolymerization
M1i=0.075; %initial concentration of M1 (M)
M2i=0.025; %initial concentration of M2 (M)
M1Ci=0.00025;   %arbitrary initial concentration of M1C (M)
M2Ci=0.00025;   %arbitrary initial concentration of M1C (M). M1Ci+M2Ci = Ci
%fitting parameters for k12 and k21: [LowerBound InitialValue UpperBound]
k12=[0 5 20];
k21=[0 5 20];
%%%%%%the following part should not be modified%%%%%
Mi=[M1i M2i M1Ci M2Ci]; %save initial concentrations as Mi
C=[k11 k22];      %save k11 and k22 as C
%save Mi and C as constants.mat file in the current folder
save('constants', 'Mi', 'C')
data=[0 M1i M2i;data]; %add initial M1 and M2 concentration to the data
time=data(:,1);
M1M2=data(:,2:3);
P_lb=[k12(1) k21(1)];
P0 = [k12(2) k21(2)];
P_ub=[k12(3) k21(3)];
%fitting kinetic data with lsqcurvefit function. It will call odeSolver.m file
%P0 = initial parameters for k12 and k21
%time = time points used to generate the analytical solution and the fit
%M1M2 = Experimentally determined M1 and M2 concentrations at different time points
%P_result = [k12 k21] from the best fit
[P_result,resnorm] = lsqcurvefit(@odeSolver,P0,time,M1M2,P_lb,P_ub);
%use the k12 and k21 obtained from the best fit to simulate the reaction profile
odeSolver(P_result, [0 time(end)*1.3]);
load AllResult %load the reaction profile generated by odeSolver code
eval([FittingResultName '= [time_ode Y];']);
r1Mr2=k11*k22/P_result(1)/P_result(2); %calculate r1 x r2
plot(data(:,1),data(:,2),'.b',data(:,1),data(:,3),'.r','markers',12)
hold
plot(time_ode,Y(:,1),'b',time_ode,Y(:,2),'r',time_ode,Y(:,3),'m',time_ode,Y(:,4),'k')
%set legends, x-, y-label, x-axis limit. Report fitting parameters
legend('M_1 exp','M_2 exp','M_1 fit', 'M_2 fit', 'M_1* fit', 'M_2* fit')
xlabel('Time (s)')
ylabel('[M](t) (M)')
xlim([0 time(end)*1.3])
title({strjoin({'k_1_1 = ',num2str(k11),' M^-^1s^-^1, k_2_2 = ',num2str(k22),' M^-^1s^-^1'}),...
    strjoin({'k_1_2 = ',num2str(P_result(1),'%.2f'),' M^-^1s^-^1, k_2_1 = ',num2str(P_result(2),'%.2f'),' M^-^1s^-^1'}),...
    strjoin({'r_1 = ' ,num2str(k11/P_result(1),'%.2f'),', r_2 = ',num2str(k22/P_result(2),'%.2f'),', r_1\timesr_2 = ',num2str(r1Mr2,'%.2f')}),...
        'TPL, RHG, JACS 2017'})
hold off
clear k11 k12 k21 k22 M1Ci M1i M1M2 M2Ci M2i Mi P0 P_lb P_ub r1Mr2 resnorm time C P_result data ans FittingResultName time_ode Y
``` odeSolver.m

```
%This code is part of the SI of JACS 2017 by TPL, ABC, HYC, and RHG.
function y = odeSolver(k, time)
load constants
[t,Y]=ode45(@(t,Y) model(t,Y,k), time, Mi);
    y=Y(:,1:2);
time_ode=t;
save('AllResult','Y','time_ode')
``` model.m

```
%This code is part of the SI of JACS 2017 by TPL, ABC, HYC, and RHG.
function dMdt = model(t,M,k)
```

-continued

| FitKinData.m |
|---|
| load constants<br>M1=M(1);<br>M2=M(2);<br>M1C=M(3);<br>M2C=M(4);<br>k11=C(1);<br>k22=C(2);<br>k12=k(1);<br>k21=k(2);<br>dM1dt = -k11 * M1C * M1 - k21 * M2C * M1;<br>dM2dt = -k22 * M2C * M2 - k12 * M1C * M2;<br>dM1Cdt = k21 * M2C * M1 -k12 * M1C * M2;<br>dM2Cdt = -k21 * M2C * M1 + k12 * M1C * M2;<br>dMdt = [dM1dt; dM2dt; dM1Cdt; dM2Cdt]; |

Example 2A: Design, Synthesis, and Self-Assembly of Polymers with Tailored Graft Distributions Abstract: Grafting density and graft distribution impact the chain dimensions and physical properties of polymers. However, achieving precise control over these structural parameters represents long-standing synthetic challenges. In this example, we provide a versatile strategy to synthesize polymers with tailored architectures via a grafting-through ring-opening metathesis polymerization (ROMP). One-pot copolymerization of an ω-norbornenyl macromonomer and a discrete norbornenyl co-monomer (diluent) provides opportunities to control the backbone sequence and therefore the side chain distribution. Toward sequence control, the homopolymerization kinetics of 23 diluents are studied, representing diverse variations in the stereochemistry, anchor groups, and substituents. These modifications tune the homopolymerization rate constants over at least two orders of magnitude ($0.36 \text{ M}^{-1} \text{ s}^{-1} < k_{homo} < 82 \text{ M}^{-1} \text{ s}^{-1}$). Rate trends are identified and elucidated by complementary mechanistic and density functional theory (DFT) studies. Building on this foundation, complex architectures are achieved through copolymerizations of selected diluents with a poly($_{D,L}$-lactide) (PLA), polydimethylsiloxane (PDMS), or polystyrene (PS) macromonomer. The cross-propagation rate constants are obtained by non-linear least squares fitting of the instantaneous co-monomer concentrations according to the Mayo-Lewis terminal model. In-depth kinetic analyses indicate a wide range of accessible macromonomer/diluent reactivity ratios ($0.08 < r_1/r_2 < 20$), corresponding to blocky, gradient, or random backbone sequences. We further demonstrate the versatility of this copolymerization approach by synthesizing AB graft diblock polymers with tapered, uniform, and inverse-tapered molecular "shapes." Small-angle X-ray scattering analysis of the self-assembled structures illustrates effects of the graft distribution on the domain spacing and backbone conformation. Collectively, the insights provided herein into a ROMP mechanism, monomer design, and homo- and copolymerization rate trends offer a general strategy for the design and synthesis of graft polymers with arbitrary architectures. Controlled copolymerization therefore expands the parameter space for molecular and materials design.

Introduction: Molecular architecture impacts the chemical and physical properties of all polymers. Achieving precise control over the chain connectivity, sequence, and symmetry presents synthetic challenges as well as rich opportunities for materials design. Over the past several decades, advances in polymerization have enabled the synthesis of polymers with complex architectures.[1-4] Graft polymers are a class of such nonlinear architectures featuring polymeric side chains attached to a polymeric backbone. The grafting density and distribution of grafts along the backbone influence the steric interactions between side chains and in turn influence the physical properties. Graft polymers display many unique properties compared to their linear analogues, such as extended chain conformations,[5-8] increased entanglement molecular weights,[9-12] and architecture-dependent rheological behavior.[13-16] Recent studies have harnessed these properties in a wide variety of applications in photonics,[17-19] drug delivery,[20-22] transport,[23-24] and thermoplastics.[25-26] Continued progress in synthetic command over polymer architecture enables further studies of structure-property relationships and inspires new potential applications.

Graft polymers represent ideal platforms to study how chain connectivity defines nanostructures and thereby physical properties. Despite the importance of grafting density and graft distribution, prior synthetic strategies that permit precise and preselected control of these parameters have been currently limited. Grafting-to[27-30] and grafting-from[31-34] approaches require multiple steps in which side chains are either attached to or grown from a pre-formed backbone. Steric congestion along the backbone typically prevents precise control over the molecular weight, grafting density, and side chain distribution. As a result, the synthesis of well-defined architectural variants—let alone materials with variable chemical compositions—is challenging. Grafting-through ring-opening metathesis polymerization (ROMP) closes this gap by affording wide functional group tolerance and enabling simultaneous control over side chain and backbone lengths.[35-37] In another example demonstrate a ROMP-type strategy that provides access to polymers with uniform grafting densities spanning the linear to bottlebrush regimes.[38] In this example, we further expand the scope of architectural design by demonstrating that methods of the present invention can be exploited to further tune "molecular shapes."

Figures 22A, 22B:
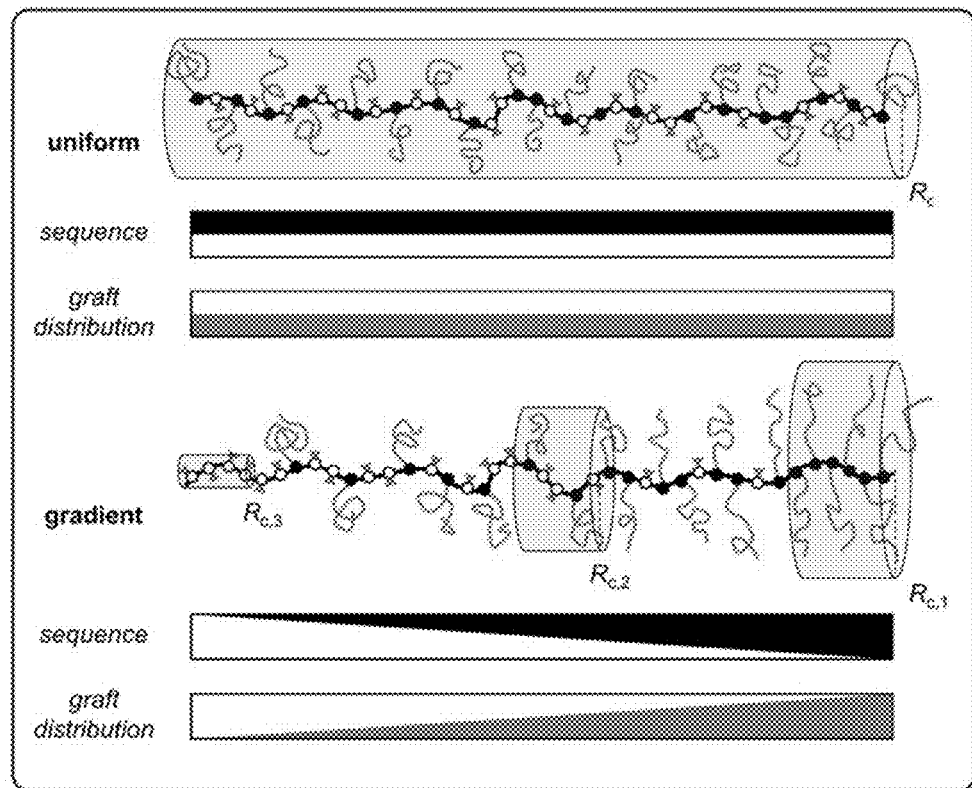
FIG. 22A-22B. Grafting-through ROMP of a small-molecule diluent (white) and a macromonomer (black). Since the side chains (red, squiggly lines) are connected to certain backbone units, control over the backbone sequence directly determines the side chain distribution.

Our approach employs controlled copolymerization of a macromonomer and a small-molecule diluent. The relative reactivity of the two co-monomers directly dictates the spatial arrangement of the side chains. For example, if the macromonomer and diluent copolymerize at approximately the same rate, the side chains are therefore uniformly distributed along the polymer backbone (FIG. 22A). Such polymers are widely termed "cylindrical molecular brushes" due to their steric-induced stiffness and axes of symmetry.[39-43] These cylindrical brushes can be modeled as wormlike chains with the same average cross-sectional radius ($R_c$) along the entire backbone.[5, 44-46] On the other hand, if the macromonomer and diluent copolymerize at different rates, the resulting gradient sequences may template different side chain conformations. Depending on the extent of side chain stretching, $R_c$ varies and tapered, non-cylindrical molecular shapes result (FIG. 22B). Control over the co-monomer distribution therefore opens opportunities to manipulate the chain dimensions and physical properties.

In this example, we provide the demonstration that varying the stereochemistry and steric profiles of discrete co-monomers enables the synthesis of well-defined graft polymers with tunable grafting density and graft distribution. We first discuss the homopolymerization kinetics of a library of discrete norbornenyl monomers, then build complexity through controlled copolymerizations of these small molecules with ω-norbornenyl macromonomers. Trends in the homo- and cross-propagation rates are outlined to provide guidance for future rational design of polymer architectures with arbitrary graft chemistry and distribution. We illustrate the versatility of this copolymerization strategy through the synthesis of graft polymers with different anticipated molecular shapes. The physical consequences of varying the graft distribution are discussed in the context of block polymer self-assembly.

Monomer Design. Previous work introduced endo,exo-norbornenyl dialkylesters as appropriate discrete monomers (diluents) to control the grafting density of polymers with poly($_{D,L}$-lactide) (PLA, $M_n$=3230 g mol$^{-1}$) polydimethylsiloxane (PDMS, $M_n$=1280 g mol$^{-1}$), or polystyrene (PS, $M_n$=3990 g mol$^{-1}$) side chains.[38] Across all macromonomer/diluent combinations and feed ratios, kinetic analyses indicated approximately equal rates of co-monomer consumption and therefore approximately uniform side chain distributions. Obtaining non-uniform side chain distributions requires changing the relative reactivity of the macromonomer and diluent. We show that designing new small-molecule co-monomers is a convenient route. This strategy avoids tedious end-group modifications to the macromonomers and retains the synthetic utility of one-pot batch copolymerization. Semi-batch methods (involving continuous addition of one monomer to another)[47-48] require additional instrumentation and optimization of factors such as feed ratio and feed rate.[49-50] Similarly, while sequential addition of macromonomers with different molecular weights can also provide access to tapered architectures,[51] such approach requires the preparation of multiple well-defined macromonomers and fixes the grafting density at 100%.

FIG. 23 highlights a strategy for monomer design. Species 1a-1j, 2a-2d, 3a-3d, 4a-4c, and 5a-5c are summarized in FIG. 23. The polymerizable strained olefin, anchor group, and substituents can all be readily modified. Substituted norbornenes are selected for this example due to (1) the ease of modifying the stereochemistry and functional groups and (2) the high ring strain, which disfavors unproductive [2+2] cycloreversion.[52] The importance of the anchor group in homopolymerization kinetics has been demonstrated for both discrete norbornenes[53-54] and more recently, ω-norbornenyl macromonomers.[55] In contrast, anchor group effects on the copolymerization of discrete monomers and macromonomers have not been previously studied. In order to investigate these effects, discrete substituted norbornenes with five different types of anchor groups are synthesized: endo,exo-diester (dx-DE, "1"), endo,endo-diester (dd-DE, "2"), exo,exo-diester (xx-DE, "3"), endo-imide (d-I, "4"), and exo-imide (x-I, "5"). For each anchor group, monomers with different substituents (R) are prepared, including for example homologous alkyl groups or para-substituted phenyl rings. All monomers can be prepared in high yields in one or two steps from commercially available starting materials. (Further synthetic details can be found in the Supporting Information.) These steric and electronic variations provide a diverse library of co-monomers for ROMP.

The homopolymerization kinetics of all monomers are studied under the same conditions. ROMP of each monomer in dichloromethane ([M]=50 mM) is catalyzed by the fast-initiating third-generation ruthenium metathesis catalyst, (H$_2$IMes)(pyr)$_2$(Cl—)$_2$Ru═CHPh ([G3]$_0$=0.5 mM). Over the course of the polymerization, aliquots (<20 μL) are collected and immediately quenched into separate vials containing excess ethyl vinyl ether and a silica-bound metal scavenger (SiliaMetS).[56] Removing the quenched ruthenium complex from solution prevents potential reactivation and undesired metathesis that would affect the apparent rates. Analysis by size-exclusion chromatography (SEC) and $^1$H NMR spectroscopy indicates first-order rate dependence on monomer concentration. The first- and second-order rate constants ($k_{obs}$ and $k_{homo}$, respectively) are determined according to Eq. 1:

$$-\frac{d[M]_t}{dt} = k_{obs}[M]_t = k_{homo}[G3]_0[M]_t \qquad (1)$$

For many monomers, the rate constants are determined at least in triplicate. The calculated values typically varied by no more than five percent (FIGS. 49A-49B).

Studying trends in $k_{homo}$ with variations in steric and electronic structure guides monomer design. The first class of monomers demonstrated herein features endo,exo-diester anchor groups (dx-DE). The homopolymerization kinetics of ten dx-DE monomers with different substituents are analyzed (1a-1j, FIGS. 23 and 24). The monomers are readily synthesized by esterification of commercially available norbornene endo,exo-dicarboxylic acid with the appropriate alcohol (1a-d, Scheme 1). (For the synthesis of 1e-1j, FIGS. 23 and 24, the acyl chloride derivatives are used, Scheme 2.) In a series of monomers with homologous alkyl substituents (R=methyl, ethyl, n-propyl, n-butyl; 1a-d, FIGS. 23 and 24), $k_{homo}$ decreases with increasing substituent size. Increasing the steric bulk with isopropyl- and tert-butyl-substituted monomers (1e-f, FIGS. 23 and 24) further decreases $k_{homo}$. These results indicate that sterics clearly impact the homopolymerization kinetics: for example, the methyl-substituted monomer polymerizes over three times faster than the tert-butyl-substituted analogue ($k_{homo}$=18.7 versus 5.36 M$^{-1}$ s$^{-1}$). The effects of electronic variations are also determined. Monomers with ethyl (1b, 14.6 M$^{-1}$ s$^{-1}$) and trifluoroethyl (1g, 10.5 M$^{-1}$ s$^{-1}$) substituents polymerize at approximately the same rate. Comparison of dx-DE monomers with different para-substituted phenyl rings further reveals that the electronic effects are minor. dx-norbornenyl diphenylester (1h) has a larger $k_{homo}$ (8.36 M$^{-1}$ s$^{-1}$) than monomers with either an electron-withdrawing para-trifluoromethyl group (1i, 5.14 M$^{-1}$ s$^{-1}$) or an electron-donating para-methoxy group (1j, 7.76 M$^{-1}$ s$^{-1}$). These electronic variations may exist too far away from the polymerizable olefin to affect $k_{homo}$. Modifying norbornene itself rather than the distal substituents (for example, by substituting oxanorbornene or otherwise changing the bridge position) may result in more apparent electronic effects.

Changing the stereochemistry of the diester anchor groups further demonstrates the effects of steric variations on polymerization rates. (Synthetic details: Schemes 3-4.) Comparing series with the same substituents (FIG. 25A) indicates that dx-DE monomers (1a-d) all polymerize significantly faster than the corresponding endo,endo isomers (dd-DE, 2a-d) and slightly slower than the corresponding exo,exo isomers (xx-DE, 3a-d). For example, the measured $k_{homo}$ for dx-norbornenyl dimethylester is 18.7 $M^{-1}$ $s^{-1}$, while $k_{homo}$ values for the dd-DE and xx-DE analogues are 2.24 $M^-s^{-1}$ and 30.8 $M^{-1}$ $s^{-1}$, respectively. The same anchor group trend occurs for ethyl-, n-propyl-, and n-butyl-substituted norbornenyl diesters and is anticipated to be independent of the substituent.

In order to further examine the relationship between anchor groups and homopolymerization kinetics, norbornenyl monomers with endo-imide (d-I) and exo-imide (x-I) linkages are also synthesized (Schemes 5-6). The x-I anchor group has been widely incorporated in macromonomers toward the synthesis of bottlebrush polymers by grafting-through ROMP,[21,55,57-59] motivating our interest in imide-based diluents. Compared to diester anchor groups, imides are more rigid due to their fused rings and thereby change the monomer steric profile. The electronic character differs as well, since the electron density of an imide oxygen is typically greater than the electron density of an ester oxygen. The interplay of steric and electronic influences are discussed further in the following section.

Figure 25A:
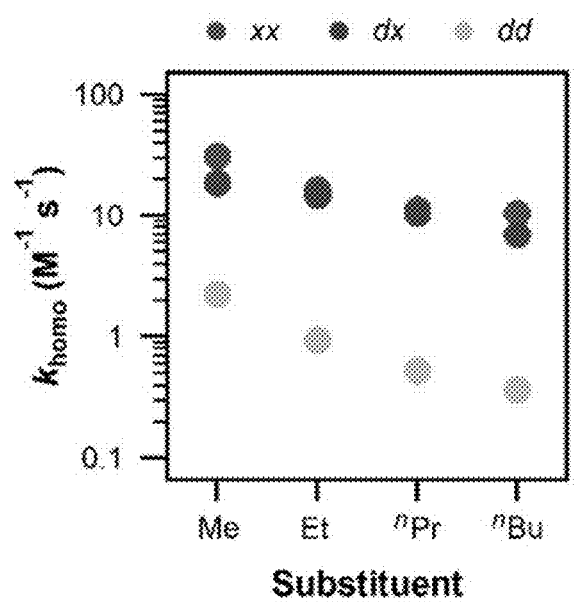
FIG. 25A. Homopolymerization rate constants ($k_{homo}$) for monomers with exo,exo-diester (xx, green), endo,exo-diester (dx, red), and endo,endo-diester (dd, yellow) anchor groups. Comparison of $k_{homo}$ for monomers with R=Me, Et, $^n$Pr, and $^n$Bu supports the steric influences of stereochemistry and substituent size. Top most points correspond to exo,exo-diester (xx, green), middle points correspond to endo,exo-diester (dx, red), and bottom points correspond to endo,endo-diester (dd, yellow).
Figure 25B:
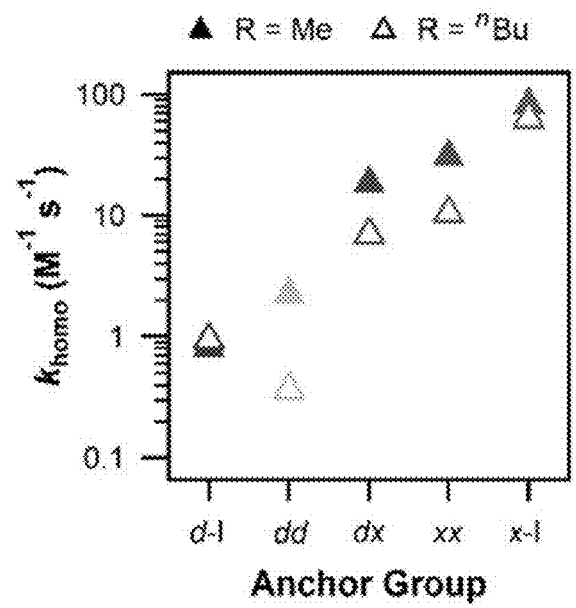
FIG. 25B. $k_{homo}$ for Me- and $^n$Bu-substituted monomers with each of the five anchor groups; endo-imide (d-I, blue) and exo-imide (x-I, purple).

FIG. 25B compares $k_{homo}$ for monomers with each of the five anchor groups. The endo/exo rate difference between d-I and x-I is magnified compared to the endo/exo rate differences observed among the diester-substituted monomers. The $k_{now}$ values for methyl-substituted dd-DE and xx-DE are 2.24 and 30.8 $M^{-1}$ $s^{-1}$ respectively, representing a tenfold rate difference; in comparison, the $k_{homo}$ values for methyl-substituted d-I and x-I are 0.814 and 82.4 $M^{-1}$ $s^{-1}$ respectively, representing a hundredfold rate difference. FIG. 25B also shows that the steric effects of the R group are smaller for x-I and d-I compared to the diester series. For monomers containing the same substituents, the following trend in $k_{homo}$ is observed: d-I<dd-DE<dx-DE<xx-DE<x-I.

Figure 26:
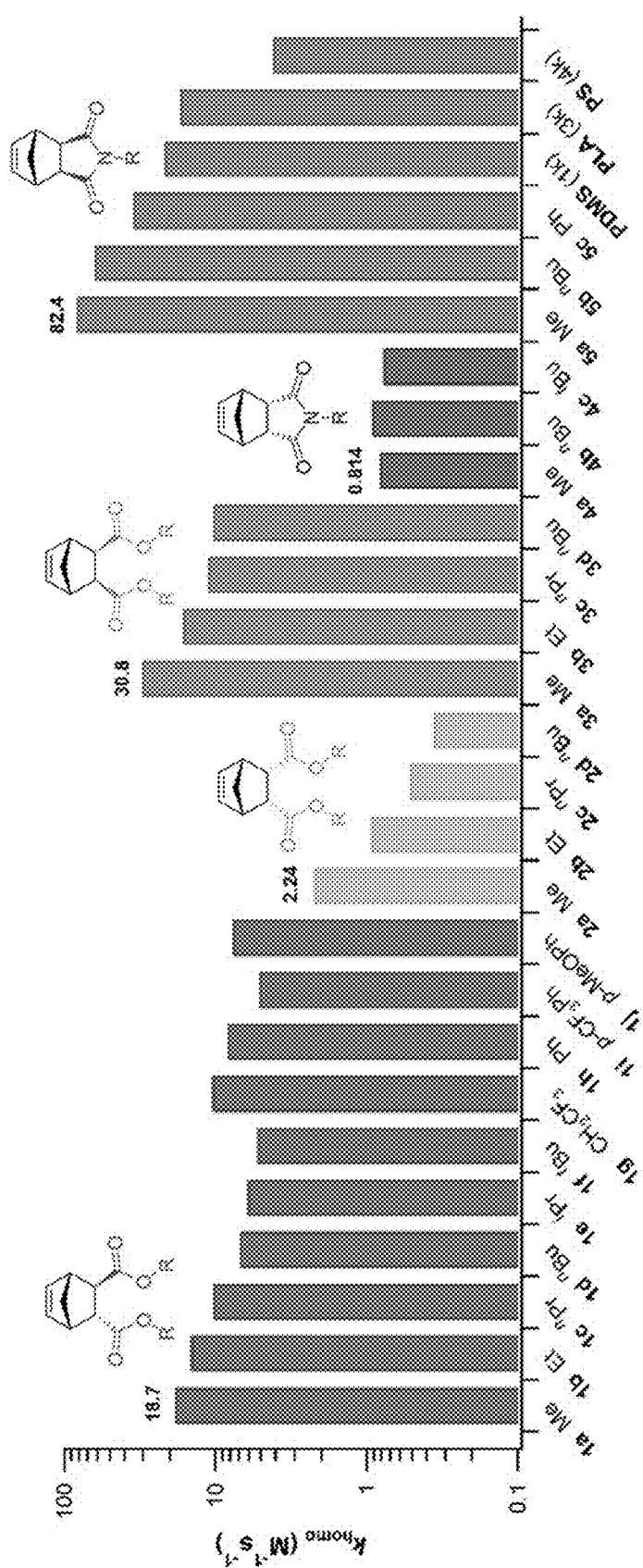
FIG. 26. Plot of $k_{homo}$ values for all monomers studied herein. The monomers are sorted according to their anchor groups: left to right endo,exo-diester (red, 1a-j), endo,endo-diester (yellow, 2a-d), exo,exo-diester (green, 3a-d), endo-imide (blue, 4a-c), and exo-imide (purple, 5a-c and macromonomers). $k_{homo}$ values for methyl-substituted monomers are provided for comparison.

FIG. 26 and Table 4 summarize the homopolymerization kinetics for all monomers studied herein. Variations in the anchor groups and substituents afford a wide range of $k_{homo}$ over two orders of magnitude, spanning 0.362 $M^{-1}$ $s^{-1}$ (2d) to 82.4 $M^{-1}$ $s^{-1}$ (5a). This library of monomers can be readily diversified by simple esterification reactions, providing a versatile platform for tuning the polymerization rates. Understanding the origin of trends in $k_{homo}$ provides insight into the ROMP mechanism. While developing a complete mechanistic understanding is outside the scope of this study, we aim to identify key components of $k_{homo}$ in order to facilitate applications of this method as well as future monomer design.

Figure 24:
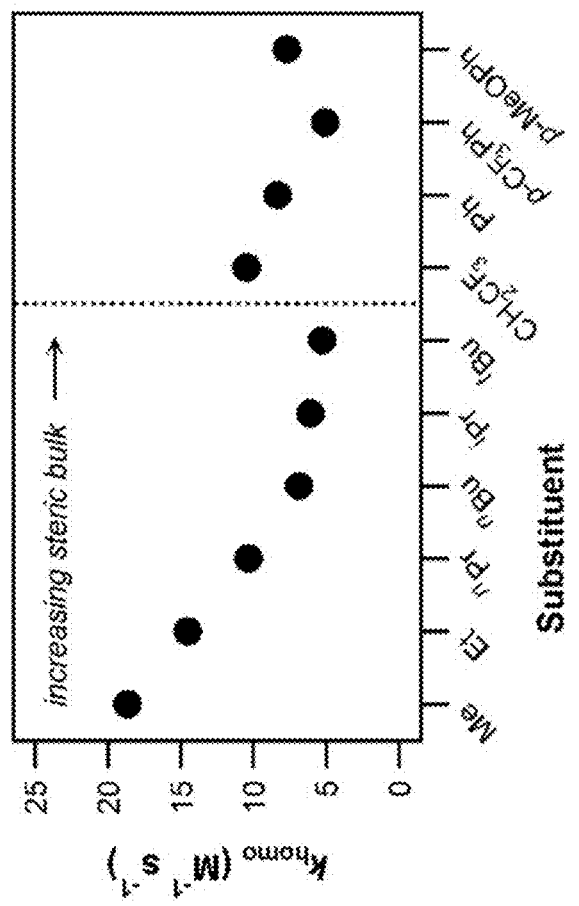
FIG. 24. Homopolymerization rate constants ($k_{homo}$) for substituted endo,exo-norbornenyl diester monomers (left to right: 1a-j). $k_{homo}$ decreases with increasing steric bulk (R=Me to $^t$Bu, 1a-f). $k_{homo}$ does not change significantly with electronic changes via fluorination (1g) or para-substitution of a phenyl ring (1h-j).

Origin of Rate Trends. Polymerization rates are determined by a combination of steric and electronic factors. Our results show that steric effects dominate: (1) In a series of monomers with homologous alkyl R groups, the electronic character is similar but $k_{homo}$ decreases as the steric bulk increases (FIG. 24). (2) $k_{homo}$ is relatively insensitive to distal electronic variations (for example, via para-substitution of phenyl R groups, FIG. 24). (3) $k_{homo}$ decreases for endo-substituted monomers compared to the corresponding exo isomers (FIGS. 25A-25B). In agreement with this work, previous studies of the ROMP of norbornene derivatives have also observed that endo isomers polymerize more slowly than their exo counterparts.[54,60-63]

The observed rate trends may be motivated by a combination of factors, including but not limited to pyridine coordination, olefin coordination, cycloaddition, and formation of a six-membered chelate involving the ruthenium center and the ester- or imide-functionalized chain end.[64] In order to deconvolute these potential contributions to $k_{homo}$, we examined the mechanism of ROMP. Based on reported results for related phosphine-based catalysts,[65-67] we contemplate a dissociative pathway (FIG. 27A) in which pyridine dissociation ($K_{eq,1}=k_1/k_{-1}$, $K_{eq,2}=k_2/k_{-2}$) generates a 14-electron intermediate (b) that can coordinate with a free olefin (c, $K_{eq,3}=k_3/k_{-3}$). The olefin adduct then undergoes cycloaddition ($k_4$) to form a metallacyclobutane intermediate. Subsequent cycloreversion yields a $P_{n+1}$ alkylidene and regenerates the 14-electron species. From a Van't Hoff analysis, Guironnet and coworkers recently reported an equilibrium constant $K_{eq,1}=k_1/k_{-1}=0.5$ M in $CD_2Cl_2$ at 298 K.[68] In agreement with this work, we observe a similar $K_{eq,1}$ value from $^1$H NMR pyridine titration experiments (0.25 M, FIG. 50). The large $K_{eq,1}$ value indicates that >99.8% of the precatalyst G3 exists as the monopyridine adduct in solution under the conditions employed in our homo- and copolymerization studies ($[G3]_0$=0.5 mM). As a result, the concentration of free pyridine is approximately equal to the initial concentration of G3 (i.e., [pyr]≈$[G3]_0$). We derive a simplified rate expression corresponding to a proposed dissociative ROMP pathway in which olefin coordination is the rate-limiting step:[69]

$$-\frac{d[M]_t}{dt} = k_{homo}[G3]_0[M]_t \approx \frac{K_{eq,2}k_3}{K_{eq,2}+[pyr]}[G3]_0[M]_t \quad (2)$$

In this rate expression, $K_{eq,2}$ corresponds to dissociation of the second pyridine and is affected by the identity of the alkylidene ligand. At high catalyst concentrations ([pyr]>>$K_{eq,2}$), a pseudo-zeroth-order dependence on $[G3]_0$ is observed.[68] At low catalyst concentrations however, we observe a rate dependence on $[G3]_0$ for monomers 5a and 5b (FIG. 51). Collectively, these kinetic analyses are consistent with a dissociative pathway.[70]

Figure 52B:
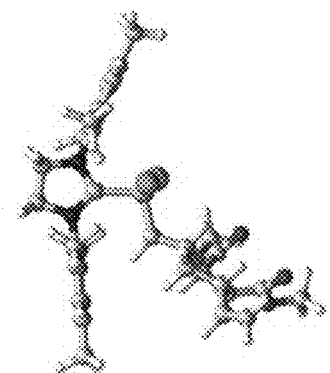
Figure 52A:
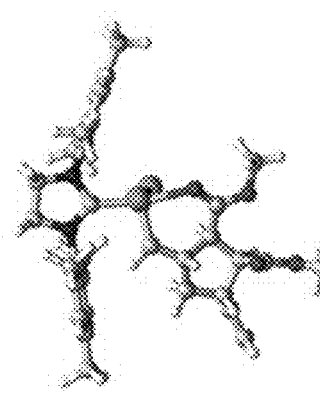

Density functional theory (DFT) methods are employed to address potential chelation effects. Chelation sequesters the catalyst in an unproductive form (FIG. 27A, a) and therefore slows the polymerization rate.[71] For methyl-substituted endo,endo- and exo,exo-norbornenyl diesters (2a and 3a, respectively), the ground-state potential energy surfaces corresponding to one productive ROMP cycle are computed (FIGS. 27B and 52A-52B). The relative free energies at 298 K (ΔG) indicate that formation of the six-membered chelate is more favorable for the endo isomer ($ΔΔG_{chelate}$=9.64 kcal $mol^{-1}$) than for the exo isomer ($ΔΔG_{chelate}$=5.87 kcal $mol^{-1}$). The calculated free energies corresponding to olefin coordination to the vacant species, $ΔΔG_{binding}$, are similar for the endo and exo isomers (8.86 and 8.91 kcal $mol^{-1}$, respectively). These results indicate that disruption of chelation by olefin binding should be more favorable for exo isomers than endo isomers (by 3.72 kcal $mol^{-1}$). This disparity provides a possible reason for the observed endo/exo rate differences ($k_{homo}$=30.8 $M^{-1}$ $s^{-1}$ for 3a, 2.24 $M^{-1}$ $s^{-1}$ for 2a). These results are consistent with previous reports on the ROMP of discrete norbornenyl monomers with similar ruthenium catalysts[64,66,72] and are contemplated to be valid whether olefin coordination ($k_3$<<$k_4$) or cycloaddition ($k_3$>>$k_4$) is the rate-limiting step.[73] Insights into the rate trends from mechanistic studies help identify important elements of monomer design and, therefore, opportunities for controlled copolymerization.

Figure 28:
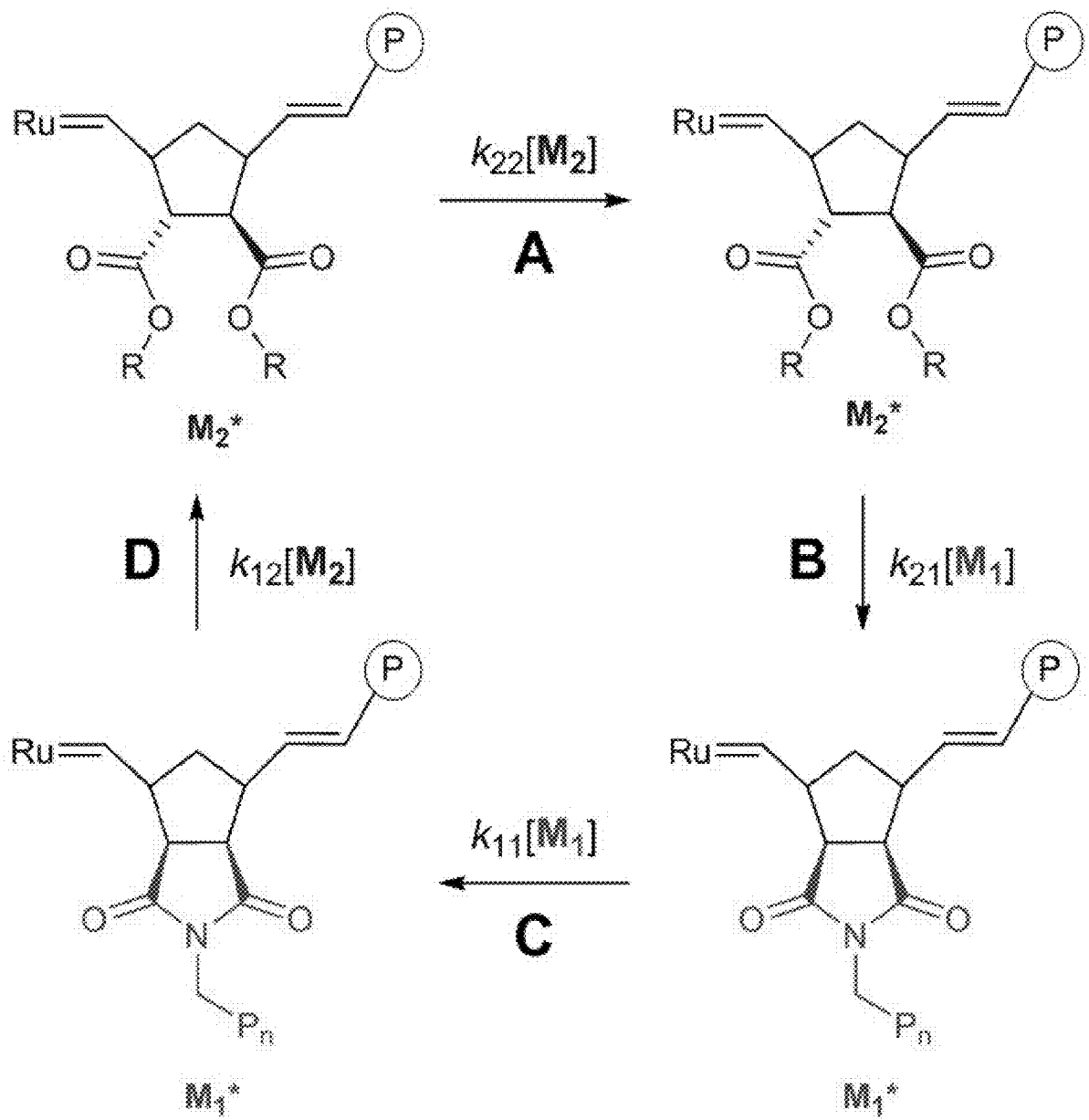
FIG. 28. Propagation reactions for the copolymerization of a discrete diluent ($M_2$, dx-DE shown for example) and a macromonomer ($M_1$) according to a terminal model. $M_2$* and $M_1$* are the corresponding propagating alkylidene species. (A) Diluent self-propagation ($k_{22}$), (B) cross-propagation ($k_{21}$), (C) macromonomer self-propagation ($k_{11}$), (D) cross-propagation ($k_{12}$).

Copolymerization Kinetics. In order to analyze the copolymerization kinetics of a macromonomer and a discrete co-monomer, the Mayo-Lewis terminal model is adapted for G3-catalyzed ROMP.[38] The terminal model assumes that, for a mixture of two monomers $M_1$ and $M_2$, there are two propagating species ($M_1^*$ and $M_2^*$) whose reactivities solely depend on the last-incorporated monomer.[74] The copolymerization kinetics can be captured by four propagation reactions involving $M_1^*$ and $M_2^*$, each described by a unique rate constant k. FIG. 28 shows the relevant reactions for a mixture of a discrete diluent ($M_2$) and a macromonomer ($M_1$): (A) diluent self-propagation ($M_2^* \rightarrow M_2^*$, $k_{22}$), (B) cross-propagation via addition of $M_1$ to $M_2^*$ ($M_2^* \rightarrow M_1^*$, $k_{21}$), (C) macromonomer self-propagation ($M_1^* \rightarrow M_1^*$, $k_{11}$), and (D) cross-propagation via addition of $M_2$ to $M_1^*$ ($M_1^* \rightarrow M_2^*$, $k_{12}$). The conversion over time of all species can be described by a system of four ordinary differential equations. Non-linear least squares regression, described in a previous report,[38] is used to fit the instantaneous monomer concentrations over the entire course of the copolymerization. Finding the best numerical solutions for the cross-propagation rates $k_{12}$ and $k_{21}$ enables determination of the reactivity ratios, $r_1 = k_{11}/k_{12}$ and $r_2 = k_{22}/k_{21}$.

The relative reactivity, captured by $r_1$ and $r_2$, determines the polymer sequence. $r_1$ and $r_2$ can be tuned by building on insights into homopolymerization rate trends. Monomer design ultimately enables architecture design: for a polymerizable macromonomer with any side chain chemistry, a discrete co-monomer can be selected among those in FIG. 26 or otherwise designed to target preselected backbone sequences. In turn, control over the backbone sequence directly controls side chain distribution. We first discuss general trends and opportunities for copolymerization, then outline potential implications for polymer architectures by design.

Figure 29A:
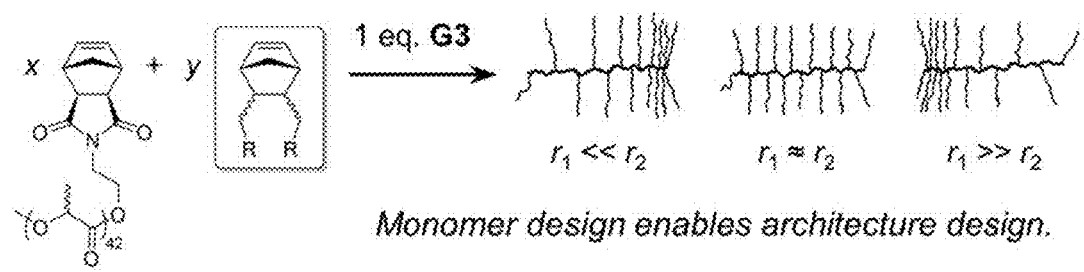
FIG. 29A. Copolymerization scheme: the same macromonomer (PLA, $M_1$) is copolymerized with 13 different reactive diluents ($M_2$). The feed ratio (x/y=1) and total backbone length (x+y=200) are fixed.
Figure 29B:
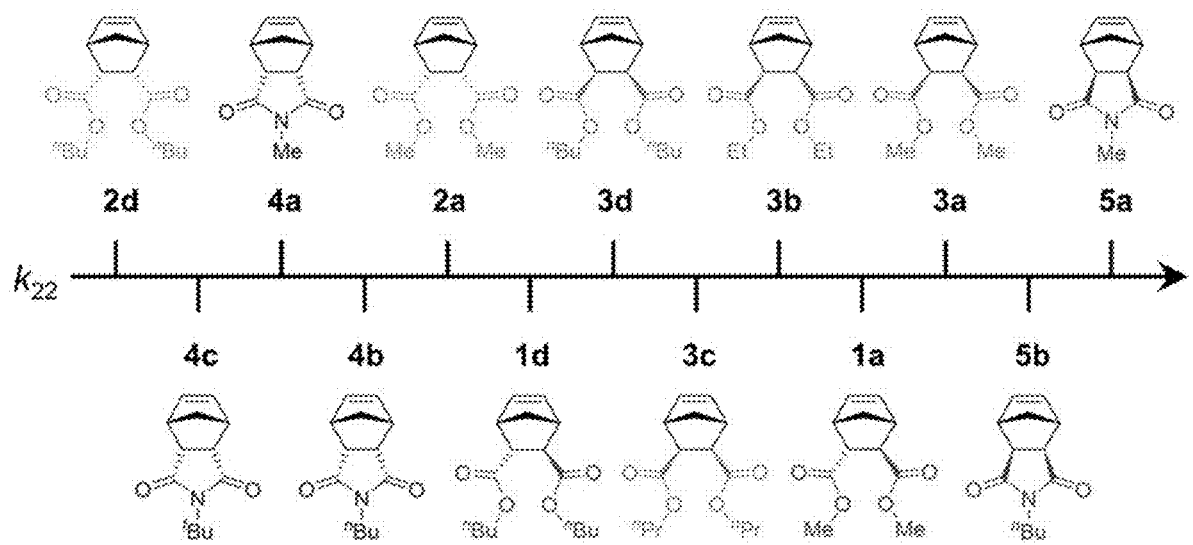
FIG. 29B. $M_2$ (exemplary reactive diluent species in accordance with the present invention) arranged in order of increasing $k_{22}$.

In order to study the impact of monomer structure on the copolymerization kinetics, we select 13 diluents and copolymerized each with the same co-norbornenyl macromonomer (PLA, $M_n$=3230 g mol$^{-1}$) (FIG. 29A). FIG. 29B arranges these discrete co-monomers in order of increasing $k_{22}$. For all copolymerization experiments, the total backbone degree of polymerization ($N_{bb}$) and monomer feed ratio (f) are fixed: given x equivalents of the diluent and y equivalents of PLA relative to 1 equivalent of G3, $N_{bb}$=x+y≈200 and f=x/y≈1. The copolymerization conditions, including monomer and catalyst concentrations, are identical to those for the homopolymerization experiments described above: $[M_1]_0=[M_2]_0$=50 mM, $[G3]_3$=0.5 mM.[75] The kinetics are monitored in the same way as the homopolymerization kinetics, i.e., by quenching aliquots of the polymerization mixture. The instantaneous concentrations of the macromonomer and diluent are determined by integrating the olefin resonances in $^1$H NMR spectra, and $k_{12}$ and $k_{21}$ are obtained by non-linear least squares regression. SEC data for all copolymers indicate low dispersities (Đ<1.1) and similar molecular weights (FIG. 53, Table 5).

FIG. 29C shows the self-propagation rate constants ($k_{11}$, $k_{22}$) and reactivity ratios ($r_1$, $r_2$) for the copolymerization of PLA ($M_1$) with different diluents ($M_2$). (All data, including the cross-propagation rate constants $k_{12}$ and $k_{21}$, are compiled in Table 6.) $k_{11}$ is constant throughout the series (=17.2 M$^{-1}$ s$^{-1}$) since $M_1$ is the same in each co-monomer pair, while $k_{22}$ varies over a wide range due to anchor group and substituent effects (2d: 0.362 M$^{-1}$ s$^{-1}$ to 5a: 82.4 M$^{-1}$ s$^{-1}$). As $k_{22}$ increases, $r_2$ also increases. The magnitude of $r_2$ reflects the reactivity of the propagating alkylidene $M_2^*$ toward free $M_1$ and $M_2$.[76] In the case that $r_2$<1, for example when PLA is copolymerized with dd-DE or d-I diluents (2d to 2a, 0.4<$r_2$<0.9), $M_2^*$ preferentially adds $M_1$. In the opposite case $r_2$>1, for example when PLA is copolymerized with dx-DE, xx-DE, or x-I diluents (3d to 5a, 1.2<$r_2$<3.1), $M_2^*$ preferentially adds $M_2$ instead. In other words, if a diluent is the terminal unit of the propagating species, the probability of incorporating either a macromonomer or another diluent reflects the difference between the homopolymerization rate constants: when $k_{22}$<$k_{11}$, $r_2$<1 and $M_2^*$ favors macromonomer addition; on the other hand, when $k_{22}$>$k_{11}$, $r_2$>1 and $M_2^*$ favors diluent addition.[77] Translating these trends to the copolymer sequence also requires examination of $r_1$, which reflects consumption of the other propagating species $M_1^*$. FIG. 29C shows that, as $k_{22}$ increases, $r_1$ generally decreases, opposite the trend observed for $r_2$. These observations suggest that both $M_1^*$ and $M_2^*$ (1) favor incorporating $M_2$ when $k_{22} \gtrsim k_{11}$ and (2) favor incorporating $M_1$ when $k_{22}$<$k_{11}$. In other words, both cross-propagation terms ($k_{12}$ and $k_{21}$) are functions of the incoming olefin (to first order) and appear relatively insensitive to the nature of the pendant chain.

We note that, while $r_1$ generally decreases with increasing $k_{22}$, the trend is not monotonic. These results highlight the additional complexity that copolymerization introduces. While informative, the difference between the homopolymerization rate constants ($k_{11}$-$k_{22}$) is not a universal predictor for the values of $r_1$ and $r_2$ (nor therefore the copolymer sequence). For example, when PLA is copolymerized with a xx-DE diluent, $r_2$ varies but $r_1$ remains the same (=0.36±0.02), regardless of whether $k_{22}$<$k_{11}$ (3d, 3c, and 3b) or $k_{22}$>$k_{11}$ (3a). Meanwhile, when PLA is copolymerized with the dx-DE analogue of 3a (i.e., 1a), the self-propagation rates are equal ($k_{22}$=$k_{11}$) and both $r_1$ and $r_2$ are approximately equal to 1. These observations suggest that the key interactions identified in this example of diluent homopolymerization rate trends do not fully capture the relative reactivity upon copolymerization. The individual second-order rate constants ($k_{11}$, $k_{12}$, $k_{21}$, $k_{22}$) are affected by both (1) pyridine binding ($K_{eq,2}$) and (2) chelation and olefin binding ($k_3$). Both those terms are dictated by the identities of the approaching olefin monomer and the propagating alkylidene. We note that the large disparity between the molecular weights of the PLA macromonomer and diluents (10- to 20-fold) may play a significant role in the departure from simple chain-end control. Under the copolymerization conditions (rapid stirring in dilute solution), simple diffusion of free monomers to the catalyst active site may not be expected to limit propagation. However, beyond the anchor group and substituent effects outlined for discrete diluents, the presence of polymeric side chains in proximity to the metal center should amplify steric congestion. Excluded volume interactions and solvent quality may further affect the steric and electronic environment around the propagating metal center.

Graft Polymer Architecture. Monitoring the copolymerization kinetics enables determination of the instantaneous composition and therefore the graft polymer architecture. Using the experimentally determined rate constants, the probability of incorporating either a diluent or a macromonomer at any point in the growing chain can be simulated.[38] FIGS. 30A-30C plot these probabilities as a function of the total conversion for several PLA/diluent pairs. If $r_1$>$r_2$, gradient sequences are obtained. The copolymers are rich in $M_1$ at early conversions and rich in $M_2$ at later conversions, producing tapered side chain distributions (e.g., PLA+4a, FIG. 30A). If $r_1 r_2$ 1, the copolymer backbone sequence is approximately random and therefore the side chains are uniformly distributed (e.g. PLA+1a, FIG. 30B). Lastly, if $r_1 < r_2$, the inverse-tapered graft polymers are obtained, which are rich in $M_2$ at early conversions and rich in $M_1$ at later conversions (e.g., PLA+5a, FIG. 30C).

Figure 31:
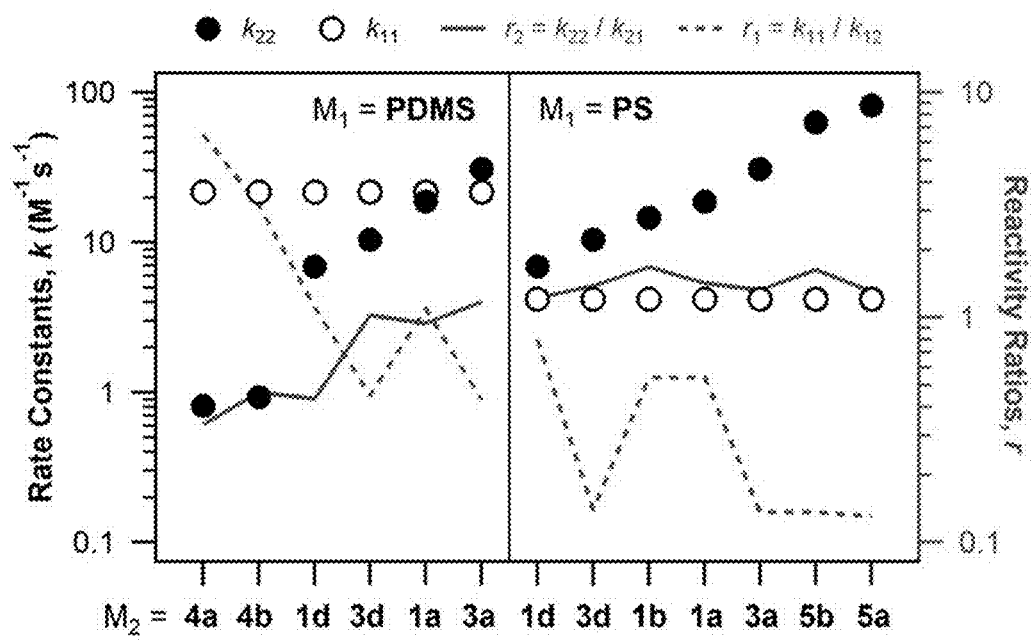
FIG. 31. Data for the copolymerization of $M_1$=PDMS (left) or PS (right) with different diluents. Left axis, black: self-propagation rate constants ($k_{22}$: filled circles, $k_{11}$: open circles). Right axis, red: reactivity ratios ($r_2$: solid line, $r_1$: dotted line).

The copolymerization methods outlined herein provide a general approach to architecture design for any side chain chemistry. In principle, given any polymerizable macromonomer, a diluent may be designed to access any desired sequence. Although the magnitudes of $r_1$ and $r_2$ are presently determined de novo, insights into the relationships among $r_1$, $r_2$, and diluent structure should guide the selection of appropriate macromonomer/diluent pairs. In order to further illustrate these design principles, the copolymerization kinetics of various diluents with either a PDMS ($M_n$=1280 g mol$^{-1}$) or PS ($M_n$=3990 g mol$^{-1}$) macromonomer are also studied here. PDMS and PS polymerize faster ($k_{11}$=21.6 M$^{-1}$ s$^{-1}$) and slower ($k_{11}$=4.18 M$^{-1}$ s$^{-1}$) than PLA, respectively. The selected diluents all homopolymerize slower than PDMS ($k_{22} < k_{11}$, with the exception of 3a) and faster than PS ($k_{22} > k_{11}$). The self-propagation rate constants and reactivity ratios are provided in FIG. 31. All values are compiled in Tables 7-8, and SEC data are provided in FIGS. 54-55 and Tables 9-10.

Copolymerizations of PDMS with each of the selected diluents generally follow the same trends outlined for PLA/diluent copolymerizations. As $k_{22}$ increases while $k_{11}$ remains constant, $r_2$ increases and $r_1$ decreases. In other words, as $k_{22}$ increases, both $M_1^*$ and $M_2^*$ increasingly favor incorporating $M_2$ instead of $M_1$. The xx-DE diluents (3a, 3d) are again outliers, leading to smaller values of $r_1$ than diluents with any other anchor group. As a result, at least for copolymerizations with PDMS or PLA macromonomers, the xx-DE anchor group favors gradient sequences that are $M_2$-rich at early conversions and $M_1$-rich at later conversions. Copolymerizations of PS with any of the selected diluents reveal a similar kinetic preference for gradient sequences. Unlike copolymerizations with either PLA or PDMS, regardless of the relative magnitude of $k_{22}$ (2.7 < $k_{22}$-$k_{11}$ < 78 M$^{-1}$ s$^{-1}$), $r_2$ remains constant ($\approx$1). The constant magnitude of $r_2$ suggests that $M_2^*$ displays similar reactivity toward PS and any diluent. Meanwhile, since $M_1^*$ favors incorporating $M_2$ ($r_1$<1), gradient sequences result.

Figure 32:
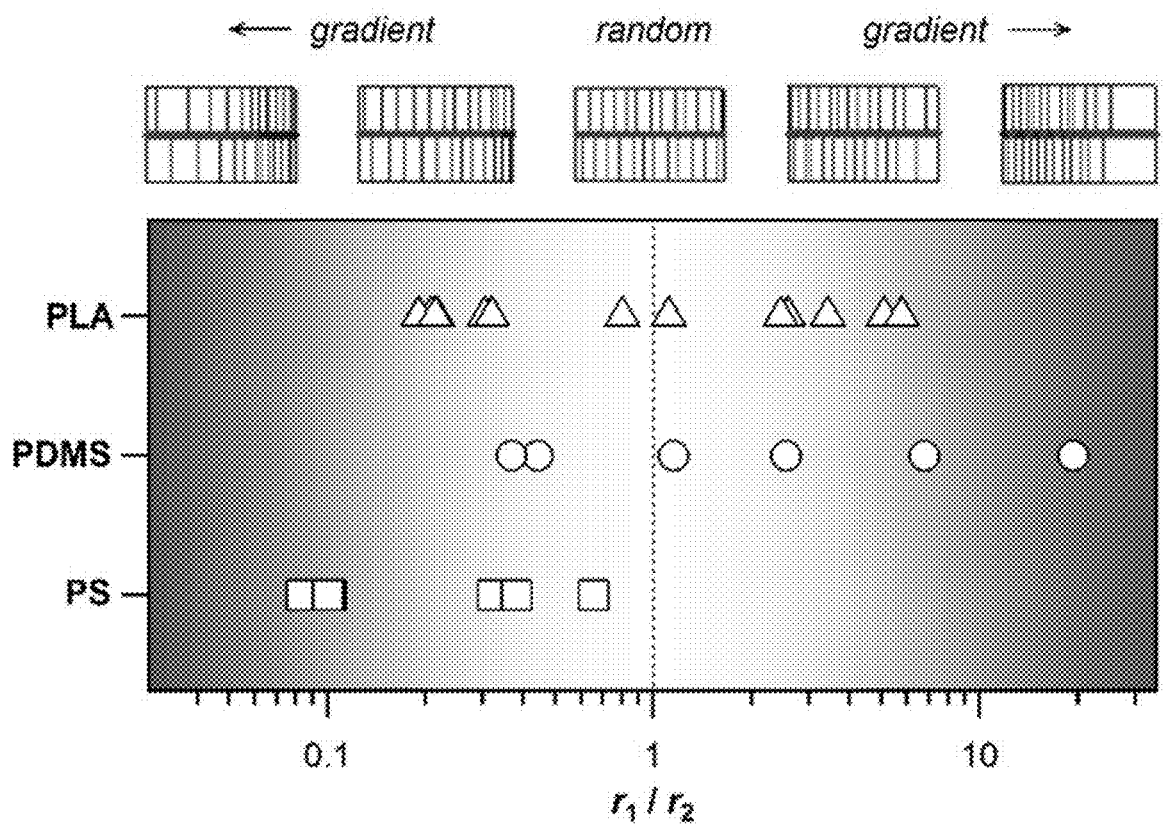
FIG. 32. Reactivity ratio map. The copolymerization kinetics studied for PLA, PDMS, and PS are interpreted in terms of the quotient $r_1/r_2$, plotted on the x-axis. For ease of visualization, the simulated structures show fully extended side chains and backbones.

The copolymerization kinetics for PLA, PDMS, and PS collectively illustrate how different diluents can be used to control the graft polymer architecture. The magnitudes of $r_1$ and $r_2$ determine the backbone sequence, which can be alternating ($r_1 \approx r_2 \approx 0$), blocky ($r_1, r_2 \gg 1$), gradient ($r_1 \gg r_2$ or $r_1 \ll r_2$), or random ($r_1 \approx r_2 \approx 1$).[76] The backbone sequence in turn directly determines the side chain distribution (FIG. 22A-22B). FIG. 32 illustrates the wide range of distributions obtained by copolymerizing PLA, PDMS, or PS with selected diluents. The relative reactivities of the macromonomers and diluents are interpreted in terms of the quotient $r_1/r_2$, which reflects the kinetic preference for the chain end (either $M_1^*$ or $M_2^*$) to incorporate $M_1$ over $M_2$.

PLA/diluent copolymerizations obtain $r_1/r_2$ ranging from 0.20 (PLA+5a) to 5.8 (PLA+4a). Copolymerizing PDMS with 4a, one of the slowest-polymerizing diluents studied herein, produces a remarkably large difference between $r_1$ and $r_2$: $r_1/r_2$=19. This large disparity in reactivity results in a highly gradient—or blocky—distribution of side chains. Since $r_1 \gg r_2$, the graft polymers are densely grafted (i.e., rich in $M_1$) at early conversions and loosely grafted (i.e., rich in $M_2$) at later conversions. Copolymerizing PS with 5b, one of the fastest-polymerizing diluents introduced in this report, also affords a wide gap in reactivity: $r_1/r_2$=0.084. Compared to PDMS+4a, the inverse-tapered sequence is obtained. The ability to invert the gradient direction might not affect the properties of homopolymers, but it is valuable in the design of block polymers and other multicomponent materials. In the final section of this example, we demonstrate the physical consequences of varying the sequence distribution in the context of block polymer self-assembly.

Physical Consequences. Grafting density and graft distribution are important parameters that govern polymer architectures and physical properties. Grafting-through ring-opening metathesis copolymerization has recently been exploited to study how grafting density affects the scaling of the block polymer lamellar period.[78] In the final section of this example, we further demonstrate the utility of the ROMP method by describing the synthesis of AB diblock polymers with variable side chain distributions, then examine how differences in chain connectivity affect self-assembly.

Three different AB graft diblock polymers are synthesized by controlled ROMP. Simple substitutions of the discrete co-monomers ensure that the block polymers differ only in the distribution of the grafts for this series of experiments. All other aspects of the structure and chemistry are identical:

All block polymers of this particular series feature PDMS and PS side chains. The grafting-through approach guarantees that the side chain molecular weights are the same within each block (PDMS: 1280 g mol$^{-1}$, PS: 3990 g mol$^{-1}$).

The grafting density in each block is 50% for this particular series.

The backbone degree of polymerization in each block is the same. For the A block (PDMS+diluent), $N_{bb,A}$=150; for the B block (PS+diluent), $N_{bb,B}$=50.

The above constraints enforce equal block volume fractions for all three block polymers: f=0.50.

Figure 33A:
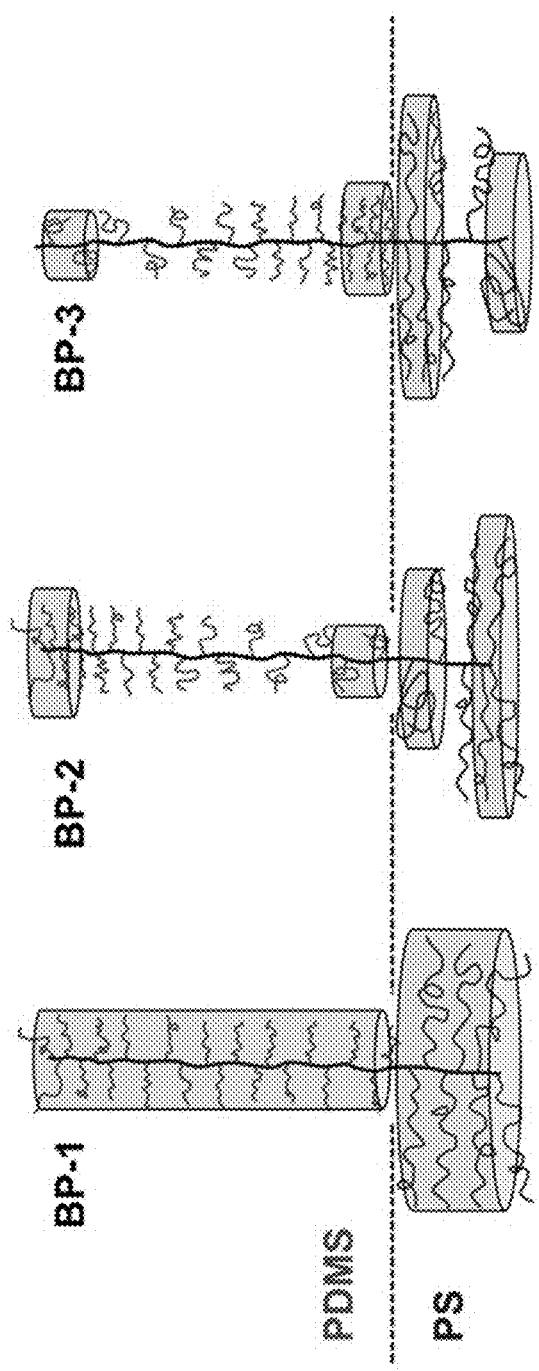
FIG. 33A. Illustrations of three AB graft diblock polymers, differing in the side chain distribution: uniform (BP-1), gradient (BP-2), and inverse-gradient (BP-3). The horizontal dotted line indicates the junction between blocks.

The side chain distributions can be varied while fixing all of the preceding parameters by switching the identity of the diluents in each block. FIG. 33A illustrates the resulting architectures with uniform (BP-1) or gradient (BP-2, BP-3) graft distributions. The backbones are drawn in the fully extended limit for ease of visualization, and the side chain conformations and cross-sectional radii are depicted as anticipated by existing theory.[5,44-46]

BP-1 is synthesized by first copolymerizing PDMS and endo,exo-norbornenyl dimethylester (dx-DMeE, 1a) in a 1:1 feed ratio. Since $r_1$=1.1 and $r_2$=0.94, the first block has an ideal random backbone sequence and therefore uniform side chain distribution. After complete consumption of PDMS and dx-DMeE, the chain ends are still living, and the second block (B) is added via a 1:1 mixture of PS and endo,exo-norbornenyl di-n-butylester (dx-D"BuE, 1d). Since $r_1$=0.80 and $r_2$=1.2, the side chain distribution in the second block is also effectively uniform. A graft polymer with a gradient side chain distribution (BP-2) is synthesized by keeping all conditions exactly the same but simply switching the diluents. The first block (A) is synthesized by copolymerizing PDMS with dx-D"BuE instead of dx-DMeE; since $r_1$=1.1 and $r_2$=0.43, the block is rich in the macromonomer at early conversions and rich in the diluent at late conversions. Addition of PS+dx-DMeE as the second block (B; $r_1$=0.54, $r_2$=1.4) therefore produces a block polymer with low grafting density at the block-block junction and increasing grafting density moving toward the free chain ends. A third distinct graft block polymer (BP-3) is synthesized by keeping all conditions exactly the same as those for BP-2 but simply switching the order in which the blocks are added. By polymerizing block B (PS+dx-DMeE) first and block A (PDMS+dx-D"BuE) second, the product features the inverse-tapered architecture compared to BP-2. FIG. 56 provides the chemical structures of BP-1, -2, and -3. Analysis by SEC (FIG. 57) and $^1$H NMR (FIG. 58) confirms that their overall molecular weights and chemical compositions are identical.

Figure 33B:
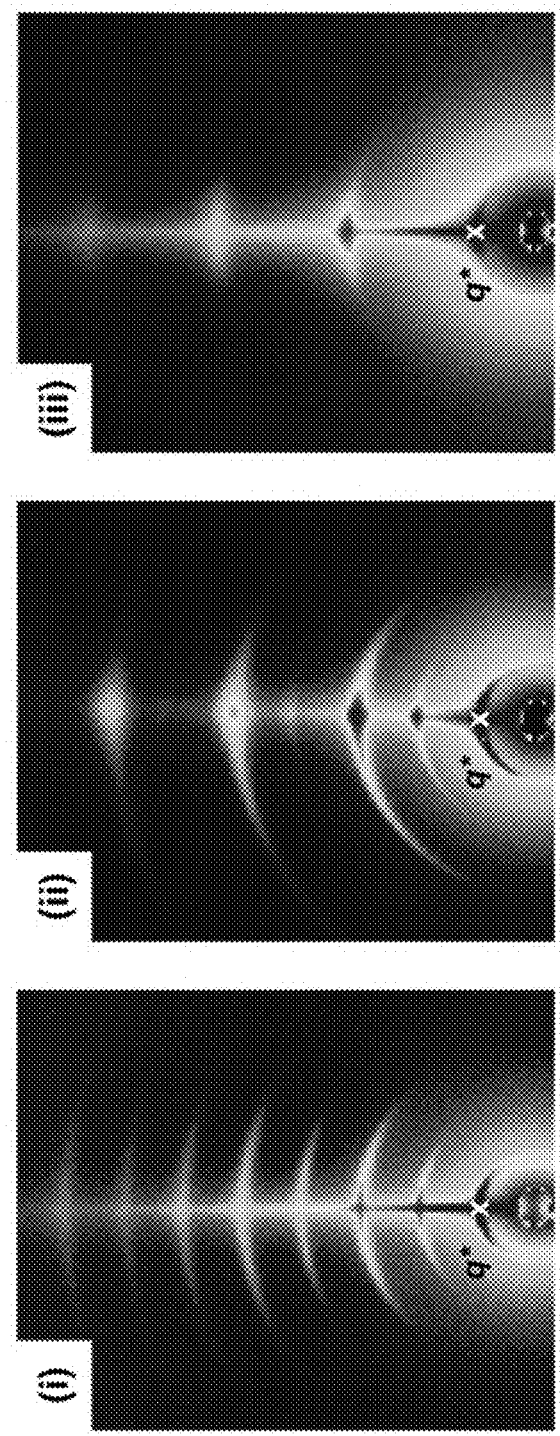
FIG. 33B. SAXS patterns corresponding to the annealed block polymers: (i) BP-1, (ii) BP-2, (iii) BP-3. The white "x" indicates the first-order diffraction peak, q*.
Figure 35:
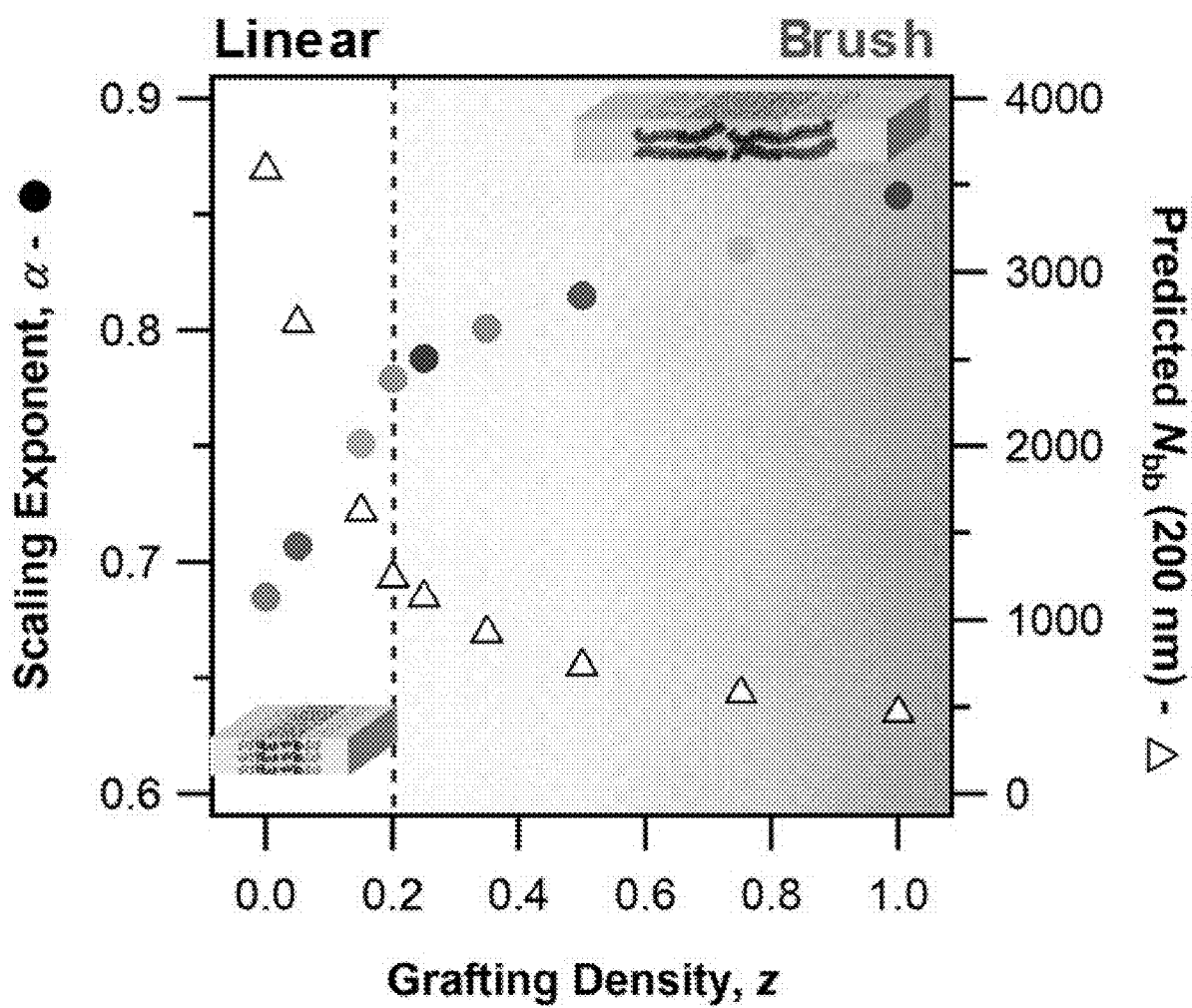
FIG. 35. A plots of scaling exponent ($\alpha$) vs. graft density (z) and of predicted total backbone degree of polymerization (Nbb) vs. graft density (z) for exemplary copolymers, or polymer structures therewith, of the present invention.

These three graft block polymers are annealed for 24 hours at 140° C. under vacuum and modest applied pressure. The resulting microphase-separated structures are characterized by synchrotron-source small-angle X-ray scattering (SAXS). Comparison of the SAXS patterns (FIG. 33B) indicates that all three samples form long-range-ordered lamellar morphologies but also reveals two differences. First, the lamellar periods (d*=2π/q*) differ. Equal values of d* are perhaps expected since the chemical compositions and backbone and side chain lengths are all identical; on the contrary, BP-1 exhibits d*=51.0 nm (FIG. 33B.i), while BP-2 (FIG. 33B.ii) and BP-3 (FIG. 33B.iii) exhibit d*=49.5 and 46.5 nm, respectively. Second, the relative thicknesses of the A and B domains ($d_A$ and $d_B$) also differ. Compared to BP-1, BP-2 forms more symmetric lamellae, as evidenced by the weak intensities of the even-order diffraction peaks ($q_2$, $q_4$, ... ). The inverse-gradient BP-3 forms lamellae that are the most symmetric of all; in fact, the complete extinction of even-order peaks suggests that $d_A$ and $d_B$ are equal. This symmetry is perhaps surprising: although the block volume fractions are equal (f=0.50), the backbone lengths are highly asymmetric: $N_{bb,A}$=3$N_{bb,B}$. The graft polymer backbones are clearly not fully extended as illustrated in FIG. 33A. If the backbone is fully extended, $d_A$=3$d_B$ is contemplated for all samples (FIG. 34A). Every fourth diffraction peak ($q_4$, $q_8$, ... ) would be weak, which is inconsistent with the SAXS data. Instead, the SAXS data indicates that the backbones are flexible and that changing the side chain distribution affects the backbone conformation. Gradient distributions in which the grafting density is either lowest (BP-2) or highest (BP-3) at the block-block junction enable more efficient packing than uniform distributions (BP-1). Closer packing balances the backbone asymmetry with the demands of equal block volumes, most likely via bending of the A (PDMS) block backbone (FIG. 34B).

For all samples, the backbones should be strongly stretched at the domain interface as a consequence of segregation. In the case of BP-2, the chains should have the highest local backbone stiffness but also the greatest free volume at the free chain ends. Compared to the uniformly grafted BP-1, this may better accommodate high grafting density in the center of the domains. In the case of BP-3, since the backbones are already strongly stretched at the domain interfaces, the high grafting density might not significantly stretch the backbones further, resulting in the smallest d* among all three graft polymers. Low grafting density at the free chain ends should result in comparatively low backbone stiffness and therefore better accommodate bending in the A block (FIG. 34C). Collectively, these results indicate that the side chain distribution affects chain stretching and packing. This result indicates that molecular "shape" is indeed an important design parameter, allowing materials to possess non-equilibrium density distributions.

Conclusion: Grafting-through methods of the present invention provide a versatile strategy for the design and synthesis of polymers with tailored side chain distributions. Controlled copolymerization of an ω-norbornenyl macromonomer and a discrete norbornenyl diluent constructs graft architectures through the backbone; as a result, the backbone sequence directly dictates the side chain distribution. Since tuning the backbone sequence requires changing the relative reactivity of the co-monomers, we show steric and electronic effects on the homopolymerization kinetics of 23 diluents. Varying the stereochemistry, anchor groups, and substituents varies the homopolymerization rate constants over two orders of magnitude (0.36 M$^{-1}$ s$^{-1}$≤$k_{homo}$≤82 M$^{-1}$ s$^{-1}$), reflecting a wide scope of monomer reactivity. These small-molecule monomers can be readily prepared and diversified, providing a convenient library for future development. In order to provide further guidance, we identify rate trends and studied their origins through complementary mechanistic studies. Density functional theory (DFT) calculations suggest that formation of a Ru—O six-membered chelate (which sequesters the catalyst in an unproductive form) is significantly different for endo and exo isomers. Other factors that may affect the ROMP kinetics, including for example solvent quality and additives.

Building on these results, we studied the copolymerization kinetics of selected diluents and a poly($_{D,L}$-lactide) (PLA), polydimethylsiloxane (PDMS), or polystyrene (PS) macromonomer. The co-monomer concentrations are monitored by $^1$H NMR, and the cross-propagation rate constants are calculated by non-linear least squares regression based on the Mayo-Lewis terminal model. Trends involving the measured self-propagation rate constants and the calculated reactivity ratios ($r_1$ and $r_2$) are identified. In general, for the 26 co-monomer pairs studied, the greater the difference between homopolymerization rates, the greater the gradient tendency ($r_1/r_2$>>1 or $r_1/r_2$<<1). The backbone sequence—and therefore the polymer architecture—can be tailored simply by choosing the appropriate diluent among the library introduced herein or by designing an appropriate monomer. We note that, at present, de novo prediction of the reactivity ratios from the macromonomer and diluent chemical structures is not possible. However, we anticipate that the versatility of this design strategy, coupled with the broad functional group tolerance of ROMP and its living character, should enable the design and synthesis of graft polymers with almost any desired graft chemistry and graft distribution.

We further demonstrate the ease and versatility of this approach by synthesizing three AB graft diblock polymers that differ in the distribution of side chains along the backbone. Analysis of the annealed, microphase-separated structures by small-angle X-ray scattering (SAXS) indicates that the graft block polymers all formed long-range-ordered lamellar structures. Differences in the lamellar periods and domain thicknesses reflect changes in the chain conformations. These results demonstrate the physical consequences of varying the side chain distribution. Ultimately, the design strategy outlined herein provides extensive customizability in terms of polymer structure and functionality, illuminating new opportunities for molecular and materials design.

REFERENCES CORRESPONDING TO EXAMPLE 2A (1) Hadjichristidis, N.; Pitsikalis, M.; Pispas, S.; Iatrou, H. Chem. Rev. 2001, 101, 3747-3792.
(2) Polymeropoulos, G.; Zapsas, G.; Ntetsikas, K.; Bilalis, P.; Gnanou, Y.; Hadjichristidis, N. Macromolecules 2017, 50, 1253-1290.
(3) Bates, C. M.; Bates, F. S. Macromolecules 2016, 50, 3-22.
(4) Matyjaszewski, K.; Tsarevsky, N. V. Nature Chem. 2009, 1, 276-288.

(5) Kikuchi, M.; Nakano, R.; Jinbo, Y.; Saito, Y.; Ohno, S.; Togashi, D.; Enomoto, K.; Narumi, A.; Haba, O.; Kawaguchi, S. Macromolecules 2015, 48, 5878-5886.

(6) Liang, H.; Cao, Z.; Wang, Z.; Sheiko, S. S.; Dobrynin, A. V. Macromolecules 2017, 50, 3430-3437.

(7) Paturej, J.; Sheiko, S. S.; Panyukov, S.; Rubinstein, M. Sci. Adv. 2016, 2, e1601478.

(8) Rathgeber, S.; Pakula, T.; Wilk, A.; Matyjaszewski, K.; Beers, K. L. J. Chem. Phys. 2005, 122, 124904.

(9) Abbasi, M.; Faust, L.; Riazi, K.; Wilhelm, M. Macromolecules 2017, 50, 5964-5977.

(10) Dalsin, S. J.; Hillmyer, M. A.; Bates, F. S. Macromolecules 2015, 48, 4680-4691.

(11) Hu, M.; Xia, Y.; McKenna, G. B.; Kornfield, J. A.; Grubbs, R. H. Macromolecules 2011, 44, 6935-6943.

(12) Daniel, W. F. M.; Burdynska, J.; Vatankhah-Varnoosfaderani, M.; Matyjaszewski, K.; Paturej, J.; Rubinstein, M.; Dobrynin, A. V.; Sheiko, S. S. Nat. Mater. 2016, 15, 183-189.

(13) Mai, D. J.; Marciel, A. B.; Sing, C. E.; Schroeder, C. M. ACS Macro Lett. 2015, 4, 446-452.

(14) Kapnistos, M.; Kirkwood, K. M.; Ramirez, J.; Vlassopoulos, D.; Leal, L. G. J. Rheol. 2009, 53, 1133-1153.

(15) Read, D. J.; Auhl, D.; Das, C.; den Doelder, J.; Kapnistos, M.; Vittorias, I.; McLeish, T. C. B. Science 2011, 333, 1871-1874.

(16) Jeong, S. H.; Kim, J. M.; Baig, C. Macromolecules 2017, 50, 4491-4500.

(17) Liberman-Martin, A. L.; Chu, C. K.; Grubbs, R. H. Macromol. Rapid Commun. 2017, 38, 1700058.

(18) Runge, M. B.; Bowden, N. B. J. Am. Chem. Soc. 2007, 129, 10551-10560.

(19) Sveinbjörnsson, B. R.; Weitekamp, R. A.; Miyake, G. M.; Xia, Y.; Atwater, H. A.; Grubbs, R. H. Proc. Natl. Acad. Sci. U.S.A. 2012, 109, 14332-14336.

(20) Qiu, L. Y.; Bae, Y. H. Biomaterials 2007, 28, 4132-4142.

(21) Johnson, J. A.; Lu, Y. Y.; Burts, A. O.; Lim, Y.-H.; Finn, M. G.; Koberstein, J. T.; Turro, N. J.; Tirrell, D. A.; Grubbs, R. H. J. Am. Chem. Soc. 2011, 133, 559-566.

(22) Bhattarai, N.; Ramay, H. R.; Gunn, J.; Matsen, F. A.; Zhang, M. J. Control. Release 2005, 103, 609-624.

(23) Bates, C. M.; Chang, A. B.; Momčilović, N.; Jones, S. C.; Grubbs, R. H. Macromolecules 2015, 48, 4967-4973.

(24) Bates, C. M.; Chang, A. B.; Schulze, M. W.; Momčilović, N.; Jones, S. C.; Grubbs, R. H. J. Polym. Sci., Part B: Polym. Phys. 2016, 54, 292-300.

(25) Jiang, F.; Wang, Z.; Qiao, Y.; Wang, Z.; Tang, C. Macromolecules 2013, 46, 4772-4780.

(26) Zhang, J.; Schneiderman, D. K.; Li, T.; Hillmyer, M. A.; Bates, F. S. Macromolecules 2016, 49, 9108-9118.

(27) Ma, H.; Wang, Q.; Sang, W.; Han, L.; Liu, P.; Chen, J.; Li, Y.; Wang, Y. Macromol. Rapid Commun. 2015, 36, 726-732.

(28) Prudnikova, K.; Yucha, R. W.; Patel, P.; Kriete, A. S.; Han, L.; Penn, L. S.; Marcolongo, M. S. Biomacromolecules 2017, 18, 1713-1723.

(29) Noel, A.; Borguet, Y. P.; Wooley, K. L. ACS Macro Lett. 2015, 4, 645-650.

(30) Wang, Q.; Ma, H.; Sang, W.; Han, L.; Liu, P.; Shen, H.; Huang, W.; Gong, X.; Yang, L.; Wang, Y.; Li, Y. Polym. Chem. 2016, 7, 3090-3099.

(31) Grubbs, R. B.; Hawker, C. J.; Dao, J.; Fréchet, J. M. J. Angew. Chem., Int. Ed. 1997, 36, 270-272.

(32) Shinoda, H.; Matyjaszewski, K. Macromolecules 2001, 34, 6243-6248.

(33) Börner, H. G.; Duran, D.; Matyjaszewski, K.; da Silva, M.; Sheiko, S. S. Macromolecules 2002, 35, 3387-3394.

(34) Lee, H.-i.; Matyjaszewski, K.; Yu, S.; Sheiko, S. S. Macromolecules 2005, 38, 8264-8271.

(35) Sutthasupa, S.; Shiotsuki, M.; Sanda, F. Polym. J. 2010, 42, 905-915.

(36) Bielawski, C. W.; Grubbs, R. H. Prog. Polym. Sci. 2007, 32, 1-29.

(37) Leitgeb, A.; Wappel, J.; Slugovc, C. Polymer 2010, 51, 2927-2946.

(38) Lin, T.-P.; Chang, A. B.; Chen, H.-Y.; Liberman-Martin, A. L.; Bates, C. M.; Voegtle, M. J.; Bauer, C. A.; Grubbs, R. H. J. Am. Chem. Soc. 2017, 139, 3896-3903.

(39) Zhang, B.; Gröhn, F.; Pedersen, J. S.; Fischer, K.; Schmidt, M. Macromolecules 2006, 39, 8440-8450.

(40) Sheiko, S. S.; Sumerlin, B. S.; Matyjaszewski, K. Prog. Polym. Sci. 2008, 33, 759-785.

(41) Zhang, M.; Müller, A. H. E. J. Polym. Sci., Part A: Polym. Chem. 2005, 43, 3461-3481.

(42) Lee, H.-i.; Pietrasik, J.; Sheiko, S. S.; Matyjaszewski, K. Prog. Polym. Sci. 2010, 35, 24-44.

(43) Peng, S.; Bhushan, B. RSC Advances 2012, 2, 8557-8578.

(44) Pesek, S. L.; Li, X.; Hammouda, B.; Hong, K.; Verduzco, R. Macromolecules 2013, 46, 6998-7005.

(45) Pesek, S. L.; Xiang, Q.; Hammouda, B.; Verduzco, R. J. Polym. Sci., Part B: Polym. Phys. 2017, 55, 104-111.

(46) Gerle, M.; Fischer, K.; Roos, S.; Müller, A. H. E.; Schmidt, M.; Sheiko, S. S.; Prokhorova, S.; Möller, M. Macromolecules 1999, 32, 2629-2637.

(47) Dettmer, C. M.; Gray, M. K.; Torkelson, J. M.; Nguyen, S. T. Macromolecules 2004, 37, 5504-5512.

(48) Matyjaszewski, K.; Ziegler, M. J.; Arehart, S. V.; Greszta, D.; Pakula, T. J. Phys. Org. Chem. 2000, 13, 775-786.

(49) Sun, X.; Luo, Y.; Wang, R.; Li, B. G.; Zhu, S. AIChE J. 2008, 54, 1073-1087.

(50) Wang, R.; Luo, Y.; Li, B.-G.; Zhu, S. AIChE J. 2007, 53, 174-186.

(51) Radzinski, S. C.; Foster, J. C.; Scannelli, S. J.; Weaver, J. R.; Arrington, K. J.; Matson, J. B. ACS Macro Lett. 2017, 6, 1175-1179.

(52) Grubbs, R. H.; Khosravi, E.: Handbook of Metathesis: Polymer Synthesis; Wiley, 2015.

(53) Moatsou, D.; Hansell, C. F.; O'Reilly, R. K. Chem. Sci. 2014, 5, 2246-2250.

(54) Slugovc, C.; Demel, S.; Riegler, S.; Hobisch, J.; Stelzer, F. Macromol. Rapid Commun. 2004, 25, 475-480.

(55) Radzinski, S. C.; Foster, J. C.; Chapleski, R. C.; Troya, D.; Matson, J. B. J. Am. Chem. Soc. 2016, 138, 6998-7004.

(56) Rosso, V. W.; Lust, D. A.; Bernot, P. J.; Grosso, J. A.; Modi, S. P.; Rusowicz, A.; Sedergran, T. C.; Simpson, J. H.; Srivastava, S. K.; Humora, M. J.; Anderson, N. G. Org. Process Res. Dev. 1997, 1, 311-314.

(57) Xia, Y.; Kornfield, J. A.; Grubbs, R. H. Macromolecules 2009, 42, 3761-3766.

(58) Miyake, G. M.; Weitekamp, R. A.; Piunova, V. A.; Grubbs, R. H. J. Am. Chem. Soc. 2012, 134, 14249-14254.

(59) Radzinski, S. C.; Foster, J. C.; Matson, J. B. Polym. Chem. 2015, 6, 5643-5652.

(60) Wolfe, P. S.; Wagener, K. B. Macromolecules 1999, 32, 7961-7967.

(61) Rule, J. D.; Moore, J. S. Macromolecules 2002, 35, 7878-7882.

(62) Pollino, J. M.; Stubbs, L. P.; Weck, M. Macromolecules 2003, 36, 2230-2234.
(63) Seehof, N.; Grutke, S.; Risse, W. Macromolecules 1993, 26, 695-700.
(64) Liu, P.; Taylor, B. L. H.; Garcia-Lopez, J.; Houk, K. N.: Computational Studies of Ruthenium-Catalyzed Olefin Metathesis. In Handbook of Metathesis; Wiley-VCH Verlag GmbH & Co. KGaA, 2015; pp 199-252.
(65) Sanford, M. S.; Love, J. A.; Grubbs, R. H. J. Am. Chem. Soc. 2001, 123, 6543-6554.
(66) Adlhart, C.; Chen, P. J. Am. Chem. Soc. 2004, 126, 3496-3510.
(67) Vyboishchikov, S. F.; Bühl, M.; Thiel, W. Chem. Eur. J. 2002, 8, 3962-3975.
(68) Walsh, D. J.; Lau, S. H.; Hyatt, M. G.; Guironnet, D. J. Am. Chem. Soc. 2017, 139, 13644-13647.
(69) See Example 2B for the full derivation. We could not exclude the possibility that cycloaddition is the rate-limiting step, which would result in a more complicated rate expression.
(70) Further discussion of the ROMP mechanism can be found in the Example 2B. We note that, at present, we do conclusively rule out the stepwise or concerted associative/dissociative pathway.
(71) Fürstner, A.; Thiel, O. R.; Lehmann, C. W. Organometallics 2002, 21, 331-335.
(72) Benitez, D.; Tkatchouk, E.; Goddard, W. A. Organometallics 2009, 28, 2643-2645.
(73) In-depth DFT investigation of the ROMP mechanism, including calculation of transition-state structures and identification of the rate-limiting step, is contemplated.
(74) Mayo, F. R.; Lewis, F. M. J. Am. Chem. Soc. 1944, 66, 1594-1601.
(75) In order to account for pyridine binding, it is useful to use the same $[G3]_0$ concentration in both homo- and copolymerization reactions. Further details can be found in this example and Example 2B.
(76) Odian, G.: Principles of Polymerization; 4th ed.; Wiley-Interscience: Hoboken, N.J., 2004.
(77) Meijs, G. F.; Rizzardo, E. J. Macromol. Sci., Polym. Rev. 1990, 30, 305-377.
(78) Lin, T.-P.; Chang, A. B.; Luo, S.-X.; Chen, H.-Y.; Lee, B.; Grubbs, R. H. ACS Nano 2017, Article ASAP, DOI: 10.1021/acsnano.7b06664.

Example 2B: Design, Synthesis, and Self-Assembly of Polymers with Tailored Graft Distributions Materials and Methods:

General. Norbornene macromonomers PLA,[1] PDMS,[2] and PS[3] were prepared according to reported procedures. Norbornene diluents were prepared according to reported procedures, summarized in Schemes 1-6. The second-generation ruthenium metathesis catalyst [(H$_2$IMes)(PCy$_3$)(Cl)$_2$Ru=CHPh] was generously provided by Materia, and G3 was prepared according to the reported procedure.[4] CH$_2$Cl$_2$ was dried by passing through an activated alumina column. Deuterated solvents were purchased from Cambridge Isotopes Laboratories, Inc. and used as received.

NMR, SEC, and SAXS characterization. Ambient temperature NMR spectra were recorded on a Varian 400 MHz NMR spectrometer. Chemical shifts (δ) were given in ppm and referenced against residual solvent signals ($^1$H, $^{13}$C). SEC data were collected using two Agilent PLgel MIXED-B 300×7.5 mm columns with 10 μm beads, connected to an Agilent 1260 Series pump, a Wyatt 18-angle DAWN HELEOS light scattering detector, and Optilab rEX differential refractive index detector. Online determination of dn/dc assumed 100% mass elution under the peak of interest. The mobile phase was THF. SAXS data were collected at beamline 12-ID at Argonne National Laboratory's Advanced Photon Source. The samples were probed using 12 keV (1.033 Å) X-rays, and the sample-to-detector distance was calibrated from a silver behenate standard. The beam was collimated using two sets of slits and a pinhole was used to remove parasitic scattering. The beam width was approximately 200-300 μm horizontally and 50 μm vertically.

Standard procedure for the determination of homopolymerization rate constants. A 4 mL vial was charged with a flea stir bar and the norbornene monomer (0.025 mmol) in CH$_2$Cl$_2$ at 298 K. While stirring vigorously, the polymerization was initiated by adding a CH$_2$Cl$_2$ solution of G3 (0.0125 M, 20 μL, 0.25 μmol) to achieve initial conditions of $[norbornene]_0$ (0.05 M) and $[G3]_0$ (0.5 mM). Over the course of the reaction, aliquots (~20 μL) were extracted at different time points and immediately quenched in a separate vial containing a large excess of ethyl vinyl ether (~0.2 mL) and silica-bound metal scavenger (SiliaMetS, dimercaptotriazine (DMT)) in THF. The quenched reaction mixtures were subsequentially subjected to SEC and $^1$H NMR analysis, allowing the determination of $[norbornene]_t$. For each homopolymerization experiment, the self-propagation rate constant $k_{homo}$ was determined according to Eq. 1.

Standard procedure for the determination of copolymerization reactivity ratios. A 4 mL vial was charged with a flea stir bar and a CH$_2$Cl$_2$ solution of two norbornene monomers (M$_1$, M$_2$, each 0.025 mmol) at 298 K. While stirring vigorously, the copolymerization was initiated by adding a CH$_2$Cl$_2$ solution of G3 (0.0125 M, 20 μL, 0.25 μmol) to achieve initial conditions of $[M_1]_0$ (0.05 M), $[M_2]_0$ (0.05 M), and $[G3]_0$ (0.5 mM). Over the course of the reaction, aliquots (~20 μL) were extracted at different time points and immediately quenched in a separate vial containing a large excess of ethyl vinyl ether (~0.2 mL) and silica-bound metal scavenger (SiliaMetS, dimercaptotriazine (DMT)) in THF. The quenched reaction mixtures were subsequentially subjected to SEC and $^1$H NMR analysis, allowing the determination of $[M_1]_t$ and $[M_2]_t$. Values of $k_{12}$ and $k_{21}$ were obtained by fitting the experimentally determined kinetic data with the best numerical solutions using MATLAB non-linear least-square solver (lsqcurvefit) in conjunction with non-stiff differential equation solver (ode45).[2]

Density functional theory. All calculations were carried out using version 4.0 of the ORCA package.[5] For all complexes, the singlet potential energy surface was searched for minima in the gas phase using the BP86 exchange-correlation functional, along with the 6-31G(d) basis set on all main group elements and the LANL2DZ basis set and associated effective core potential for Ru. For each structure, frequency calculations were carried out at the same level of theory to ensure true minima (no imaginary frequencies). To account for solvation effects, single point calculations were carried out on the optimized geometries using the SMD implicit solvation model (CH$_2$Cl$_2$) with the M06 functional in combination with the def2-TZVP basis set on Ru with the SDD pseudopotential, the 6-311+G(d,p) basis set on all heteroatoms and carbons in the primary coordination sphere of Ru, and the 6-31G(d) basis set on all other C and H atoms. Free energies at 298.15 K were thus calculated as $G = H^{BP86} - T \times S^{BP86} + (E^{M06} - E^{BP86})$, where $H^{BP86}$, $S^{BP86}$, $E^{BP86}$ are the total enthalpy, entropy, and electronic energy calculated at the BP86 level, and $E^{M06}$ is the electronic energy calculated Scheme 1:

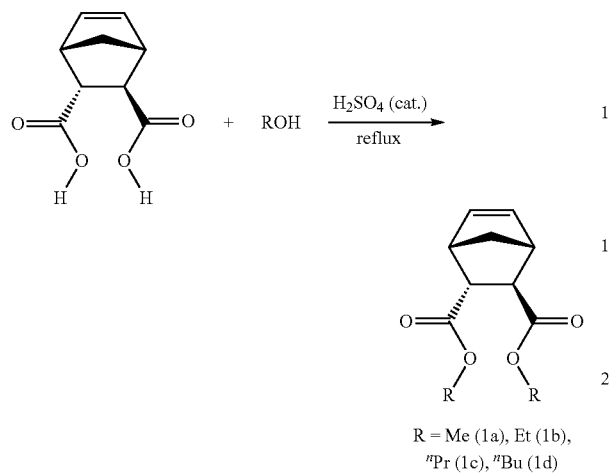

R = Me (1a), Et (1b),
$^n$Pr (1c), $^n$Bu (1d)

Scheme 1 (illustrated above). Synthesis of 1a-1d. Cis-5-norbornene-endo,exo-2,3-dicarboxylic acid (5 g, 27.5 mmol) was added to 50 mL of the corresponding anhydrous alcohol. To this mixture was added ~50 mg of conc. $H_2SO_4$. After stirring at 50° C. for 12 h, an excess of solid $KHCO_3$ was added to quench the reaction. The alcohol was removed under reduced pressure, and 30 mL $CH_2Cl_2$ was added. The organic solution was washed with brine (20 mL×3), dried with $MgSO_4$, and filtered to afford a colorless oil. The product was purified by either vacuum distillation or recrystallization from cold n-pentane.

Scheme 2:

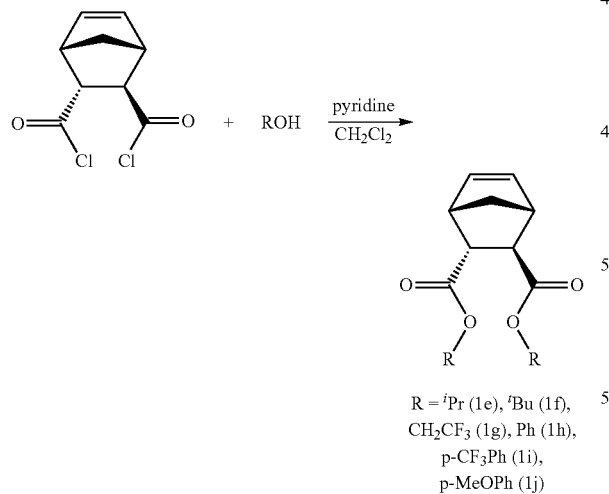

R = $^i$Pr (1e), $^t$Bu (1f),
$CH_2CF_3$ (1g), Ph (1h),
p-$CF_3$Ph (1i),
p-MeOPh (1j)

Scheme 2 (illustrated above). Synthesis of 1e-1j. Cis-5-norbornene-endo,exo-2,3-diacyl chloride (3 mL, 18.5 mmol) was dissolved in $CH_2Cl_2$ (25 mL) and pyridine (4.91 mL, 61.0 mmol). A $CH_2Cl_2$ solution (5 mL) of the corresponding anhydrous alcohol (42.5 mmol) was slowly added at −78° C. The mixture was allowed to slowly warm to room temperature over 1 hour and was allowed to stir for 12 h. The pyridinium salt was removed by filtration. The organic solution was washed with brine (20 mL×3), dried with $MgSO_4$, and filtered to afford a colorless oil. The product was purified by either vacuum distillation or recrystallization from cold n-pentane.

Scheme 3:

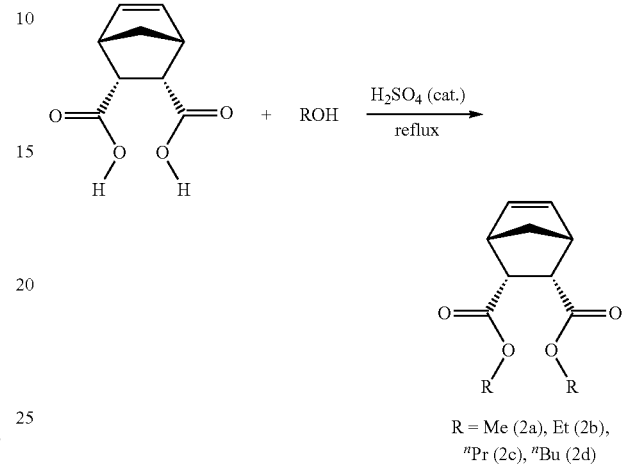

R = Me (2a), Et (2b),
$^n$Pr (2c), $^n$Bu (2d)

Scheme 3 (illustrated above). Synthesis of 2a-2d. A suspension of cis-5-norbornene-endo,endo-2,3-dicarboxylic acid (2.0 g, 11 mmol), 4 drops of concentrated sulfuric acid, and 20 mL of the corresponding anhydrous alcohol was stirred under air at 75° C. After 36 hours, the solution was cooled to room temperature and was concentrated under reduced pressure. The resulting oil was redissolved in 50 mL $CH_2Cl_2$ and washed with saturated aqueous $NaHCO_3$ (2×30 mL) and brine (1×30 mL). The organic solution was dried over $MgSO_4$, filtered, and concentrated in vacuo to afford an oil. The oil was filtered through a plug of basic alumina, precipitated from cold (−78° C.) hexanes, and dried in vacuo to obtain the product as a white crystalline solid (2a), pink oil (2b-2c) or colorless oil (2d).

Scheme 4:

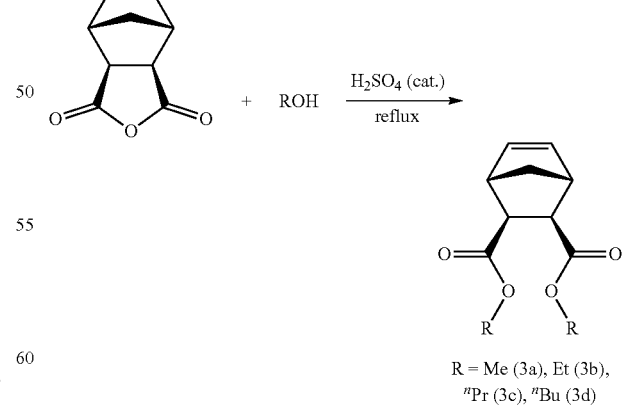

R = Me (3a), Et (3b),
$^n$Pr (3c), $^n$Bu (3d)

Scheme 4 (illustrated above). Synthesis of 3a-3d. A suspension of cis-5-norbornene-exo-2,3-dicarboxylic anhydride (2.00 g, 12.2 mmol), 4 drops of concentrated sulfuric acid, and 20 mL of the corresponding anhydrous alcohol was stirred under air at 75° C. After 20 hours, the colorless solution was cooled to room temperature and was concentrated under reduced pressure. The resulting pale yellow oil was redissolved in 50 mL $CH_2Cl_2$ and washed with saturated aqueous $NaHCO_3$ (2×30 mL) and brine (1×30 mL). The organic solution was dried over $MgSO_4$, filtered, and concentrated in vacuo to afford a colorless oil. Precipitation from cold (−78° C.) hexanes produced the product as a white crystalline solid (3a) or colorless oil (3b-3d) that was dried in vacuo.

Scheme 5:

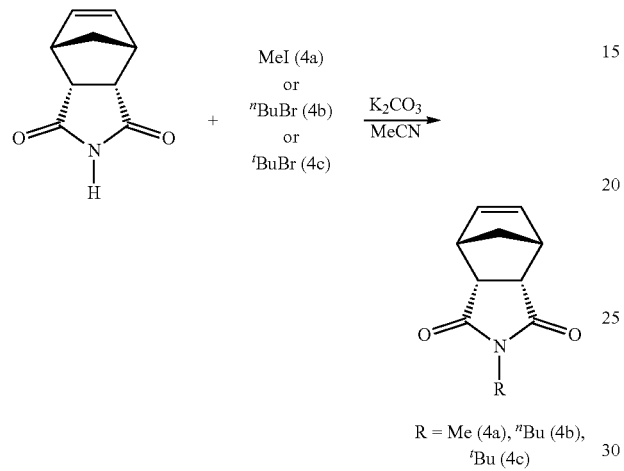

R = Me (4a), $^n$Bu (4b), $^t$Bu (4c)

Scheme 5 (illustrated above). Synthesis of 4a-4c. To a 10 mL MeCN solution of cis-5-norbornene-endo-2,3-diimide (1 g, 6.13 mmol) was added the corresponding alkyl halide (12.3 mmol) and $K_2CO_3$ (1.69 g, 12.3 mmol). The resulting mixture was allowed to stir at room temperature for 24 h (4a) or at 65° C. for 54 h (4b and 4c). The product was purified using column chromatography.

Scheme 6:

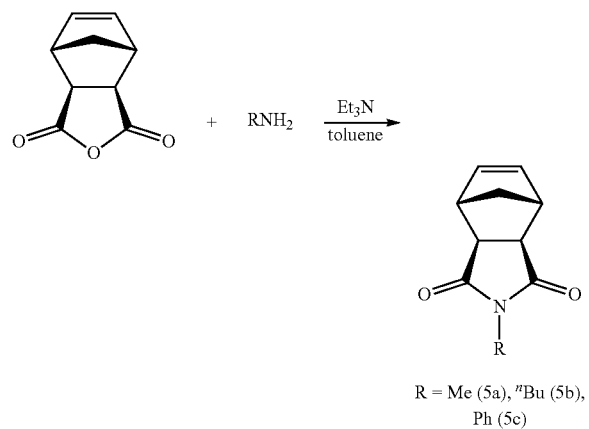

R = Me (5a), $^n$Bu (5b), Ph (5c)

Scheme 6 (illustrated above). Synthesis of 5a-5c. To a 20 mL toluene solution of cis-5-norbornene-exo-2,3-dicarboxylic anhydride (1 g, 6.09 mmol) was added the corresponding alkyl amine (6.70 mmol) and $Et_3N$ (0.85 mL, 0.609 mmol). The resulting mixture was allowed to stir at 110° C. for 15 h. The product was purified using column chromatography.

TABLE 4

Structures and homopolymerization rate constants ($k_{homo}$) for all monomers synthesized and studied in this report.

| Anchor Group | ID | R | $k_{homo}$ ($M^{-1}$ $s^{-1}$) |
|---|---|---|---|
| endo, exo-diester (dx-DE) | 1a | Me | 18.7 |
| | 1b | Et | 14.6 |
| | 1c | $^n$Pr | 10.4 |
| | 1d | $^n$Bu | 6.90 |
| | 1e | $^i$Pr | 6.14 |
| | 1f | $^t$Bu | 5.32 |
| | 1g | $CH_2CF_3$ | 10.5 |
| | 1h | Ph | 8.36 |
| | 1i | p-$CF_3$Ph | 5.14 |
| | 1j | p-MeOPh | 7.76 |
| endo, endo-diester (dd-DE) | 2a | Me | 2.24 |
| | 2b | Et | 0.934 |
| | 2c | $^n$Pr | 0.518 |
| | 2d | $^n$Bu | 0.362 |
| exo, exo-diester (xx-DE) | 3a | Me | 30.8 |
| | 3b | Et | 16.4 |
| | 3c | $^n$Pr | 11.2 |
| | 3d | $^n$Bu | 10.4 |
| endo-imide (d-I) | 4a | Me | 0.814 |
| | 4b | $^n$Bu | 0.930 |
| | 4c | $^t$Bu | 0.782 |
| exo-imide (d-I) | 5a | Me | 82.4 |
| | 5b | $^n$Bu | 63.2 |
| | 5c | Ph | 34.8 |
| | PDMS | PDMS (1k) | 21.6 |
| | PLA | PLA (3k) | 17.2 |
| | PS | PS (4k) | 4.18 |

Derivation of Rate Expression (Eq. 2):

We derived a simplified rate expression corresponding to the proposed dissociative ROMP mechanism in which olefin coordination is the rate-limiting step:

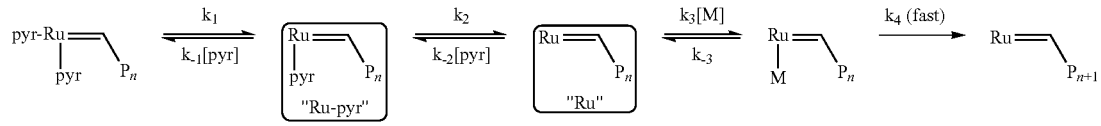

The large value estimated for $K_{eq,1}=k_1/k_{-1}$ indicates that >99.8% of the precatalyst G3 exists as the monopyridine adduct in solution under the conditions employed in our homo- and copolymerization studies. The initial concentration of G3 equals the sum of the concentrations of the monopyridine adduct ("Ru-pyr") and the 14-electron vacant species ("Ru"):

$$[G3]_0 = [Ru\text{-}pyr] + [Ru] \quad (S1)$$

A steady-state approximation can be made for the 14-electron vacant species:

$$-\frac{d[Ru]}{dt} = k_2[Ru\text{-}pyr] - k_{-2}[Ru][pyr] - k_3[Ru][M] = 0 \quad (S2)$$

Substituting S1 in S2 obtains the following:

$$-\frac{d[Ru]}{dt} = k_2[G3]_0 - k_2[Ru] - k_{-2}[Ru][pyr] - k_3[Ru][M] = 0 \quad (S3)$$

$$[Ru] = \frac{k_2[G3]_0}{k_2 + k_{-2}[pyr] + k_3[M]} \quad (S4)$$

$$[Ru] \times \frac{1/k_{-2}}{1/k_{-2}} = \frac{K_{eq,2}[G3]_0}{K_{eq,2} + [pyr] + \frac{k_3}{k_{-2}}[M]} \approx \frac{K_{eq,2}[G3]_0}{K_{eq,2} + [pyr]} \quad (S5)$$

In Eq. S5, since $k_3 \ll k_{-2}$, the third term in the denominator is close to 0. The time-dependent consumption of the monomer ("M") is provided by Eq. S6 (Eq. 2 in the main text):

$$-\frac{d[M]}{dt} = k_3[Ru][M] = \frac{K_{eq,2}k_3}{K_{eq,2} + [pyr]}[G3]_0[M] \quad (S6)$$

TABLE 5

Compiled SEC data for PLA + diluent copolymerizations at full conversion.

| ID | Diluent | $M_n$ (kDa)[a] | Ð |
|---|---|---|---|
| 2d | dd-D"BuE | 95.4 | 1.07 |
| 4c | d-'BuI | 89.9 | 1.10 |
| 4a | d-MeI | 90.5 | 1.04 |
| 4b | d-"BuI | 103 | 1.04 |
| 2a | dd-DMeE | 94.5 | 1.05 |
| 1d | dx-D"BuE | 101 | 1.04 |
| 3d | xx-D"BuE | —[b] | —[b] |
| 3c | xx-D"PrE | 101 | 1.08 |
| 3b | xx-DEtE | 99.5 | 1.06 |
| 1a | dx-DMeE | 108 | 1.05 |
| 3a | xx-DMeE | 95.4 | 1.04 |
| 5b | x-"BuI | 95.9 | 1.02 |
| 5a | x-MeI | 86.4 | 1.02 |

TABLE 6

Kinetic data for the copolymerization of PLA ($M_1$, $M_n$ = 3230 g mol$^{-1}$) with selected diluents ($M_2$). The self-propagation rate constants $k_{22}$ and $k_{11}$ were determined from homopolymerization experiments, and the cross-propagation rate constants $k_{12}$ and $k_{21}$ were determined by fitting copolymerization data using non-linear least squares regression. The reactivity ratios $r_1 = k_{11}/k_{12}$ and $r_2 = k_{22}/k_{21}$ are also provided.

| ID | Diluent | $k_{22}$ (M$^{-1}$s$^{-1}$) | $k_{11}$ (M$^{-1}$s$^{-1}$) | $k_{12}$ (M$^{-1}$s$^{-1}$) | $k_{21}$ (M$^{-1}$s$^{-1}$) | $r_1$ | $r_2$ | $r_1 r_2$ | $r_1/r_2$ |
|---|---|---|---|---|---|---|---|---|---|
| 2d | dd-D"BuE | 0.362 | 17.2 | 8.03 | 0.860 | 2.14 | 0.421 | 0.902 | 5.09 |
| 4c | d-'BuI | 0.782 | 17.2 | 11.0 | 1.72 | 1.56 | 0.455 | 0.708 | 3.43 |
| 4a | d-MeI | 0.814 | 17.2 | 4.55 | 1.24 | 3.78 | 0.656 | 2.48 | 5.76 |
| 4b | d-"BuI | 0.930 | 17.2 | 8.14 | 1.08 | 2.11 | 0.861 | 1.82 | 2.45 |
| 2a | dd-DMeE | 2.24 | 17.2 | 8.05 | 2.71 | 2.14 | 0.827 | 1.77 | 2.58 |
| 1d | dx-D"BuE | 6.90 | 17.2 | 16.4 | 7.35 | 1.05 | 0.939 | 0.983 | 1.12 |
| 3d | xx-D"BuE | 10.4 | 17.2 | 46.0 | 8.94 | 0.374 | 1.17 | 0.436 | 0.320 |
| 3c | xx-D"PrE | 11.2 | 17.2 | 47.2 | 9.38 | 0.364 | 1.20 | 0.436 | 0.304 |
| 3b | xx-DEtE | 16.4 | 17.2 | 48.6 | 10.1 | 0.354 | 1.63 | 0.577 | 0.217 |
| 1a | dx-DMeE | 18.7 | 17.2 | 18.0 | 15.7 | 0.953 | 1.19 | 1.13 | 0.801 |
| 3a | xx-DMeE | 30.8 | 17.2 | 49.2 | 18.3 | 0.350 | 1.68 | 0.588 | 0.208 |
| 5b | x-"BuI | 63.2 | 17.2 | 27.2 | 21.4 | 0.633 | 2.95 | 1.87 | 0.214 |
| 5a | x-MeI | 82.4 | 17.2 | 28.4 | 27.1 | 0.606 | 3.05 | 1.85 | 0.199 |

TABLE 7

Kinetic data for the copolymerization of PDMS ($M_1$, $M_n$ = 1280 mol$^{-1}$) with selected diluents ($M_2$). The self-propagation rate constants $k_{22}$ and $k_{11}$ were determined from homopolymerization experiments, and the cross-propagation rate constants $k_{12}$ and $k_{21}$ were determined by fitting copolymerization data using non-linear least squares regression. The reactivity ratios $r_1 = k_{11}/k_{12}$ and $r_2 = k_{22}/k_{21}$ are also provided.

| ID | Diluent | $k_{22}$ (M$^{-1}$s$^{-1}$) | $k_{11}$ (M$^{-1}$s$^{-1}$) | $k_{12}$ (M$^{-1}$s$^{-1}$) | $k_{21}$ (M$^{-1}$s$^{-1}$) | $r_1$ | $r_2$ | $r_1 r_2$ | $r_1/r_2$ |
|---|---|---|---|---|---|---|---|---|---|
| 4a | d-MeI | 0.814 | 21.6 | 3.34 | 2.44 | 6.47 | 0.334 | 2.16 | 19.4 |
| 4b | d-$^n$BuI | 0.930 | 21.6 | 6.85 | 2.00 | 3.15 | 0.465 | 1.47 | 6.78 |
| 1d | dx-D$^n$BuE | 6.90 | 21.6 | 19.5 | 15.9 | 1.11 | 0.434 | 0.481 | 2.55 |
| 3d | xx-D$^n$BuE | 10.4 | 21.6 | 48.2 | 10.3 | 0.448 | 1.02 | 0.455 | 0.441 |
| 1a | dx-DMeE | 18.7 | 21.6 | 19.9 | 19.9 | 1.09 | 0.940 | 1.02 | 1.16 |
| 3a | xx-DMeE | 30.8 | 21.6 | 50.4 | 26.3 | 0.429 | 1.17 | 0.502 | 0.367 |

TABLE 8

Kinetic data for the copolymerization of PS ($M_1$, $M_n$ = 3990 mol$^{-1}$) with selected diluents ($M_2$). The self-propagation rate constants $k_{22}$ and $k_{11}$ were determined from homopolymerization experiments, and the cross-propagation rate constants $k_{12}$ and $k_{21}$ were determined by fitting copolymerization data using non-linear least squares regression. The reactivity ratios $r_1 = k_{11}/k_{12}$ and $r_2 = k_{22}/k_{21}$ are also provided.

| ID | Diluent | $k_{22}$ (M$^{-1}$s$^{-1}$) | $k_{11}$ (M$^{-1}$s$^{-1}$) | $k_{12}$ (M$^{-1}$s$^{-1}$) | $k_{21}$ (M$^{-1}$s$^{-1}$) | $r_1$ | $r_2$ | $r_1 r_2$ | $r_1/r_2$ |
|---|---|---|---|---|---|---|---|---|---|
| 1d | dx-D$^n$BuE | 6.90 | 4.18 | 5.23 | 5.66 | 0.799 | 1.22 | 0.974 | 0.656 |
| 3d | xx-D$^n$BuE | 10.4 | 4.18 | 29.9 | 7.58 | 0.140 | 1.38 | 0.193 | 0.102 |
| 1b | dx-DEtE | 14.6 | 4.18 | 7.77 | 8.75 | 0.538 | 1.67 | 0.897 | 0.322 |
| 1a | dx-DMeE | 18.7 | 4.18 | 7.74 | 13.2 | 0.540 | 1.42 | 0.765 | 0.381 |
| 3a | xx-DMeE | 30.8 | 4.18 | 30.8 | 23.3 | 0.136 | 1.32 | 0.180 | 0.103 |
| 5b | x-$^n$BuI | 63.2 | 4.18 | 30.8 | 38.9 | 0.136 | 1.63 | 0.221 | 0.0836 |
| 5a | x-MeI | 82.4 | 4.18 | 31.9 | 63.2 | 0.131 | 1.30 | 0.171 | 0.100 |

TABLE 9

Compiled SEC data for PDMS + diluent copolymerizations at full conversion.

| ID | Diluent | $M_n$ (kDa)$^a$ | Đ |
|---|---|---|---|
| 4a | d-MeI | 39.3 | 1.04 |
| 4b | d-$^n$BuI | 42.7 | 1.05 |
| 1d | dx-D$^n$BuE | 32.5 | 1.06 |
| 3d | xx-D$^n$BuE | 39.9 | 1.09 |
| 1a | dx-DMeE | 32.2 | 1.04 |
| 3a | xx-DMeE | 37.9 | 1.03 |

$^a$The number-average molecular weight ($M_n$) is reported relative to polystyrene in THF (dn/dc = 0.185 mL g$^{-1}$).

TABLE 10

Compiled SEC data for PS + diluent copolymerizations at full conversion.

| ID | Diluent | $M_n$ (kDa) | Đ |
|---|---|---|---|
| 1d | dx-D$^n$BuE | 362 | 1.09 |
| 3d | xx-D$^n$BuE | 379 | 1.09 |
| 1b | dx-DEtE | 398 | 1.10 |
| 1a | dx-DMeE | 375 | 1.04 |
| 3a | xx-DMeE | 376 | 1.05 |
| 5b | x-$^n$BuI | 386 | 1.04 |
| 5a | x-MeI | 364 | 1.06 |

$^a$The number-average molecular weight ($M_n$) is reported relative to polystyrene in THF (dn/dc = 0.185 mL g$^{-1}$).

TABLE 11 xyz coordinates (in Angstroms) for structures in FIG. 53: endo isomer (2a).

| olefin endo (2a) | | | |
|---|---|---|---|
| C | 1.37924E+00 | 3.92831E−01 | −3.22856E−01 |
| C | 1.16270E+00 | −9.39169E−01 | −2.65412E−01 |
| O | −9.72876E−02 | 2.15024E+00 | −2.19202E+00 |
| O | −2.27946E+00 | 1.48833E+00 | −2.26447E+00 |
| O | −2.43997E+00 | −2.31171E+00 | −1.62638E+00 |
| O | −7.30496E−01 | −1.10449E+00 | −2.52547E+00 |
| C | 2.79507E−01 | 1.06702E+00 | 4.86745E−01 |
| C | −8.10609E−02 | −1.16530E+00 | 5.81677E−01 |
| C | −1.34579E+00 | −6.49205E−01 | −2.42913E−01 |
| C | −1.06624E+00 | 9.05880E−01 | −3.14351E−01 |
| H | −1.88335E+00 | 1.40366E+00 | 2.40453E−01 |
| H | −2.24511E+00 | −8.32600E−01 | 3.65716E−01 |
| C | 5.39175E−02 | 3.47364E−03 | 1.59193E+00 |
| H | −8.54421E−01 | 1.72316E−01 | 2.19954E+00 |
| H | 9.29488E−01 | −1.12527E−01 | 2.25139E+00 |
| H | −2.30996E−01 | −2.17697E+00 | 9.87862E−01 |
| H | 1.69050E+00 | −1.71993E+00 | −8.18140E−01 |
| H | 2.11273E+00 | 9.23746E−01 | −9.31238E−01 |
| H | 4.70643E−01 | 2.10252E+00 | 8.04631E−01 |
| C | −1.04361E+00 | 1.56452E+00 | −1.68620E+00 |
| C | −1.59258E+00 | −1.43417E+00 | −1.52086E+00 |
| C | −2.37037E+00 | 2.10899E+00 | −3.56562E+00 |
| H | −3.40808E+00 | 1.95389E+00 | −3.89040E+00 |
| H | −1.66592E+00 | 1.63678E+00 | −4.26851E+00 |
| H | −2.13915E+00 | 3.18414E+00 | −3.49946E+00 |
| C | −9.05792E−01 | −1.87012E+00 | −3.73855E+00 |
| H | −1.53347E−01 | −1.48092E+00 | −4.43738E+00 |
| H | −1.92285E+00 | −1.73248E+00 | −4.13837E+00 |
| H | −7.43190E−01 | −2.94249E+00 | −3.54617E+00 |

TABLE 11-continued xyz coordinates (in Angstroms) for
structures in FIG. 53: endo isomer (2a).

chelate endo (FIG. 52A)

| | | | |
|---|---|---|---|
| Ru | 2.51298E+00 | −2.83991E+00 | 1.99790E+00 |
| C | 1.82535E+00 | −1.48956E+00 | 9.77774E−01 |
| C | 4.28400E+00 | −3.09559E+00 | 1.11161E+00 |
| N | 5.17130E+00 | −4.03946E+00 | 1.57214E+00 |
| N | 4.89236E+00 | −2.45658E+00 | 6.42919E−02 |
| O | 6.65926E−01 | −2.84820E+00 | 3.19021E+00 |
| O | −1.22902E+00 | −1.98641E+00 | 4.03640E+00 |
| O | −3.33328E+00 | −9.09042E−01 | 1.02780E+00 |
| O | −1.34432E+00 | −2.01365E+00 | 8.26982E−01 |
| Cl | 3.35846E+00 | −1.34486E+00 | 3.70978E+00 |
| Cl | 1.46186E+00 | −4.58682E+00 | 6.51703E−01 |
| C | −8.27318E−01 | 1.20405E+00 | 1.15747E+00 |
| C | 1.10551E+00 | −2.91703E−01 | 1.54542E+00 |
| C | −1.33078E+00 | 2.74034E−02 | 2.06495E+00 |
| C | 4.88660E−03 | −5.18496E−01 | 2.65677E+00 |
| C | 6.49035E+00 | −3.97113E+00 | 9.08613E−01 |
| C | 6.21706E+00 | −3.02710E+00 | −2.74732E−01 |
| H | 6.16629E+00 | −3.56374E+00 | −1.24047E+00 |
| C | 4.36805E+00 | −1.40755E+00 | −7.63900E−01 |
| C | 4.06401E−01 | 5.80081E−01 | 4.62618E−01 |
| C | 4.98068E+00 | −4.91335E+00 | 2.70433E+00 |
| H | 7.24820E+00 | −3.56608E+00 | 1.60497E+00 |
| C | −1.84115E+00 | 1.80210E+00 | 2.20939E−01 |
| C | −2.16952E+00 | 3.10431E+00 | 1.92397E−01 |
| H | 1.08210E+00 | 1.34434E+00 | 4.65121E−02 |
| H | 7.63865E−02 | −5.74638E−02 | −3.78048E−01 |
| C | −2.13755E+00 | −9.97183E−01 | 1.26637E+00 |
| H | −4.79652E−01 | 1.99676E+00 | 1.84913E+00 |
| H | 1.91235E+00 | 2.89956E−01 | 2.03916E+00 |
| H | −1.72188E+00 | 3.82750E+00 | 8.85133E−01 |
| H | −2.31842E+00 | 1.11183E+00 | −4.87369E−01 |
| C | 3.68129E+00 | −1.73937E+00 | −1.95803E+00 |
| C | 3.23637E+00 | −6.86731E−01 | −2.77795E+00 |
| C | 3.46294E+00 | 6.63162E−01 | −2.45071E+00 |
| C | 4.15083E+00 | 9.51903E−01 | −1.25857E+00 |
| C | 4.48041E+00 | −6.22311E+00 | 2.47903E+00 |
| C | 4.31315E+00 | −7.06877E+00 | 3.58927E+00 |
| C | 4.65216E+00 | −6.66730E+00 | 4.89346E+00 |
| C | 5.22464E+00 | −5.39627E+00 | 5.06633E+00 |
| C | 5.42086E+00 | −4.50989E+00 | 3.99150E+00 |
| C | 4.17339E+00 | −6.72798E+00 | 1.08927E+00 |
| C | 6.16339E+00 | −3.21319E+00 | 4.22168E+00 |
| C | 4.41365E+00 | −7.58229E+00 | 6.07529E+00 |
| C | 3.38799E+00 | −3.17708E+00 | −2.32345E+00 |
| C | 3.00658E+00 | 1.77196E+00 | −3.37533E+00 |
| H | 3.94729E+00 | −7.80665E+00 | 1.11444E+00 |
| H | 5.02776E+00 | −6.57808E+00 | 4.04097E−01 |
| H | 7.24393E+00 | −3.34406E+00 | 4.01488E+00 |
| H | 5.77851E+00 | −2.39554E+00 | 3.59550E+00 |
| H | 5.12597E+00 | −7.38190E+00 | 6.89345E+00 |
| H | 4.50600E+00 | −8.64426E+00 | 5.79043E+00 |
| H | 2.81445E+00 | −3.22809E+00 | −3.26333E+00 |
| H | 4.31332E+00 | −3.76410E+00 | −2.46948E+00 |
| C | 4.61915E+00 | −6.23716E−02 | −4.02344E−01 |
| C | 5.35853E+00 | 2.81360E−01 | 8.70892E−01 |
| H | 5.48020E+00 | 1.37280E+00 | 9.66800E−01 |
| H | 4.82436E+00 | −9.09074E−02 | 1.76445E+00 |
| H | 2.06051E+00 | 1.51394E+00 | −3.88083E+00 |
| H | 2.85646E+00 | 2.71858E+00 | −2.82975E+00 |
| H | 6.96712E+00 | −2.22401E+00 | −3.68618E−01 |
| H | 6.81553E+00 | −4.97614E+00 | 5.91689E−01 |
| H | 6.06886E+00 | −2.89276E+00 | 5.27154E+00 |
| H | 3.30519E+00 | −6.19909E+00 | 6.58265E−01 |
| H | 3.39607E+00 | −7.44241E+00 | 6.48566E−01 |
| H | 2.80459E+00 | −3.68471E+00 | −1.53222E+00 |
| H | 3.75553E+00 | 1.96491E+00 | −4.16631E+00 |
| H | 6.36774E+00 | −1.69857E−01 | 8.90609E−01 |
| H | 5.54415E+00 | −5.08207E+00 | 6.06744E+00 |
| H | 3.91613E+00 | −8.07764E+00 | 3.42344E+00 |
| H | 4.33820E+00 | 1.99804E+00 | −9.86679E−01 |
| H | 2.69471E+00 | −9.31865E−01 | −3.69981E+00 |
| H | 1.88651E+00 | −1.51676E+00 | −1.26084E−01 |
| C | −1.21050E−01 | −1.89760E+00 | 3.27451E+00 |
| C | −1.99960E+00 | −3.05629E+00 | 6.19953E−02 |
| H | −2.34427E+00 | −2.65356E+00 | −9.03869E−01 |
| H | −1.22663E+00 | −3.82375E+00 | −7.39152E−02 |
| H | −2.86600E+00 | −3.44543E+00 | 6.18671E−01 |
| C | −1.42371E+00 | −3.25544E+00 | 4.71500E+00 |
| H | −5.99728E−01 | −3.43623E+00 | 5.42191E+00 |
| H | −1.46447E+00 | −4.07564E+00 | 3.98287E+00 |
| H | −2.37950E+00 | −3.14886E+00 | 5.24370E+00 |
| H | −2.90057E+00 | 3.49776E+00 | −5.21047E−01 |
| H | −2.00732E+00 | 4.03936E−01 | 2.84711E+00 |
| H | 2.57913E−01 | 1.35145E−01 | 3.51335E+00 | vacant endo (FIG. 52B)

| | | | |
|---|---|---|---|
| Ru | 2.95468E+00 | −2.53803E+00 | 2.28144E+00 |
| C | 1.60566E+00 | −1.74763E+00 | 1.33824E+00 |
| C | 4.25479E+00 | −3.10926E+00 | 9.54312E−01 |
| O | −1.47766E+00 | −3.12470E+00 | −1.78657E−02 |
| O | −1.38177E+00 | −8.53069E−01 | −1.60651E−01 |
| O | −3.80276E+00 | −1.29270E+00 | 1.44332E+00 |
| O | −4.00359E+00 | −5.02317E−01 | 3.57129E+00 |
| N | 4.41627E+00 | −2.73169E+00 | −3.55362E−01 |
| N | 5.31358E+00 | −3.92952E+00 | 1.27572E+00 |
| Cl | 4.17252E+00 | −6.35523E−01 | 2.99402E+00 |
| Cl | 1.88733E+00 | −4.56009E+00 | 2.85127E+00 |
| C | −1.15394E+00 | 5.61245E−01 | 2.71186E+00 |
| C | 5.02974E−01 | −1.21251E+00 | 2.20505E+00 |
| C | −1.80078E+00 | −8.91894E−01 | 2.81262E+00 |
| C | −9.11992E−01 | −1.85880E+00 | 1.98350E+00 |
| C | 6.32000E+00 | −4.00325E+00 | 1.96801E−01 |
| C | 5.56275E+00 | −3.41225E+00 | −1.00153E+00 |
| H | 5.19893E+00 | −4.18985E+00 | −1.70002E+00 |
| C | 3.53251E+00 | −1.97819E+00 | −1.20169E+00 |
| C | 2.50457E−01 | 3.14172E−01 | 2.07030E+00 |
| C | 5.55112E+00 | −4.61622E+00 | 2.52205E+00 |
| H | 7.21204E+00 | −3.40662E+00 | 4.65074E−01 |
| C | −1.96203E+00 | 1.57297E+00 | 1.93985E+00 |
| C | −2.40276E+00 | 2.73731E+00 | 2.44461E+00 |
| H | 1.04373E+00 | 8.99830E−01 | 2.56055E+00 |
| H | 2.31510E−01 | 5.89616E−01 | 1.00329E+00 |
| C | −3.28843E+00 | −9.36306E−01 | 2.49572E+00 |
| H | −1.02968E+00 | 9.37301E−01 | 3.74209E+00 |
| H | 7.50605E−01 | −1.41727E+00 | 3.27034E+00 |
| H | −2.20977E+00 | 3.02414E+00 | 3.48549E+00 |
| H | −2.16978E+00 | 1.31323E+00 | 8.94143E−01 |
| C | 2.48456E+00 | −2.64422E+00 | −1.88085E+00 |
| C | 1.72157E+00 | −1.90381E+00 | −2.80386E+00 |
| C | 1.96993E+00 | −5.43129E−01 | −3.05726E+00 |
| C | 3.01363E+00 | 8.53800E−02 | −2.35303E+00 |
| C | 5.06969E+00 | −5.94251E+00 | 2.65841E+00 |
| C | 5.32820E+00 | −6.62153E+00 | 3.86077E+00 |
| C | 6.05872E+00 | −6.03408E+00 | 4.90796E+00 |
| C | 6.58109E+00 | −4.74460E+00 | 4.70815E+00 |
| C | 6.36246E+00 | −4.02146E+00 | 3.52167E+00 |
| C | 4.32435E+00 | −6.63275E+00 | 1.53902E+00 |
| C | 7.04596E+00 | −2.68784E+00 | 3.31908E+00 |
| C | 6.28216E+00 | −6.76818E+00 | 6.21230E+00 |
| C | 2.16693E+00 | −4.09847E+00 | −1.61050E+00 |
| C | 1.13445E+00 | 2.32851E−01 | −4.05336E+00 |
| H | 4.09469E+00 | −7.67461E+00 | 1.81498E+00 |
| H | 4.91727E+00 | −6.65664E+00 | 6.05811E−01 |
| H | 7.91535E+00 | −2.78875E+00 | 2.64073E+00 |
| H | 6.36840E+00 | −1.92866E+00 | 2.89799E+00 |
| H | 5.61421E+00 | −6.38045E+00 | 7.00355E+00 |
| H | 7.31792E+00 | −6.64661E+00 | 6.57454E+00 |
| H | 1.29919E+00 | −4.42430E+00 | −2.20529E+00 |
| H | 3.01431E+00 | −4.76256E+00 | −1.86081E+00 |
| C | 3.81193E+00 | −6.08298E−01 | −1.42719E+00 |
| C | 4.93276E+00 | 9.29668E−02 | −6.94324E−01 |
| H | 4.79705E+00 | 3.10315E−02 | 4.00004E−01 |
| H | 5.91708E+00 | −3.56224E−01 | −9.22937E−01 |
| H | 4.49712E−01 | 9.34478E−01 | −3.54223E+00 |
| H | 1.76791E+00 | 8.36326E−01 | −4.72674E+00 |
| H | 6.16135E+00 | −2.68648E+00 | −1.57567E+00 |
| H | 6.63664E+00 | −5.04683E+00 | 3.67537E−02 |
| H | 7.42750E+00 | −2.30093E+00 | 4.27787E+00 |
| H | 3.37207E+00 | −6.12160E+00 | 1.32306E+00 |
| H | 6.07913E+00 | −7.84699E+00 | 6.10889E+00 |
| H | 1.92755E+00 | −4.26532E+00 | −5.45493E−01 |
| H | 5.20093E−01 | −4.38764E−01 | −4.67540E+00 |

TABLE 11-continued xyz coordinates (in Angstroms) for structures in FIG. 53: endo isomer (2a).

| | | | |
|---|---|---|---|
| H | 4.97806E+00 | 1.15622E+00 | −9.80752E−01 |
| H | 7.19303E+00 | −4.28486E+00 | 5.49388E+00 |
| H | 4.94472E+00 | −7.64174E+00 | 3.98046E+00 |
| H | 3.22223E+00 | 1.14671E+00 | −2.53519E+00 |
| H | 9.16749E−01 | −2.41390E+00 | −3.34692E+00 |
| H | 1.51773E+00 | −1.64027E+00 | 2.44568E−01 |
| C | −1.30062E+00 | −2.04026E+00 | 5.14509E−01 |
| C | −5.43205E+00 | −4.37513E−01 | 3.35661E+00 |
| H | −5.66679E+00 | 2.72112E−01 | 2.54765E+00 |
| H | −5.82817E+00 | −1.43007E+00 | 3.09048E+00 |
| H | −5.85265E+00 | −9.20309E−02 | 4.31036E+00 |
| C | −1.88096E+00 | −9.79092E−01 | −1.51052E+00 |
| H | −2.89432E+00 | −1.40903E+00 | −1.49279E+00 |
| H | −1.21812E+00 | −1.62188E+00 | −2.10945E+00 |
| H | −1.89848E+00 | 4.37867E−02 | −1.91075E+00 |
| H | −2.96947E+00 | 3.45072E−01 | 1.83703E+00 |
| H | −1.70276E+00 | −1.19840E+00 | 3.86845E+00 |
| H | −9.28168E−01 | −2.87539E+00 | 2.40434E+00 |
| olefin adduct endo (FIG. 52C) | | | |
| Ru | 2.78629E+00 | −2.64299E+00 | 2.55817E+00 |
| C | 1.40559E+00 | −1.91739E+00 | 1.58761E+00 |
| C | 4.19891E+00 | −3.06497E+00 | 1.05222E+00 |
| C | 2.07251E+00 | −1.85353E+00 | 4.62129E+00 |
| C | 1.34854E+00 | −3.02166E+00 | 4.35842E+00 |
| N | 5.35550E+00 | −3.73648E+00 | 1.33089E+00 |
| N | 4.19961E+00 | −2.78281E+00 | −2.78811E−01 |
| O | −3.11283E+00 | 2.08198E+00 | 2.74260E+00 |
| O | −3.58219E+00 | −1.02816E−01 | 2.29459E+00 |
| O | −1.85751E+00 | −2.78398E+00 | 2.90201E+00 |
| O | −1.78179E+00 | −1.94838E+00 | 7.88705E−01 |
| O | −7.46843E−01 | −2.21975E+00 | 6.62167E+00 |
| O | −8.90751E−01 | −4.49262E+00 | 6.59710E+00 |
| O | 1.46586E+00 | 1.12303E−02 | 6.90170E+00 |
| O | 9.81721E−01 | −1.22240E+00 | 8.76094E+00 |
| Cl | 3.97967E+00 | −4.87109E−01 | 2.80845E+00 |
| Cl | 1.86702E+00 | −4.88353E+00 | 2.05216E+00 |
| C | −7.63334E−01 | 1.14821E+00 | 7.97353E−01 |
| C | 7.36835E−01 | −5.85949E−01 | 1.78544E+00 |
| C | −1.26244E+00 | 6.99678E−01 | 2.23644E+00 |
| C | −6.54225E−01 | −6.99878E−01 | 2.52766E+00 |
| C | 6.25818E+00 | −3.84925E+00 | 1.58549E−01 |
| C | 5.36745E+00 | −3.36541E+00 | −9.92028E−01 |
| H | 5.02861E+00 | −4.18808E+00 | −1.64747E+00 |
| C | 3.24746E+00 | −2.06619E+00 | −1.08981E+00 |
| C | 3.90226E−01 | 1.48053E−01 | 4.64568E−01 |
| C | 5.81371E+00 | −4.27055E+00 | 2.59319E+00 |
| H | 7.14739E+00 | −3.21049E+00 | 3.08187E−01 |
| C | −1.82454E+00 | 1.15814E+00 | −2.74283E−01 |
| C | −2.15163E+00 | 2.23372E+00 | −1.01164E+00 |
| H | 1.27109E+00 | 6.59852E−01 | 4.93272E−01 |
| H | 4.90200E−02 | −5.81194E−01 | −2.88432E−01 |
| C | −2.76816E+00 | 8.03028E−01 | 2.42439E+00 |
| C | −3.61279E−01 | 2.17187E+00 | 8.90788E−01 |
| H | 1.37384E+00 | 6.35766E−02 | 2.40940E+00 |
| H | −1.66527E+00 | 3.20525E+00 | −8.60680E−01 |
| H | −2.33176E+00 | 2.00303E−01 | −4.45755E−01 |
| C | 2.21194E+00 | −2.77794E+00 | −1.74424E+00 |
| C | 1.38549E+00 | −2.06842E+00 | −2.63627E+00 |
| C | 1.57934E+00 | −7.04538E+00 | −2.91522E+00 |
| C | 2.65009E+00 | −4.59131E−02 | −2.28439E+00 |
| C | 5.58442E+00 | −5.64439E+00 | 2.87541E+00 |
| C | 6.07086E+00 | −6.16071E+00 | 4.08890E+00 |
| C | 6.80886E+00 | −5.37764E+00 | 4.99455E+00 |
| C | 7.08935E+00 | −4.04786E+00 | 4.64077E+00 |
| C | 6.63050E+00 | −3.47544E+00 | 3.43876E+00 |
| C | 4.88643E+00 | −6.55632E+00 | 1.89459E+00 |
| C | 7.06311E+00 | −2.07744E+00 | 3.06386E+00 |
| C | 7.33719E+00 | −5.97276E+00 | 6.28263E+00 |
| C | 2.00389E+00 | −4.25926E+00 | −1.52944E+00 |
| C | 6.48412E−01 | 4.42692E−02 | −3.84378E+00 |
| H | 4.79510E+00 | −7.57197E+00 | 2.31265E+00 |
| H | 5.45478E+00 | −6.63947E+00 | 9.48736E−01 |
| H | 7.72907E+00 | −2.09126E+00 | 2.18014E+00 |
| H | 6.20436E+00 | −1.42568E+00 | 2.82960E+00 |
| H | 7.62389E+00 | −5.18851E+00 | 7.00260E+00 |
| H | 8.23291E+00 | −6.59466E+00 | 6.09726E+00 |
| H | 1.10660E+00 | −4.60483E+00 | −2.06839E+00 |
| H | 2.86014E+00 | −4.84751E+00 | −1.91041E+00 |
| C | 3.49755E+00 | −6.99148E−01 | −1.37227E+00 |
| C | 4.64514E+00 | 4.41322E−02 | −7.28988E−01 |
| H | 4.57008E+00 | 1.84599E−02 | 3.73206E−01 |
| H | 5.62380E+00 | −3.95567E−01 | −9.99253E−01 |
| H | −1.36006E−01 | 5.71389E−01 | −3.26842E+00 |
| H | 1.18891E+00 | 8.06109E−01 | −4.43136E+00 |
| H | 5.84813E+00 | −2.59896E+00 | −1.62082E+00 |
| H | 6.59668E+00 | −4.89081E+00 | 3.71591E−02 |
| H | 7.62871E+00 | −1.61644E+00 | 3.88988E+00 |
| H | 3.87557E+00 | −6.18705E+00 | 1.65166E+00 |
| H | 6.58730E+00 | −6.62357E+00 | 6.76441E+00 |
| H | 1.89100E+00 | −4.51489E+00 | −4.60103E−01 |
| H | 1.42005E−01 | −6.37672E−01 | −4.54735E+00 |
| H | 4.65590E+00 | 1.09648E+00 | −1.05666E+00 |
| H | 7.70244E+00 | −3.43214E+00 | 5.30988E+00 |
| H | 5.87795E+00 | −7.21492E+00 | 4.32200E+00 |
| H | 2.83528E+00 | 1.01228E+00 | −2.50625E+00 |
| H | 5.74435E−01 | −2.60868E+00 | −3.13957E+00 |
| I I | 8.98947E−01 | −2.57615E+00 | 8.53466E−01 |
| C | −1.50687E+00 | −1.90663E+00 | 2.12306E+00 |
| C | −4.53536E+00 | 2.30573E+00 | 2.87305E+00 |
| H | −5.04697E+00 | 2.09101E+00 | 1.92155E+00 |
| H | −4.95651E+00 | 1.66170E+00 | 3.66096E+00 |
| H | −4.63830E+00 | 3.36611E+00 | 3.13943E+00 |
| C | −2.62098E+00 | −3.05949E+00 | 3.92081E−01 |
| H | −3.59913E+00 | −2.98325E+00 | 8.91269E−01 |
| H | −2.14436E+00 | −4.01510E+00 | 6.58485E−01 |
| H | −2.72987E+00 | −2.96480E+00 | −6.96700E−01 |
| H | −2.91983E+00 | 2.18609E+00 | −1.79081E+00 |
| H | −8.04128E−01 | 1.39782E+00 | 2.95718E+00 |
| H | −5.02469E−01 | −8.27154E−01 | 3.61031E+00 |
| C | 3.04840E+00 | −2.18330E+00 | 5.74754E+00 |
| C | 1.84765E+00 | −4.07133E+00 | 5.34263E+00 |
| C | 1.28835E+00 | −3.58683E+00 | 6.75395E+00 |
| C | 2.19235E+00 | −2.32987E+00 | 7.05505E+00 |
| H | 2.86947E+00 | −2.60819E+00 | 7.88386E+00 |
| H | 1.45811E+00 | −4.38611E+00 | 7.49508E+00 |
| C | 3.33446E+00 | −3.68003E+00 | 5.47683E+00 |
| H | 3.85627E+00 | −4.18635E+00 | 6.30725E+00 |
| H | 3.90853E+00 | −3.86685E+00 | 4.54876E+00 |
| H | 1.60501E+00 | −5.11423E+00 | 5.10228E+00 |
| H | 3.45960E−01 | −3.07675E+00 | 3.92794E+00 |
| H | 1.74552E+00 | −8.30441E−01 | 4.44418E+00 |
| H | 3.90692E+00 | −1.50520E+00 | 5.84463E+00 |
| C | 1.49289E+00 | −1.05165E+00 | 7.50529E+00 |
| C | −2.07807E−01 | −3.31873E+00 | 6.67485E+00 |
| C | 2.33090E−01 | −9.06581E−02 | 9.25278E+00 |
| H | −8.32188E−02 | −3.68259E−01 | 1.02678E+01 |
| H | −6.41548E−01 | 8.91697E−02 | 8.60790E+00 |
| H | 8.60721E−01 | 8.14495E−01 | 9.27324E+00 |
| C | −2.30831E+00 | −4.34057E+00 | 6.32983E+00 |
| H | −2.70080E+00 | −5.36493E+00 | 6.27772E+00 |
| H | −2.45521E+00 | −3.81210E+00 | 5.37522E+00 |
| H | −2.79452E+00 | −3.77682E+00 | 7.14170E+00 |
| metallacyclobutane endo (FIG. 52D) | | | |
| Ru | 2.48432E+00 | −2.45240E+00 | 2.26077E+00 |
| C | 5.04808E−01 | −1.94731E+00 | 2.29378E+00 |
| C | 4.08056E+00 | −2.81180E+00 | 1.03692E+00 |
| C | 2.27404E+00 | −2.66601E+00 | 4.22552E+00 |
| C | 8.41763E−01 | −2.00079E+00 | 3.82367E+00 |
| N | 5.18936E+00 | −3.44965E+00 | 1.49947E+00 |
| N | 4.25495E+00 | −2.52706E+00 | −2.79432E−01 |
| O | −3.43500E+00 | 2.57195E+00 | 8.30333E−01 |
| O | −4.23411E+00 | 4.92799E−01 | 1.31388E+00 |
| O | −2.98984E+00 | −2.03839E+00 | 3.06256E+00 |
| O | −2.60902E+00 | −1.94667E+00 | 8.22609E−01 |
| O | 9.64500E−01 | −4.28823E−01 | 6.51783E+00 |
| O | −1.20064E+00 | −9.14663E−01 | 7.03891E+00 |
| O | 3.67828E+00 | −2.50757E+00 | 7.00893E+00 |
| O | 1.96990E+00 | −2.38579E+00 | 8.51498E+00 |
| Cl | 3.18321E+00 | −1.55039E−01 | 2.69746E+00 |
| Cl | 1.74965E+00 | −4.65973E+00 | 1.43527E+00 |
| C | −1.04194E+00 | 7.09439E−01 | −5.49562E−02 |
| C | −2.40763E−02 | −6.19749E−01 | 1.78173E+00 |

TABLE 11-continued xyz coordinates (in Angstroms) for structures in FIG. 53: endo isomer (2a).

| | | | |
|---|---|---|---|
| C | −1.81627E+00 | 9.20249E−01 | 1.32258E+00 |
| C | −1.50472E+00 | −3.07422E−01 | 2.21411E+00 |
| C | 6.25751E+00 | −3.53213E+00 | 4.73361E−01 |
| C | 5.52558E+00 | −3.09303E+00 | −8.04775E−01 |
| H | 5.30438E+00 | −3.93884E+00 | −1.47999E+00 |
| C | 3.40892E+00 | −1.78757E+00 | −1.18678E+00 |
| C | −4.96489E−02 | −4.59556E−01 | 2.44997E−01 |
| C | 5.45708E+00 | −3.89372E+00 | 2.84900E+00 |
| H | 7.09131E+00 | −2.85800E+00 | 7.42305E−01 |
| C | −1.93924E+00 | 4.40666E−01 | −1.23693E+00 |
| C | −2.12963E+00 | 1.29309E+00 | −2.25975E+00 |
| H | 9.56394E−01 | −2.53374E−01 | −1.52722E−01 |
| H | −4.09857E−01 | −1.38946E+00 | −2.25452E−01 |
| C | −3.28989E+00 | 1.25903E+00 | 1.16944E+00 |
| H | −4.82666E−01 | 1.63899E+00 | −2.57848E−01 |
| H | 5.97251E−01 | 1.87812E−01 | 2.20782E+00 |
| H | −1.62792E+00 | 2.26779E+00 | −2.29788E+00 |
| H | −2.46975E+00 | −5.19504E−01 | −1.22011E+00 |
| C | 2.51612E+00 | −2.48319E+00 | −2.04105E+00 |
| C | 1.79007E+00 | −1.73457E+00 | −2.98465E+00 |
| C | 1.94783E+00 | −3.44815E−01 | −3.12470E+00 |
| C | 2.88098E+00 | 3.00733E−01 | −2.29517E+00 |
| C | 5.27303E+00 | −5.26178E+00 | 3.16869E+00 |
| C | 5.56333E+00 | −5.67523E+00 | 4.48268E+00 |
| C | 6.04784E+00 | −4.78610E+00 | 5.45637E+00 |
| C | 6.29287E+00 | −3.45555E+00 | 5.07598E+00 |
| C | 6.02452E+00 | −2.98555E+00 | 3.78009E+00 |
| C | 4.80771E+00 | −6.26923E+00 | 2.14341E+00 |
| C | 6.35728E+00 | −1.55770E+00 | 3.41489E+00 |
| C | 6.29943E+00 | −5.23408E+00 | 6.87895E+00 |
| C | 2.36665E+00 | −3.98589E+00 | −1.99751E+00 |
| C | 1.13354E+00 | 4.29095E−01 | −4.13711E+00 |
| H | 4.70478E+00 | −7.26578E+00 | 2.60325E+00 |
| H | 5.52878E+00 | −6.36619E+00 | 1.30958E+00 |
| H | 6.99858E+00 | −1.50061E+00 | 2.51619E+00 |
| H | 5.44825E+00 | −9.64590E−01 | 3.20867E+00 |
| H | 5.58862E+00 | −4.73923E+00 | 7.56489E+00 |
| H | 7.31617E+00 | −4.96397E+00 | 7.21586E+00 |
| H | 1.51920E+00 | −4.30619E+00 | −2.62545E+00 |
| H | 3.27006E+00 | −4.49107E+00 | −2.39013E+00 |
| C | 3.63278E+00 | −3.94452E−01 | −1.33013E+00 |
| C | 4.66476E+00 | 3.36499E−01 | −5.03722E−01 |
| H | 4.38736E+00 | 3.42137E−01 | 5.65553E−01 |
| H | 5.66259E+00 | −1.33399E−01 | −5.81377E−01 |
| H | 1.31114E−01 | 6.62407E−01 | −3.73108E+00 |
| H | 1.61802E+00 | 1.38395E+00 | −4.40195E+00 |
| H | 6.07087E+00 | −2.32451E+00 | −1.37585E+00 |
| H | 6.64784E+00 | −4.56074E+00 | 4.15842E−01 |
| H | 6.90037E+00 | −1.07066E+00 | 4.24087E+00 |
| H | 3.83396E+00 | −5.98096E+00 | 1.71146E+00 |
| H | 6.18153E+00 | −6.32483E+00 | 6.98972E+00 |
| H | 2.19795E+00 | −4.35346E+00 | −9.70925E−01 |
| H | 9.84965E−01 | −1.50609E−01 | −5.06448E+00 |
| H | 4.76074E+00 | 1.38042E+00 | −8.44105E−01 |
| H | 6.69864E+00 | −2.75298E+00 | 5.81238E+00 |
| H | 5.40965E+00 | −6.72905E+00 | 4.74557E+00 |
| H | 3.04668E+00 | 1.37871E+00 | −2.41054E+00 |
| H | 1.09101E+00 | −2.26393E+00 | −3.64341E+00 |
| H | −8.72236E−02 | −2.81318E+00 | 1.95135E+00 |
| C | −2.46196E+00 | −1.49481E+00 | 2.09950E+00 |
| C | −4.79937E+00 | 2.97952E+00 | 5.81839E−01 |
| H | −5.22145E+00 | 2.41128E+00 | −2.61978E−01 |
| H | −5.42268E+00 | 2.81254E+00 | 1.47448E+00 |
| H | −4.74307E+00 | 4.04938E+00 | 3.40043E−01 |
| C | −3.54164E+00 | −3.04393E+00 | 6.81876E−01 |
| H | −4.54880E+00 | −2.71742E+00 | 9.83468E−01 |
| H | −3.23113E+00 | −3.89786E+00 | 1.30304E+00 |
| H | −3.51873E+00 | −3.30831E+00 | −3.83770E−01 |
| H | −2.80054E+00 | 1.05386E+00 | −3.09193E+00 |
| H | −1.34375E+00 | 1.79252E+00 | 1.80666E+00 |
| H | −1.54495E+00 | −3.00760E−02 | 3.27976E+00 |
| C | 1.90753E+00 | −3.91633E+00 | 5.03193E+00 |
| C | −1.10395E−01 | −2.93941E+00 | 4.63922E+00 |
| C | 1.00901E−01 | −2.69830E+00 | 6.18324E+00 |
| C | 1.47141E+00 | −3.43883E+00 | 6.45741E+00 |
| H | 1.22574E+00 | −4.34393E+00 | 7.04542E+00 |
| H | −7.21075E−01 | −3.21592E+00 | 6.70250E+00 |
| C | 5.27060E−01 | −4.33453E+00 | 4.48227E+00 |
| H | 2.61521E−02 | −5.09491E+00 | 5.10859E+00 |
| H | 5.65576E−01 | −4.68628E+00 | 3.44304E+00 |
| H | −1.16362E+00 | −2.82792E+00 | 4.34178E+00 |
| H | 8.95414E−01 | −9.59943E−01 | 4.17690E+00 |
| H | 2.92543E+00 | −1.95106E+00 | 4.74672E+00 |
| H | 2.70157E+00 | −4.67707E+00 | 5.05316E+00 |
| C | 2.50763E+00 | −2.70850E+00 | 7.30055E+00 |
| C | 4.69337E−02 | −1.23876E+00 | 6.59711E+00 |
| C | 2.85856E+00 | −1.65135E+00 | 9.38578E+00 |
| H | 2.29281E+00 | −1.49582E+00 | 1.03145E+01 |
| H | 3.12675E+00 | −6.87427E−01 | 8.92581E+00 |
| H | 3.77693E+00 | −2.22745E+00 | 9.58079E+00 |
| C | −1.37000E+00 | 4.74700E−01 | 7.40082E+00 |
| H | −2.41999E+00 | 5.67678E−01 | 7.70822E+00 |
| H | −1.15484E+00 | 1.12916E+00 | 6.54151E+00 |
| H | −6.94240E−01 | 7.41666E−01 | 8.22879E+00 |
| | pyridine adduct endo(FIG. 52E) | | |
| Ru | 3.05288E+00 | −2.28463E+00 | 2.52684E+00 |
| C | 1.67715E+00 | −1.41400E+00 | 1.67128E+00 |
| C | 4.09879E+00 | −3.07536E+00 | 9.87837E−01 |
| N | 5.05130E+00 | −4.02595E+00 | 1.28793E+00 |
| N | 4.24184E+00 | −2.78066E+00 | −3.38327E−01 |
| N | 2.53498E+00 | −1.59335E+00 | 4.60362E+00 |
| O | −4.43645E+00 | −1.81721E+00 | 2.35141E+00 |
| O | −3.67745E+00 | −7.65497E−01 | 4.78694E−01 |
| O | −8.48756E−01 | 6.27190E−02 | −1.42354E−01 |
| O | −1.21369E+00 | −2.00026E+00 | −1.03967E+00 |
| Cl | 4.56546E+00 | −3.60281E−01 | 2.39956E+00 |
| Cl | 1.70118E+00 | −4.29090E+00 | 2.90579E+00 |
| C | −1.66970E+00 | −2.46136E−02 | 2.98809E+00 |
| C | 2.90238E−01 | −1.34350E+00 | 2.25314E+00 |
| C | −2.10985E+00 | −1.37379E+00 | 2.26731E+00 |
| C | −9.12386E−01 | −1.81754E+00 | 1.36481E+00 |
| C | 5.99433E+00 | −4.26048E+00 | 1.73780E−01 |
| C | 5.22789E+00 | −3.66666E+00 | −1.01000E+00 |
| H | 4.69321E+00 | −4.43638E+00 | −1.59898E+00 |
| C | 3.41417E+00 | −1.99595E+00 | −1.21599E+00 |
| C | −1.32736E−01 | 7.79299E−02 | 2.71811E+00 |
| C | 5.29872E+00 | −4.64233E+00 | 2.56878E+00 |
| H | 6.94856E+00 | −3.73322E+00 | 3.64511E−01 |
| C | −2.40708E+00 | 1.21760E+00 | 2.55806E+00 |
| C | −3.10065E+00 | 2.01093E+00 | 3.39179E+00 |
| H | 4.12862E−01 | 3.90367E−01 | 3.62200E+00 |
| H | 6.82121E−02 | 8.15827E−01 | 1.92544E+00 |
| C | −3.45784E+00 | −1.27659E+00 | 1.57010E+00 |
| H | −1.84434E+00 | −1.65896E−01 | 4.06935E+00 |
| H | 2.61035E−01 | −2.01104E+00 | 3.13142E+00 |
| H | −3.19119E+00 | 1.78468E+00 | 4.46150E+00 |
| H | −2.33714E+00 | 1.46911E+00 | 1.49314E+00 |
| C | 2.20334E+00 | −2.53885E+00 | −1.70688E+00 |
| C | 1.53129E+00 | −1.83820E+00 | −2.72807E+00 |
| C | 2.03501E+00 | −6.43801E−01 | −3.27006E+00 |
| C | 3.22761E+00 | −1.20825E−01 | −2.73643E+00 |
| C | 4.74257E+00 | −5.92819E+00 | 2.80876E+00 |
| C | 5.00007E+00 | −6.54473E+00 | 4.04211E+00 |
| C | 5.80324E+00 | −5.93902E+00 | 5.02726E+00 |
| C | 6.39648E+00 | −4.70366E+00 | 4.72750E+00 |
| C | 6.18825E+00 | −4.04592E+00 | 3.49761E+00 |
| C | 3.91833E+00 | −6.63802E+00 | 1.76018E+00 |
| C | 6.98336E+00 | −2.79958E+00 | 3.17833E+00 |
| C | 6.04189E+00 | −6.62294E+00 | 6.35669E+00 |
| C | 1.64797E+00 | −3.85003E+00 | −1.19368E+00 |
| C | 1.33497E+00 | 5.29615E−02 | −4.41914E+00 |
| H | 3.64498E+00 | −7.64883E+00 | 2.10430E+00 |
| H | 4.47094E+00 | −6.74493E+00 | 8.08683E−01 |
| H | 7.84115E+00 | −3.04632E+00 | 2.52286E+00 |
| H | 6.38367E+00 | −2.02233E+00 | 2.67814E+00 |
| H | 6.71950E+00 | −6.03473E+00 | 6.99723E+00 |
| H | 6.48918E+00 | −7.62432E+00 | 6.22064E+00 |
| H | 5.85002E+00 | −3.94340E+00 | −1.46469E+00 |
| H | 2.18673E+00 | −4.71356E+00 | −1.62977E+00 |
| C | 3.93930E+00 | −7.77578E−01 | −1.71901E+00 |
| C | 5.23592E+00 | −2.01323E−01 | −1.19808E+00 |
| H | 5.22122E+00 | −1.19252E−01 | −9.72136E−02 |
| H | 6.10521E+00 | −8.31437E−01 | −1.46670E+00 |

TABLE 11-continued xyz coordinates (in Angstroms) for structures in FIG. 53: endo isomer (2a).

| | | | |
|---|---|---|---|
| H | 1.21447E+00 | 1.13436E+00 | −4.22887E+00 |
| H | 1.91595E+00 | −4.39110E−02 | −5.35518E+00 |
| H | 5.86432E+00 | −3.08480E+00 | −1.69483E+00 |
| H | 6.20511E+00 | −5.33642E+00 | 6.26108E−02 |
| H | 7.39860E+00 | −2.36017E+00 | 4.10022E+00 |
| H | 2.98978E+00 | −6.08091E+00 | 1.55361E+00 |
| H | 5.09564E+00 | −6.76700E+00 | 6.90904E+00 |
| H | 1.72762E+00 | −3.93491E+00 | −9.69470E−02 |
| H | 3.36497E−01 | −3.76201E−01 | −4.60527E+00 |
| H | 5.41281E+00 | 7.98900E−01 | −1.62663E+00 |
| H | 7.06728E+00 | −4.23845E+00 | 5.46018E+00 |
| H | 4.55996E+00 | −7.53014E+00 | 4.23792E+00 |
| H | 3.62949E+00 | 8.19424E−01 | −3.13418E+00 |
| H | 5.86305E−01 | −2.24477E+00 | −3.10313E+00 |
| H | 1.86094E+00 | −8.26384E−01 | 7.49739E−01 |
| C | −1.00356E+00 | −1.28950E+00 | −6.61100E−02 |
| C | −5.76832E+00 | −1.71557E+00 | 1.79697E+00 |
| H | −6.04342E+00 | −6.59560E−01 | 1.64781E+00 |
| H | −5.82423E+00 | −2.24011E+00 | 8.30105E−01 |
| H | −6.42701E+00 | −2.18979E+00 | 2.53675E+00 |
| C | −1.12243E+00 | 6.23853E−01 | −1.44684E+00 |
| H | −2.15896E+00 | 3.91882E−01 | −1.73587E+00 |
| H | −4.23823E−01 | 2.16704E−01 | −2.19151E+00 |
| H | −9.79883E−01 | 1.70694E+00 | −1.33055E+00 |
| H | −3.60282E+00 | 2.91796E+00 | 3.03925E+00 |
| H | −2.20823E+00 | −2.13990E+00 | 3.05318E+00 |
| H | −8.93141E−01 | −2.91350E+00 | 1.26780E+00 |
| C | 2.08537E+00 | −2.16708E+00 | 6.91106E+00 |
| C | 2.26348E+00 | −2.51222E+00 | 5.56598E+00 |
| C | 2.63981E+00 | −2.91624E−01 | 4.97878E+00 |
| C | 2.46333E+00 | 1.30664E+00 | 6.30110E+00 |
| C | 2.18153E+00 | −8.21535E−01 | 7.29080E+00 |
| H | 1.87235E+00 | −2.95228E+00 | 7.64210E+00 |
| H | 2.17463E+00 | −3.54340E+00 | 5.21114E+00 |
| H | 2.90893E+00 | 4.04669E−01 | 4.18085E+00 |
| H | 2.55442E+00 | 1.19367E+00 | 6.54189E+00 |
| H | 2.04440E+00 | −5.21451E−01 | 8.33474E+00 |

TABLE 12 xyz coordinates (in Angstroms) for structures in FIG. 53: exo isomer (3a).

olefin exo (3a)

| | | | |
|---|---|---|---|
| C | 1.51577E+00 | 7.97488E−01 | −8.82461E−01 |
| C | 1.65083E+00 | −5.40666E−01 | −1.00826E+00 |
| O | −3.09073E+00 | −1.55260E+00 | −1.59212E+00 |
| O | −1.94766E+00 | −2.49705E+00 | 1.39336E+00 |
| O | −2.78016E+00 | 7.48375E−01 | 5.42960E−01 |
| O | −2.87026E+00 | 2.06177E+00 | −1.31714E+00 |
| C | 2.36582E−01 | 1.04923E+00 | −9.27080E−02 |
| C | 4.61180E−01 | −1.18911E+00 | −3.06953E−01 |
| C | −7.84719E−01 | −8.86527E−01 | −1.22450E+00 |
| C | −9.50477E−01 | 6.84973E−01 | −1.08638E+00 |
| C | 2.23659E−01 | −1.82496E−01 | 8.46485E−01 |
| H | −7.38888E−01 | −3.23640E−01 | 1.36189E+00 |
| H | 1.05525E+00 | −1.64510E−01 | 1.57030E+00 |
| H | 5.61971E−01 | −2.24993E+00 | −4.06910E−02 |
| H | 2.39764E+00 | −1.07960E+00 | −1.59866E+00 |
| H | 2.12578E+00 | 1.57672E+00 | −1.34817E+00 |
| H | 1.28653E−01 | 2.04266E+00 | 3.68740E−01 |
| H | −8.12345E−01 | 1.18112E+00 | −2.05760E+00 |
| H | −5.62775E−01 | −1.11765E+00 | −2.28038E+00 |
| C | −2.07040E+00 | −1.65545E+00 | −9.22525E−01 |
| C | −2.28889E+00 | 1.12718E+00 | −5.15068E−01 |
| C | −4.14787E+00 | 2.54558E+00 | −8.42355E−01 |
| H | −4.47615E+00 | 3.27879E+00 | −1.59109E+00 |
| H | −4.04053E+00 | 3.01760E+00 | 1.47209E−01 |
| H | −4.86590E+00 | 1.71414E+00 | −7.67602E−01 |
| C | −3.15752E+00 | −3.21777E+00 | 4.68403E−01 |
| H | −2.89484E+00 | −3.84675E+00 | 1.32951E+00 |
| H | −3.48447E+00 | −3.83494E+00 | −3.83243E−01 |
| H | −3.95913E+00 | −2.50991E+00 | 7.29858E−01 |

TABLE 12-continued xyz coordinates (in Angstroms) for structures in FIG. 53: exo isomer (3a).

chelate exo (FIG. 52A)

| | | | |
|---|---|---|---|
| Ru | 2.56860E+00 | −2.69210E+00 | 2.06412E+00 |
| C | 1.71712E+00 | −1.38818E+00 | 1.09789E+00 |
| C | 4.16879E+00 | −3.00884E+00 | 9.24580E−01 |
| N | 5.07949E+00 | −3.99113E+00 | 1.25101E+00 |
| N | 4.69444E+00 | −2.33431E+00 | −1.50400E−01 |
| O | −3.70287E+00 | −3.32121E−01 | 3.34125E+00 |
| O | −1.60105E+00 | 5.45584E−01 | 3.45414E+00 |
| O | −1.18034E+00 | −2.46084E+00 | 4.32821E+00 |
| O | 9.85226E−01 | −2.52826E+00 | 3.68811E+00 |
| Cl | 3.82745E+00 | −1.18276E+00 | 3.45556E+00 |
| Cl | 1.30221E+00 | −4.61624E+00 | 1.31385E+00 |
| C | −1.97426E+00 | −4.71675E−01 | 4.92621E−01 |
| C | 3.02548E−01 | −9.36260E−01 | 1.32734E+00 |
| C | −2.07117E+00 | −1.25883E+00 | 1.87653E+00 |
| C | −6.71240E−01 | −1.89936E+00 | 2.04719E+00 |
| C | 6.33588E+00 | −3.89832E+00 | 4.78774E−01 |
| C | 5.95486E+00 | −2.93131E+00 | −6.50263E−01 |
| H | 5.77275E+00 | −3.44883E+00 | −1.61196E+00 |
| C | 4.07301E+00 | −1.33828E+00 | −9.77281E−01 |
| C | −4.92769E−01 | −6.35767E−01 | 3.15992E−02 |
| C | 4.94760E+00 | −5.00970E+00 | 2.26456E+00 |
| H | 7.14652E+00 | −3.49973E+00 | 1.11705E+00 |
| C | −2.96713E+00 | −9.61022E−01 | −5.26510E−01 |
| C | −3.90014E+00 | −2.00817E−01 | −1.12289E+00 |
| H | −1.25848E+00 | 2.55785E−01 | −5.01239E−01 |
| H | −4.00949E−01 | −1.49641E+00 | −6.56774E−01 |
| C | −2.39291E+00 | −2.62425E−01 | 2.98050E+00 |
| H | −2.16227E+00 | 5.99507E−01 | 6.85204E−01 |
| H | 3.62498E−01 | 7.05167E−04 | 1.92489E+00 |
| H | −4.00881E+00 | 8.64916E−01 | −8.88531E−01 |
| H | −2.88950E+00 | −2.02682E+00 | −7.90472E−01 |
| C | 3.16347E+00 | −1.73579E+00 | −1.98741E+00 |
| C | 2.62384E+00 | −7.38138E−01 | −2.81927E+00 |
| C | 2.96850E+00 | 6.18830E−01 | −2.67883E+00 |
| C | 3.87572E+00 | 9.73713E−01 | −1.66389E+00 |
| C | 4.40309E+00 | −6.26521E−01 | 1.88488E+00 |
| C | 4.29265E+00 | −7.26631E+00 | 2.86321E+00 |
| C | 4.72808E+00 | −7.06852E+00 | 4.18583E+00 |
| C | 5.34494E+00 | −5.84750E+00 | 4.50199E+00 |
| C | 5.49266E+00 | −4.81221E+00 | 3.55882E+00 |
| C | 3.99592E+00 | −6.55196E+00 | 4.57943E−01 |
| C | 6.29227E+00 | −3.58188E+00 | 3.92096E+00 |
| C | 4.54489E+00 | −8.14583E+00 | 5.23285E+00 |
| C | 2.74485E+00 | −3.18057E+00 | −2.14536E+00 |
| C | 2.40073E+00 | 1.66599E+00 | −3.61365E+00 |
| H | 3.68616E+00 | −7.60448E+00 | 3.51661E+00 |
| H | 4.82964E+00 | −6.37537E+00 | −2.46861E−01 |
| H | 7.31028E+00 | −3.63755E+00 | 3.48816E+00 |
| H | 5.81451E+00 | −2.65412E+00 | 3.56860E+00 |
| H | 5.28079E+00 | −8.04802E+00 | 6.04875E+00 |
| H | 4.64525E+00 | −9.15515E+00 | 4.79792E+00 |
| H | 2.07500E+00 | −3.29767E+00 | −3.01298E+00 |
| H | 3.61172E+00 | −3.84817E+00 | −2.30078E+00 |
| C | 4.44606E+00 | 1.66230E−02 | −8.05005E−01 |
| C | 5.39399E+00 | 4.30452E−01 | 2.97860E+00 |
| H | 5.51094E+00 | 1.52623E+00 | 3.18359E−01 |
| H | 5.02872E+00 | 9.69952E−02 | 1.28648E+00 |
| H | 1.40656E+00 | 1.37473E+00 | −3.99249E+00 |
| H | 2.30472E+00 | 2.64480E+00 | −3.11397E+00 |
| H | 6.71047E+00 | −2.14718E+00 | −8.21568E−01 |
| H | 6.64018E+00 | −4.89316E+00 | 1.13555E−01 |
| H | 6.40928E+00 | −3.50548E+00 | 5.01431E+00 |
| H | 3.15042E+00 | −5.91413E+00 | 1.52697E−01 |
| H | 3.53893E+00 | −8.08752E+00 | 5.68904E+00 |
| H | 2.21697E+00 | −3.54906E+00 | −1.24674E+00 |
| H | 3.05536E+00 | 1.81230E+00 | −4.49341E+00 |
| H | 6.39990E+00 | −8.63422E−03 | 1.62058E+00 |
| H | 5.74549E+00 | −5.69359E+00 | 5.51144E+00 |
| H | 3.85853E+00 | −8.23235E+00 | 2.57844E+00 |
| H | 4.14791E+00 | 2.02799E+00 | −1.53134E+00 |
| H | 1.91294E+00 | −1.03306E+00 | −3.60097E+00 |
| H | 2.25684E+00 | −7.67166E−01 | 3.62992E−01 |
| C | −2.02797E−01 | −2.29985E+00 | 3.42112E+00 |
| C | −4.10171E+00 | 6.34315E−01 | 4.34106E+00 |
| H | −3.92595E+00 | 1.66007E+00 | 3.98017E+00 |
| H | −5.17280E+00 | 4.56231E−01 | 4.50500E+00 |

TABLE 12-continued xyz coordinates (in Angstroms) for structures in FIG. 53: exo isomer (3a).

| | | | |
|---|---|---|---|
| H | −3.53278E+00 | 4.82413E−01 | 5.27172E+00 |
| C | −7.44689E−01 | −2.91000E+00 | 5.63989E+00 |
| H | −6.85304E−02 | −2.16603E+00 | 6.08703E+00 |
| H | −2.24450E−01 | −3.87556E+00 | 5.55376E+00 |
| H | −1.66706E+00 | −3.00859E+00 | 6.22635E+00 |
| H | −6.48244E−01 | −2.85222E+00 | 1.47808E+00 |
| H | −2.86833E+00 | −2.01686E+00 | 1.84040E+00 |
| H | −4.58976E+00 | −6.12433E−01 | −1.86683E+00 |
| vacant exo (FIG. 52B) | | | |
| Ru | 3.03309E+00 | −2.71505E+00 | 2.35199E+00 |
| C | 1.93637E+00 | −1.62589E+00 | 1.37604E+00 |
| C | 4.41760E+00 | −3.23564E+00 | 1.08998E+00 |
| N | 5.39056E+00 | −4.15238E+00 | 1.42484E+00 |
| N | 4.72092E+00 | −2.76673E+00 | −1.65666E−01 |
| O | −3.46966E+00 | −2.22773E+00 | 2.16922E+00 |
| O | −2.45060E+00 | 8.20582E−01 | 3.92443E+00 |
| O | −1.45276E+00 | −3.08562E+00 | 1.11275E+00 |
| O | −1.51262E+00 | −2.30280E+00 | 3.25823E+00 |
| Cl | 4.30804E+00 | −1.05355E+00 | 3.45488E+00 |
| Cl | 1.73531E+00 | −4.68862E+00 | 2.42202E+00 |
| C | −1.07301E−01 | 1.39463E+00 | 2.38191E+00 |
| C | 9.13192E−01 | −7.96028E−01 | 2.09389E+00 |
| C | −1.22217E+00 | 4.56240E−01 | 1.82628E+00 |
| C | −5.33121E−01 | −9.28432E−01 | 1.50215E+00 |
| C | 6.49466E+00 | −4.18581E+00 | 4.44094E−01 |
| C | 5.87612E+00 | −3.47246E+00 | −7.66579E−01 |
| H | 5.52847E+00 | −4.18102E+00 | −1.54276E+00 |
| C | 3.95573E+00 | −1.88821E+00 | −1.00516E+00 |
| C | 1.21616E+00 | 7.20711E−01 | 1.95138E+00 |
| C | 5.48991E+00 | −4.91410E+00 | 2.64611E+00 |
| H | 7.37483E+00 | −3.64731E+00 | 8.43822E−01 |
| C | −2.40998E−01 | 2.81945E+00 | 1.91316E+00 |
| C | −4.73695E−01 | 3.87548E+00 | 2.70962E+00 |
| H | 2.07804E+00 | 1.02538E+00 | 2.56473E+00 |
| H | 1.44929E+00 | 9.54390E−01 | 8.93980E−01 |
| C | −2.41163E+00 | 3.78804E−01 | 2.78701E+00 |
| H | −1.85073E−01 | 1.36937E+00 | 3.48341E+00 |
| H | 8.64946E−01 | −1.04363E+00 | 3.17265E+00 |
| H | −5.91189E−01 | 3.75914E+00 | 3.79275E+00 |
| H | −1.37561E−01 | 2.97450E+00 | 8.27318E−01 |
| C | 2.92233E+00 | −2.42028E+00 | −1.81367E+00 |
| C | 2.23033E+00 | −1.53948E+00 | −2.66507E+00 |
| C | 2.54246E+00 | −1.69173E−01 | −2.73390E+00 |
| C | 3.57455E+00 | 3.21095E−01 | −1.91237E+00 |
| C | 4.93884E+00 | −6.22258E+00 | 2.66582E+00 |
| C | 5.05047E+00 | −6.97102E+00 | 3.84749E+00 |
| C | 5.70412E+00 | −6.47119E+00 | 4.98936E+00 |
| C | 6.30728E+00 | −5.20657E+00 | 4.90544E+00 |
| C | 6.23832E+00 | −4.41686E+00 | 3.74149E+00 |
| C | 4.28068E+00 | −6.82167E+00 | 1.44421E+00 |
| C | 7.03248E+00 | −3.13208E+00 | 3.66845E+00 |
| C | 5.75761E+00 | −7.27948E+00 | 6.26737E+00 |
| C | 2.52582E+00 | −3.87783E+00 | −1.72554E+00 |
| C | 1.80605E+00 | 7.49250E−01 | −3.68577E+00 |
| H | 4.03971E+00 | −7.88280E+00 | 1.61943E+00 |
| H | 4.93851E+00 | −6.76767E+00 | 5.57392E−01 |
| H | 8.05165E+00 | −3.33241E+00 | 3.28353E+00 |
| H | 6.55645E+00 | −2.37734E+00 | 3.02663E+00 |
| H | 6.58664E+00 | −6.95452E+00 | 6.91785E+00 |
| H | 5.88307E+00 | −8.35640E+00 | 6.06089E+00 |
| H | 1.69750E+00 | −4.09718E+00 | −2.41828E+00 |
| H | 3.36188E+00 | −4.55321E+00 | −1.98248E+00 |
| C | 4.29926E+00 | −5.16210E−01 | −1.04512E+00 |
| C | 5.39173E+00 | 4.06975E−02 | −1.60749E+00 |
| H | 5.50983E+00 | 1.12419E+00 | −3.23588E−01 |
| H | 5.16844E+00 | −1.29390E−01 | 9.07746E−01 |
| H | 8.00557E−01 | 3.63957E−01 | −3.92376E+00 |
| H | 1.69530E+00 | 1.76330E+00 | −3.26566E+00 |
| H | 6.56050E+00 | −2.75017E+00 | −1.24045E+00 |
| H | 6.79010E+00 | −5.22592E+00 | 2.30832E−01 |
| H | 7.14456E+00 | −2.68534E+00 | 4.66941E+00 |
| H | 3.34385E+00 | −6.29328E+00 | 1.20202E+00 |
| H | 4.82128E+00 | −7.16640E+00 | 6.84467E+00 |
| H | 2.19850E+00 | −4.14337E+00 | −7.04106E−01 |
| H | 2.35258E+00 | 8.51984E−01 | −4.64196E+00 |
| H | 6.36754E+00 | −4.36796E−01 | −3.65791E−01 |
| H | 6.86491E+00 | −4.81933E+00 | 5.76680E+00 |

TABLE 12-continued xyz coordinates (in Angstroms) for structures in FIG. 53: exo isomer (3a).

| | | | |
|---|---|---|---|
| H | 4.61488E+00 | −7.97704E+00 | 3.87491E+00 |
| H | 3.82679E+00 | 1.38796E+00 | −1.94614E+00 |
| H | 1.42113E+00 | −1.93785E+00 | −3.28911E+00 |
| H | 1.96508E+00 | −1.50795E+00 | 2.79770E−01 |
| C | −1.22859E+00 | −2.15548E+00 | 2.07629E+00 |
| C | −4.61758E+00 | −4.27499E−01 | 3.02465E+00 |
| H | −4.97515E+00 | 5.32467E−01 | 3.42881E+00 |
| H | −5.38004E+00 | −8.89125E−01 | 2.38258E+00 |
| H | −4.35014E+00 | −1.09551E+00 | 3.85814E+00 |
| C | −1.98853E+00 | −4.33891E+00 | 1.60374E+00 |
| H | −2.90513E+00 | −4.16322E+00 | 2.18771E+00 |
| H | −1.23542E+00 | −4.83834E+00 | 2.23257E+00 |
| H | −2.20174E+00 | −4.93321E+00 | 7.05178E−01 |
| H | −4.60149E−01 | −1.04603E+00 | 4.08351E−01 |
| H | −1.62214E+00 | 8.50851E−01 | 8.74967E−01 |
| H | −5.62342E−01 | 4.89060E+00 | 2.30853E+00 |
| olefin adduct exo (FIG. 52C) | | | |
| Ru | 2.73883E+00 | −2.97367E+00 | 2.66814E+00 |
| C | 1.61472E+00 | −1.96591E+00 | 1.62172E+00 |
| C | 4.25302E+00 | −3.32244E+00 | 1.26000E+00 |
| C | 1.86029E+00 | −2.47878E+00 | 4.79128E+00 |
| C | 9.76582E−01 | −3.39680E+00 | 4.22805E+00 |
| N | 5.33434E+00 | −4.09009E+00 | 1.58971E+00 |
| N | 4.39625E+00 | −2.96305E+00 | −4.76807E−02 |
| O | −3.23978E+00 | 6.18223E−01 | 2.42301E+00 |
| O | −1.60718E+00 | 1.08758E+00 | 3.94606E+00 |
| O | −2.00026E+00 | −2.39358E+00 | 5.21051E−01 |
| O | −1.83272E+00 | −2.08593E+00 | 2.77436E+00 |
| O | 1.30955E+00 | −6.44831E+00 | 7.60410E+00 |
| O | −9.11108E−01 | −6.12536E+00 | 7.20828E+00 |
| O | 3.46159E+00 | −4.13098E+00 | 8.47917E+00 |
| O | 1.35729E+00 | −3.95197E+00 | 9.34124E+00 |
| Cl | 4.09274E+00 | −1.07523E+00 | 3.46091E+00 |
| Cl | 1.70669E+00 | −5.02188E+00 | 1.71572E+00 |
| C | 2.86755E−01 | 1.62149E+00 | 1.81873E+00 |
| C | 8.10929E−01 | −7.61679E−01 | 2.01750E+00 |
| C | −1.03071E+00 | 8.01222E−01 | 1.57362E+00 |
| C | −5.47821E−01 | −6.63244E−01 | 1.26142E+00 |
| C | 6.33657E+00 | −4.18752E+00 | 5.02673E−01 |
| C | 5.58857E+00 | −3.57752E+00 | −6.90392E−01 |
| H | 5.26594E+00 | −4.33712E+00 | −1.42493E+00 |
| C | 3.59308E+00 | −2.09098E+00 | −8.64089E−01 |
| C | 1.45136E+00 | 6.04079E−01 | 1.64659E+00 |
| C | 5.64870E+00 | −4.66347E+00 | 2.87729E+00 |
| H | 7.24214E+00 | −3.61682E+00 | 7.79026E−01 |
| C | 4.12054E−01 | 2.82049E+00 | 9.16802E−01 |
| C | 5.20347E−01 | 4.09288E+00 | 1.33370E+00 |
| H | 2.31969E+00 | 8.31733E−01 | 2.28184E+00 |
| H | 1.79292E+00 | 5.76042E−01 | 5.95665E−01 |
| C | −1.95105E+00 | 8.59082E−01 | 2.79486E+00 |
| H | 2.66036E−01 | 1.95503E+00 | 2.87066E+00 |
| H | 6.07136E−01 | −7.63842E−01 | 3.10270E+00 |
| H | 5.18357E−01 | 4.34855E+00 | 2.39973E+00 |
| H | 4.21450E−01 | 2.60617E+00 | −1.63492E−01 |
| C | 2.61886E+00 | −2.64347E+00 | −1.73243E+00 |
| C | 1.91558E+00 | −1.76549E+00 | −2.57857E+00 |
| C | 2.17639E+00 | −3.84197E−01 | −2.60906E+00 |
| C | 3.17503E+00 | 1.21133E−01 | −1.75673E+00 |
| C | 5.30672E+00 | −6.01867E+00 | 3.12800E+00 |
| C | 5.60182E+00 | −6.55026E+00 | 4.39602E+00 |
| C | 6.23423E+00 | −5.79220E+00 | 5.39770E+00 |
| C | 6.66267E+00 | −4.49477E+00 | 5.06921E+00 |
| C | 6.41410E+00 | −3.91800E+00 | 3.81117E+00 |
| C | 4.66021E+00 | −6.88713E+00 | 2.07429E+00 |
| C | 7.04861E+00 | −2.58897E+00 | 3.46852E+00 |
| C | 6.43404E+00 | −6.34242E+00 | 6.79194E+00 |
| C | 2.32941E+00 | −4.12680E+00 | −1.76411E+00 |
| C | 1.43599E+00 | 5.26935E−01 | −3.56533E+00 |
| H | 4.52504E+00 | −7.91304E+00 | 2.45394E+00 |
| H | 5.28166E+00 | −6.95048E+00 | 1.16133E+00 |
| H | 8.07932E+00 | −2.74976E+00 | 3.09505E+00 |
| H | 6.47814E+00 | −2.03154E+00 | 2.71349E+00 |
| H | 7.40846E+00 | −6.03913E+00 | 7.21248E+00 |
| H | 6.37732E+00 | −7.44363E+00 | 6.80720E+00 |
| H | 1.43951E+00 | −4.33266E+00 | −2.38103E+00 |
| H | 3.17045E+00 | −4.69366E+00 | −2.20673E+00 |
| C | 3.90218E+00 | −7.08393E−01 | −8.82940E−01 |

TABLE 12-continued xyz coordinates (in Angstroms) for structures in FIG. 53: exo isomer (3a).

| | | | |
|---|---|---|---|
| C | 4.98774E+00 | −1.31888E−01 | −3.75449E−03 |
| H | 5.07951E+00 | 9.54702E−01 | −1.63722E−01 |
| H | 4.78520E+00 | −3.11501E−01 | 1.06781E+00 |
| H | 4.40104E−01 | 1.25740E−01 | −3.81741E+00 |
| H | 1.30295E+00 | 1.53716E+00 | −3.14230E+00 |
| H | 6.17068E+00 | −2.80715E+00 | −1.22176E+00 |
| H | 6.62474E+00 | −5.23901E+00 | 3.42121E−01 |
| H | 7.11881E+00 | −1.94658E+00 | 4.36051E+00 |
| H | 3.67347E+00 | −6.49154E+00 | 1.77599E+00 |
| H | 5.65053E+00 | −5.95503E+00 | 7.46932E+00 |
| H | 2.15365E+00 | −4.53335E+00 | −7.51676E−01 |
| H | 1.99160E+00 | 6.43898E−01 | −4.51472E+00 |
| H | 5.97235E+00 | −5.84443E−01 | −2.26611E−01 |
| H | 7.21572E+00 | −3.90823E+00 | 5.81272E+00 |
| H | 5.31404E+00 | −7.58672E+00 | 4.60889E+00 |
| H | 3.40596E+00 | 1.19328E+00 | −1.77512E+00 |
| H | 1.14752E+00 | −2.18147E+00 | −3.24189E+00 |
| H | 1.42329E+00 | −2.31784E+00 | 5.88487E−01 |
| C | −1.52392E+00 | −1.76895E+00 | 1.62970E+00 |
| C | −4.17057E+00 | 5.22539E−01 | 3.52678E+00 |
| H | −4.15285E+00 | 1.44454E+00 | 4.12830E+00 |
| H | −5.15583E+00 | 3.76548E−01 | 3.06373E+00 |
| H | −3.90611E+00 | −3.35005E−01 | 4.16458E+00 |
| C | −2.88820E+00 | −3.50609E−01 | 7.89319E−01 |
| H | −3.74108E+00 | −3.17883E−01 | 1.40374E+00 |
| H | −2.34348E+00 | −4.30503E−01 | 1.31578E+00 |
| H | −3.22435E+00 | −3.85093E+00 | −1.97375E−01 |
| H | −3.46816E−01 | −7.28513E−01 | 1.77862E−01 |
| H | −1.60489E+00 | 1.17903E+00 | 7.11146E−01 |
| H | 6.16685E−01 | 4.92503E+00 | 6.28438E−01 |
| C | 2.63264E+00 | −3.21522E+00 | 5.88243E+00 |
| C | 1.18587E+00 | −4.70973E+00 | 4.97483E+00 |
| C | 5.55538E−01 | −4.44164E+00 | 6.41242E+00 |
| C | 1.59579E+00 | −3.42282E+00 | 7.04088E−03 |
| C | 2.69009E+00 | −4.64770E+00 | 5.30699E+00 |
| H | 3.00944E+00 | −5.39827E+00 | 6.04518E+00 |
| H | 3.32943E+00 | −4.74328E+00 | 4.40966E+00 |
| H | 8.09292E−01 | −5.61240E+00 | 4.47515E+00 |
| H | 4.74024E−02 | −3.15724E+00 | 3.70600E+00 |
| H | 1.75670E+00 | −1.39198E+00 | 4.79061E+00 |
| H | 3.57823E+00 | −2.76138E+00 | 6.20410E+00 |
| H | 1.06448E+00 | −2.48743E+00 | 7.29034E+00 |
| H | −4.40090E−01 | −3.98327E+00 | 6.31815E+00 |
| C | 4.01746E+00 | −5.75617E+00 | 7.15568E+00 |
| C | 2.27198E+00 | −3.89301E+00 | 8.32812E+00 |
| C | 1.88686E+00 | −4.44525E+00 | 1.05918E+01 |
| H | 1.04690E+00 | −4.40741E+00 | 1.12989E+01 |
| H | 2.71801E+00 | −3.81148E+00 | 1.09391E+01 |
| H | 2.24730E+00 | −5.47856E+00 | 1.04673E+01 |
| C | −1.14700E+00 | −7.40971E+00 | 7.82686E+00 |
| H | −2.23494E+00 | −7.55512E+00 | 7.78793E+00 |
| H | −7.90457E−01 | −7.40804E+00 | 8.86915E+00 |
| H | −6.26427E−01 | −8.20807E+00 | 7.27428E+00 |
| metallacyclobutane exo (FIG. 52D) | | | |
| Ru | 2.79827E+00 | −3.19662E+00 | 2.28691E+00 |
| C | 7.94338E−01 | −2.74882E+00 | 2.25230E+00 |
| C | 4.56579E+00 | −3.20713E+00 | 1.26221E+00 |
| C | 2.44357E+00 | −3.88923E+00 | 4.09447E+00 |
| C | 9.85875E−01 | −3.22192E+00 | 3.72425E+00 |
| N | 5.62308E+00 | −3.92811E+00 | 1.72811E+00 |
| N | 4.93922E+00 | −2.56671E+00 | 1.25610E−01 |
| O | −2.85137E+00 | 1.31721E+00 | 3.18429E+00 |
| O | −7.53097E−01 | 2.08650E+00 | 2.73441E+00 |
| O | −3.00529E+00 | −2.00376E+00 | 3.61803E+00 |
| O | −1.23591E+00 | −9.65080E−01 | 4.61854E+00 |
| O | −1.19478E+00 | −6.52338E+00 | 6.07945E+00 |
| O | −1.99015E+00 | −4.54913E+00 | 6.88658E+00 |
| O | 2.08302E+00 | −7.41534E+00 | 6.53701E+00 |
| O | 1.00681E+00 | −6.12041E+00 | 8.07575E+00 |
| Cl | 3.35953E+00 | −1.09507E+00 | 3.39277E+00 |
| Cl | 2.21207E+00 | −5.07201E+00 | 8.04586E−01 |
| C | −5.20535E+00 | 3.63870E−01 | 4.32099E+00 |
| C | 2.70152E−01 | −1.34253E+00 | 2.02538E+00 |
| C | −1.63292E+00 | 1.36808E+00 | 1.51790E+00 |
| C | −1.27410E+00 | −1.24445E+00 | 2.18677E+00 |
| C | 6.85464E+00 | −3.68676E+00 | 9.36583E−01 |
| C | 6.31550E+00 | −2.94175E+00 | −2.94349E−01 |

TABLE 12-continued xyz coordinates (in Angstroms) for structures in FIG. 53: exo isomer (3a).

| | | | |
|---|---|---|---|
| H | 6.26869E+00 | −3.58292E+00 | −1.19293E+00 |
| C | 4.19609E+00 | −1.64310E+00 | −7.00103E−01 |
| C | 4.49528E−01 | −8.42903E−01 | 5.75134E−01 |
| C | 5.67312E+00 | −4.78111E+00 | 2.89417E+00 |
| H | 7.56817E+00 | −3.08023E+00 | 1.52406E+00 |
| C | −1.10752E+00 | 5.27347E−01 | −9.45682E−01 |
| C | −1.14272E+00 | 1.67784E+00 | −1.64108E+00 |
| H | 1.49275E+00 | −5.65418E−01 | 3.57265E−01 |
| H | 1.69531E−01 | −1.64979E+00 | −1.30419E−01 |
| C | −1.65513E+00 | 1.28853E+00 | 2.52661E+00 |
| H | 1.31338E−02 | 1.28753E+00 | 7.13910E−01 |
| H | 7.50801E−01 | −6.40301E−01 | 2.72726E+00 |
| H | −7.11503E−01 | 2.60298E+00 | −1.24048E+00 |
| H | −1.55982E+00 | −3.76347E−01 | −1.38362E+00 |
| C | 3.49249E+00 | −2.12524E+00 | −1.83244E+00 |
| C | 2.86903E+00 | −1.18218E+00 | −2.66963E+00 |
| C | 2.95162E+00 | 2.01287E−01 | −2.43645E+00 |
| C | 3.70300E+00 | 6.41847E−01 | −1.33278E+00 |
| C | 5.49344E+00 | −6.17816E+00 | 2.72310E+00 |
| C | 5.56699E+00 | −6.99733E+00 | 3.86283E+00 |
| C | 5.83330E+00 | −6.47840E+00 | 5.14333E+00 |
| C | 6.08358E+00 | −5.10046E+00 | 5.25744E+00 |
| C | 6.02875E+00 | −4.23141E+00 | 4.15081E+00 |
| C | 5.24578E+00 | −6.79135E+00 | 1.36509E+00 |
| C | 6.36655E+00 | −2.76853E+00 | 4.32275E+00 |
| C | 5.83142E+00 | −7.38141E+00 | 6.35694E+00 |
| C | 3.43772E+00 | −3.59411E+00 | −2.18210E+00 |
| C | 2.25207E+00 | 1.18605E+00 | −3.34590E+00 |
| H | 5.16210E+00 | −7.88703E+00 | 1.44828E+00 |
| H | 6.07006E+00 | −6.57466E+00 | 6.59921E−01 |
| H | 7.21277E+00 | −2.46683E+00 | 3.67808E+00 |
| H | 5.51254E+00 | −2.11396E+00 | 4.07083E+00 |
| H | 6.33524E+00 | −6.90727E+00 | 7.21587E+00 |
| H | 6.33575E+00 | −8.34106E+00 | 6.14869E+00 |
| H | 2.77777E+00 | −3.75762E+00 | −3.04963E+00 |
| H | 4.43712E+00 | −3.98290E+00 | −2.45542E+00 |
| C | 4.34618E+00 | −2.53345E−01 | −4.59216E−01 |
| C | 5.19618E+00 | 2.72528E−01 | 6.73687E−01 |
| H | 5.24636E+00 | 1.37282E+00 | 6.37511E−01 |
| H | 4.78458E+00 | −2.49697E−02 | 1.65430E+00 |
| H | 2.18273E+00 | 8.03918E−01 | −4.37865E+00 |
| H | 1.22079E+00 | 1.37302E+00 | −2.99159E+00 |
| H | 6.89248E+00 | −2.03664E+00 | −5.41717E−01 |
| H | 7.33688E+00 | −4.64498E+00 | 6.85940E−01 |
| H | 6.65992E+00 | −2.56332E+00 | 5.36526E+00 |
| H | 4.31400E+00 | −6.40268E+00 | 9.18719E−01 |
| H | 4.79371E+00 | −7.61648E+00 | 6.65745E+00 |
| H | 3.06446E+00 | −4.20313E+00 | −1.34073E+00 |
| H | 2.77587E+00 | 2.15664E+00 | −3.37122E+00 |
| H | 6.23241E+00 | −1.10520E−01 | 6.21454E−01 |
| H | 6.34260E+00 | −4.68172E+00 | 6.23755E+00 |
| H | 5.40893E+00 | −8.07576E+00 | 3.74306E+00 |
| H | 3.81041E+00 | 1.71795E+00 | −1.15110E+00 |
| H | 2.31785E+00 | −1.54630E+00 | −3.54509E+00 |
| H | 2.80635E−01 | −3.50073E+00 | 1.62705E+00 |
| C | −1.79563E+00 | −1.37633E+00 | 3.60823E+00 |
| C | −2.92777E+00 | 2.31063E+00 | 4.23424E+00 |
| H | −2.72449E+00 | 3.31467E+00 | 3.83088E+00 |
| H | −3.95376E+00 | 2.24551E+00 | 4.62113E+00 |
| H | −2.19532E+00 | 2.08101E+00 | 5.02363E+00 |
| C | −3.63661E+00 | −2.07423E+00 | 4.91905E+00 |
| H | −3.76565E+00 | −1.06203E+00 | 5.33287E+00 |
| H | −3.02799E+00 | −2.67665E+00 | 5.61102E+00 |
| H | −4.61129E+00 | −2.54786E+00 | 4.73915E+00 |
| H | −1.75149E+00 | −2.03143E+00 | 1.57482E+00 |
| H | −2.64254E+00 | 6.86539E−02 | 1.07959E+00 |
| H | −1.61306E+00 | 1.74061E+00 | −2.62819E+00 |
| C | 2.09935E+00 | −5.30193E+00 | 4.56814E+00 |
| C | 5.78226E−02 | −4.41214E+00 | 4.15301E+00 |
| C | 9.03988E−02 | −4.46427E+00 | 5.72771E+00 |
| C | 1.52390E+00 | −5.08325E+00 | 6.00416E+00 |
| C | 8.34819E−01 | −5.68806E+00 | 3.78189E+00 |
| H | 3.50147E−01 | −6.59308E+00 | 4.18045E+00 |
| H | 1.01465E+00 | −5.79817E+00 | 2.70433E+00 |
| H | −9.62254E−01 | −4.31604E+00 | 3.74727E+00 |
| H | 9.02787E−01 | −2.32122E+00 | 4.35407E+00 |
| H | 2.98000E+00 | −3.27472E+00 | 4.83754E+00 |
| H | 2.94145E+00 | −6.00773E+00 | 4.54610E+00 |

TABLE 12-continued xyz coordinates (in Angstroms) for structures in FIG. 53: exo isomer (3a).

| | | | |
|---|---|---|---|
| H | 2.11512E+00 | −4.33788E+00 | 6.56850E+00 |
| H | −7.26832E−03 | −3.45739E+00 | 6.16120E+00 |
| C | −1.06121E+00 | −5.31609E+00 | 6.23895E+00 |
| C | 1.56347E+00 | −6.35423E+00 | 6.85087E+00 |
| C | 9.70560E−01 | −7.27462E+00 | 8.94564E+00 |
| H | 5.30666E−01 | −6.91618E+00 | 9.88616E+00 |
| H | 1.98629E+00 | −7.66542E+00 | 9.11409E+00 |
| H | 3.48469E−01 | −8.06564E+00 | 8.49839E+00 |
| C | −3.12938E+00 | −5.28962E+00 | 7.38469E+00 |
| H | −3.76176E+00 | −4.54552E+00 | 7.88702E+00 |
| H | −2.80014E+00 | −6.06460E+00 | 8.09405E+00 |
| H | −3.67214E+00 | −5.77235E+00 | 6.55673E+00 | pyridine adduct exo (FIG. 52E)

| | | | |
|---|---|---|---|
| Ru | 2.96707E+00 | −2.90511E+00 | 2.66262E+00 |
| C | 1.79328E+00 | −1.91159E+00 | 1.66108E+00 |
| C | 4.36426E+00 | −3.23431E+00 | 1.22604E+00 |
| N | 5.45116E+00 | −4.02733E+00 | 1.51631E+00 |
| N | 4.57620E+00 | −2.73406E+00 | −3.19151E−02 |
| N | 1.79169E+00 | −2.84941E+00 | 4.56149E+00 |
| O | −3.34125E+00 | 3.12413E−01 | 2.28019E+00 |
| O | −1.92025E+00 | 7.83741E−01 | 4.00223E+00 |
| O | −1.49726E+00 | −2.73309E+00 | 4.90717E−01 |
| O | −1.84248E+00 | −2.27069E+00 | 2.69812E+00 |
| Cl | 4.26023E+00 | −1.01863E+00 | 3.49765E+00 |
| Cl | 1.82025E+00 | −5.01210E+00 | 2.21354E+00 |
| C | 1.70198E−01 | 1.51007E+00 | 2.12939E+00 |
| C | 8.70924E−01 | −8.27772E−01 | 2.13879E+00 |
| C | −1.06439E+00 | 6.40004E−01 | 1.70092E+00 |
| C | −4.71366E−01 | −7.70140E−01 | 1.33947E+00 |
| C | 6.51559E+00 | −3.96025E+00 | 4.91840E−01 |
| C | 5.79815E+00 | −3.27227E+00 | −6.77551E−01 |
| H | 5.52149E+00 | −3.97872E+00 | −1.48331E+00 |
| C | 3.69519E+00 | −1.94734E+00 | −8.49702E−01 |
| C | 1.41300E+00 | 6.08271E−01 | 1.89525E+00 |
| C | 5.67700E+00 | −4.78498E+00 | 2.72371E+00 |
| H | 7.36952E+00 | −3.36720E+00 | 8.69502E−01 |
| C | 2.44984E−01 | 2.82932E+00 | 1.40822E+00 |
| C | 2.23687E−01 | 4.03566E+00 | 1.99890E+00 |
| H | 2.25193E+00 | 8.47442E−01 | 2.56517E+00 |
| H | 1.77084E+00 | 6.95379E−01 | 8.51583E−01 |
| C | −2.11606E+00 | 5.88468E−01 | 2.81135E+00 |
| H | 6.99553E−02 | 1.69191E+00 | 3.21393E+00 |
| H | 6.49318E−01 | −9.35827E−01 | 3.21432E+00 |
| H | 1.41845E−01 | 4.13872E+00 | 3.08715E+00 |
| H | 3.30640E−01 | 2.76963E+00 | 3.11692E−01 |
| C | 2.70365E+00 | −2.59404E+00 | −1.62767E+00 |
| C | 1.90639E+00 | −1.80129E+00 | −2.47384E+00 |
| C | 2.07928E+00 | −4.08869E−01 | −2.57410E+00 |
| C | 3.08014E+00 | 1.95429E−01 | −1.79099E+00 |
| C | 5.26968E+00 | −6.14634E+00 | 2.75301E+00 |
| C | 5.49888E+00 | −6.88361E+00 | 3.92580E+00 |
| C | 6.14437E+00 | −6.32719E+00 | 5.04531E+00 |
| C | 6.62278E+00 | −5.01146E+00 | 4.94372E+00 |
| C | 6.42958E+00 | −4.22798E+00 | 3.78916E+00 |
| C | 4.65502E+00 | −6.81518E+00 | 1.54608E+00 |
| C | 7.11137E+00 | −2.88254E+00 | 3.68471E+00 |
| C | 6.32973E+00 | −7.13274E+00 | 6.31303E+00 |
| C | 2.46886E+00 | −4.08475E+00 | −1.52436E+00 |
| C | 1.23552E+00 | 4.13647E−01 | −3.52506E+00 |
| H | 4.51220E+00 | −7.89161E+00 | 1.73569E+00 |
| H | 5.30032E+00 | −6.71426E+00 | 6.53857E−01 |
| H | 8.09785E+00 | −2.99079E+00 | 3.19242E+00 |
| H | 6.51318E+00 | −2.15018E+00 | 3.12349E+00 |
| H | 7.13505E+00 | −6.71849E+00 | 6.94246E+00 |
| H | 6.57408E+00 | −8.18616E+00 | 6.09141E+00 |
| H | 1.68560E+00 | −4.40230E+00 | −2.23176E+00 |
| H | 3.38126E+00 | −4.66415E+00 | −1.75441E+00 |
| C | 3.90359E+00 | −5.49707E−01 | −9.26810E−01 |
| C | 4.96768E+00 | 1.28853E−01 | −9.43302E−02 |
| H | 4.93627E+00 | 1.22106E−01 | −2.38631E−01 |
| H | 4.83669E+00 | −8.78506E−02 | 9.80874E−01 |
| H | 2.71509E−01 | −7.74136E−02 | −3.73900E+00 |
| H | 1.02656E+00 | 1.41730E+00 | −3.11699E+00 |
| H | 6.38673E+00 | −2.45541E+00 | −1.12646E+00 |
| H | 6.87922E+00 | −4.97114E+00 | 2.43860E−01 |
| H | 7.29485E+00 | −2.45943E+00 | 4.68587E+00 |
| H | 3.67346E+00 | −6.37251E+00 | 1.30808E+00 |
| H | 5.40470E+00 | −7.13599E+00 | 6.91909E+00 |
| H | 2.15400E+00 | −4.37954E+00 | −5.05425E−01 |
| H | 1.75175E+00 | 5.58623E−01 | −4.49266E+00 |
| H | 5.98248E+00 | −2.13219E−01 | −3.71322E−01 |
| H | 7.18576E+00 | −4.57843E+00 | 5.77976E+00 |
| H | 5.17074E+00 | −7.92956E+00 | 3.95921E+00 |
| H | 3.23062E+00 | 1.28018E+00 | −1.85453E+00 |
| H | 1.12792E+00 | −2.29019E+00 | −3.07199E+00 |
| H | 1.68977E+00 | −2.13521E+00 | 5.82809E−01 |
| C | −1.35635E+00 | −1.97423E+00 | 1.61120E+00 |
| C | −4.38504E+00 | 1.21720E−01 | 3.26164E+00 |
| H | −4.48802E+00 | 1.01531E+00 | 3.89701E+00 |
| H | −5.30162E+00 | −5.26799E−02 | 2.68171E+00 |
| H | −4.14958E100 | −7.49285E−01 | 3.89267E+00 |
| C | −2.20544E+00 | −3.98128E+00 | 6.85446E+00 |
| H | −3.15753E+00 | −3.80833E+00 | 1.20985E+00 |
| H | −1.58017E+00 | −4.67513E+00 | 1.26970E+00 |
| H | −2.37699E+00 | −4.37764E+00 | −3.24206E−01 |
| H | −2.20666E−01 | −7.68307E−01 | 2.64477E−01 |
| H | −1.56324E+00 | 1.04777E+00 | 8.05348E−01 |
| H | 2.88753E−01 | 4.96290E+00 | 1.41989E+00 |
| C | 5.11646E−01 | −3.29350E+00 | 4.64466E+00 |
| C | −1.73730E−01 | −3.40599E+00 | 5.85905E+00 |
| C | 4.84532E−01 | −3.07008E+00 | 7.04886E+00 |
| C | 1.81069E+00 | −2.62208E+00 | 6.97139E+00 |
| C | 2.42341E+00 | −2.51976E+00 | 5.71815E+00 |
| H | 3.66767E−02 | −3.56422E+00 | 3.70197E+00 |
| H | −1.21188E+00 | −3.74828E+00 | 5.85494E+00 |
| H | −2.48725E−02 | −3.15091E+00 | 8.01454E+00 |
| H | 2.37261E+00 | −2.34353E+00 | 7.86754E+00 |
| H | 3.44382E+00 | −2.14491E+00 | 5.60322E+00 |

REFERENCES CORRESPONDING TO EXAMPLE 2B (1) Sveinbjörnsson, B. R.; Weitekamp, R. A.; Miyake, G. M.; Xia, Y.; Atwater, H. A.; Grubbs, R. H. Proc. Natl. Acad. Sci. U.S.A. 2012, 109, 14332-14336.

(2) Lin, T.-P.; Chang, A. B.; Chen, H.-Y.; Liberman-Martin, A. L.; Bates, C. M.; Voegtle, M. J.; Bauer, C. A.; Grubbs, R. H. J. Am. Chem. Soc. 2017, 139, 3896-3903.

(3) Bates, C. M.; Chang, A. B.; Momčilović, N.; Jones, S. C.; Grubbs, R. H. Macromolecules 2015, 48, 4967-4973.

(4) Love, J. A.; Morgan, J. P.; Trnka, T. M.; Grubbs, R. H. Angew. Chem. Int. Ed. 2002, 41, 4035-4037.

(5) Neese, F. Wiley Interdiscip. Rev.: Comput. Mol. Sci. 2017, e1327.

Example 3A: Effects of Grafting Density on Block Polymer Self-Assembly: From Linear to Bottlebrush Abstract: Grafting density is an important structural parameter that impacts the physical properties of architecturally complex polymers. In this example, the physical consequences of varying the grafting density (z) are contemplated in the context of block polymer self-assembly. Well-defined block polymers spanning the linear, comb, and bottlebrush regimes ($0 \leq z \leq 1$) are prepared via grafting-through ring-opening-metathesis polymerization (ROMP). ω-norbornenyl poly($_{D,L}$-lactide) (PLA) and polystyrene (PS) macromonomers are copolymerized with discrete co-monomers in different feed ratios, enabling precise control over both the grafting density and molecular weight. Small-angle X-ray scattering (SAXS) experiments demonstrate that these graft block polymers self-assemble into long-range-ordered lamellar structures. For seventeen series of block polymers with variable z, the scaling of the lamellar period with the total backbone degree of polymerization ($d^* \sim N_{bb}^\alpha$) are studied. The scaling exponent $\alpha$ monotonically decreases with decreasing z and exhibits an apparent transition at $z \approx 0.2$, suggesting significant changes in the chain conformations. Comparison of two block polymer systems, one that is strongly segregated for all z (System I) and one that experiences weak segregation at low z (System II), indicates that the observed trends are primarily motivated by the polymer architectures, not segregation effects. A model is contemplated in which the characteristic ratio ($C_\infty$), a proxy for the backbone stiffness, scales with $N_{bb}$ as a function of the grafting density: $C_\infty \sim N_{bb}^{f(z)}$. To the best of our knowledge, this report represents the first study of scaling behavior for the self-assembly of block polymers with variable grafting density. The scaling behavior disclosed herein provides valuable insights into conformational changes with grafting density, thus introducing new opportunities for block polymer and materials design.

Introduction: Block polymer self-assembly is a powerful process that connects molecular and materials design.[1-6] Due to their covalently linked yet chemically distinct blocks, block polymers provide access to a wide range of periodic structures by balancing competing entropic and enthalpic demands. Linear AB diblock polymers feature the simplest possible block connectivity and architecture, yet they still afford rich opportunities to tune structure and properties through the block volume fraction (f), binary block-block interaction parameter ($\chi$), and total degree of polymerization (N). Due to this versatility, the self-assembly of block polymers has been exploited in many practical applications spanning all areas of science and technology.

Recent advances in polymer chemistry have enabled the precise synthesis of polymers with non-linear architectures.[7-8] Introducing architectural complexity expands the opportunities for block polymer design. We recently reported the efficient synthesis of graft polymers with controlled grafting density (z), defined as the average number of polymer side chains per backbone repeat unit.[9] In the present report, we study the effects of grafting density on the scaling of the lamellar period ($d^*$) with the total backbone degree of polymerization ($N_{bb}$). The scaling of $d^*$ reflects steric demands and penalties to chain stretching, thus providing valuable insight into the physical consequences of varying polymer architectures. In addition, $d^*$ is an attractive parameter to study because it has an unambiguous physical definition (unlike potentially model-dependent parameters such as $\chi$) and can be directly measured by scattering and electron microscopy.[10]

Figure 36:
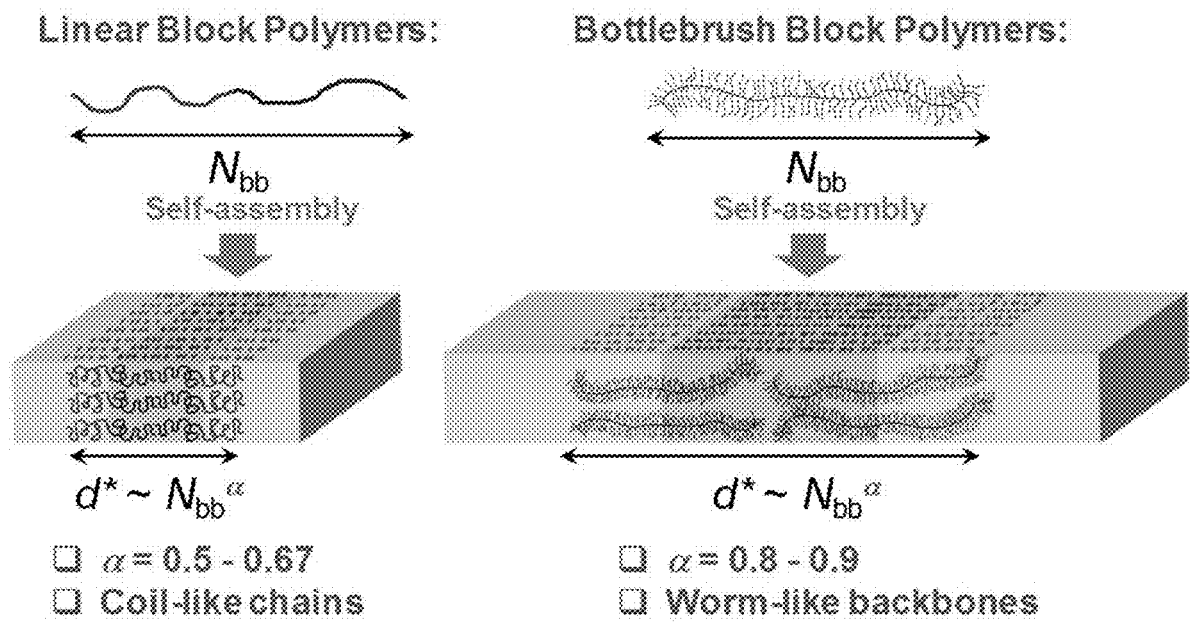
FIG. 36. Illustrations of exemplary copolymers (left: linear; right: bottlebrush-type graft block copolymer) and corresponding lamellar self-assembled structures therewith.

FIG. 36 (left side) illustrates the self-assembly of linear (z=0) diblock polymers into lamellar morphologies. For symmetric linear diblock polymers, arguments based on free energy demands accurately predict the scaling behavior ($d^* \sim N_{bb}^\alpha$). The scaling exponent $\alpha$ is ½ in the weak segregation limit ($\chi N_{bb} \approx 10.5$) and plateaus at ⅔ in the strong segregation limit ($\chi N_{bb} \gg 10.5$).[11-12] The small scaling exponent is intrinsically related to the coil-like chain conformations. In contrast, reports of scaling behavior for block polymers with bottlebrush (z=1) and other complex, non-linear architectures are limited due to the synthetic challenges associated with (1) precisely controlling the architecture, molecular weight, and composition and (2) efficiently preparing multiple samples to study trends.

Bottlebrush polymers have recently emerged as an advanced class of non-linear architectures that manifest unique physical, mechanical, and dynamic properties.[13-19] Like their linear analogues, bottlebrush diblock polymers can also access lamellar morphologies (FIG. 36). However, bottlebrush polymers display much larger scaling exponents ($\alpha$=0.8-0.9),[20-23] consistent with extended backbone conformations. Steric repulsion between the densely grafted side chains imparts a certain bending rigidity to the backbone, which can be modeled as a wormlike chain.[24-27] The unique properties of bottlebrush polymers have been previously exploited for applications in photonics,[28-32] lithography,[33-34] and surface coatings.[35] For example, the bottlebrush architecture minimizes chain entanglement and promotes rapid self-assembly to structures with ultra-large $d^*$, enabling the fabrication of photonic materials that reflect visible and even infrared radiation. In contrast, such materials are generally inaccessible using linear and low-z analogues due to the ultra-high molecular weights required as well as the low entanglement molecular weights.

The effects of grafting density on the rheological properties of homopolymers have received tremendous interest.[36-44] However, the impacts of grafting density on block polymer self-assembly have not been explored.[45-48] Elucidating these physical principles is of fundamental importance and may also guide future materials design. With this mindset, we launched the first study on block polymers with systematically modified grafting densities ($0 \leq z \leq 1$) spanning the linear, comb, and bottlebrush regimes. The self-assembly of these unprecedented polymers is examined by small-angle X-ray scattering (SAXS), allowing determination of the scaling behavior. These studies reveal vital information on the backbone conformations, and the determined scaling laws allow prediction of lamellar periods of direct relevance to the development of nanomaterials.

Figure 37:
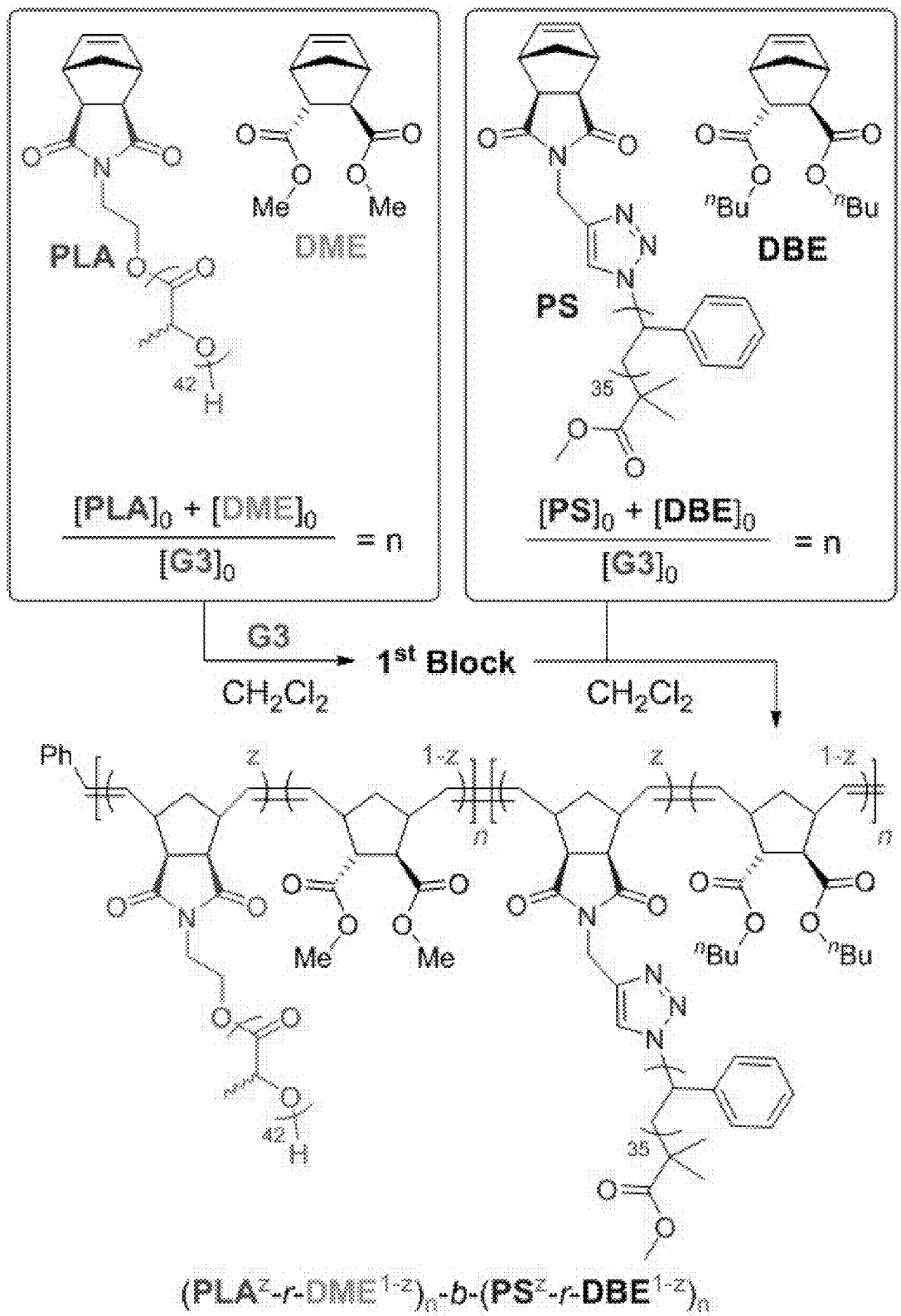
FIG. 37. Synthesis of $(PLA^z\text{-}r\text{-}DME^{1-z})_n\text{-}b\text{-}(PS^z\text{-}r\text{-}DBE^{1-z})_n$ block polymers (System I) featuring variable backbone degrees of polymerization ($N_{bb}=2n=44$-$363$) and grafting densities (z=1.00, 0.75, 0.50, 0.35, 0.25, 0.20, 0.15, 0.05, 0).

Synthesis of block polymers with variable grafting densities (System I: Different diluents for each block). Ring-opening metathesis polymerization (ROMP) is a powerful strategy to synthesize well-defined bottlebrush polymers in a controlled and living manner.[49-52] We targeted poly($_{D,L}$-lactide)-b-polystyrene (PLA-b-PS) graft diblock polymers to permit comparisons with brush PLA-b-PS systems previously investigated in the context of self-assembly[20-24] In this example, polymerizations are carried out in $CH_2Cl_2$ at room temperature under an inert atmosphere. To vary the grafting density (FIG. 37), the first block is synthesized by copolymerizing a PLA macromonomer ($M_n$=3230 g/mol) with a discrete co-monomer (i.e., diluent), DME (endo,exo-norbornenyl dimethyl ester, $M_n$=210 g/mol). The grafting density (z) is precisely determined by the feed ratio according to Eq. 1:

$$z = \frac{[PLA]_0}{[PLA]_0 + [DME]_0} \quad (1)$$

After both co-monomers have been fully consumed (as verified by $^1$H NMR), a mixture of a PS macromonomer ($M_n$=3990 g/mol) and another discrete diluent, DBE (endo,exo-norbornenyl di-n-butyl ester, $M_n$=294 g/mol), is introduced as the second block. The PS/DBE feed ratio is the same as the PLA/DME feed ratio in the first block. The determined reactivity ratios (block A: $r_{PLA}$=0.92, $r_{DME}$=1.11; block B: $r_{PS}$=0.80, $r_{DBE}$=1.16) suggest that the copolymerization is statistically random with minimal compositional drift.[9] Monitoring the instantaneous monomer concentrations over time indicates that the macromonomer and diluent are incorporated at approximately equal rates in each block, consistent with uniform z throughout the entire block polymer. The backbone degrees of polymerization (n)

for the first and second blocks are equal and determined by the ratio of the total monomer concentration to catalyst (G3) concentration (Eqs. 2-3):

$$n = \frac{[PLA]_0 + [DME]_0}{[G3]_0} = \frac{N_{bb}}{2} \quad (2)$$

$$n = \frac{[PS]_0 + [DBE]_0}{[G3]_0} = \frac{N_{bb}}{2} \quad (3)$$

For System I, (see FIG. 38) nine different series with variable grafting densities (z=1.00, 0.75, 0.50, 0.35, 0.25, 0.20, 0.15, 0.05, and 0) are prepared. Each series includes five to seven block polymers with fixed composition and varying backbone lengths ($N_{bb}$=44-363, see Example 3B). To achieve consistent control over z, the targeted macromonomer/diluent feed ratios are verified by $^1$H NMR prior to initiating the first block with G3. After reaching >99% conversion, the reaction mixtures are quenched by addition of excess ethyl vinyl ether. The block polymers are precipitated into methanol at −78° C., isolated by filtration, and dried under vacuum for >24 h. The first blocks and precipitated products are analyzed by NMR and size-exclusion chromatography (SEC), allowing determination of the molecular weights and therefore $N_{bb}$. These analyses indicated that our methodology produced well-defined, monodisperse (Ð=1.01-1.18) graft block polymers.

Figure 38:
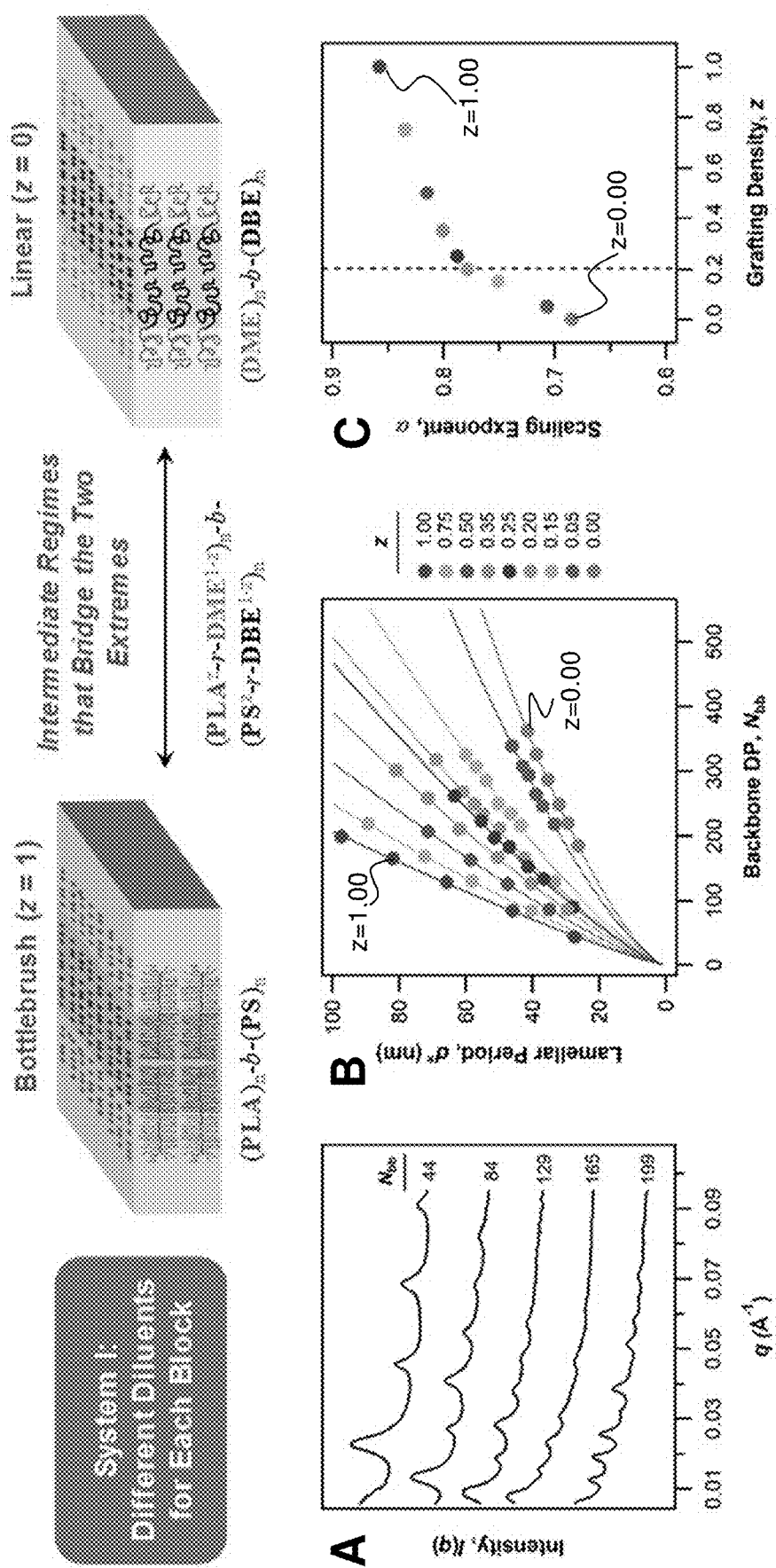
FIG. 38. Top: Scheme of System I, consisting of block copolymer $(PLA^z\text{-}r\text{-}DME^{1-z})_n\text{-}b\text{-}(PS^z\text{-}r\text{-}DBE^{1-z})_n$ with variable total backbone degrees of polymerization ($N_{bb}=2n$) and grafting densities (z), where "r" represent a random graft distribution (e.g., within respective polymer block) and "b" represent a blocky distribution of the different polymer blocks of the overall graft block copolymer.
Figure 39:
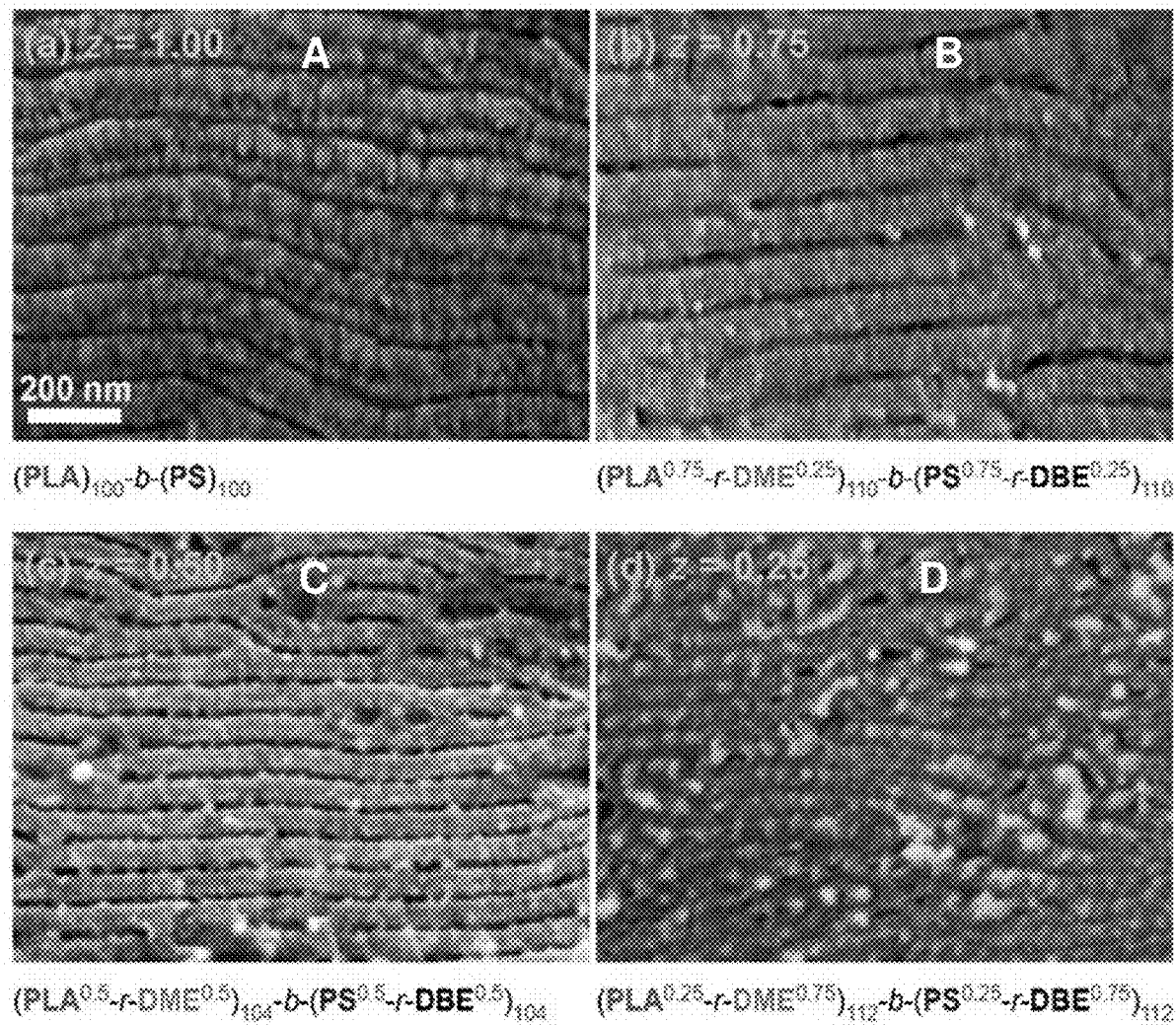
FIG. 39. Scanning electron micrographs of graft block polymers with (FIG. 39, panel A) z=1.00, $(PLA)_{100}\text{-}b\text{-}(PS)_{100}$.

Self-assembly and the lamellar period. With these graft block polymers in hand, we studied their self-assembly to lamellar morphologies. The isolated polymers are thermally annealed at 140° C. for 24 h under modest pressure (applied using binder clips). The samples are analyzed by synchrotron-source small-angle X-ray scattering (SAXS). Representative azimuthally averaged SAXS profiles corresponding to five samples with z=1 are shown in FIG. 38 (panel A). For all of the series investigated, the scattering patterns are consistent with well-ordered lamellar morphologies (see Example 3B and/or FIGS. 76 and 77). Scanning electron microscope (SEM) images obtained for selected block polymers with $N_{bb}$≈200 and z=1.00, 0.75, 0.50, or 0.25 also indicate long-range-ordered lamellar structures (FIG. 39, panels A, B, C, and D).

We note that varying the grafting density also changes the chemical composition within each block (i.e., by substituting PLA with DME and PS with DBE), potentially complicating the comparison of series with different z. In order to address the effects of varying the backbone chemistry, samples corresponding to loosely grafted individual A and B blocks—(PLA$^{0.05}$-r-DME$^{0.95}$)$_{200}$ and (PS$^{0.05}$-r-DBE$^{0.95}$)$_{200}$, respectively—are also studied. The samples are annealed under the same conditions as the graft block polymers. No evidence of microphase separation is observed by SAXS (see Example 3B and/or FIGS. 76 and 77), suggesting that each block behaves as a single component. In other words, the effective $\chi$ in each block between the backbone and side chains can be regarded as negligible, and series with different z can be directly compared.

For all graft block polymers, the lamellar periods (d*) are determined by indexing the raw SAXS data. FIG. 38 (panel B) shows plots of d* versus $N_{bb}$. The scaling relationships for each series are calculated using a least-square power-law fitting function in Igor. To gain additional insight into the scaling behavior, the determined scaling exponents α are plotted as a function of z (FIG. 38, panel C). For the z=1 series, the large magnitude of α (0.858) is consistent with previously reported values for symmetric PLA-b-PS bottlebrush block polymers (α=0.8-0.9)[20-24,53] At the other extreme, the z=0 series exhibits an α value of 0.685, very close to the theoretical value (α=⅔) for strongly segregated symmetric linear diblock polymers.[11] The variable-z series (z=0.75, 0.50, 0.35, 0.25, 0.20, 0.15, 0.05) constitute intermediate regimes bridging the two extremes. Comparing all series, the scaling exponents decrease monotonically with decreasing z. However, while α modestly decreases from 0.858 (z=1.00) to 0.779 (z=0.20), it then sharply decreases with decreasing z to 0.685 (z=0). Collectively, these trends suggest changes in the backbone conformation with decreasing grafting density. Consistent with recent experimental and theoretical reports, at a certain critical z the conformational regime may transition from densely grafted brushes to loosely grafted brushes or combs.[54-55] These changes significantly impact the physical properties of graft homopolymers, such as the plateau modulus and extensibility. However, the effects of grafting density on block polymer phase behavior are unexplored to date. In the final section of this report, we contemplate a model for the observed scaling behavior.

System II: Same diluent for both blocks. The potential consequences of changing $\chi$ within each block may be dismissed by considering individual A and B blocks. We note that varying the grafting density in System I may also affect the effective $\chi$ between blocks. Changing $\chi$ would influence d* and potentially complicate the interpretations of the observed scaling trends. For symmetric linear diblock polymers, d* exhibits a weak dependence on $\chi$ in the strongly segregated regime (d*~$\chi^{1/6}$) and is independent of $\chi$ in the weakly segregated regime. In the mean-field Flory-Huggins lattice model, $\chi$ is determined by the number of nearest neighbor contacts per monomer. In our materials, since the number ratio of diluents to side chain monomers (i.e., either lactide or styrene repeats) is very small, the diluents are not expected to significantly affect $\chi$. We anticipate that the large size disparity between macromonomers and diluents should make polymer architecture the primary factor responsible for the observed trends.

Figure 40:
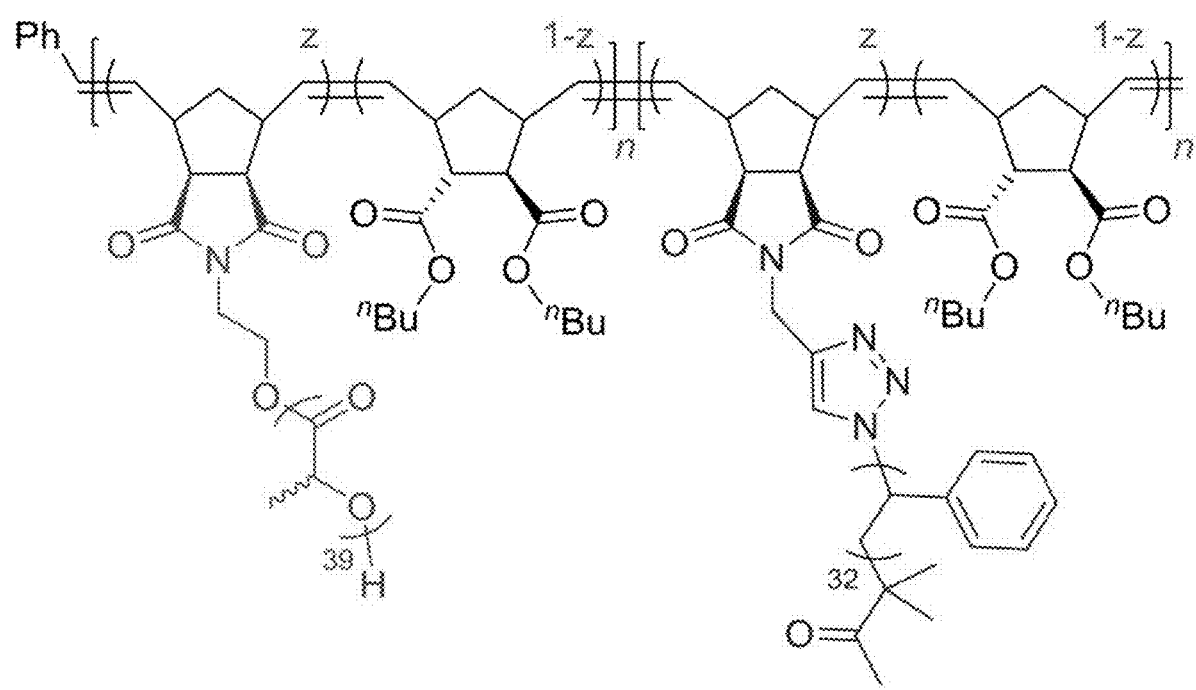
FIG. 40. $(PLA^z\text{-}r\text{-}DBE^{1-z})_n\text{-}b\text{-}(PS^z\text{-}r\text{-}DBE^{1-z})_n$ of variable backbone degrees of polymerization ($N_{bb}=2n=82$-$533$) and grafting densities (z=0.75, 0.50, 0.35, 0.25, 0.15, 0.12, 0.06, and 0.05).

To examine this hypothesis, we prepared System II in which the same diluent (DBE) is employed to vary z in both blocks (FIG. 40). The lowest-z extreme (z=0) in System II is the homopolymer (DBE)$_n$, which does not microphase separate. Macromonomers PLA ($M_n$=3030 g/mol) and PS ($M_n$=3800 g/mol) of similar molecular weights as those in System I are used. The determined reactivity ratios ($r_{PLA}$=1.04, $r_{DBE}$=0.89; $r_{PS}$=0.83, $r_{DBE}$=1.16) indicated random copolymerization within each block and therefore uniform grafting density. As for System I, polymers of general formula (PLA$^z$-r-DBE$^{1-z}$)$_n$-b-(PS$^z$-r-DBE$^{1-z}$)$_n$ are prepared ($N_{bb}$=2n=82-533; z=0.75, 0.50, 0.35, 0.25, 0.15, 0.12, 0.06, 0.05). The isolated monodisperse (Ð=1.02-1.19) copolymers are characterized by NMR and SEC.

Figure 41:
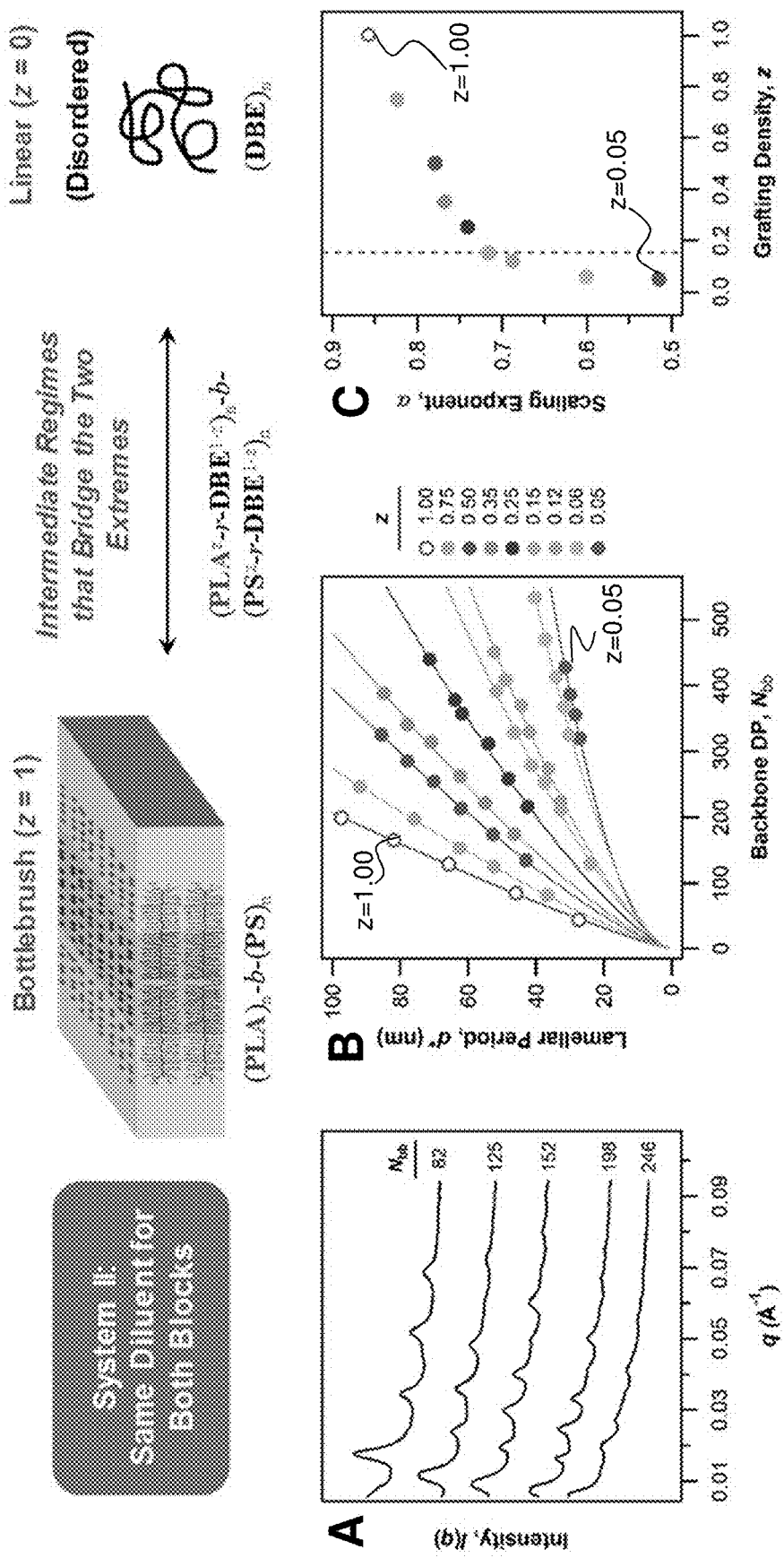
FIG. 41. Top: Scheme of System II, consisting of block polymer $(PLA^z\text{-}r\text{-}DBE^{1-z})_n\text{-}b\text{-}(PS^z\text{-}r\text{-}DBE^{1-z})_n$ with variable total backbone degrees of polymerization ($N_{bb}=2n$) and grafting densities (z).

The samples are thermally annealed under the same conditions as System I. All of the polymers in System II self-assembled into well-ordered lamellae as evidenced by SAXS (see Example 3B and/or FIGS. 76 and 77). (Azimuthally averaged 1D SAXS plots obtained for the z=0.75 series are shown in FIG. 41, panel A, as representative examples.) FIG. 41, panel B, shows the power-law fitting plots (d* versus $N_{bb}$) for each series. The α values in System II are uniformly smaller compared to their counterparts of the same grafting density in System I. This observation could be attributed to the larger changes in $\chi$ between blocks upon decreasing z. The z=0.05 series displays an α value of 0.515, approaching the theoretical value in the weak segregation limit ($\alpha=\frac{1}{2}$).[11-12] Comparing FIGS. 38, panel C, and 41, panel C, suggests that the different d* and α values are likely due to different changes in x. The linear diblock polymer $(DME)_n$-b-$(DBE)_n$, which is exactly the z=0 series in System I, is itself strongly segregated, whereas the z=0 series in System II is the homopolymer $(DBE)_n$. However, we note that the transition between regions of shallow and steep decreases in a with decreasing z occur at nearly the same z in both systems (z≈0.2), suggesting that such transition is intrinsically related to polymer architecture rather than segregation strengths.

Significance of the determined scaling relationships. Present example appears to be the first to study how grafting density affects the scaling of the lamellar period with the total backbone degree of polymerization. Understanding these scaling relationships expands the parameter space for materials design. Materials with controlled length scales are desired for many applications. For example, ultra-large d* values are required by photonic crystals in order to access the visible spectrum. In general, linear polymers are prohibitively challenging to synthesize and process at sufficiently high molecular weights. Meanwhile, bottlebrush block polymers are attractive building blocks due to their reduced chain entanglement and steep increase in d* with molecular weight. However, synthesizing fully grafted, ultra-high-molecular-weight bottlebrush block polymers can be challenging and expensive. In grafting-through strategies, the concentrations of reactive chain ends are low, and the side chains are typically synthesized by costly metal-mediated controlled polymerizations. Through grafting-through copolymerization however, $N_{bb}$ can be readily increased by introducing small-molecule diluents that can be synthesized on large scales from readily available precursors.

The ability to simultaneously tune the grafting density and backbone length provides an additional tool for designing materials with desired length scales. For example, according to the determined scaling relationship for fully grafted bottlebrush block polymers (z=1.00, $d^*=1.033 \times N_{bb}^{0.858}$), a polymer with $N_{bb}=100$ should self-assemble to lamellae with d*=53.6 nm. In System I, a 50% grafted block polymer (z=0.50, $d^*=0.926 \times N_{bb}^{0.815}$) with the same number of side chains has $N_{bb}=200$ and should self-assemble to lamellae with d*=69.5 nm. In other words, decreasing the grafting density (z=1.00 to 0.50) while maintaining the same number of side chains results in a large increase in d* (30%) at the expense of a small increase in total molecular weight (7%). The modest increase in M is highly advantageous for processing these materials since the zero-shear viscosity scales with M ($\eta_0 \sim M^\alpha$). Below the onset of entanglements at a critical molecular weight $M_c$, α=1, whereas above $M_c$, α=3.4. The influence of grafting density on rheological properties are also contemplated.

We further highlight the significance of grafting density effects on the scaling of the lamellar period by predicting the required $N_{bb}$ to reach an arbitrary value of d*=200 nm (FIG. 42, panels A and B). Such a large d* is desired for photonic applications. At the same z, $N_{bb}$ required to reach d*=200 is larger for block polymers in System II than in System I as a result of differences in segregation strengths. In both systems, the predicted $N_{bb}$ values exponentially increase with decreasing z below the observed transition (z<0.20). In the linear block polymer limit (z=0, System I), the required N to reach d*=200 nm is close to 4000. Such high-molecular-weight linear polymers are extremely challenging to synthesize, and as a result there are very few examples of linear block polymers that can self-assemble to visible-light-reflecting photonic crystals.[56] Existing examples are typically limited by low conversion and inability to process the materials from the melt. In contrast, a 50% grafted block polymer may require $N_{bb} \approx 730$. Manipulating the grafting density through copolymerization therefore constitutes a promising strategy to overcome limitations associated with both synthesis and processing.

Interpretation of the scaling trends. We derive a model in order to relate the observed changes in a with grafting density (z) to the conformations of the graft polymer backbone and side chains. Key experimental results to capture include (1) the monotonic decrease in α with z (FIGS. 38, panel C, and 41, panel C), (2) the apparent transition between shallow and steep decreases in α at a critical $z_c=0.2$, and (3) potential segregation effects that emerge at low z. Comparison of two systems—one in which all series (z≥0) are in the strongly segregated limit (SSL) (System I) and one that bridges the strongly and weakly segregated limits (WSL) (System II)—suggests that architecture effects, not segregation effects, are primarily responsible for the observed trends. We begin by framing our results in the context of existing theory for the self-assembly of diblock polymers, then propose a functional form for the observed relationship between z and d*, i.e., $d^* \sim N_{bb}^{f(z)}$. We note that, in part due to the long-standing challenges associated with synthesizing well-defined graft polymers, there is not currently a theoretical or experimental consensus detailing the effects of grafting density on block polymer self-assembly.

The scaling of the lamellar period (d*) is well-understood in the case of symmetric linear diblock polymers.[11-12,57] The magnitude of d* is determined by the balance between the elastic energy ($F_{stretch}$), which resists chain stretching, and the interfacial energy ($F_{int}$), which resists expansion of block junctions along the domain interfaces. The stretching free energy per polymer chain is inversely proportional to the mean-square end-to-end distance, $\langle R^2 \rangle$:

$$\frac{F_{stretch}}{kT} \sim \frac{d^{*2}}{\langle R^2 \rangle} \tag{4}$$

When the chain is flexible, the mean-square end-to-end distance is given by $\langle R^2 \rangle = a_0^2 N_{bb}$, where $a_0$ is the statistical segment length and $N_{bb}$ is the backbone degree of polymerization. (Note that in the case of linear polymers, $N_{bb}$ is identical to the total degree of polymerization.) The interfacial energy per polymer chain is $$\frac{F_{int}}{kT} \sim \gamma A \tag{5}$$

where γ is the surface tension and A is the area per chain. These parameters can be approximated by $\gamma = \chi^{1/2} a_0^{-2}$ and $A \sim N_{bb} a_0 / d^*$, leading to the following expression:

$$\frac{F_{int}}{kT} \sim \frac{N_{bb} a_0 \chi^{\frac{1}{2}}}{d^*} \tag{6}$$

In the SSL, the elastic energy and interfacial energy are balanced ($F_{stretch}=F_{int}$), and thus we obtain $$d^* \sim \chi^{1/6} N^{1/3} [\langle R^2 \rangle]^{1/3} \sim a_0 \chi^{1/6} N_{bb}^{2/3} \tag{7}$$

In the WSL, the chains do not significantly stretch at the interface because χ is small, and thus $F_{int}$ is effectively negligible. Therefore, $$d^* \sim [\langle R^2 \rangle]^{1/2} \sim a_0 N_{bb}^{1/2} \tag{8}$$

Collectively, following Eqs. 7 and 8, the d* scaling relationship for diblock polymers has the general form $$d^* \sim a_0 N_{bb}^\alpha \quad (9)$$

For flexible linear diblock polymers, typically $\frac{1}{2} \leq \alpha \leq \frac{2}{3}$. In contrast, when the polymer is semi-flexible, the same general form applies but the scaling exponent $\alpha$ is larger.[58-59] Bottlebrush diblock polymers typically exhibit $\alpha$ close to 0.9, reflecting the extended backbone conformations due to the sterically demanding architecture.[22-23,31] We note that, in the limit of extremely long backbones, when the persistence length and cross-sectional diameter are much shorter than the contour length of the brush, the chain should become flexible and $\alpha$ should approach $\frac{2}{3}$.[24,60] In the current study however, the graft polymers exclusively reside in the regime in which the backbone persistence length ($l_p$) is not negligible compared to $N_{bb}$.

For non-flexible polymers, the mean-square end-to-end distance can be written as $$\langle R^2 \rangle = a_0^2 C_\infty N_{bb} \quad (10)$$

by adopting Flory's characteristic ratio, $C_\infty = 2l_p/a_0$. Therefore, $$\langle R^2 \rangle = 2a_0 l_p N_{bb} \quad (11)$$

For bottlebrush polymers, $l_p$ is a function of the side chain degree of polymerization ($N_{sc}$) and z.[55,61] $l_p$ is also anticipated to be a function of $N_{bb}$ by theory and simulations,[54,62] but the functional form of this relationship is currently a matter of some debate. We may assume that $C_\infty$ is a function of $N_{bb}$ and z in order to study how the backbone stiffness affects d*.

Two boundary conditions of this function are known. First, when z=0, $C_\infty = 1$ by definition since the backbone is identical to a flexible linear polymer. Second, in the opposite limit, when z=1, $C_\infty$ should approach $N_{bb}$. To satisfy these conditions, we write the following power function describing the relationship between $C_\infty$ and $N_{bb}$:

$$C_\infty = N_{bb}^{mz+b} \quad (12)$$

We now insert Eq. 12 into Eq. 10, then rewrite the expressions for d* in the SSL (Eq. 7) and WSL (Eq. 8) in terms of $C_\infty$:

$$d^* \sim \begin{cases} a_0 \chi^{\frac{1}{6}} C_\infty^{\frac{1}{3}} N_{bb}^{\frac{2}{3}} & SSL \\ a_0 C_\infty^{\frac{1}{2}} N_{bb}^{\frac{1}{2}} & WSL \end{cases} \quad (13)$$

Therefore, the experimentally observed scaling exponents $\alpha$ can be written as follows:

$$\alpha = \begin{cases} \dfrac{mz+b+2}{3} & SSL \\ \dfrac{mz+b+1}{2} & WSL \end{cases} \quad (14)$$

We now apply Eq. 14 to Systems I and II in order to evaluate how $C_\infty$, as a proxy for the backbone stiffness, changes with z. In System I, different diluents (DME and DBE) are used to vary z in each block. The linear diblock polymer DME-b-DBE exhibits $\alpha = 0.688 = \frac{2}{3}$. This result suggests that, even in the z=0 limit, the block polymers in System I are strongly segregated. Since $\alpha$ may just increase with z, all series in System I are expected to be in the SSL. FIG. 43, panel A, shows the lines of best fit for experimentally determined values of $\alpha$ and z. Two regions are identified, diverging at a critical grafting density $z_{c,I}$: (1) when z<0.2, $\alpha$ steeply decreases with decreasing z; (2) when z>0.2, $\alpha$ slightly decreases with decreasing z. In the first region, $\alpha = 0.46z + 0.68$; in the second region, $\alpha = 0.091z + 0.77$. The lines of best fit intersect at $z_{c,I} = 0.23$. We obtain the following expressions for $C_\infty$:

$$C_\infty = \begin{cases} N_{bb}^{1.39z} & z < 0.23 \\ N_{bb}^{0.27z+0.30} & z > 0.23 \end{cases} \quad (15)$$

Introducing Eq. 15 into Eq. 10 enables calculations of the normalized root-mean-square end-to-end distances ($\sqrt{\langle R^2 \rangle}/a_0$) as a function of z (FIG. 43, panel A). The transition in $\sqrt{\langle R^2 \rangle}/a_0$ occurs near $z_{c,I}$: z=0.27.

Unlike System I, System II uses the same diluent (DBE) for both blocks. The z=0 limit constitutes a linear homopolymer rather than a diblock polymer, and therefore the segregation behavior and chain stretching at the domain interface differ between Systems I and II. Applying the same analysis for System II, when the grafting density is low (z<0.2) we obtain $\alpha = 1.44z + 0.50$ (FIG. 43, panel B). In this region, the block polymers experience intermediate to weak segregation ($\alpha < \frac{2}{3}$). Reflecting the boundary condition $C_\infty = 1$ at z=0, the y-intercept is fixed at ½. Therefore, applying Eq. 14 in the WSL, m=2.87 and b=0. By comparison to System I and literature results, we expect the series to experience strong segregation at a certain z. We may assume that, at least when z>0.2, the block polymers are in the SSL. Therefore, $\alpha = 0.15z + 0.71$ suggests m=0.46, b=0.12. The lines of best fit intersect at $z_{c,II} = 0.16$. From these results, for System II we obtain the following expression for $C_\infty$:

$$C_\infty = \begin{cases} N_{bb}^{2.87z} & z < 0.16 \\ N_{bb}^{0.46z+0.12} & z > 0.16 \end{cases} \quad (16)$$

FIG. 43B (bottom) shows the values of $\sqrt{\langle R^2 \rangle}/a_0$ calculated for System II per Eq. 16. Surprisingly, $\sqrt{\langle R^2 \rangle}/a_0$ exhibits an apparent transition at z=0.05, much lower than the value $z_{c,II} = 0.16$ identified by fitting the experimental data (FIG. 43B, top). In contrast, for System I the transitions in $\alpha$ and $\sqrt{\langle R^2 \rangle}/a_0$ occur at approximately the same z (FIG. 43A). Since $\sqrt{\langle R^2 \rangle}/a_0$ is obtained from fitting $\alpha$ in two regions (diverging at a critical $z_c$ and assuming either weak or strong segregation), the transitions should occur at the same z if the proposed model accurately describes the entire z range. The observed mismatch suggests that our model does not reflect all factors affecting d* in the transition region. The preceding discussions have focused on the backbone stiffness. However, the potential contributions of $\chi$ and side chain conformations is also contemplated.

FIGS. 43A-43B indicate that changes in $C_\infty$ alone do not fully capture the scaling of the lamellar period. Changes in the segregation strength that emerge with decreasing z are likely also significant. In System I, the diluents are different and the polymers are already stretched at z=0 (inferred based on $\alpha > \frac{2}{3}$). Since the backbones are already stretched, increasing z may not significantly affect $\chi$ between the two grafted blocks or backbone stretching. A high grafting density (large $z_c$) may be required to further stretch the chains. In System II however, the z=0 limit describes linear homopolymers, which are expected to adopt unperturbed conformations. Therefore, the onset of backbone and side chain stretching should occur at a lower $z_c$. The effects of segregation, as well as the precise location of the transition between SSL and WSL with z, are important factors to consider.

To conclude our interpretation of the scaling relationships, we address the potential role of the side chains in the experimentally observed transition at $z_c \approx 0.20$. Our analysis is consistent with $C_\infty$ changing abruptly at $z_c$. We note that, for System I, all series (0≤z≤1) are in the SSL. Steric repulsion between the side chains is expected to be the primary factor responsible for increasing $C_\infty$. The location of the transition $z_c$ is therefore expected to be related to the onset of side chain overlap. The radius of gyration of a side chain is $$R_{g,sc} = a_{sc}(N_{sc}/6)^{1/2} \quad (17)$$

where $a_{sc}$ is the statistical segment length of the side chain. In order for the side chains to retain their unperturbed conformations, the contour length of a section of backbone separating adjacent side chains ($L_g$) should be larger than $2R_{g,sc}$. As z increases, the side chains are expected to stretch to accommodate tethering at shorter $L_g$.[61] Consistent with a convention employed by previous theories and experiments for bottlebrush polymers,[24] we assume that the contour length per polynorbornene backbone segment is constant ($L_s$=0.62 nm). The number of backbone segments between adjacent grafting points (inclusive) is provided by 1/z, and $L_g$ follows:

$$L_g = \frac{L_s}{z} \quad (18)$$

When $L_g > 2R_{g,sc}$, the backbone is expected to behave as a flexible Gaussian chain. When $L_g < 2R_{g,sc}$, the backbone is expected to stretch, ultimately leading to wormlike chain conformations at sufficiently high z. The stiffness of the brush is expected to increase when two neighboring grafts contact each other in the limiting range of the torsional angle. We define $z_s$ as the grafting density at the onset of backbone stretching due to torsional limitations ($L_g = 2R_{g,sc}$):

$$z_s \equiv \frac{L_s}{2a_{sc}(N_{sc}/6)^{\frac{1}{2}}} \quad (19)$$

As an approximation, we estimate that the transition in the brush conformation responsible for the transition in α occurs when $z=_s$. We note that stretching of the side chains at $z>_s$ may not permit this simple approximation, since stretching of the graft polymer backbone and side chains should compete to balance conformational entropy. We further assume $N_{sc}$=36 and $L_s \approx a_{sc}$, producing $z_s$=0.20. For both Systems I and II, the experimentally observed transition in α occurs at $z_c \approx z_s$ ($z_{c,I}$=0.23, $z_{c,II}$=0.16). This observation suggests that the steep increase in α at small z is mainly due to the stretching of the backbone, whereas the modest increase in α at high z is mainly due to the increasing torsional angle demanded by decreasing $L_g$.

These results collectively suggest that changes in the end-to-end distance ($R^2$) are primarily responsible for the increase in α with increasing z. $\langle R^2 \rangle$ may increase due to a combination of backbone stretching, torsional limitations, and χ effects. ($R^2$) exhibits two regimes in terms of z dependence, corresponding to a transition between loose and densely grafted brushes.[63-64] In our model, we propose functional forms for (1) the relationship between backbone stiffness and backbone length ($C_\infty \sim N_{bb}^{f(z)}$) and (2) the relationship between the lamellar period scaling exponent and grafting density (α~mz+b). We anticipate that the materials and framework outlined herein should stimulate additional theories and experiments.

CONCLUSIONS: The self-assembly of block polymers enables diverse practical applications. We herein provide the first experimental study that quantitatively correlates grafting density with scaling of the lamellar period. Through the analyses of well-defined graft block polymer assemblies, we show that the scaling exponent undergoes a sharp transition at z≈0.20. The observed transition is attributed to different conformational regimes dictated by backbone chain conformations. We contemplate that the determined scaling relationships for various grafting density series may be exploited to guide future material design.

MATERIALS AND METHODS: General considerations. Norbornene macromonomers PS[65] and PLA[22] are prepared according to previously reported procedures. Norbornene diluents DME[66] and DBE[67] are prepared by Diels-Alder reactions according to previously reported procedures. Grubbs' second-generation catalyst [(H$_2$IMes)(PCy$_3$)(Cl)$_2$Ru=CHPh] is provided by Materia, and G3 is prepared according to the reported precedure.[68] CH$_2$Cl$_2$ is dried by passing through an activated alumina column. Deuterated solvents are purchased from Cambridge Isotopes Laboratories, Inc. and used as received.

NMR, SEC, SEM, and SAXS characterizations. Ambient temperature NMR spectra are recorded on a Varian 300 MHz, 400 MHz, or 500 MHz NMR spectrometer. Chemical shifts (δ) are given in ppm and referenced against residual solvent signals ($^1$H, $^{13}$C). SEC data are collected using two Agilent PLgel MIXED-B 300×7.5 mm columns with 10 µm beads, connected to an Agilent 1260 Series pump, a Wyatt 18-angle DAWN HELEOS light scattering detector, and Optilab rEX differential refractive index detector. The mobile phase is THF. Online determination of dn/dc assumed 100% mass elution under the peak of interest. (Further details about SEC can be found in FIGS. 53-57 and 59-75) Samples are prepared for SEM by fracturing films supported on glass to expose a cross-section, staining over ruthenium tetroxide vapors for 5 minutes, then coating with 5 nm Pd/Pt. SEM images are taken on a ZEISS 1550 VP Field Emission SEM. SAXS data are collected at beamline 12-ID at Argonne National Laboratory's Advanced Photon Source. The samples are probed using 12 keV (1.033 Å) X-rays, and the sample-to-detector distance is calibrated using a silver behenate standard. The beam is collimated using two sets of slits and a pinhole is used to remove parasitic scattering. The beamwidth is approximately 200-300 µm horizontally and 50 µm vertically.

REFERENCES CORRESPONDING TO EXAMPLE 3A (1) Bates, F. S.; Fredrickson, G. H. Physics Today 1999, 52, 32-38.
(2) Mai, Y.; Eisenberg, A. Chem. Soc. Rev. 2012, 41, 5969-5985.

(3) Bates, F. S.; Hillmyer, M. A.; Lodge, T. P.; Bates, C. M.; Delaney, K. T.; Fredrickson, G. H. Science 2012, 336, 434-440.

(4) Hu, H.; Gopinadhan, M.; Osuji, C. O. Soft Matter 2014, 10, 3867-3889.

(5) Xu, Z.; Lin, J.; Zhang, Q.; Wang, L.; Tian, X. Polymer Chemistry 2016, 7, 3783-3811.

(6) Bates, C. M.; Bates, F. S. Macromolecules 2017, 50, 3-22.

(7) Polymeropoulos, G.; Zapsas, G.; Ntetsikas, K.; Dilalis, P.; Gnanou, Y.; Hadjichristidis, N. Macromolecules 2017, 50, 1253-1290.

(8) Matyjaszewski, K. Science 2011, 333, 1104-1105.

(9) Lin, T.-P.; Chang, A. B.; Chen, H.-Y.; Liberman-Martin, A. L.; Bates, C. M.; Voegtle, M. J.; Bauer, C. A.; Grubbs, R. H. J. Am. Chem. Soc. 2017, 139, 3896-3903.

(10) Sing, C. E.; Zwanikken, J. W.; Cruz, M. O. d. l. J. Chem. Phys. 2015, 142, 034902.

(11) Semenov, A. N. JETP 1985, 61, 733-742.

(12) Matsen, M. W.; Bates, F. S. Macromolecules 1996, 29, 1091-1098.

(13) Hadjichristidis, N.; Pitsikalis, M.; Iatrou, H.; Pispas, S. Macromol. Rapid Commun. 2003, 24, 979-1013.

(14) Sheiko, S. S.; Sumerlin, B. S.; Matyjaszewski, K. Prog. Polym. Sci. 2008, 33, 759-785.

(15) Peng, S.; Bhushan, B. RSC Advances 2012, 2, 8557-8578.

(16) Rzayev, J. ACS Macro Lett. 2012, 1, 1146-1149.

(17) Verduzco, R.; Li, X.; Pesek, S. L.; Stein, G. E. Chemical Society Reviews 2015, 44, 2405-2420.

(18) Müllner, M.; Müller, A. H. E. Polymer 2016, 98, 389-401.

(19) Yavitt, B. M.; Gai, Y.; Song, D.-P.; Winter, H. H.; Watkins, J. J. Macromolecules 2017, 50, 396-405.

(20) Xia, Y.; Olsen, B. D.; Kornfield, J. A.; Grubbs, R. H. Journal of the American Chemical Society 2009, 131, 18525-18532.

(21) Rzayev, J. Macromolecules 2009, 42, 2135-2141.

(22) Sveinbjörnsson, B. R.; Weitekamp, R. A.; Miyake, G. M.; Xia, Y.; Atwater, H. A.; Grubbs, R. H. Proceedings of the National Academy of Sciences 2012, 109, 14332-14336.

(23) Gu, W.; Huh, J.; Hong, S. W.; Sveinbjornsson, B. R.; Park, C.; Grubbs, R. H.; Russell, T. P. ACS Nano 2013, 7, 2551-2558.

(24) Dalsin, S. J.; Rions-Maehren, T. G.; Beam, M. D.; Bates, F. S.; Hillmyer, M. A.; Matsen, M. W. ACS Nano 2015, 9, 12233-12245.

(25) Lecommandoux, S.; Chécot, F.; Borsali, R.; Schappacher, M.; Deffieux, A.; Brûlet, A.; Cotton, J. P. Macromolecules 2002, 35, 8878-8881.

(26) Zhang, B.; Gröhn, F.; Pedersen, J. S.; Fischer, K.; Schmidt, M. Macromolecules 2006, 39, 8440-8450.

(27) Cao, Z.; Carrillo, J.-M. Y.; Sheiko, S. S.; Dobrynin, A. V. Macromolecules 2015, 48, 5006-5015.

(28) Miyake, G. M.; Weitekamp, R. A.; Piunova, V. A.; Grubbs, R. H. Journal of the American Chemical Society 2012, 134, 14249-14254.

(29) Miyake, G. M.; Piunova, V. A.; Weitekamp, R. A.; Grubbs, R. H. Angew. Chem., Int. Ed. 2012, 51, 11246-11248.

(30) Piunova, V. A.; Miyake, G. M.; Daeffler, C. S.; Weitekamp, R. A.; Grubbs, R. H. Journal of the American Chemical Society 2013, 135, 15609-15616.

(31) Macfarlane, R. J.; Kim, B.; Lee, B.; Weitekamp, R. A.; Bates, C. M.; Lee, S. F.; Chang, A. B.; Delaney, K. T.; Fredrickson, G. H.; Atwater, H. A.; Grubbs, R. H. Journal of the American Chemical Society 2014, 136, 17374-17377.

(32) Liberman-Martin, A. L.; Chu, C. K.; Grubbs, R. H. Macromol. Rapid Commun. 2017, 38, 1700058.

(33) Sun, G.; Cho, S.; Clark, C.; Verkhoturov, S. V.; Eller, M. J.; Li, A.; Pavía-Jiménez, A.; Schweikert, E. A.; Thackeray, J. W.; Trefonas, P.; Wooley, K. L. Journal of the American Chemical Society 2013, 135, 4203-4206.

(34) Kawamoto, K.; Zhong, M.; Gadelrab, K. R.; Cheng, L.-C.; Ross, C. A.; Alexander-Katz, A.; Johnson, J. A. Journal of the American Chemical Society 2016, 138, 11501-11504.

(35) Liu, M.; Li, W.; Qiu, F.; Shi, A.-C. Macromolecules 2012, 45, 9522-9530.

(36) Daniels, D. R.; McLeish, T. C. B.; Crosby, B. J.; Young, R. N.; Fernyhough, C. M. Macromolecules 2001, 34, 7025-7033.

(37) McLeish, T. C. B. Advances in Physics 2002, 51, 1379-1527.

(38) Kapnistos, M.; Vlassopoulos, D.; Roovers, J.; Leal, L. G. Macromolecules 2005, 38, 7852-7862.

(39) Chambon, P.; Fernyhough, C. M.; Im, K.; Chang, T.; Das, C.; Embery, J.; McLeish, T. C. B.; Read, D. J. Macromolecules 2008, 41, 5869-5875.

(40) Kapnistos, M.; Kirkwood, K. M.; Ramirez, J.; Vlassopoulos, D.; Leal, L. G. J. Rheol. 2009, 53, 1133-1153.

(41) Larson, R. G. Science 2011, 333, 1834-1835.

(42) van Ruymbeke, E.; Lee, H.; Chang, T.; Nikopoulou, A.; Hadjichristidis, N.; Snijkers, F.; Vlassopoulos, D. Soft Matter 2014, 10, 4762-4777.

(43) Mai, D. J.; Marciel, A. B.; Sing, C. E.; Schroeder, C. M. ACS Macro Lett. 2015, 4, 446-452.

(44) Jeong, S. H.; Kim, J. M.; Baig, C. Macromolecules 2017, 50, 4491-4500.

(45) Olvera de la Cruz, M.; Sanchez, I. C. Macromolecules 1986, 19, 2501-2508.

(46) Grayer, V.; Dormidontova, E. E.; Hadziioannou, G.; Tsitsilianis, C. Macromolecules 2000, 33, 6330-6339.

(47) Zhang, J.; Schneiderman, D. K.; Li, T.; Hillmyer, M. A.; Bates, F. S. Macromolecules 2016, 49, 9108-9118.

(48) Gai, Y.; Song, D.-P.; Yavitt, B. M.; Watkins, J. J. Macromolecules 2017, 50, 1503-1511.

(49) Bielawski, C. W.; Grubbs, R. H. Progress in Polymer Science 2007, 32, 1-29.

(50) Leitgeb, A.; Wappel, J.; Slugovc, C. Polymer 2010, 51, 2927-2946.

(51) Sutthasupa, S.; Shiotsuki, M.; Sanda, F. Polym J 2010, 42, 905-915.

(52) Martinez, H.; Ren, N.; Matta, M. E.; Hillmyer, M. A. Polymer Chemistry 2014, 5, 3507-3532.

(53) Chang, A. B.; Bates, C. M.; Lee, B.; Garland, C. M.; Jones, S. C.; Spencer, R. K. W.; Matsen, M. W.; Grubbs, R. H. Proc. Natl. Acad. Sci. U.S.A. 2017, 114, 6462-6467.

(54) Daniel, W. F. M.; Burdynska, J.; Vatankhah-Varnoosfaderani, M.; Matyjaszewski, K.; Paturej, J.; Rubinstein, M.; Dobrynin, A. V.; Sheiko, S. S. Nat Mater 2016, 15, 183-189.

(55) Paturej, J.; Sheiko, S. S.; Panyukov, S.; Rubinstein, M. Science Advances 2016, 2.

(56) Mapas, J. K. D.; Thomay, T.; Cartwright, A. N.; Ilaysky, J.; Rzayev, J. Macromolecules 2016, 49, 3733-3738.

(57) Bates, F. S.; Fredrickson, G. H. Annual Review of Physical Chemistry 1990, 41, 525-557.

(58) Matsen, M. W. The Journal of Chemical Physics 1996, 104, 7758-7764.

(59) Jiang, Y.; Zhang, X.; Miao, B.; Yan, D.; Chen, J. Z. Y. Soft Matter 2016, 12, 2481-2490.
(60) Elli, S.; Ganazzoli, F.; Timoshenko, E. G.; Kuznetsov, Y. A.; Connolly, R. J. Chem. Phys. 2004, 120, 6257-6267.
(61) Fredrickson, G. H. Macromolecules 1993, 26, 2825-2831.
(62) Hsu, H.-P.; Paul, W.; Rathgeber, S.; Binder, K. Macromolecules 2010, 43, 1592-1601.
(63) Daniel, W. F. M.; Burdynska, J.; Vatankhah-Varnoosfaderani, M.; Matyjaszewski, K.; Paturej, J.; Rubinstein, M.; Dobrynin, A. V.; Sheiko, S. S. Nat. Mater. 2016, 15, 183-189.
(64) Paturej, J.; Sheiko, S. S.; Panyukov, S.; Rubinstein, M. Sci. Adv. 2016, 2, e1601478.
(65) Bates, C. M.; Chang, A. B.; Momčilović, N.; Jones, S. C.; Grubbs, R. H. Macromolecules 2015, 48, 4967-4973.
(66) Hickey, S. M.; Ashton, T. D.; Khosa, S. K.; Robson, R. N.; White, J. M.; Li, J.; Nation, R. L.; Yu, H. Y.; Elliott, A. G.; Butler, M. S.; Huang, J. X.; Cooper, M. A.; Pfeffer, F. M. Organic & Biomolecular Chemistry 2015, 13, 6225-6241.
(67) Park, J.-S.; Oh, H.-C.; Park, Y.-S.; Woo, J.-W. Advanced Materials Research (Durnten-Zurich, Switzerland) 2012, 421, 136-139.
(68) Love, J. A.; Morgan, J. P.; Trnka, T. M.; Grubbs, R. H. Angewandte Chemie, International Edition 2002, 41, 4035-4037.

Example 3B: Effects of Grafting Density on Block Polymer Self-Assembly

TABLE 13

Total molecular weights ($M_n$), total backbone degrees of polymerization ($N_{bb}$), and lamellar periods (d*) for $(PLA^x\text{-r-}DME^{1-x})_n\text{-b-}(PS^x\text{-r-}DBE^{1-x})_n$ graft block polymers (System I).

| z | Sample ID | $M_n$ (kDa) | $N_{bb}$ | d* (nm) |
|---|---|---|---|---|
| 1.00 | A1 | 158 | 44 | 27.5 |
|  | A2 | 304 | 84 | 46.0 |
|  | A3 | 465 | 129 | 65.8 |
|  | A4 | 596 | 165 | 82.0 |
|  | A5 | 718 | 199 | 97.5 |
| 0.75 | B1 | 234 | 84 | 40.3 |
|  | B2 | 361 | 130 | 58.2 |
|  | B3 | 467 | 168 | 72.5 |
|  | B4 | 606 | 219 | 89.5 |
| 0.50 | C1 | 166 | 86 | 35.0 |
|  | C2 | 243 | 126 | 47.6 |
|  | C3 | 315 | 163 | 58.7 |
|  | C4 | 400 | 207 | 71.5 |
| 0.35 | D1 | 124 | 87 | 29.7 |
|  | D2 | 181 | 127 | 40.5 |
|  | D3 | 238 | 167 | 50.5 |
|  | D4 | 301 | 211 | 62.0 |
|  | D5 | 369 | 258 | 71.5 |
|  | D6 | 430 | 301 | 81.0 |
| 0.25 | E1 | 98.8 | 90 | 27.9 |
|  | E2 | 146 | 134 | 36.7 |
|  | E3 | 167 | 153 | 41.5 |
|  | E4 | 200 | 183 | 47.0 |
|  | E5 | 216 | 197 | 51.5 |
|  | E6 | 244 | 223 | 55.5 |
|  | E7 | 286 | 262 | 63.5 |
| 0.20 | F1 | 119 | 128 | 33.6 |
|  | F2 | 153 | 166 | 42.5 |
|  | F3 | 195 | 211 | 50.0 |
|  | F4 | 216 | 234 | 55.0 |
|  | F5 | 230 | 249 | 57.5 |
|  | F6 | 248 | 268 | 61.0 |
|  | F7 | 294 | 318 | 69.0 |
| 0.15 | G1 | 163 | 216 | 43.6 |
|  | G2 | 178 | 235 | 46.6 |
|  | G3 | 189 | 250 | 50.3 |
|  | G4 | 216 | 286 | 54.0 |
|  | G5 | 232 | 307 | 57.0 |
|  | G6 | 246 | 325 | 60.0 |
| 0.05 | H1 | 91.7 | 218 | 33.5 |
|  | H2 | 103 | 246 | 37.0 |
|  | H3 | 111 | 264 | 39.0 |
|  | H4 | 124 | 294 | 41.2 |
|  | H5 | 129 | 308 | 43.0 |
|  | H6 | 142 | 339 | 46.2 |
| 0.00 | I1 | 46.5 | 184 | 26.3 |
|  | I2 | 55.4 | 219 | 29.5 |
|  | I3 | 62.7 | 249 | 32.1 |
|  | I4 | 72.4 | 287 | 35.4 |
|  | I5 | 82.3 | 326 | 38.9 |
|  | I6 | 91.5 | 363 | 41.6 |

TABLE 14

Total molecular weights ($M_n$), total backbone degrees of polymerization ($N_{bb}$), and lamellar periods (d*) for $(PLA^z\text{-r-}DBE^{1-z})_n\text{-b-}(PS^z\text{-r-}DBE^{1-z})_n$ graft block polymers (System II).

| z | Sample ID | $M_n$ (kDa) | $N_{bb}$ | d* (nm) |
|---|---|---|---|---|
| 0.75 | J1 | 116 | 44 | 23.5 |
|  | J2 | 215 | 82 | 36.8 |
|  | J3 | 330 | 125 | 52.4 |
|  | J4 | 402 | 152 | 62.6 |
|  | J5 | 521 | 198 | 76.0 |
|  | J6 | 649 | 246 | 92.0 |
| 0.50 | K1 | 249 | 135 | 43.0 |
|  | K2 | 322 | 174 | 52.8 |
|  | K3 | 396 | 213 | 62.2 |
|  | K4 | 472 | 254 | 70.2 |
|  | K5 | 529 | 285 | 78.0 |
|  | K6 | 603 | 325 | 85.7 |
| 0.35 | L1 | 241 | 174 | 46.5 |
|  | L2 | 307 | 221 | 55.0 |
|  | L3 | 364 | 263 | 62.5 |
|  | L4 | 436 | 314 | 71.0 |
|  | L5 | 472 | 341 | 78.0 |
|  | L6 | 538 | 388 | 85.0 |
| 0.25 | M1 | 232 | 216 | 42.6 |
|  | M2 | 277 | 258 | 48.2 |
|  | M3 | 335 | 312 | 54.1 |
|  | M4 | 384 | 358 | 61.9 |
|  | M5 | 406 | 378 | 64.0 |
|  | M6 | 472 | 439 | 71.4 |
| 0.15 | N1 | 98.5 | 129 | 24.0 |
|  | N2 | 161 | 212 | 32.8 |
|  | N3 | 193 | 253 | 37.5 |
|  | N4 | 213 | 279 | 41.5 |
|  | N5 | 251 | 329 | 46.6 |
|  | N6 | 299 | 392 | 51.8 |
| 0.12 | O1 | 150 | 224 | 32.8 |
|  | O2 | 183 | 274 | 36.5 |
|  | O3 | 221 | 330 | 42.0 |
|  | O4 | 248 | 370 | 44.3 |
|  | O5 | 274 | 409 | 49.0 |
|  | O6 | 302 | 451 | 52.5 |
| 0.06 | P1 | 156 | 324 | 30.3 |
|  | P2 | 177 | 367 | 31.8 |
|  | P3 | 199 | 413 | 34.2 |
|  | P4 | 226 | 469 | 37.3 |
|  | P5 | 257 | 533 | 40.4 |

TABLE 14-continued

Total molecular weights ($M_n$), total backbone degrees of polymerization ($N_{bb}$), and lamellar periods (d*) for $(PLA^z\text{-r-}DBE^{1-z})_n\text{-b-}(PS^z\text{-r-}DBE^{1-z})_n$ graft block polymers (System II).

| z | Sample ID | $M_n$ (kDa) | $N_{bb}$ | d* (nm) |
|---|---|---|---|---|
| 0.05 | Q1 | 152 | 337 | 27.2 |
|  | Q2 | 169 | 376 | 28.5 |
|  | Q3 | 184 | 408 | 30.0 |
|  | Q4 | 203 | 451 | 31.5 |

TABLE 15

Lamellar scaling laws ($d^* = b \times N_{bb}^\alpha$) obtained for System I using the least-square power-law fitting function in Igor.

| z | b | □ |
|---|---|---|
| 1.00 | 1.033 | 0.858 |
| 0.75 | 0.999 | 0.835 |
| 0.50 | 0.926 | 0.815 |
| 0.35 | 0.838 | 0.801 |
| 0.25 | 0.788 | 0.788 |
| 0.20 | 0.781 | 0.779 |
| 0.15 | 0.778 | 0.751 |
| 0.05 | 0.750 | 0.707 |
| 0.00 | 0.737 | 0.685 |

TABLE 16

Lamellar scaling laws ($d^* = b \times N_{bb}^\alpha$) obtained for System II using the least-square power-law fitting function in Igor.

| z | b | □ |
|---|---|---|
| 0.75 | 1.049 | 0.812 |
| 0.50 | 0.949 | 0.779 |
| 0.35 | 0.872 | 0.768 |
| 0.25 | 0.787 | 0.741 |
| 0.15 | 0.726 | 0.716 |
| 0.12 | 0.778 | 0.688 |
| 0.06 | 0.924 | 0.601 |
| 0.05 | 1.356 | 0.515 |

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

Where used, a bond represented by "⁓" (a squiggly or wavy line) refers to a bond having any angle or geometry, such as in the case of a chemical species exhibiting stereochemistry such as chirality. For example, the compound of formula (FX90):

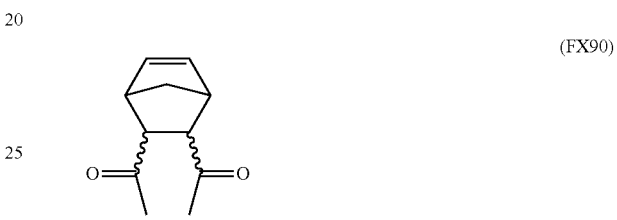

(FX90)

may correspond to one or more compounds, such as those having the formulas (FX90a), (FX90b), (FX90c), and (FX90d):

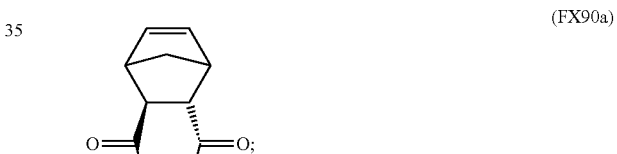

(FX90a)

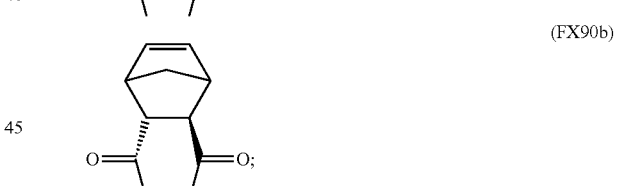

(FX90b)

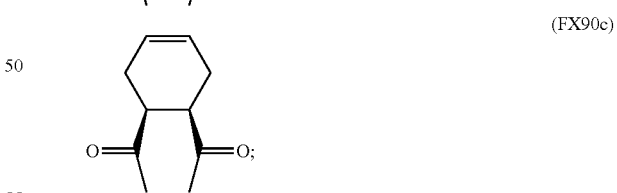

(FX90c)

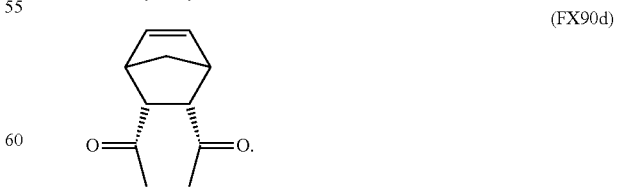

(FX90d)

It must also be noted that a bond represented as a non-wavy or non-squiggly line(s), such as a "_____", may exhibit more than one stereochemical configuration, such as chirality.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of synthesizing a graft copolymer, said method comprising the steps of:
copolymerizing a first macromonomer and a first reactive diluent; wherein said first macromonomer comprises a first backbone precursor directly or indirectly covalently linked to a first polymer side chain group;
wherein said first reactive diluent is provided in the presence of the first macromonomer at an amount selected so as to result in formation of said graft copolymer having a first backbone incorporating said first reactive diluent and said first macromonomer in a first polymer block characterized by a preselected first graft density and/or a preselected first graft distribution of said first macromonomer;
wherein said graft copolymer is a graft block copolymer; and wherein said method further comprises a step of:
copolymerizing a second macromonomer and a second reactive diluent;
wherein said second macromonomer comprises a second backbone precursor directly or indirectly covalently linked to a second polymer side chain group;
thereby resulting in formation of said graft copolymer having a second backbone incorporating said second reactive diluent and said second macromonomer in a second polymer block; wherein said second polymer block is directly or indirectly covalently linked to said first polymer block along said backbone; and wherein said second polymer block has a different composition than said first polymer block; and wherein said second reactive diluent is provided in the presence of the second macromonomer at an amount selected so as to result in said second polymer block being characterized by a preselected second graft density and/or a preselected second graft distribution of said second macromonomer;
wherein said first reactive diluent, said second reactive diluent, or each of said first reactive diluent and said second reactive diluent independently is defined by the formula (FX1a), (FX1b), or (FX1c):

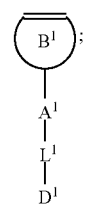

(FX1a)

-continued

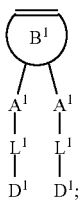
(FX1b)

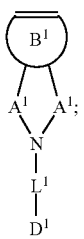
(FX1c)

wherein:
B₁ is a second backbone precursor group having a strained olefin;
each $A^1$ is independently an anchor group having the formula (FX3a) or (FX3b):

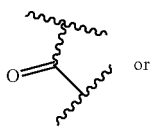
(FX3a)

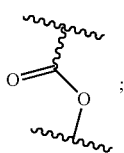
(FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof;

and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl; and wherein said first macromonomer, said second macromonomer, or each of said first macromonomer and said second macromonomer independently is defined by the formula (FX6a), (FX6b), or (FX6c):

(FX6a)

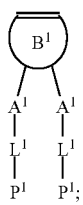
(FX6b)

(FX6c)

where:
B₁ is said second backbone precursor group having a strained olefin;
each $A^1$ is independently an anchor group having the formula (FX3a) or (FX3b):

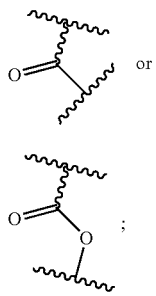
(FX3a)

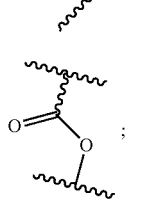
(FX3b)

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof;
and each $P^1$ is independently said second polymer side chain group.

2. The method of claim 1 further comprising one or more additional copolymerization steps, so as to result in said graft copolymer having one or more additional polymer blocks directly or indirectly covalently linked to said first backbone of said first polymer block.

3. The method of claim 1, wherein said second polymer side chain group is different from said first polymer side chain group and wherein said second reactive diluent is different from said first reactive diluent.

4. The method of claim 1 further comprising a step of copolymerizing a third polymer block, said third polymer block having a third backbone, wherein said third backbone of said third polymer block is directly or indirectly covalently linked to said first backbone of said first polymer block or to said second backbone of said second polymer block; wherein the composition of said third block is different from the composition said first polymer block, said second polymer block or both; and wherein said third polymer block comprises one or more third polymer side chain groups, and wherein said third reactive diluent is provided in the presence of the third macromonomer at an amount selected so as to result in formation of said third polymer block characterized by a preselected third graft density and/or a preselected third graft distribution of said one or more third polymer side chain groups.

5. The method of claim 1, wherein said first graft density of said first macromonomer in said first polymer block is equal to $[M^a{}_1]_0/([M^a{}_1]_0+[M^a{}_2]_0)$, where:
$[M^a{}_1]_0$ and $[M^a{}_2]_0$ are initial concentrations of said first macromonomer and said first reactive diluent, respectively; and wherein said first graft density is selected from the range of 0.05 to 0.75.

6. The method of claim 5, wherein said first graft density is selected from the range of 0.05 to 0.32, 0.34 to 0.49, 0.51 to 0.65, or 0.68 to 0.75.

7. The method of claim 1, where:
$r^a{}_1$ is a reactivity ratio of said first macromonomer; and
$r^a{}_2$ is a reactivity ratio of said first reactive diluent;
wherein:
said first graft distribution of said first macromonomer is an alternating graft distribution when $r^a{}_1$ is less than 1 and $r^a{}_2$ is less than 1;
said first graft distribution of said first macromonomer is a blocky graft distribution when $r^a{}_1$ is greater than 1 and $r^a{}_2$ is greater than 1; wherein the first polymer block characterized by the blocky graft distribution comprises four or more identical first repeating units followed by four or more identical second repeating units, wherein each of the first repeating units or each of the second repeating units comprises the first polymer side chain group of said first macromonomer;
said first graft distribution of said first macromonomer is a random graft distribution when $r^a{}_1$ is within 10% of or equal to 1 and $r^a{}_2$ is within 10% of or equal to 1; or
said first graft distribution of said first macromonomer is a gradient graft distribution when $r^a{}_1$ is less than 1 and $r^a{}_2$ is greater than 1;
wherein said step of copolymerizing said first macromonomer is performed in the presence of a catalyst; and wherein first polymer block has a preselected first degree of polymerization, said first degree of polymerization being equal to $([M^a{}_1]_0+[M^a{}_2]_0)/[Cat]_0$; where:
$[Cat]_0$ is an initial concentration of said catalyst; and
$[M^a{}_1]_0$ and $[M^a{}_2]_0$ are initial concentrations of said first macromonomer and said first reactive diluent, respectively.

8. The method of claim 1, wherein said second graft density is equal to $[M^b{}_1]_0/([M^b{}_1]_0+[M^b{}_2]_0)$, where:
$[M^b{}_1]_0$ and $[M^b{}_2]_0$ are initial concentrations of said second macromonomer and said second reactive diluent, respectively; and wherein said preselected second graft density is any value selected from the range of 0.05 to 0.75.

9. The method of claim 8, wherein said second graft density is selected from the range of 0.05 to 0.32, 0.34 to 0.49, 0.51 to 0.65, or 0.68 to 0.75.

10. The method of claim 1, where:
$r^b{}_1$ is a reactivity ratio of said second macromonomer; and
$r^b{}_2$ is a reactivity ratio of said second reactive diluent;
wherein:
said second graft distribution is an alternating graft distribution when $r^b{}_1$ is less than 1 and $r^b{}_2$ is less than 1;
said second graft distribution is a blocky graft distribution when $r^b{}_1$ is greater than 1 and $r^b{}_2$ is greater than 1; wherein the first polymer block characterized by the blocky graft distribution comprises four or more identical first repeating units followed by four or more identical second repeating units;
said second graft distribution is a random graft distribution when $r^b{}_1$ is within 10% of or equal to 1 and $r^b{}_2$ is within 10% of or equal to 1; or
said second graft distribution is a gradient graft distribution when $r^b{}_1$ is less than 1 and $r^b{}_2$ is greater than 1;
wherein said step of copolymerizing said second macromonomer is performed in the presence of a catalyst; and wherein second polymer block has a preselected second degree of polymerization, said second degree of polymerization being equal to $([M^b{}_1]_0+[M^b{}_2]_0)/[Cat]_0$; where:
$[Cat]_0$ is initial concentration of said catalyst; and
$[M^b{}_1]_0$ and $[M^b{}_2]_0$ are initial concentrations of said second macromonomer and said second reactive diluent, respectively.

11. The method of claim 1, wherein a polydispersity index of said graft copolymer is selected from the range of 1.00 to 1.10.

12. The method of claim 1, wherein said first reactive diluent is defined by the formula (FX1a), (FX1b), or (FX1c):

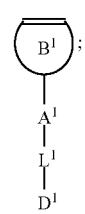
(FX1a)

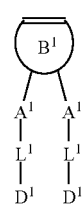
(FX1b)

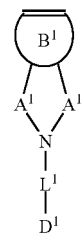
(FX1c)

where:
$B_1$ is a first backbone precursor group having a strained olefin;

each $A^1$ is independently an anchor group having the formula (FX3a) or (FX3b):

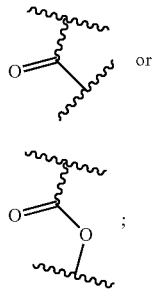

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof;

and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl; and wherein said first macromonomer is defined by the formula (FX6a), (FX6b), or (FX6c):

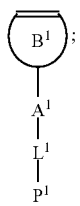

(FX6a)

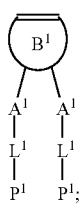

(FX6b)

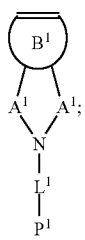

(FX6c)

where:
$B_1$ is said first backbone precursor group having a strained olefin;
each $A^1$ is independently an anchor group having the formula (FX3a) or (FX3b):

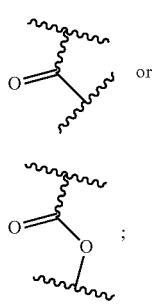

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof;

and each $P^1$ is independently said first polymer side chain group.

13. The method of claim 12, wherein said first reactive diluent is defined by the formula (FX5):

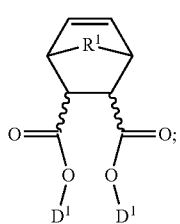

where:
$R^1$ is —$CH_2$—, —$C_2H_4$—, —NH—, or —O—; and
each $D^1$ is independently a $C_1$-$C_4$ alkyl dangling group.

14. The method of claim 12, wherein each $B^1$ connected to one or more $A^1$ has the formula (FX4a), (FX4b), or (FX4c):

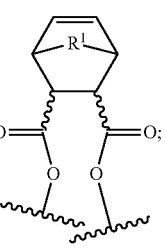

(FX4a)

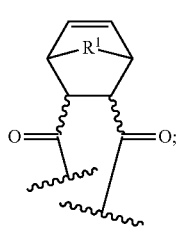

(FX4b)

-continued (FX4c)

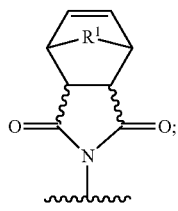

where:
R$^1$ is selected from the group consisting of —CH$_2$—, —C$_2$H$_4$—, —NH—, and —O—.

15. The method of claim 12, wherein each L$^1$ is independently is defined by the formula (FX5a), (FX5b), (FX5c), or any combination thereof:

(FX5a)

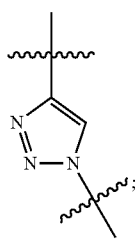

(FX5b)

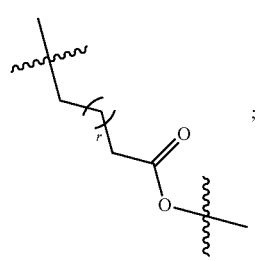

(FX5c)

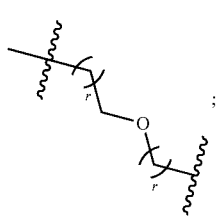

wherein r is 0 or an integer selected from the range of 1 to 5.

16. The method of claim 12, wherein each P$^1$ is independently defined by the formula (FX6a), (FX6b), (FX6c), or (FX6d):

(FX6a)

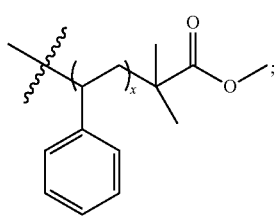

-continued (FX6b)

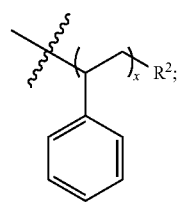

(FX6c)

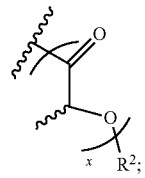

(FX6d)

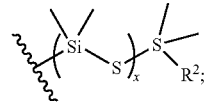

wherein x is an integer selected from the range of 10 to 100;

wherein R$^2$ is a hydrogen, C$_1$-C$_{30}$ alkyl, C$_3$-C$_{30}$ cycloalkyl, C$_5$-C$_{30}$ aryl, C$_5$-C$_{30}$ heteroaryl, C$_1$-C$_{30}$ acyl, C$_1$-C$_{30}$ hydroxyl, C$_1$-C$_{30}$ alkoxy, C$_2$-C$_{30}$ alkenyl, C$_2$-C$_{30}$ alkynyl, C$_5$-C$_{30}$ alkylaryl, —CO$_2$R$^3$, —CONR$^4$R$^5$, —COR$^6$, —SOR$^7$, —OSR$^8$, —SO$_2$R$^9$, —OR$^{10}$, —SR$^{11}$, —NR$^{12}$R$^{13}$, —NR$^{14}$COR$^{15}$, C$_1$-C$_{30}$ alkyl halide, phosphonate, phosphonic acid, silane, siloxane, silsesquioxane, C$_2$-C$_{30}$ halocarbon chain, C$_2$-C$_{30}$ perfluorocarbon, C$_2$-C$_{30}$ polyethylene glycol, a metal, or a metal complex, wherein each of R$^3$-R$^{15}$ is independently H, C$_5$-C$_{10}$ aryl or C$_1$-C$_{10}$ alkyl.

17. The method of claim 12, wherein said first macromonomer is defined by the formula (FX7a), (FX7b), or (FX7c):

(FX7a)

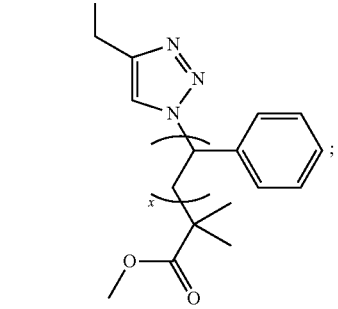

(FX7b)

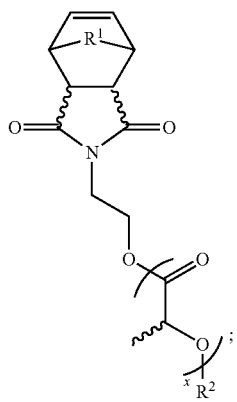

(FX7c)

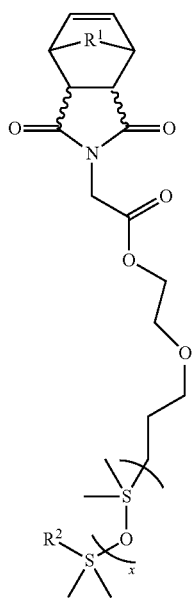

where:
$R^1$ is selected from the group consisting of —$CH_2$—, —$C_2H_4$—, —NH—, and —O—;
$R^2$ is a hydrogen or $C_1$-$C_5$ alkyl; and
x is an integer selected from the range of 10 to 100.

18. The method of claim 1, wherein said second reactive diluent is defined by the formula (FX1a), (FX1b), or (FX1c):

(FX1a)

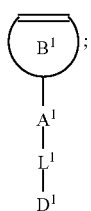

(FX1b)

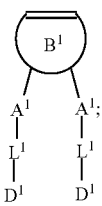

(FX1c)

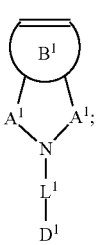

where:
$B_1$ is a second backbone precursor group having a strained olefin;
each $A^1$ is independently an anchor group having the formula (FX3a) or (FX3b):

(FX3a)

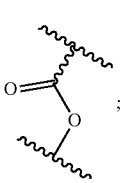

or (FX3b)

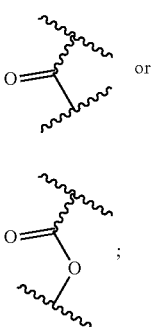

each $L^1$ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof;

and each $D^1$ is independently a dangling group that is a substituted or unsubstituted $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl; and wherein said second macromonomer is defined by the formula (FX6a), (FX6b), or (FX6c):

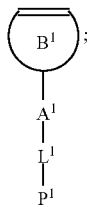 (FX6a)

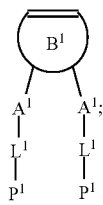 (FX6b)

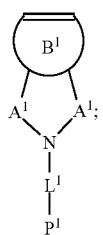 (FX6c)

where:
- B₁ is said second backbone precursor group having a strained olefin;
- each A¹ is independently an anchor group having the formula (FX3a) or (FX3b):

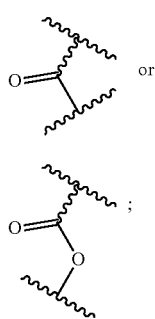 (FX3a) or (FX3b)

each L¹ is independently a linker group selected from the group consisting of a single bond, —O—, $C_1$-$C_{10}$ alkyl, $C_2$-$C_{10}$ alkenylene, $C_3$-$C_{10}$ arylene, $C_1$-$C_{10}$ alkoxy, $C_1$-$C_{10}$ acyl, triazole, diazole, pyrazole, and any combination thereof;

and each P¹ is independently said second polymer side chain group.

19. The method of claim 18, wherein said second reactive diluent is defined by the formula (FX5):

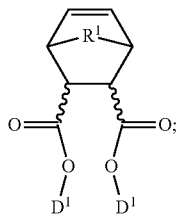 (FX5)

where:
R¹ is —CH₂—, —C₂H₄—, —NH—, or —O—; and
each D¹ is independently a $C_1$-$C_4$ alkyl dangling group.

20. The method of claim 18, wherein B¹ connected to one or more A¹ has the formula (FX4a), (FX4b), or (FX4c):

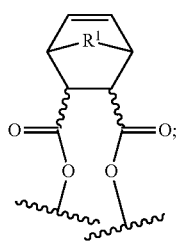 (FX4a)

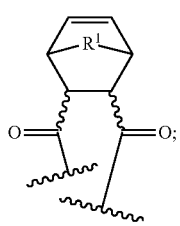 (FX4b)

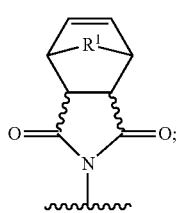 (FX4c)

where:
R¹ is selected from the group consisting of —CH₂—, —C₂H₄—, —NH—, and —O—.

21. The method of claim 18, wherein each L¹ is independently is defined by the formula (FX5a), (FX5b), (FX5c), or any combination thereof:

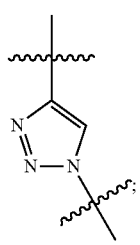 (FX5a)

-continued (FX5b)

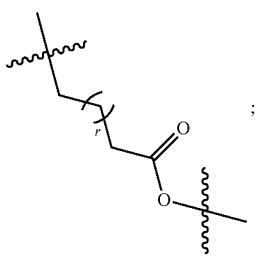

(FX5c)

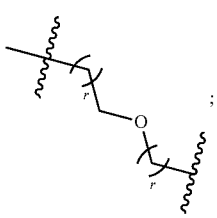

wherein r is 0 or an integer selected from the range of 1 to 5.

22. The method of claim 18, wherein each $P^1$ is independently defined by the formula (FX6a), (FX6b), (FX6c), or (FX6d):

(FX6a)

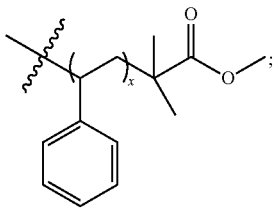

(FX6b)

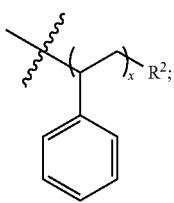

(FX6c)

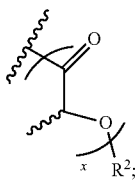

(FX6d)

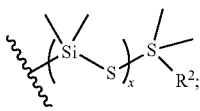

wherein x is an integer selected from the range of 10 to 100;

wherein $R^2$ is a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —$NR^{14}COR^{15}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^3$-$R^{15}$ is independently H, $C_5$-$C_{10}$ aryl or $C_1$-$C_{10}$ alkyl.

23. The method of claim 18, wherein said second macromonomer is defined by the formula (FX7a), (FX7b), or (FX7c):

(FX7a)

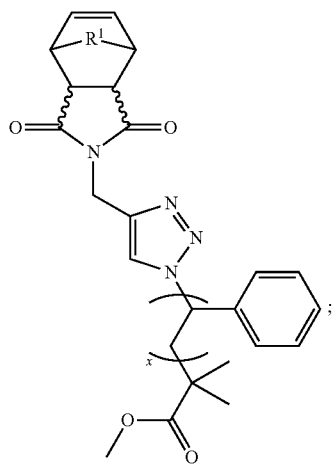

(FX7b)

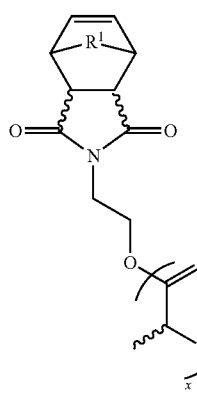

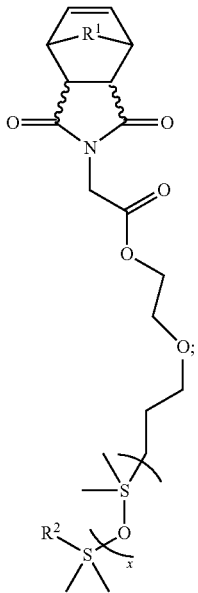

(FX7c)

where:
R[1] is selected from the group consisting of —CH$_2$—, —C$_2$H$_4$—, —NH—, and —O—;
R[2] is a hydrogen or C$_1$-C$_5$ alkyl; and
x is an integer selected from the range of 10 to 100.

24. The method of claim 7, wherein said catalyst is a Grubbs' catalyst or a third-generation Grubbs' catalyst ("G3").

25. The method of claim 1, wherein said step of copolymerizing a first macromonomer and a first reactive diluent is a grafting through copolymerization of said first macromonomer and first reactive diluent; and wherein said grafting through copolymerization of said first macromonomer and first reactive diluent is carried out via ring-opening metathesis polymerization.

26. The method of claim 1, wherein said step of copolymerizing a second macromonomer and a second reactive diluent is a grafting through copolymerization of said second macromonomer and second reactive diluent; and wherein said grafting through copolymerization of said second macromonomer and second reactive diluent is carried out via ring-opening metathesis polymerization.

27. The method of claim 5 comprising selecting said first graft density and selecting the initial concentrations of said first macromonomer and said first reactive diluent so as to result in said first polymer block being characterized by the first graft density of the first macromonomer.

28. The method of claim 7 comprising selecting the first graft distribution and selecting the first macromonomer and the first reactive diluent group so as to result in said first polymer block being characterized by the first graft distribution of the first macromonomer.

29. The method of claim 1, wherein the first reactive diluent is provided in the presence of the first macromonomer in a mixture of the first reactive diluent and the first macromonomer during the step of copolymerizing the first macromonomer and the first reactive diluent.

30. A method of synthesizing a graft copolymer, said method comprising the steps of:
copolymerizing a first macromonomer and a first reactive diluent; wherein said first macromonomer comprises a first backbone precursor directly or indirectly covalently linked to a first polymer side chain group;
wherein said first reactive diluent is provided in the presence of the first macromonomer at an amount selected so as to result in formation of said graft copolymer having a first backbone incorporating said first reactive diluent and said first macromonomer in a first polymer block characterized by a preselected first graft density and/or a preselected first graft distribution of said first macromonomer;
wherein said graft copolymer is a graft block copolymer; and wherein said method further comprises a step of:
copolymerizing a second macromonomer and a second reactive diluent;
wherein said second macromonomer comprises a second backbone precursor directly or indirectly covalently linked to a second polymer side chain group;
thereby resulting in formation of said graft copolymer having a second backbone incorporating said second reactive diluent and said second macromonomer in a second polymer block; wherein said second polymer block is directly or indirectly covalently linked to said first polymer block along said backbone; and wherein said second polymer block has a different composition than said first polymer block; and wherein said second reactive diluent is provided in the presence of the second macromonomer at an amount selected so as to result in said second polymer block being characterized by a preselected second graft density and/or a preselected second graft distribution of said second macromonomer;
wherein said step of copolymerizing a second macromonomer and a second reactive diluent is a grafting through copolymerization of said second macromonomer and second reactive diluent; and wherein said grafting through copolymerization of said second macromonomer and second reactive diluent is carried out via ring-opening metathesis polymerization.

* * * * *

UNITED STATES PATENT AND TRADEMARK OFFICE
CERTIFICATE OF CORRECTION

PATENT NO. : 11,053,356 B2
APPLICATION NO. : 15/914762
DATED : July 6, 2021
INVENTOR(S) : Grubbs et al.

Page 1 of 1

It is certified that error appears in the above-identified patent and that said Letters Patent is hereby corrected as shown below:

In the Claims

• Claim 16 (Column 152, Line 25): please replace the "S" in the parenthetically enclosed element of formula FX6d with --O--.

• Claim 22 (Column 157, Line 64): please replace the "S" in the parenthetically enclosed element of formula FX6d with --O--.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*